United States Patent [19]

Gallo

[11] 4,349,832

[45] Sep. 14, 1982

[54] DIGITAL DATA RATE CORRECTOR AND TIME BASE CORRECTOR

[75] Inventor: Luigi C. Gallo, Woodside, Calif.

[73] Assignee: Ampex Corporation, Redwood City, Calif.

[21] Appl. No.: 108,912

[22] Filed: Dec. 31, 1979

Related U.S. Application Data

[63] Continuation of Ser. No. 763,762, Jan. 28, 1977, Pat. No. 4,181,817.

[51] Int. Cl.[3] .......................... H04N 5/785; H04N 9/02

[52] U.S. Cl. .......................................... 358/8; 358/17; 360/9; 375/114; 375/119

[58] Field of Search .................... 358/8, 13, 17, 18, 19, 358/148, 149; 360/9, 33; 370/100, 108; 375/107, 114, 118, 119

[56] References Cited

U.S. PATENT DOCUMENTS 4,133,009 1/1979 Kittler et al. ........................ 360/9

4,212,027 7/1980 Lemoine .............................. 358/17

4,231,063 10/1980 Ito et al. ................................ 358/19

*Primary Examiner*—Benedict V. Safourek

*Attorney, Agent, or Firm*—Ralph L. Mossino; Robert G. Clay; Joel D. Talcott

[57] ABSTRACT

A first digital data memory is responsive to a first clock signal varying at a rate in accordance with the timing errors contained in a stream of digital data to enter the digital data for temporary storage. The stored digital data is retrieved from storage in the first digital data memory in response to a second clock signal of a stable reference rate. The relative times of entering and retrieving the digital data in the first digital memory are set according to the occurrence of a selected sequence of digital data bits contained in the digital data. The digital data retrieved from the first digital data memory is further temporarily stored in a second digital data memory for an interval determined by the time difference between the occurrence of the selected sequence of digital data bits and the occurrence of a reference time signal.

11 Claims, 43 Drawing Figures

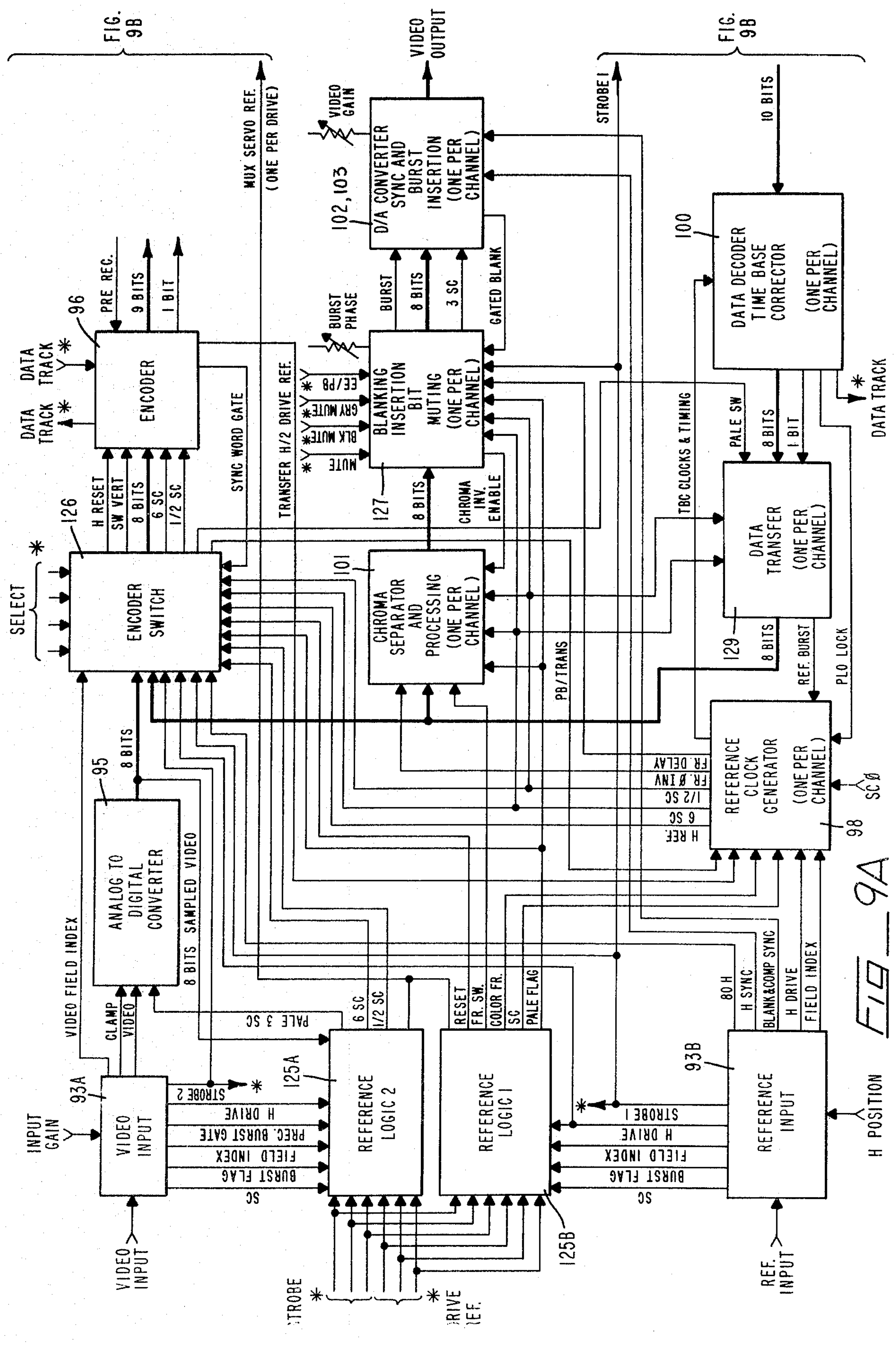
FIG_9A

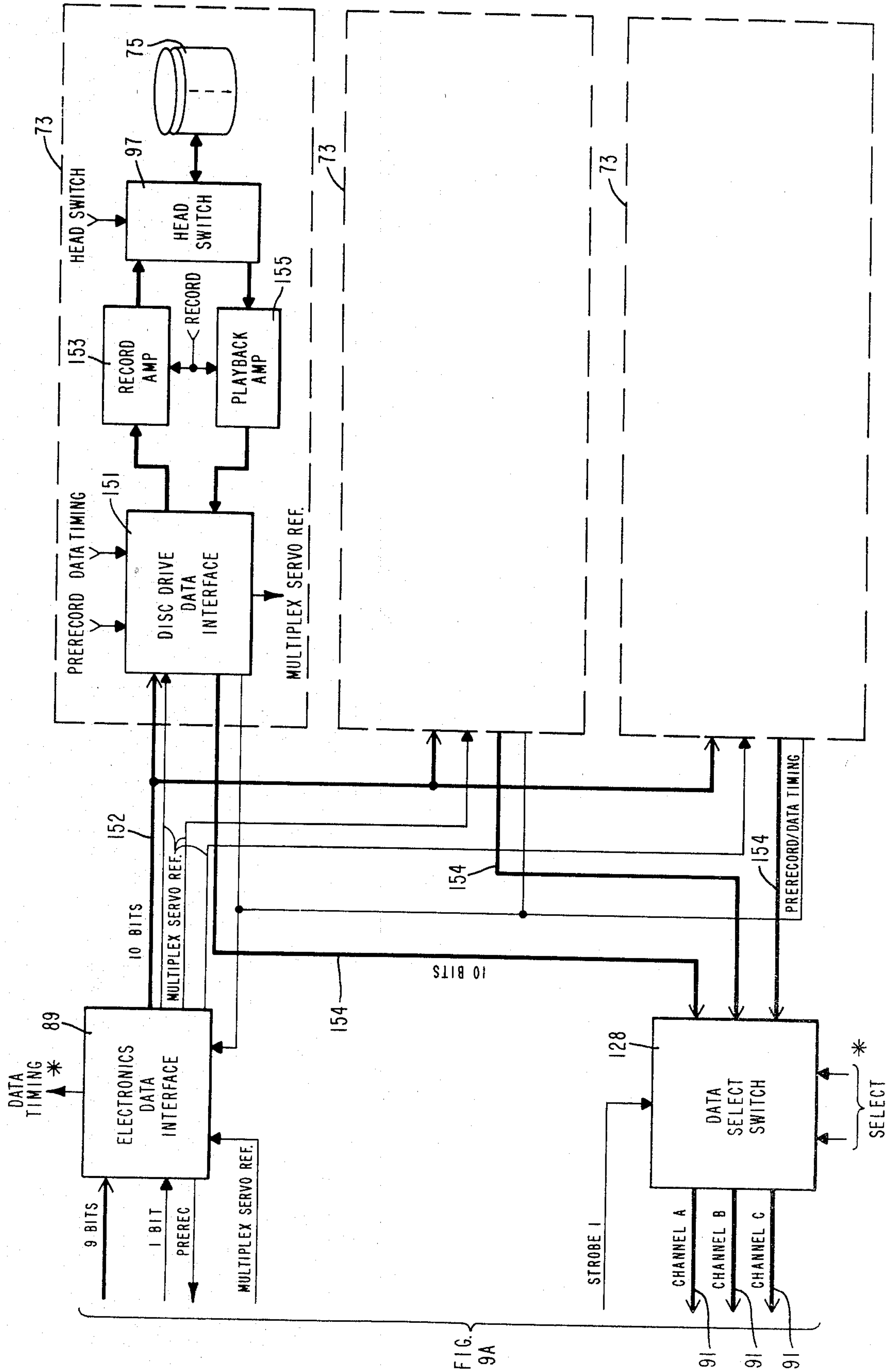
FIG_9B

Fig. 12C
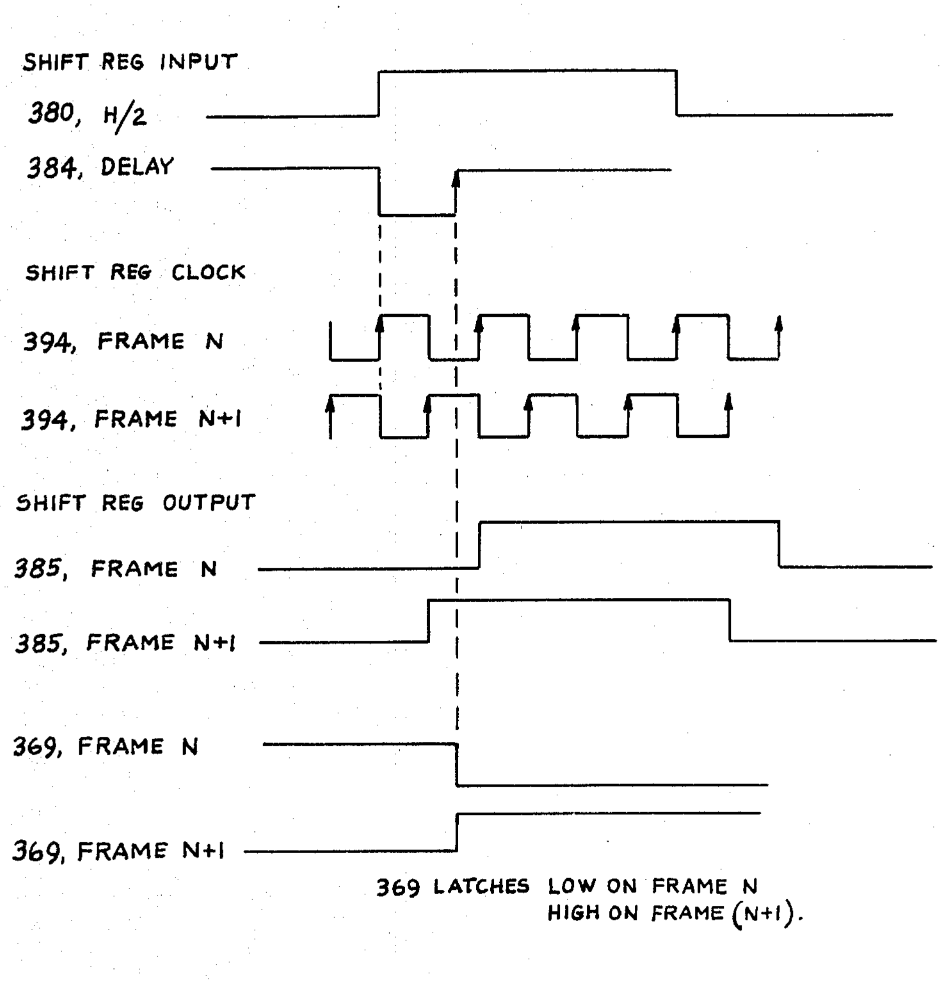
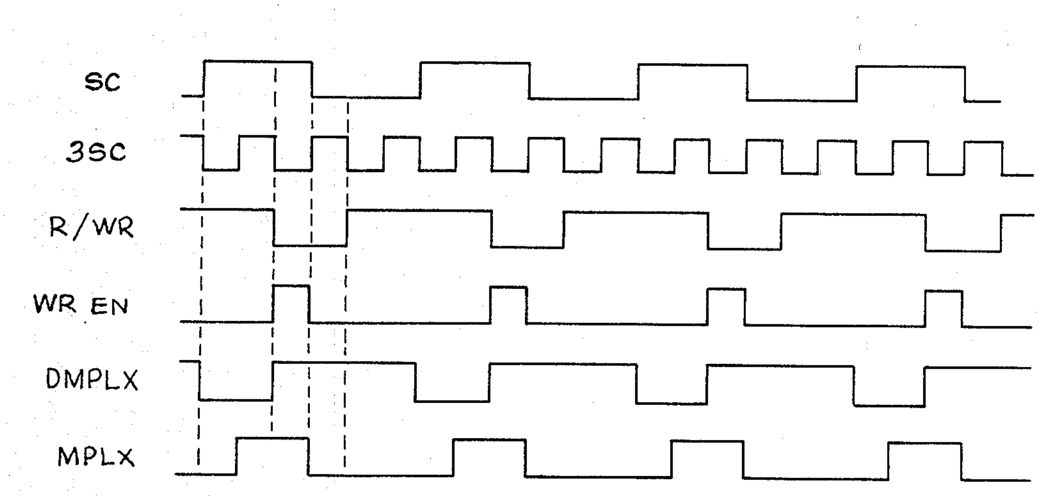
Fig. 12B

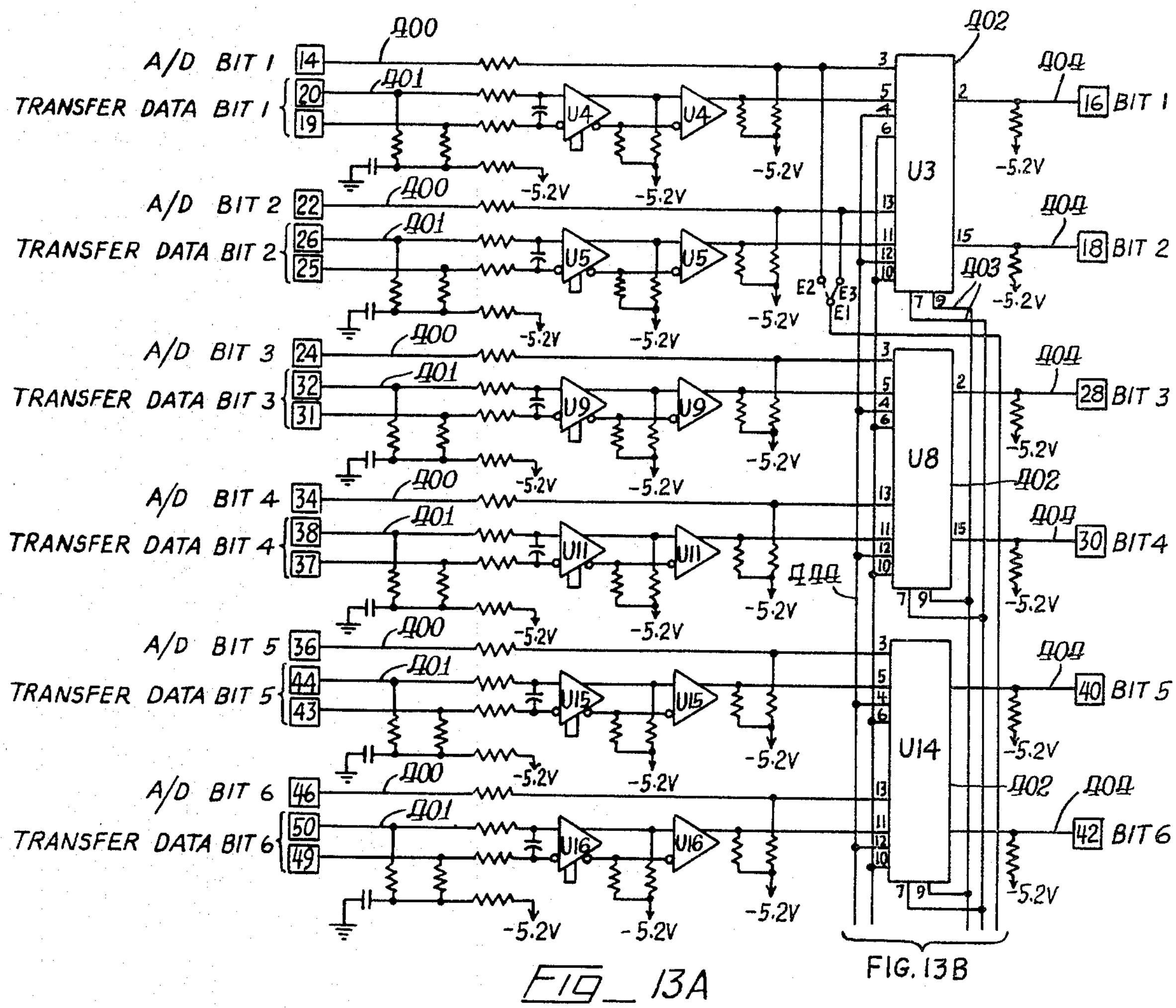
FIG_13A

| DATA SELECT MODE | 2¹ | 2⁰ |
|---|---|---|
| TEST | H | H |
| DELETE | H | L |
| TRANSFER | L | H |
| VIDEO INPUT | L | L |

| REFERENCE SELECT | STATE |
|---|---|
| REF LOGIC #1 (REF INPUT) | H |
| REF LOGIC #2 (VIDEO INPUT) | L |

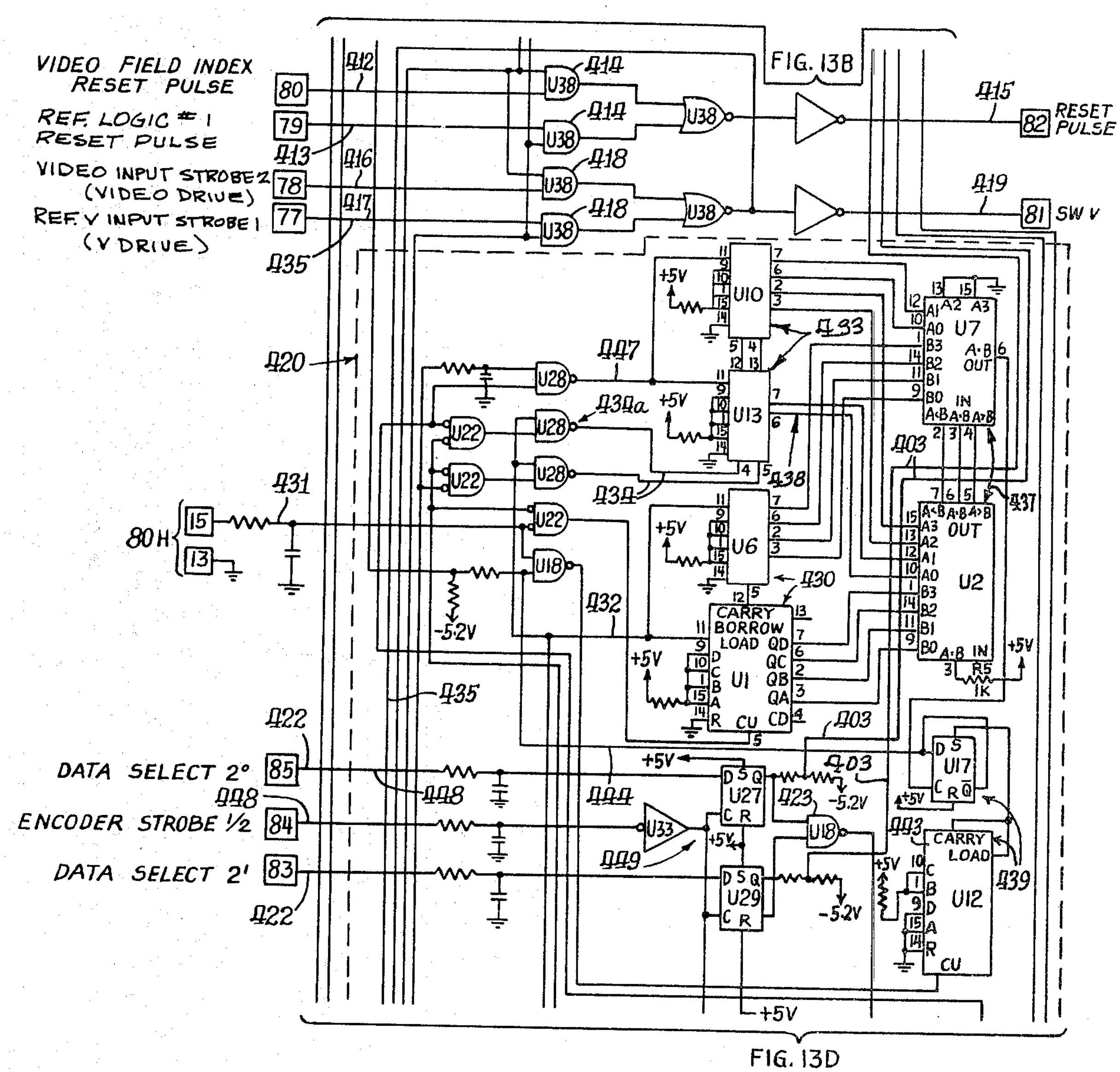
Fig_ 13C
| INTEGRATED CIRCUIT LIST | | | | | | | | | | | | | |
|---|---|---|---|---|---|---|---|---|---|---|---|---|---|
| REFERENCE DESIGNATIONS | U4,5,9,11,15,16 20,23,25,31 | U3,8, 14,19 | U34,35 | U24,30 | U18,28 | U22 | U21,33 | U38 | U17,27, 29 | U26 | U2,7 | U32,37 | U1,6,10, 12,13 |
| AMPEX P/N | 587-704 | 587-664 | 587-139 | 587-549 | 586-075 | 586-109 | 586-326 | 586-287 | 586-108 | 586-705 | 586-601 | 586-492 | 586-800 |
| VENDOR P/N | 10116 | 10174 | 10131 | 10104 | 7400 | 7402 | 7404 | 74H51 | 7474 | 7486 | 7485 | 7496 | 74193 |
| VOLTAGE (PIN) | -5.2V (8) | -5.2V(18) | -5.2V(8) | -5.2V(8) | +5V(14) | +5V(14) | +5V(14) | +5V(14) | +5V(14) | +5V(14) | +5V(16) | +5V(5) | +5V(16) |
| GROUND PINS | 1,16 | 1,16 | 1,16 | 1,16 | 7 | 7 | 7 | 7 | 7 | 7 | 8 | 12 | 8 |

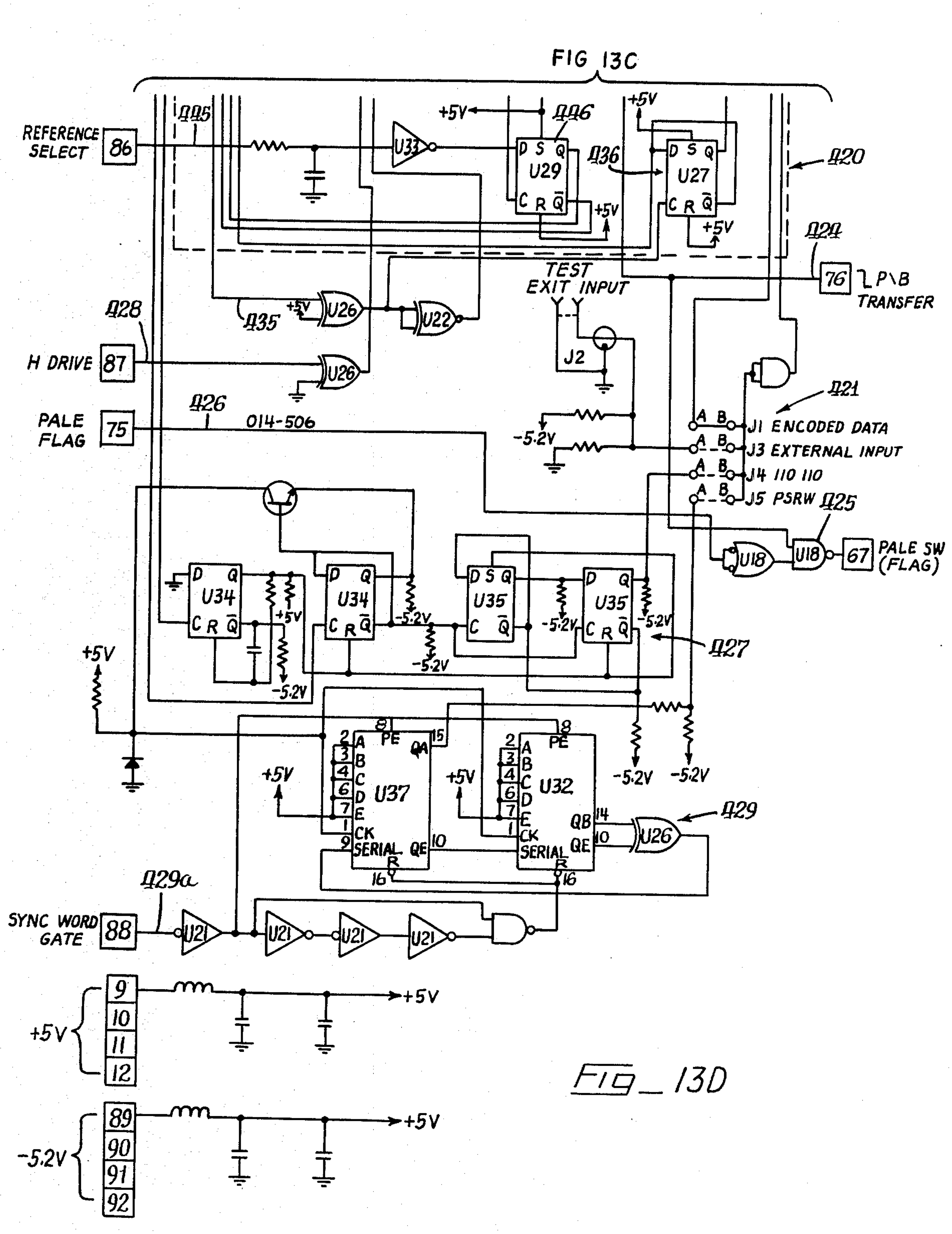
FIG_13D

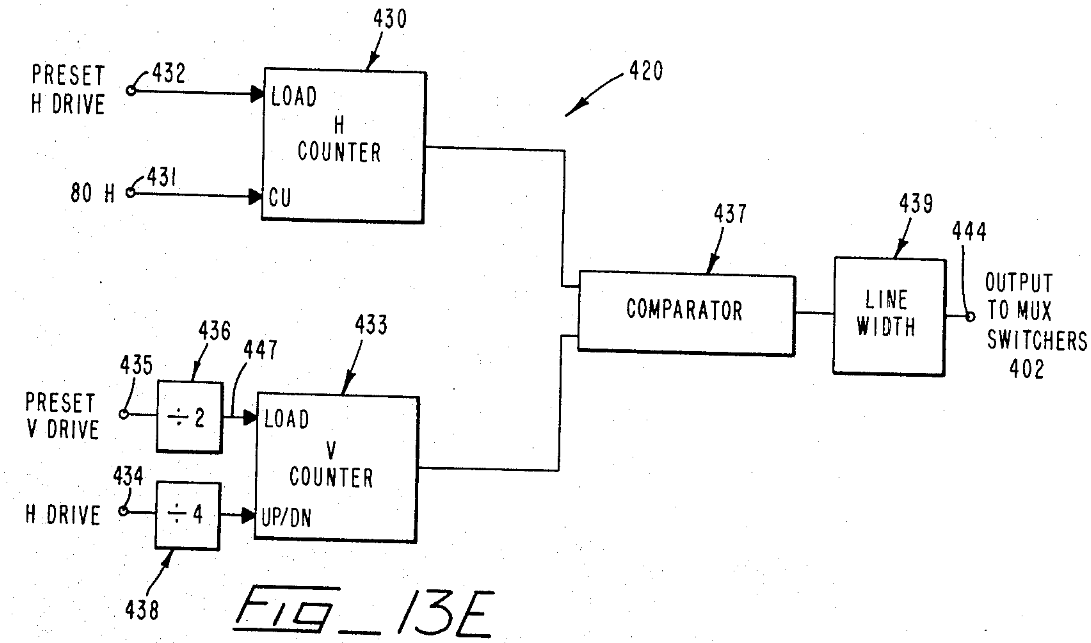
FIG_13E
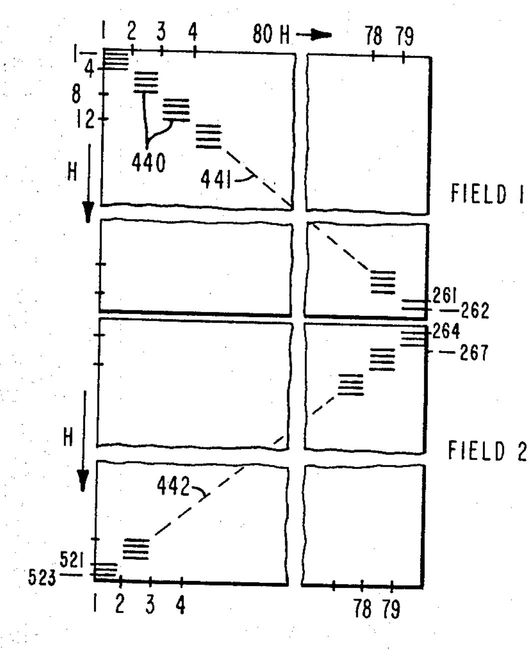
FIG_13F

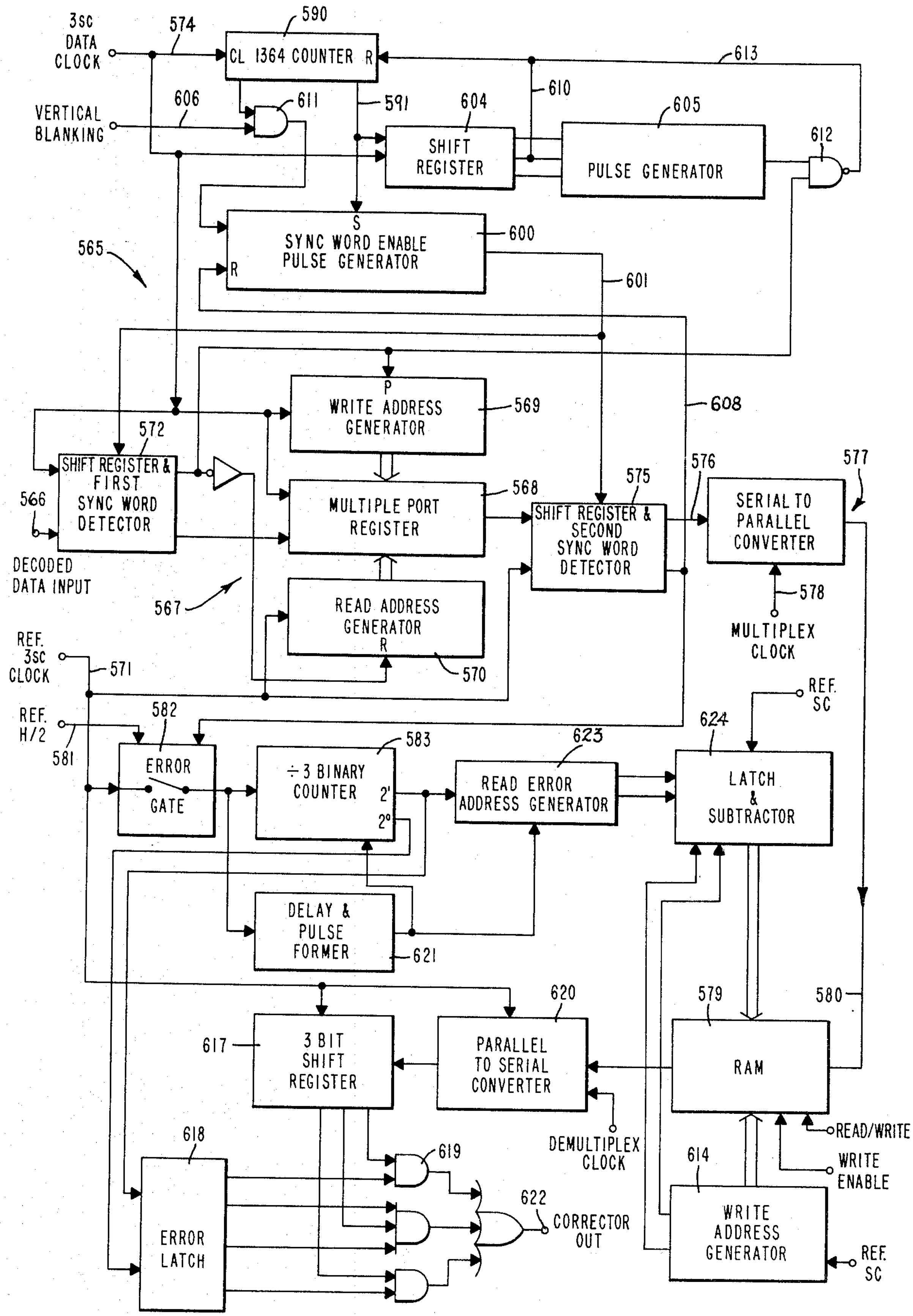
FIG_15A

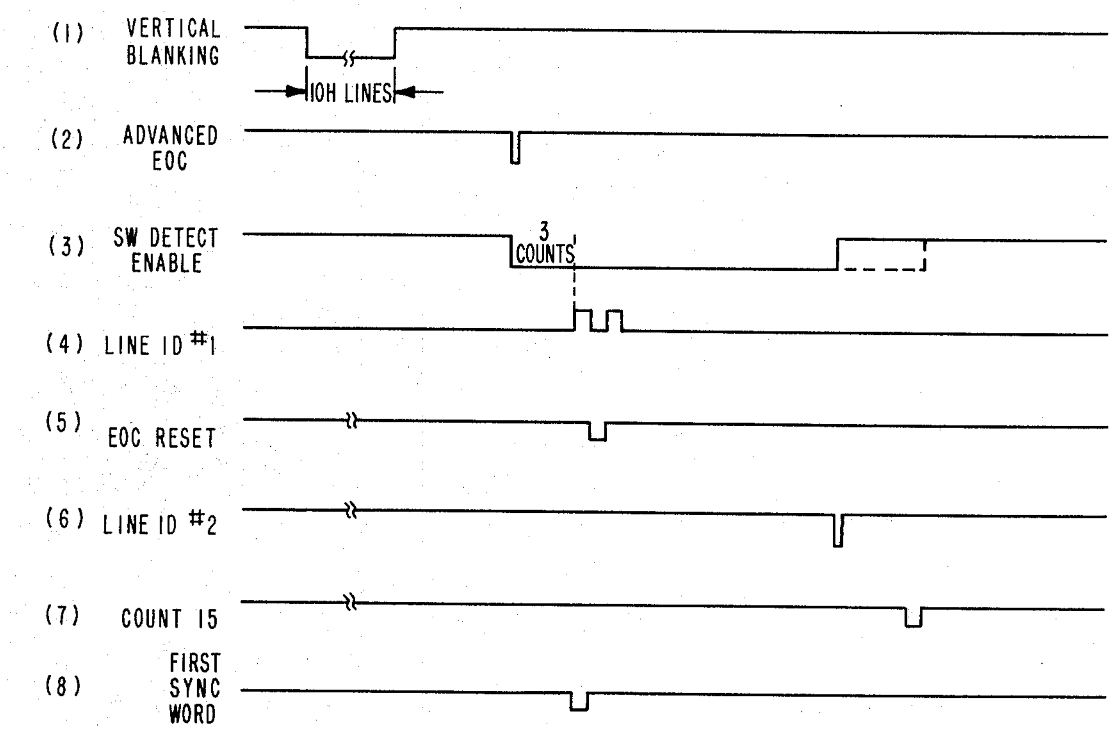
FIG_15B
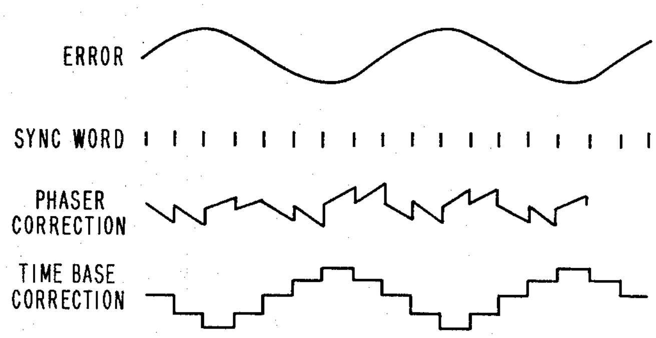
FIG_15C

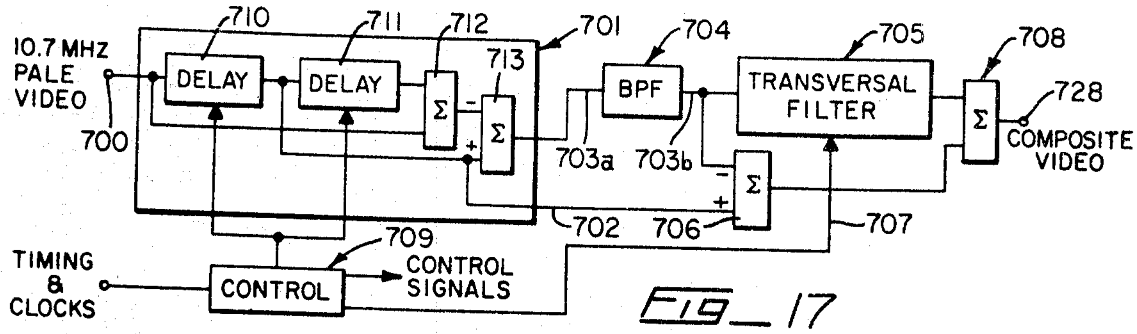
FIG_17
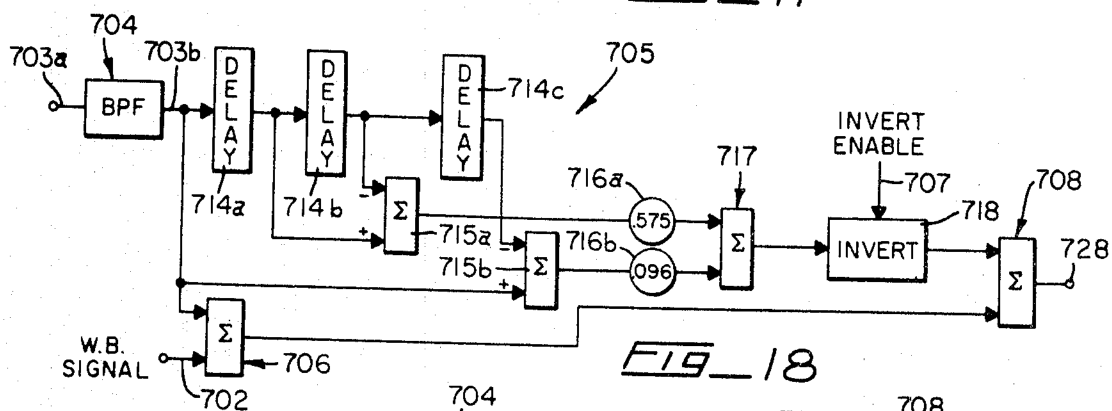
FIG_18
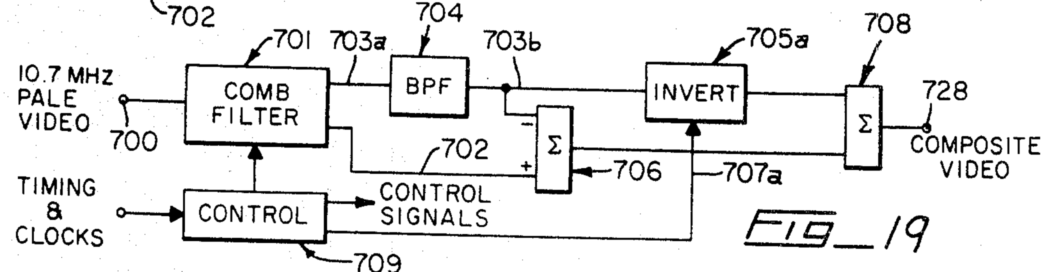
FIG_19
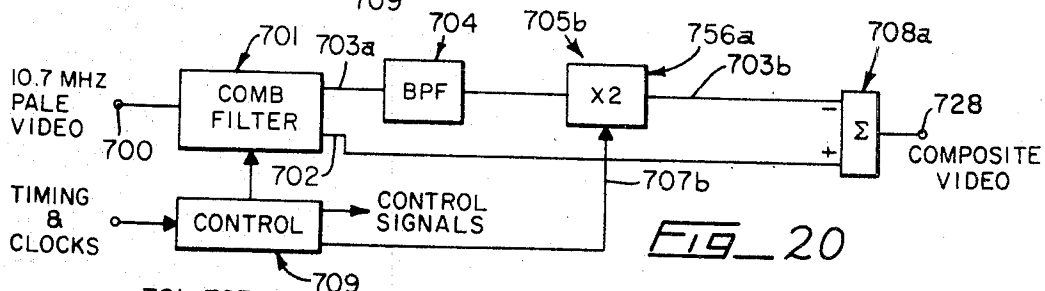
FIG_20
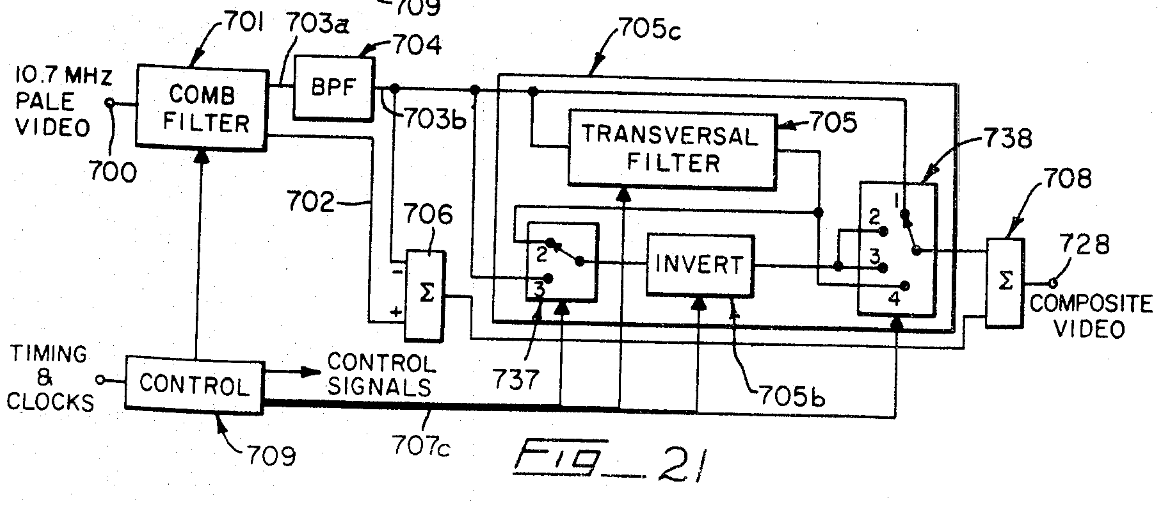
FIG_21

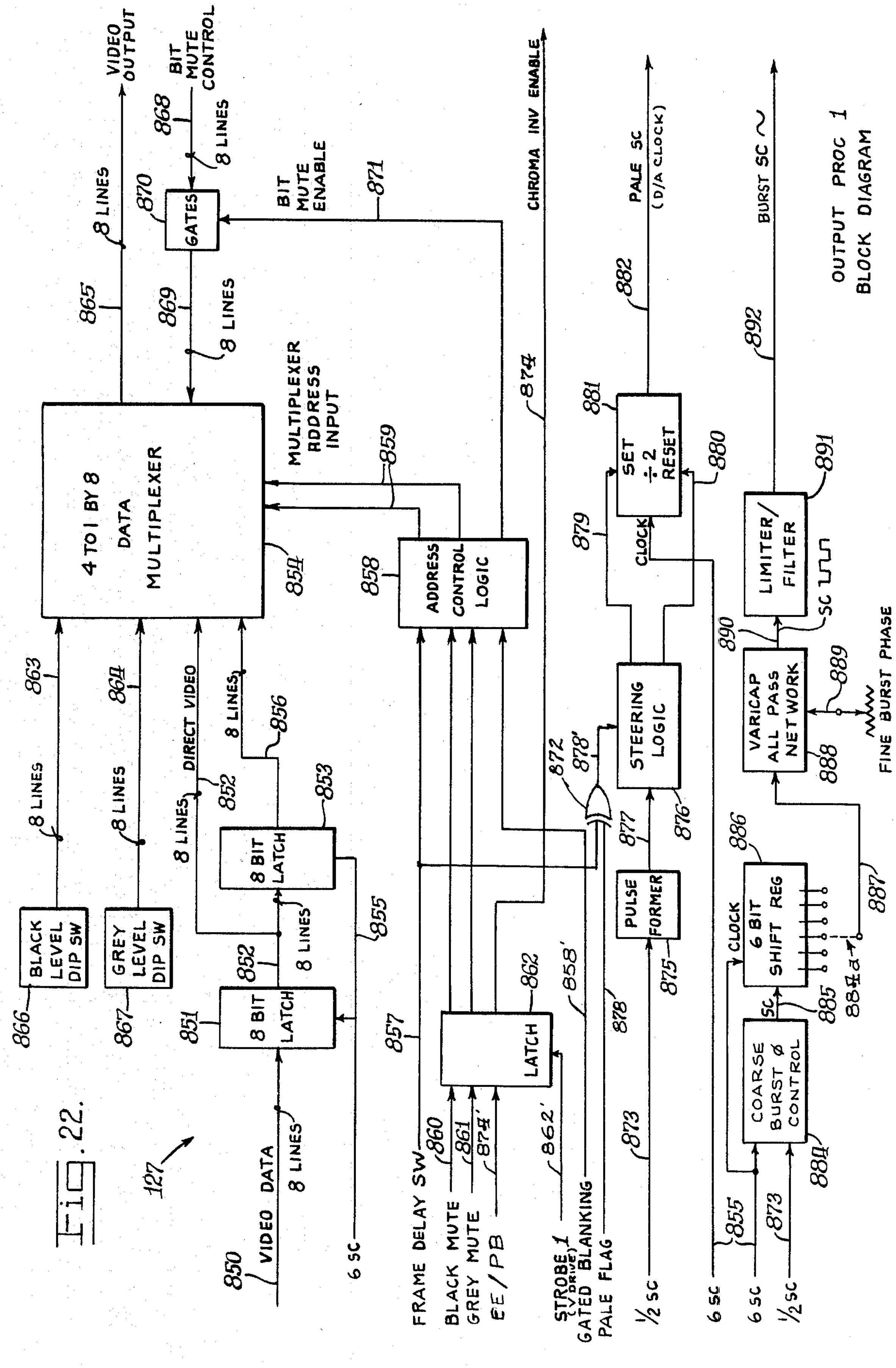
FIG. 22.
127
VIDEO DATA
8 LINES
850
6 SC
8 BIT LATCH
851
852
8 LINES
8 BIT LATCH
853
855
856
8 LINES
DIRECT VIDEO
BLACK LEVEL DIP SW
866
GREY LEVEL DIP SW
867
8 LINES
863
864
4 TO 1 BY 8 DATA MULTIPLEXER
854
865
VIDEO OUTPUT
8 LINES
869
GATES
870
868
BIT MUTE CONTROL
BIT MUTE ENABLE
871
MULTIPLEXER ADDRESS INPUT
859
ADDRESS CONTROL LOGIC
858
LATCH
862
857
FRAME DELAY SW
BLACK MUTE
GREY MUTE
EE/PB
860
861
874'
862'
STROBE 1 (V DRIVE)
GATED BLANKING
PALE FLAG
858'
878
872
878'
874
CHROMA INV ENABLE
1/2 SC
873
PULSE FORMER
875
877
STEERING LOGIC
876
879
SET ÷ 2 RESET
CLOCK
881
880
882
PALE SC (D/A CLOCK)
6 SC
855
6 SC
1/2 SC
COARSE BURST Ø CONTROL
884
SC
885
6 BIT SHIFT REG
CLOCK
886
884a
887
VARICAP ALL PASS NETWORK
888
889
FINE BURST PHASE
890
LIMITER/FILTER
SC
891
892
BURST SC
OUTPUT PROC 1 BLOCK DIAGRAM

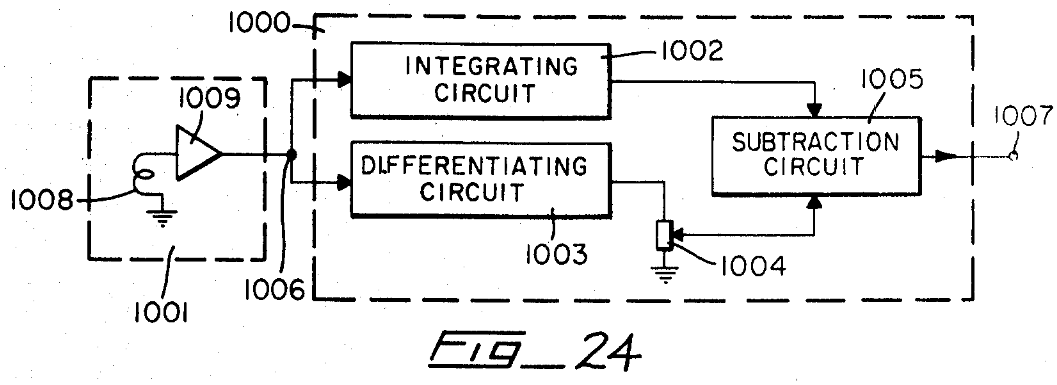
FIG_24
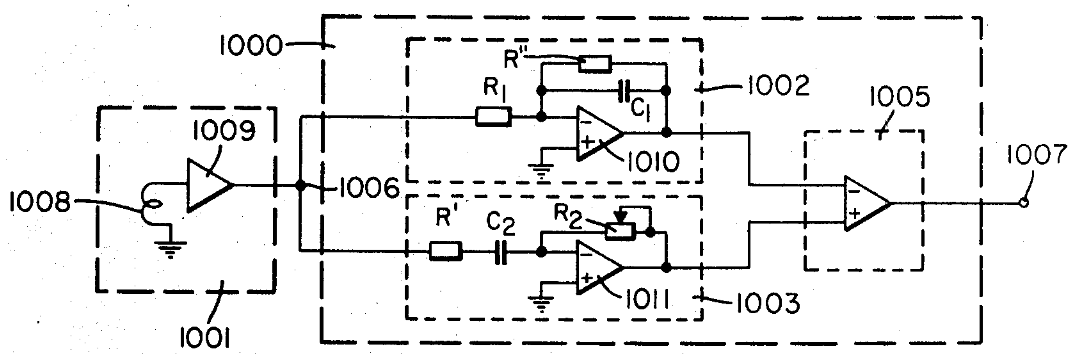
FIG_25
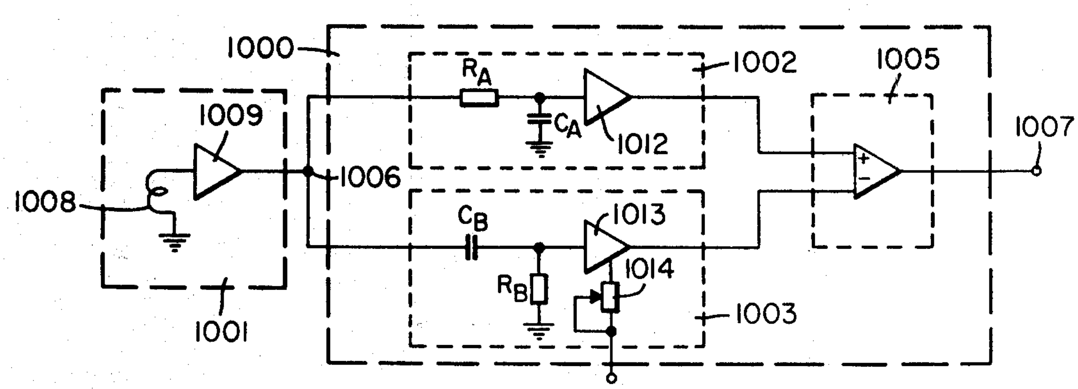
FIG_26
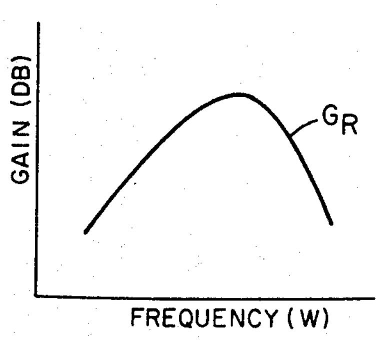
FIG_27
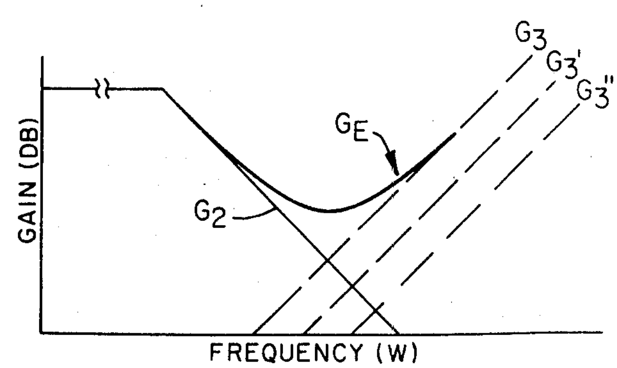
FIG_28

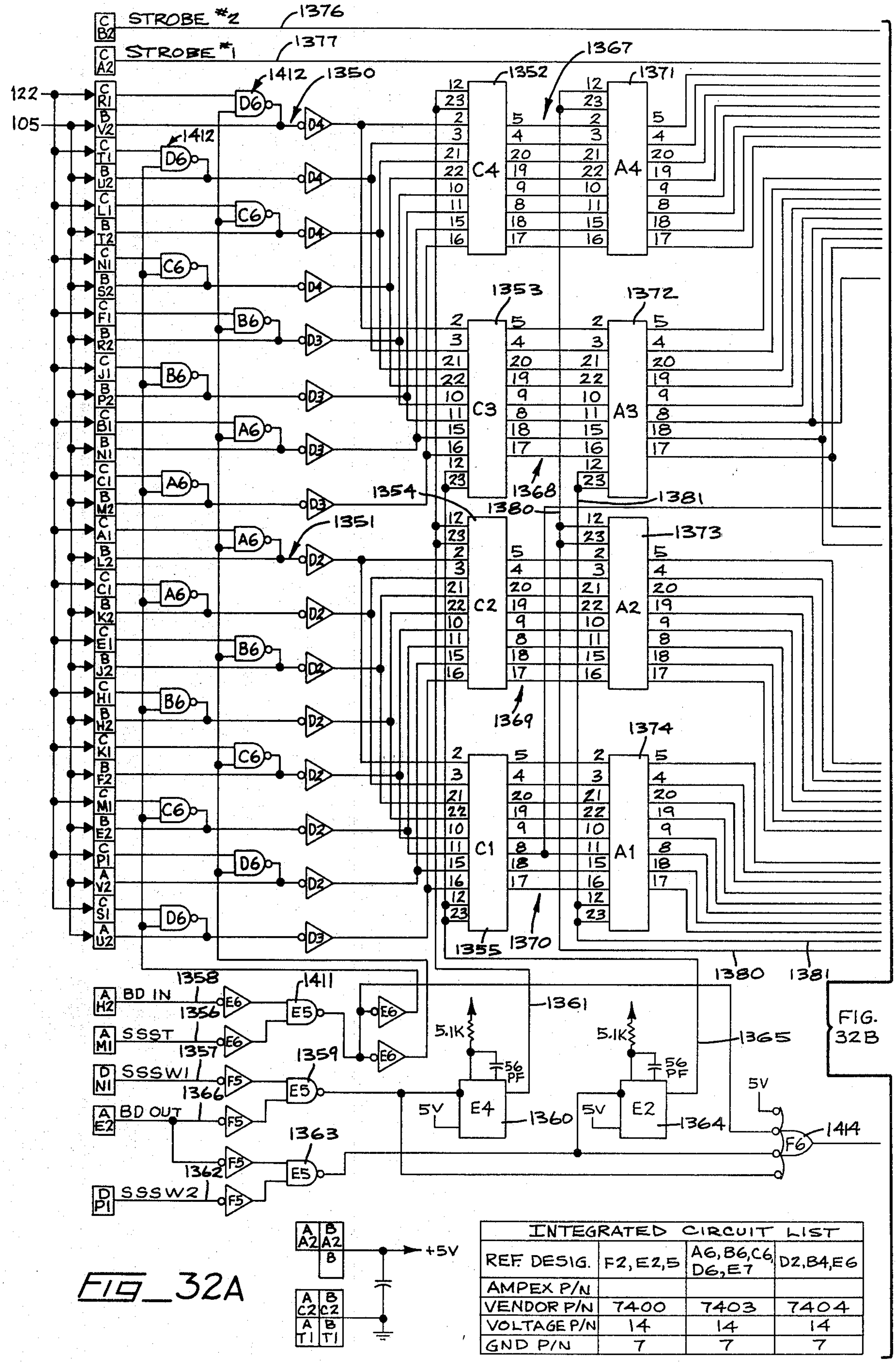
FIG_32A
| INTEGRATED CIRCUIT LIST | | | |
|---|---|---|---|
| REF. DESIG. | F2, E2, 5 | A6, B6, C6, D6, E7 | D2, B4, E6 |
| AMPEX P/N | | | |
| VENDOR P/N | 7400 | 7403 | 7404 |
| VOLTAGE P/N | 14 | 14 | 14 |
| GND P/N | 7 | 7 | 7 |

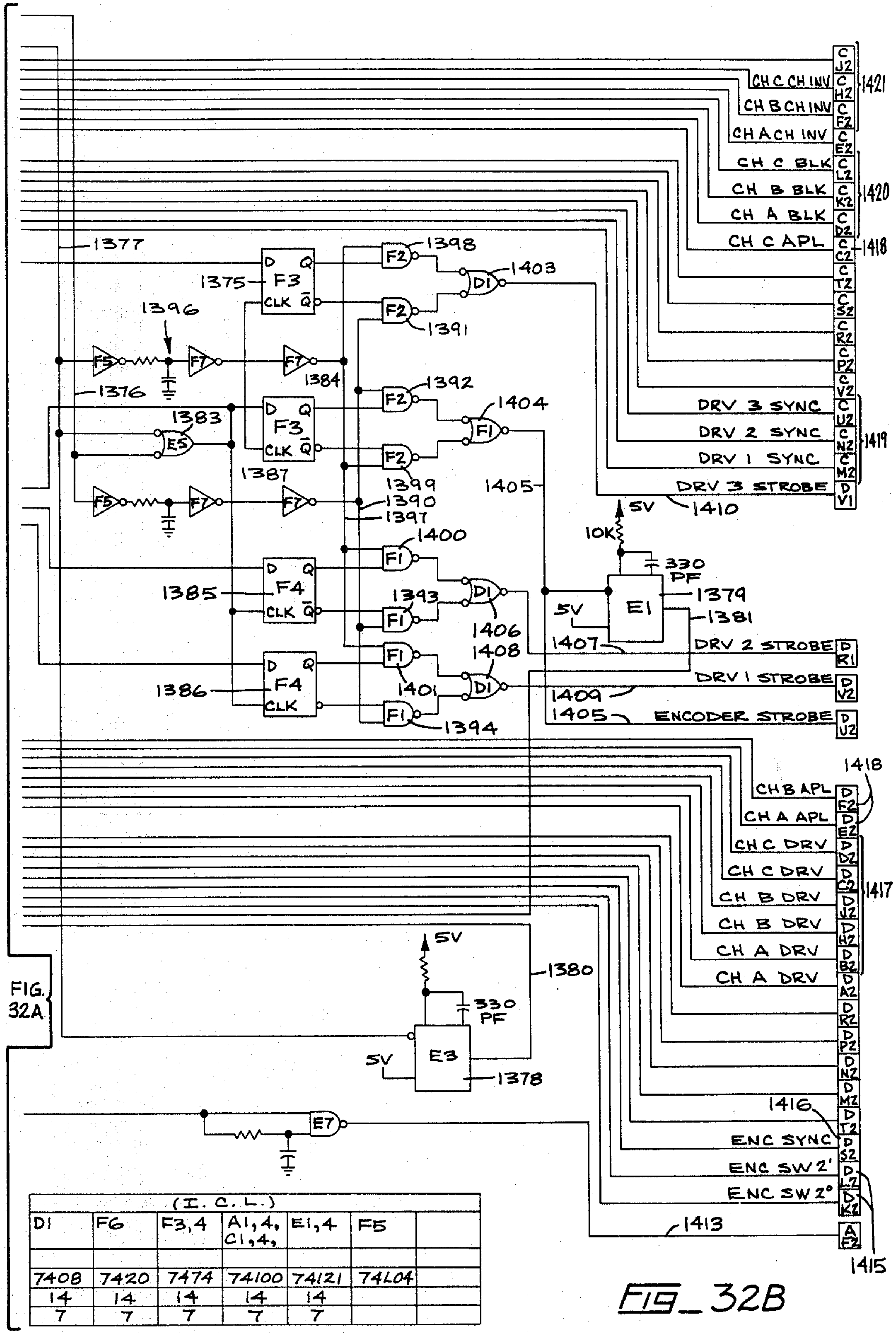
| (I.C.L.) | | | | | | |
|---|---|---|---|---|---|---|
| D1 | F6 | F3,4 | A1,4, C1,4, | E1,4 | F5 | |
| 7408 | 7420 | 7474 | 74100 | 74121 | 74LO4 | |
| 14 | 14 | 14 | 14 | 14 | | |
| 7 | 7 | 7 | 7 | 7 | | |
FIG_32B

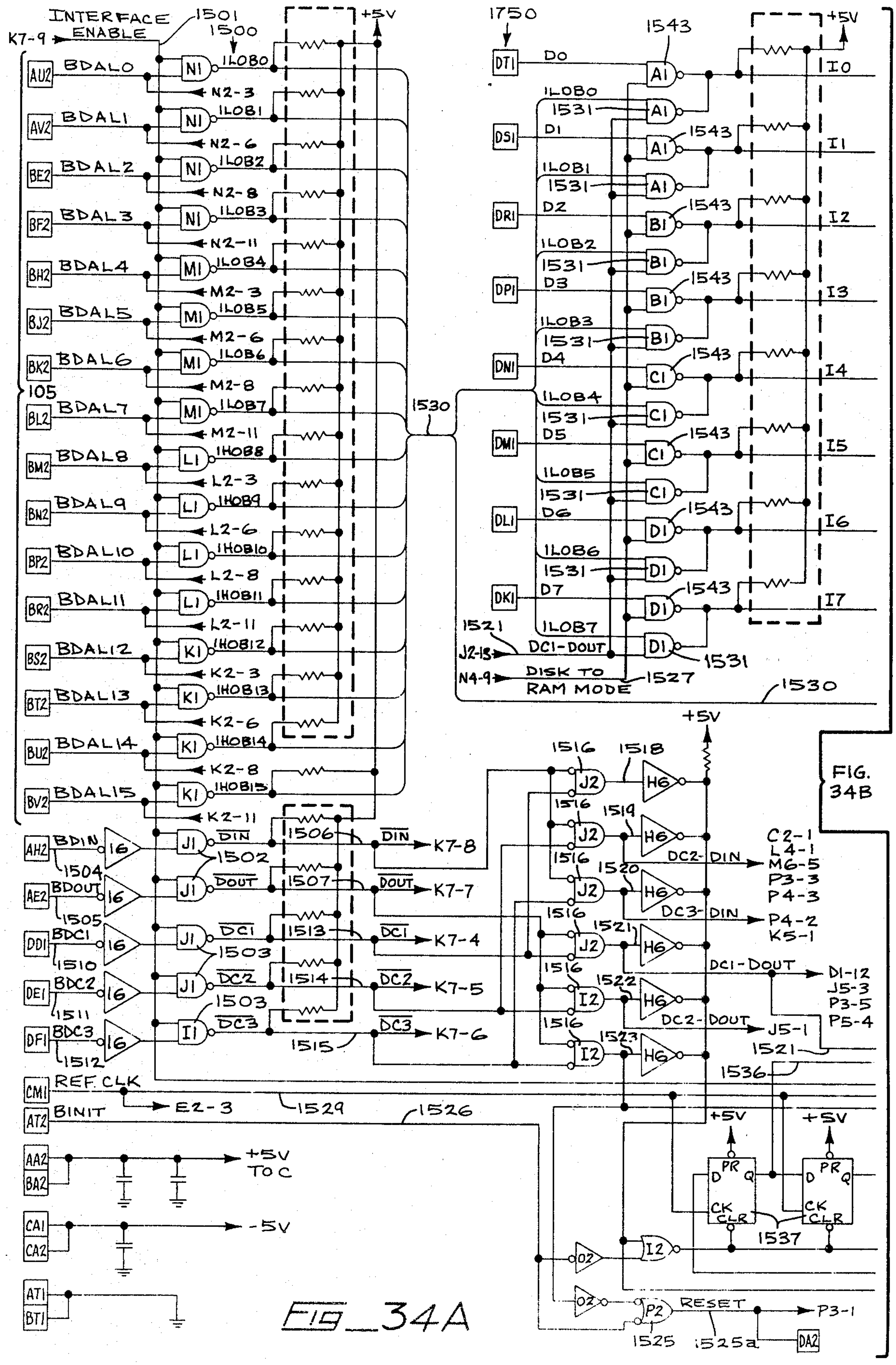
FIG_34A

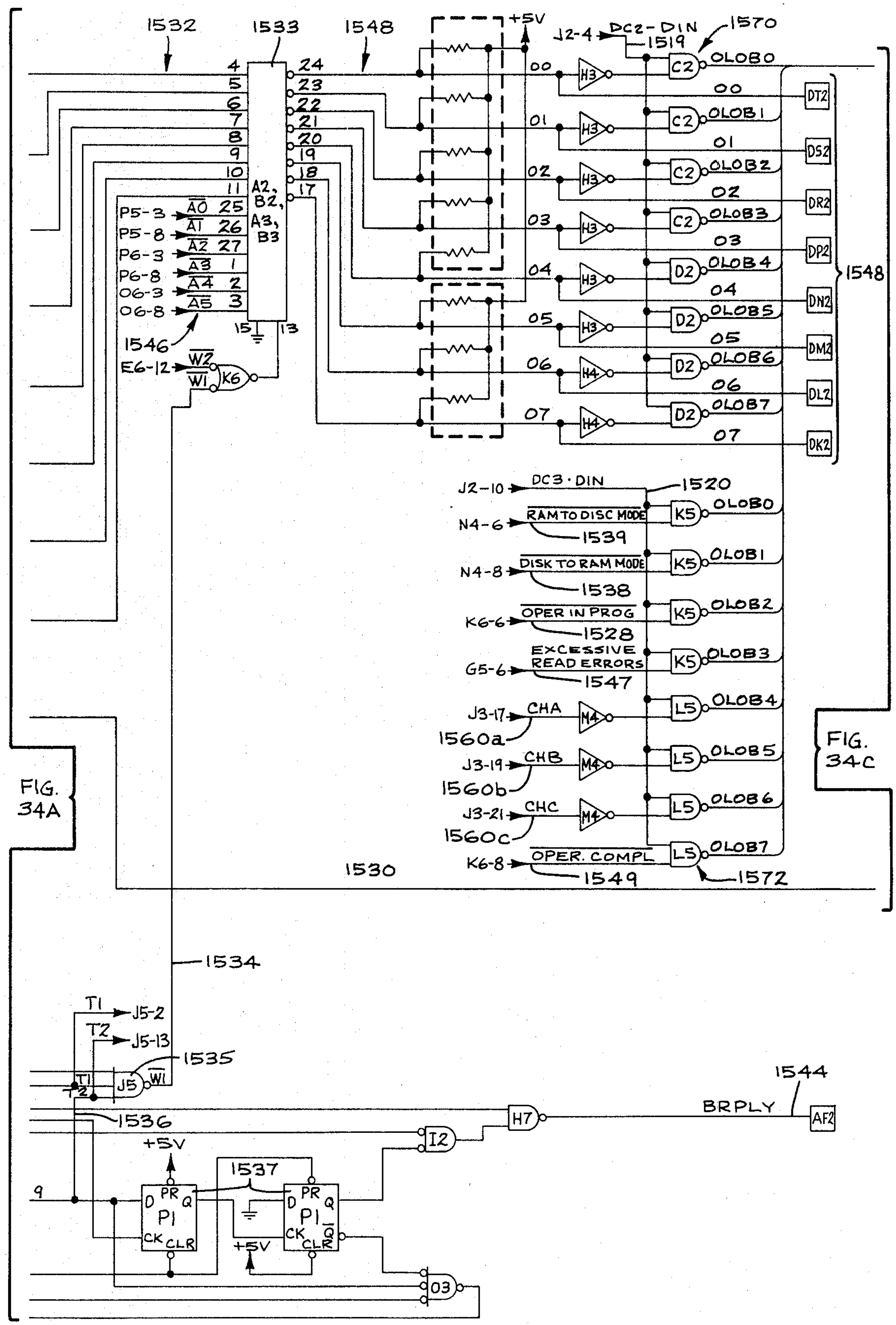
FIG_34B

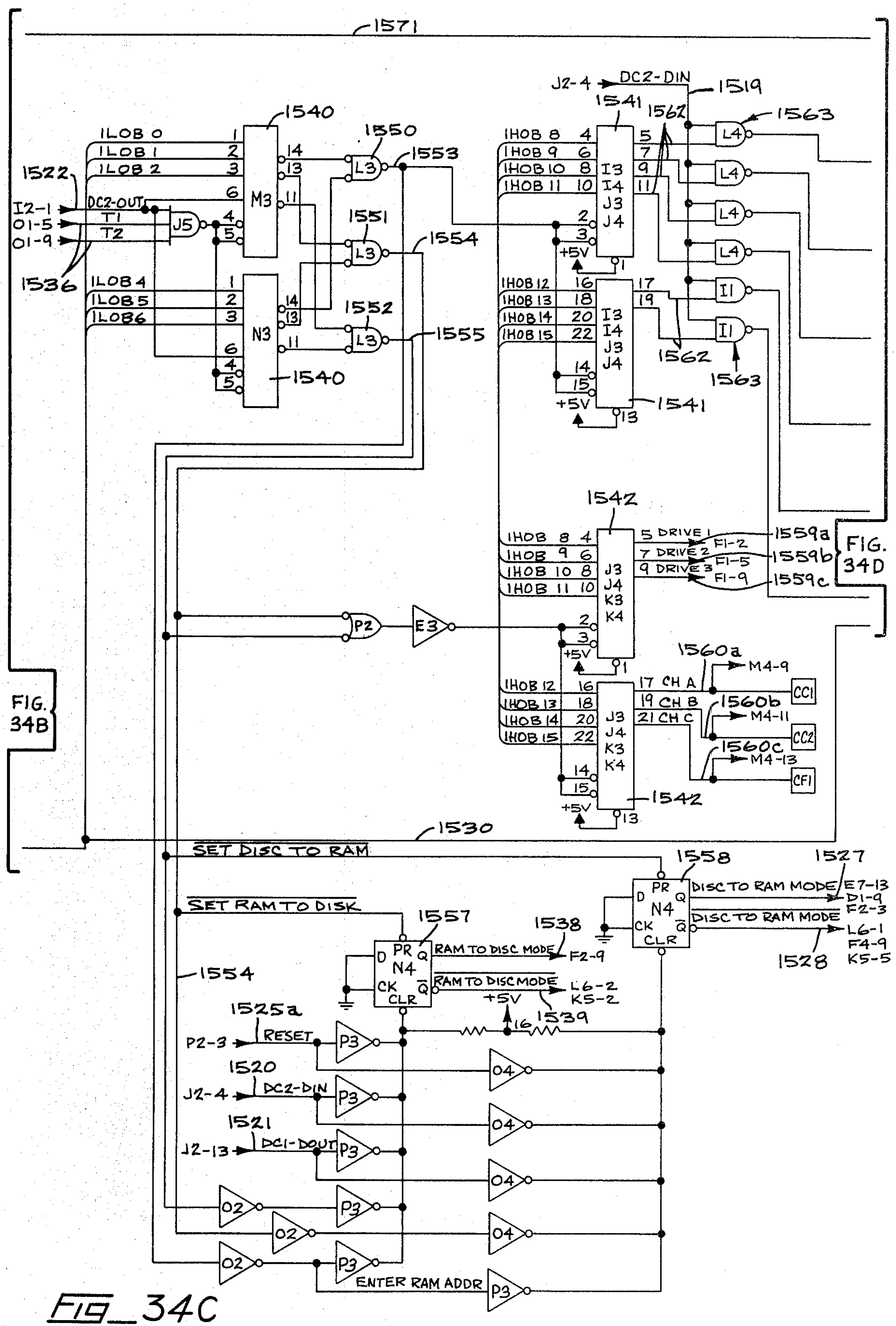
FIG_34C

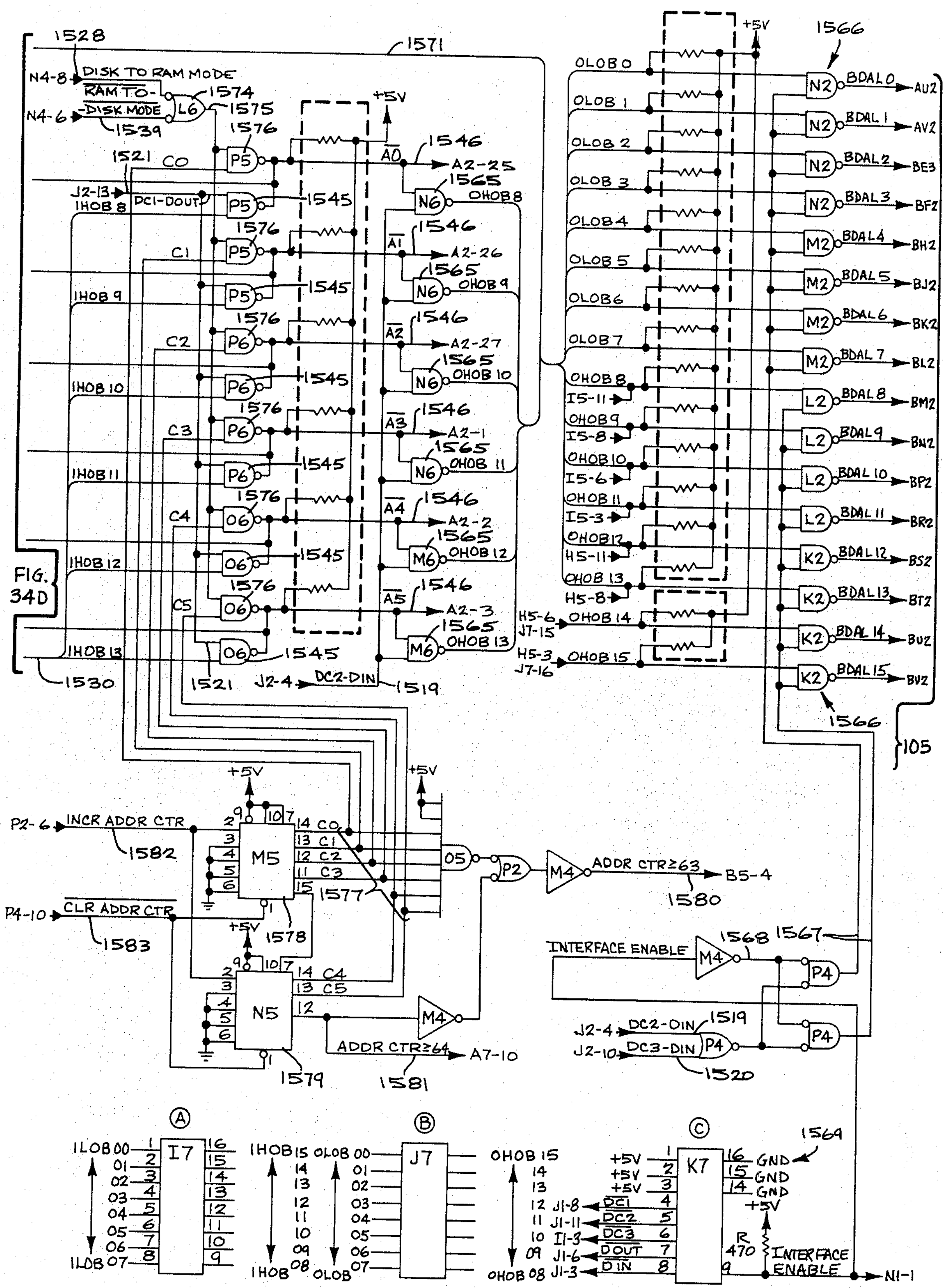
DATA TRACK INTERFACE TEST CABLE CONNECTORS
FIG_34D

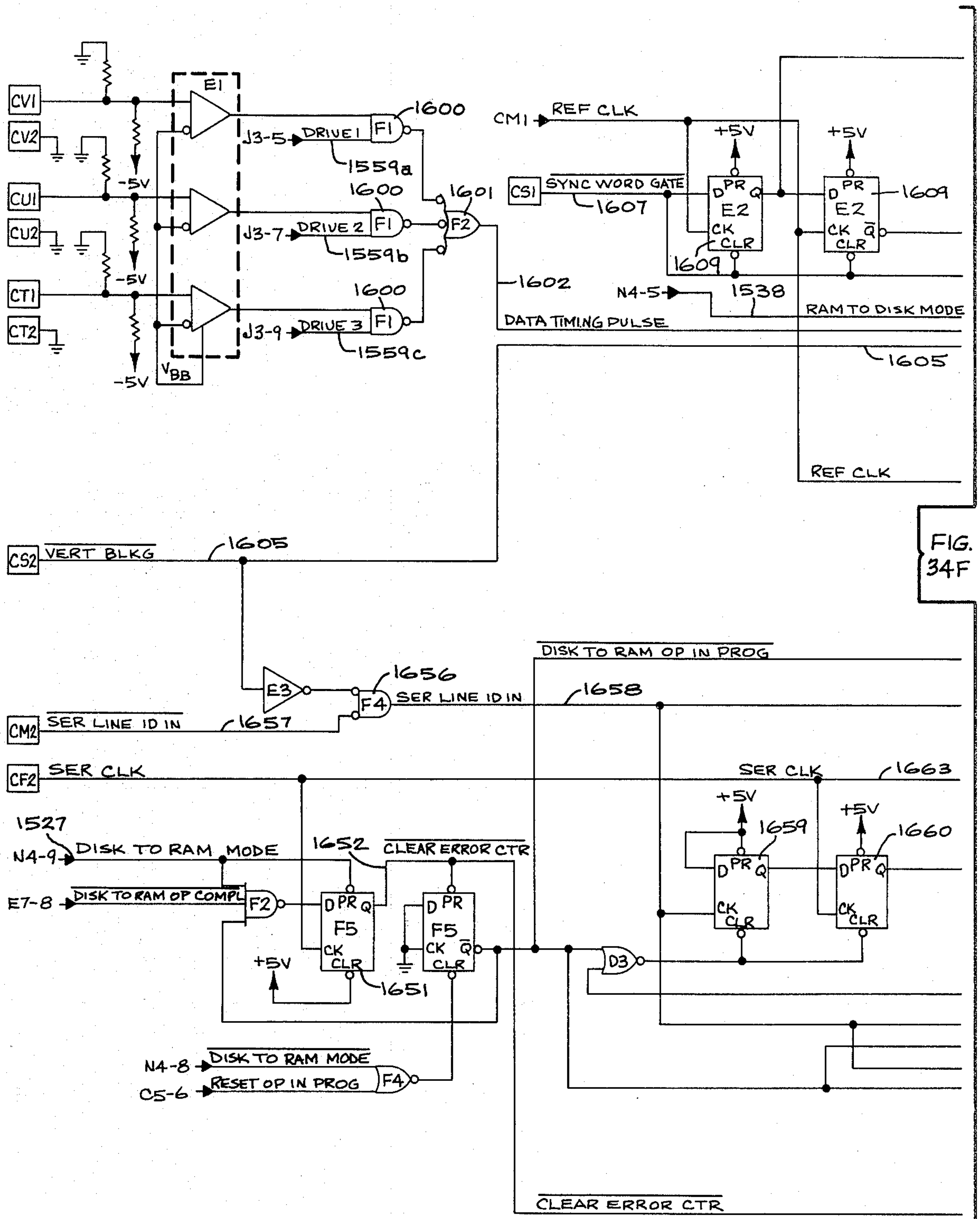
INTEGRATED CIRCUIT LIST
| REF. DESIG. | A1,B1,C1,2,D1,2,I1,5,J1, K1,2,5, L1,2,4,5,M1,2,6, N1,2,6,O6,P5,6,H7 | A4,5,6,B6,C2,4,7,D4, D5,6,7,E4,5,7,F5,G5,J6, N4,O1,P1 | I2,J2, D3,B4,F4, P4,C6 | O2,H3,4, M4,C5, E3,I6 | F1,P2, B5,L6, A7 | F2,3 J5,E6 | O4,P3 H6 | F1,B5 K6 | O3,G4, B7 | G3 |
|---|---|---|---|---|---|---|---|---|---|---|
| AMPEX P/N | | | | | | | | | | |
| VENDOR P/N | 7403 | 7474 | 7402 | 7404 | 7400 | 7410 | 7405 | 7408 | 7427 | 7420 |
| VOLTAGE PIN | 14 | 14 | 14 | 14 | 14 | 14 | 14 | 14 | 14 | 14 |
| GROUND PIN | 7 | 7 | 7 | 7 | 7 | 7 | 7 | 7 | 7 | 7 |
FIG_34E

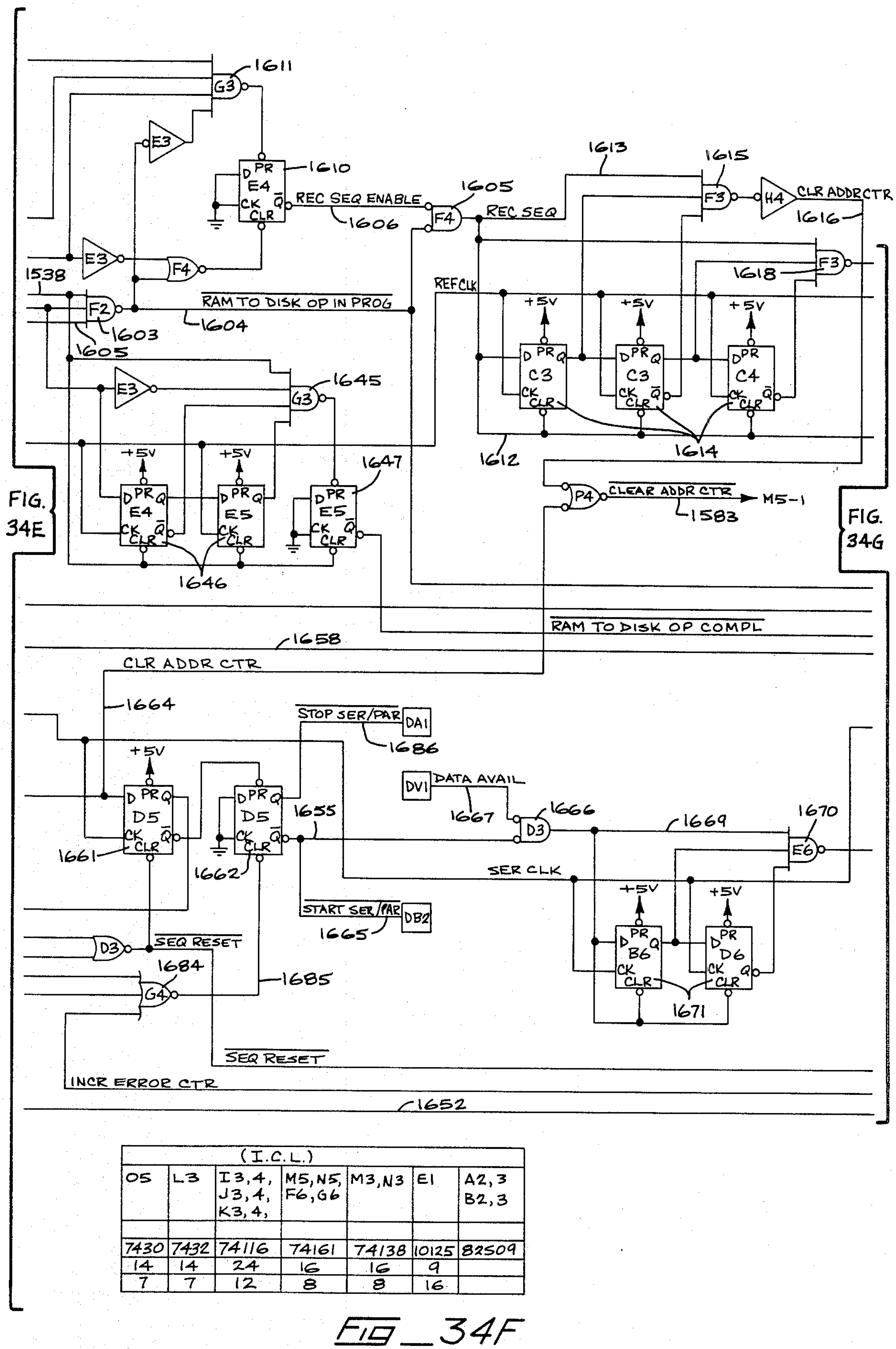
| (I.C.L.) | | | | | | |
|---|---|---|---|---|---|---|
| O5 | L3 | I3,4, J3,4, K3,4, | M5,N5, F6,G6 | M3,N3 | E1 | A2,3 B2,3 |
| | | | | | | |
| 7430 | 7432 | 74116 | 74161 | 74138 | 10125 | 82509 |
| 14 | 14 | 24 | 16 | 16 | 9 | |
| 7 | 7 | 12 | 8 | 8 | 16 | |
FIG_34F

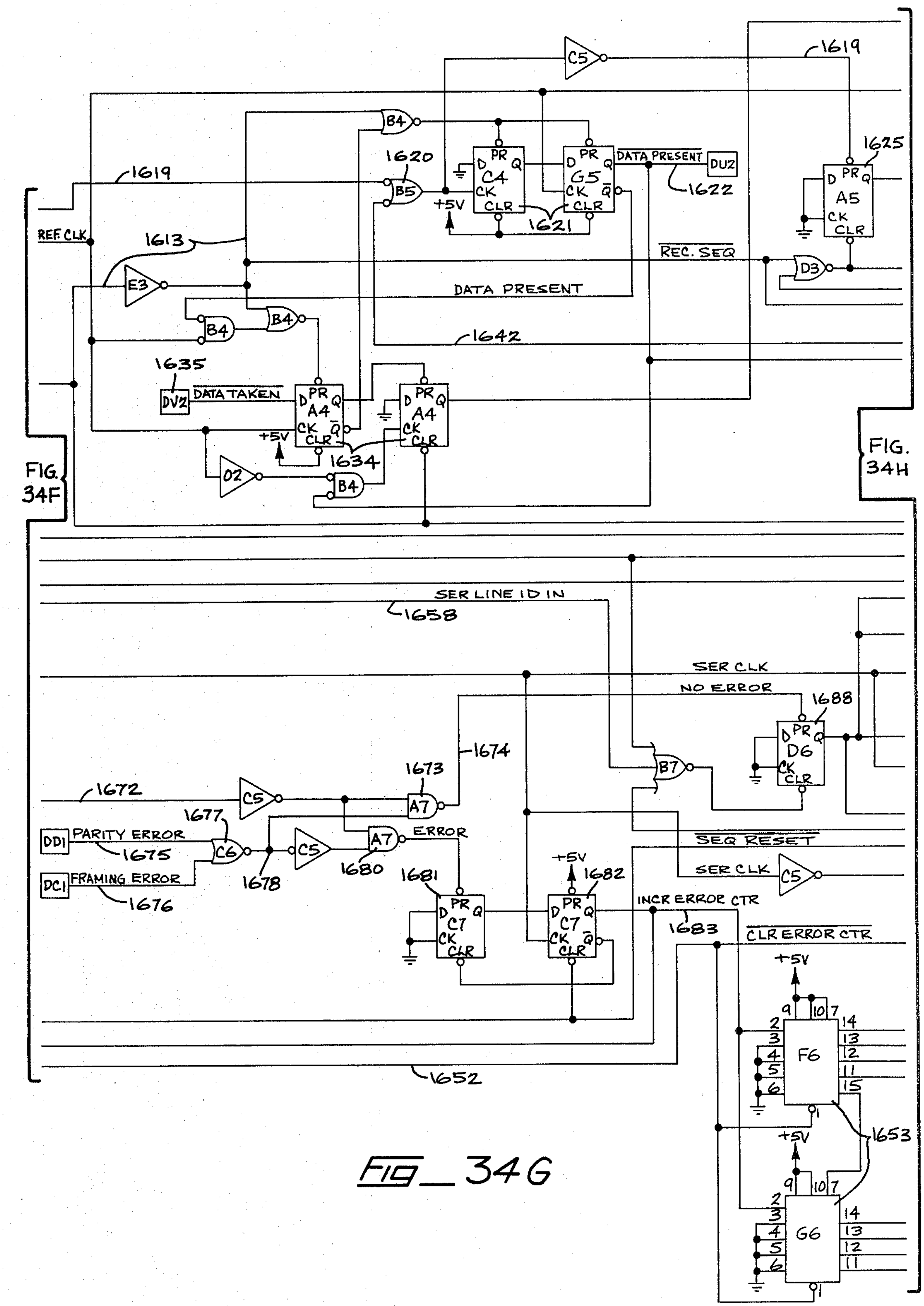
FIG_34G

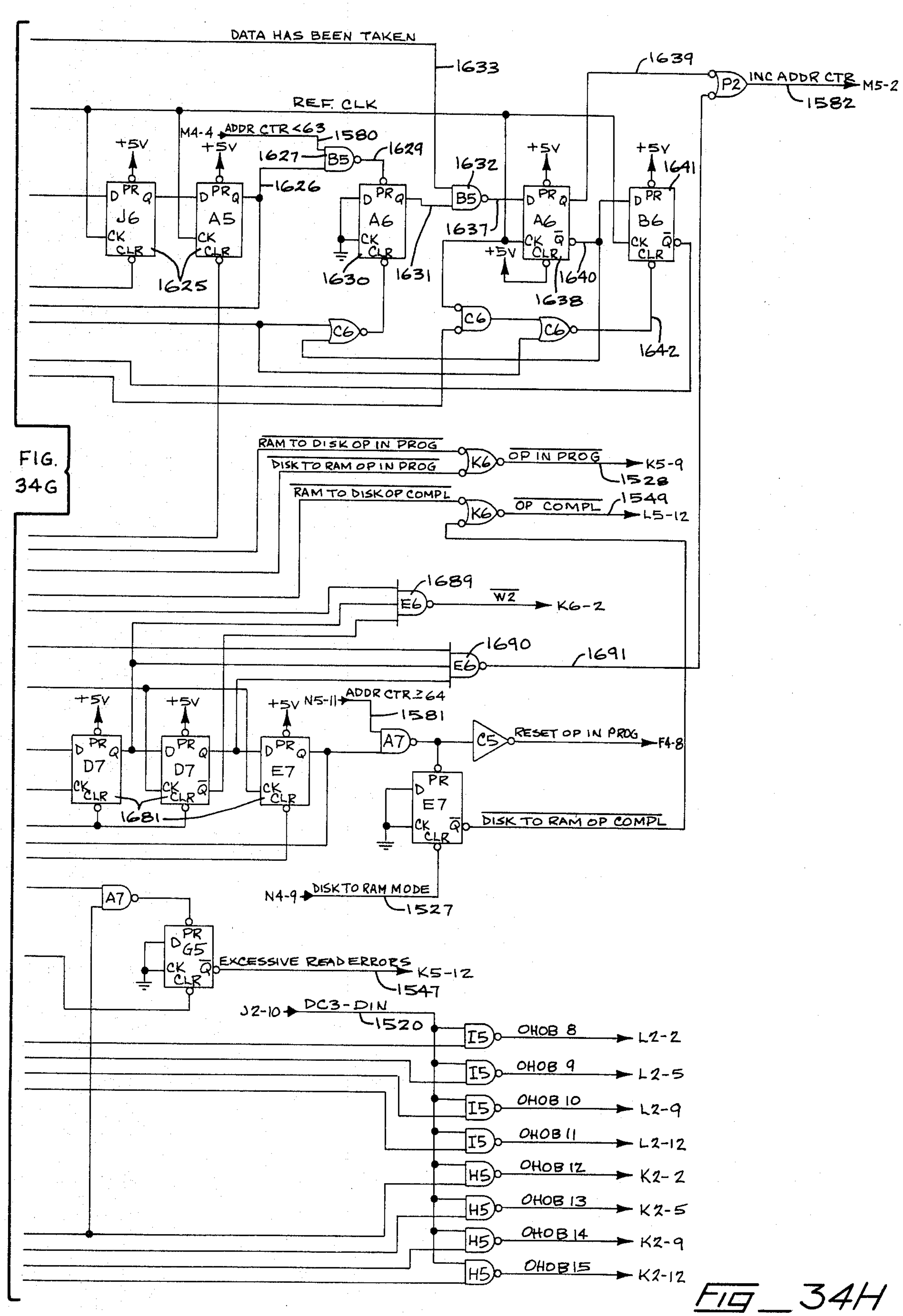
FIG_34H

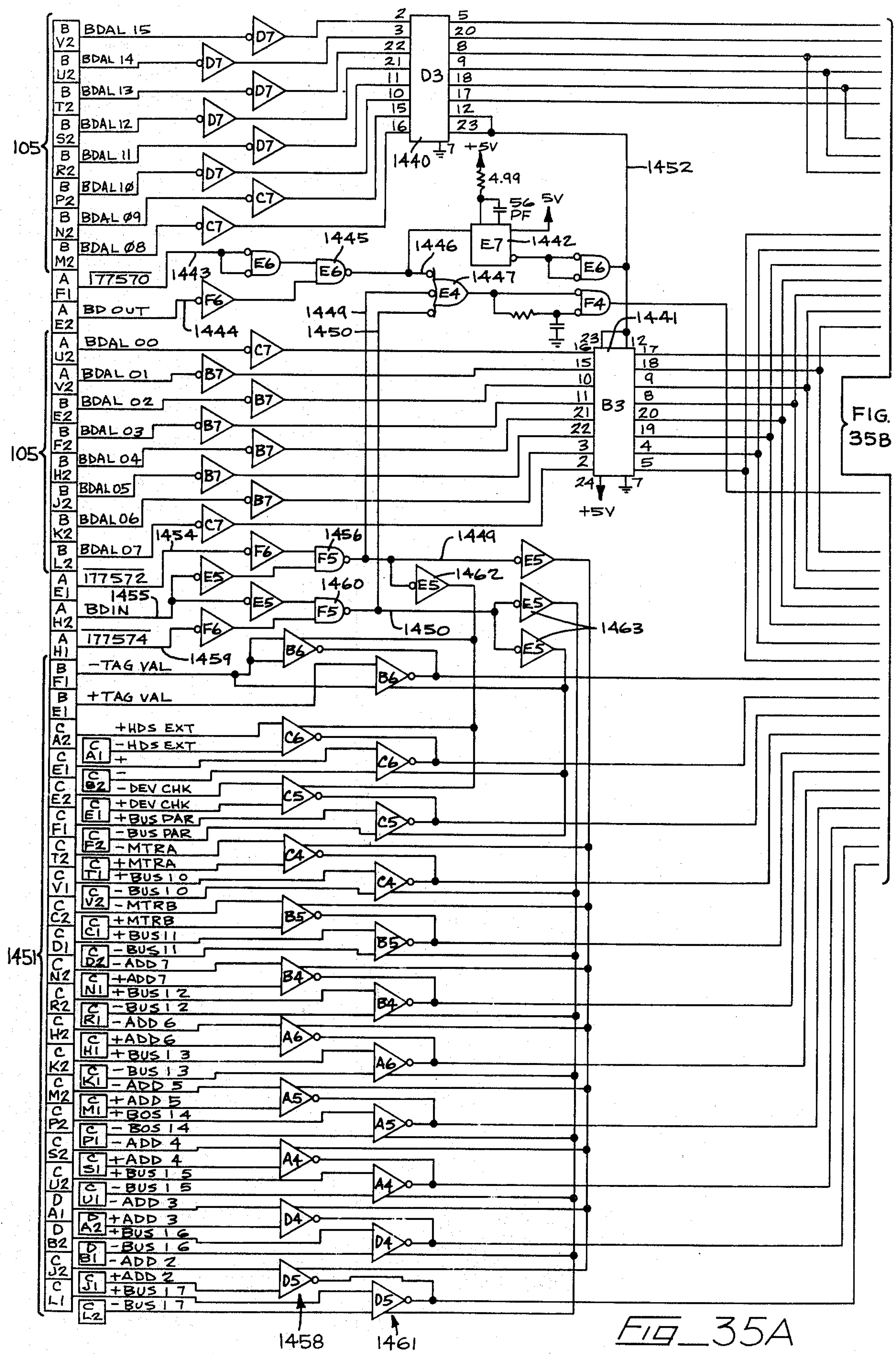
FIG_35A

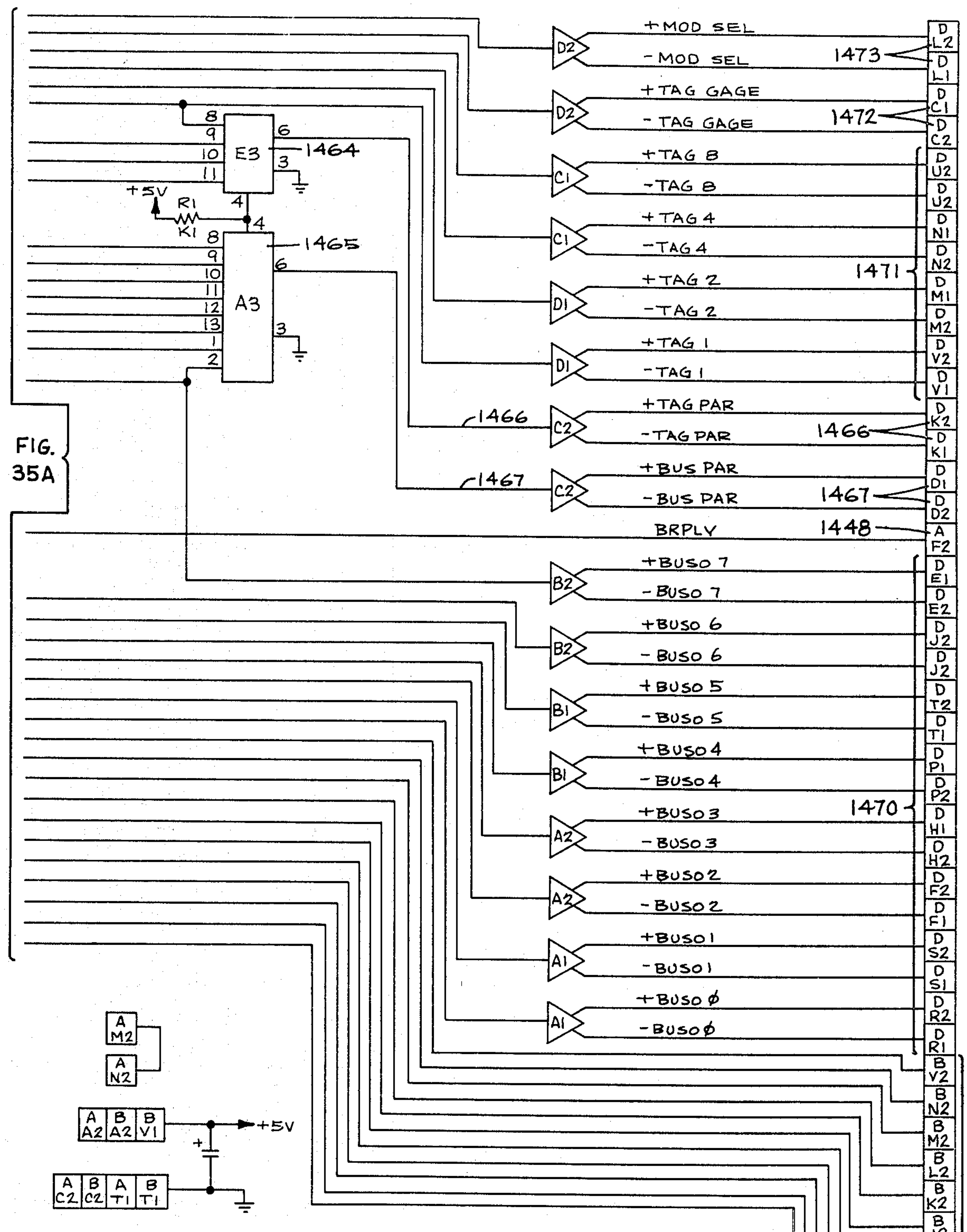
| INTEGRATED CIRCUIT LIST | | | | | | | | | | |
|---|---|---|---|---|---|---|---|---|---|---|
| REF. DES. | A1,2,B1, B2,C2,D2 | A4-6,B4-6, C4-6,D4-5 | A3,E3 | B3,D3 | B7,C7, D7,F6 | E4 | E5 | E6,F5 | E7 | F4 |
| AMPEX P/N | | | | | | | | | | |
| VENDOR P/N | 75114 | 75115 | 74180 | 74100 | 74L04 | 7410 | 7404 | 7400 | 74121 | 7403 |
| VOLT. PIN | 16 | 16 | 14 | 24 | 14 | 14 | 14 | 14 | 14 | 14 |
| GND PIN | 8 | 8 | 7 | 7 | 7 | 7 | 7 | 7 | 7 | 7 |
FIG_35B

I.C. LIST

| REF DES. | AMPEX P/N | VENDOR P/N | VOLTAGE PIN | GRD PIN |
|---|---|---|---|---|
| A1,3,4 | 587-510 | 74LS00 | 14 | 7 |
| A2,5,6 | 587-533 | 74LS04 | 14 | 7 |
| B1,D1,6 | 587-387 | 74LS74 | 14 | 7 |
| B2 | 587-534 | 74LS08 | 14 | 7 |
| B3,D2,3 | 587-895 | 74LS164 | 14 | 7 |
| B4,C4 | 587-758 | 74LS279 | 16 | 8 |
| B5,C3 | 587-952 | 74LS27 | 14 | 7 |
| B6 | 581-778 | 74LS30 | 14 | 7 |
| C1,5 | 587-750 | 74LS02 | 14 | 7 |
| C6 | 587-765 | 74LS20 | 14 | 7 |
| D4,5 | 587-007 | 9305 | 14 | 7 |
| C2 | 586-326 | 7404 | 14 | 7 |

| REFERENCE DESIGNATIONS | A1 | B2 | C1 | C2 | D1 | D2 | D3 | C3,5 | B5,C6 | B3,A5 | B4 | B6 | A3 | A4 |
|---|---|---|---|---|---|---|---|---|---|---|---|---|---|---|
| AMPEX P/N | 587-285 | 587-680 | 587-318 | 587-428 | 587-446 | 587-332 | 587-972 | 587-535 | 587-534 | 587-533 | 589-132 | 587-750 | 587-777 | 587-895 |
| VENDOR P/N | 10125 | CD4066 | CD4001 | CD4046 | CD4013 | CD4049 | CD4018 | 74LS123 | 74LS08 | 74LS04 | 74LS192 | 74LS02 | 74LS153 | 74LS164 |
| VOLTAGE PIN | 9+5 8-5 | 14 | 14 | 16 | 14 | 16 | 16 | 16 | 14 | 14 | 16 | 14 | 16 | 14 |
| GROUND PIN | 16 | 7 | 7 | 8 | 7 | 8 | 8 | 8 | 7 | 7 | 8 | 7 | 8 | 7 |

I. C. LIST

| REFERENCE DESIGNATION | A13, B1, 6, C1, 4, D2, 5 | A2, 5, C3, C6, D3 | A6, B2, B4, D1 | B3 | B5 | A4, C2, D4 | C5 |
|---|---|---|---|---|---|---|---|
| AMPEX P/N | 587-533 | 587-510 | 587-758 | 587-283 | 587-778 | 587-765 | 587-387 |
| VENDOR P/N | 74LS04 | 74LS00 | 74LS279 | 74LS10 | 74LS30 | 74LS20 | 74LS74 |
| VOLTAGE PIN | 14 | 14 | 16 | 14 | 14 | 14 | 14 |
| GROUND PIN | 7 | 7 | 8 | 7 | 7 | 7 | 7 |

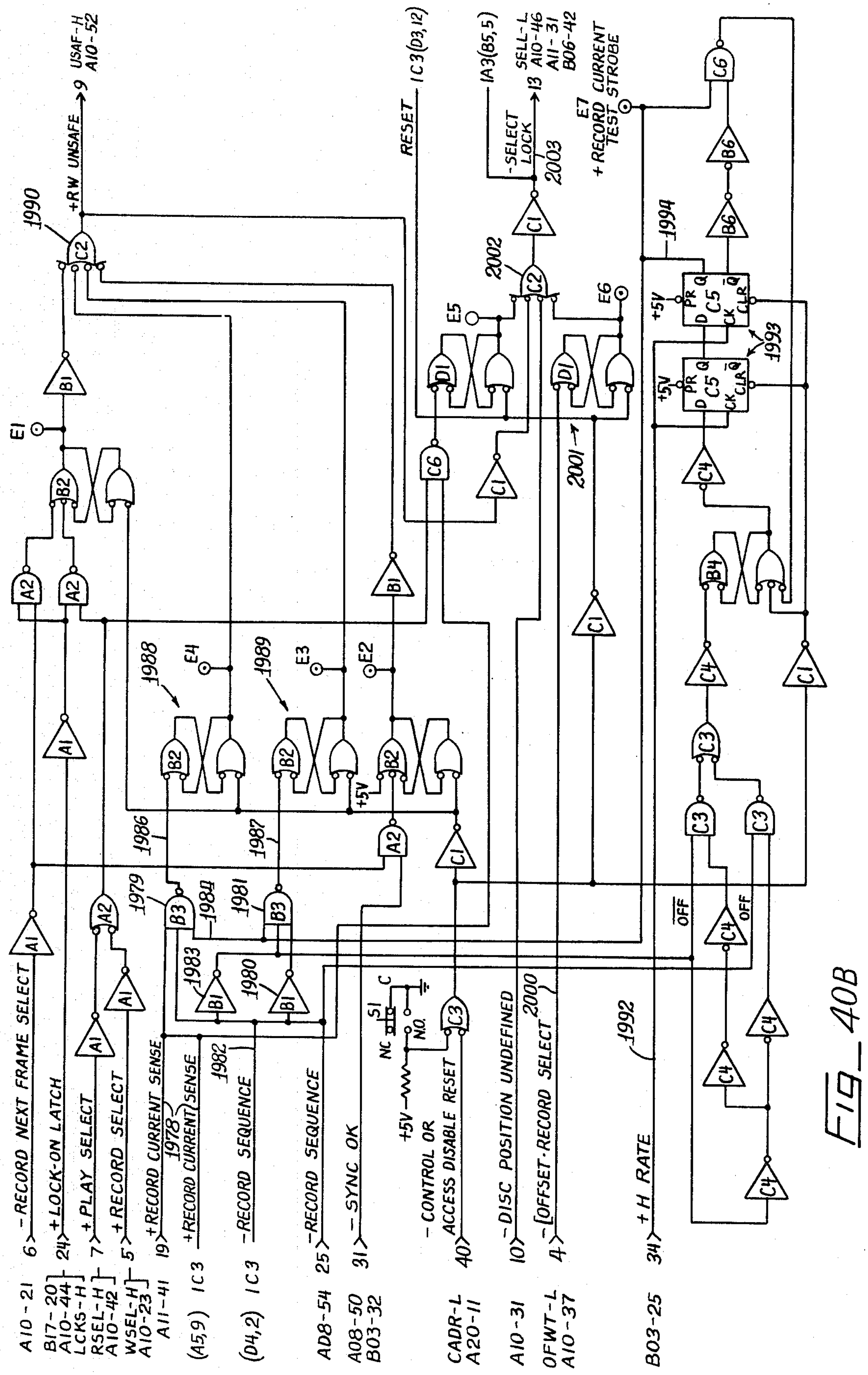
FIG_ 40B

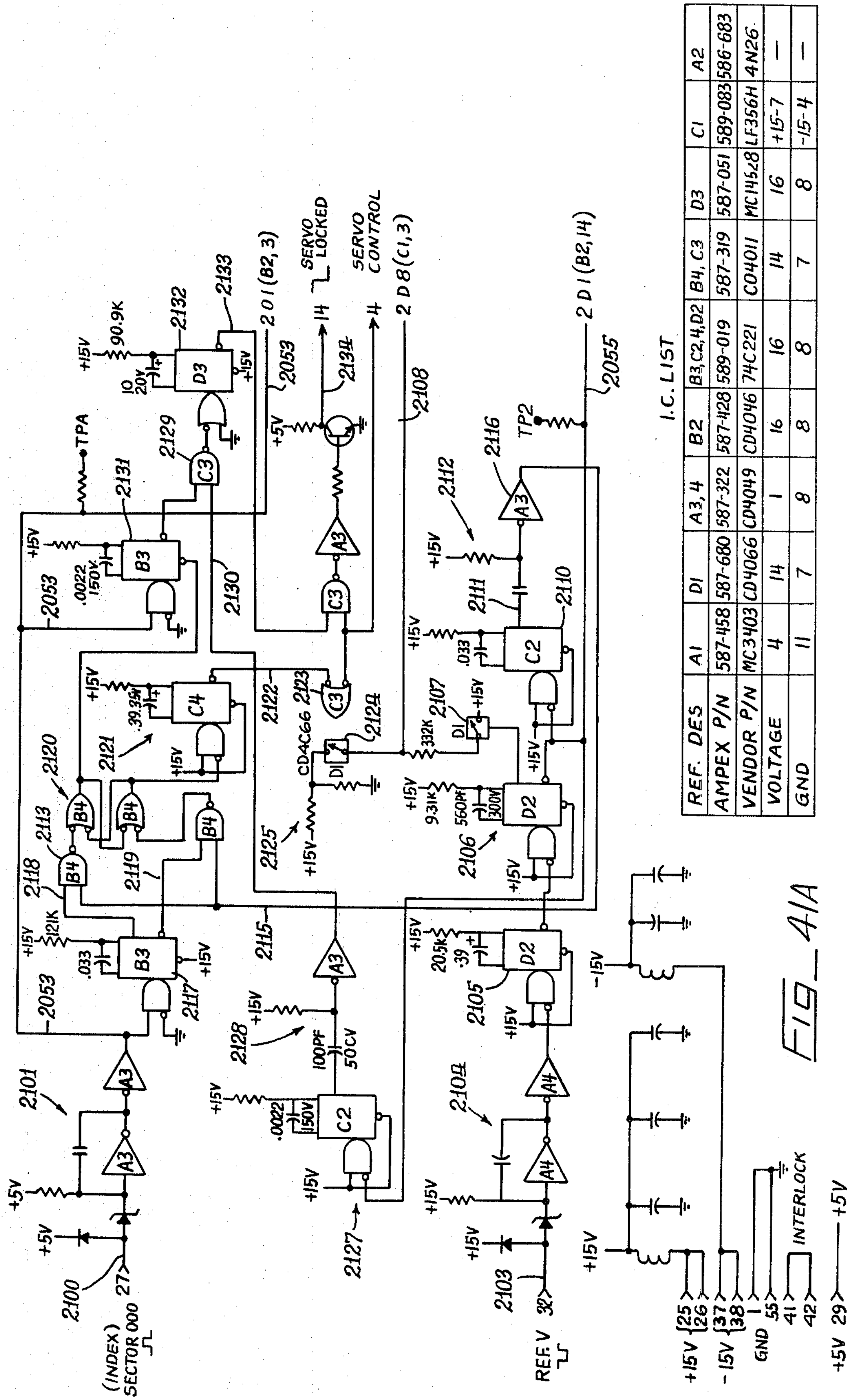
I.C. LIST
| REF. DES | A1 | D1 | A3, 4 | B2 | B3, C2, 4, D2 | B4, C3 | D3 | C1 | A2 |
|---|---|---|---|---|---|---|---|---|---|
| AMPEX P/N | 587-458 | 587-680 | 587-322 | 587-428 | 589-019 | 587-319 | 587-051 | 589-083 | 586-683 |
| VENDOR P/N | MC3403 | CD4066 | CD4049 | CD4046 | 74C221 | CD4011 | MC14528 | LF356H | 4N26 |
| VOLTAGE | 4 | 14 | 1 | 16 | 16 | 14 | 16 | +15-7 | — |
| GND | 11 | 7 | 8 | 8 | 8 | 7 | 8 | -15-4 | — |
FIG_4A

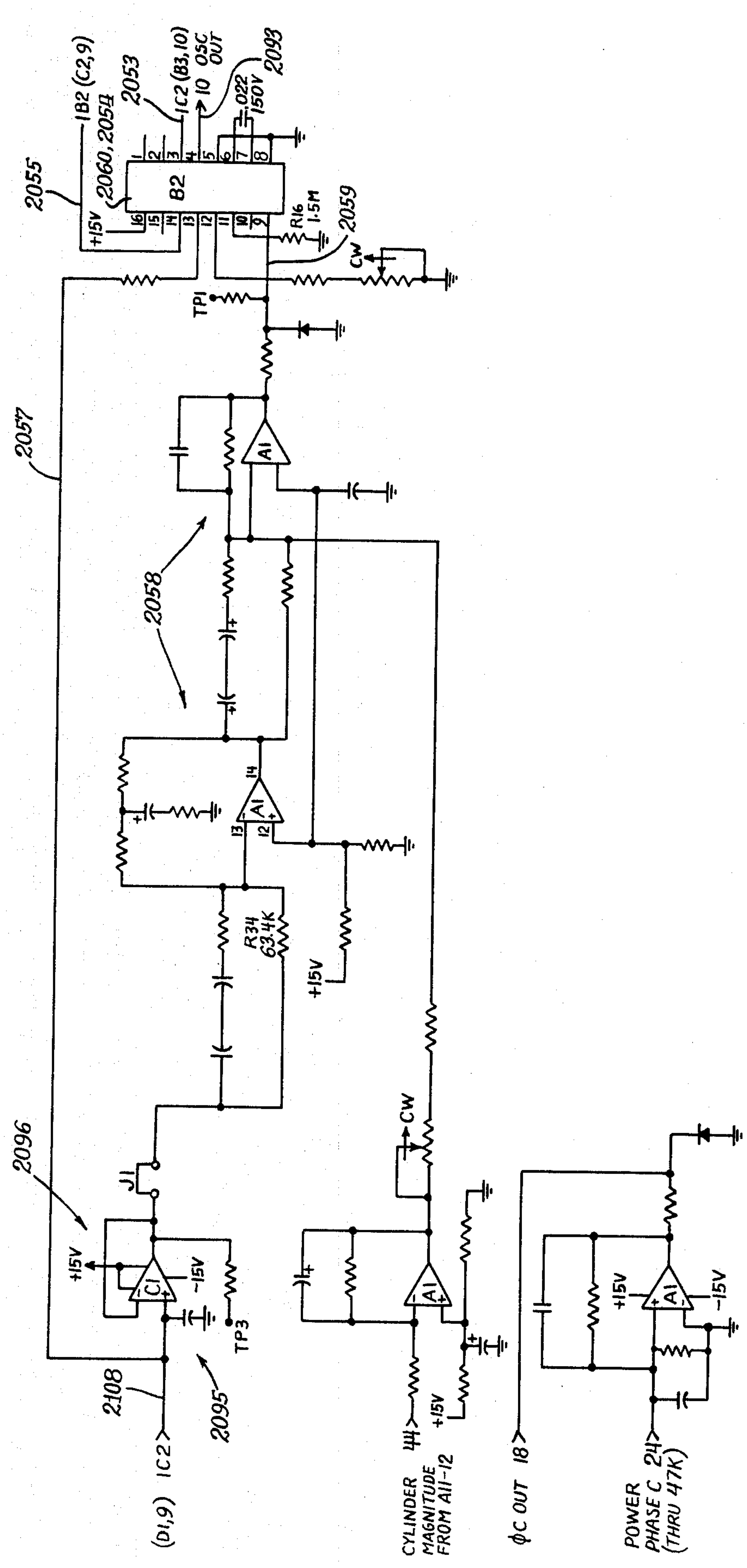
FIG_ 41B

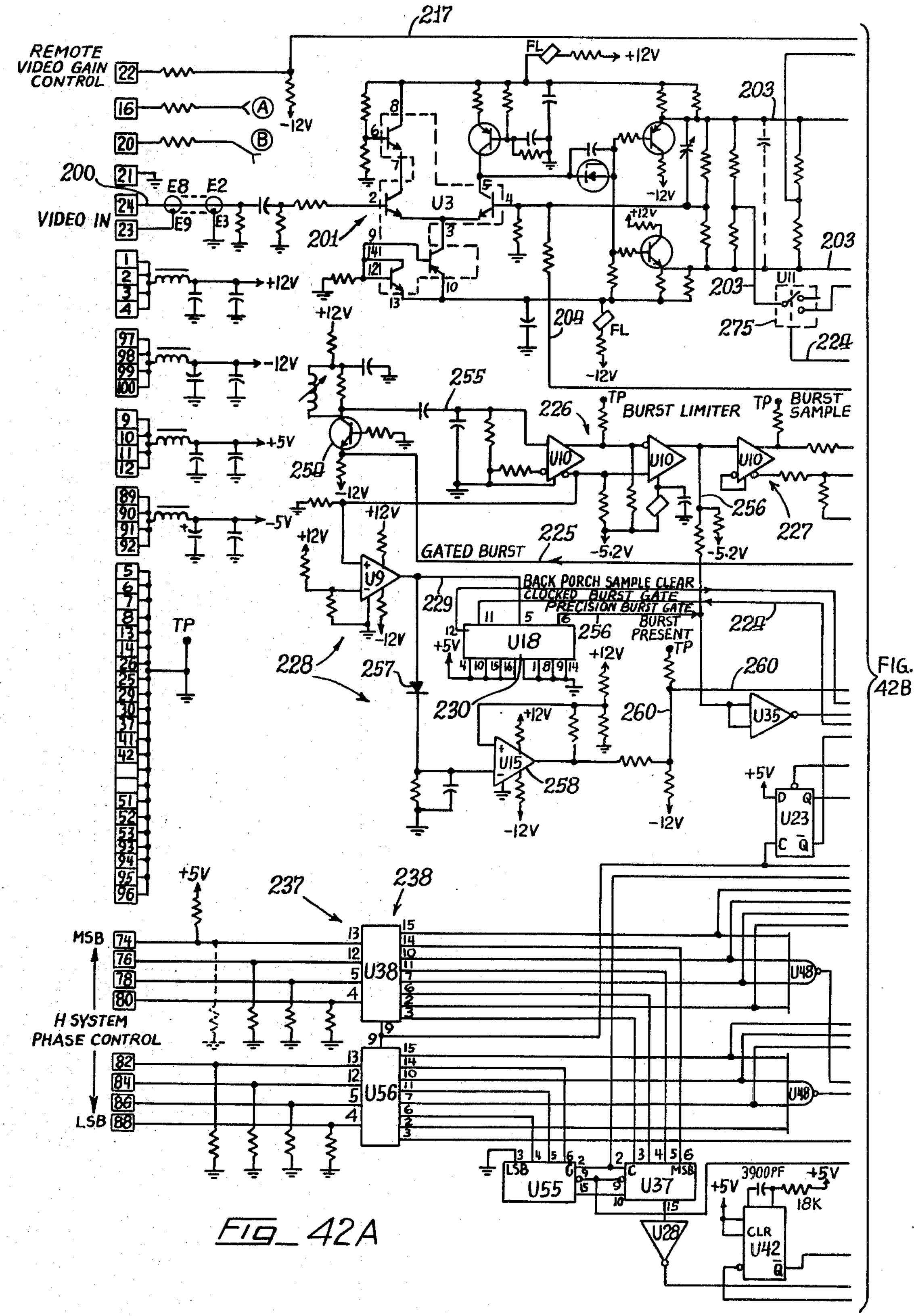
FIG_ 42A

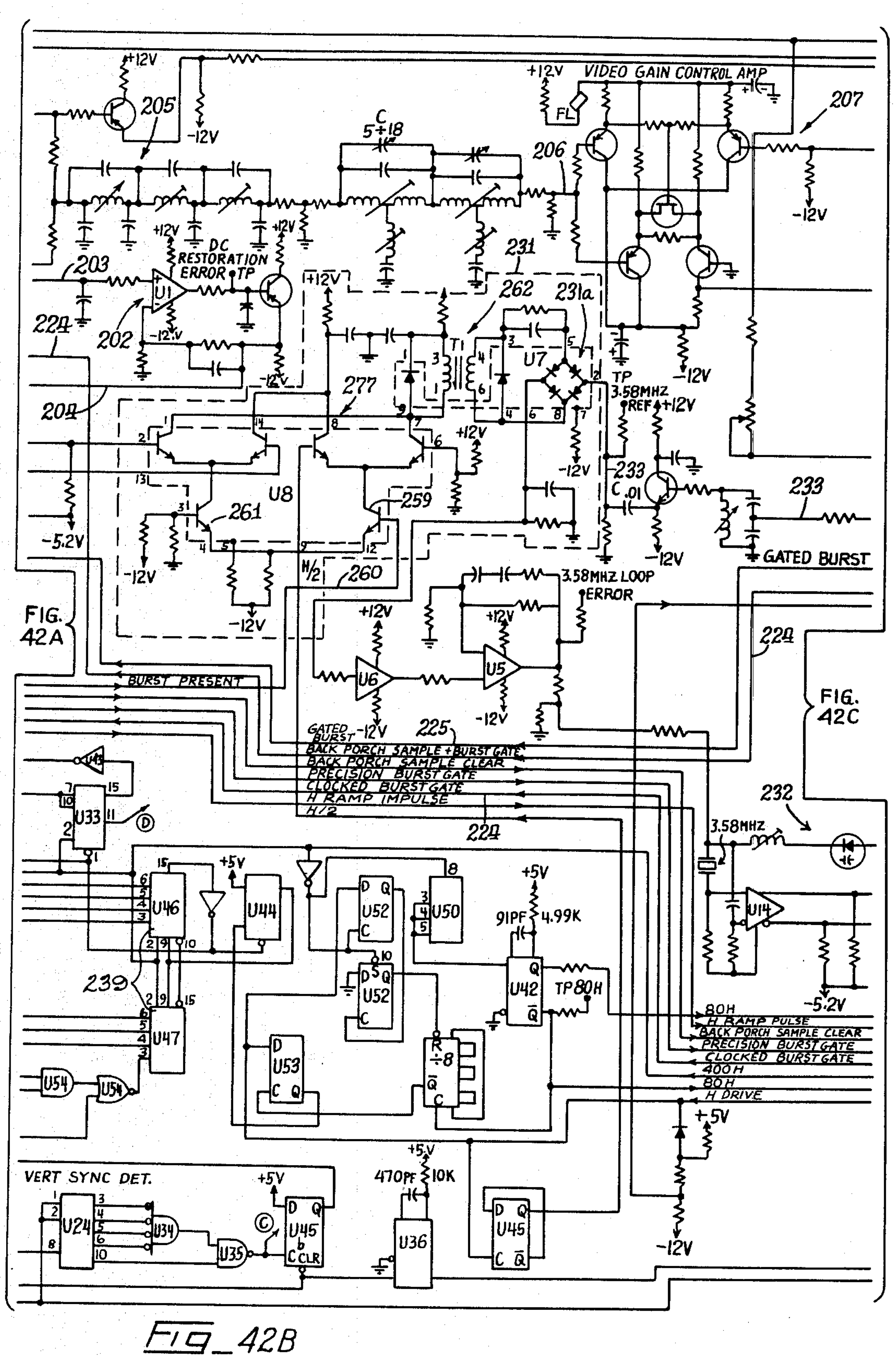
FIG_42B

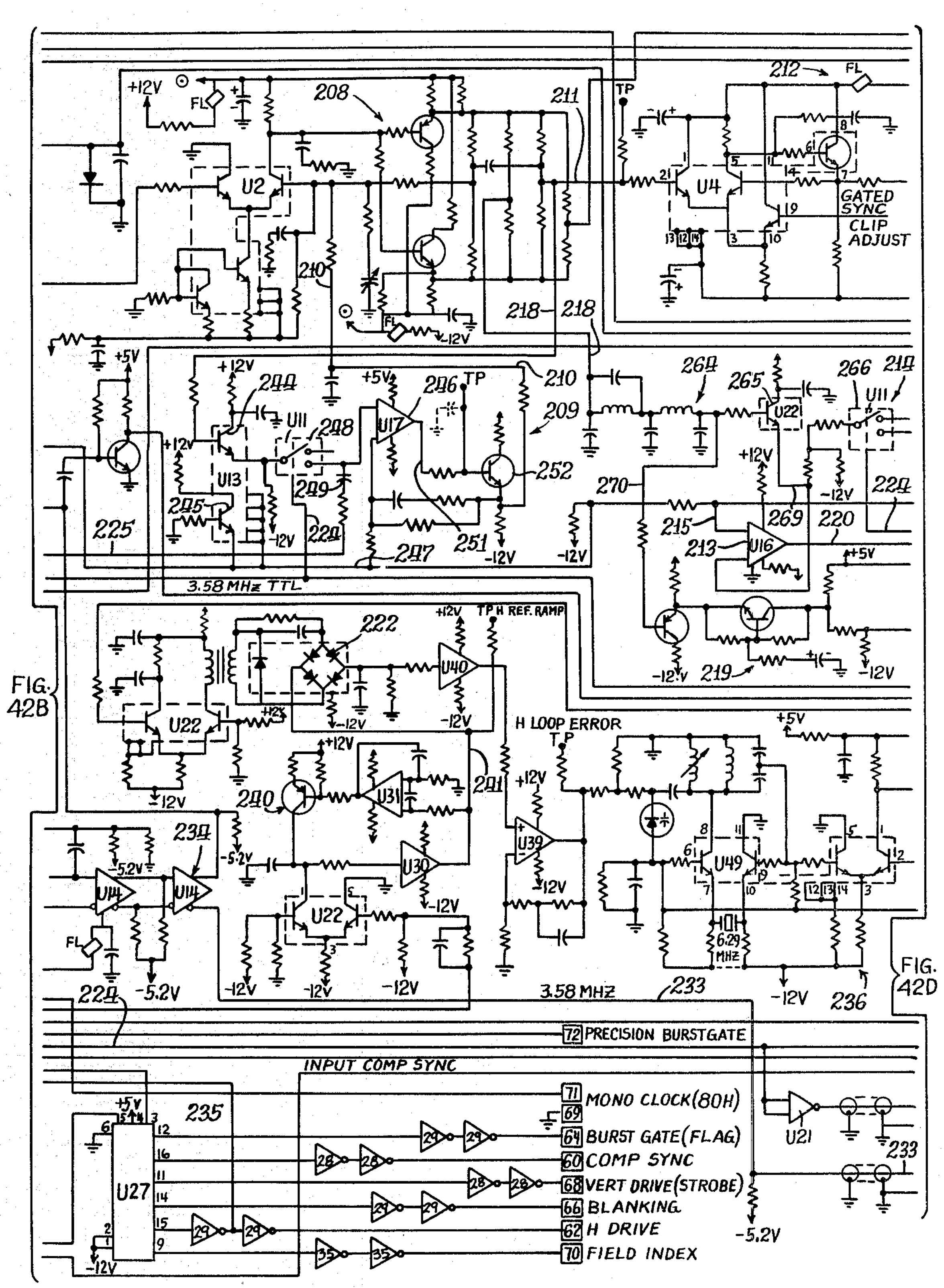
FIG_42C

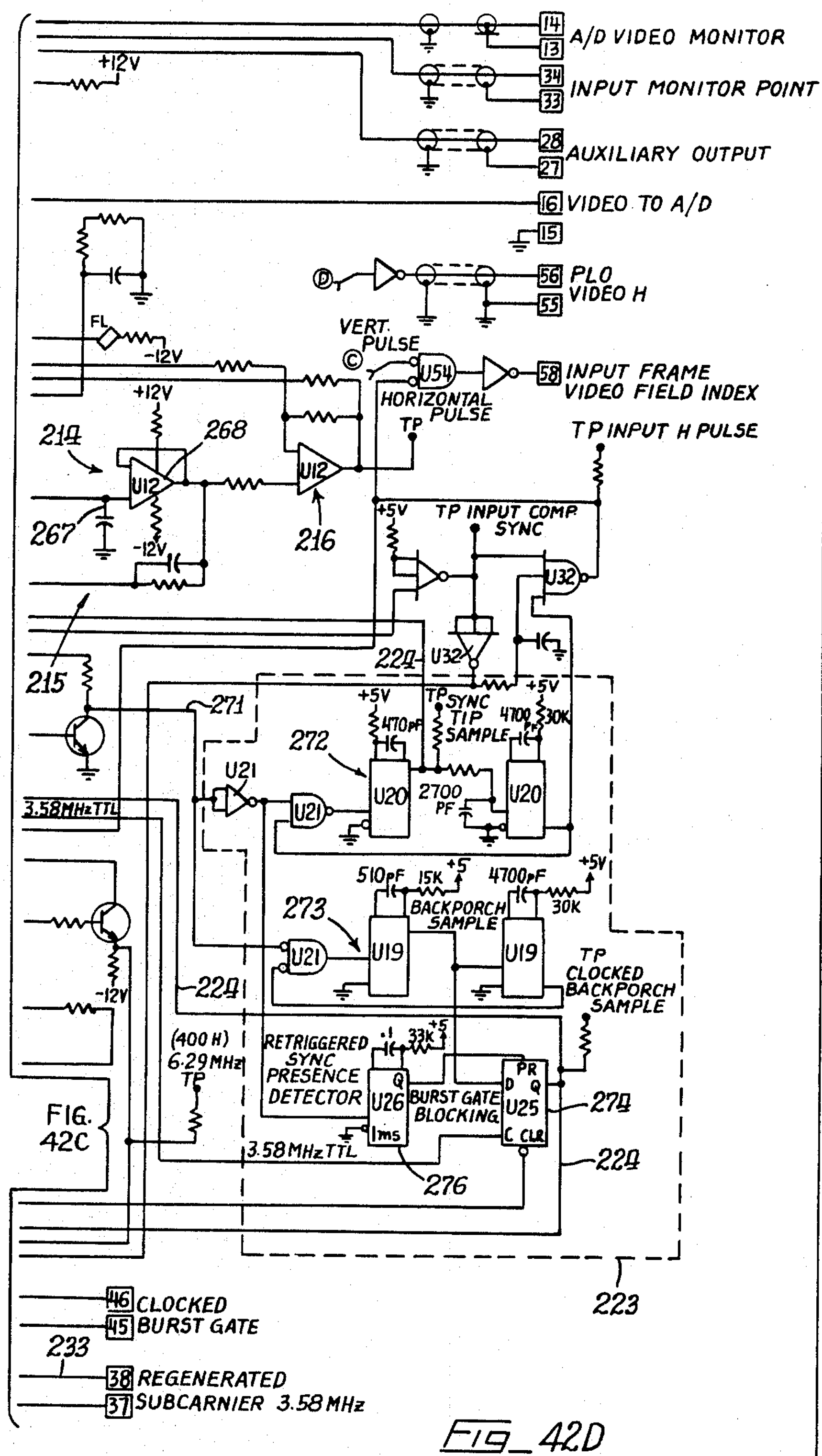
FIG_42D
INTEGRATED CIRCUIT LIST
| REF DES | AMPEX P/N | VENDOR P/N | VOLTAGE PIN | GROUND PIN |
|---|---|---|---|---|
| U2,3,4,13,22 | | CA 3046 | | |
| U1,12,17 | | 1458 | | |
| U5,31,39 | | 741 | | |
| U6,30,40 | | 302 | | |
| U8 | | CA3054 | | |
| U9,15,16 | | 710 | | |
| U24 | | 74164 | | |
| U32 | | 7410 | | |
| U33,37,46,47,55 | | 9316 | | |
| U34 | | 7425 | | |
| U38,51,56 | | 74LS175 | | |
| U7,41 | | 3019 | | |
| U48 | | 7420 | | |
| REF DES | AMPEX P/N | VENDOR P/N | VOLTAGE PIN | GROUND PIN |
|---|---|---|---|---|
| U10,14 | | 10116 | | |
| U12,17 | | 1458 | | |
| U18 | | 74193 | | |
| U19,20,26,36,42 | | 74123 | | |
| U21,35 | | 7400 | | |
| U23,25,44,45,52 | | 7474 | | |
| U49 | | 3103 | | |
| U50 | | 9305 | | |
| U53 | | 74154 | | |
| U54 | | 7402 | | |
| U11 | | | | |

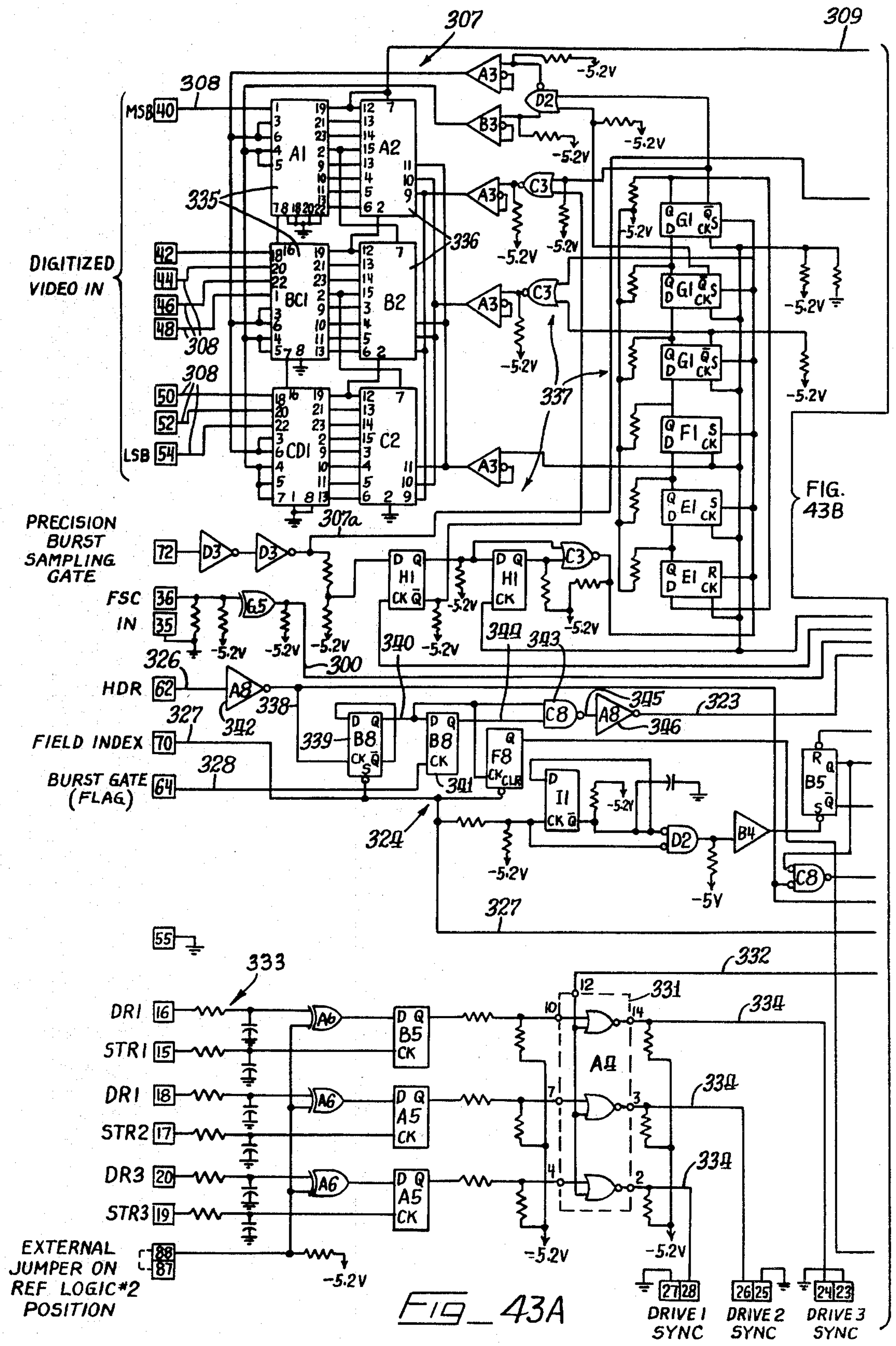
FIG_43A

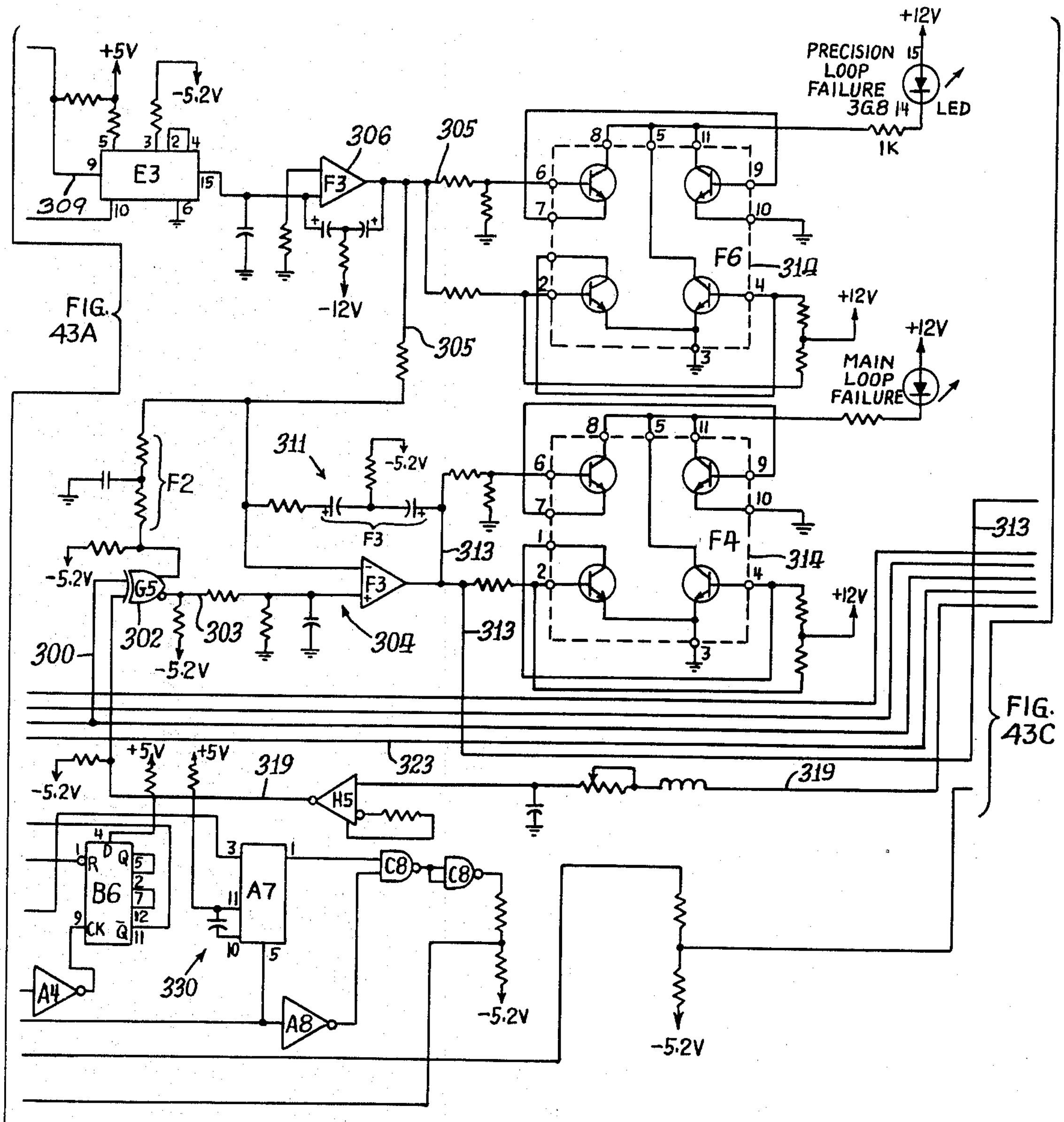
| I.C. LIST | | | | | | | | | | | |
|---|---|---|---|---|---|---|---|---|---|---|---|
| REF DES | F4, F6 | D7 | E3 | F3 | F7 | C8 | A8, D3 | A6 | A7 | A5, B5, 8 | B6 |
| AMPEX P/N | — | — | — | 586-905 | 586-764 | 586-075 | 586-326 | 586-705 | 586-533 | 587-875 | 587-757 |
| VENDOR P/N | CA3046 | CA3028 | CD4053 | MC1458 | LM741 | 7400 | 7404 | 7486 | 74121 | 74LS74 | 74LS175 |
| VOLTAGE PIN | — | — | +5V (16) | — | — | +5V (14) | +5V (14) | +5V (14) | +5V (14) | +5V (14) | +5V (16) |
| GROUND PIN | — | — | 8 | — | — | 7 | 7 | 7 | 7 | 7 | 8 |
| REF. DES | A1, BC-1, CD1 | A2, B2, C2 | A4, D4, D5, D8, E2, E4, E5, F8 | C5 | C3, C4, D2, H4 | G5 | E6, H7 | A3, B3, B4 | C6, C7, D6, E1, F1, G1, G4, G8, H1, H2, H3, I1 |
|---|---|---|---|---|---|---|---|---|---|
| AMPEX P/N | 587-100 | 587-924 | 587-203 | 587-205 | 587-703 | 587-747 | 587-704 | 587-285 | 587-139 |
| VENDOR P/N | 745181 | 745194 | 10101 | 10102 | 10105 | 10107 | 10116 | 10125 | 10131 |
| VOLTAGE PIN | +5V (24) | +5V (16) | -5.2V (8) | -5.2V (8) | -5.2V (8) | -5.2V (8) | -5.2V (8) | +5V (9) - 5.2V (8) | -5.2V (8) |
| GROUND PIN | 12 | 8 | 1, 16 | 1, 16 | 1, 16 | 1, 16 | 1, 16 | 16 | 1, 16 |
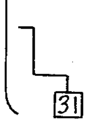
TRANSFER ID RESET
FIG_ 43B

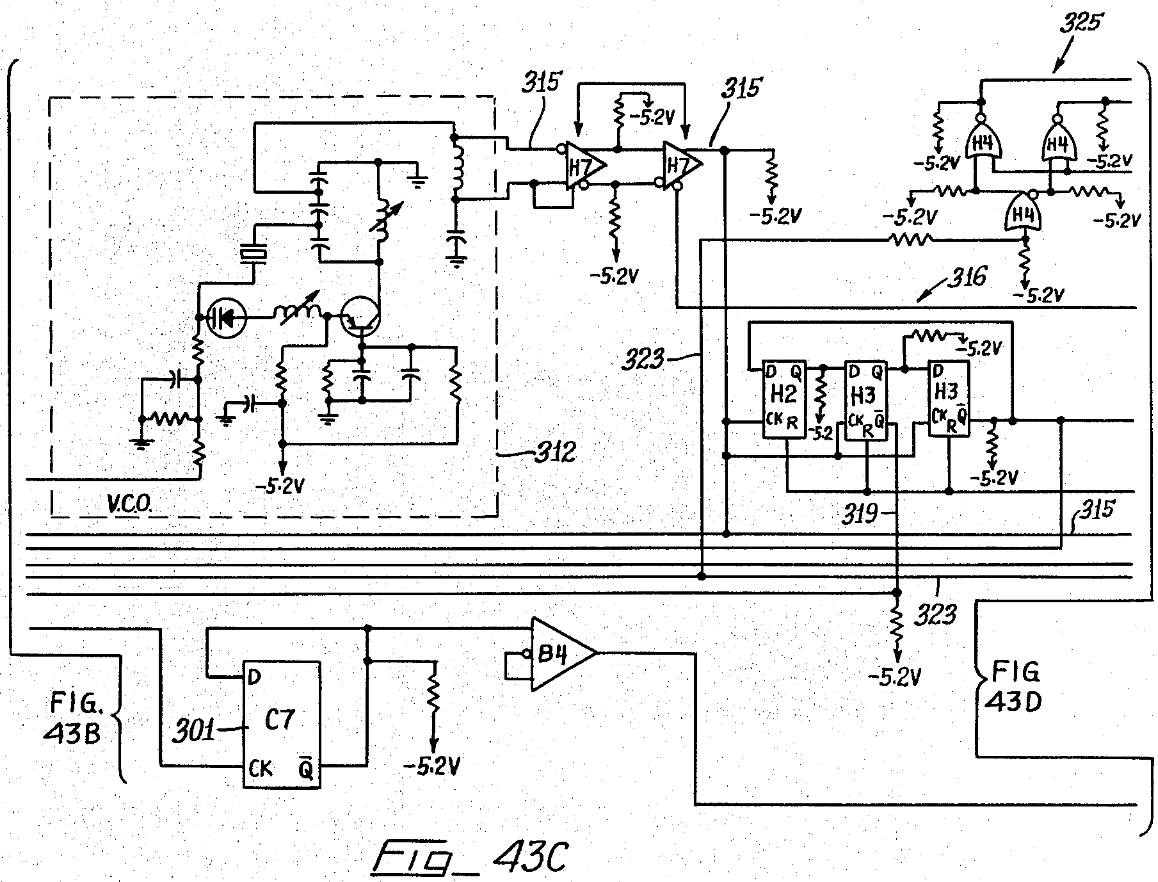
FIG_ 43C

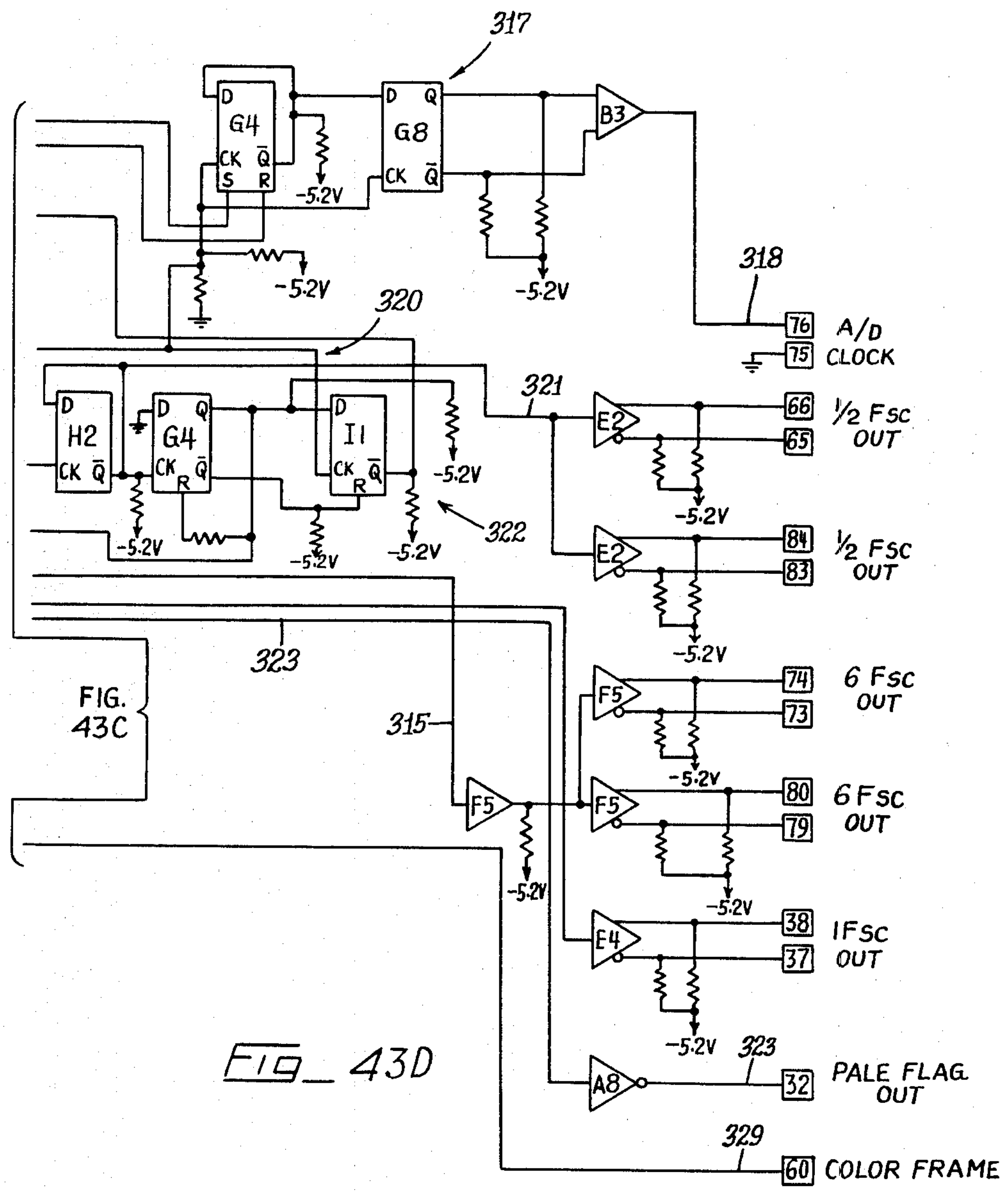
FIG_ 43D

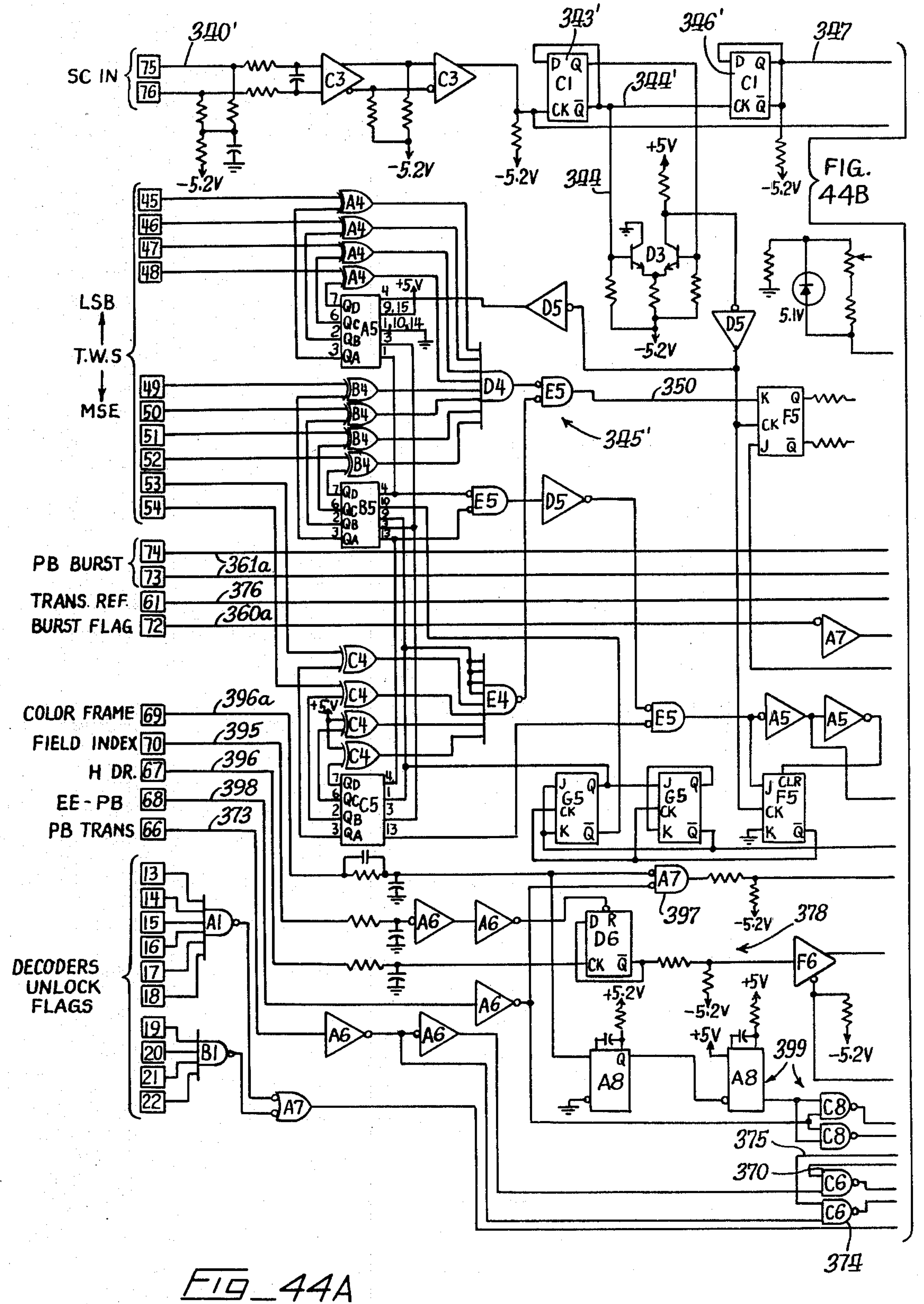
Fig_44A

| INTEGRATED CIRCUIT LIST | | | | | | | | | | | | | | | | | | |
|---|---|---|---|---|---|---|---|---|---|---|---|---|---|---|---|---|---|---|
| REFERENCE DESIGNATION | A7,E5 | A8 | B1 | C1,C2,D1,F7,F8 G8,H4,H5,H6, H8 | A6,B6 B7,D5 | A1,D4,E4 | A2,A3 B2,B3 | A4,B4 C4 | A5,B5, C5 | C3,F2 I5 | C6,C8 E6 | C7,D7 | D2,H7 | D6,D8 | E3,F4 | E7,G8 G7 | E8 |
| AMPEX P/N | | | | | | | | | | | | | | | | | |
| VENDOR P/N | 7402 | 74123 | 7420 | 10131 | 7404 | 7430 | 10101 | 7486 | 74192 | 10116 | 7400 | 74H04 | 10107 | 7474 | 3046 | 10125 | 10105 |
| VOLTAGE PIN | +5V(14) | +5V(15) | +5V(14) | -5V (8) | +5V(14) | +5V(14) | -5V(8) | +5V(15) | +5V(15) | -5V(14) | +5V(14) | +5V(14) | -5V(8) | +5V(14) | – | -5V(8) +5V(9) | -5V(8) +5V(9) |
| GROUND PIN | 7 | 8 | 7 | 1+16 | 7 | 7 | 1+16 | 7 | 8 | 7 | 7 | 7 | 1+16 | 7 | – | 16 | 16 |

| G3 | G5 | I1 | I6, I7 | I8 |
|---|---|---|---|---|
| | | | | |
| 1458 | 74107 | 74164 | 9316 | 7495 |
| +12V (8) | +5V(14) | +5V(14) | +5V(15) | +5V(14) |
| -12V(4) | 7 | 7 | 8 | 7 |

FIG_44D

FIG_ 45A

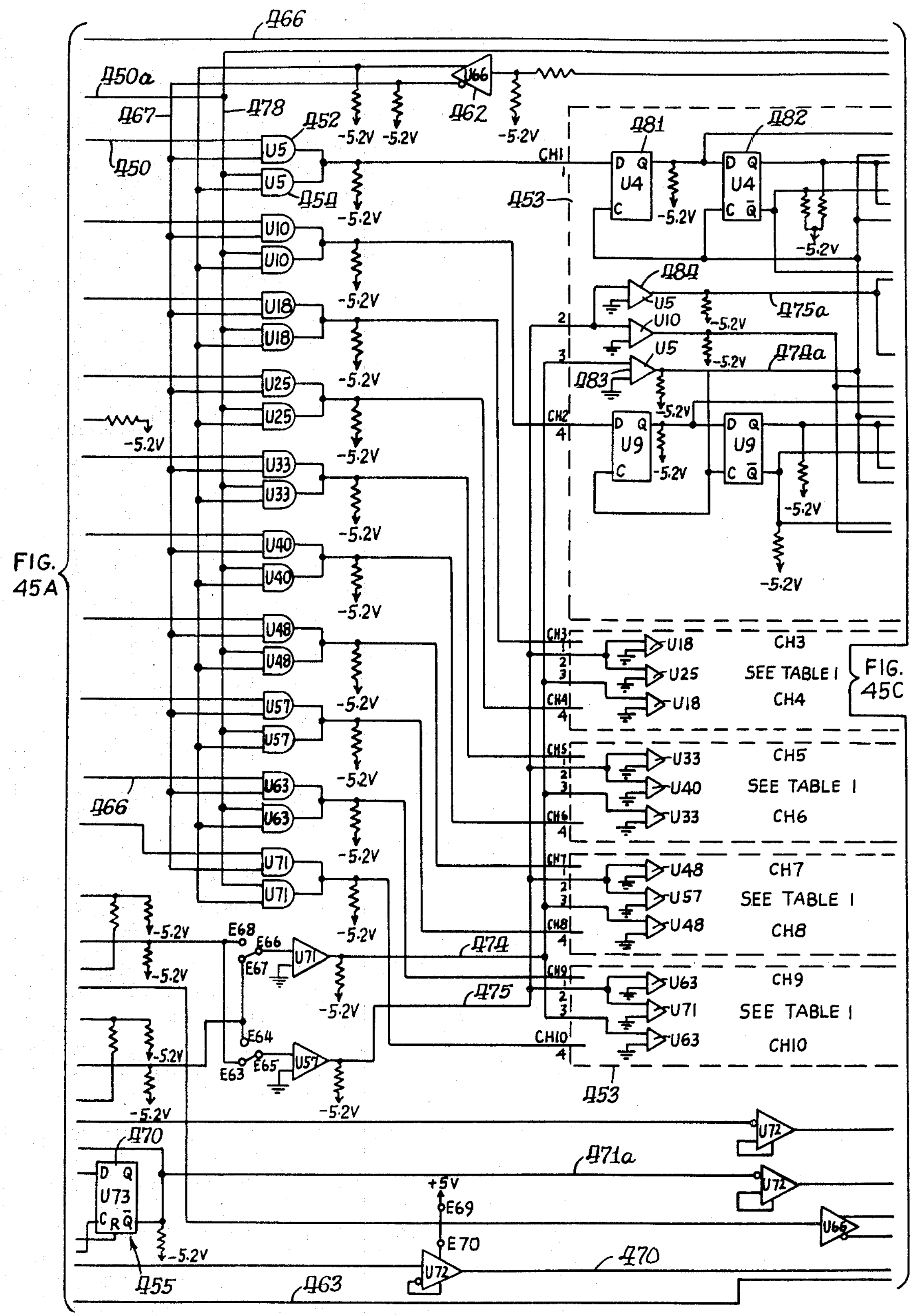
FIG_45B

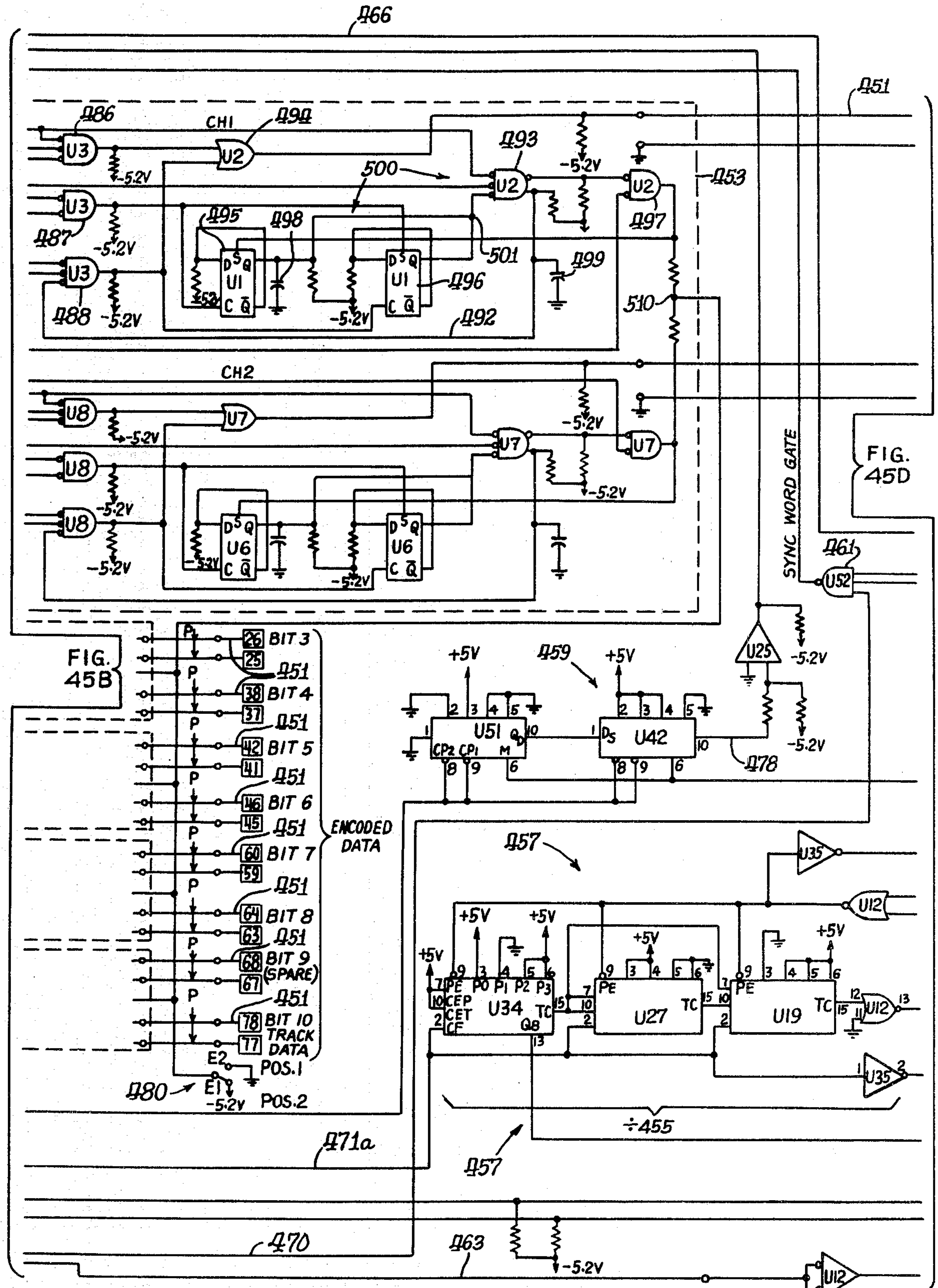
Fig_45C

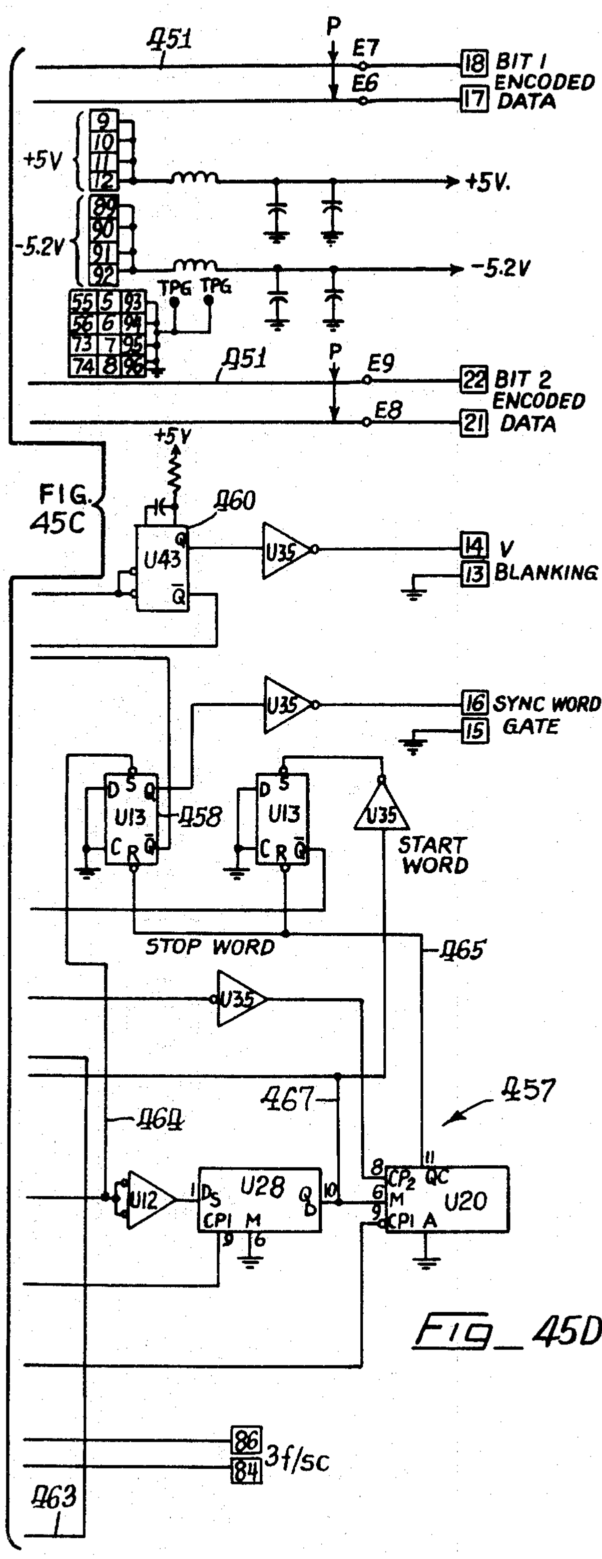

FIG_45D

| INTEGRATED CIRCUIT LIST | | | | | | | | |
|---|---|---|---|---|---|---|---|---|
| REFERENCE DESIGNATION | U52 | U13 | U12 | U35 | U20,28, 42,51 | U43 | U19,27, 34 | U1,4,6,9, 24,29,32,36, 39,44,47,53,56 58,59,62,64,65 67,70,73 |
| AMPEX P/N | 586-076 | 586-108 | 586-109 | 586-326 | 586-497 | 586-533 | 586-552 | 587-139 |
| VENDOR P/N | 7410 | 7474 | 7402 | 7404 | 7495 | 74121 | 9316 | 10131 |
| VOLTAGE PIN | +5V(14) | +5V(14) | +5V(14) | +5V(14) | +5V(14) | +5V(14) | +5V(16) | -5.2V(8) |
| GROUND PIN | 7 | 7 | 7 | 7 | 7 | 7 | 8 | 1,16 |

NOTES: UNLESS OTHERWISE SPECIFIED.

1 RESISTANCE VALUES ARE IN OHMS, 1/4W, 5%

2 CAPACITANCE VALUES ARE IN MICROFARADS, 50V.

3 SCHEMATIC REFLECTS PWA 1403332-01 REVISION "A"

| INTEGRATED CIRCUIT LIST | | | | | | | | |
|---|---|---|---|---|---|---|---|---|
| REFERENCE DESIGNATION | U66 | U50 | U11,26, 41 | U3,8,16,23,31, 38,46,55,61, 69 | U5,10,18,25,33 40,48,57,63, 71 | U2,7,15,22,30, 37,45,54,60, 68 | U49 | U72 |
| AMPEX P/N | 587-203 | 587-205 | 587-741 | 587-324 | 587-549 | 587-703 | 587-704 | 587-285 |
| VENDOR P/N | 10101 | 10102 | 10107 | 10106 | 10104 | 10105 | 10116 | 10125 |
| VOLTAGE PIN | -5.2V(8) | -5.2V(8) | -5.2V(8) | -5.2V(8) | -5.2V(8) | -5.2V(8) | -5.2V(8) | -5.2V(8) - 5V(9) |
| GROUND PIN | 1,16 | 1,16 | 1,16 | 1,16 | 1,16 | 1,16 | 1,16 | 16 |

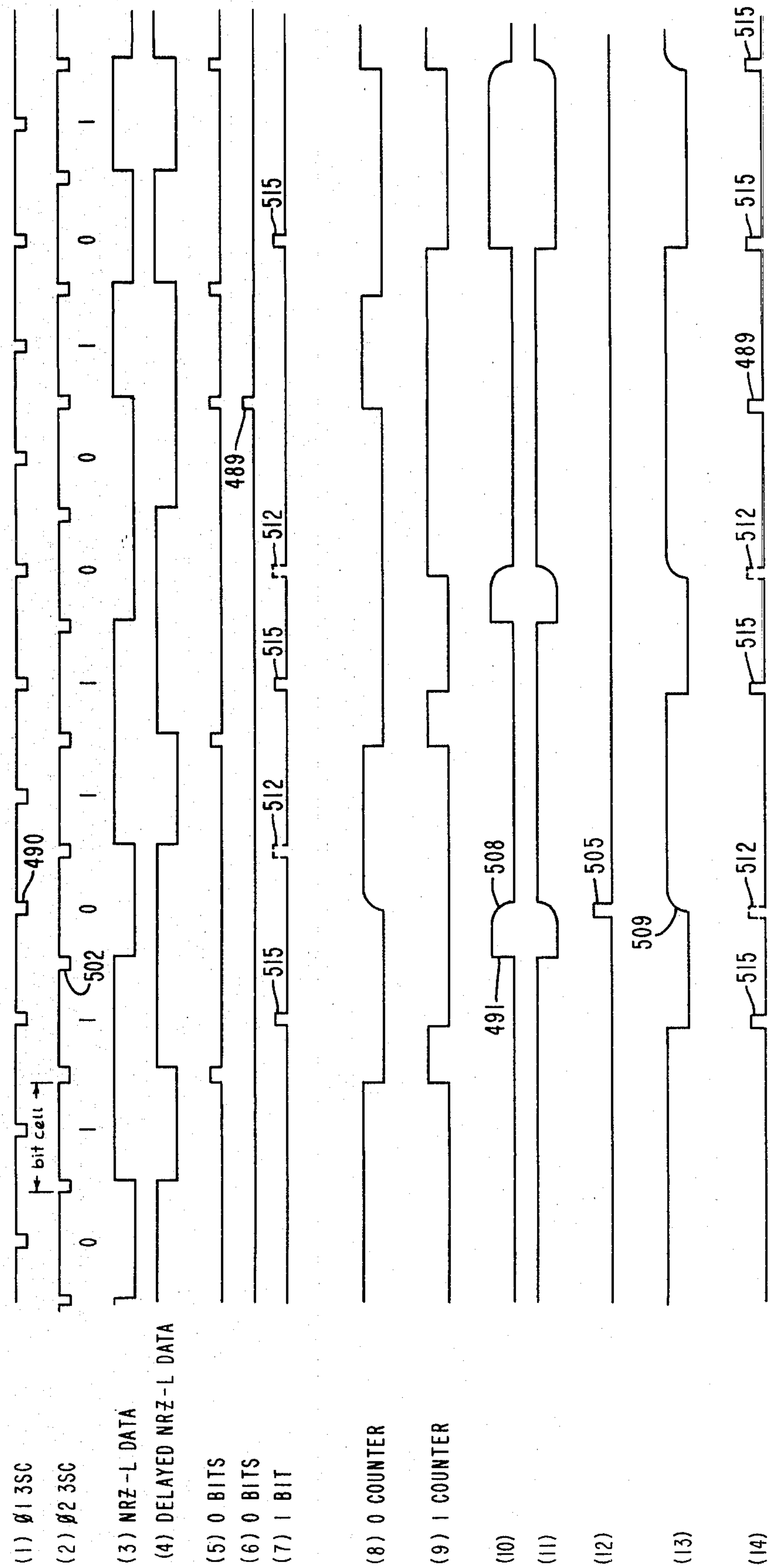
FIG_45E

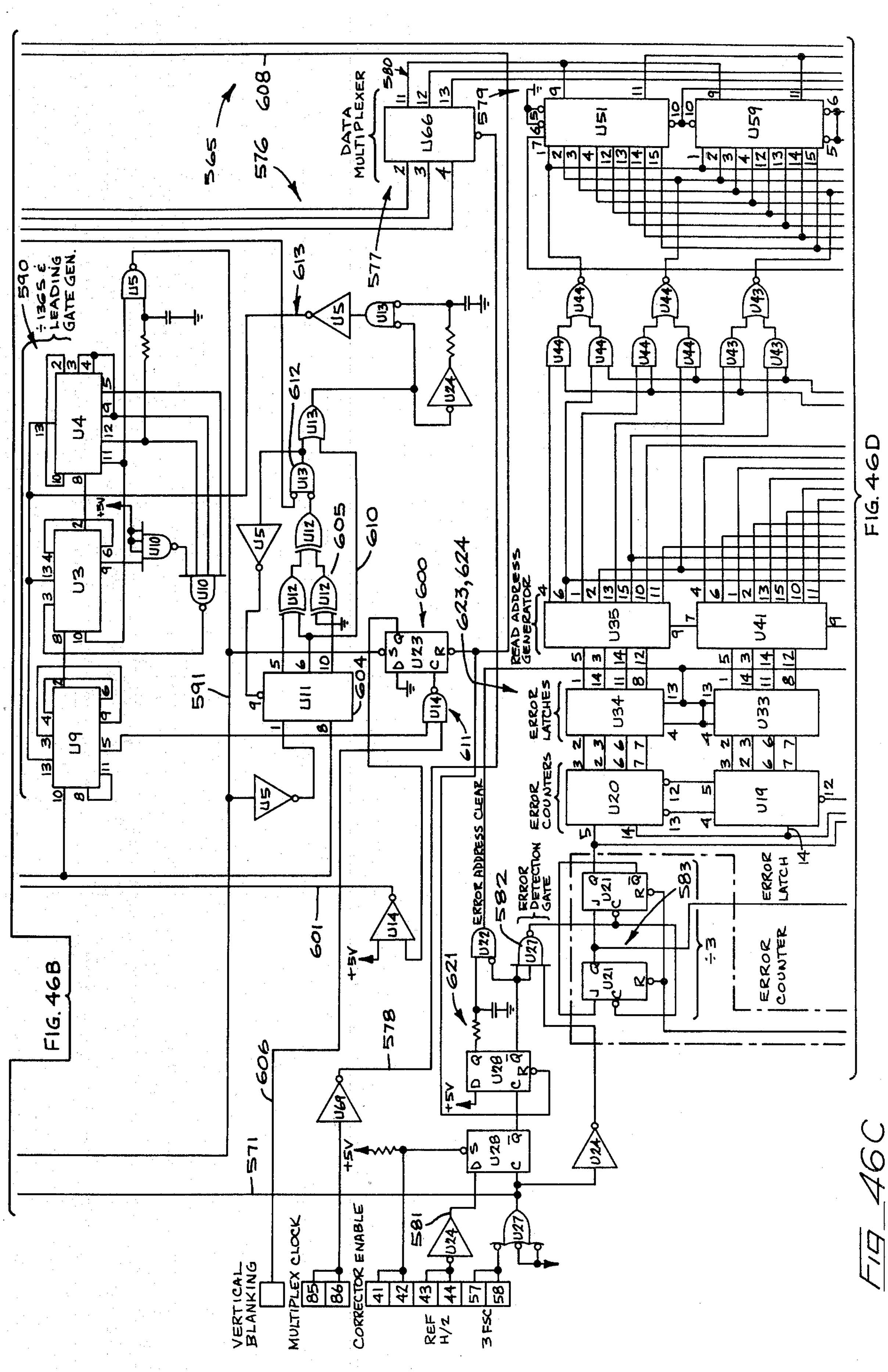
FIG_46C

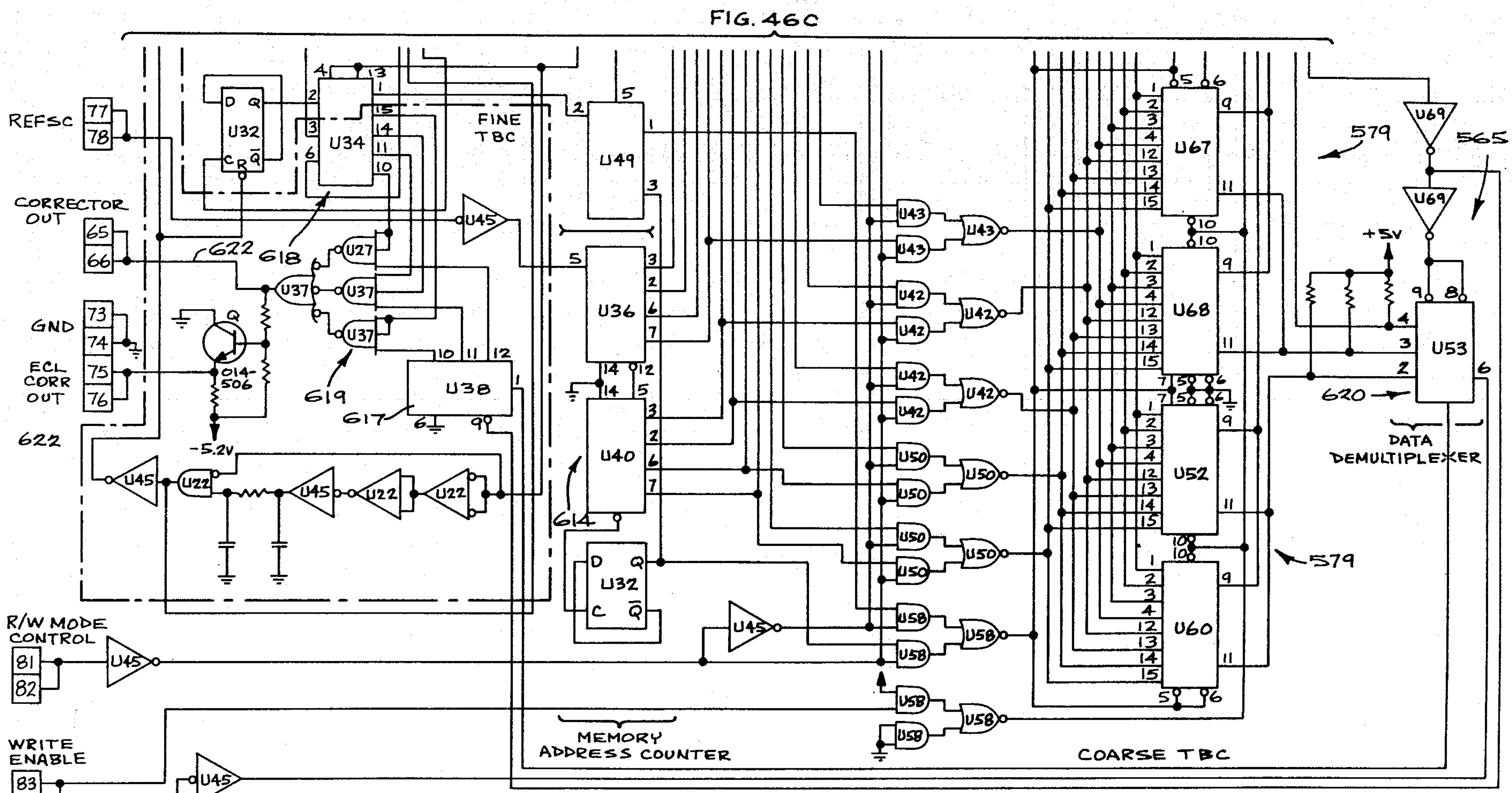
INTEGRATED CIRCUIT LIST
| | | | | | | | | | | | | | | | |
|---|---|---|---|---|---|---|---|---|---|---|---|---|---|---|---|
| REF. DES. | U14,56 | U10 | U23,32 | U13,8 | U42,44,50,58 | U24 | U18,33,34,34 | U38,66,53 | U49 | U69 | U12,47,48,64,81 | U5 | U45 | U27,37 | U22 |
| AMPEX P/N | 586-075 | 586-077 | 586-108 | 586-109 | 586-287 | 586-326 | 586-445 | 586-497 | 586-550 | 586-688 | 586-705 | 586-830 | 586-831 | 587-018 | 586-277 |
| VENDOR P/N | 7400 | 7420 | 7474 | 7402 | 74H51 | 7404 | 7475 | 7495 | 7482 | 74H04 | 7486 | 74S00 | 74S04 | 74S10 | 74S02 |
| VOLT. PIN | +5V(14) | +5V(14) | +5V(14) | +5V(14) | +5V(14) | +5V(14) | +5V (6) | +5V(14) | +5V(4) | +5V(14) | +5V(14) | +5V(14) | +5V(14) | +5V(14) | +5V(14) |
| GND. PIN | 7 | 7 | 7 | 7 | 7 | 7 | 12 | 7 | 11 | 7 | 7 | 7 | 7 | 7 | 7 |
| REF. DES. | U21 | U11,46,65 | U35,41 | U3,4,9 | U61 | U51,52,59,60,67,68 | U55,63 | U39 | U2,6,70 | U7,15,17,25,29,31 | U26 | U16,30 | U1 | U28 | U19,20,36,40,54,62 |
| AMPEX P/N | 587-710 | 586-450 | 587-495 | 587-007 | 589-127 | 587-040 | 587-051 | 587-285 | 587-704 | 587-139 | 587-747 | 587-205 | 589-129 | 586-700 | 586-600 |
| VENDOR P/N | 74S114 | 74164 | 74283 | 9305 | 9338 | 93410 | 7425 | 10125 | 10116 | 10131 | 10107 | 10102 | CA3102 | 74H74 | 74193 |
| VOLT. PIN | +5V(14) | +5V(14) | +5V(16) | +5V(14) | +5V(16) | +5V(16) | +5V(14) | +5V(9)-5.2V(8) | -5.2V(8) | -5.2V(8) | -5.2V(8) | -5.2V(8) | | +5V(14) | +5V(16) |
| GND. PIN | 7 | 7 | 8 | 7 | 8 | 8 | 7 | 16 | 1,16 | 1,16 | 1,16 | 1,16 | | 7 | 8 |
FIG_46D

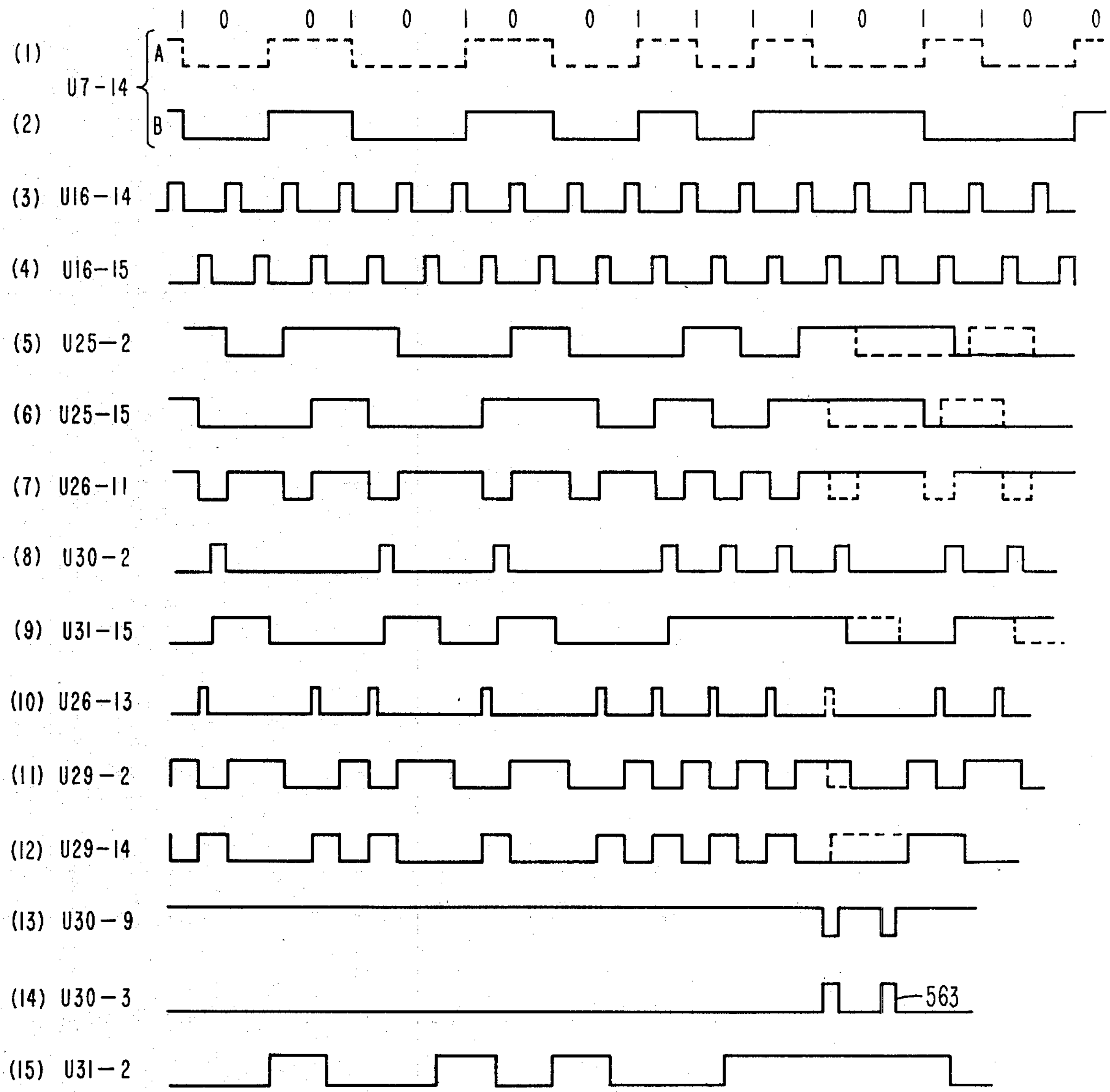
FIG_46E

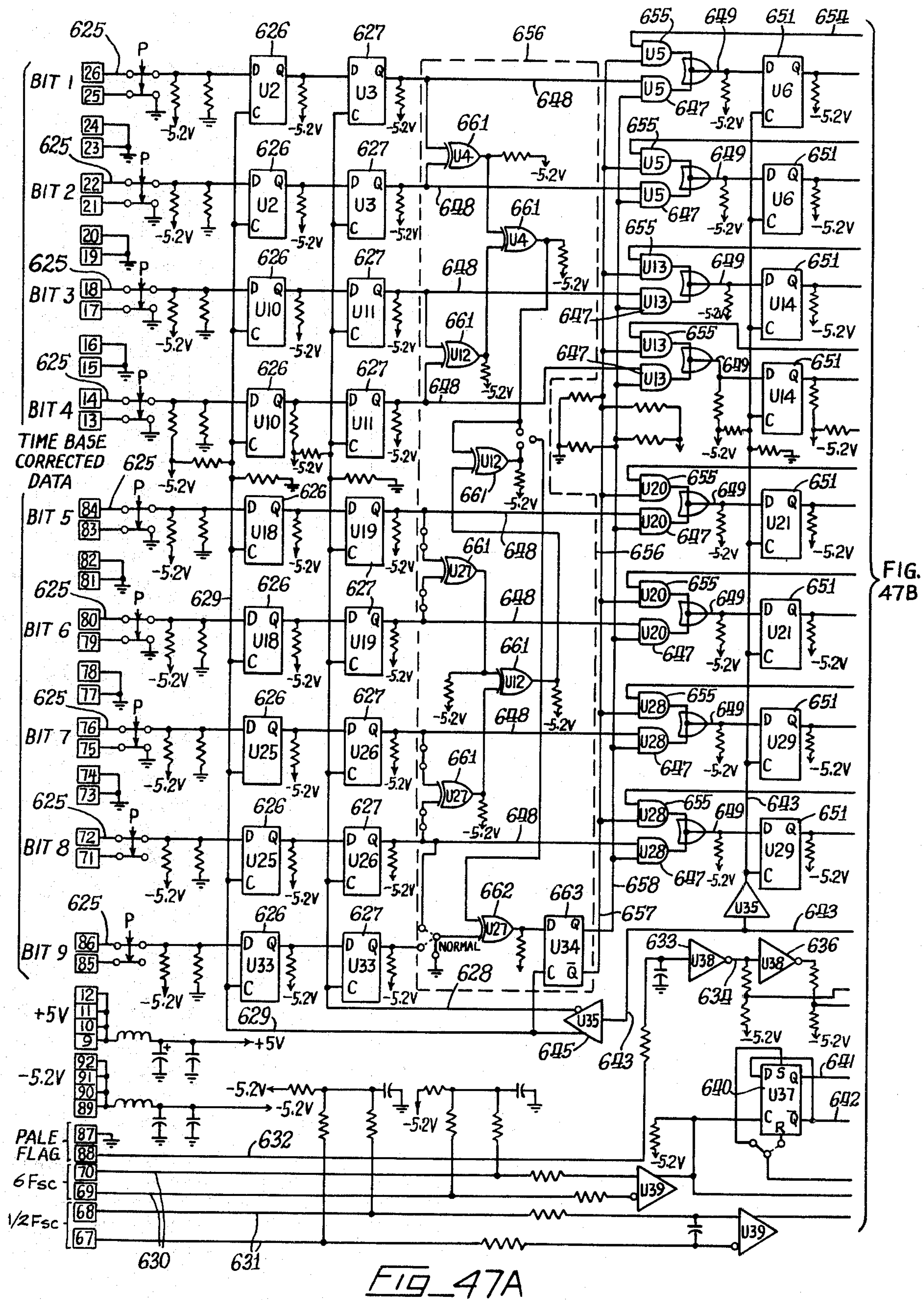
FIG_47A

INTEGRATED CIRCUIT LIST

| REF DES | AMPEX P/N | VENDOR P/N | VOLTAGE (PIN) | GROUND PIN |
|---|---|---|---|---|
| U2,3,6,7,8,10 11,14-16,18,19 21-23,25,26,29- 31,33,34,37,40 | 587-139 | 10131 | -5.2V(8) | 1,16 |
| U4,12,27 | 587-747 | 10107 | -5.2V(8) | 1,16 |
| U9,32 | 587-285 | 10125 | +5V(9) -5.2V(8) | 1,6 |
| U17,24,35 | 587-203 | 10101 | -5.2V(8) | 1,16 |
| U1,39 | 587-704 | 10116 | -5.2V(8) | 1,16 |
| U38 | 586-326 | 7404 | +5V(14) | 7 |
| U5,13,20,28,36 | 587-549 | 10104 | -5.2V(8) | 1,16 |

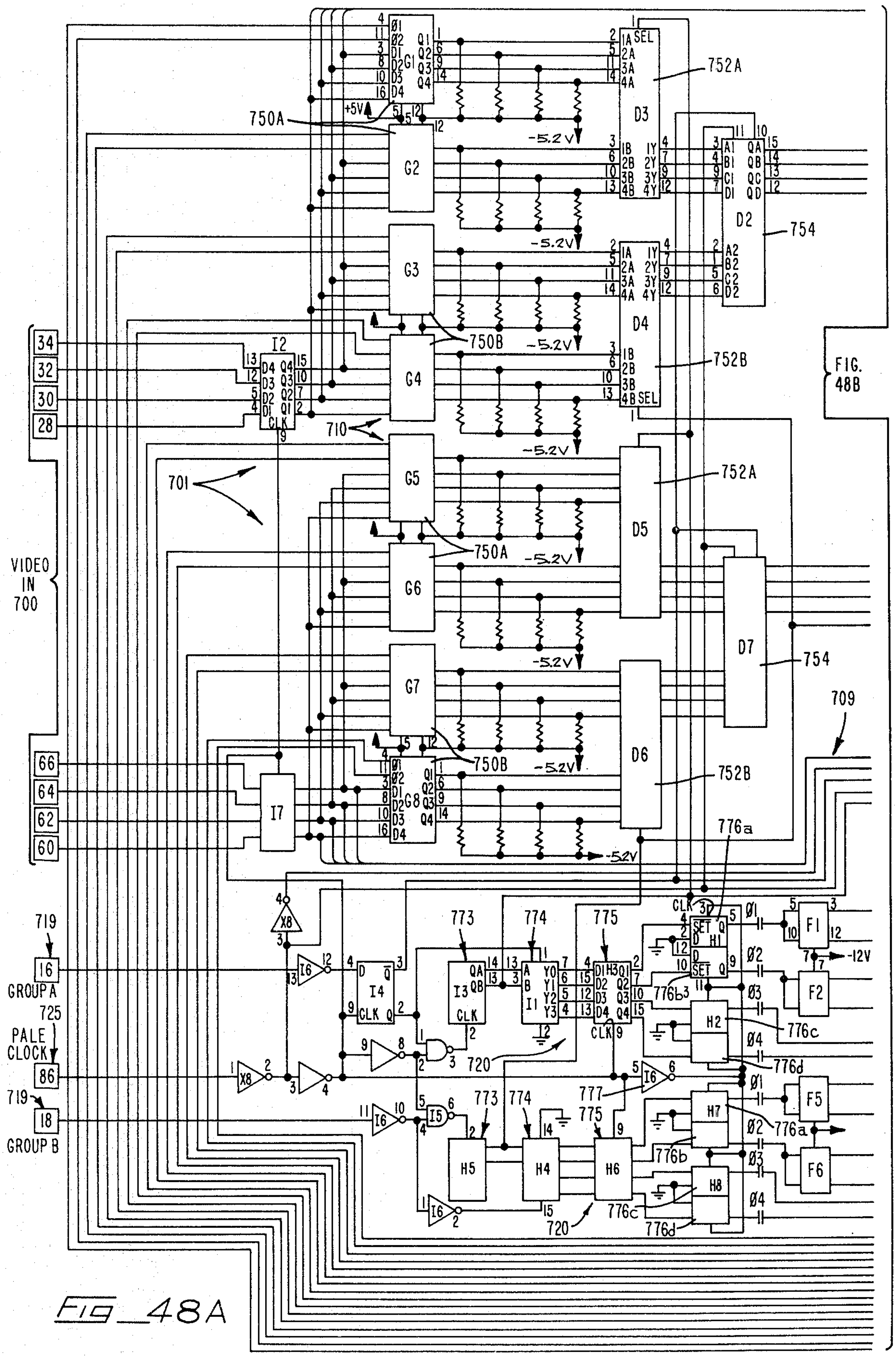
FIG_48A

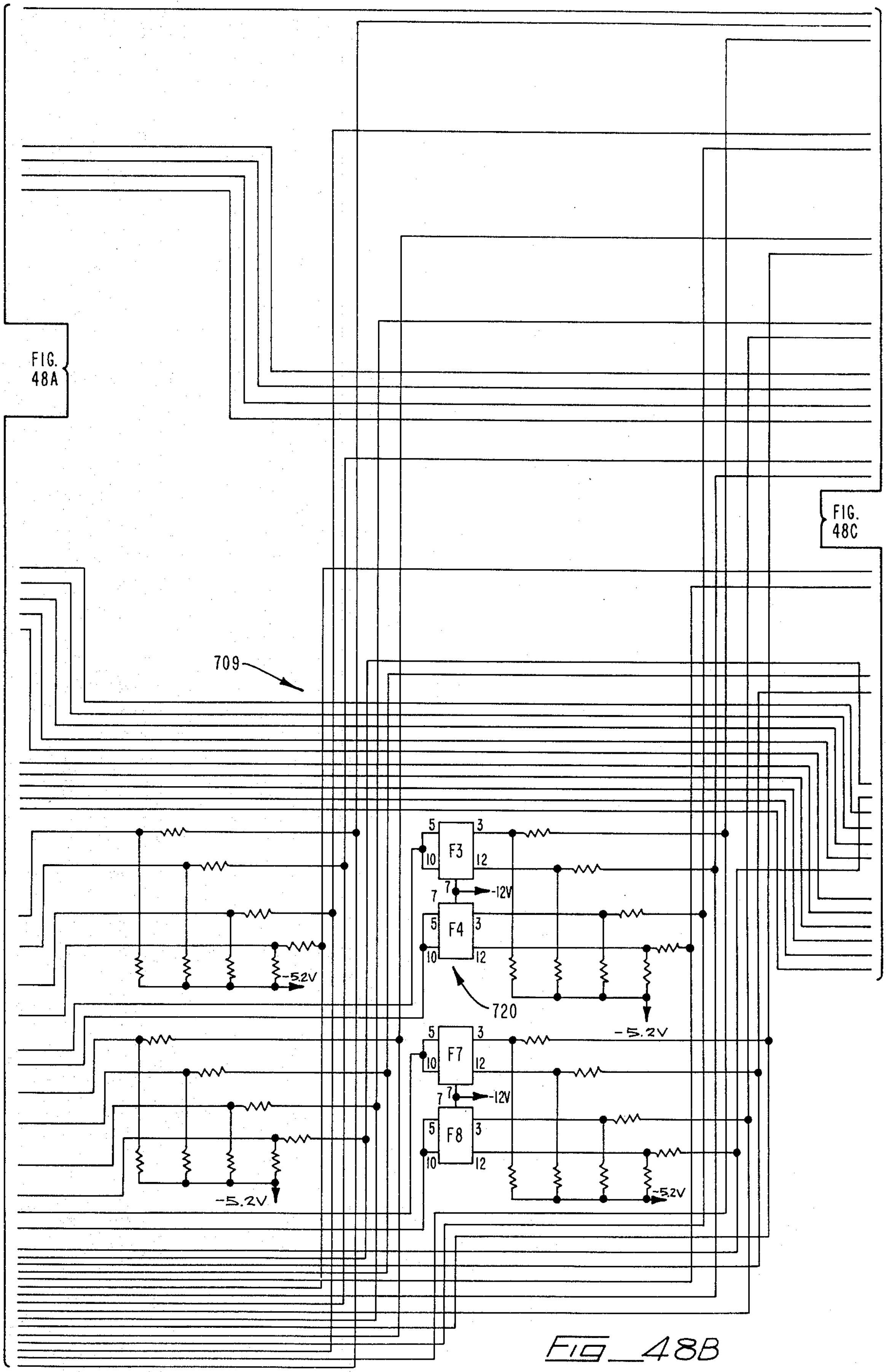
FIG_48B

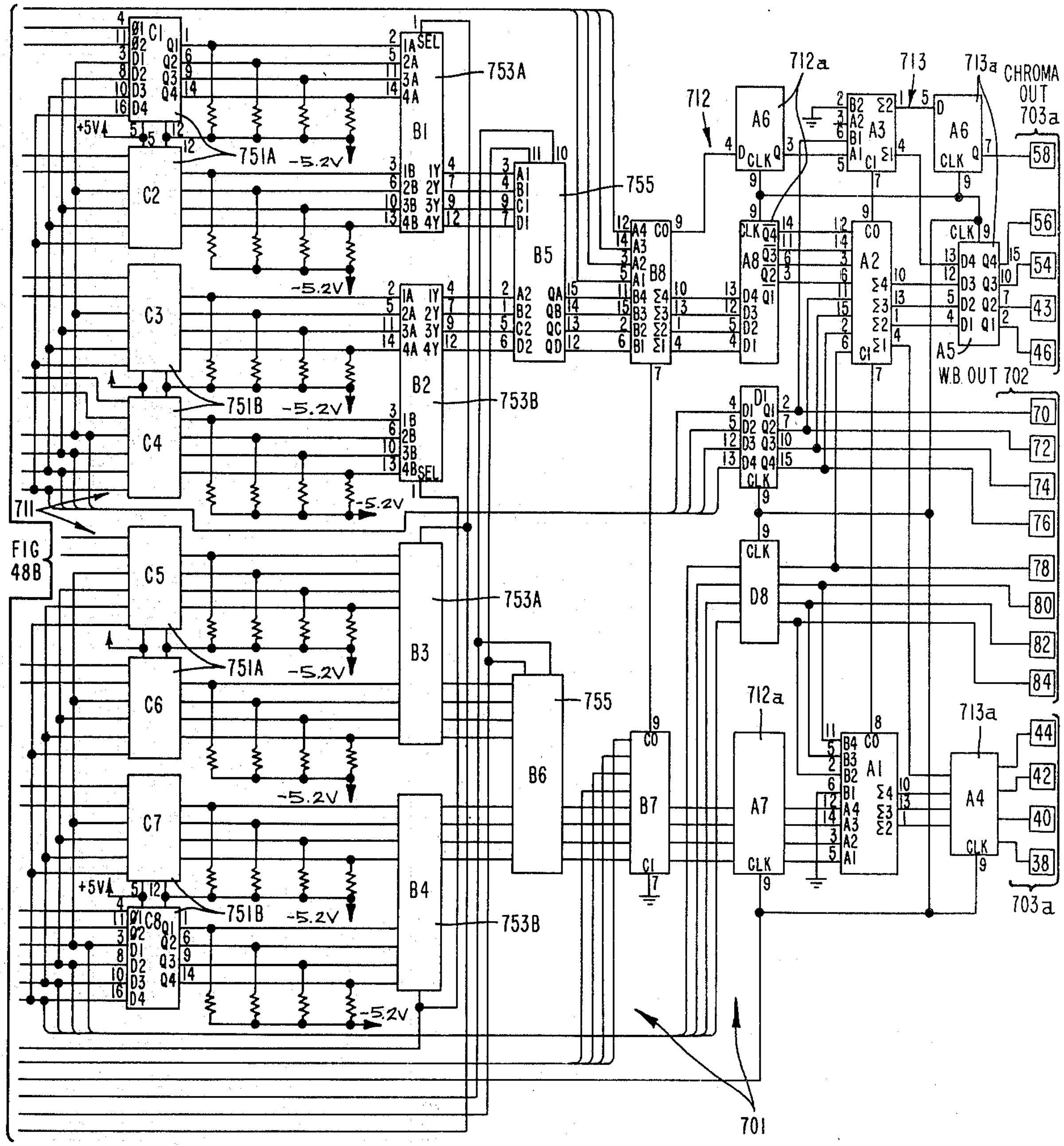
| REFERENCE DESIGNATION | A4,5,6,7,8,D1,8 H3, H6, I2, I7 | I6 X8 | I5 | I3 H5 | I1 H4 | H1,2,7,8 | B5, B6 D2, D7 | F1,2,3,4 5,6,7,8 | A1,2,3 B7, B8 | B1,2,3,4 D3,4,5,6 | C1,2,3,4,5,6,7,8 G1,2,3,4,5,6,7,8 |
|---|---|---|---|---|---|---|---|---|---|---|---|
| AMPEX P/N | 587-152 | 586-831 | 586-830 | 589-007 | 587-814 | 587-875 | 587-901 | 589-128 | 587-814 | 587-760 | 587-052 |
| VENDOR P/N | 74S175N | 74S04 | 74S00 | 74S163 | 74S155 | 74LS74 | 74LS155 | 0026CL | 74LS283 | 74LS157 | 25028 |
| VOLTAGE PIN | 16 | 14 | 14 | 16 | 16 | 14 | 16 | 7,14 | 16 | 16 | 5,12 |
| GROUND PIN | 8 | 7 | 7 | 8 | 8 | 7 | 8 | — | 8 | 8 | – |
FIG_48C

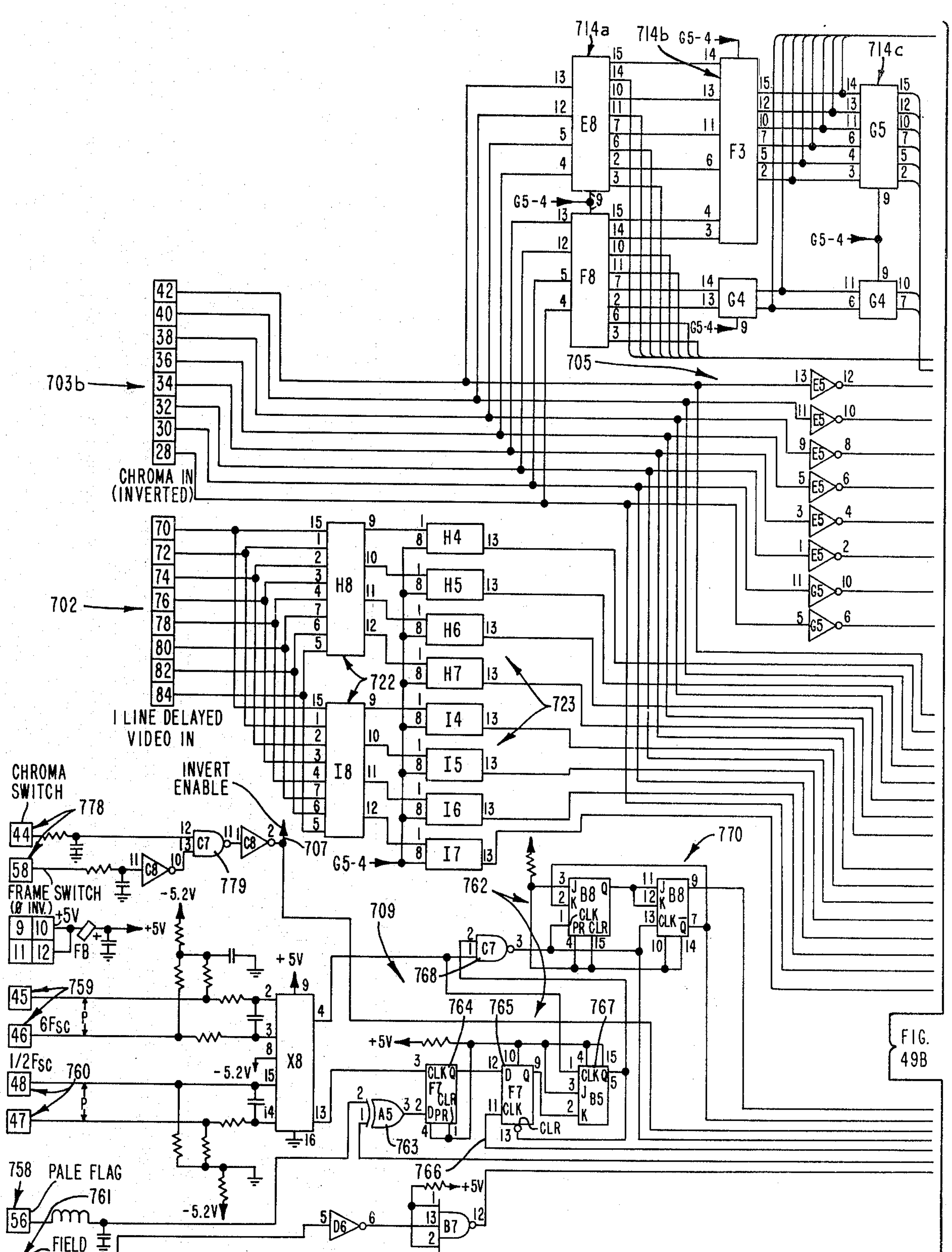
| REF. DESIGNATION | C7 | F7 | A5 | F6,G5,C8 | B5,6,8,A7 | X8 | H1,2,3, F1,2,3, D1,2,3, C4,5, D5, F5, C6, F4 | E6,7,8,F8 |
|---|---|---|---|---|---|---|---|---|
| AMPEX P/N | 586-830 | 587-096 | 586-705 | 586-831 | 586-978 | 587-132 | 587-152 | 587-200 |
| VENDOR P/N | 74S00N | 74S74N | 7486N | 74S04N | 74S112N | MC10125L | 74S175N | 74S133N |
| VOLTAGE PIN | 14 | 14 | 14 | 14 | 16 | 9,8 | 16 | 16 |
| GND PIN | 7 | 7 | 7 | 7 | 8 | 16 | 8 | 8 |
FIG_49A

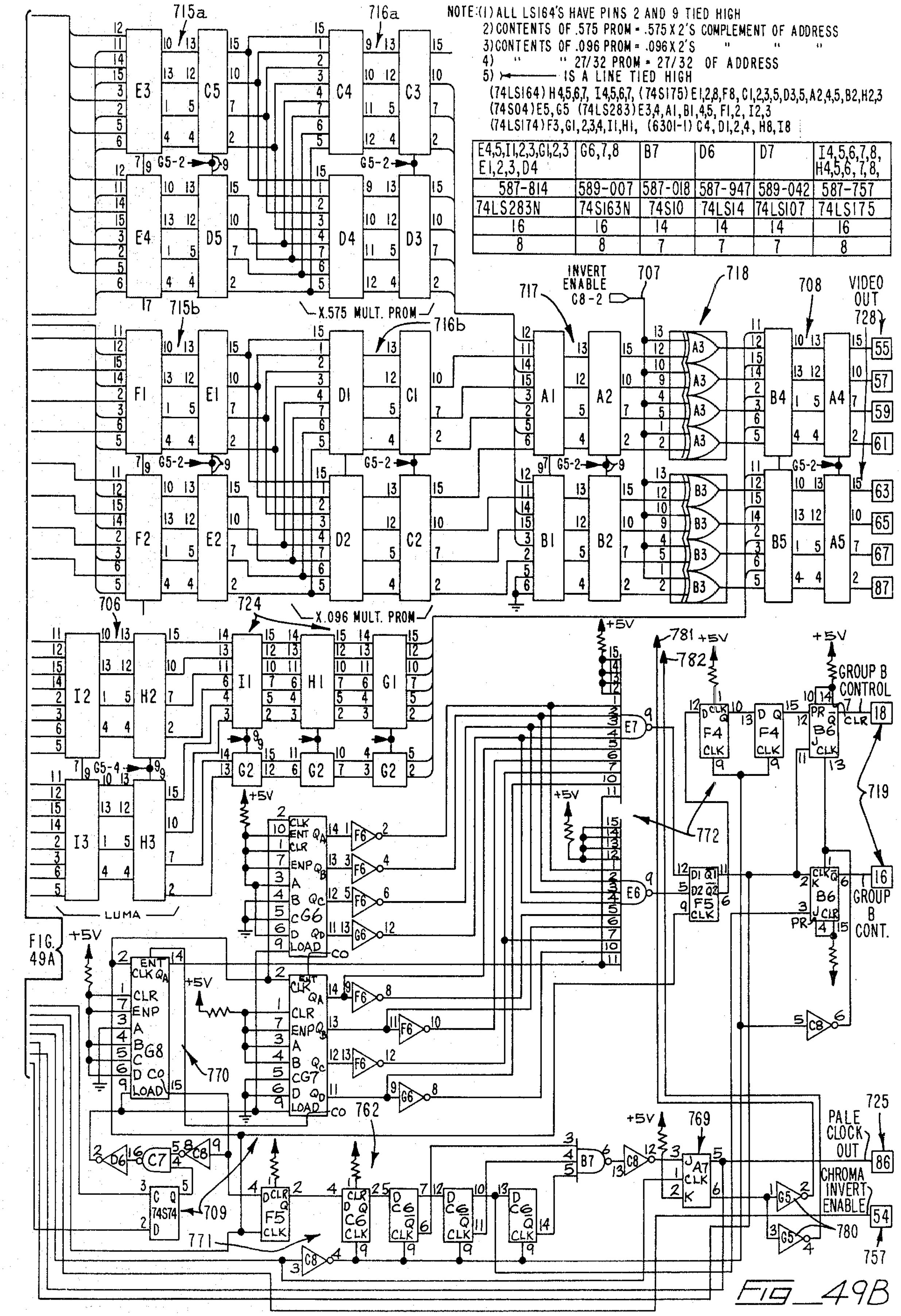
NOTE: (1) ALL LS164'S HAVE PINS 2 AND 9 TIED HIGH
2) CONTENTS OF .575 PROM = .575 X 2'S COMPLEMENT OF ADDRESS
3) CONTENTS OF .096 PROM = .096 X 2'S " " "
4) " " 27/32 PROM = 27/32 OF ADDRESS
5) ⟼ IS A LINE TIED HIGH
(74LS164) H4,5,6,7, I4,5,6,7, (74S175) E1,2,8,F8, C1,2,3,5, D3,5, A2,4,5, B2, H2,3
(74S04) E5, G5 (74LS283) E3,4, A1, B1,4,5, F1,2, I2,3
(74LS174) F3, G1,2,3,4, I1, H1, (6301-1) C4, D1,2,4, H8, I8
| E4,5,I1,2,3,G1,2,3 E1,2,3,D4 | G6,7,8 | B7 | D6 | D7 | I4,5,6,7,8, H4,5,6,7,8, |
|---|---|---|---|---|---|
| 587-814 | 589-007 | 587-018 | 587-947 | 589-042 | 587-757 |
| 74LS283N | 74S163N | 74S10 | 74LS14 | 74LS107 | 74LS175 |
| 16 | 16 | 14 | 14 | 14 | 16 |
| 8 | 8 | 7 | 7 | 7 | 8 |
FIG_49B

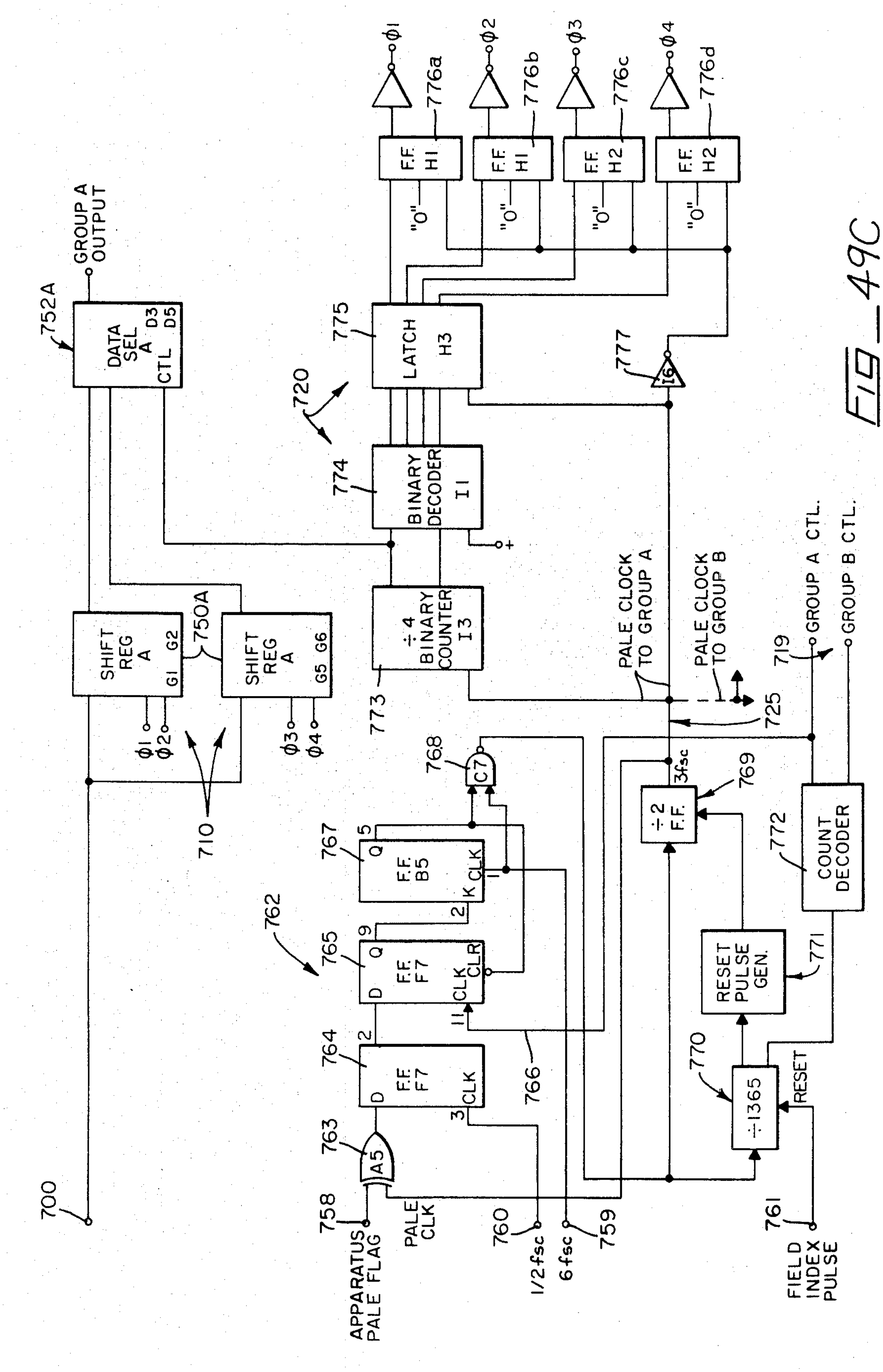
FIG_49C

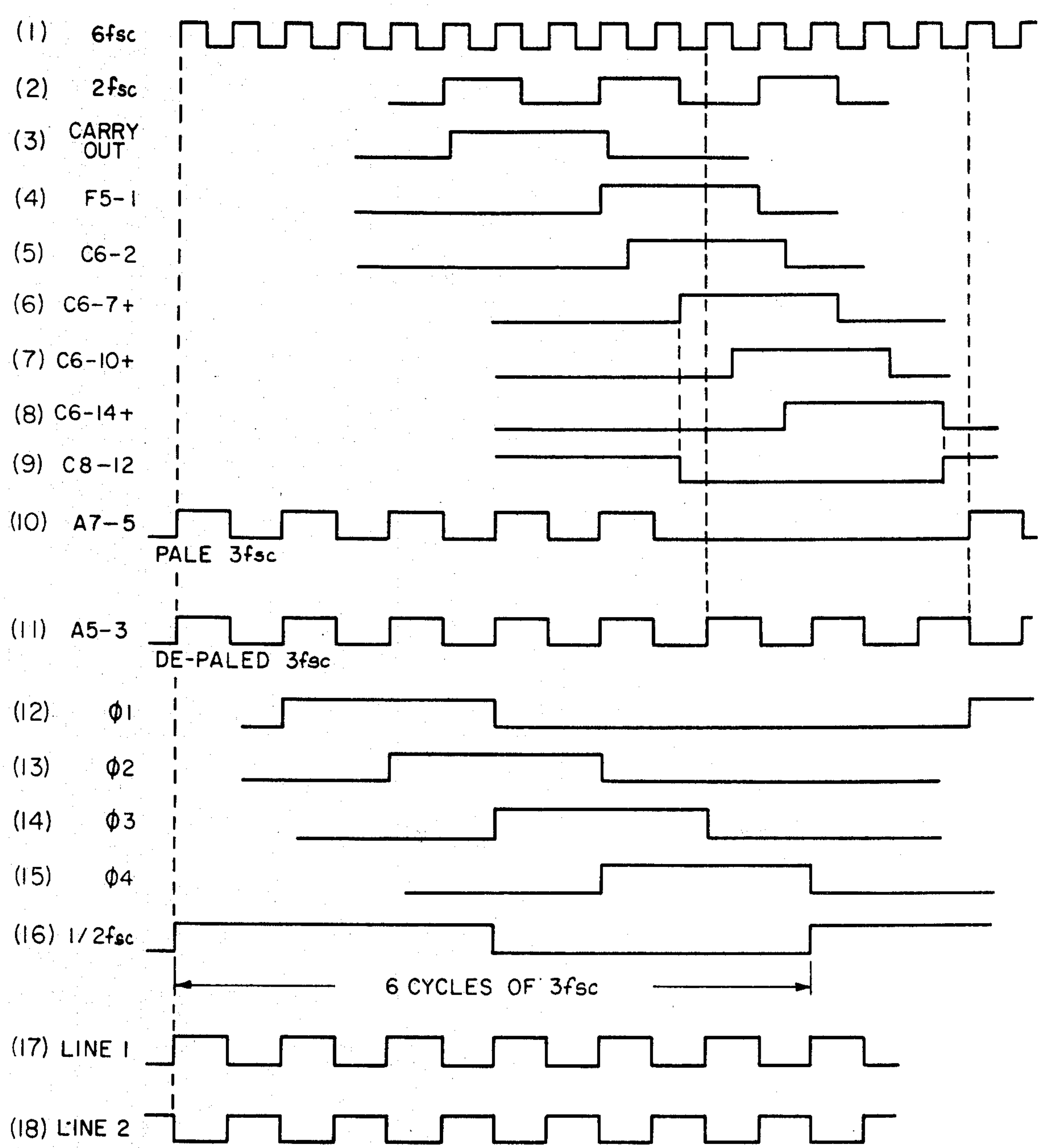
FIG_49D

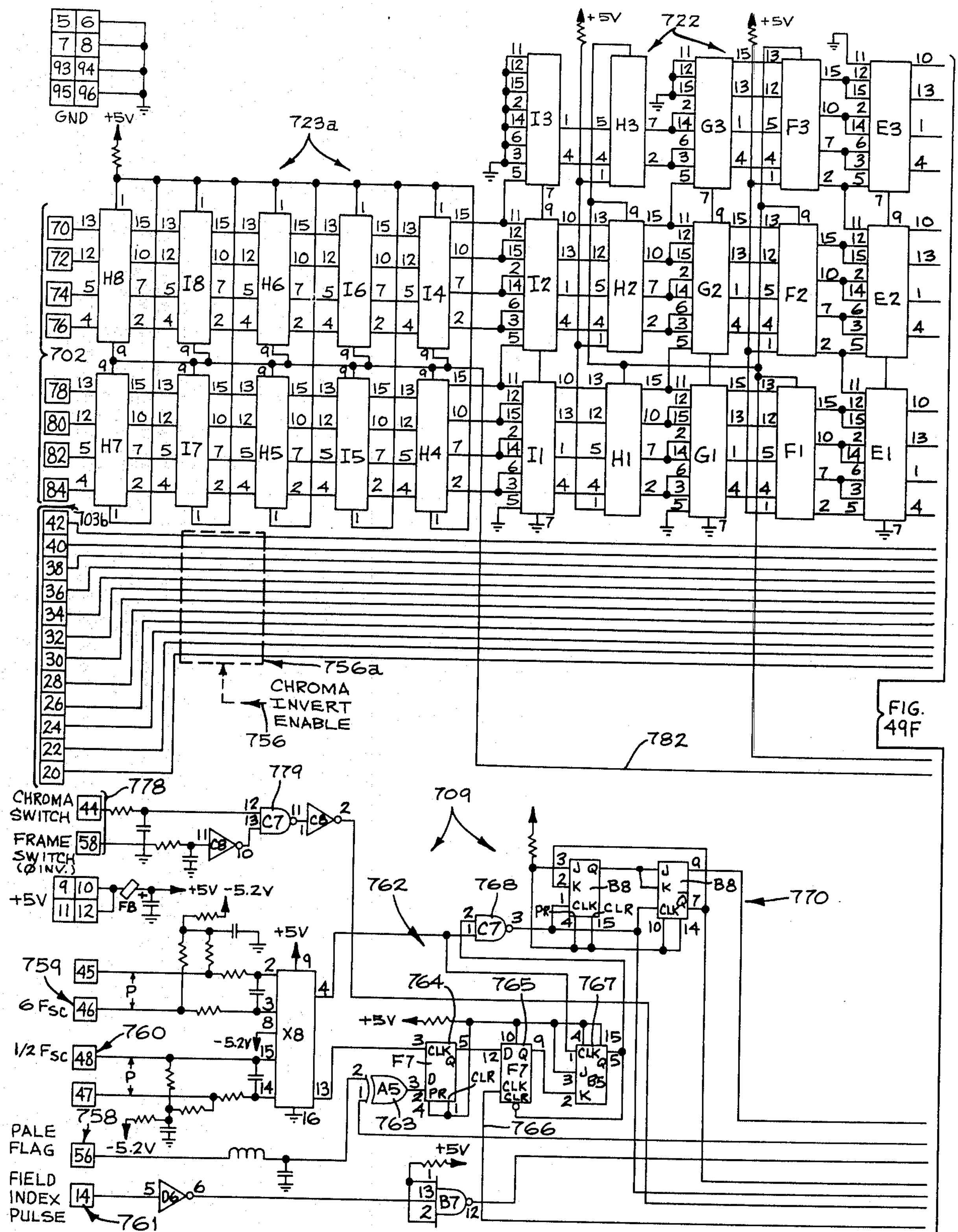
| REF. DESIGNATION | C7 | F7 | A5 | F6,G5,C8 | B5,6,8,A7 | X8 | H1,2,3,F1,2,3,4,5, D1,2,3,5,C4,5,6 | E6,7,8,F8 |
|---|---|---|---|---|---|---|---|---|
| AMPEX P/N | 586-830 | 587-095 | 586-705 | 586-831 | 586-978 | 587-132 | 587-152 | 587-200 |
| VENDOR P/N | 74S00N | 74S74N | 7486N | 74S04N | 74S112N | MC10125L | 74S175N | 74S133N |
| VOLT. PINS | 14 | 14 | 14 | 14 | 16 | 9,8 | 16 | 16 |
| GND PINS | 7 | 7 | 7 | 7 | 8 | 16 | 8 | 8 |
-5.2V FB -5.2V
FIG_49E

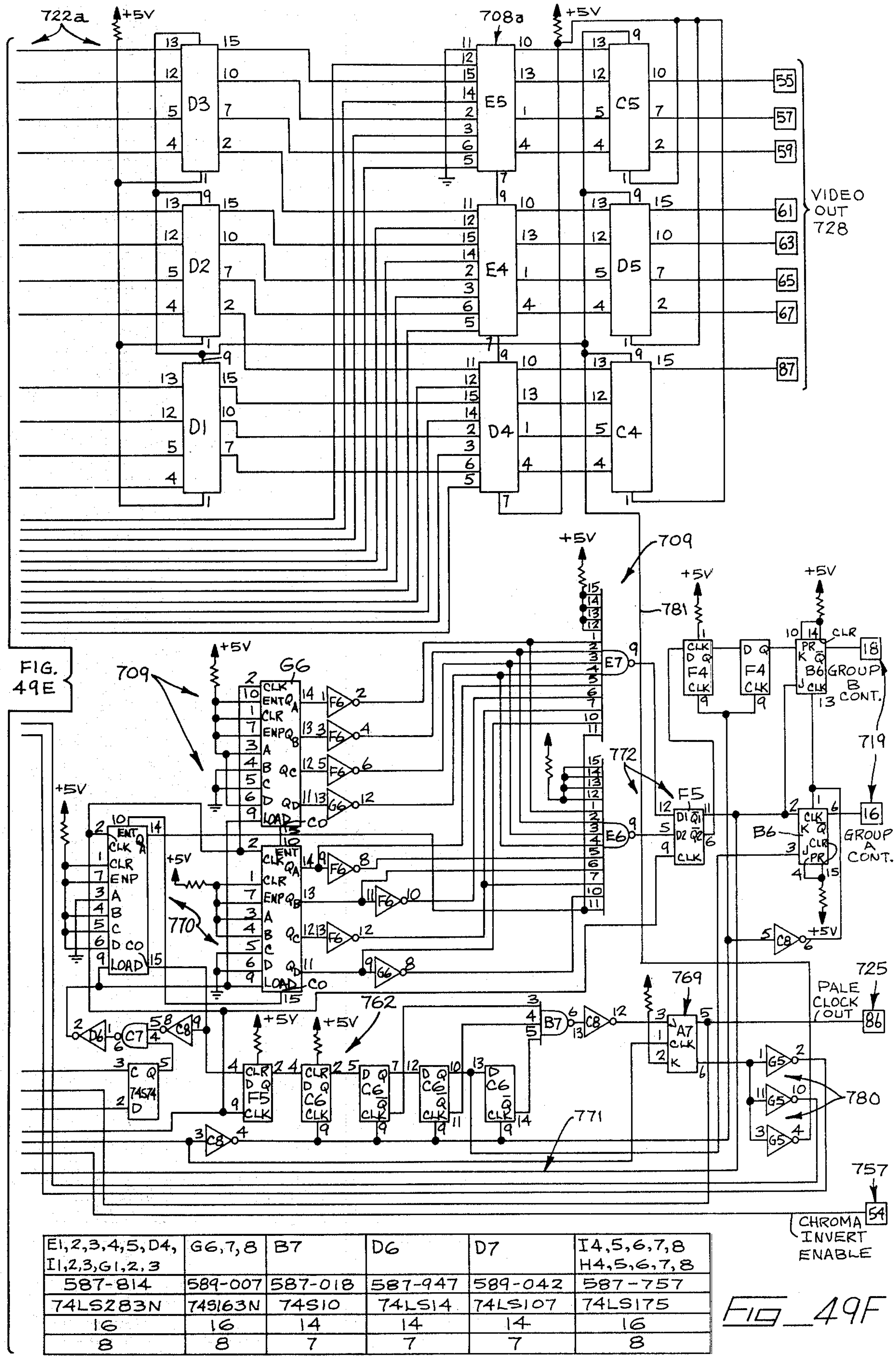
| | | | | | |
|---|---|---|---|---|---|
| E1,2,3,4,5,D4, I1,2,3,G1,2,3 | G6,7,8 | B7 | D6 | D7 | I4,5,6,7,8 H4,5,6,7,8 |
| 587-814 | 589-007 | 587-018 | 587-947 | 589-042 | 587-757 |
| 74LS283N | 74S163N | 74S10 | 74LS14 | 74LS107 | 74LS175 |
| 16 | 16 | 14 | 14 | 14 | 16 |
| 8 | 8 | 7 | 7 | 7 | 8 |
FIG_49F

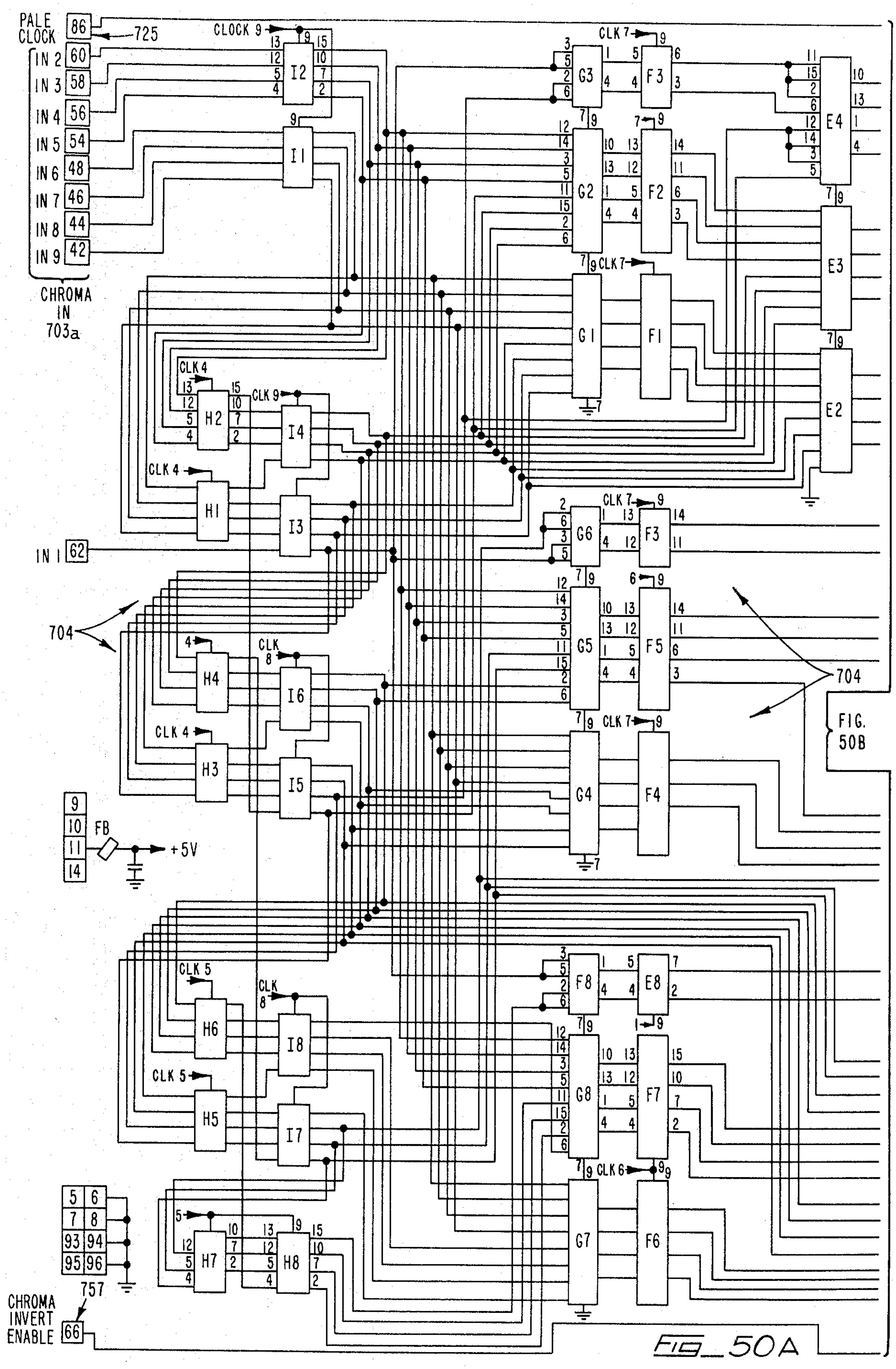
FIG_50A

| AMPEX P/N | VENDOR P/N | VCC | GND |
|---|---|---|---|
| 587-152 | 74S175 | 16 | 8 |
| 587-757 | 74S175 | 16 | 8 |
| 587-814 | 74LS283 | 16 | 8 |
| 586-831 | 74S04 | 14 | 7 |
| REFERENCE DESIGNATION |
|---|
| F1,2,3,4,5,6,7, E8, D3,4,5, C2,3,4, D6,7,8, B6,7,8, B1,2,3 |
| I1,2,3,4,5,6,7,8, H1,2,3,4,5,6,7,8 |
| G1, 2,3,4,5,6,7,8, E2,3,4, F8, C1, D1,2, E5,6,7, C5,6,7,8, B4,5 |
| X8, E1 |
NOTE: PIN 1 OF ALL 74S175 AND 74LS175 TIED THROUGH 1KΩ RES TO +5V
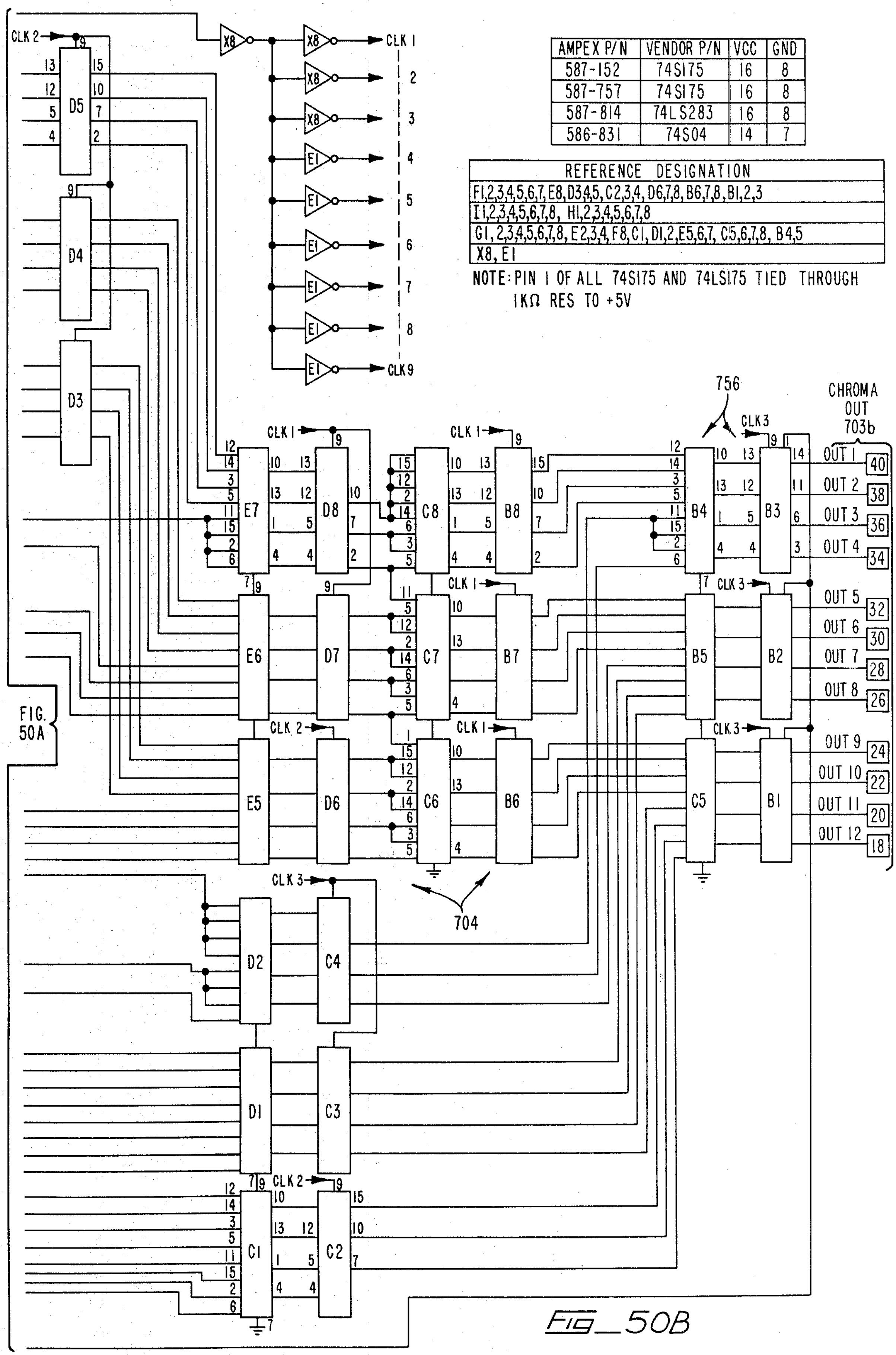
FIG_50B

| REF DES | B2,C1,C2 D1,D2 | F5,F6,G5 G6 X8 | 86,87,E7 | A5,6,7,8 | F8 | B8 | D8 | F7 |
|---|---|---|---|---|---|---|---|---|
| AMPEX P/N | | | | | | | | |
| VENDOR P/N | 10131 | 74S175 | 7402 | 74LS153 | 74153 | 74S10 | 7400 | 7486 |
| VOLTAGE PIN | | | | | | | | |
| GROUND PIN | | | | | | | | |

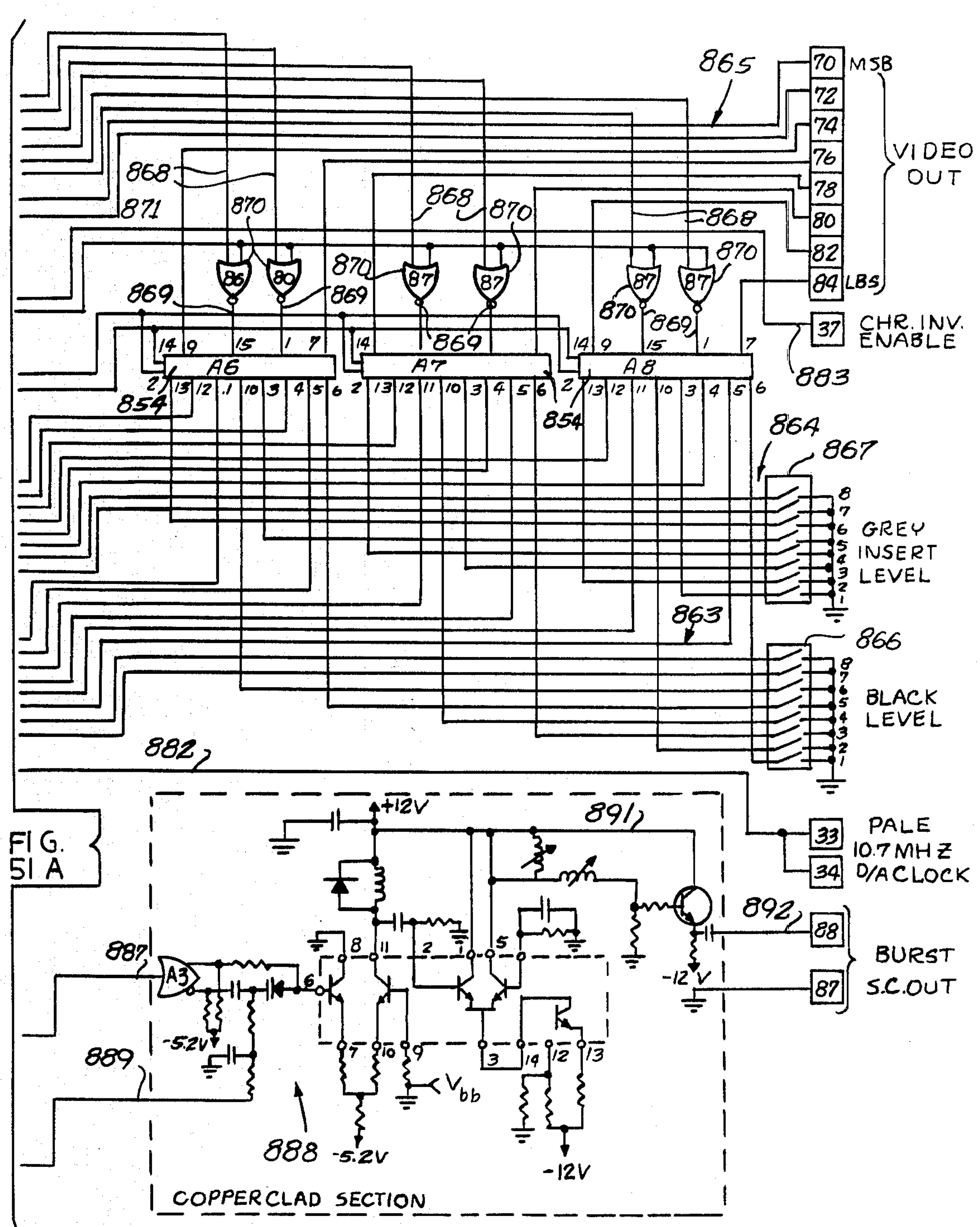
FIG_51B
| | | |
|---|---|---|
| E2 | AE, E3 | B1 |
| 10125 | 10 10510 | 10116 |

| REF DES | U12 | U34 | U29 |
|---|---|---|---|
| AMPEX P/N | 586-268 | 586-831 | 587-095 |
| VENDOR P/N | 741 | 74S04 | 74S74 |
| VOLTAGE(PIN) | +12V(11)-12(6) | +5V(14) | +5V(14) |
| GROUND PIN | | 7 | 7 |

| FIELD SER SUB LIST | |
|---|---|
| AMPEX PIN | VENDOR PIN |
| 013-166 | IN746A |
| 013-322 | IN750A |
| 013-257 | IN753A |
| 013-383 | IN757A |
| 013-371 | IN964B |
| 013-830 | IN966B |
| 013-723 | FD777 |
| 581-247 | 5082-2970 |
| 014-247 | 2N2219 |
| 014-505 | 2N3251 |
| 014506 | 2N2501 |
| 014-581 | 2N2369A |
| 580-133 | 2N4093 |
| 580-226 | 2N4124 |
| 580-471 | 2N5484 |
| 580-511 | 2N5841 |
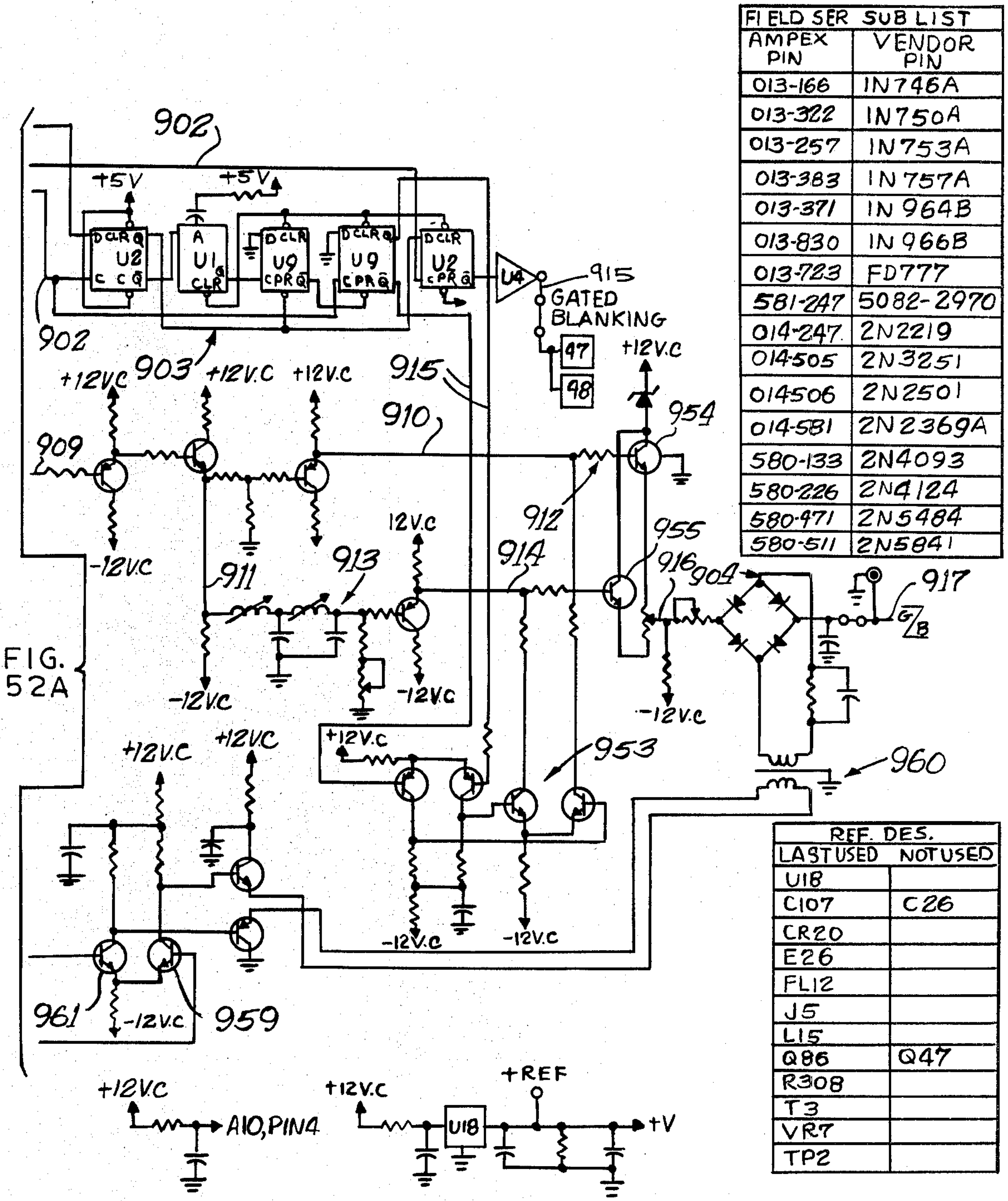
| REF. DES. | |
|---|---|
| LAST USED | NOT USED |
| U18 | |
| C107 | C26 |
| CR20 | |
| E26 | |
| FL12 | |
| J5 | |
| L15 | |
| Q86 | Q47 |
| R308 | |
| T3 | |
| VR7 | |
| TP2 | |
| I.C. LIST | | | | | | |
|---|---|---|---|---|---|---|
| U14 | U5-6 | U-1 | U13,17 | U15-16 | U10,11 | U18 |
| 587-533 | 587-387 | 587-537 | 586-316 | 586-778 | 587-682 | 587-771 |
| 74LS04 | 74LS74 | 74LS221 | CA3039 | CA3054 | MC 3403P | 78L05AWC |
| +5V (14) | +5V(14) | +5(16) | -12V(10) | -12V(5) | +12V(4) 12(11) | — |
| 7 | 7 | 8 | — | — | — | — |
FIG_52B

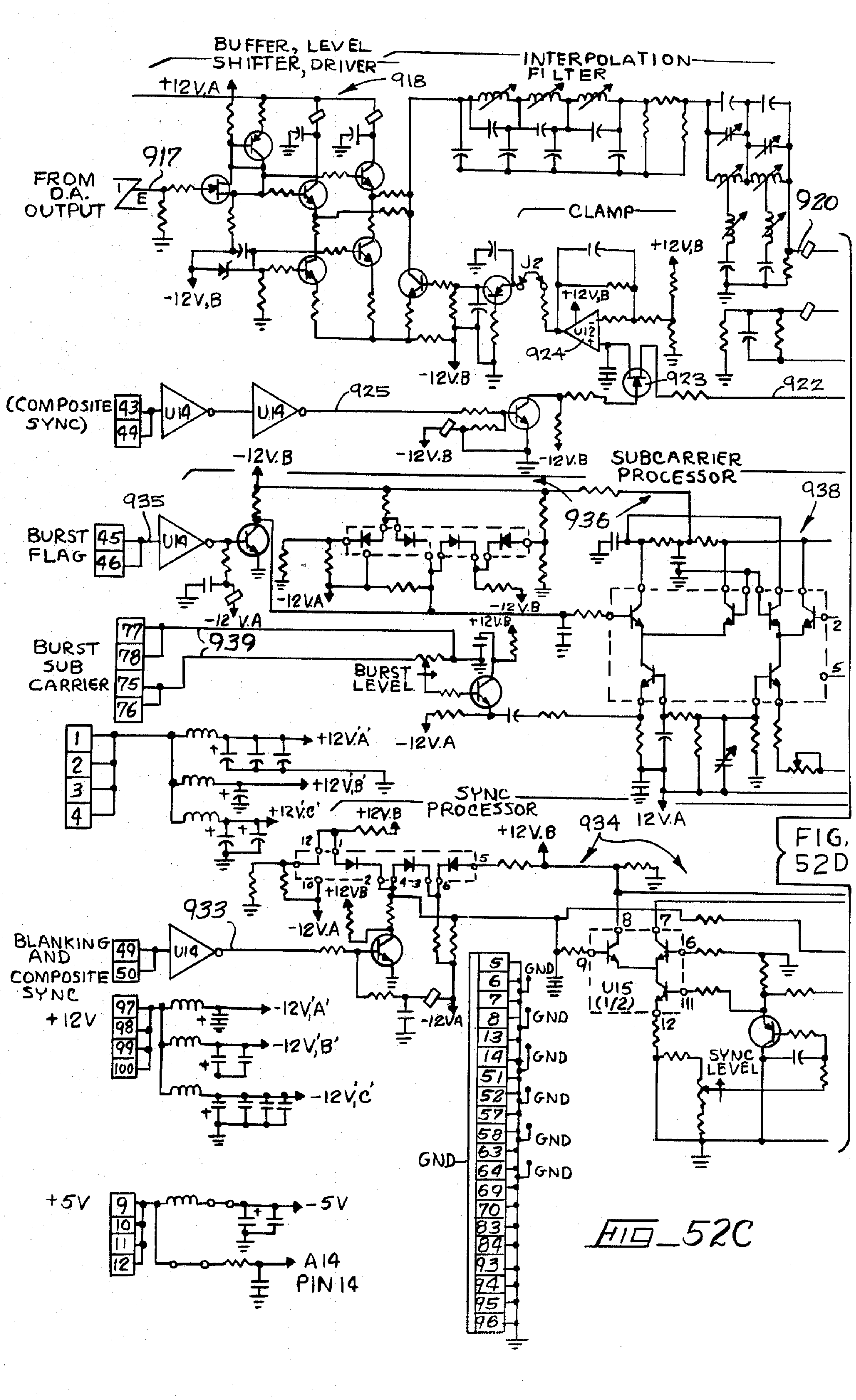
FIG_52C

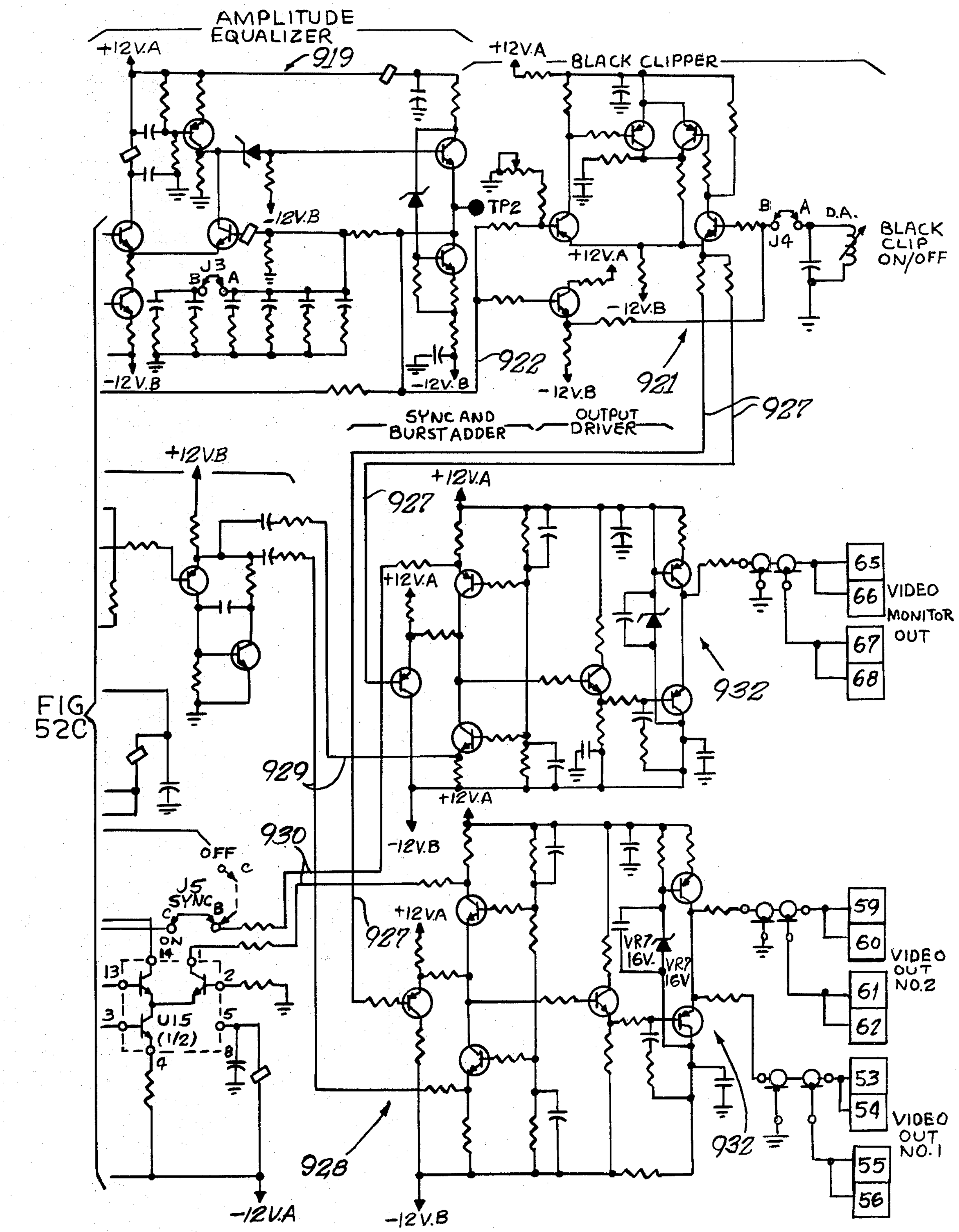
FIG_ 52D

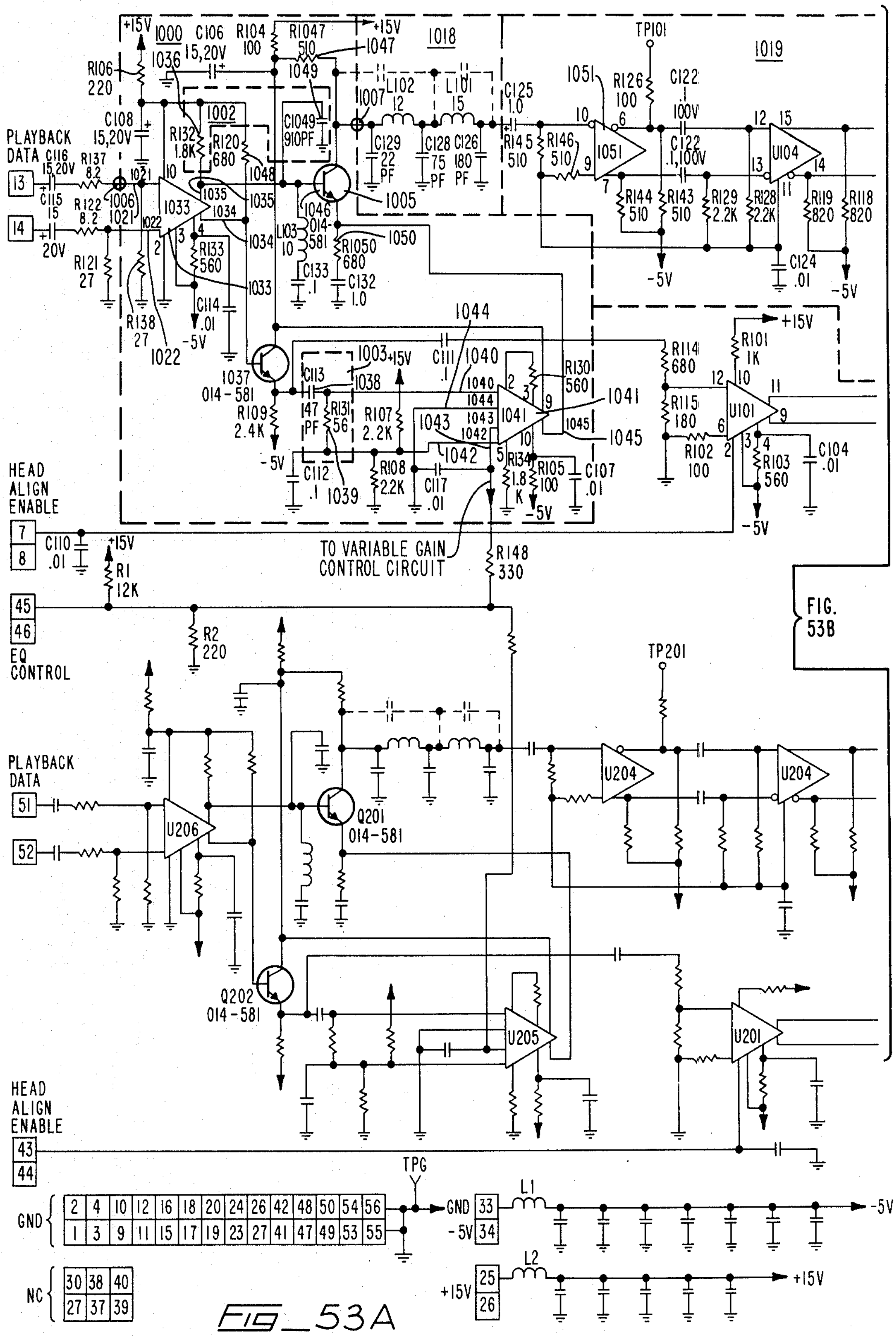
FIG_53A

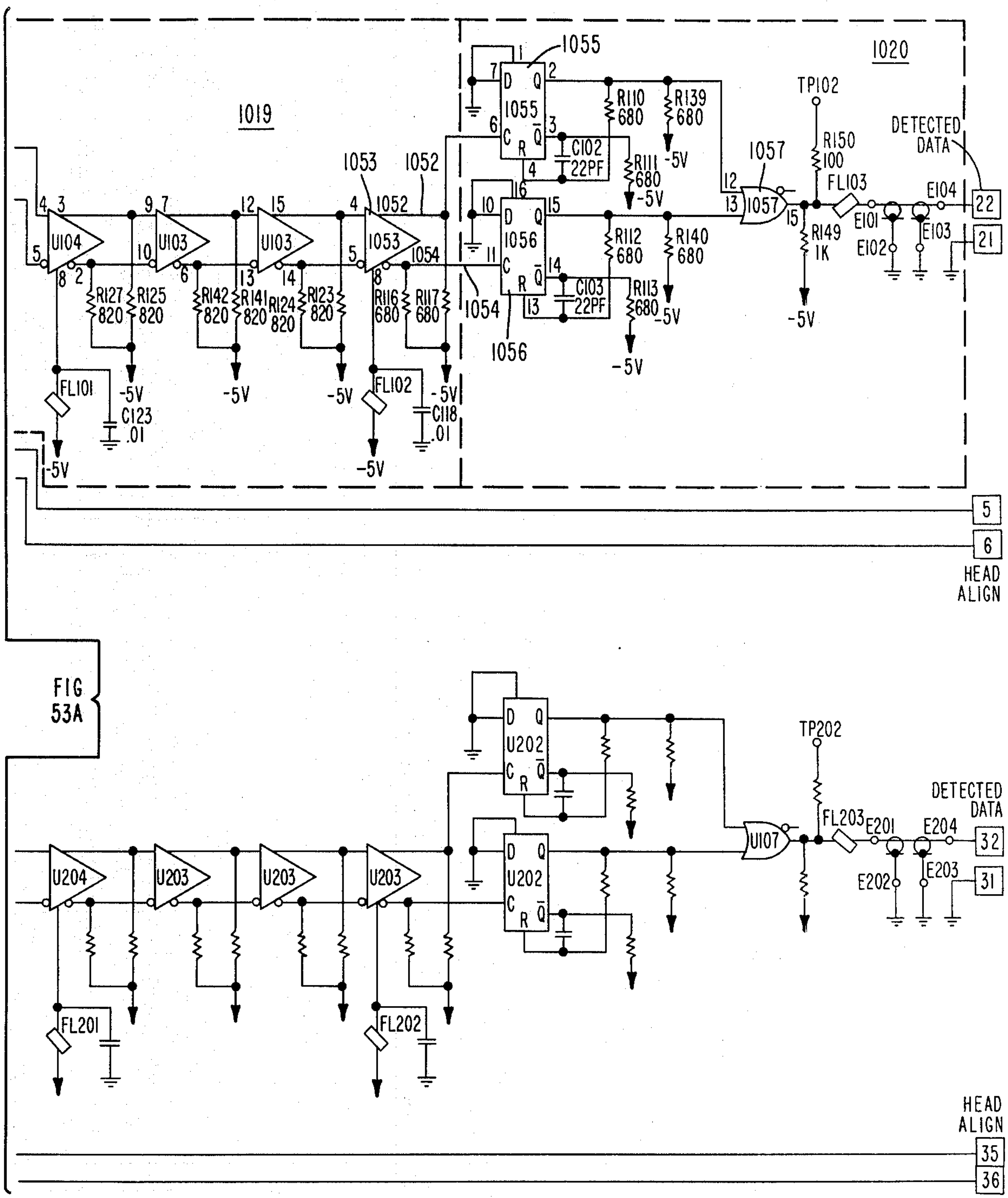
| INTEGRATED CIRCUIT LIST | | | | | |
|---|---|---|---|---|---|
| REFERENCE DESIGNATIONS | U201,U206 U101,U106 | U105,U205 | U203,U204 U103,U104 | U102,U202 | U107 |
| AMPEX P/N | 586-223 | 586-959 | 587-704 | 587-139 | 587-703 |
| VENDOR P/N | CA3004 | MC1496 | MC10116P | MC10131L | MC10105P |
| VOLTAGE (PIN) | – | – | 8 | 8 | 8 |
| GROUND (PIN) | – | 1 | 1, 16 | 1, 16 | 1, 16 |
| REFERENCE DESIGNATION | | | | | | |
|---|---|---|---|---|---|---|
| FIRST | UPPER CHAN | LOWER CHAN | LAST | UPPER CHAN | LOWER CHAN | DELETED |
| C1 | C101 | C201 | C3 | C133 | C233 | C4-100 |
| | FL101 | FL201 | | FL103 | FL203 | C133-200 |
| L1 | L101 | L201 | L2 | L103 | L203 | C220 |
| R1 | R101 | R201 | R2 | R150 | R247 | R3-100 |
| | Q101 | Q201 | | Q102 | Q202 | R151-200 |
| | TP101 | TP201 | | TP102 | TP202 | C127,130 |
| | U101 | U201 | | U107 | U206 | C227,230 |
FIG_53B

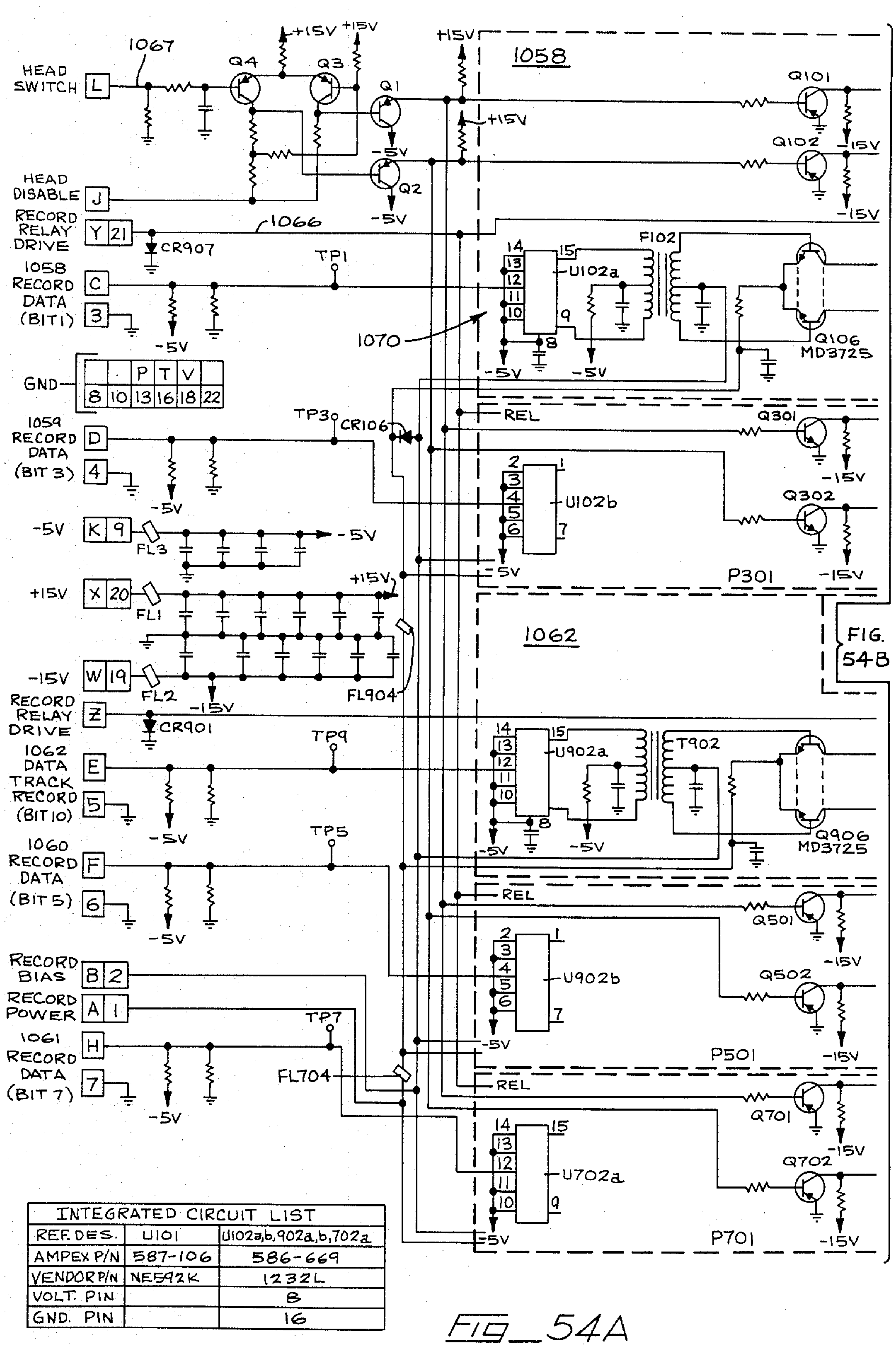
| INTEGRATED CIRCUIT LIST | | |
|---|---|---|
| REF. DES. | U101 | U102a,b, 902a,b, 702a |
| AMPEX P/N | 587-106 | 586-669 |
| VENDOR P/N | NE592K | 1232L |
| VOLT. PIN | | 8 |
| GND. PIN | | 16 |
FIG_54A

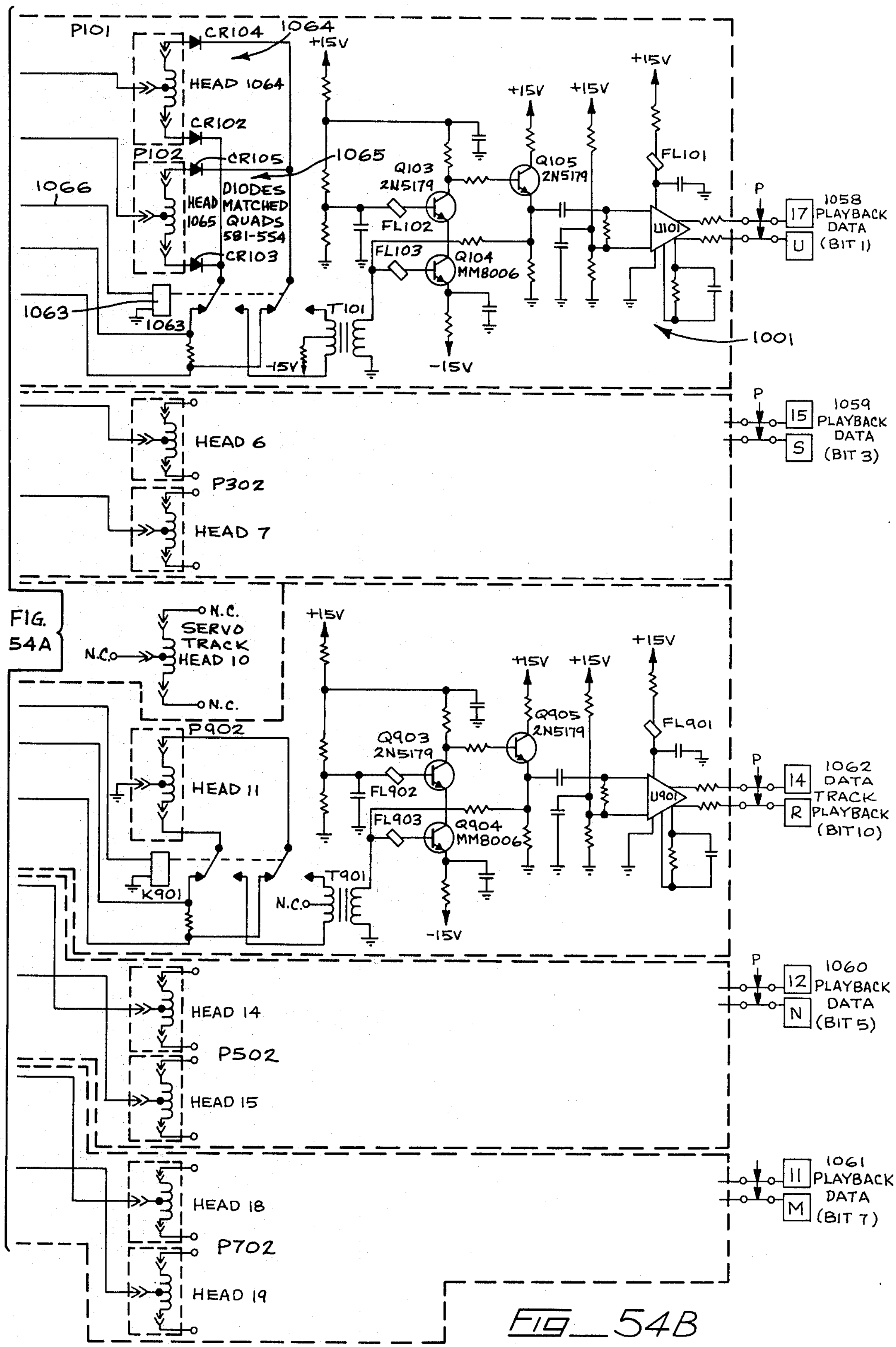
FIG_54B

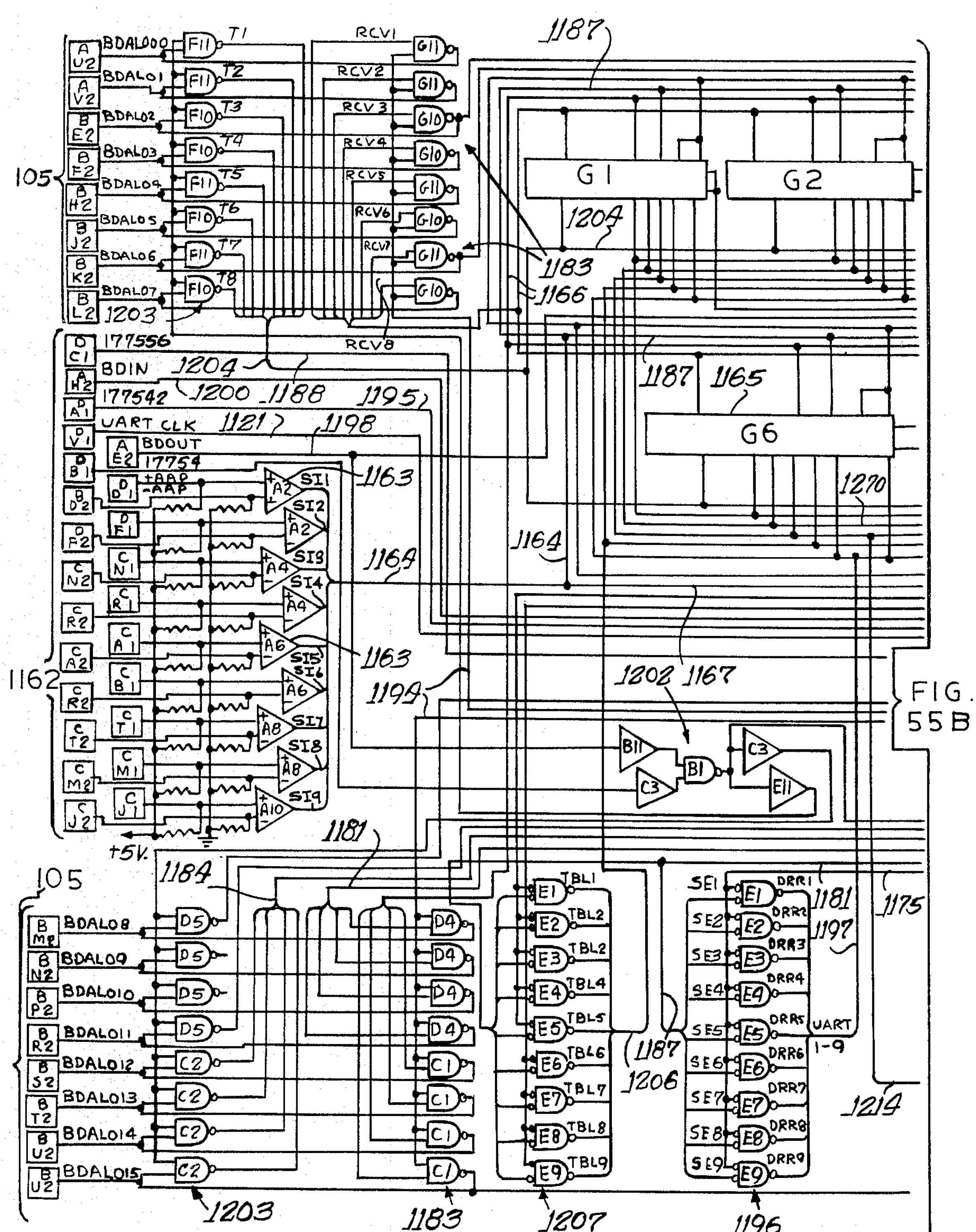
| INTEGRATED CIRCUIT LIST | | | | | | | | |
|---|---|---|---|---|---|---|---|---|
| REFERENCE DESIGNATIONS | B1, B9 C2, D5, E10 | A11 C1 D9 G10 D4 G11 | D8 C3 C9 E11 | B2-B4 B6-B8 B10-D10 | E1-19 | B3, B7 C10 | C7, D6 D11 | C6, C8 D7 |
| AMPEX P/N | 586-179 | 586-581 | 586-451 | 586-175 | 586-918 | 587-082 | 587-027 | 587200 |
| VENDOR P/N | 7400 | 7403 | 7404 | 7474 | 7432 | 7408 | 74121 | 7145133 |
| VOLTAGE PIN | 14 | 14 | 14 | 14 | 14 | 14 | 14 | 16 |
| GROUND PIN | 7 | 7 | 7 | 7 | 7 | 7 | 7 | 8 |
FIG_55A

| C5 | D1 | D-2-C4 | C11 | A2-A6 A4-A10 A8 | A1-A5 A3-A9 A7 | D3 | G1-9 | B5 F10,11 | B11 |
|---|---|---|---|---|---|---|---|---|---|
| 587-413 | 586-912 | 586-925 | 586-174 | 589-087 | 587-120 | 586-903 | 587-257 | 587-510 | 587-533 |
| 74147 | 74154 | 74175 | 7410 | 75115 | 75114 | 74157 | TR1402A | 74LS00 | 74S00 |
| 16 | 24 | 16 | 4 | 16 | 16 | 16 | +5 -12 34 2 | 14 | 14 |
| 8 | 12 | 8 | 7 | 8 | 8 | 8 | 3,39 | 7 | 7 |

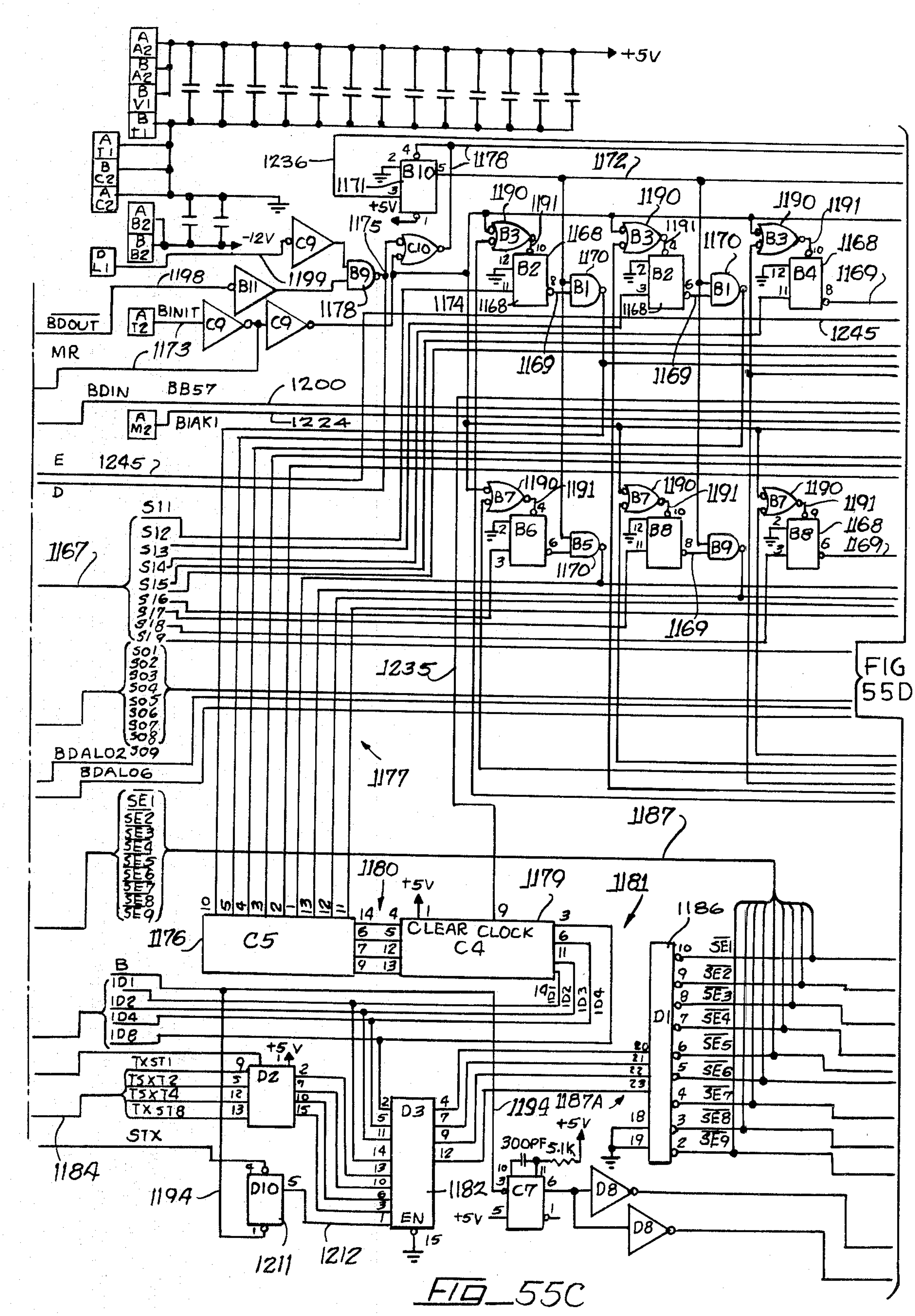
FIG_55C

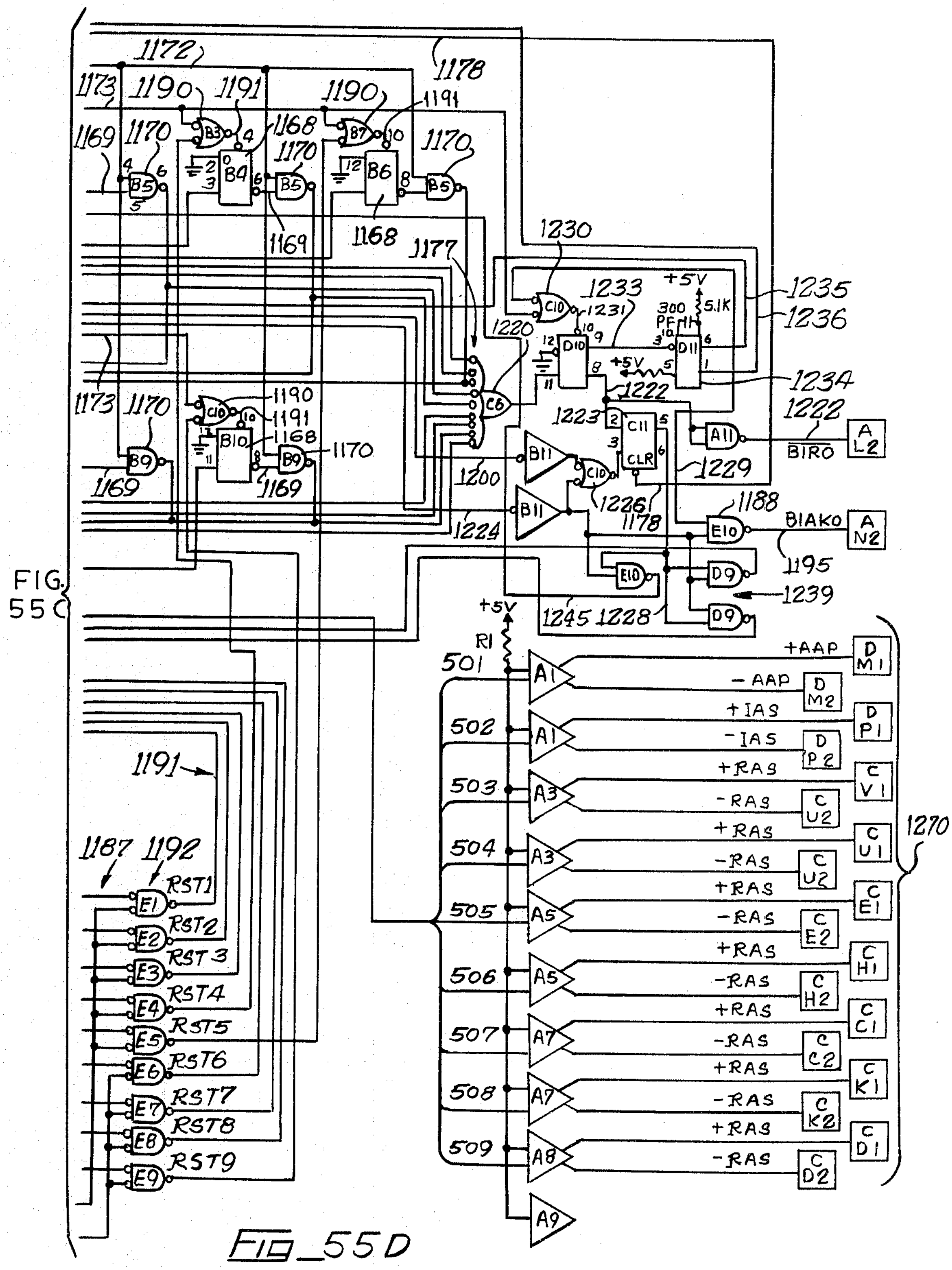
FIG_55D

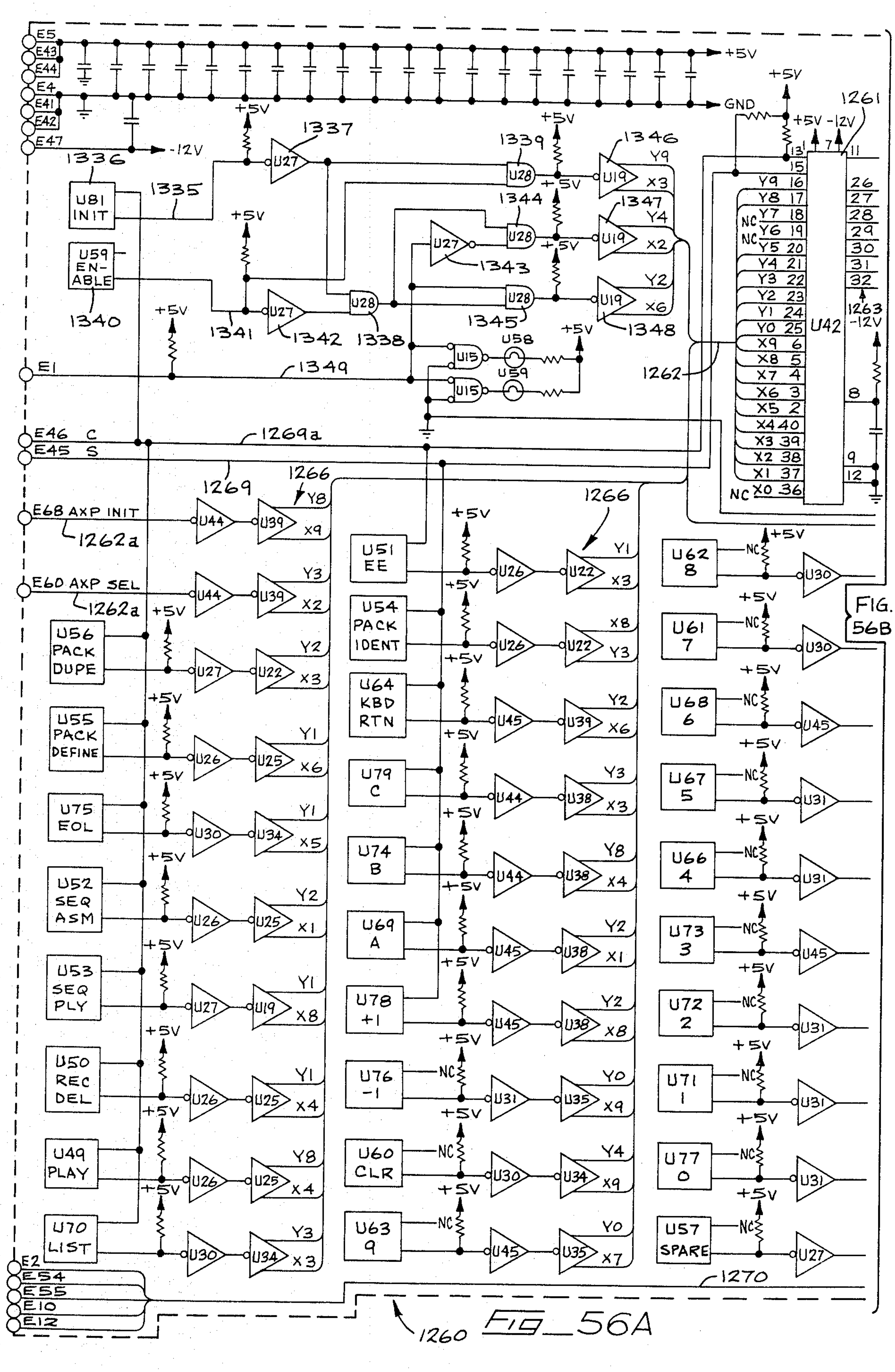
FIG_56A

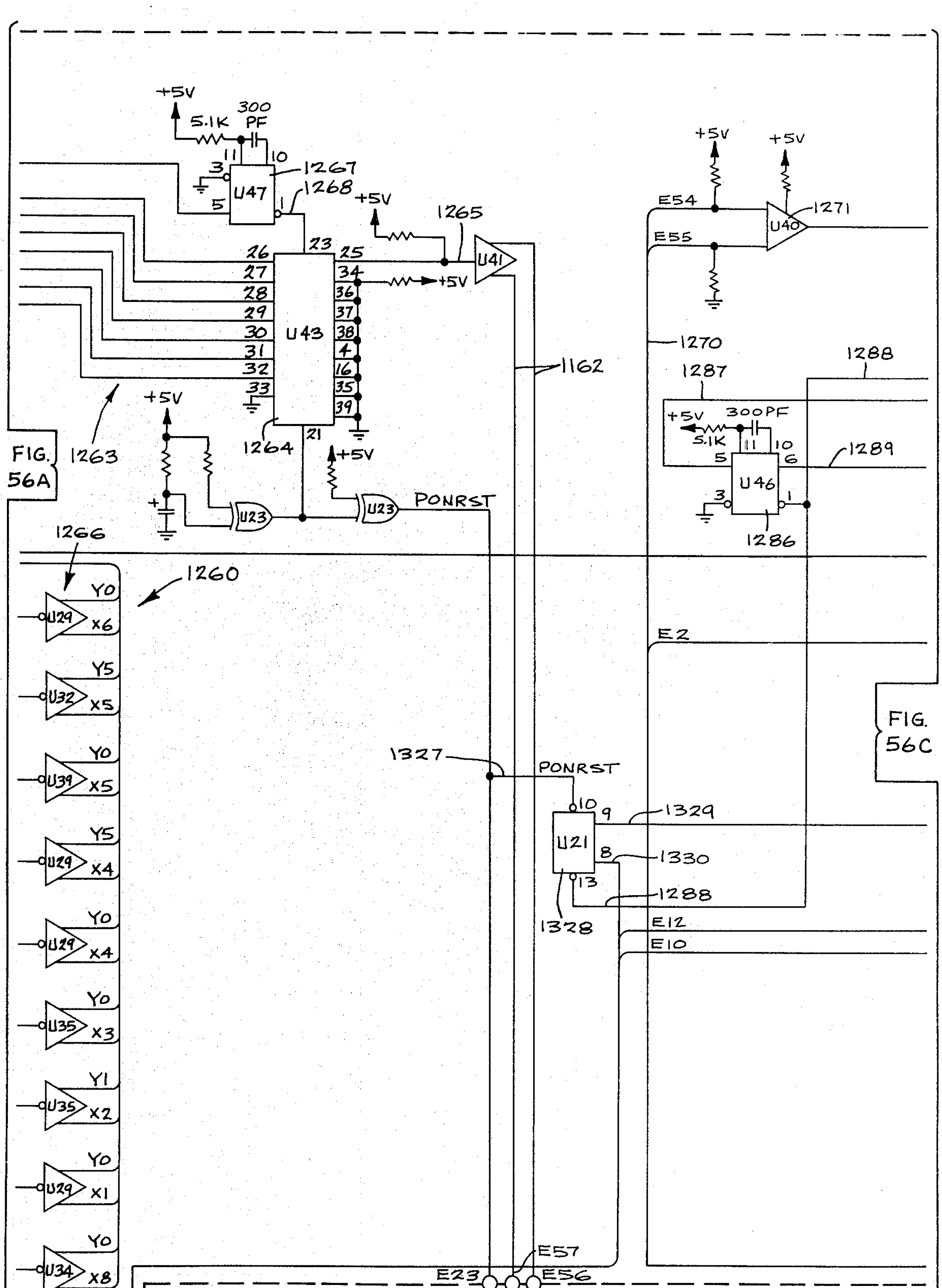
| REF. DESIG. | U48 | U16 | U8,20,24 26,27,30,31 37,38,44,45 | U6, 28 | U18 | U2, 21 | U23 | U46, 47 | U4 | U7 | U1,3 5,17 | U41 |
|---|---|---|---|---|---|---|---|---|---|---|---|---|
| AMPEX P/N | | | | | | | | | | | | |
| VENDOR P/N | 7470 | 7400 | 7404 | 7408 | 7410 | 7474 | 7486 | 74121 | 74154 | 74175 | 74193 | 75114 |
| VOLT. PIN | 14 | 14 | 14 | 14 | 14 | 14 | 14 | 14 | 24 | 16 | 16 | 16 |
| GND PIN | 7 | 7 | 7 | 7 | 7 | 7 | 7 | 7 | 12 | 8 | 8 | 8 |
FIG_56B

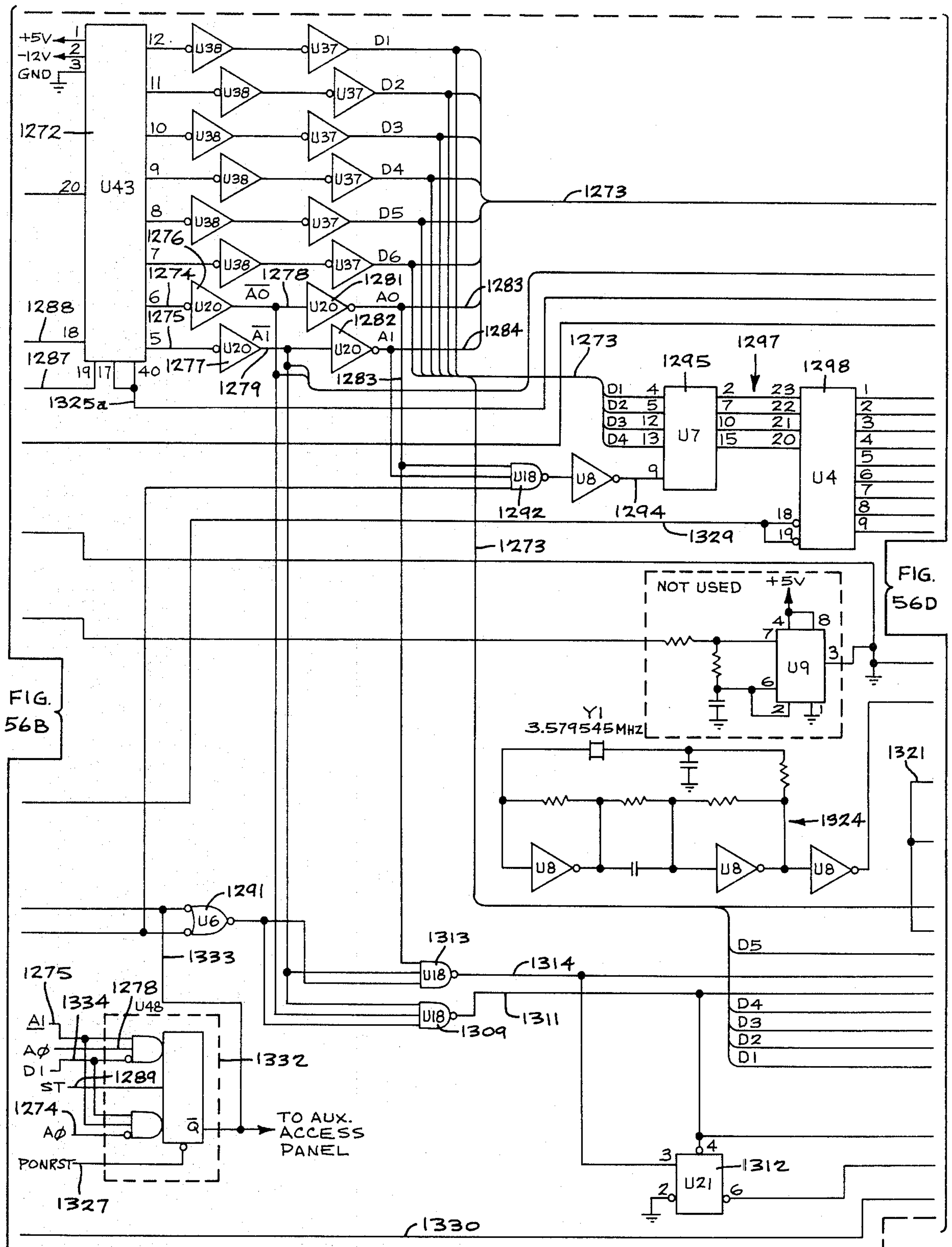
| U40 | U10,11,12,13,14,15 | U9 | U43 | U19,22,25,29,32,34,35,36,39 | U33 | U42 | U49,50,51,52,53,54,55,56,57,59 | U60,61,62,63,64,66,67,68,69,70,71,72,73,74,75,76,77,78,79,80,81 | U65 | U58 | U80,82 |
|---|---|---|---|---|---|---|---|---|---|---|---|
| | | 5 | | | | | | | | | |
| 75115 | LM351 | LM555 | TR1402A | 4066 | 82S09 | EA2007A | 201SN1A1 | 101SN11 | 101SN53 | 201SN501 | 101SN55 |
| 16 | 8 | 8 | (1+5)(2-12) | 14 | 28 | (1+5)(7-12) | 1 | 1 | 1 | 1 | 1 |
| 8 | 4 | 1 | 3 | 7 | 14 | | 4 | 4 | 4 | 4 | 4 |
FIG_56C

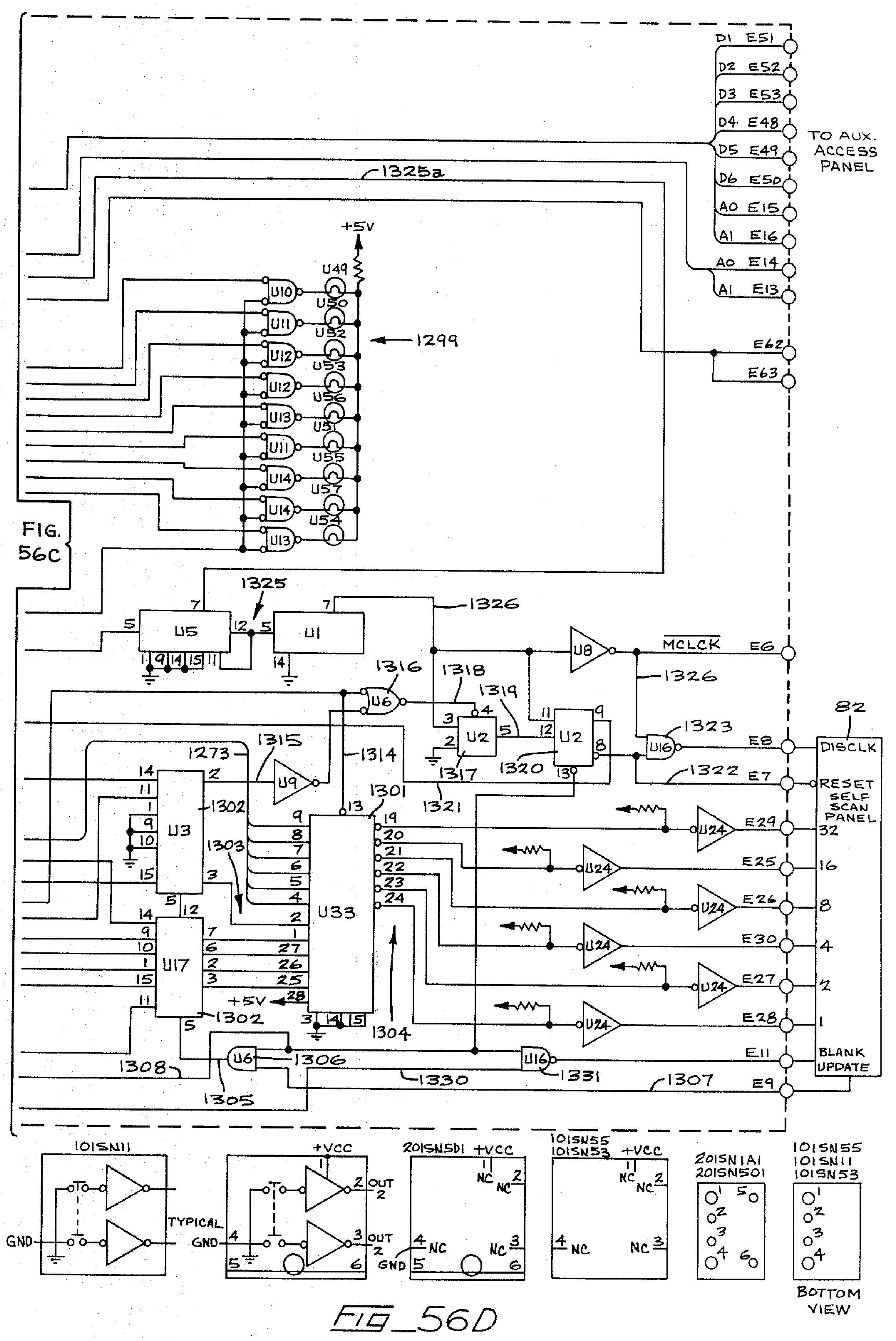
FIG_56D

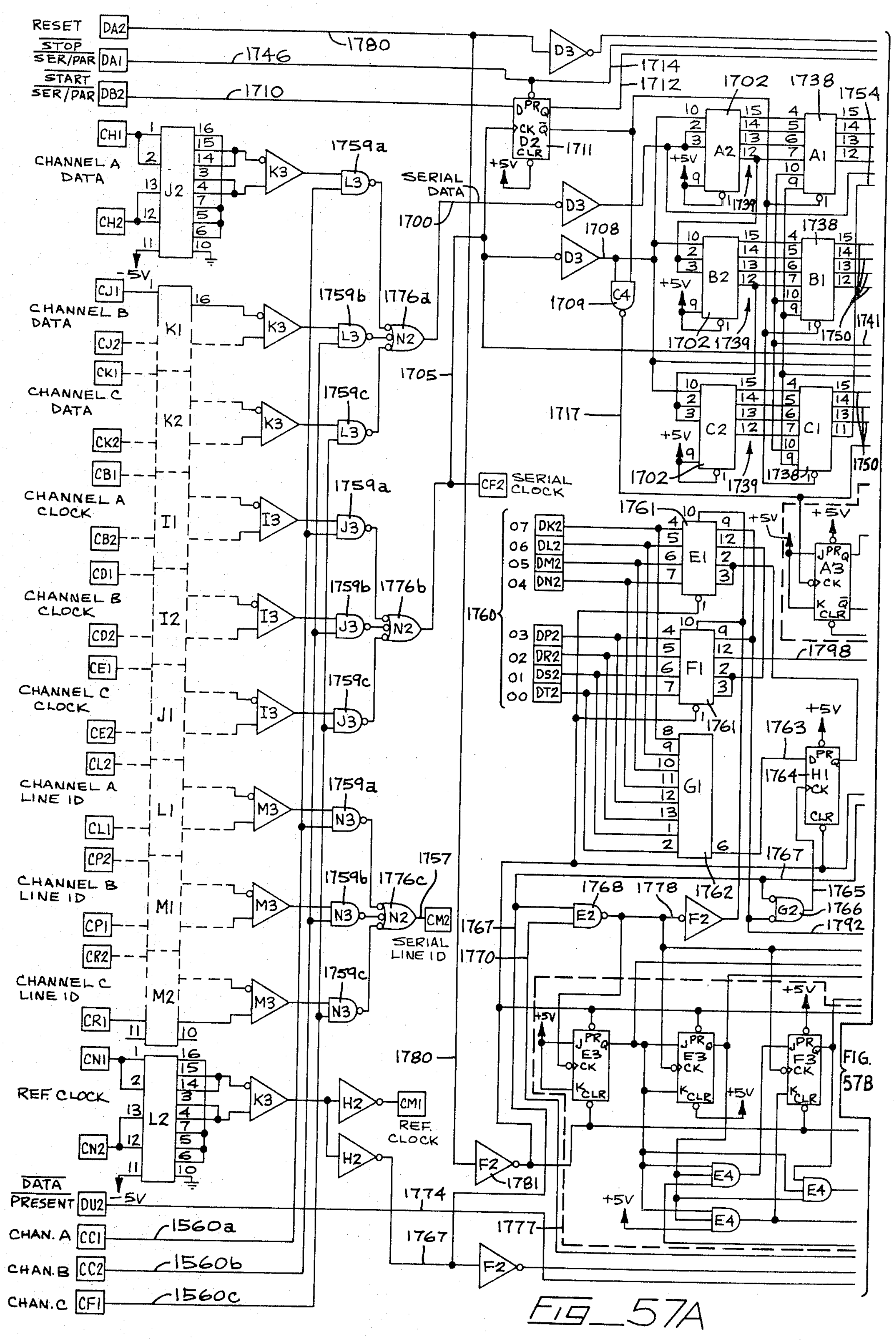
FIG_57A

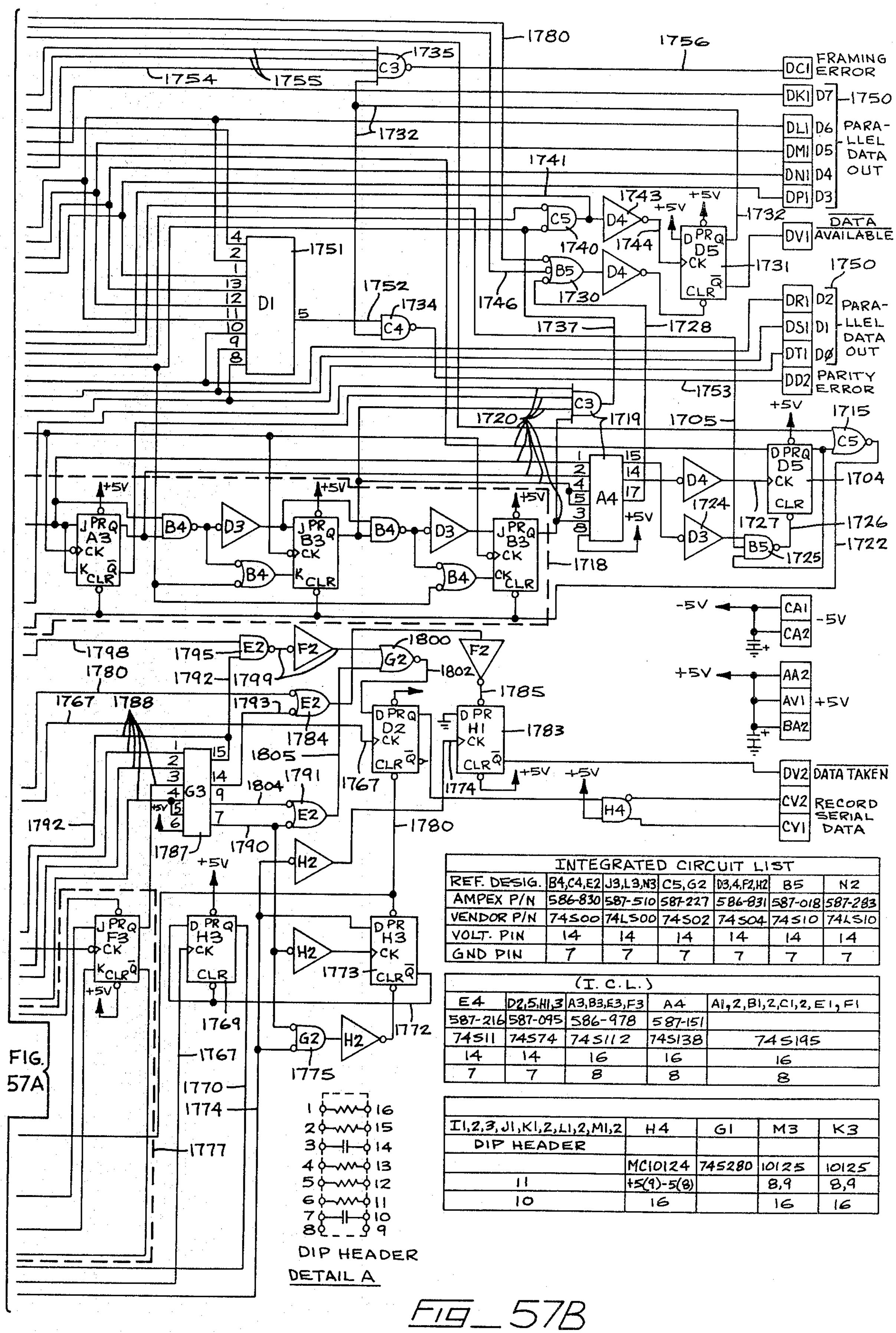
| INTEGRATED CIRCUIT LIST | | | | | | |
|---|---|---|---|---|---|---|
| REF. DESIG. | B4,C4,E2 | J3,L3,N3 | C5,G2 | D3,4,F2,H2 | B5 | N2 |
| AMPEX P/N | 586-830 | 587-510 | 587-227 | 586-831 | 587-018 | 587-283 |
| VENDOR P/N | 74S00 | 74LS00 | 74S02 | 74S04 | 74S10 | 74LS10 |
| VOLT. PIN | 14 | 14 | 14 | 14 | 14 | 14 |
| GND PIN | 7 | 7 | 7 | 7 | 7 | 7 |
(I. C. L.)
| E4 | D2,5,H1,3 | A3,B3,E3,F3 | A4 | A1,2,B1,2,C1,2,E1,F1 |
|---|---|---|---|---|
| 587-216 | 587-095 | 586-978 | 587-151 | |
| 74S11 | 74S74 | 74S112 | 74S138 | 74S195 |
| 14 | 14 | 16 | 16 | 16 |
| 7 | 7 | 8 | 8 | 8 |
| I1,2,3,J1,K1,2,L1,2,M1,2 DIP HEADER | H4 | G1 | M3 | K3 |
|---|---|---|---|---|
| | MC10124 | 74S280 | 10125 | 10125 |
| 11 | +5(9)-5(8) | | 8,9 | 8,9 |
| 10 | 16 | | 16 | 16 |
FIG_57B

| REFERENCE DESIGNATION | C3 | B8, C8, D7 D9, E6, 7, 9. |
|---|---|---|
| AMPEX PART NO. | 586-075 | 586-581 |
| VENDOR PART NO. | 7400 | 7403 |
| VOLTAGE PIN | 14 | 14 |
| GROUND PIN | 7 | 7 |

FIG_ 58A

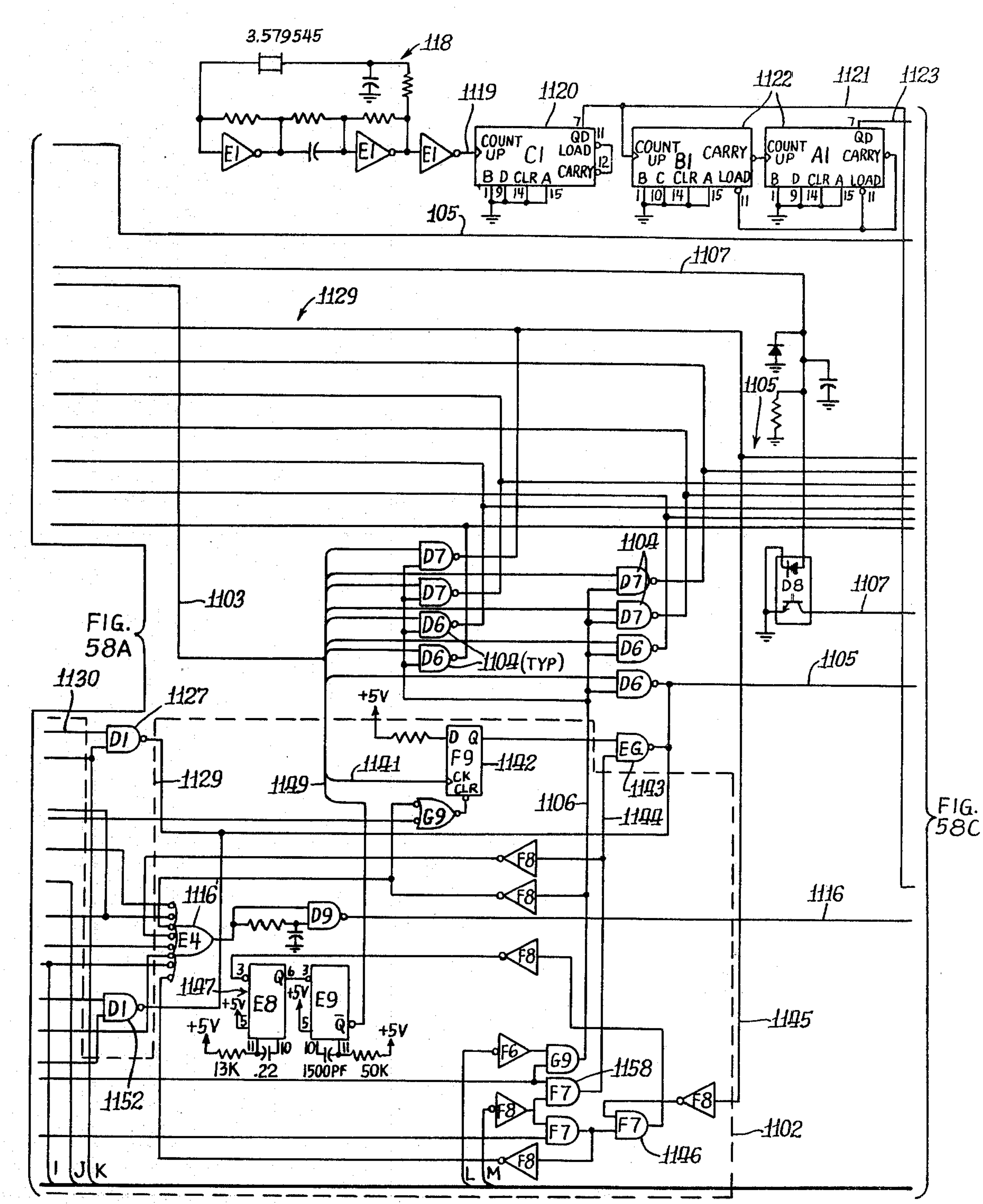
I. C. LIST
| E1, D2, F6 | A5,6,7,8, A9, F5 | C6,7,D3,5, E5,F7,G9 | D4 | A3, B3, A4, B4 | E3, C4, U1 | E2, F2 | F3, G3 F4, E8 | E4 | A2, C2 | B5, B6, B7 | A1, B1, C1, U3 | D8 |
|---|---|---|---|---|---|---|---|---|---|---|---|---|
| 586-328 | 586-743 | 586-759 | 586-918 | | 586-108 | 586-492 | 586-533 | 587-200 | 586-192 | 586,924 | | |
| 7404 | 74L04 | 7408 | 7432 | MC7472 | 7474 | 7496 | 74121 | 74133 | 74154 | 74174 | 74193 | 4N26 |
| 14 | 14 | 14 | 14 | | 14 | 5 | 14 | 16 | 24 | 16 | 16 | |
| 7 | 7 | 7 | 7 | | 7 | 12 | 7 | 8 | 12 | 8 | 8 | 2,4 |
FIG_58B

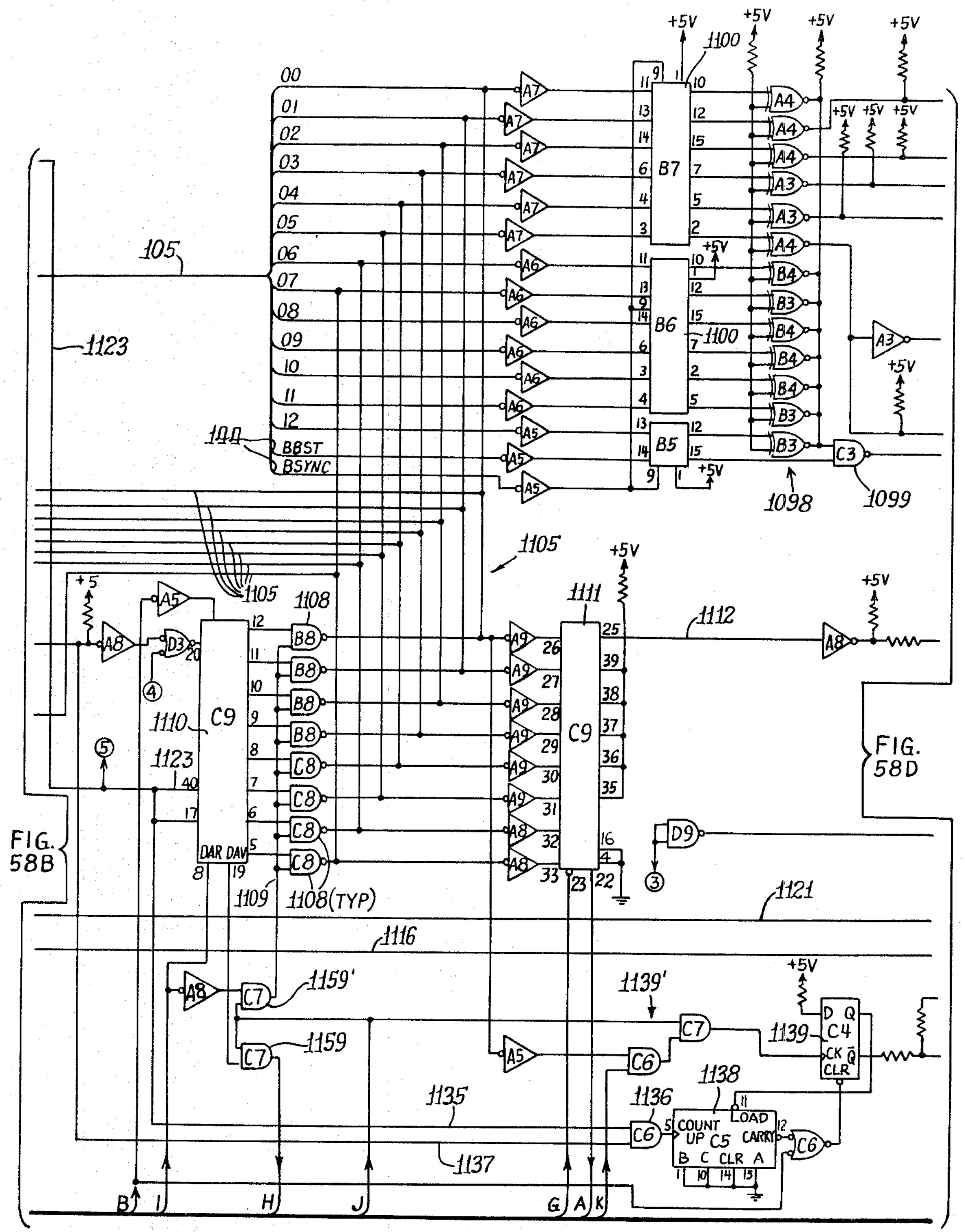
| I. C. LIST CON'T. | | | | |
|---|---|---|---|---|
| REFERENCE DESIGNATIONS | U1 | U2 | U3 | U4 |
| AMPEX PART NUMBER | 7474 | 74165 | 74193 | 7403 |
| VENDOR PART NUMBER | | | | |
| VOLTAGE PIN | | | | |
| GROUND PIN | | | | |
FIG_58C

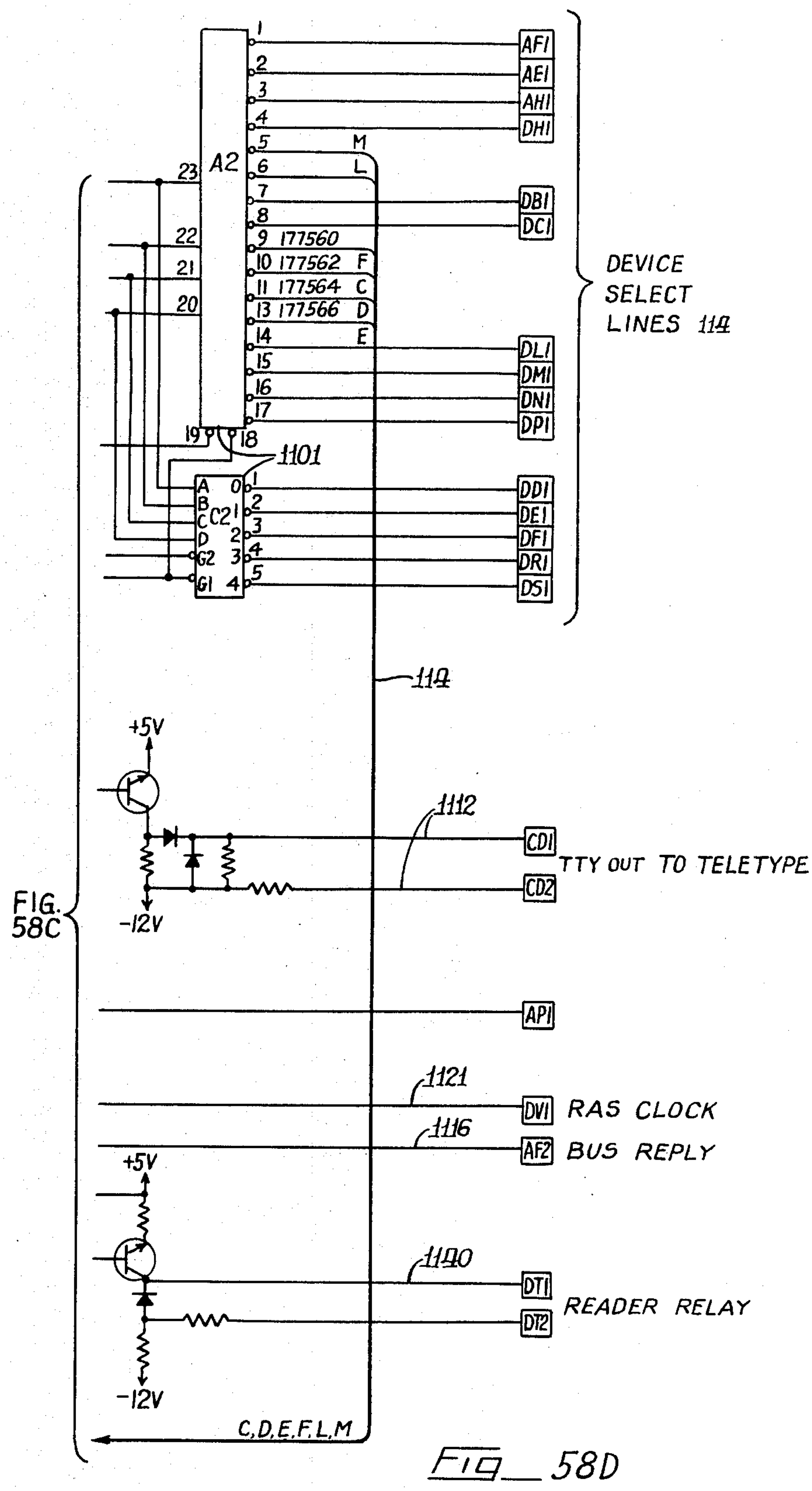
FIG_58D

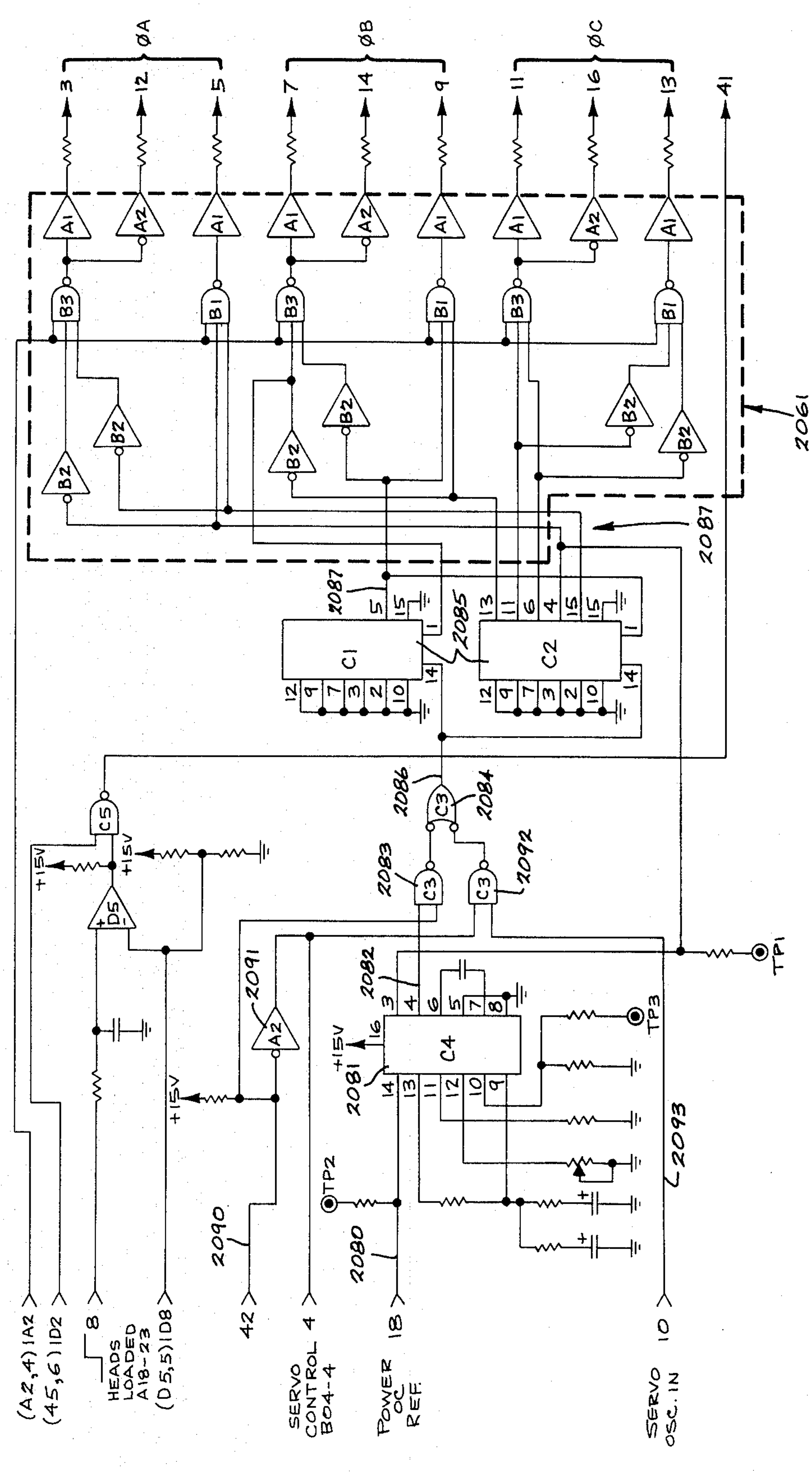
INTEGRATED CIRCUIT LIST
| REF. DESIG. | A1 | A2,5 B2 | A6,B5 | B1,3 | B6,C6 | C1,C2 | C3,5 | C4 | D5 |
|---|---|---|---|---|---|---|---|---|---|
| AMPEX P/N | 587-303 | 587-322 | 587-446 | 587-449 | 589-019 | 587-972 | 589-319 | 587-428 | 580-715 |
| VENDOR P/N | CD4050 | CD4049 | CD4013 | CD4023 | 74C221 | CD4018 | CD4011 | CD4046 | MC3302 |
| VOLT. PIN | 16 | 16 | 14 | 14 | 16 | 16 | 14 | 16 | 3 |
| GND. PIN | 8 | 8 | 7 | 7 | 8 | 8 | 7 | 8 | 12 |
FIG_59A

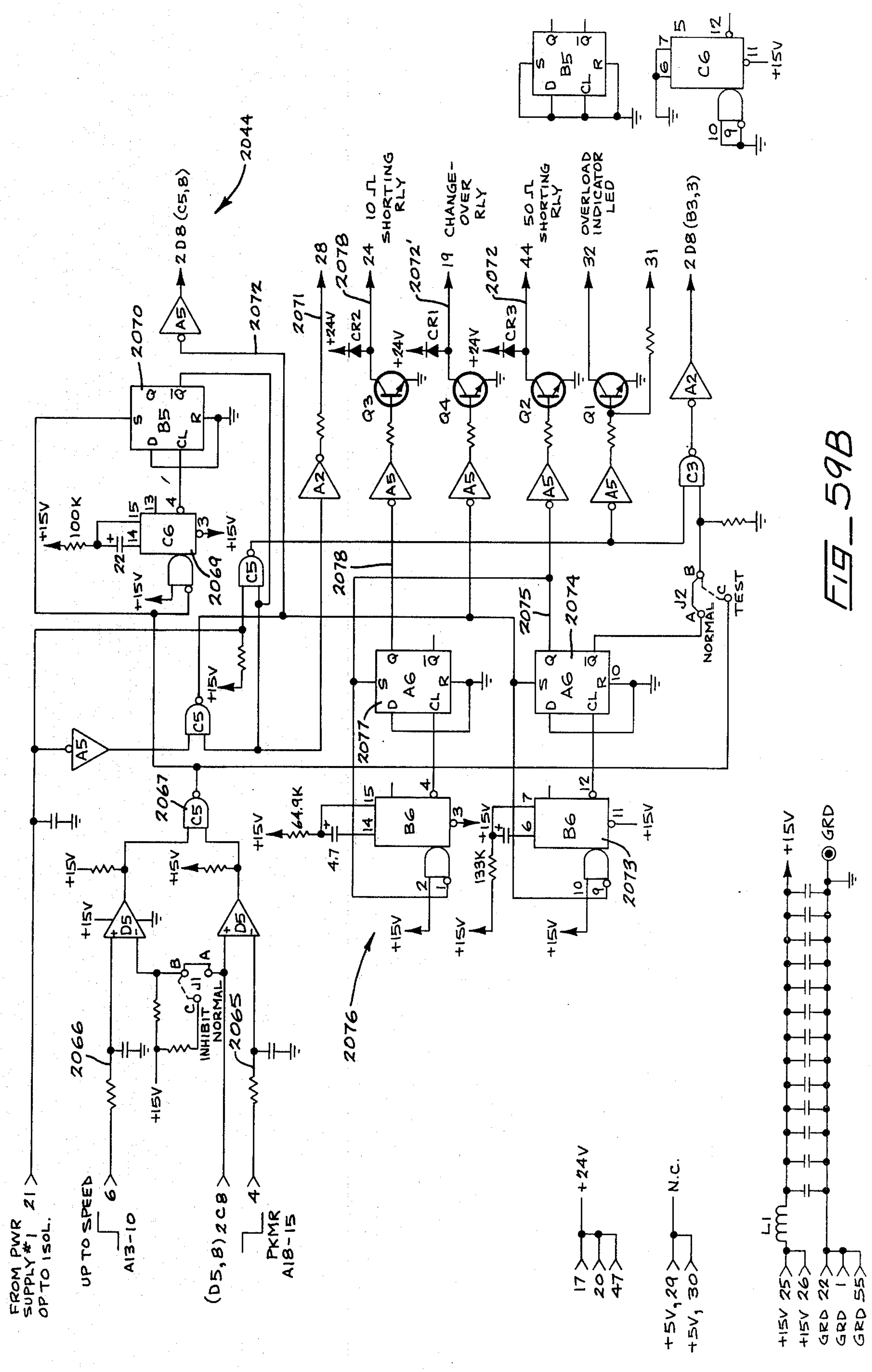
FIG_59B

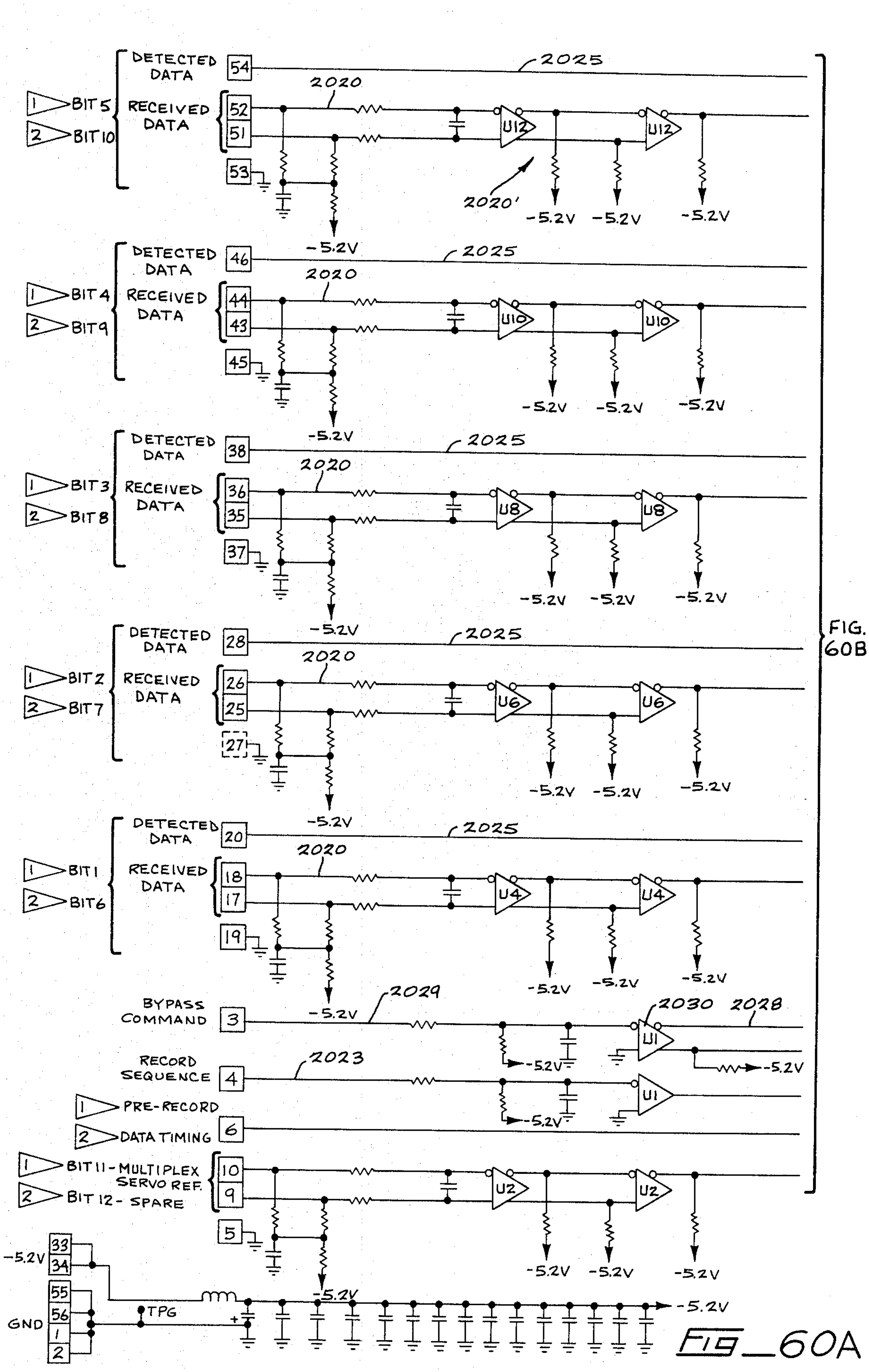
FIG_60A

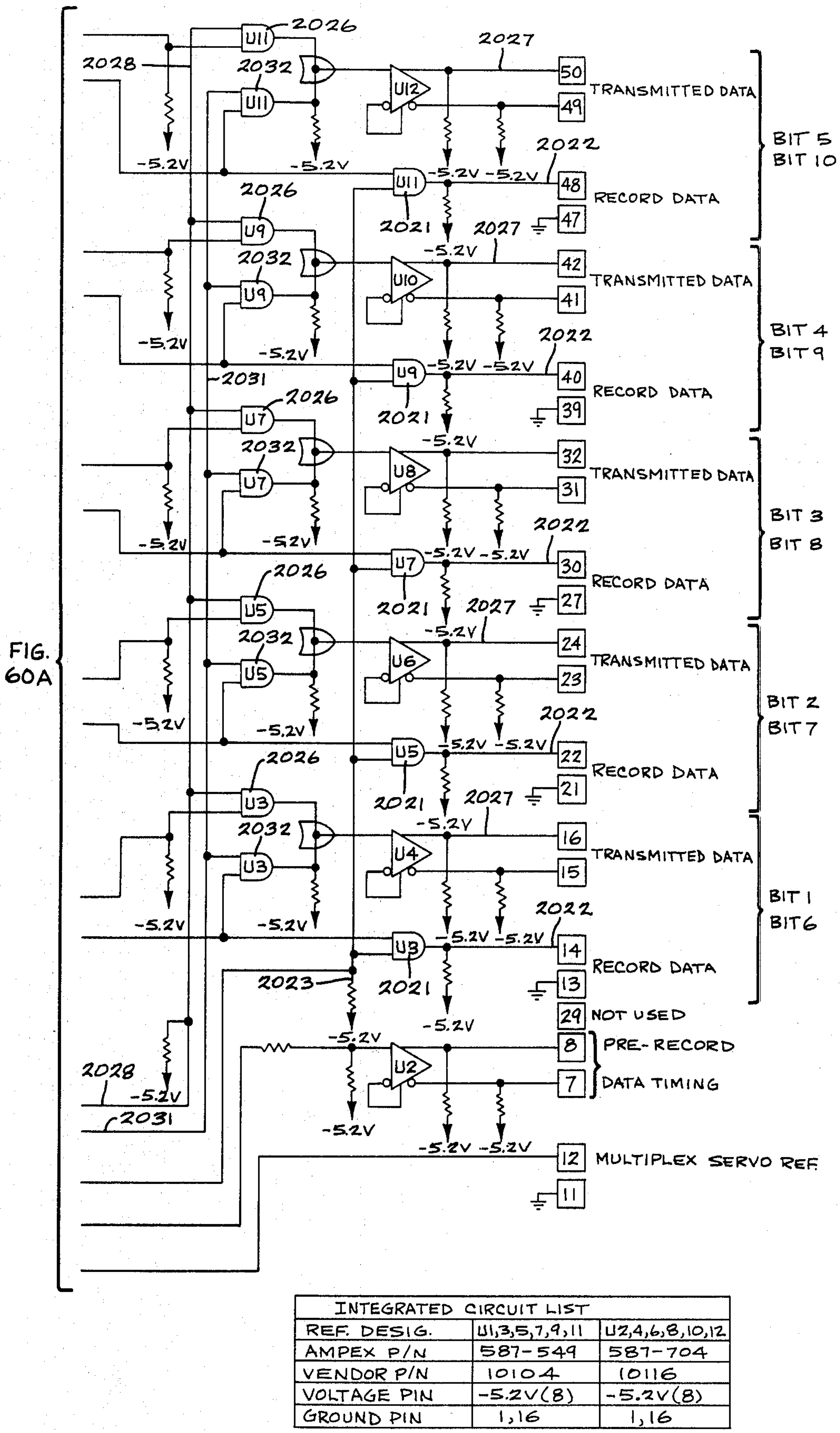
| INTEGRATED CIRCUIT LIST | | |
|---|---|---|
| REF. DESIG. | U1,3,5,7,9,11 | U2,4,6,8,10,12 |
| AMPEX P/N | 587-549 | 587-704 |
| VENDOR P/N | 10104 | 10116 |
| VOLTAGE PIN | -5.2V(8) | -5.2V(8) |
| GROUND PIN | 1,16 | 1,16 |
FIG_60B

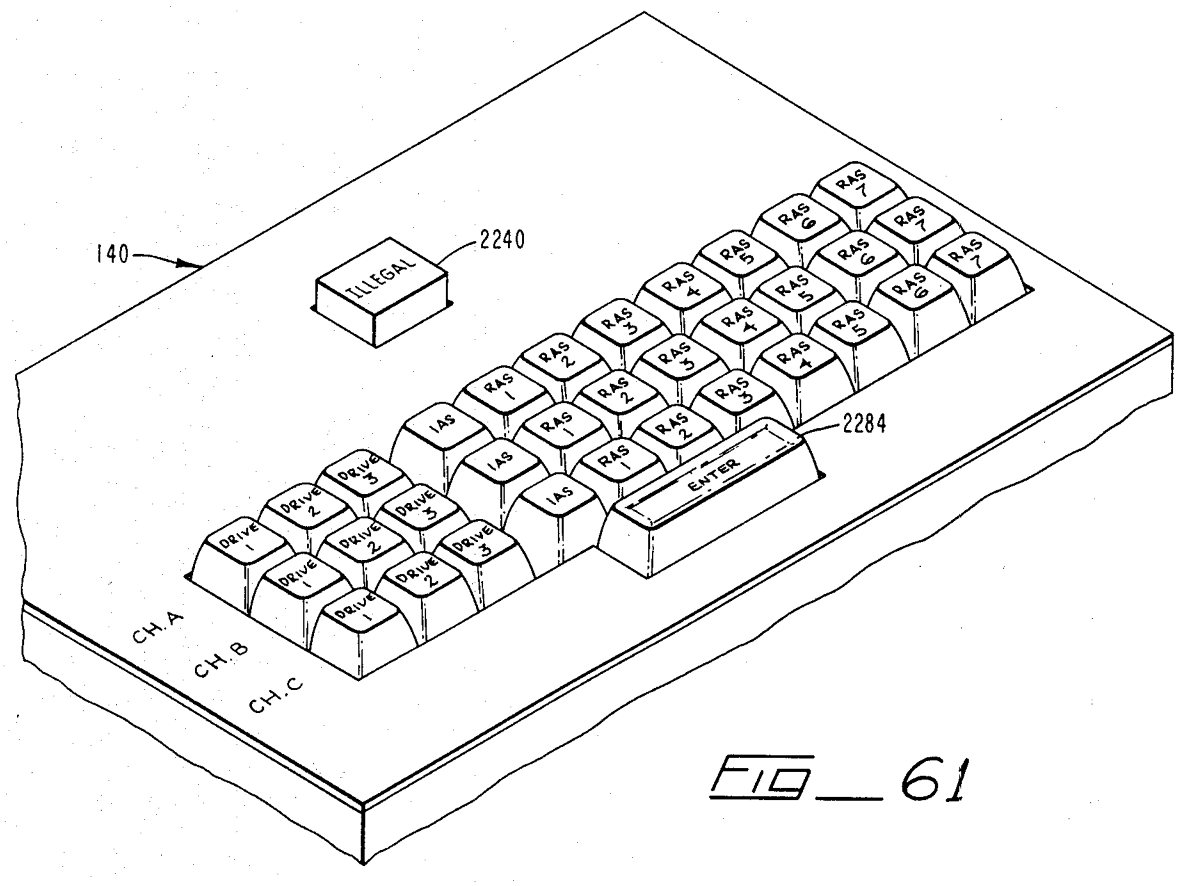
FIG_61

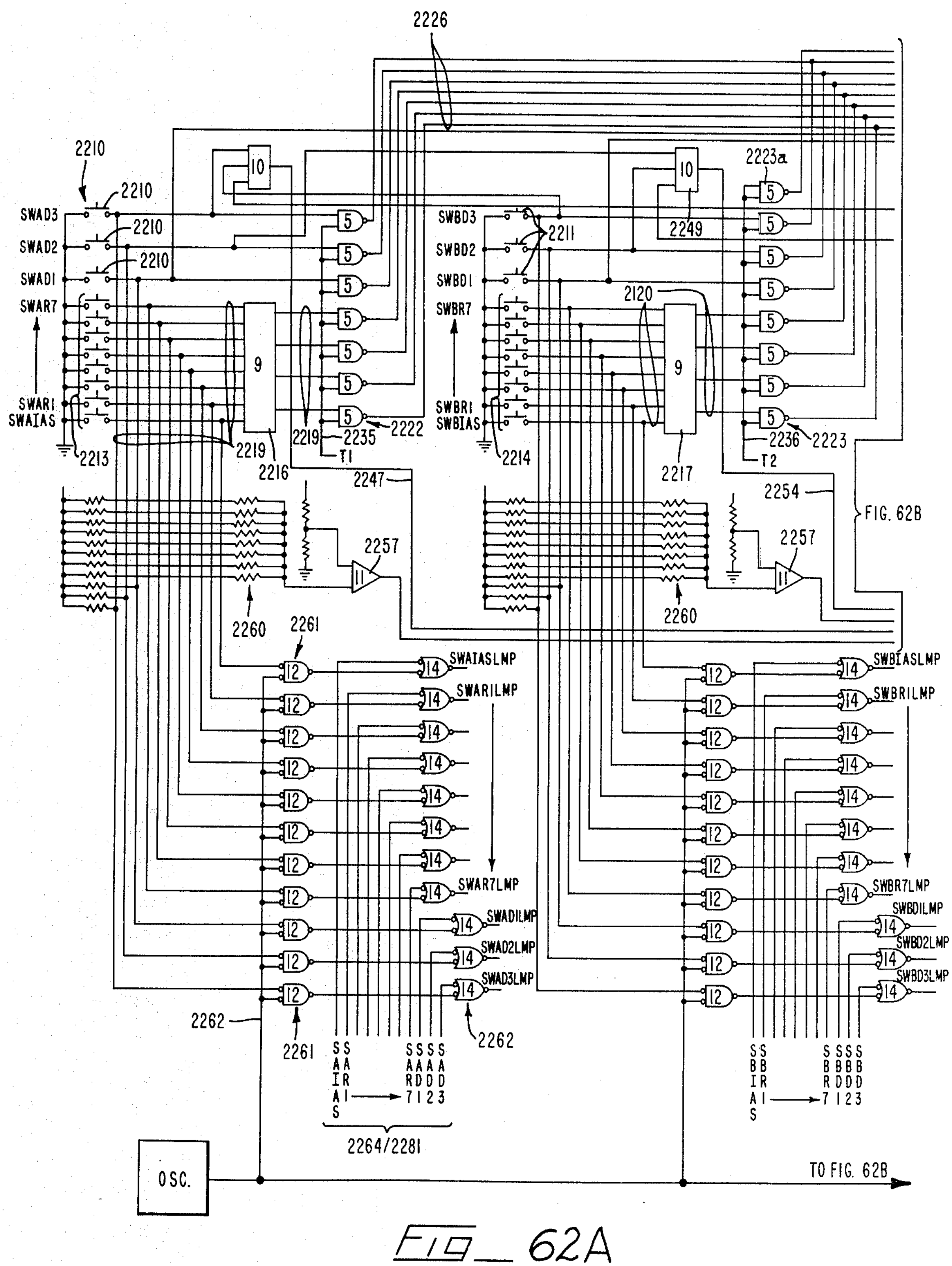
FIG_62A

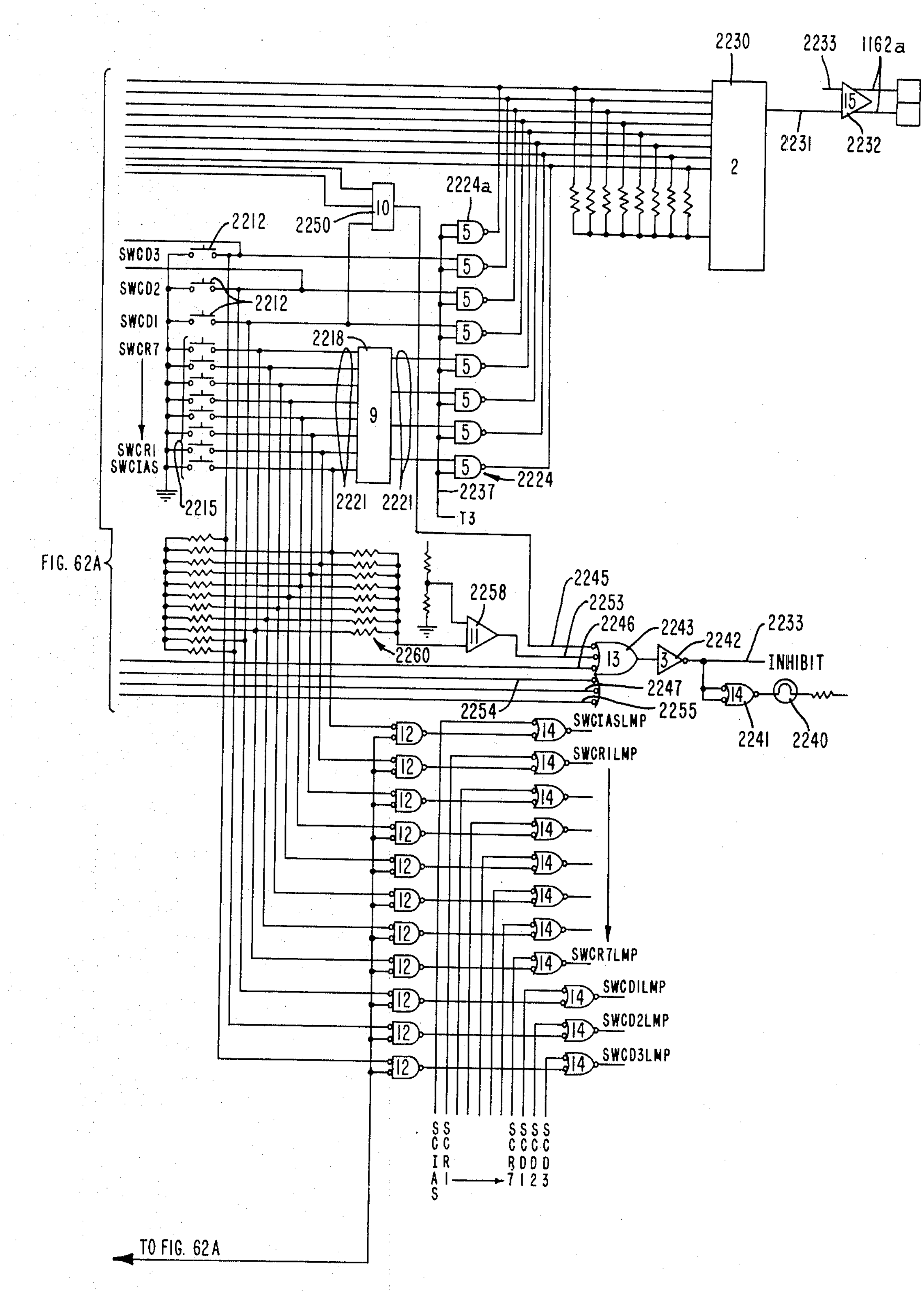
FIG_ 62B

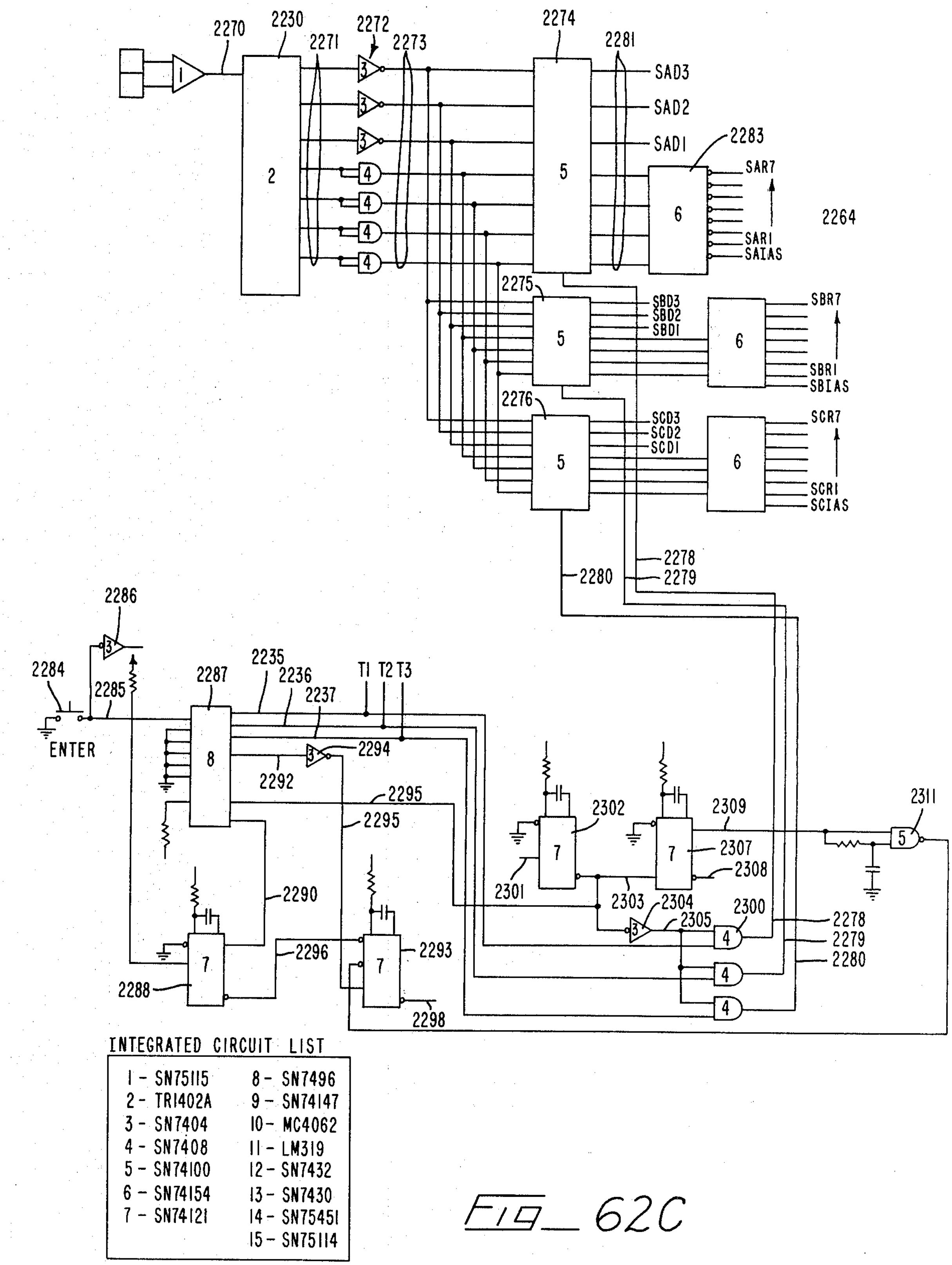
INTEGRATED CIRCUIT LIST
| | |
|---|---|
| 1 - SN75115 | 8 - SN7496 |
| 2 - TR1402A | 9 - SN74147 |
| 3 - SN7404 | 10 - MC4062 |
| 4 - SN7408 | 11 - LM319 |
| 5 - SN74100 | 12 - SN7432 |
| 6 - SN74154 | 13 - SN7430 |
| 7 - SN74121 | 14 - SN75451 |
| | 15 - SN75114 |
FIG_ 62C

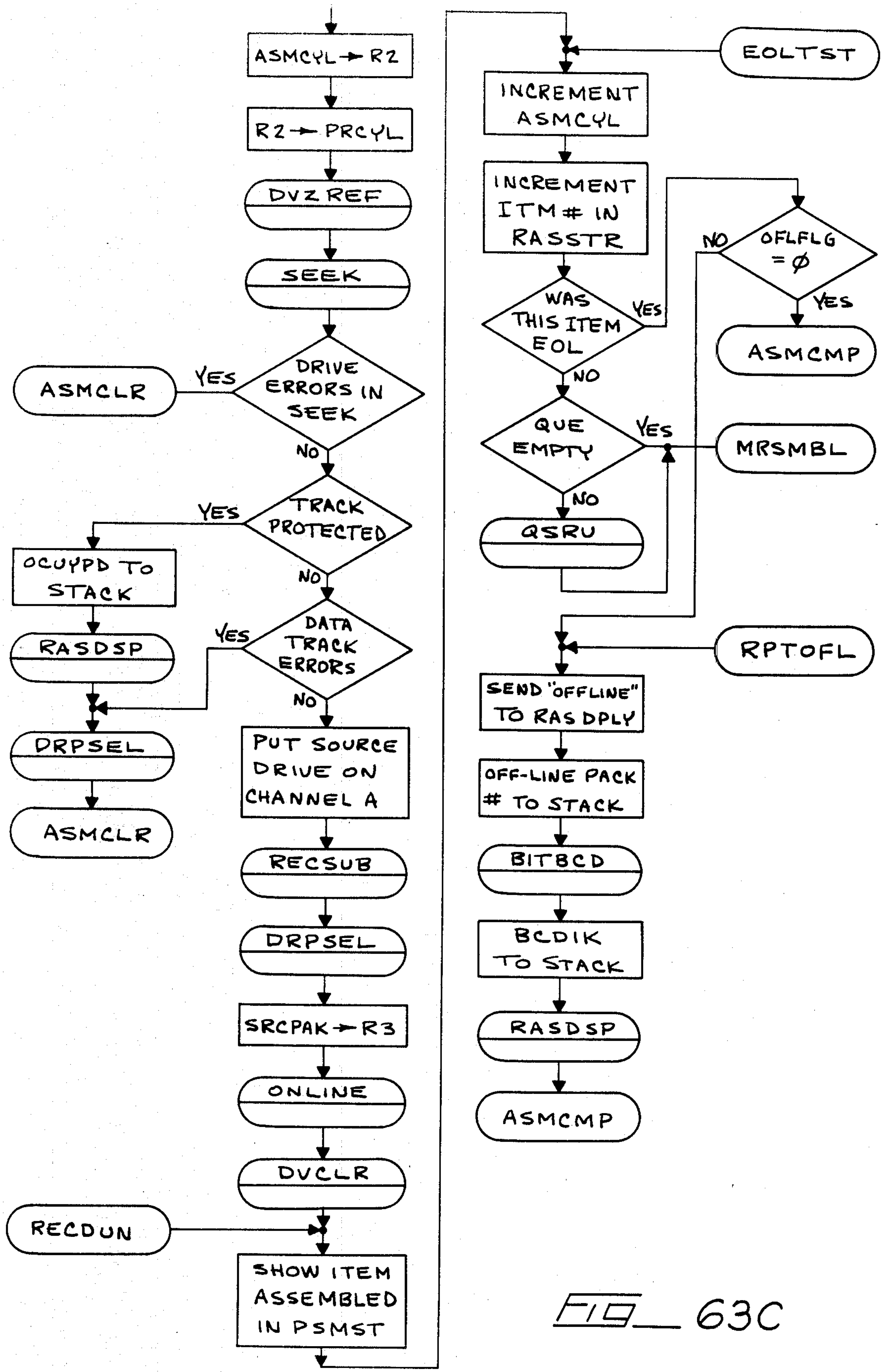
FIG_ 63C

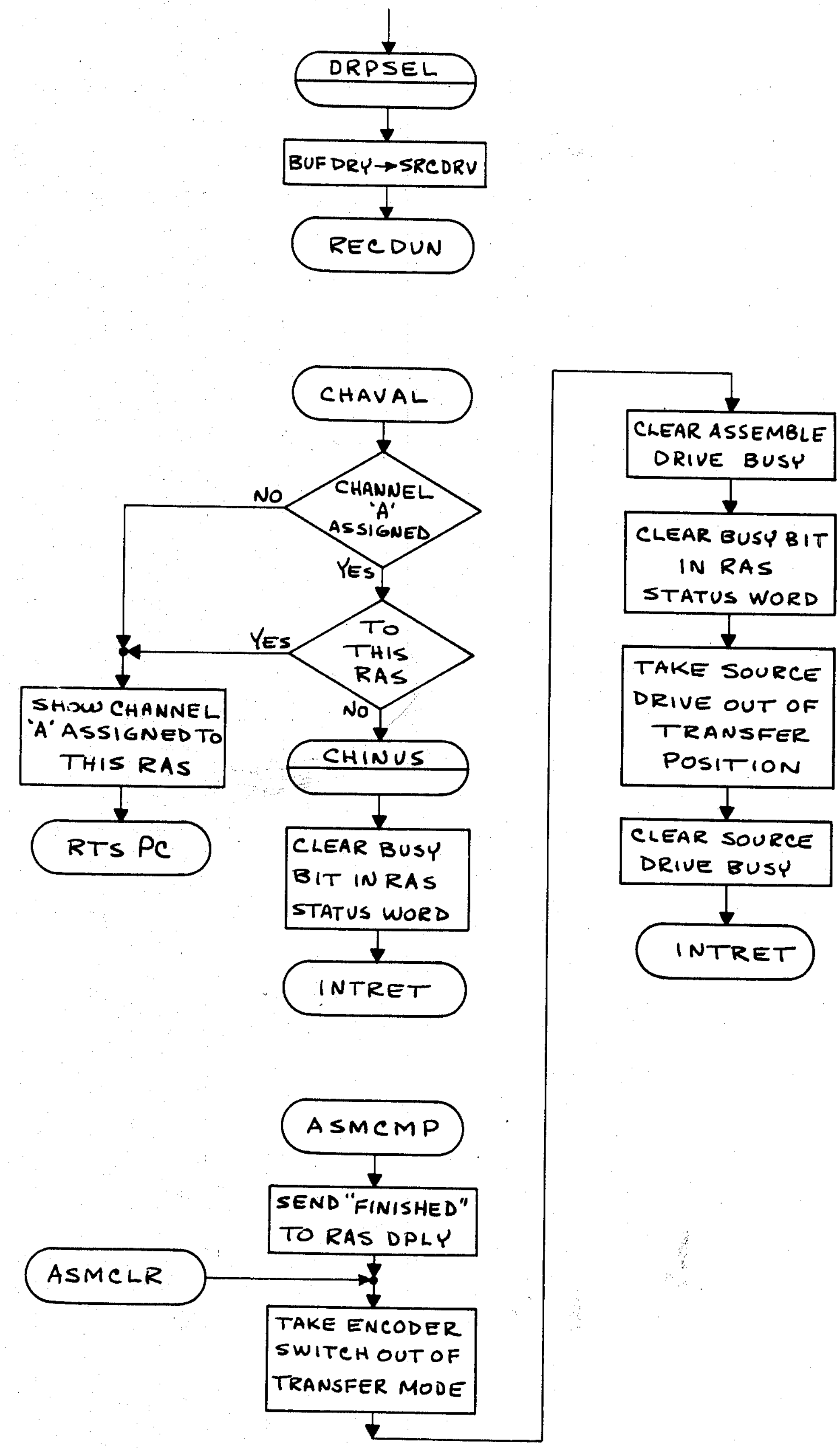
FIG_ 63E

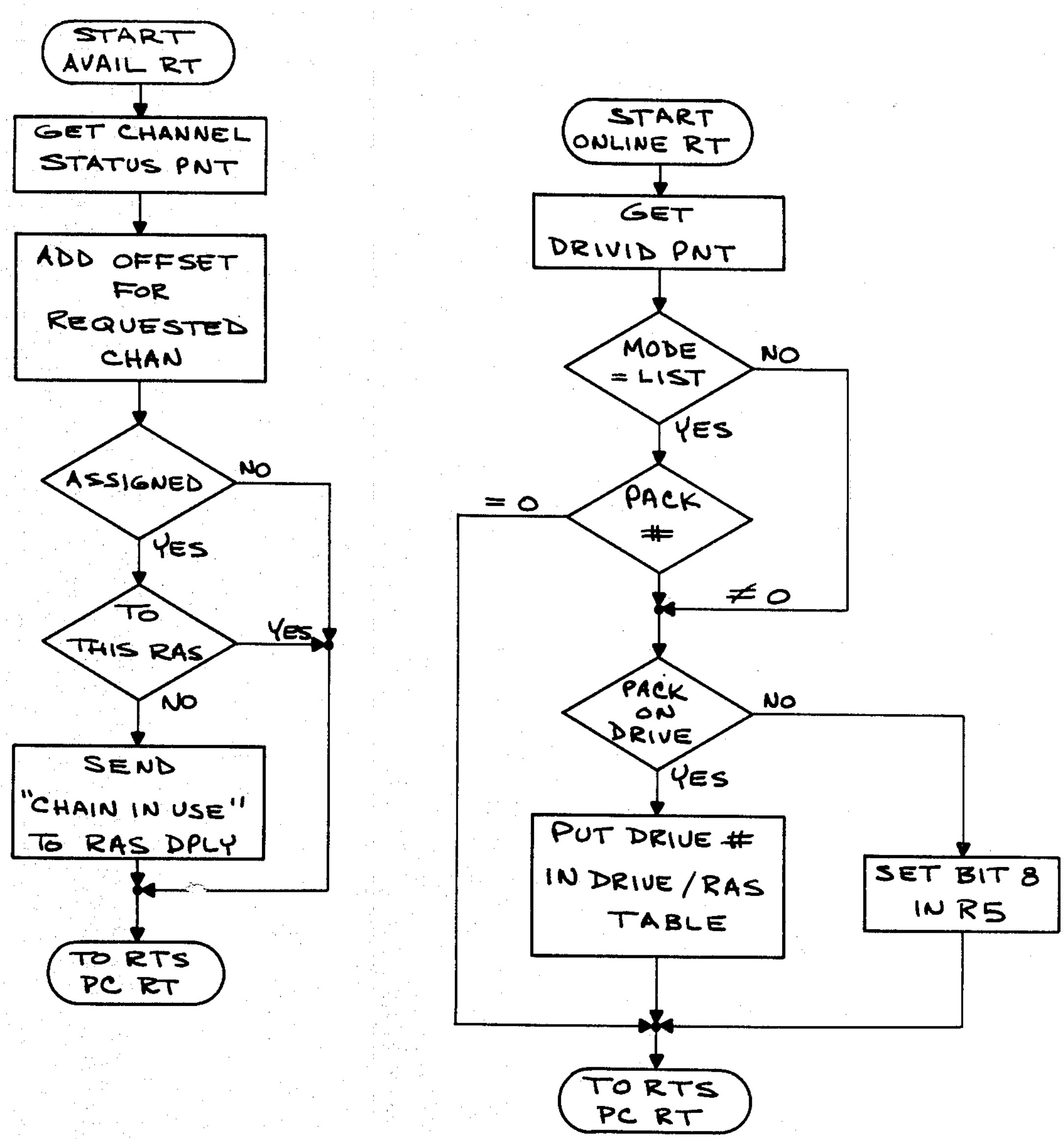
FIG_ 63F

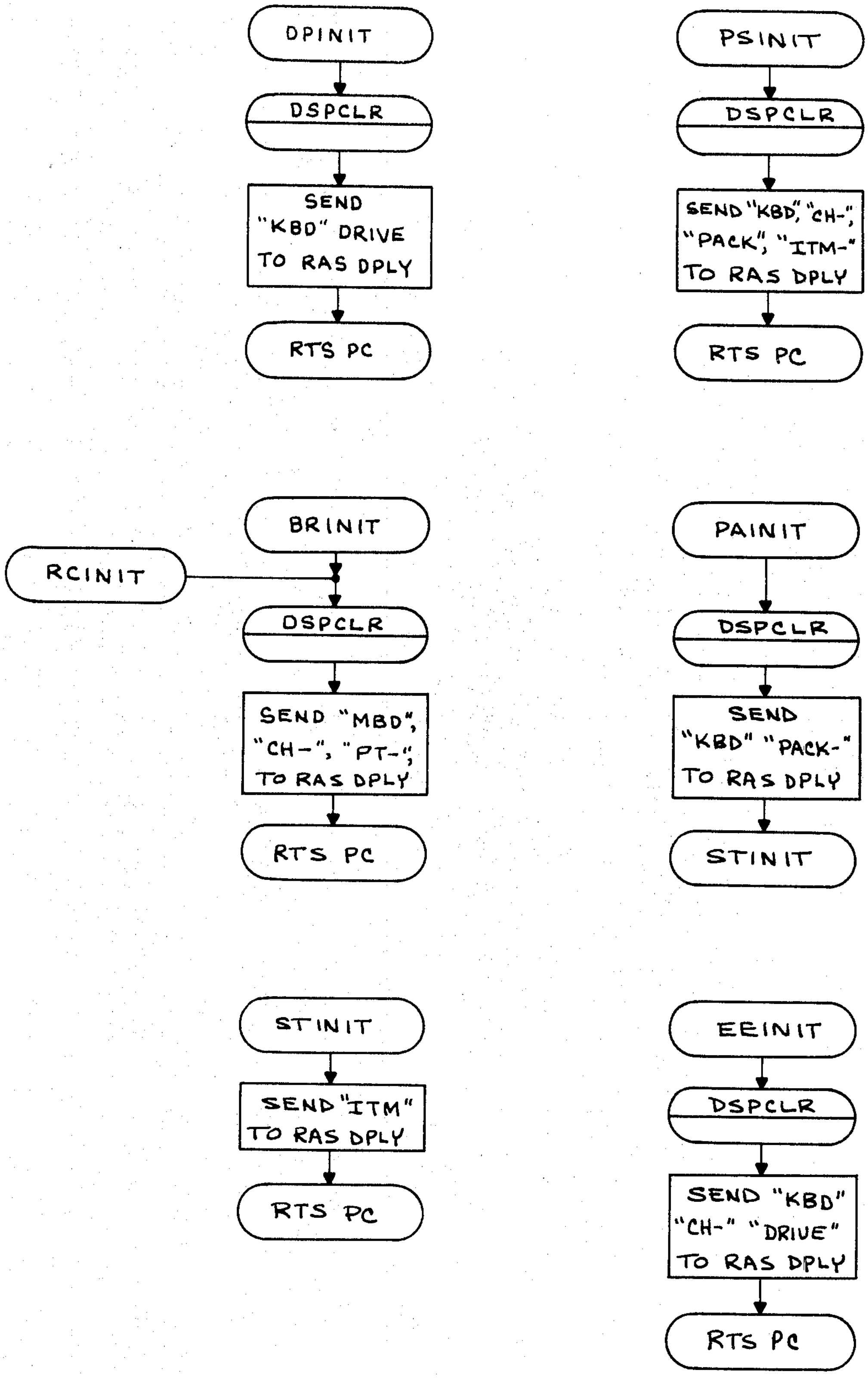
FIG_ 63G

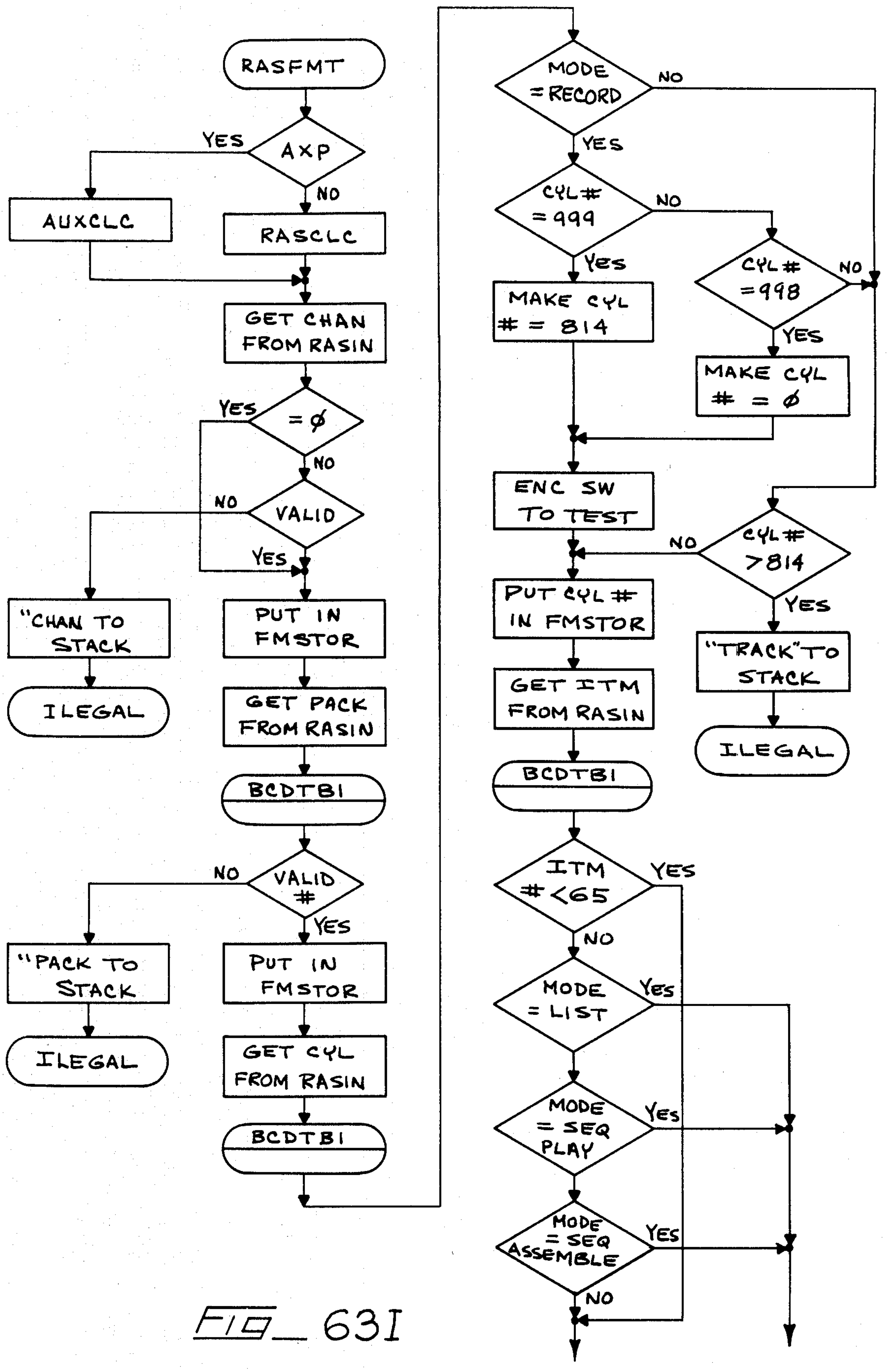
FIG_ 63I

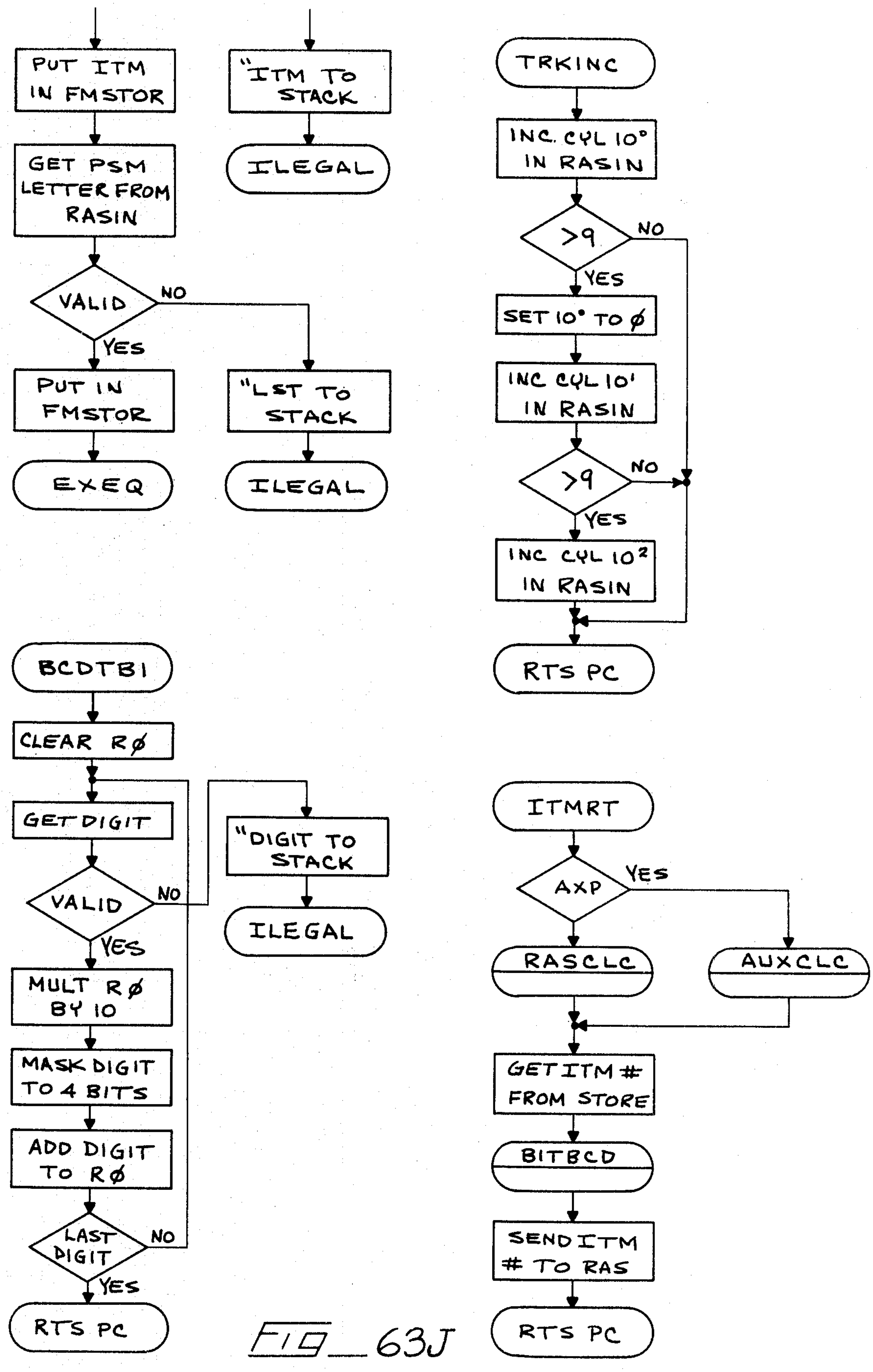
FIG_63J

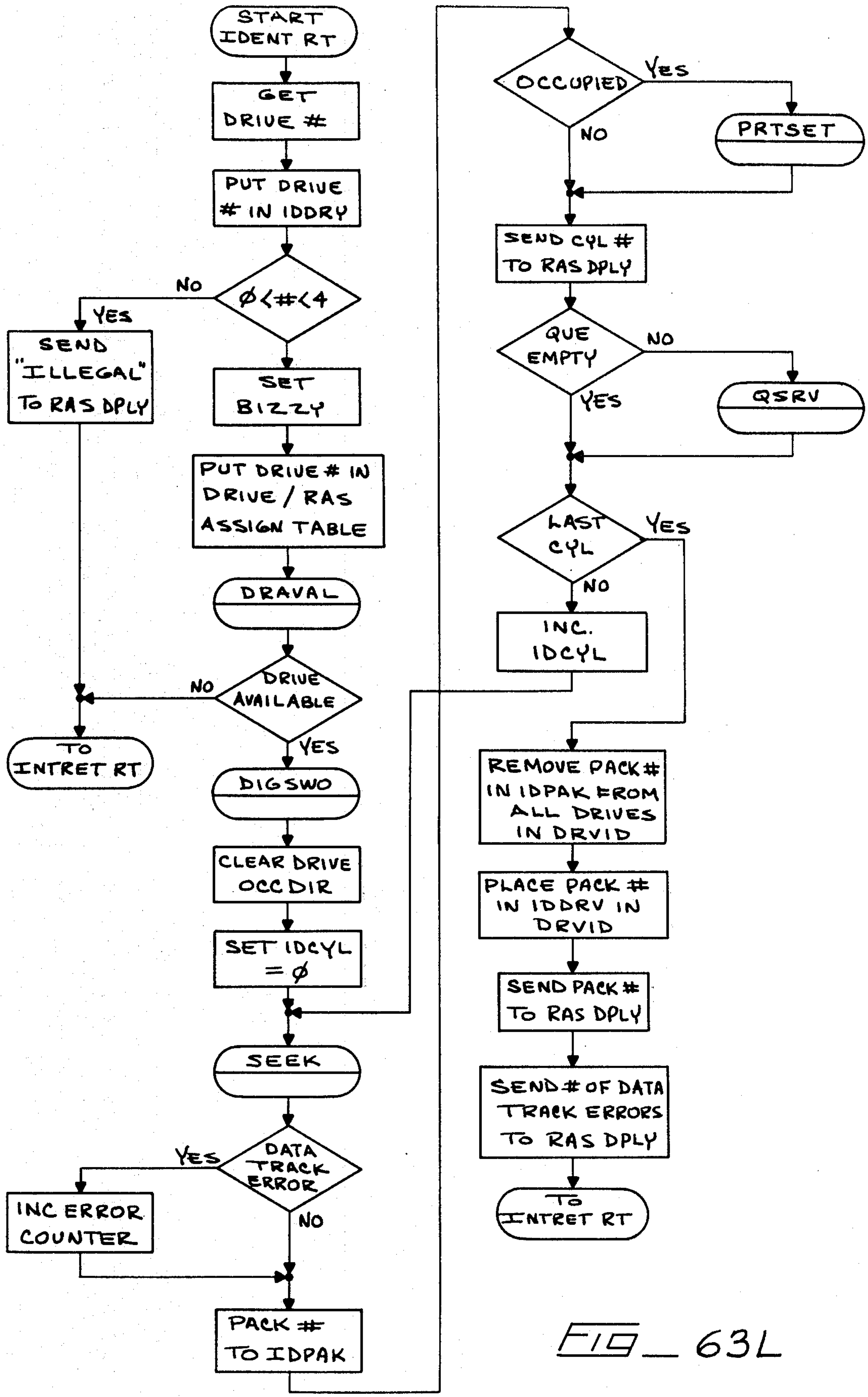
FIG_ 63L

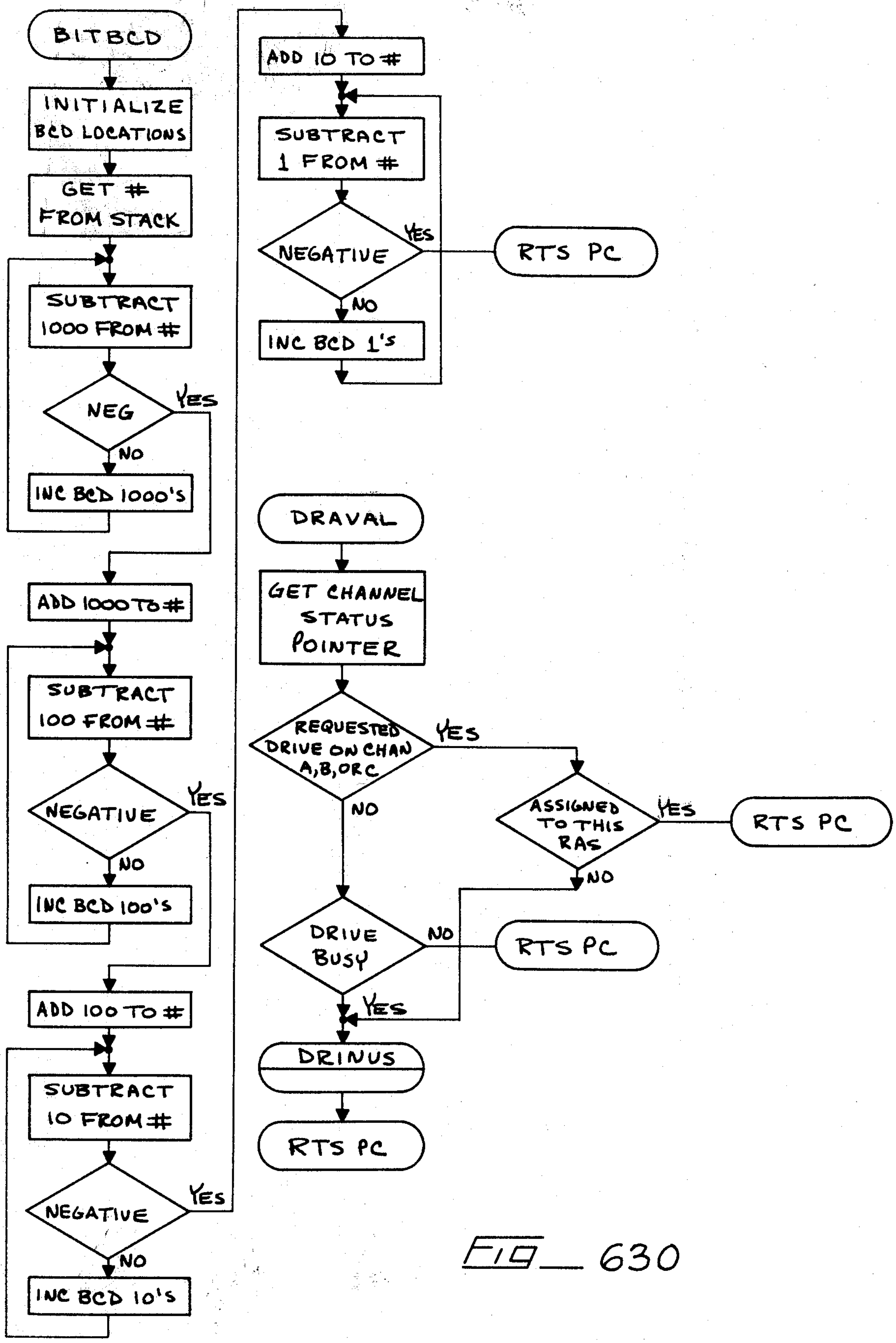
FIG_ 630

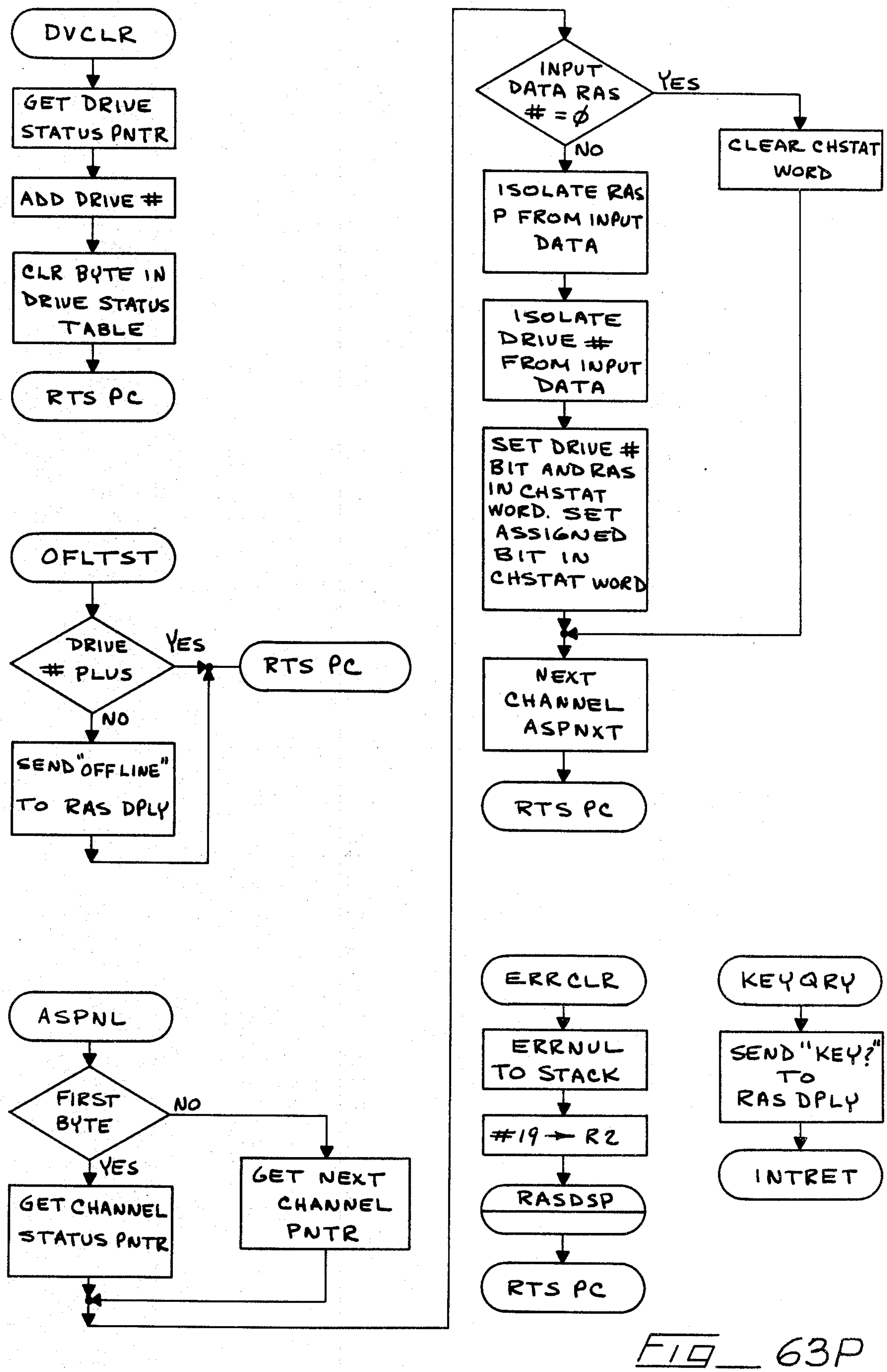
FIG_ 63P

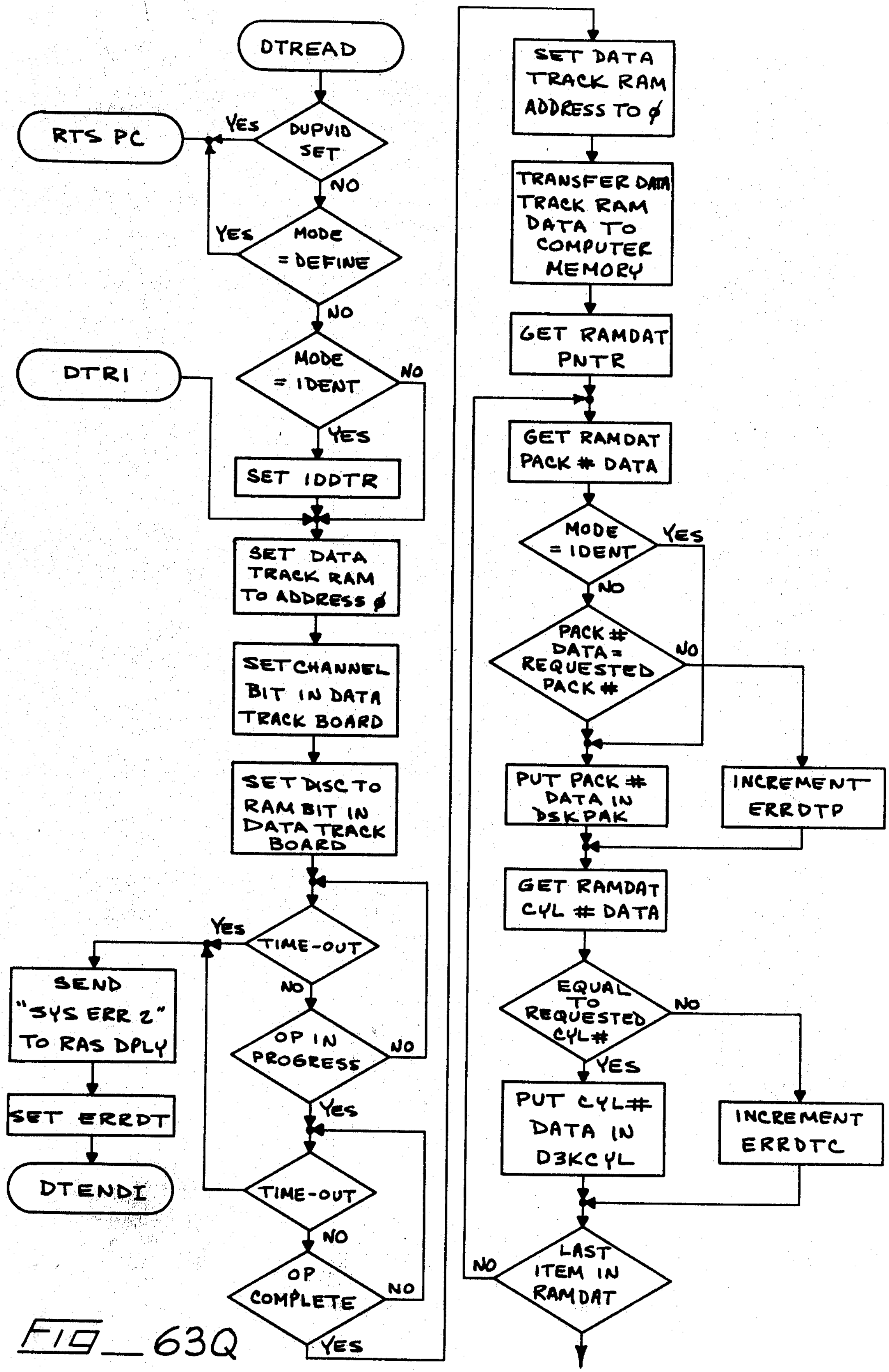
FIG_63Q

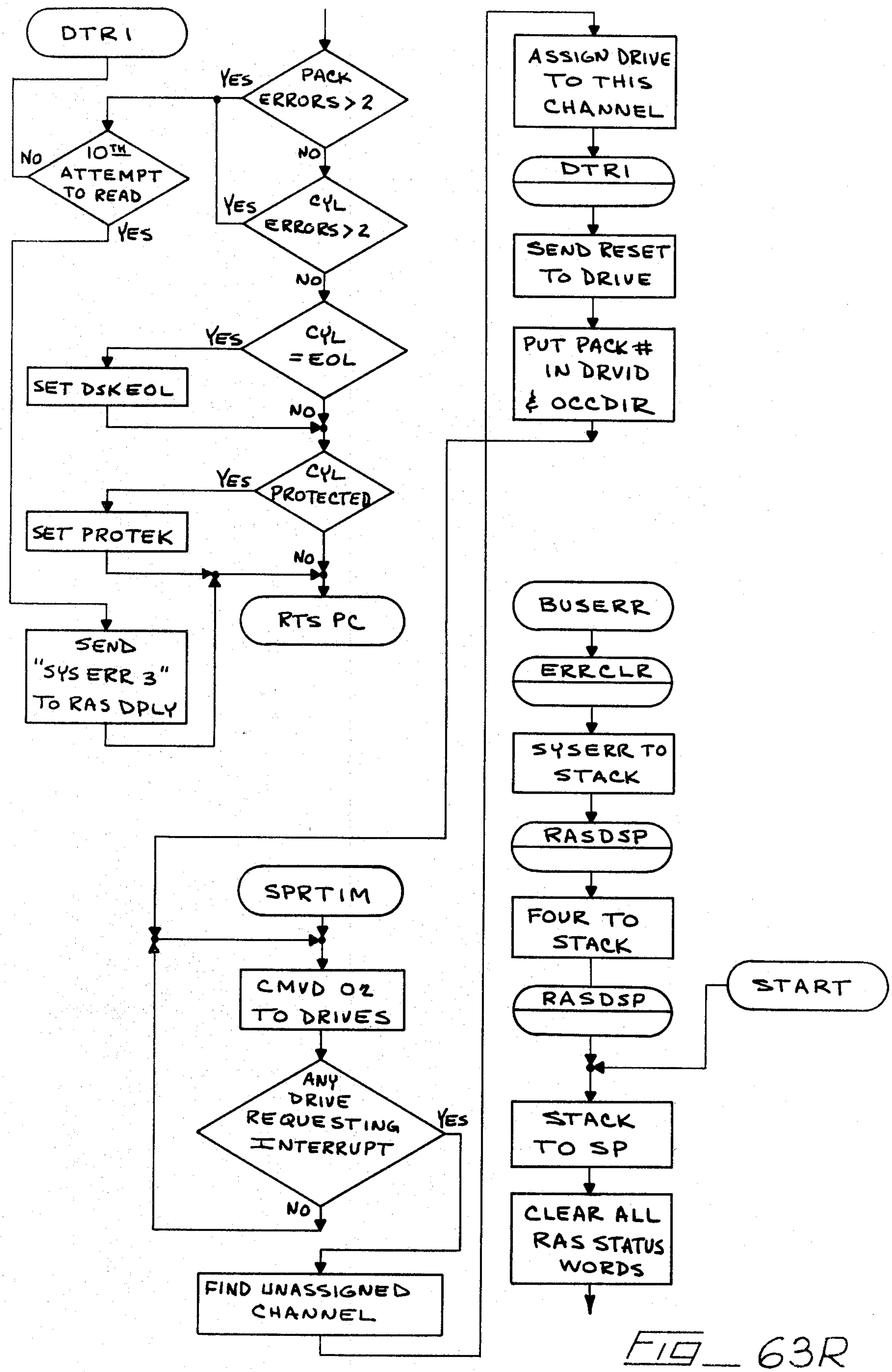
FIG_ 63R

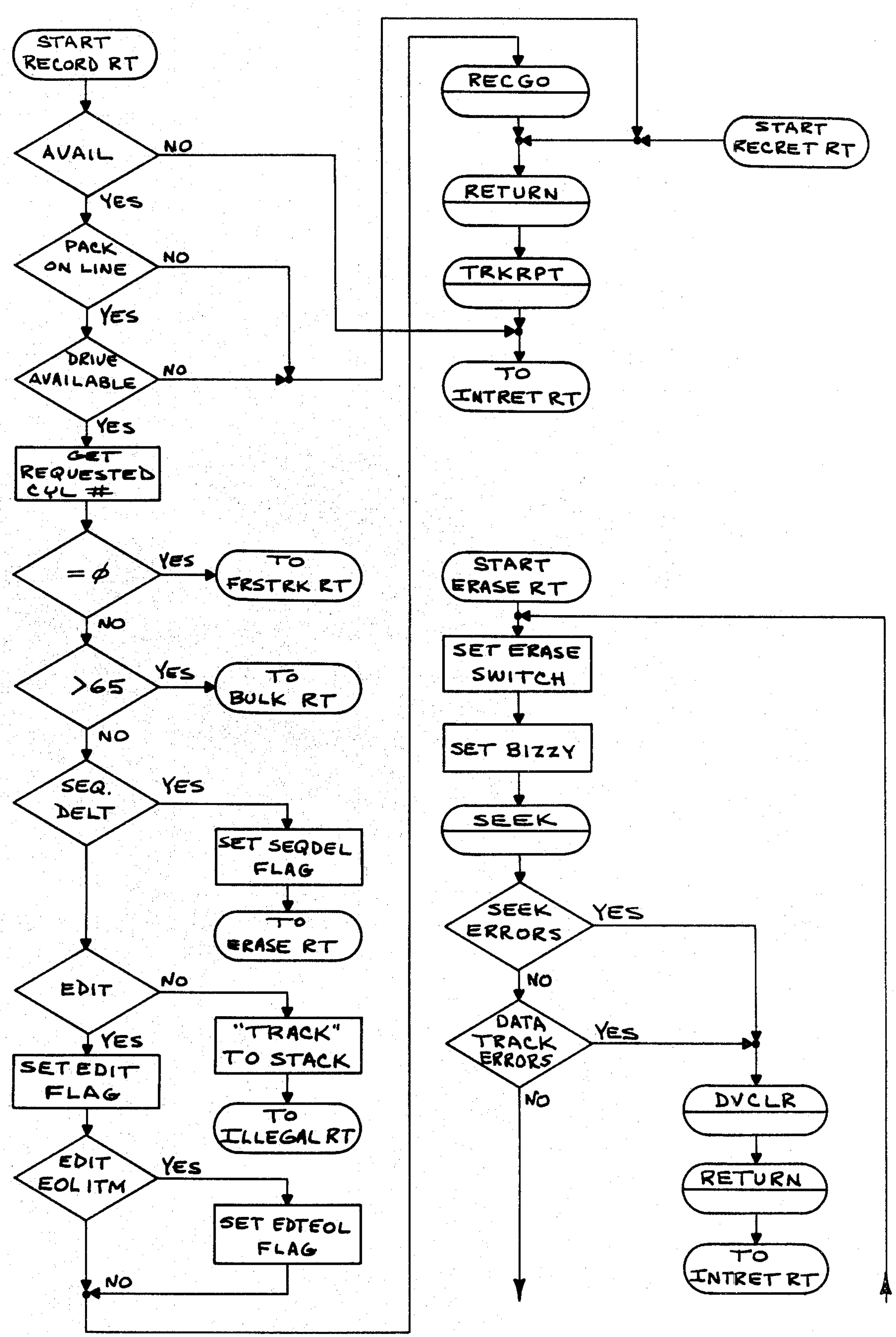
FIG_63T

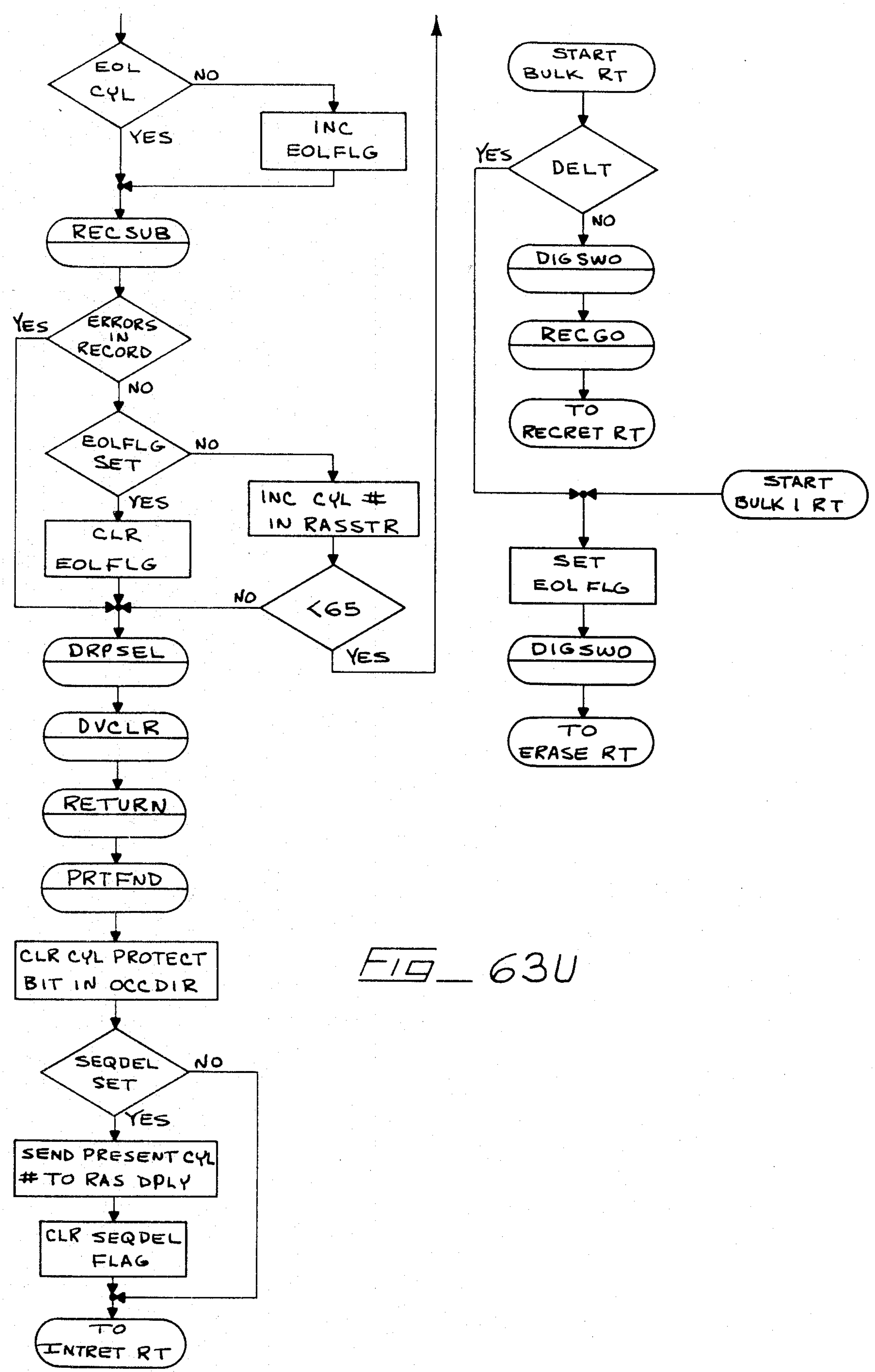
FIG_ 63U

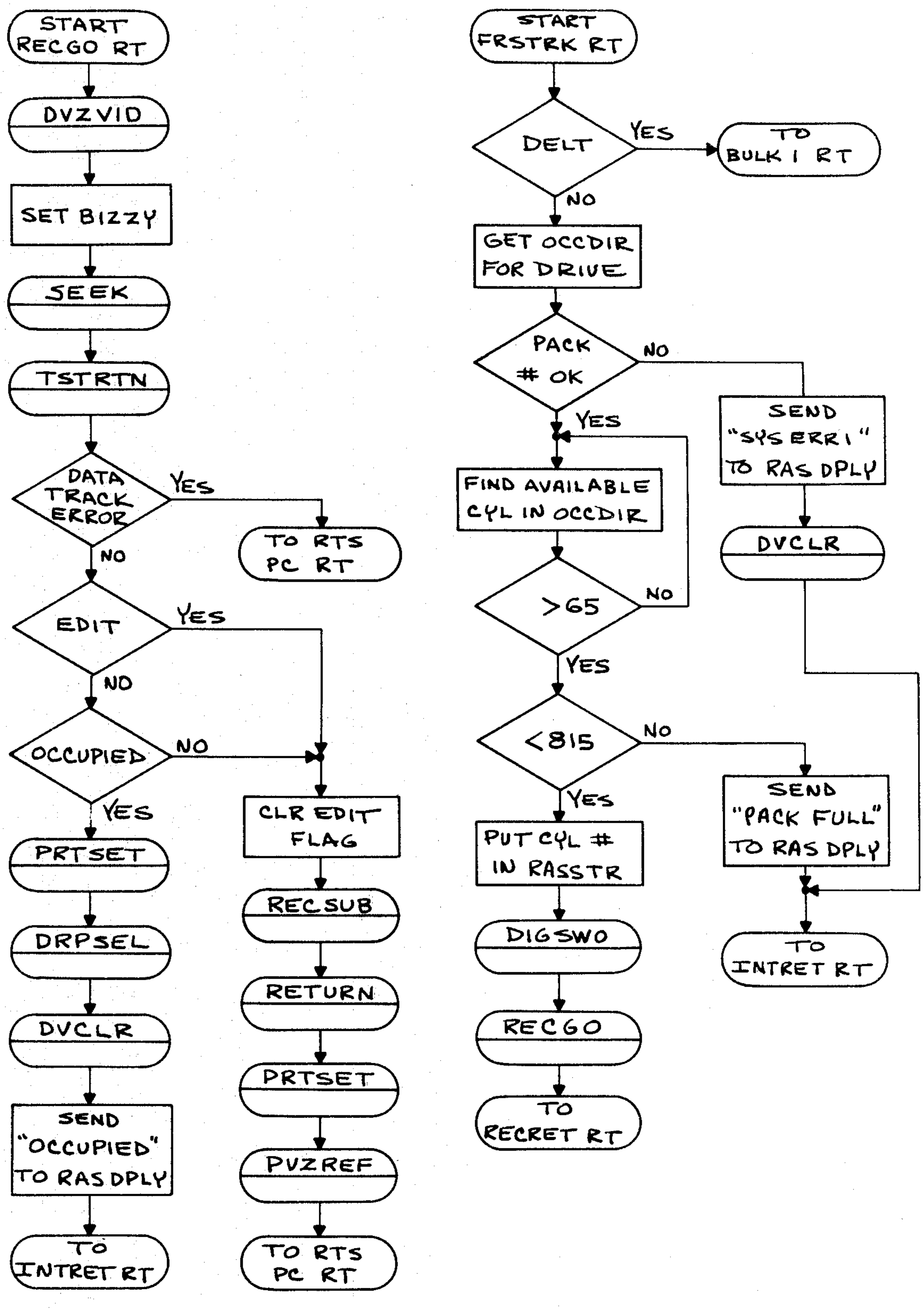
FIG_63V

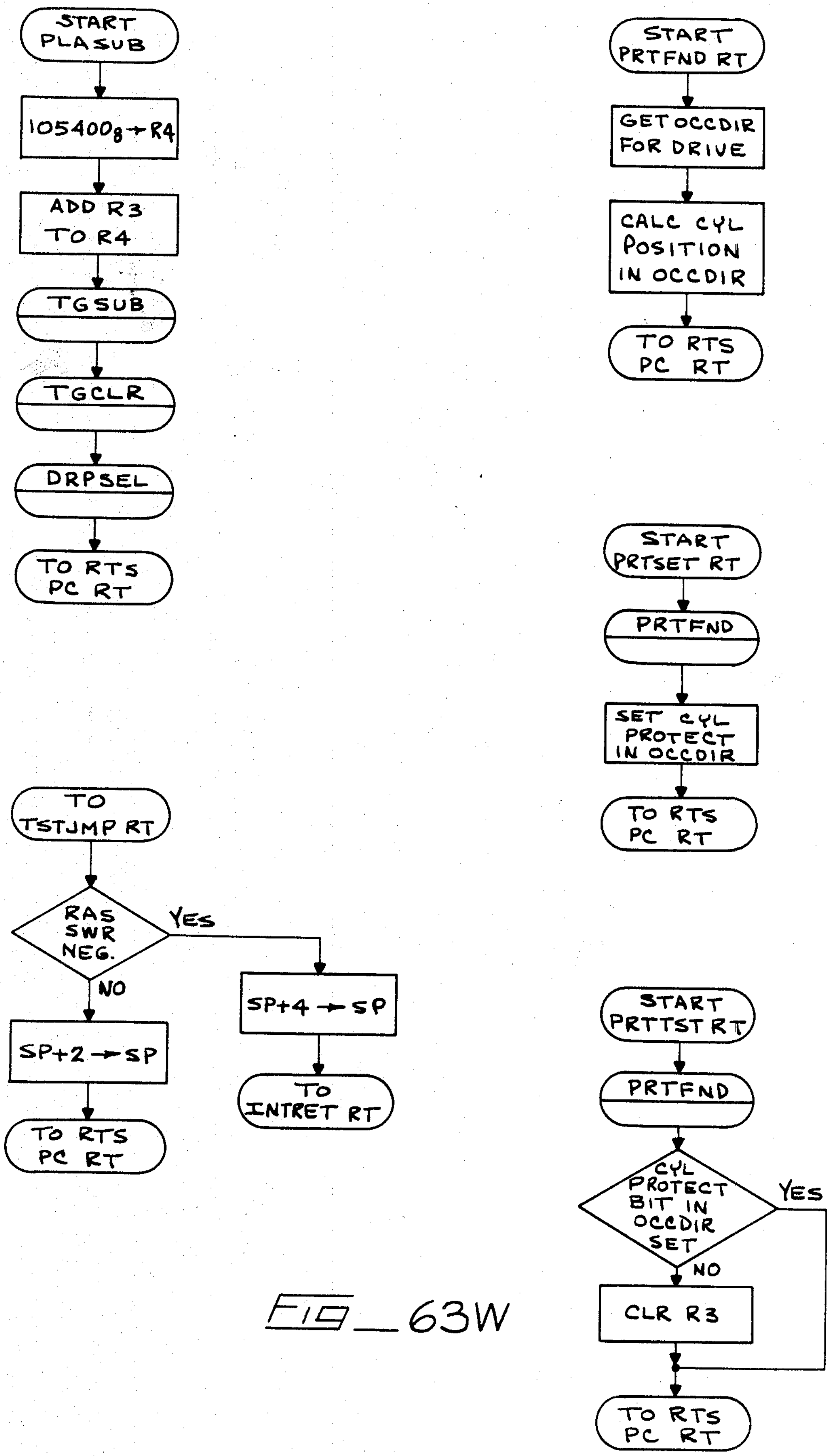
FIG_63W

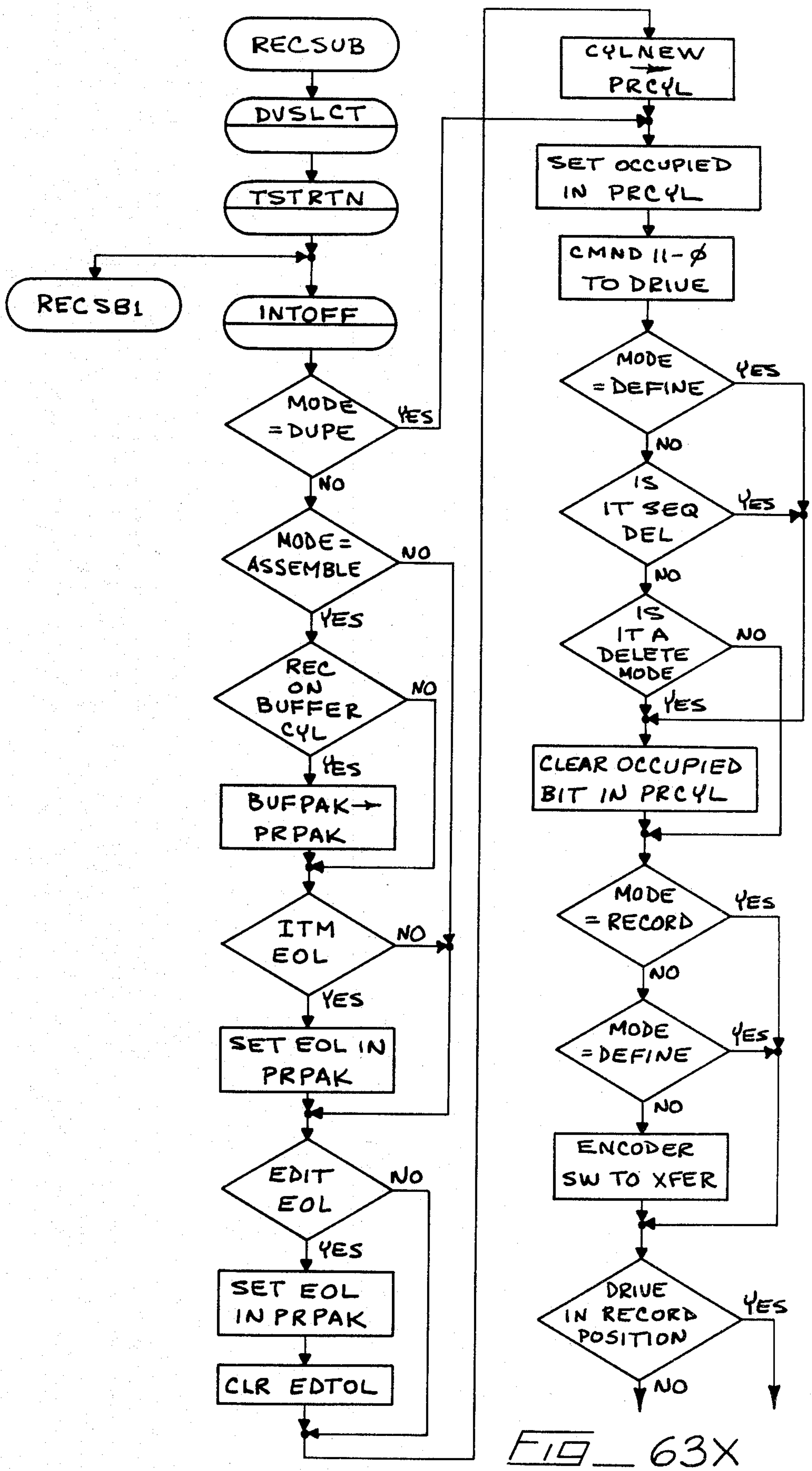
FIG_ 63X

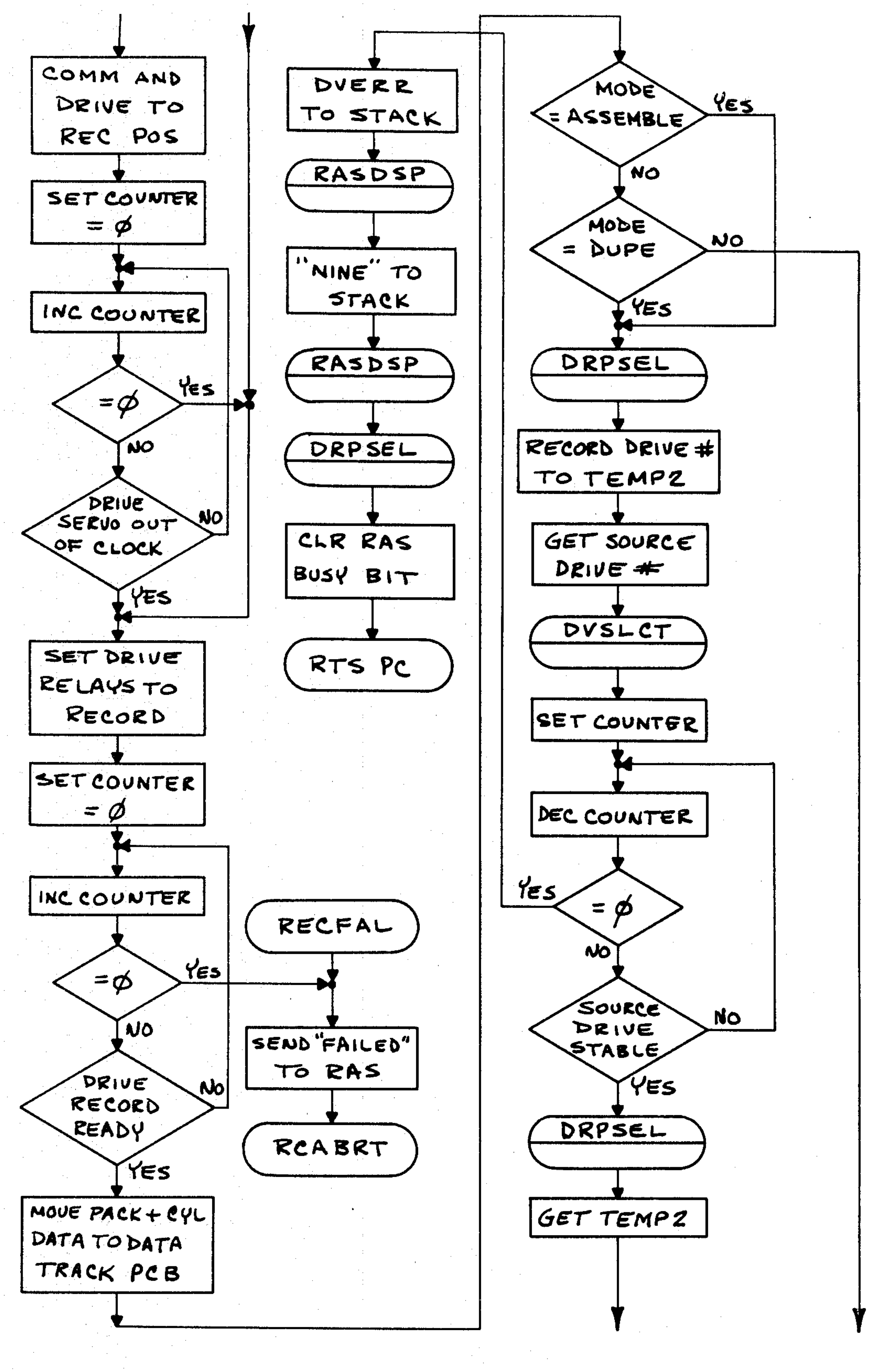
FIG_63Y

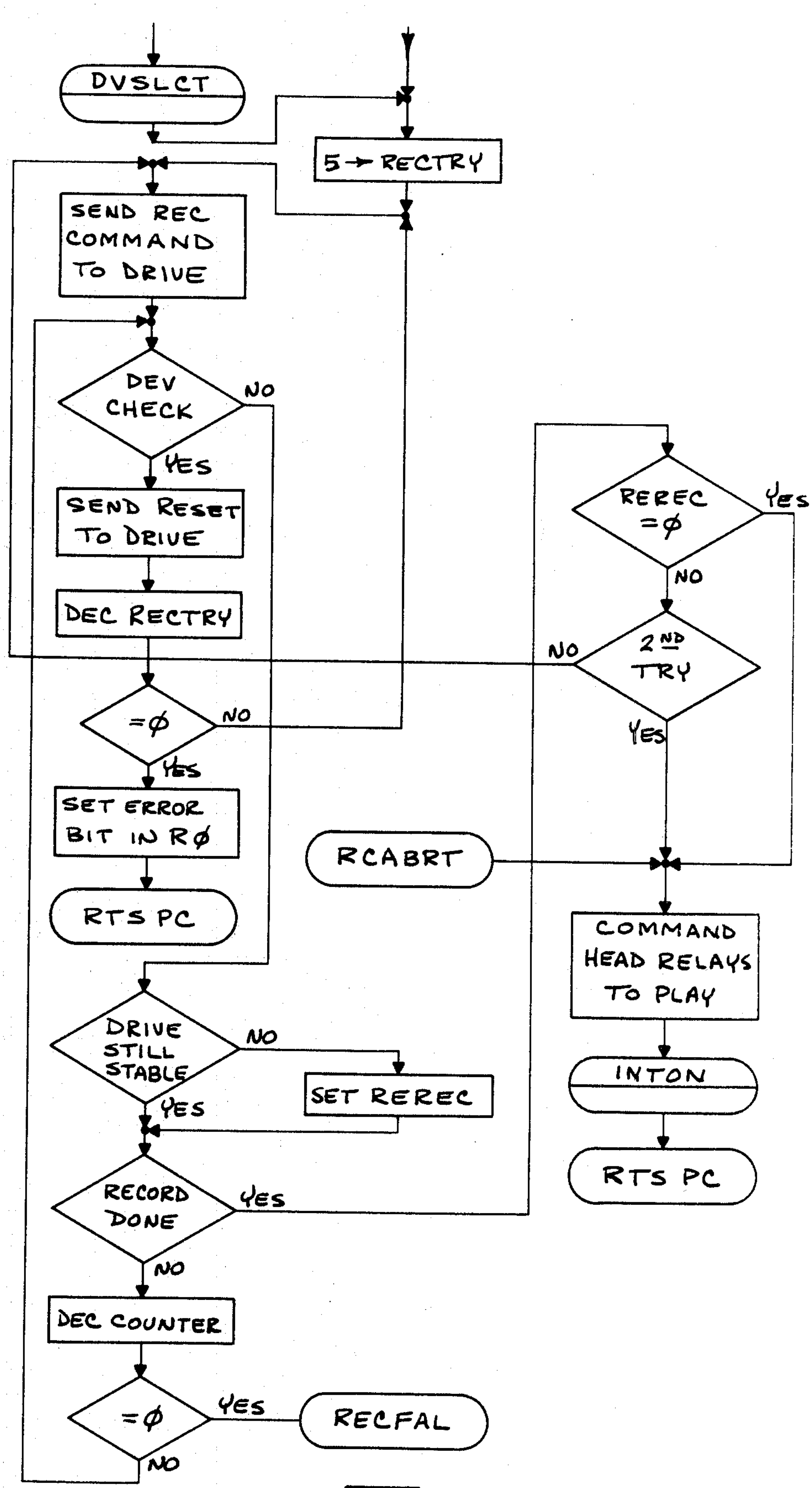
FIG_ 63Z

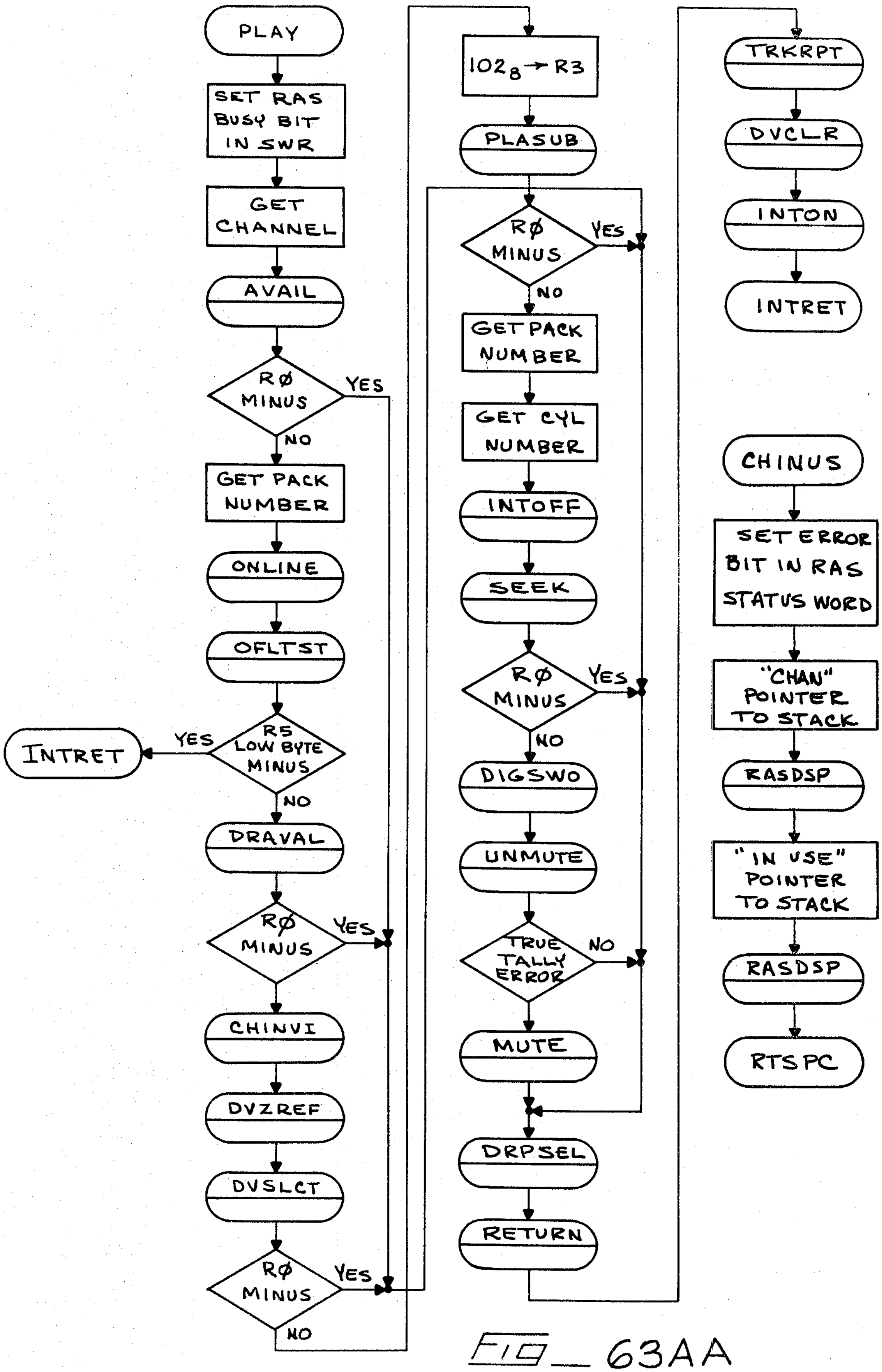
FIG_ 63AA

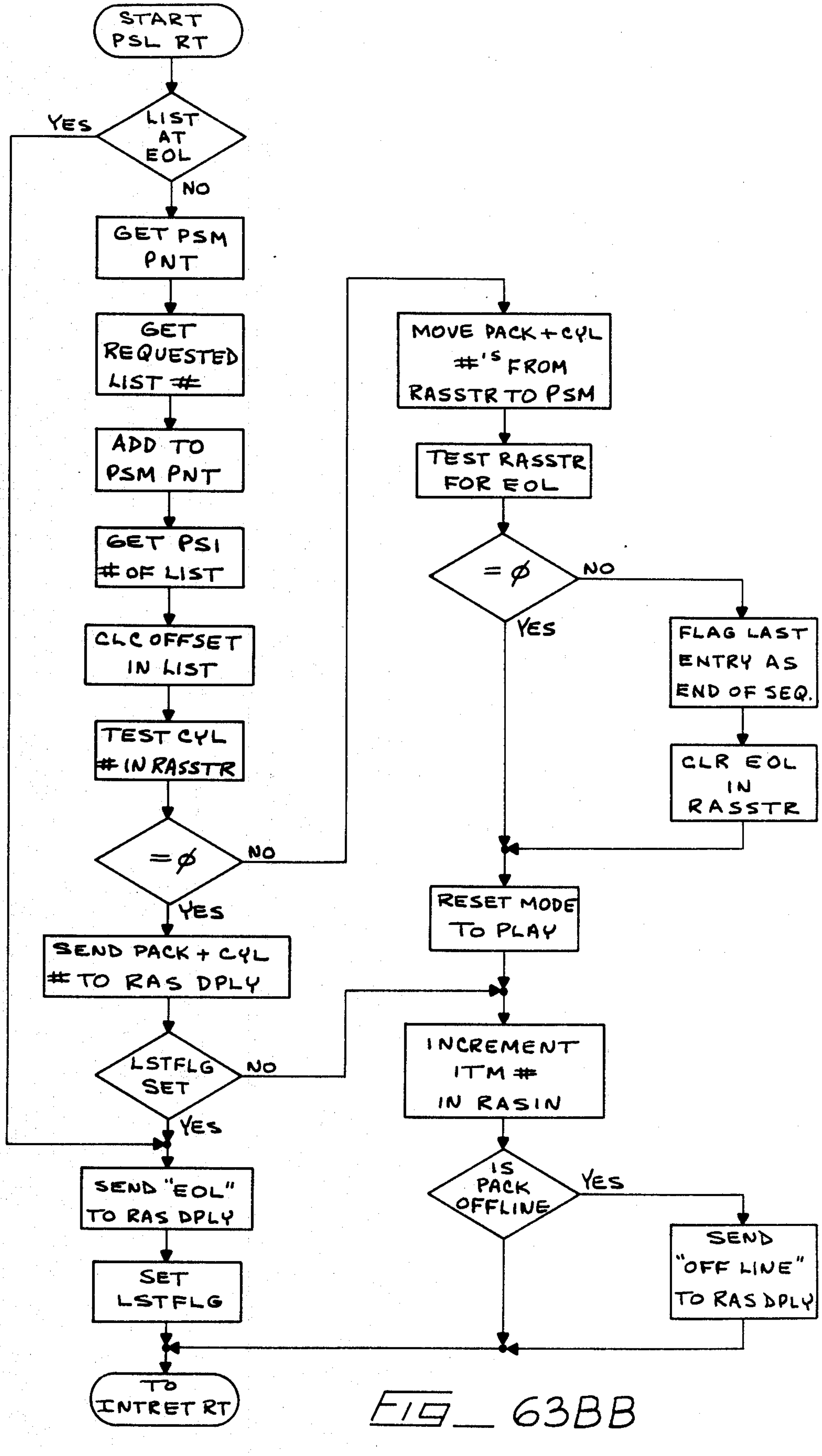
FIG_ 63BB

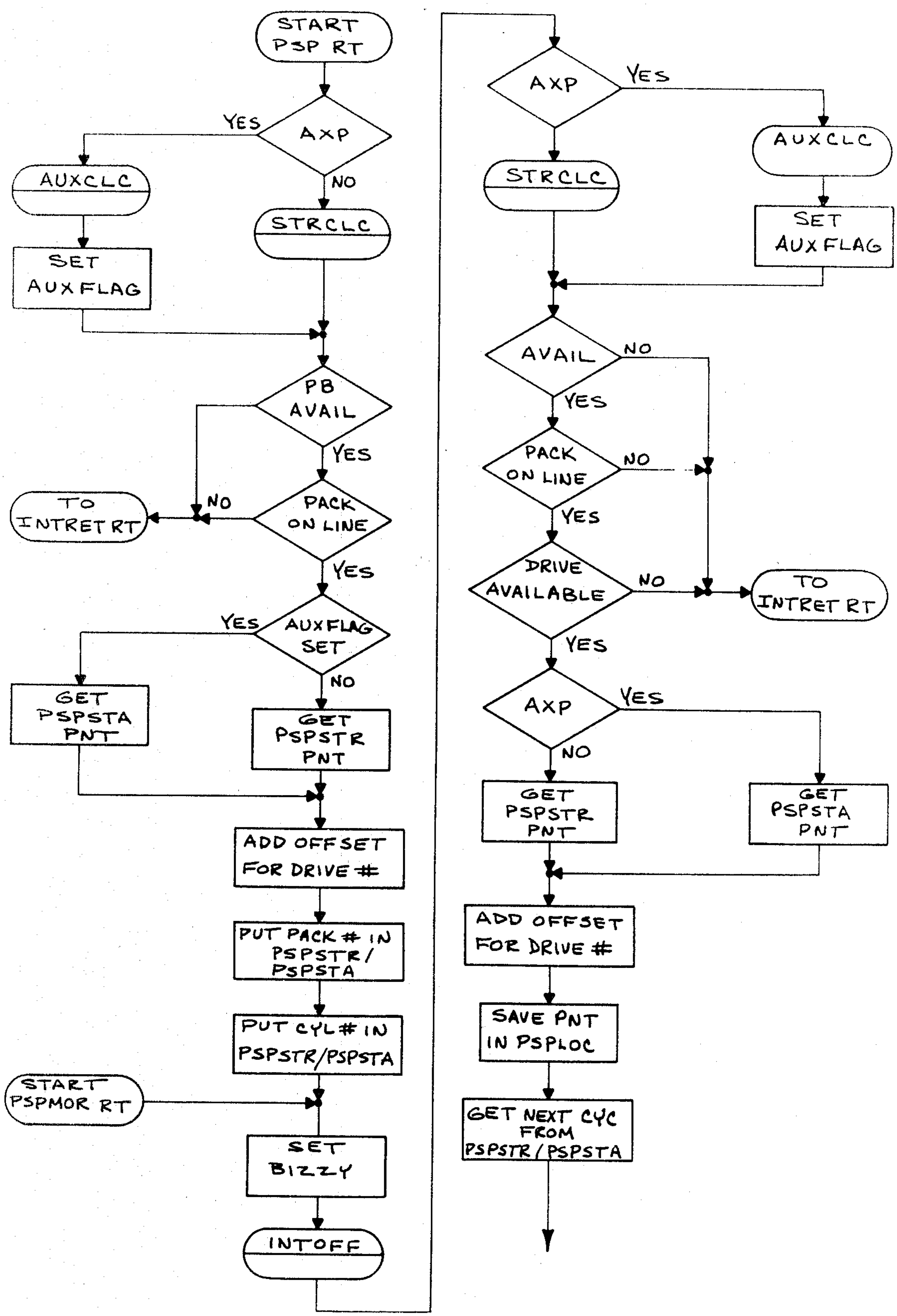
FIG_63CC

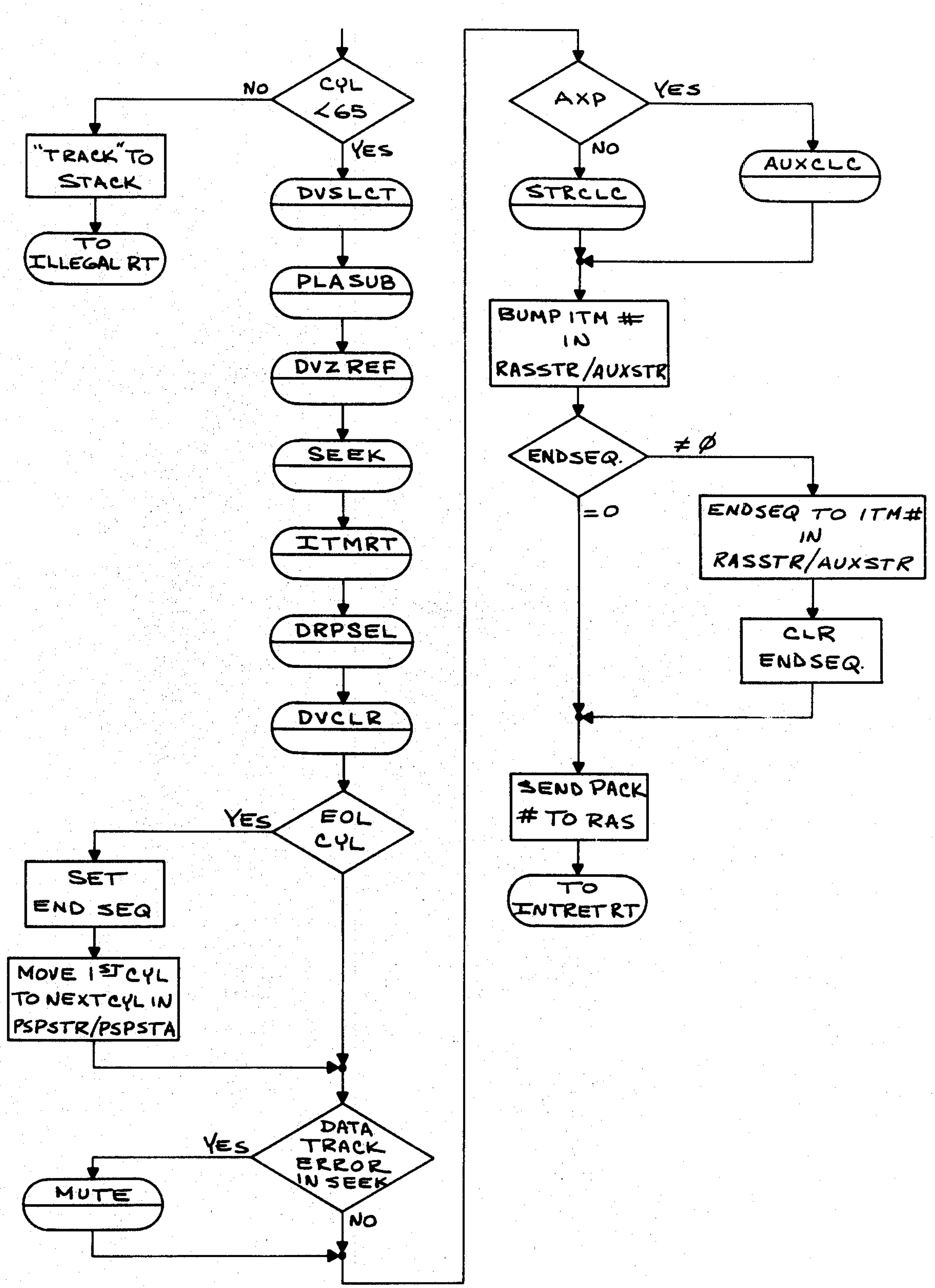
FIG_63DD

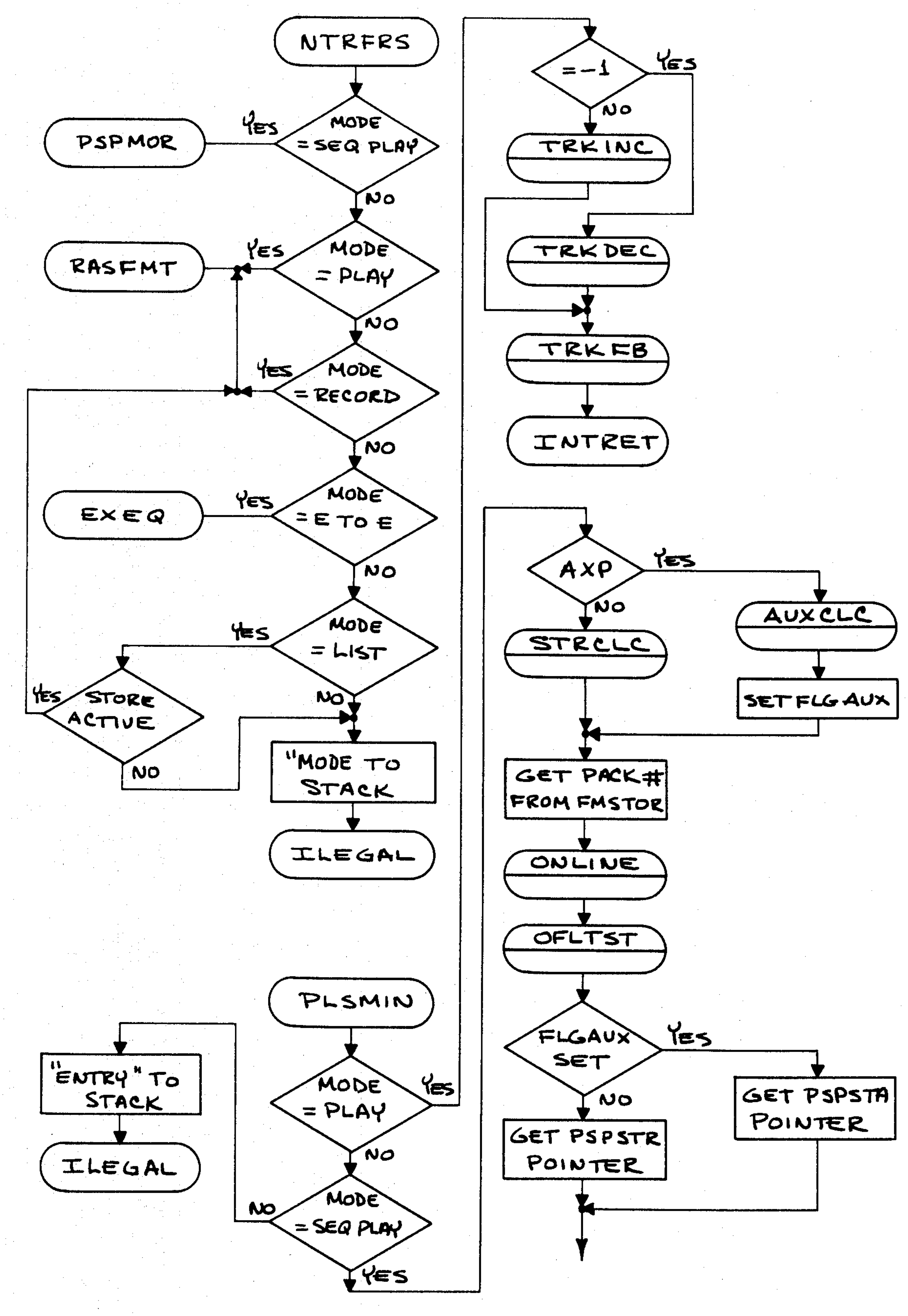
FIG_ 63EE

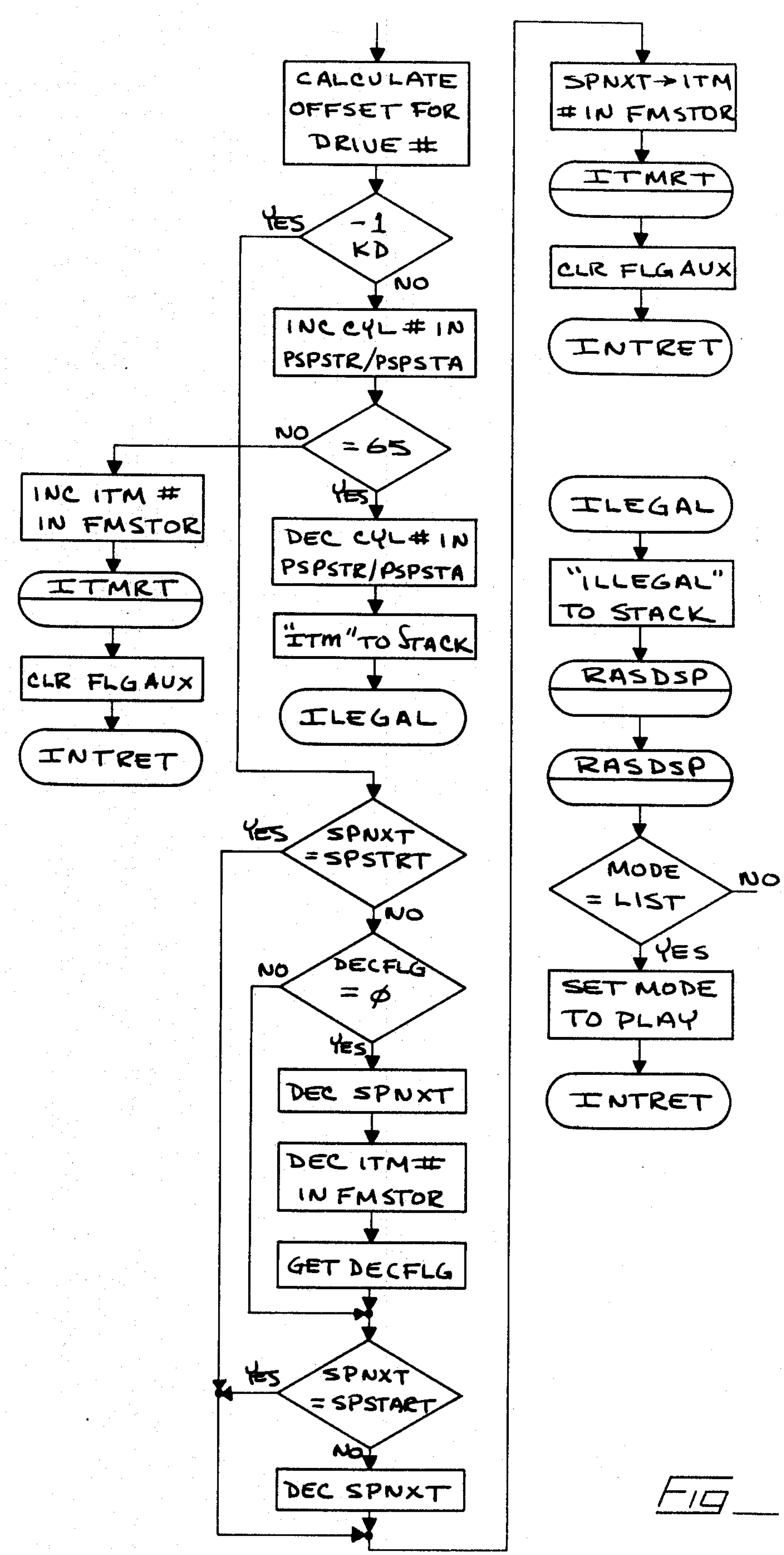
FIG_ 63FF

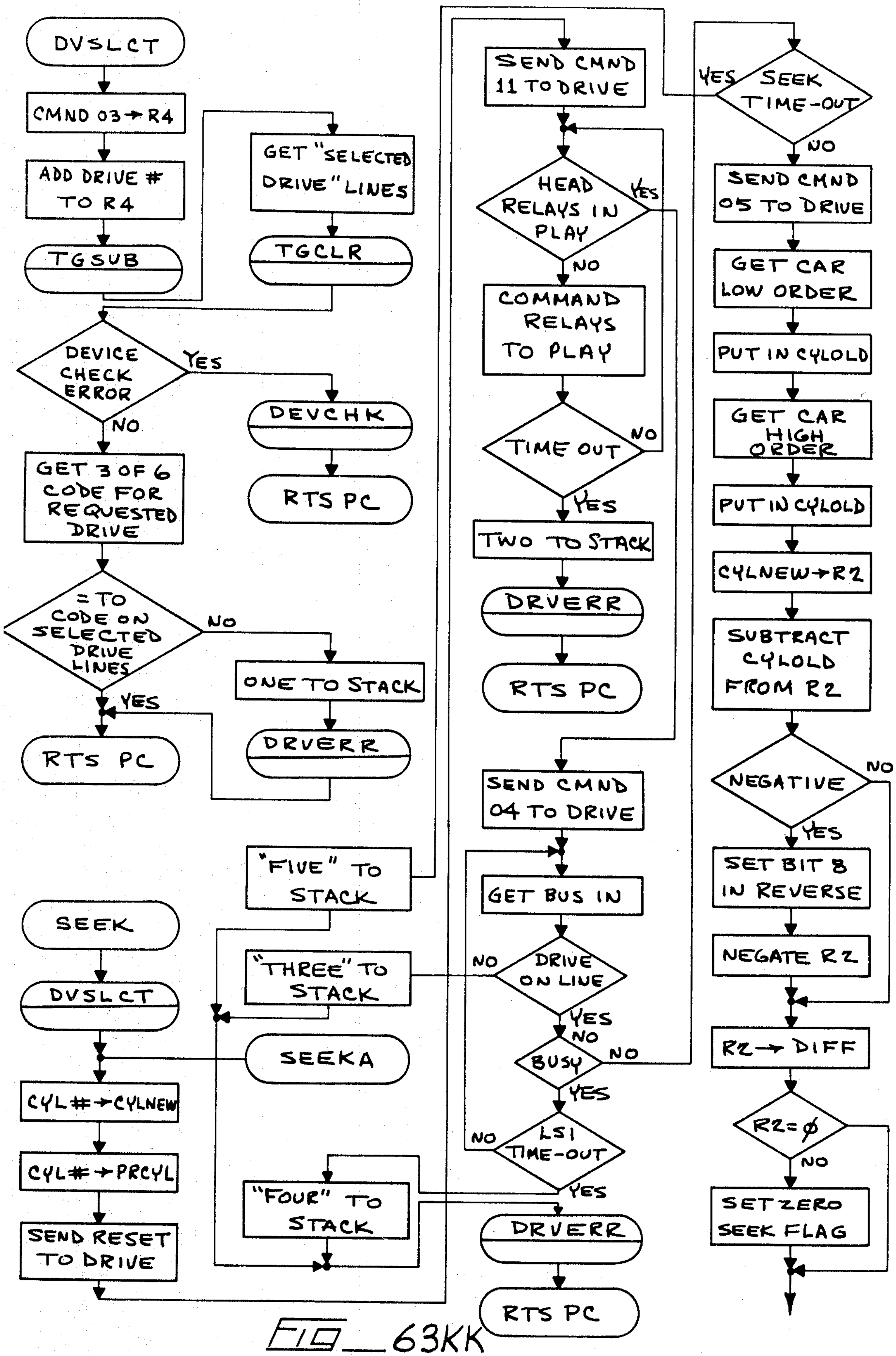
FIG_63KK

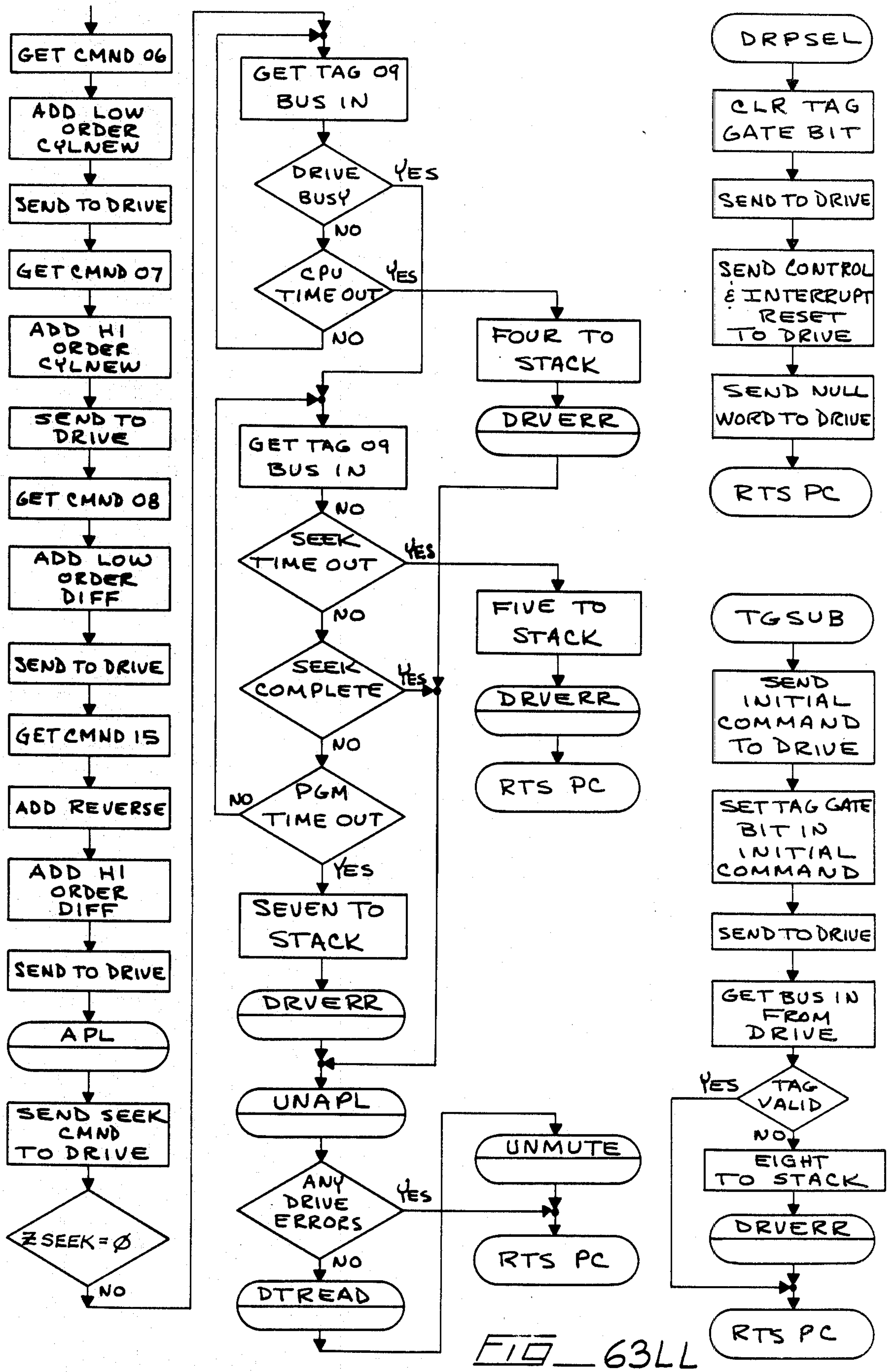
FIG_63LL

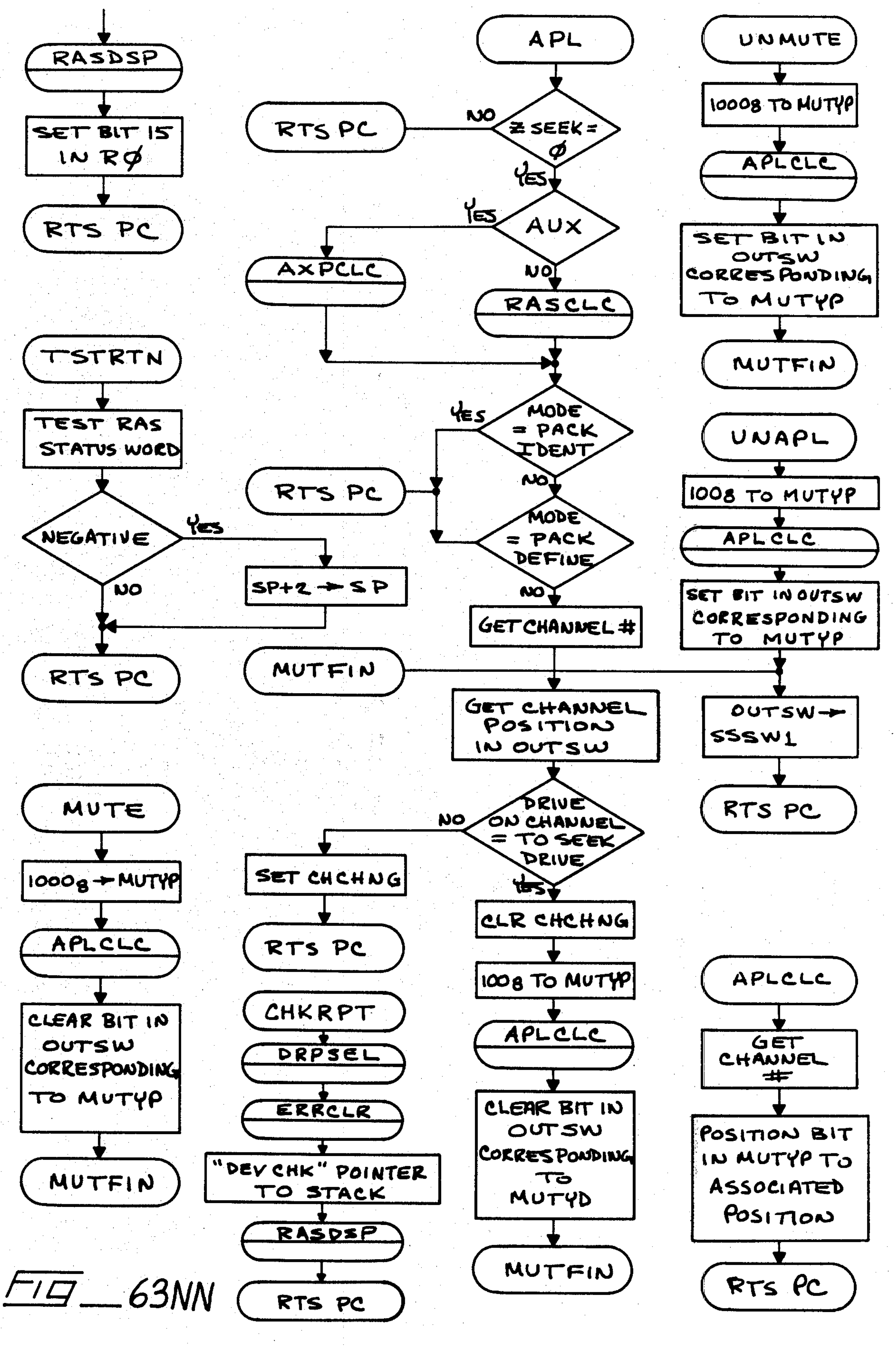
FIG_63NN

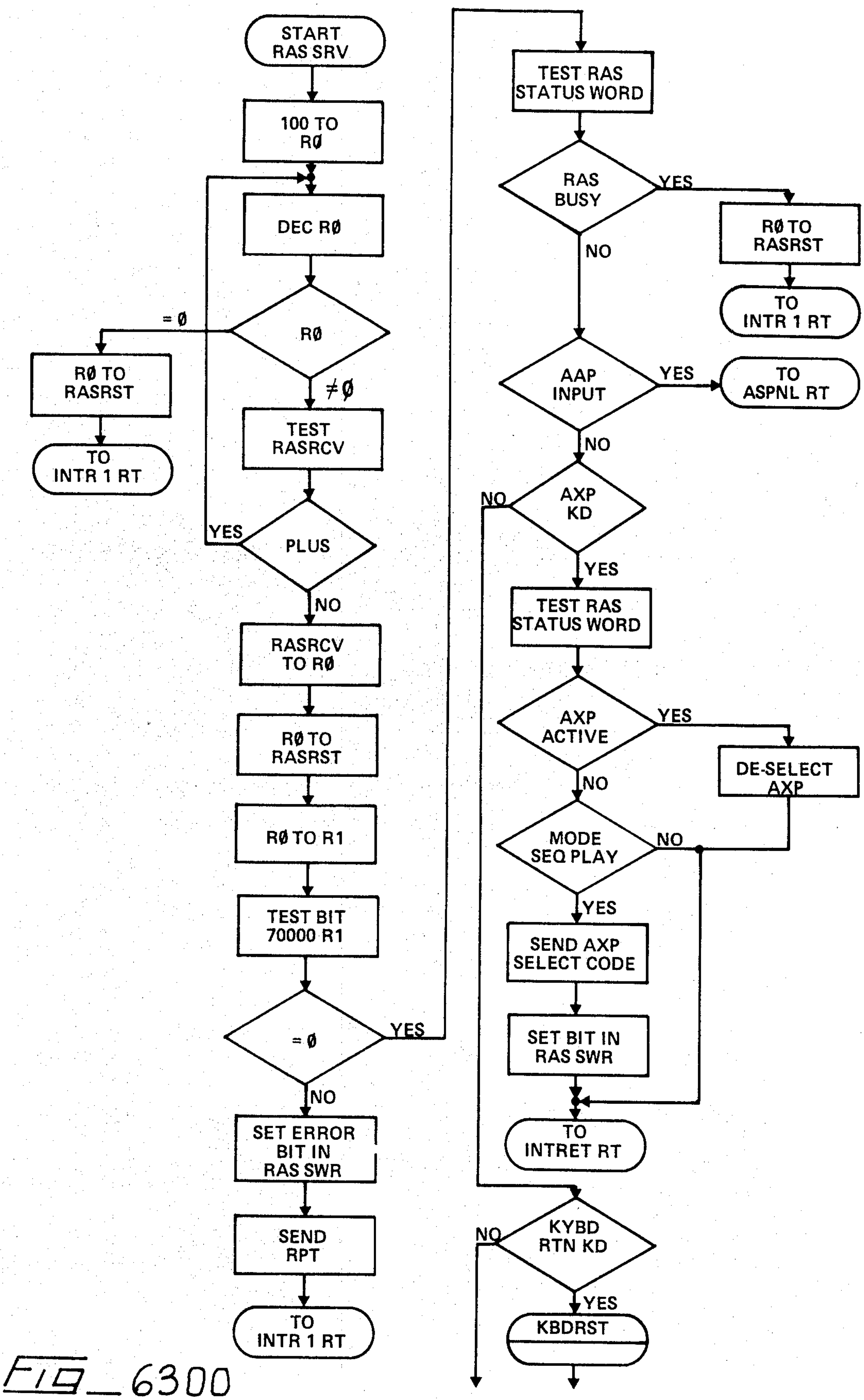
FIG_6300

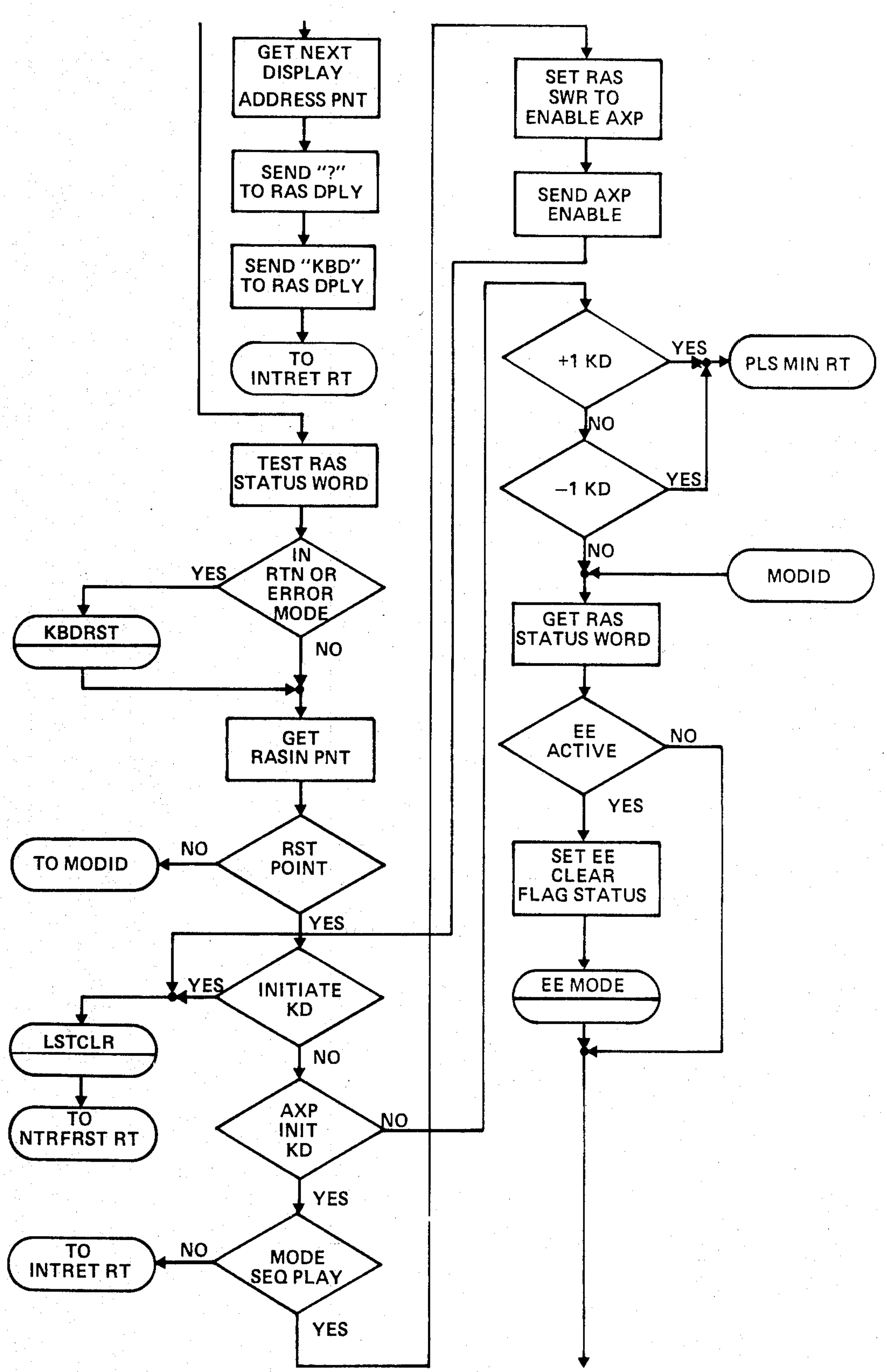
FIG_63PP

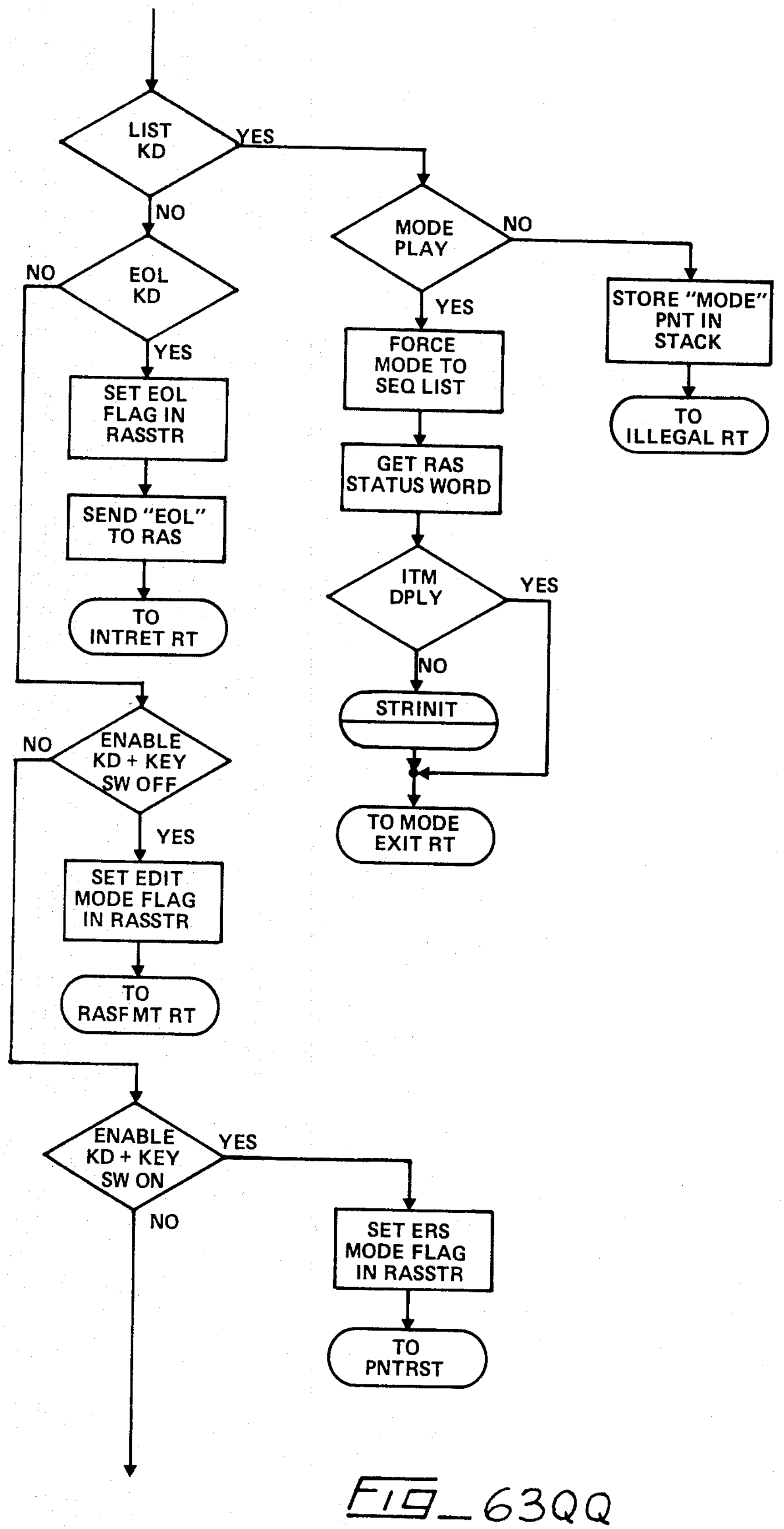
FIG_63QQ

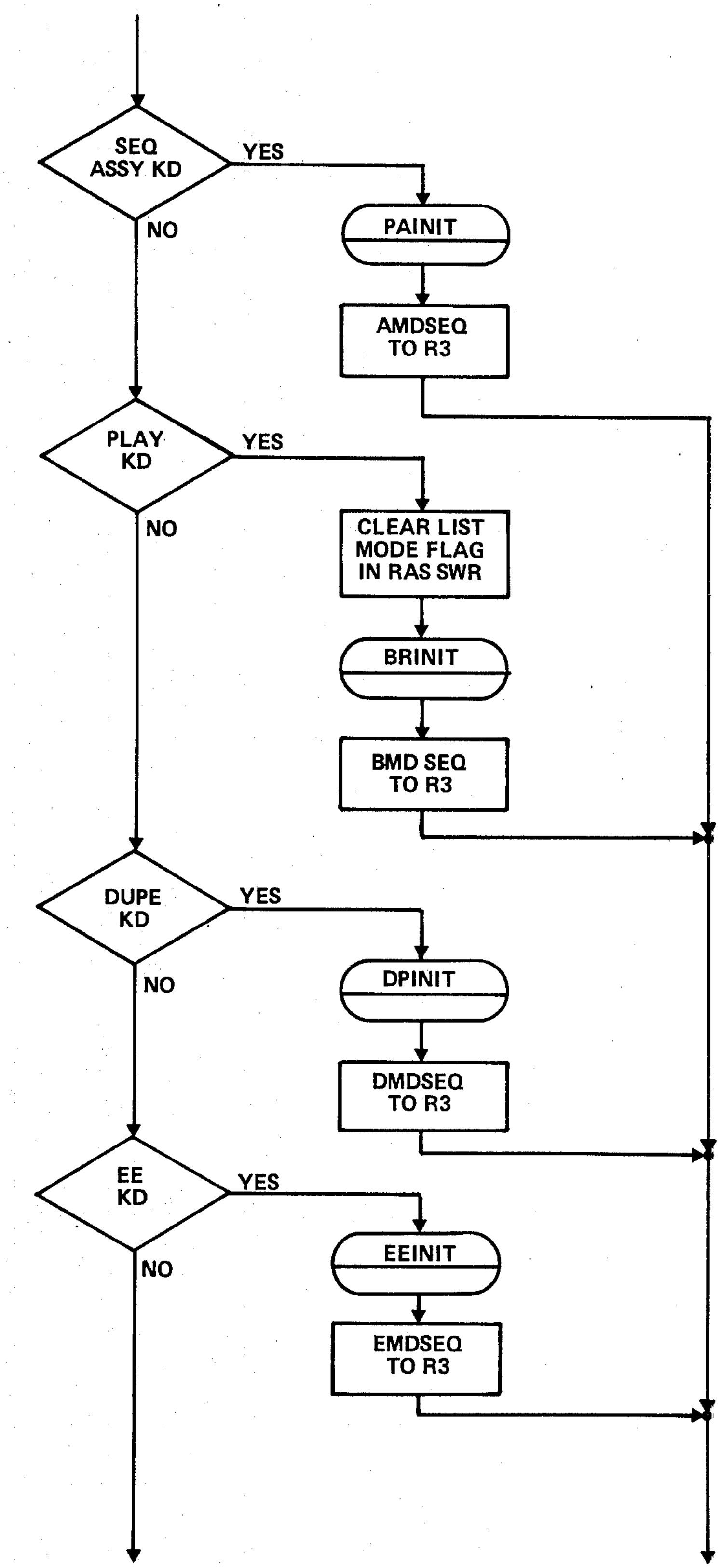
FIG_63RR

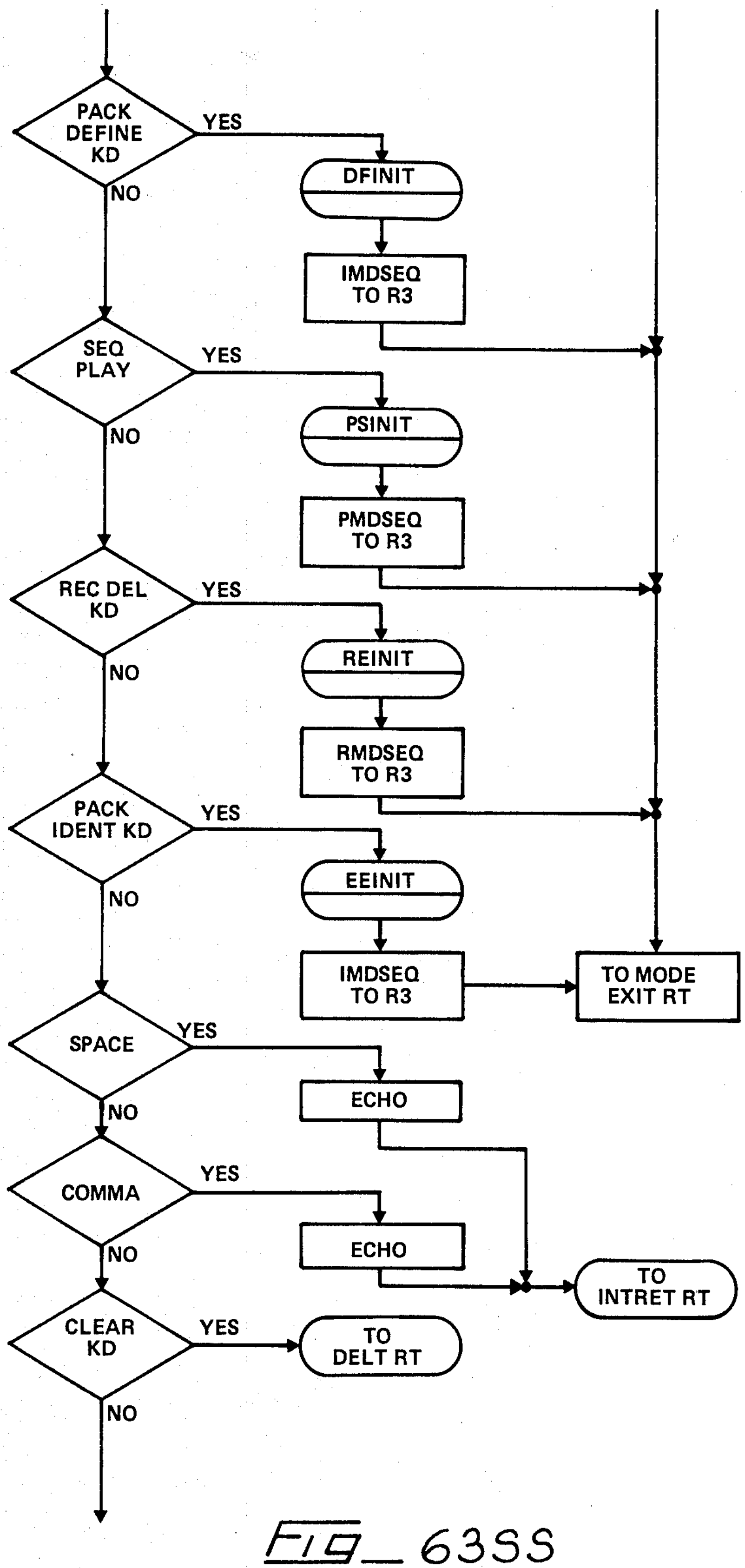
FIG_ 63SS

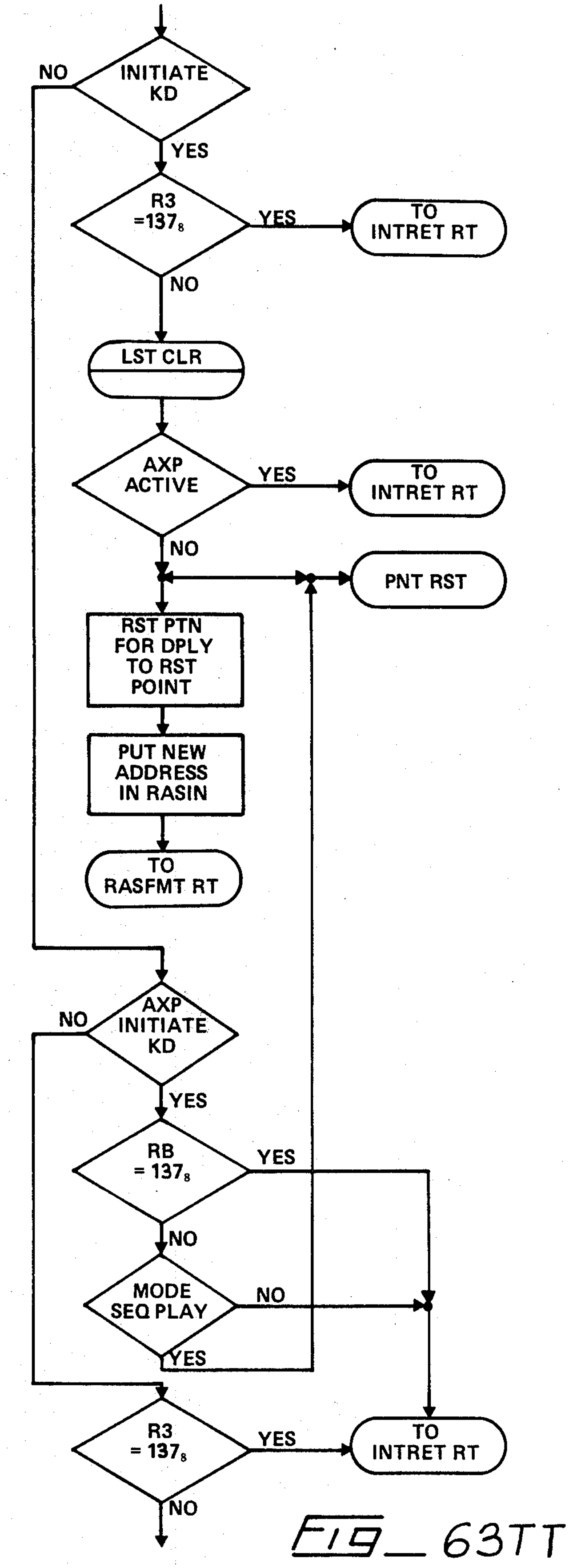
FIG_ 63TT

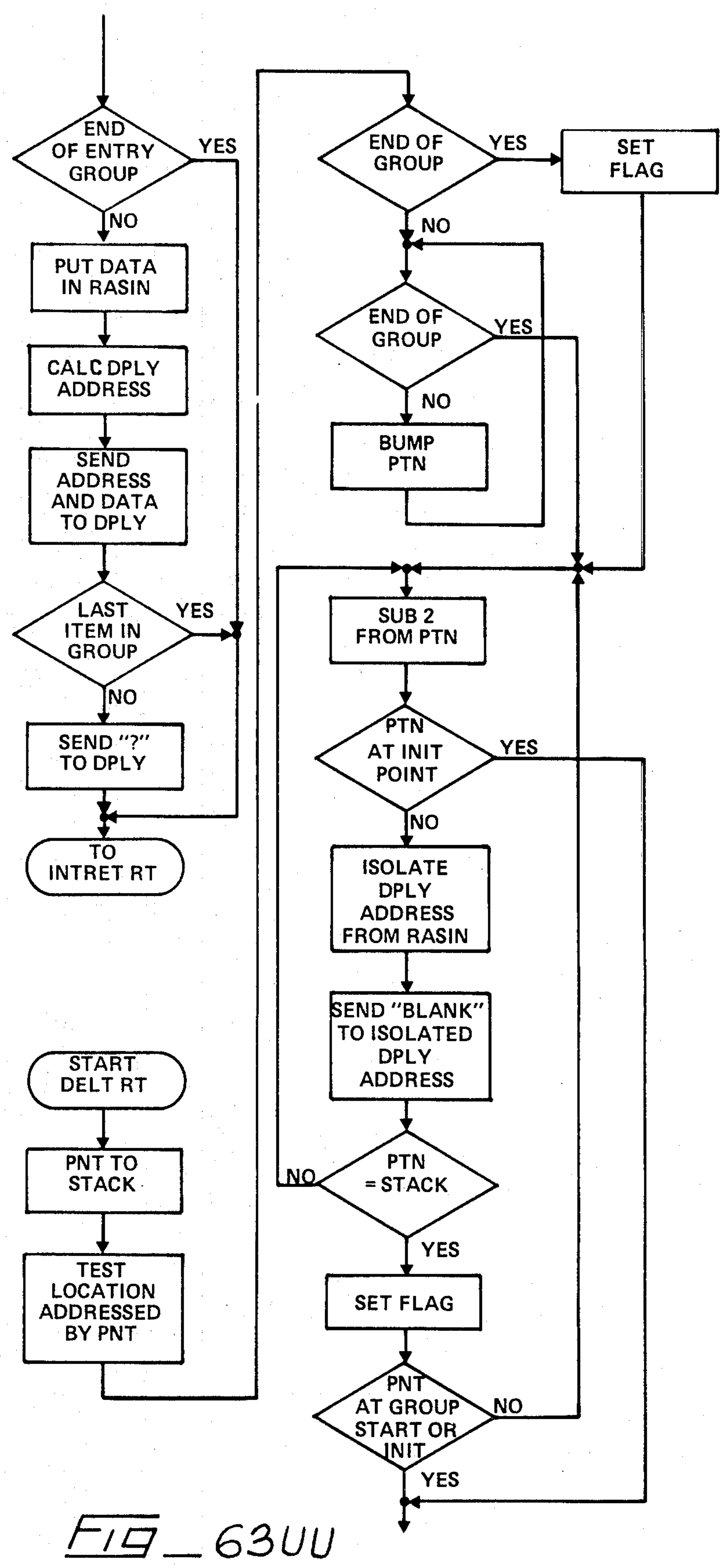
FIG_63UU

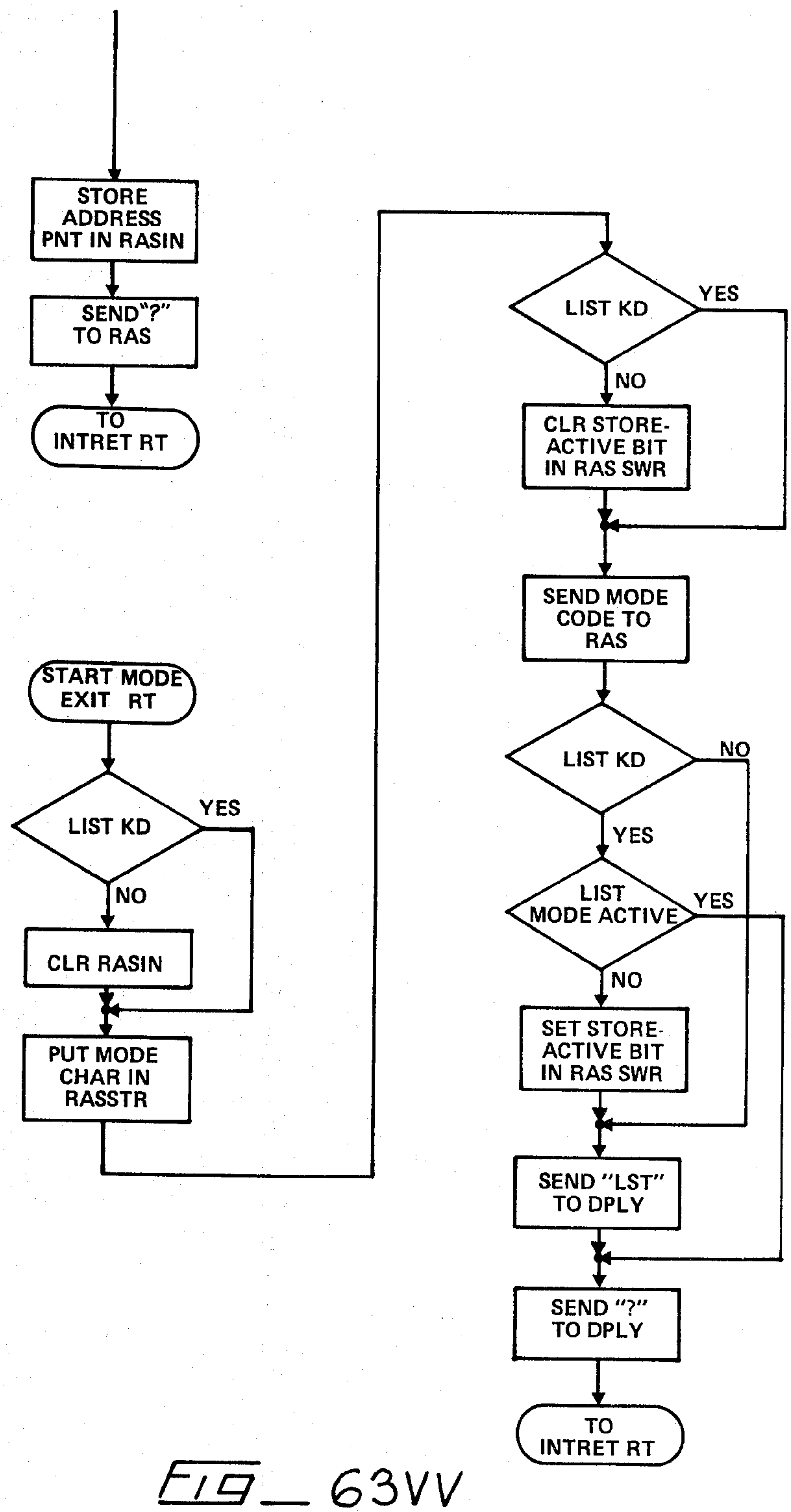
FIG_ 63VV

DIGITAL DATA RATE CORRECTOR AND TIME BASE CORRECTOR

This is a continuation application of Ser. No. 763,762, filed Jan. 28, 1977, now U.S. Pat. No. 4,181,817.

CROSS REFERENCE TO RELATED APPLICATIONS AND PATENTS

VIDEO FRAME STORAGE RECORDING AND REPRODUCING APPARATUS, Ser. No. 763,371, filed Jan. 28, 1977, by Joachim P. Diermann and Thomas W. Ritchey, Jr., now U.S. Pat. No. 4,270,150.

PLAYBACK APPARATUS ASSIGNMENT MEANS, Ser. No. 763,462, filed Jan. 28, 1977, by Howard W. Knight and Edwin W. Engberg, now abandoned.

TELEVISION SIGNAL DISC DRIVE RECORDER, Ser. No. 763,795, filed Jan. 28, 1977, by Howard W. Knight and Edwin W. Engberg, abandoned in favor of continuation application Ser. No. 48,357, filed June 14, 1979, abandoned in favor of continuation application, Ser. No. 48,357, filed June 14, 1979.

DISK DRIVE RECORDING PROTECTION APPARATUS, Ser. No. 763,761, filed Jan. 28, 1977, by Edwin W. Engberg, now abandoned.

TELEVISION SUBCARRIER PHASE CORRECTION FOR COLOR FIELD SEQUENCING, Ser. No. 763,942, filed Jan. 28, 1977, by Luigi C. Gallo, now U.S. Pat. No. 4,145,704.

METHOD AND APPARATUS FOR PROVIDING DC RESTORATION Ser. No. 763,461, filed Jan. 28, 1977, by Luigi C. Gallo, now U.S. Pat. No. 4,122,492.

METHOD AND APPARATUS FOR INSERTING SYNCHRONIZING WORDS IN DIGITIZED TELEVISION SIGNAL DATA STREAM, Ser. No. 763,463, filed Jan. 28, 1977, by Luigi C. Gallo, now U.S. Pat. No. 4,122,477.

PRECISION PHASE CONTROLLED CLOCK FOR SAMPLING TELEVISION SIGNALS, Ser. No. 763,453, filed Jan. 28, 1977, by Daniel A. Beaulier, Luigi C. Gallo, now U.S. Pat. No. 4,122,487.

DIGITAL TELEVISION SIGNAL PROCESSING SYSTEM, Ser. No. 763,941, filed Jan. 28, 1977, by Luigi C. Gallo, now U.S. Pat. No. 4,119,999.

CLOCK SIGNAL GENERATOR PROVIDING NONSYMMETRICAL ALTERNATING PHASE INTERVALS, Ser. No. 763,792, filed Jan. 28, 1977, by Daniel A. Beaulier and Luigi C. Gallo, now U.S. Pat. No. 4,122,478.

PHASE LOCK LOOP FOR DATA DECODER CLOCK GENERATOR, Ser. No. 763,793, filed Jan. 28, 1977, by Kenneth Louth and Luigi C. Gallo, now U.S. Pat. No. 4,180,701.

A CIRCUIT FOR DIGITALLY ENCODING AN ANALOG TELEVISION SIGNAL, Ser. No. 762,901, filed Jan. 26, 1977, by Daniel A. Beaulier, now U.S. Pat. No. 4,075,656.

DATA RATE AND TIME BASE CORRECTOR, Ser. No. 763,794, filed Jan. 28, 1977, by Luigi C. Gallo, now abandoned.

A DIGITAL CHROMINANCE SEPARATING AND PROCESSING SYSTEM AND METHOD, Ser. No. 763,251, filed Jan. 26, 1977, by Robert P. MacKenzie, abandoned in favor of continuation application, Ser. No. 765,563, filed Feb. 4, 1977, now U.S. Pat. No. 4,143,396.

FREQUENCY RESPONSE EQUALIZER, Ser. No. 762,902, filed Jan. 26, 1977, by Jerry W. Miller and Luigi C. Gallo, now U.S. Pat. No. 4,110,798.

A CIRCUIT FOR GENERATING A DIGITAL DELETED DATA, BLINKING CROSS SIGNAL WHICH IS STORED IN A DELETED TRACK AND SELECTIVELY DISPLAYED FOR DETECTION, Ser. No. 762,903, filed Jan. 26, 1977, by Luigi C. Gallo and Junaid Sheikh, abandoned in favor of continuation application, Ser. No. 765,564, filed Feb. 4, 1977, now U.S. Pat. No. 4,130,842.

BACKGROUND AND FIELD OF THE INVENTION

The present invention generally relates to recording and reproducing apparatus and, more particularly, to apparatus that is adapted to record and reproduce television signals, using digital techniques.

The continued advances in technology have resulted in many changes in the equipment that is currently being used in television broadcast stations. One of the more recent changes that has evolved is the shift away from photographic techniques toward the use of magnetic media in many phases of the operation of the commercial broadcast television station. For example, feature films being broadcast often originate from magnetic tape rather than film and television station news departments are increasingly converting to videotape recording systems rather than using film cameras to provide the visual coverage of the news stories. Moreover, many systems utilize travelling transmitters that can either broadcast on location coverage or transmit such coverage to the station which can either be broadcast "live" or videotaped, edited and broadcast at a later time. Some of the many benefits of these techniques are the ease of handling, flexibility and speed of processing compared to the use of photographic film, coupled with the ability to reuse the magnetic tape when the information that is recorded on them is no longer needed.

One of the last remaining film domains in the present day commercial television broadcasting station is the Telecine island which uses 35 millimeter film transparencies. The Telecine island is used to provide video still images that are used during programming, commercials, news and the like, i.e., wherever a still image may be used during operation. Their use is extensive as is evidenced by the fact that the average commercial broadcast television station maintains a total file on the order of about 2000 to 5000 35 millimeter transparency slides. The maintenance of the total file represents a laborious operation which requires introduction of new slides, the discarding of obsolete slides and the maintenance of an accurate index so that they can be readily obtained when needed. When slide program sequences are to be assembled, they must be manually carried to the Telecine island, cleaned and manually loaded. Even with the cleaning operation, dust particles and scratches and the like may easily result in an unsatisfactory end product even when the projectionist is careful. Moreover, following their use during broadcasting, the slides must be removed and returned to the file. The entire assembling, use and refiling of the slides represents a substantial labor investment because of the many manual operations that are required. The Telecine operation is considered to be one of the most antiquated operations in many modern broadcast stations and is basically incompatible with a fully automated station operation.

In contrast to the Telecine island or the use of opaque graphic material as the source for generating video still images, the present invention described herein facilitates the use of a recording and playback apparatus that will record and reproduce still images, with the still image video information being stored on magnetic media. The magnetic recording and playback apparatus utilizes generally standard computer disk drives (though modified in some respects) as the magnetic storage media and thereby eliminates the many problems that are associated with slide transparencies. Since the still images are recorded on magnetic media, the problems of physical degradation during use, e.g., dust particles and scratches, are not experienced. Moreover, since the recorded information can be easily accessed, the same still image may be used by operators at different locations almost simultaneously.

The present invention is an apparatus for correcting timing disturbances or errors in digital data streams that is particularly suited for correcting such errors introduced to digitized color television signals by signal recording and reproducing processes. In accordance with the present invention, the data rate of the digitized data stream is first synchronized to the rate of a reference rate signal. Following the synchronization of the data rate, the digitized data stream is synchronized to the occurrence of a periodic reference time signal. To achieve the synchronizations, the digital data stream is provided with a periodically occurring selected sequence of digital data bits in phase with the digital data for controlling the two synchronizations. The apparatus for performing the synchronizations includes a first digital data memory for temporarily storing the stream of digital data. The digital data is entered into the memory for storage at a rate determined by a first clock signal and is retrieved from storage at a rate determined by a second clock signal. One of the two clock signals is at a rate that varies in accordance with the timing errors and the other of the two clock signals is at a reference rate. The relative times of entering and retrieving digital data from storage in the first digital data memory are initially set according to the occurrence of the selected sequence of digital data bits contained in the digital data. As a result of the aforedescribed control of the entering and retrieving of the digital data in the first digital data memory, the digital data is at a rate that is synchronized to the reference rate.

If the digital data retrieved from the first digital data memory also is to be synchronized to a periodic reference time signal, the retrieved data is coupled to a second digital data memory for further temporary storage for an interval determined by the time difference between the occurrences of the selected sequence of digital data bits and the reference time signal. With the second digital data memory, the digital data stream can be synchronized with respect to both a reference rate signal and a periodically occurring reference time signal. The apparatus of the present invention is particularly suited for correcting timing disturbances present in color television signals because it facilitates correcting the disturbances with respect to a reference chrominance subcarrier signal and a reference horizontal line rate related signal. Furthermore, the apparatus enables the convenient correction of timing disturbances in a plurality of digital data streams by providing two digital data memories for each of the data streams and controlling all of the memories to synchronize the data streams relative to a common reference rate signal and a common reference time signal.

OBJECTS OF THE INVENTION

Accordingly, it is an object of the present invention to provide an improved apparatus for correcting timing disturbances in data signals.

Another object of the present invention is to provide an improved apparatus of the above type for correcting timing disturbances contained in a plurality of digital data streams.

Yet another object of the present invention is to provide an improved apparatus of the above type that facilitates correcting timing disturbances in a color television signal.

Other objects and advantages will become apparent upon consideration of the following description and claims in conjunction with the accompanying drawings.

DESCRIPTION OF THE DRAWINGS

FIG. 10B is a timing diagram for the PALE Flag generator included in the reference logic circuitry shown in FIG. 10A.

FIG. 13A is a functional block diagram of the data rate and time base corrector circuitry which is a portion of the signal system shown in FIG. 8A;

FIGS. 13B and 13C are timing diagrams for the data rate and time base corrector circuitry shown in FIG. 13A;

FIGS. 15A, 15B, 15C and 15D together comprise an electrical schematic diagram of the input circuitry of the signal system shown in the block diagram of FIG. 9;

FIGS. 17A, 17B, 17C and 17D together comprise electrical schematic diagrams of the reference clock generator of the signal system shown in the block diagrams of FIG. 11A;

FIGS. 18A, 18B, 18C and 18D together comprise an electrical schematic diagram of the encoder and sync word inserter circuitry of the signal system shown in the block diagram of FIG. 12;

FIG. 18E is a timing diagram illustrating the operation of the data encoder circuitry shown in FIGS. 18A, 18B, 18C and 18D;

FIGS. 19A, 19B, 19C and 19D together comprise an electrical schematic diagram of the data decoder and the data rate and time base corrector circuitry of the signal system shown in the block diagram of FIG. 13A;

FIG. 19E is a timing diagram illustrating the operation of the data decoder circuitry shown in FIGS. 19A and 19B.

Figure 1:
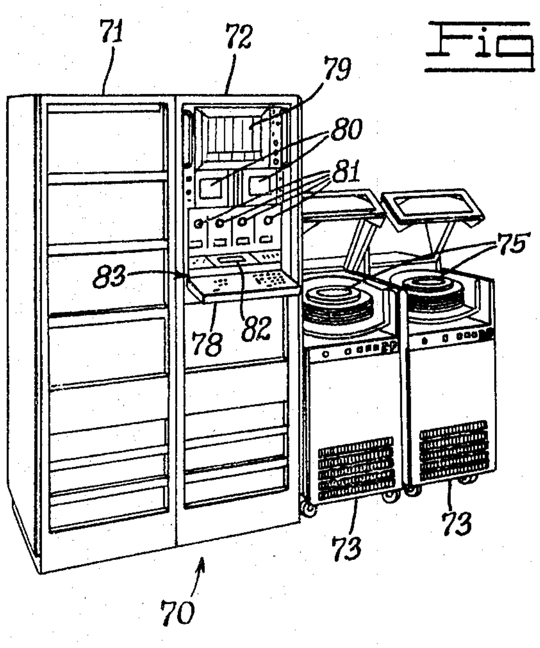
FIG. 1 is a perspective view of the apparatus embodying the present invention, illustrating its overall appearance, including the internal access station and two disc drive units.

The data rate corrector and time base corrector of the present invention will be described herein as used in the recording and reproducing apparatus, indicated generally at 70 in FIG. 1 which includes two bays 71 and 72 containing electrical circuitry associated with the apparatus, together with the various monitoring and control hardware shown specifically in the upper portion of the bay 72. The apparatus also includes a pair of disc drives 73 located adjacent the rightward bay 72 with each of the disc drives 73 having a disc pack 75 mounted thereon. While two disc drive units are specifically illustrated in FIG. 1, it should be understood that there may be additional disc drives used with the system to increase the on-line storage capacity of the apparatus. It should also be appreciated that a single disc drive may be used. Operational control of the apparatus is performed by one or more operators using either one of many remote access stations, such as the remote access station 76 shown in FIG. 2, or an internal access station 78 which is located in the bay 72. If desired, a video monitor 79, vector and "A" oscilloscopes 80 may be provided as shown in bay 72. Phase control switches 81 are provided above the internal access station 78.

Figure 2:
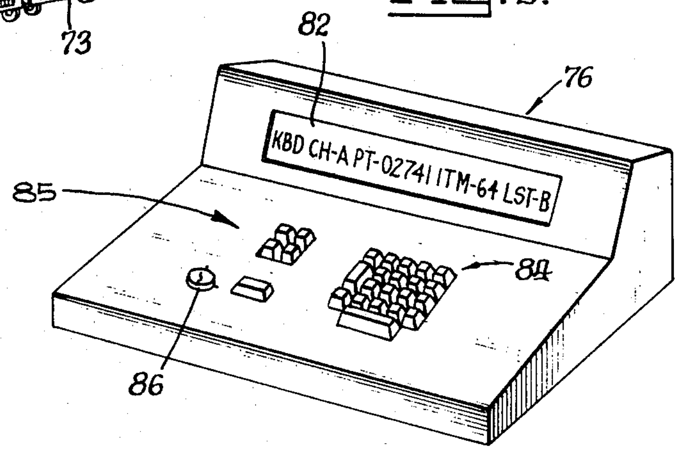
FIG. 2 is an enlarged perspective view illustrating a representative remote access station that an operator can use to control the operation of the apparatus of the present invention.

The apparatus is controlled by an operator using either the internal access station 78 or a remote access station 76, both types of which have a keyboard with numerical and function keys and bars, a 32 character display 82, which provides a readout of information that is needed to carry out functional operations during use, as well as to display the information concerning the identity of certain stills being addressed and other information. It should be understood that the remote access station 76 shown in FIG. 2 is representative of each of the remote access stations and that in the preferred embodiment, up to seven remote access stations can be used to control the apparatus 70. The internal access station keyboard indicated generally at 83 in FIG. 1, as shown in the enlarged fragmentary view in FIG. 3, has more expanded operational capability than the remote access stations, whose keyboards have fewer function keys. As will be explained in detail hereinafter, the keyboard contains a large cluster of keys indicated generally at 84 and a smaller cluster of function keys 85 located on the left side of the keyboard. Additionally, a turn key controlled switch 86 may be provided to switch between normal and delete operations to safeguard against the possibility of inadvertent or unauthorized erasure of actively used stills.

Figure 4:
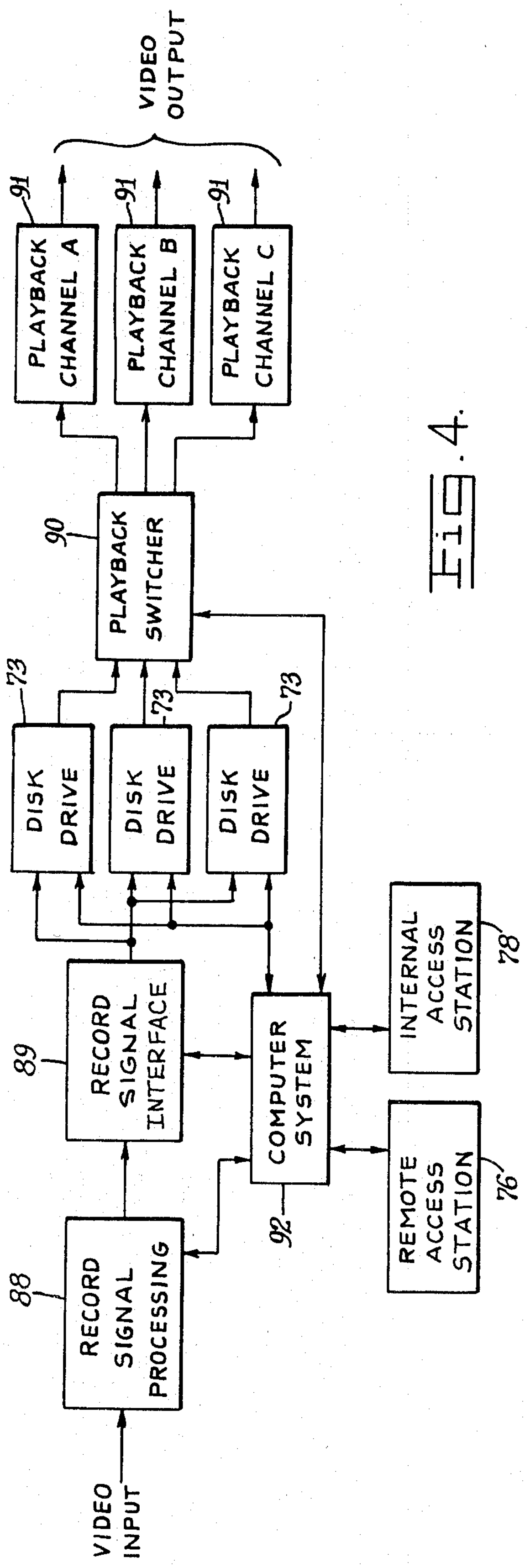
FIG. 4 is a broad functional and simplified block diagram of the entire apparatus of the present invention.

Referring to the very simplified block diagram shown in FIG. 4, the apparatus receives a video input signal which is processed by record signal processing circuitry 88 and is then applied to record signal interface circuitry 89 which directs the signal to all of the disc drives 73. Gating circuitry located within a selected disc drive 73 is enabled to allow the signal to be recorded on a selected drive. More than one disc drive 73 can be simultaneously selected for recording the video signal provided by the record signal interface circuitry 89. Switcher circuitry can be substituted for the signal interface and associated gate circuitry so that the signal provided by the record signal processing circuitry 88 is coupled only to selected disc drives having the disc packs 75 upon which the signal is to be recorded. During playback, a signal originating from one of the disc drives is applied to the playback switching circuitry 90 which directs it to one of the playback channels 91, each of which provides a video output channel. A computer control system 92 is interfaced with the record processing circuitry, signal interfacing and switching circuitry and disc drives for controlling the overall operation of the various components of the apparatus and also interfaces the remote access stations and internal access station. The circuit details of the computer control system 92 and of the access stations 76 and 78 for controlling the recording and reproducing apparatus 70 is described in the above-identified application, Ser. No. 763,371, now U.S. Pat. No. 4,270,150. An operator can select a particular disc in which to store a still, provided that the disc pack is online, i.e., it is physically loaded on one of the disc drives 73. In this regard, it should be understood that the apparatus addresses disc packs rather than disc drives for the reason that the apparatus is adapted to identify up to 64 separate disc packs, only one of which can be located on a disc drive at any one time. Thus, in the event the apparatus has two disc drives, only two disc packs can be online at one time. The operator can use an access station keyboard 83 to enter the address of a disc pack upon which he wishes to record a still and, through the interaction of the computer with the disc drive on which the selected disc pack is loaded, can carry out the recording operation on the selected on-line disc pack. Similarly, an operator can play back a still frame from the disc pack on one of the disc drives and can define the playback channel that he wishes the still frame to be played through.

The apparatus has four major operating modes or conditions, i.e., (1) record/delete, (2) playback or reproduce, (3) sequence assembly and (4) sequence play. The record and play operations will be initially described, while referring to FIGS. 6 and 7 which illustrate somewhat simplified block diagrams of the signal flow paths during recording and playback, respectively, with respect to one of the disc drives 73.

Figure 6:
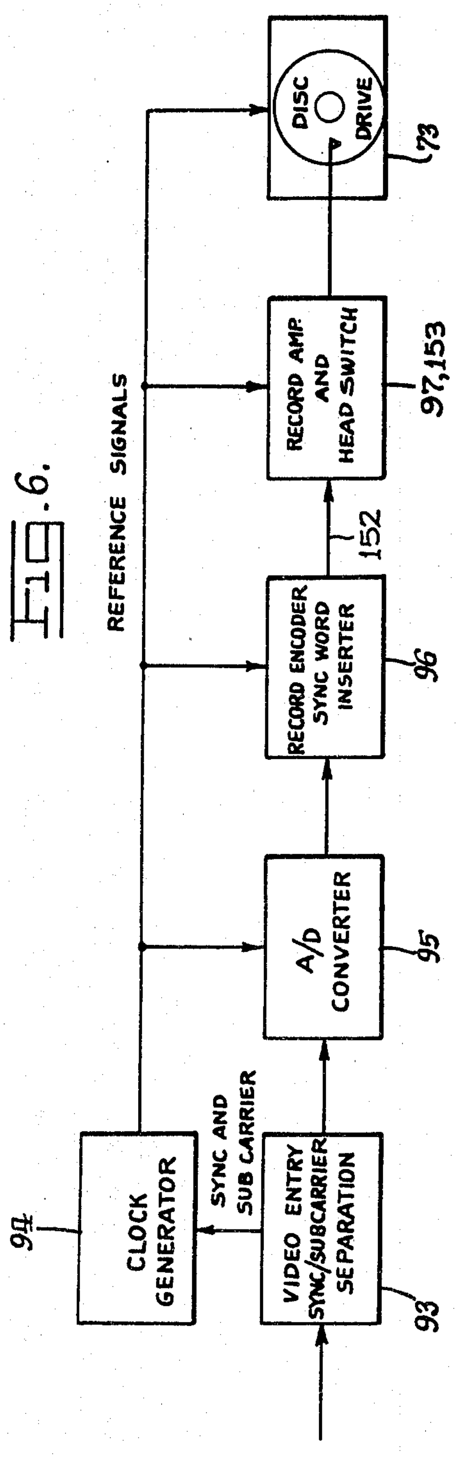
FIG. 6 is a functional block diagram broadly illustrating the signal flow path through the apparatus during a record operation.

Turning first to the record signal flow block diagram of FIG. 6, the composite video input signal is applied to the input stage circuitry 93 where clamping of the signal takes place and the synchronization and subcarrier components are stripped from the composite video signal. The input stage also regenerates the synchronization (hereafter often referred to merely as "sync") and subcarrier signals for later use during reproduction and, accordingly, the regenerated sync and subcarrier signals are directed to a clock generator 94 which also generates reference signals that are used by the downstream elements during operation. The clamped analog video signal with the color burst component is then applied to an analog-to-digital converter (A/D) 95 which provides an output signal at a sample rate of 10.7 megasamples per second, with each of the samples comprising 8 bits of information. The digital video signal is a nonreturn to zero code (NRZ) which means that it is a binary code defining a ONE as a high level and a ZERO as an equivalent low level. The digitized video signal appears on 8 parallel lines, i.e., one bit per line, which is applied to an encoder and sync word inserter 96 which converts the digitized video into a special recording code (referred to herein as a Miller code or a Miller squared code) that is particularly suitable for digital magnetic recording in that it minimizes DC content of a data stream. The circuitry also inserts a synchronizing word on alternate television lines with respect to a particular phase angle of the color subcarrier as represented by the color burst sync component. The sync word is used as a reference for correcting time base and skewing errors that occur during playback among the eight parallel bits of data that must be combined to define the value represented by each sample. The digital video information in the eight parallel lines is then applied to a recording amplifier circuitry 153 and head switch circuitry 97 associated with the selected disc drive 73 which switches between two groups of eight recording heads for recording the digitized video signal by the disc drive. The disc drive is servo controlled so that its spindle rotational speed is locked to vertical sync, with the rotational disc speed being 3600 revolutions per minute. By locking the spindle drive to vertical sync, the apparatus records one television field per revolution of the disc pack and simultaneously records the eight data streams on eight disc surfaces. At the completion of recording one field, the recording amplifier circuitry 153 and head switch circuitry 97 is commanded to activate another set of heads for simultaneously recording the second field of a television frame on another set of eight disc surfaces so that a picture frame i.e. two interlaced television fields is recorded on two revolutions of the disc drive, using 16 heads. Each disc pack located on a disc drive preferably contains 815 cylinders, each of which has 19 recording surfaces and can therefore store 815 digital television frames. There is one read/write head for each of the 19 disc recording surfaces of a disc pack and all heads are mounted vertically aligned on a common carriage whose position is controlled by a linear motor. It should be understood that a cylinder is defined to comprise all recording surfaces that are located on the same radius of a disc pack. However, the term track, rather than cylinder, is preferred herein and, accordingly, a track is meant to include all recording surfaces on a same radius, i.e., all surfaces on a cylinder. Thus, an addressed track for recording or playing back a still actually refers to the 19 individual surfaces on the cylinder available at that radius. Of the 19 surfaces that are available for recording, one is used to record the address and other housekeeping information, rather than active video information, and it is specifically referred to as the "data track". Two of the 19 surfaces are available for recording a parity bit and 16 surfaces are used to record the picture frame of video data. Also one of the heads, generally referred to as the servo head, travels on the 20th disc pack surface that contains only servo track information prerecorded by the pack manufacturer. The servo tracks carry out two functions, i.e., following a seek command the head stack traverses servo tracks that are counted to determine the instantaneous location of the heads and, after completion of a seek phase, the servo head generates an error signal that is used to control the linear motor position to hold the head carriage centered on the appropriate servo track. By using such a feedback system, it is possible to achieve a radial packing density of about 400 tracks per inch or a total of 815 tracks per disc pack.

Since the present apparatus does not record analog video signals because of frequency response limitations of disc pack memories, the video signal is digitized for recording. Because the digitized signal is recorded, the video signal to noise ratio of the system is primarily determined by quantization noise rather than recording media and preamplifier noise as is the case with conventional videotape recorders. Thus, the present apparatus delivers a signal to noise ratio of about 58 dB and effects such as moire and residual time base error do not exist, the digital random error of the storage channels being typically low enough to make occasional transmission errors virtually invisible.

By recording a digital data stream at a rate of 10.7 megabits per second on each of the eight disc surfaces, the linear packing density of the apparatus is about 6000 bits per inch which is about 60% greater than is used in conventional disc drive usage in data processing. The circuit details of the complete record circuitry and the disc drive control circuitry for record operations are described in the above-identified application, Ser. No. 763,371, now U.S. Pat. No. 4,270,150.

Figure 7:
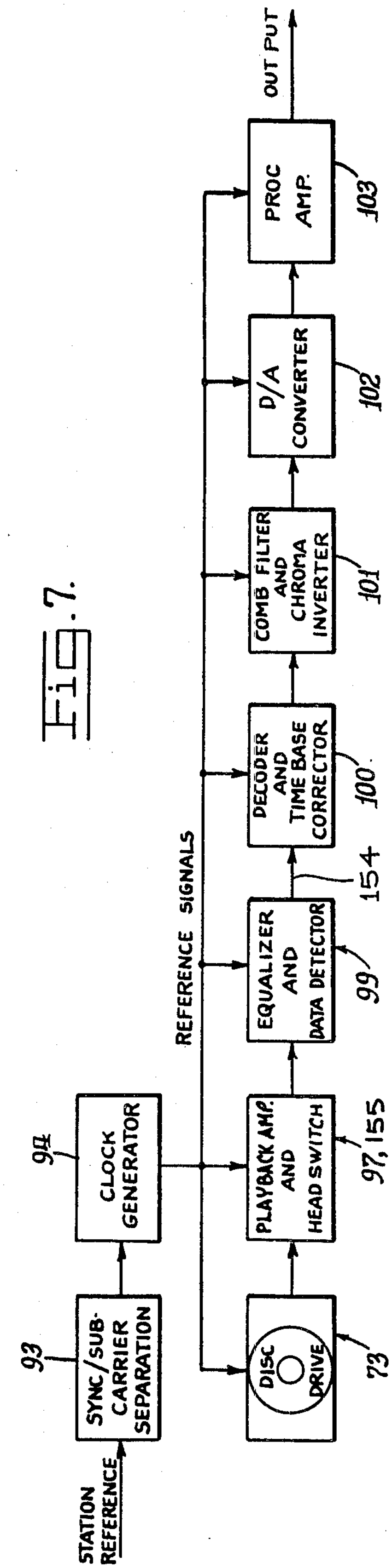
FIG. 7 is a functional block diagram broadly illustrating the signal flow path through the apparatus during a playback operation.

During playback and referring to FIG. 7, the heads read, i.e., reproduce the digital video information from the eight surfaces per field and obtain the recorded channel encoded digital video signal from the two fields forming each picture frame. The reproduced signal is applied to a playback amplifier circuitry 155 and head switch circuitry 97 associated with the selected disc drive 73 which amplifies the data streams of digital video information carried by the eight data bit lines and applies the same to equalizer and data detector circuits 99. The equalizer compensates for phase and amplitude distortion introduced to the signal by the band limiting effects of the record and reproduce processes and insures that the zero crossings of the reproduced signal are distinct and accurately positioned. Following equalization, the channel encoded signals in each data bit line are processed as described hereinbelow for transmission to the playback circuitry of the signal system over a twisted pair line. The processed channel encoded signals are in the form of a pulse for each zero crossing or signal state transition of the channel encoded signal. The twisted pair lines for the eight data bits of the digital video information apply the processed channel encoded signals to the decoder and time base corrector circuitry 100 of one or more of the playback channels 91 of the apparatus. The decoder and time base corrector circuitry 100 reprocesses the received signals to place them in the channel encoded format, decodes the signal to the non-return to zero digital form and in accordance with the present invention, time base corrects the digital signal with respect to station reference to remove interdata bit line time displacement errors (commonly referred to as skew errors) and timing distortion within each of the data streams carried by the data bit lines. To facilitate processing of the reproduced signals, phase continuous clock signals are used to time the operation of the decoder and time base corrector 100 and following circuitry. As will be explained in more detail hereinbelow, this prevents the time base corrector portion of the circuitry 100 from correctly positioning the synchronization word in alternate reproductions of the picture frame. Thus, the time base corrector of the present invention included in the circuitry 100 serves to align the eight bits defining a single sample and remove timing distortion in each of the data bit lines relative to station reference. However, the aforementioned mispositioning of the synchronization word would lead to horizontal displacement of the picture frame upon alternate reproductions and resulting visible jitter in the displayed video image. It should be realized that each playback channel 91 is provided with decoder and time base corrector circuitry 100 and within each playback channel each of the eight data bit streams travels through a separate decoder and time base corrector. The output of the circuitry 100 is then applied to a comb filter and chroma inverter circuitry 101 which separates the chroma information and selectively inverts and recombines the signal for reconstruction of a four field NTSC sequence. This reconstructed digital signal is applied to circuitry 127, which adjusts for the mispositioning of the synchronizing word in alternate reproductions of the recorded two fields of the video information and applies the adjusted video signal to a digital-to-analog converter 102 which provides an analog video signal. The new sync and burst are then added by a process amplifier 103 to produce a composite video analog output signal of the playback channel 91 as is desired. The circuit details of the complete playback circuitry and the disc drive control circuitry for playback operations are described in the above-identified application Ser. No. 763,371, now U.S. Pat. No. 4,270,150.

While the signal flow paths for both the recording and playback operations have been briefly and broadly described, the signal processing system for the composite television signal is much more detailed than is shown by the signal flow diagrams contained in FIGS. 6 and 7. The video signal system will now be described in greater detail in conjunction with the block diagram illustrated by FIGS. 8A and 8B which contains additional blocks than previously identified. However, the reference numbers previously identified will remain where corresponding functions are performed. The block diagram of FIGS. 8A and 8B also includes wider lines representing the video data flow through the signal system as well as other interconnecting lines that are necessary for controlling the timing and synchronization of the circuitry represented by the various blocks. The input and output lines from the various blocks in FIGS. 8A and 8B which have an asterisk adjacent to them are lines which extend to the computer control system 92.

Figure 5A:
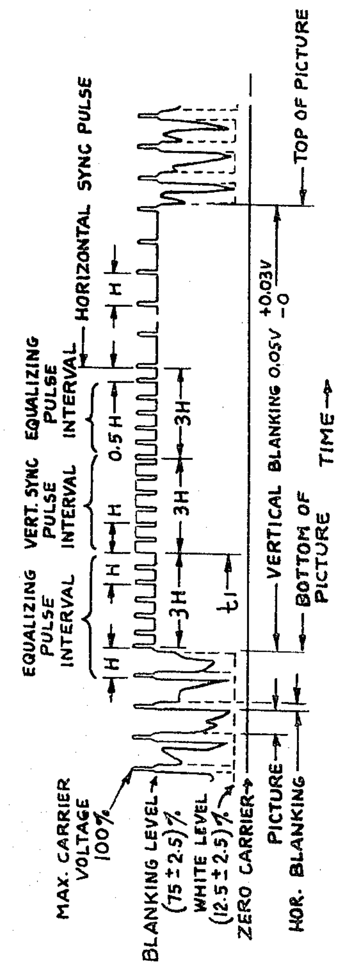
FIG. 5A illustrates a portion of a typical television signal illustrating the vertical interval thereof.
Figure 5B:
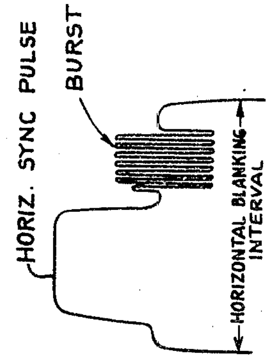
FIG. 5B illustrates a portion of a color television signal, particularly illustrating the horizontal synchronization pulse and color burst signal.

It should also be understood that the apparatus of the present invention will be described herein with respect to use in an NTSC system which has a television field comprised of 525 lines, horizontal synchronizing pulses occurring at a rate of about 15,734 Hz (often referred to herein as "H sync") which means that the period between successive H pulses is approximately 63.5 microseconds. Moreover, the vertical blanking rate in the NTSC system occurs at a 60 Hz frequency and the chrominance information is modulated on a subcarrier signal having a frequency of about 3.58 megahertz (MHz). Because of the relationship of the color subcarrier phase with respect to horizontal sync, NTSC color signals have a four field sequence, which is commonly referred to as a color frame. The subcarrier frequency of 3.58 MHz will often be referred to herein simply as SC which means 1 times the subcarrier frequency and, similarly, other commonly used clocking frequencies in the described apparatus include ½SC, 3SC and 6SC. The 3 times subcarrier frequency (3SC) often occurs for the reason that during sampling of the analog composite video signal for digitizing the signal, a sampling rate of 3 times the subcarrier frequency, i.e., 10.7 MHz is used. The composite video signal of an NTSC system is illustrated in FIGS. 5A and 5B.

Referring again to FIG. 8A, but before discussing the functions of each of the blocks shown therein, some broad general considerations should be understood with respect to the overall operation of the illustrated signal system. Firstly, the video input signal that is fed to the video input circuitry 93A is an analog signal which is processed and applied to an analog-to-digital converter 95. The output of the converter contains the video information in digital format and the digitized data is further processed and recorded on a disc pack in a digital format. Similarly, it is played back from the disc pack, time base corrected and chroma separated and processed using digital techniques and is not converted to an analog signal until one of the final steps where the digital-to-analog converter and sync and burst insertion circuitry 102, 103 provides the analog composite video output as shown.

In the analog-to-digital converter 95, the analog composite video signal is sampled three times per nominal subcarrier cycle, or at a sampling rate of 3SC (10.7 MHz), and each sample is digitally quantized into an 8 bit digital word. A sampling clock having a frequency of three times or any odd multiple of the NTSC subcarrier frequency is necessarily an odd multiple of one-half of the horizontal line frequency. If such a sampling clock is phase continuous from line to line, its phase at the start of consecutive lines changes. Using such line to line phase continuous sampling clocks will result in the instantaneous amplitude of the analog signal being sampled during consecutive lines at different times relative to the start of the consecutive lines. Because of this, the quantized samples are not in vertical alignment from line to line. Vertical alignment of the samples from line to line is desired to facilitate the use of a digital comb filter to obtain a separated chrominance component of a television signal by combining quantized samples from three consecutive (all odd or all even fields) television lines of a television field, which may be designated T (for top), M (for middle), and B (for bottom) in proportion to the formulae (Chrominance) $C=M-\frac{1}{2}(T+B)$ (Luminance) $Y=M+\frac{1}{2}(T+B)$.

It should be appreciated that if the samples of the NTSC television signal are taken at an even multiple of the subcarrier frequency, the comb filtering technique would be ideal because the phase of the sampling clock would not change from line to line. Hence, the digital code words or quantized samples would describe the instantaneous amplitudes of each line of the analog signal at the same times relative to the start of each line and all of the samples in three consecutive lines would be aligned vertically from the top to middle to bottom lines.

Figure 8:
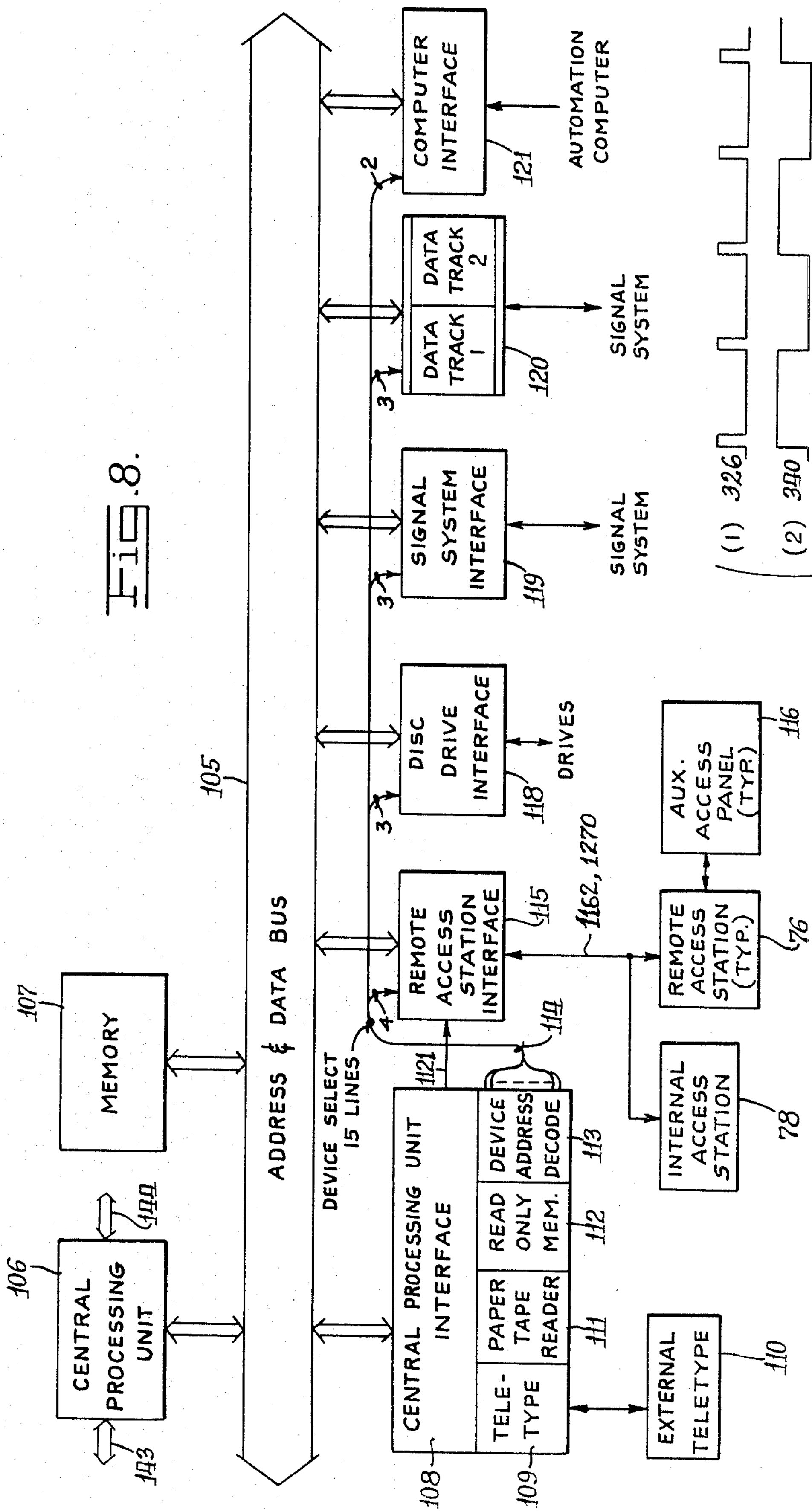
FIGS. 8A and 8B together comprise a block diagrams illustrating the signal system for the apparatus of the present invention, including control interconnections between the various blocks.
FIG. 8C is a timing diagram illustrating sampling of a television signal and phase relationships that occur at different locations of the signal system.
Figure 9C:
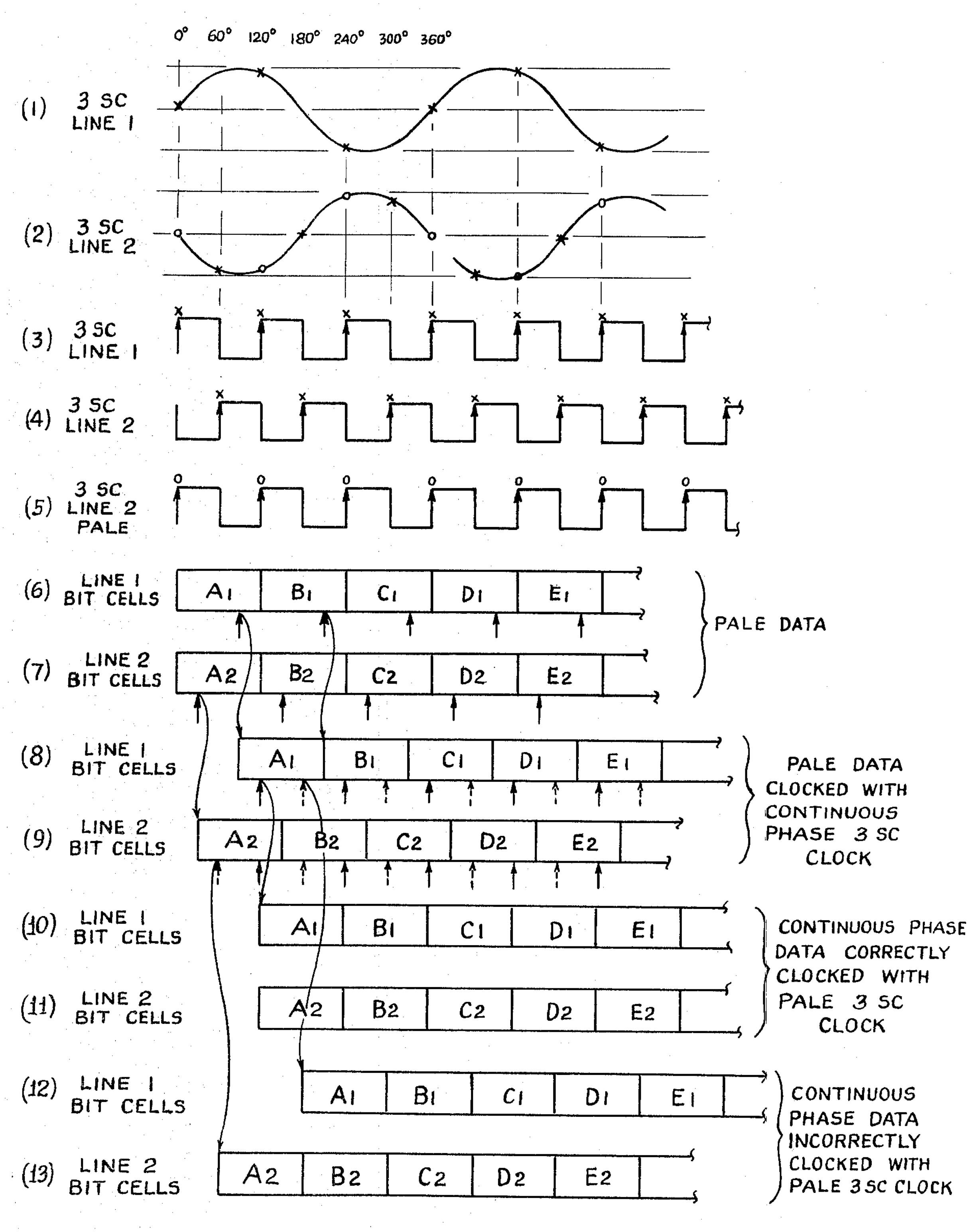
FIG. 9 is a functional block diagram of the video input circuitry (substantially similar to the reference input circuitry) which is a portion of the signal system shown in FIG. 9A.

The lack of vertical alignment of the samples of consecutive lines when using a 3SC, line to line phase continuous sampling clock can be more readily appreciated with reference to FIG. 8C(1) which shows a number of cycles of subcarrier in television line 1 that are sampled by the positive transition of a 3SC sample clock (FIG. 8C(3)) wherein the upward transition has an arrow depicting an "X" sample point that is also placed on the subcarrier for television line 1 at every sample point (FIG. 9C(1)). As shown, there are three samples for each cycle of the subcarrier. However, during television line 2, i.e, the next consecutive line, the subcarrier has a reversed phase as shown in FIG. 8C(2) and similarly, the sampling clock 3SC is of opposite phase (FIG. 8C(4)) relative to its phase in line 1 (FIG. 8C(3)) so that during television line 2 the samples are taken where shown by the X's of the television line 2 subcarrier (FIG. 8C(2)) on the upward transitions and it is seen that the X samples from line 1 to line 2 are misplaced by 60° with reference to SC, which detrimentally affects the response of the comb filter, which utilizes the instantaneous amplitude of the analog signal in the above mentioned equations for properly deriving the chrominance information. It should be appreciated that the samples taken on all odd lines will be vertically aligned and that the samples taken on all even lines will be vertically aligned but that the samples taken on even lines will be displaced 60° with reference to SC relative to those samples on the odd lines.

To avoid the problem created by sampling at an odd multiple of subcarrier frequency, i.e., 3SC in the present apparatus described herein, vertical alignments of samples in all lines can be achieved by changing the phase of the sampling clock on alternate lines. In the examples shown in FIG. 8C, reference is made to FIG. 8C(5) which illustrates the 3SC sampling clock for television line 2 which has its phase reversed relative to what it would have been for television line 2, which is shown in FIG. 8C(4). By sampling on the upward transitions at the "0" sample points, samples marked by the "0" on the subcarrier for line 2 result as shown in FIG. 8C(2). Thus, the sample points in the subcarrier for television line 1 ("X's") are vertically aligned relative to the sample points ("0's") that are sampled using the alternated phase sample clock shown in FIG. 8C(5) rather than what would have normally occurred as shown by FIG. 8C(4). This technique is commonly referred to as phase alternate line encoding or PALE and the terms PALEd, PALEing and the like will commonly be referred to throughout the description of the apparatus described herein.

While the apparatus described herein utilizes comb filtering techniques together with a sampling rate of 3SC or 10.7 MHz and requires the use of a PALE sampling clock, it should be appreciated that a 4SC sampling frequency would eliminate the need for PALEing. The use of a 4SC sampling frequency is within the contemplation of the apparatus described herein in the event that the frequency response of the recording media, i.e., the disc packs on the disc drives is sufficient to permit operation at the 4SC, 14.3 MHz frequency. In this regard, it is to be appreciated that standard disc drives used in data processing applications typically operate in the range of about 6½ megabits and the recording at a rate of 10.7 megabits represents a significant increase in the packing density of the disc packs themselves.

Another important aspect of the operation of the present apparatus that is a result of the use of PALEing will also be described with respect to FIG. 8C. By changing the phase of the sampling clock on every consecutive line, a phase discontinuity necessarily occurs with respect to SC. It is more convenient during the channel encoding of the signal for use in subsequent recording to channel encode the digitally quantized samples with respect to a continuous phase clock, i.e., no phase discontinuities from line to line. For this reason during recording, the PALEd data that results at the output of the analog-to-digital converter 95 is clocked out of the channel encoder 96 with a clock that has a continuous (i.e., no discontinuities) 3SC phase from line to line. However, clocking the encoder with a line to line continuous phase clock shifts the data in time on alternate lines by ½ cycle of 3SC, which disturbs the line to line sample time alignment created by sampling with a PALE clock. Since during playback the chroma processing circuitry requires the samples of data to be vertically aligned from line to line, which was the reason that a PALE sample clock was used in the analog-to-digital converter in the first place, it is necessary to retime or reclock the data from the continuous phase clock back to the PALE clock so that the sample time disturbance is removed and the chroma processing comb filter can process the data without error. Succinctly stated, the A/D converter 95 samples the analog signal using a PALE clock having line to line phase discontinuities. For recording, the channel encoder 96 encodes the PALE data with a line to line continuous phase clock, which requires, during playback and after decoding, the retiming of the NRZ information to a PALE clock for use by the chroma processing circuitry. However, the latter retiming from a continuous to a PALE clock is not performed during transfer modes of operation when the video data recorded on one disc drive memory is played back to be transferred and recorded on another disc drive memory. In such cases, the line to line continuous phase data clocking of the played back video data is retained and the data is rerecorded without disturbing the data clocking.

The above considerations will now be described in conjunction with FIG. 8C where the PALE data for lines 1 and 2 are shown in FIGS. 8C(6) and 8C(7), respectively. The bits A1 through E1 are consecutive bit cells that represent the instantaneous samples of the analog video signal that occur in line 1 corresponding to the X's shown in FIG. 8C(1), with each bit cell lasting a full clock cycle of the 3SC clock shown in FIG. 8C(3).

Similarly, the line 2 bit cells A2 through E2 represent data that is derived by the sampling at the "0's" in FIG. 8C(2) using the PALE sample clock, which for television line 2 is shown in FIG. 8C(5). To clock the PALE data with a line to line continuous phase 3SC clock, arrows beneath the bit cells shown in FIGS. 8C(6) and 8C(7) depict the clocking points of the line to line continuous phase clock that produce the bit cells that are shifted and are in the relation shown in FIGS. 8C(8) and 8C(9). The start of each bit cell occurs at the clocking point and the level of the cell will be continuous through the bit cell interval so that the bit cells maintain their identity during the clocking.

To retime the data from the line to line continuous phase clock back to PALE clock so that the bit cells (samples) are vertically aligned as they should be, i.e., A2 is vertically aligned with A1, B2 with B1, etc., the retiming from the continuous phase clock to the PALE clock must be correctly done or misalignment of the bit cells will result. In this regard, the retiming or reclocking must be complementary, i.e., a bit cell that was clocked in the right portion thereof in a PALE-to-continuous reclocking must be left clocked in the continuous-to-PALE reclocking to insure proper playback. Thus, given the line to line continuous phase clocked data shown in FIGS. 8C(8) and 8C(9), the solid arrows illustrate the proper complementary clocking for the two television lines and produce the retiming of the data to the PALE clock having the A1 and A2 bits vertically aligned as shown in FIGS. 8C(10) and 8C(11). It should be noted that where bit cells that were right clocked going from PALE-to-continuous reclocking, are left clocked in the opposite conversion as is evident from viewing any of the bit cells, e.g., A1, with their associated clocking arrows in FIGS. 8C(6) and 8C(8). In the event that complementary clocking is not performed, then the bits will not be properly aligned as is shown by the dotted clocking arrows in FIGS. 8C(8) and 8C(9) which produce the relationship shown in FIGS. 8C(12) and 8C(13). The reclocking from either PALE to continuous or the converse is performed at various locations as will be evident from the ensuing description.

It should also be realized that the NTSC television signal does not have any specified, defined relationship between the horizontal sync pulse occurring at each line and the phase angle of the subcarrier signal with the exception that the phase of the subcarrier changes 180° from line to line. In other words, the phase angle of the subcarrier signal relative to the H sync signal can vary from one video source to another and this variance makes the H sync an undesirable signal to control the operation of the apparatus. Accordingly, the apparatus herein uses the input signal's subcarrier as represented by the color burst sync component as the basic timing reference for the system and defines a new H sync related signal that is used for timing purposes instead of the signal's H sync. The new H sync related signal is chosen to be at a frequency of $\frac{1}{2}$ of the nominal horizontal line frequency because it represents a whole number of cycles of the subcarrier frequency, i.e., two complete horizontal lines of subcarrier frequency or 455 cycles. Moreover, the H sync related signal is given a definite relation to the subcarrier, i.e., it is synchronized with respect to the phase angle of the subcarrier. In the record portion of the signal system a synchronizing word is inserted in the video signal on alternate television lines at a location corresponding approximately to that of the video signal's H sync and phase coherent with respect to a particular phase angle of SC generated from the video signal color burst subcarrier synchronizing component. The location of the new H sync related signal is defined at the beginning of each picture frame and is maintained for the duration of the picture frame to provide the video signal with an H sync related signal accurately and consistently defined with respect to the phase of the video signal's subcarrier. For the playback portion of the signal system, an H sync related signal designated H/2 is provided that is redefined to be coherent with respect to a particular phase angle of the reference input subcarrier, which phase angle is selectable through the playback system phase control.

The redefined H sync related signal, H/2, is used as a basic timing reference signal for the system during playback operations.

By using the redefined H sync related signal as the horizontal sync reference for the system, processing signals for recording, playback and other operations of the system is facilitated because a consistent time relationship is established between the video signal's subcarrier and redefined H sync related signal.

Additionally, the use of internal horizontal and subcarrier reference signals that can be varied in time relative to the television station reference sync, permits timing control that will enable the television signal to reach a remote location at the proper time after having experienced the usual propagation delays that occur.

Figure 8A:
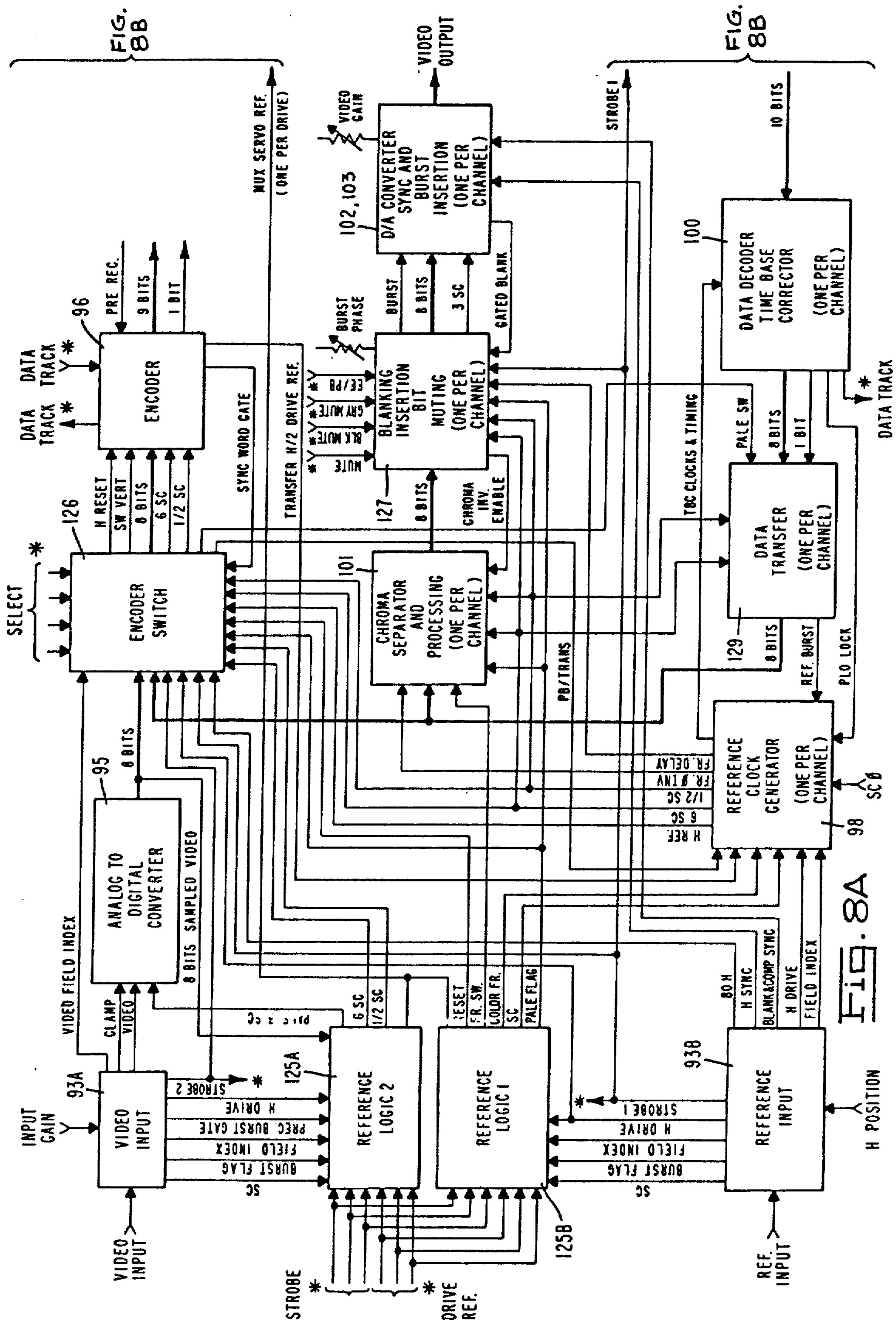
Figure 8B:
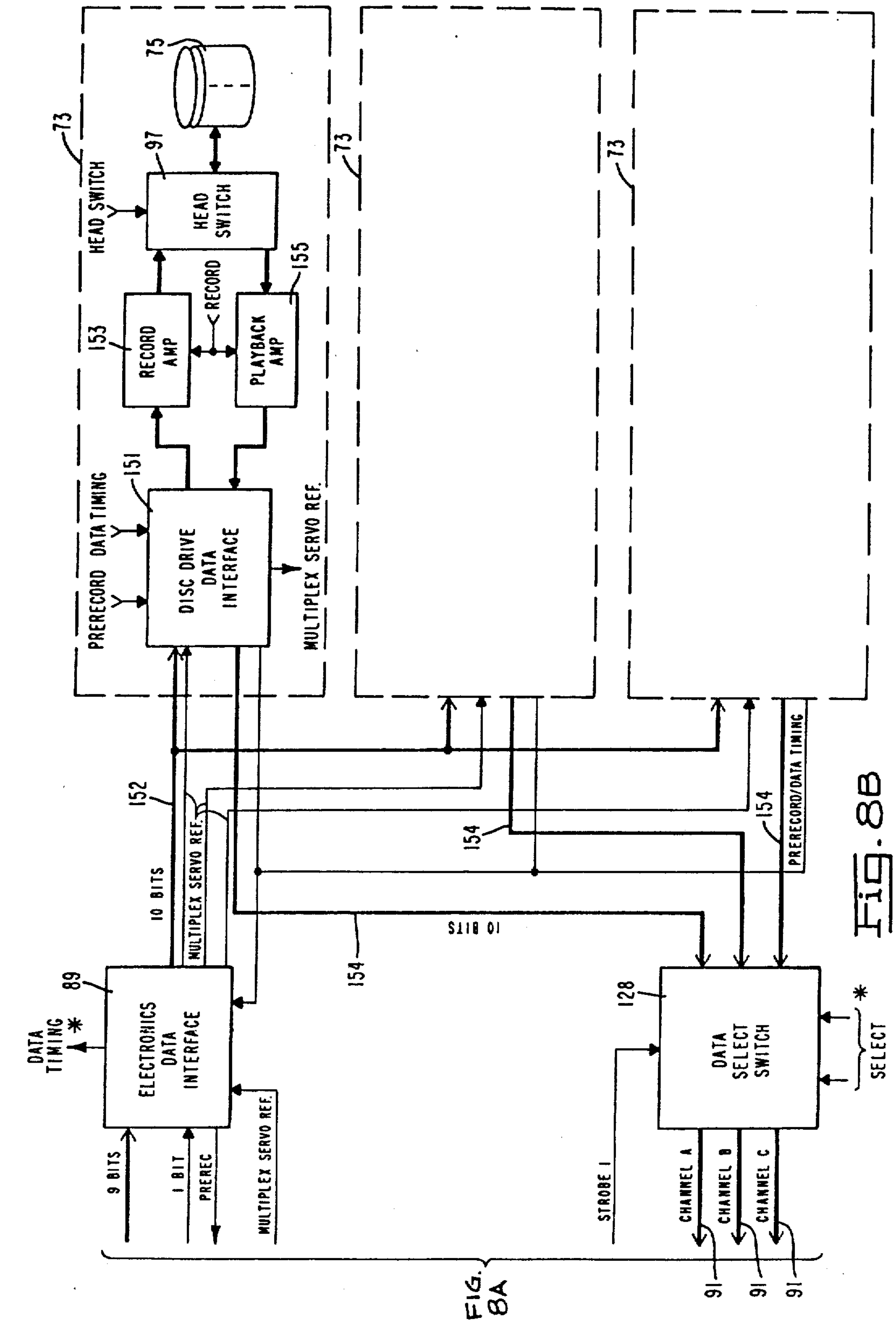

Referring again to the block diagram of FIGS. 8A and 8B, the analog video input is applied to the input of input circuitry 93A where several operations occur in the processing of the analog video signal before it is applied to the analog-to-digital converter 95. More specifically, the input circuitry 93A amplifies the analog video signal, provides DC restoration, separates the sync components contained in the video signal for use in generating timing signals for the signal system, detects the level of the tip of the H sync and thereafter clips the same. Moreover, the H sync is separated using a precision sync circuit for use in producing a regenerated sync. The circuit also produces a regenerated SC signal that is derived from the burst of the video input or, in the absence of burst, from an H/2 reference signal that is generated and is derived from the video input H sync.

It should be understood that the video input circuitry 93A and the reference input circuitry 93B shown in the lower left of FIG. 8A perform similar functions, the video input circuitry primarily for the signal recording portion of the signal system and reference input circuitry primarily for the playback portion of the signal system. Therefore, for convenience of manufacturing and service, identical circuitry is used. However, the input circuits are connected in the apparatus to receive only the input signals required to perform their respective functions and while the same signals are produced by each circuit, they are not all utilized from each circuit. The reference input to the reference input circuitry is the station reference color black video signal which contains all components of a color television signal except that the active video portion of it is at a black level. Thus, the burst, H sync and the like are present at the reference input circuitry 93B as they are at the video input circuitry 93A. In addition, the reference input circuitry 93B uses an H phase position adjusting circuit that receives H position control signals from an operator controlled thumb wheel switch or the like, such as phase control switches F1, for adjusting the H phase position of the regenerated H sync used in the playback portion of the signal system.

As shown, many of the output signals provided by the input circuits 93A and 93B are applied to the reference logic circuits 125A and 125B associated with the respective input circuits. The reference logic circuit 125A during the record mode of operation uses the inputs from the video input circuitry 93A, the analog-to-digital converter 95 and the computer control system 92 and through precision phase lock loop circuitry, generates a number of recording clocks at frequencies of 6SC, 3SC, ½SC and a PALE flag signal. The PALE flag and 3SC signals are used by the reference logic circuit 125A to generate a 3SC PALE sampling clock signal whose phase is set for each line of the video signal by the PALE flag, which is at a frequency of H/2. The PALE flag signal changes state at that rate although it does so asymmetrically, i.e., the two states of the PALE flag signal are of unequal time intervals. It is made asymmetrical so that the sampling clock phase for the color burst portion of the video signal is constant with the phase of the subcarrier and only the portion of the television line thereafter has a sampling phase which is alternated on consecutive lines. This PALE clock is coupled to the analog-to-digital converter 95 and is the sampling clock signal for deriving the samples at 3SC or 10.7 MHz.

The reference logic circuit 125B uses inputs from the reference input circuitry 93B and the computer control system 92 and generates a clock reference signal at a frequency of SC and various other timing control signals. These signals are used in the operation of the apparatus in modes other than that of recording input video signals.

During the record and playback modes of operation, the reference logic circuits also generate servo sync signals for each of the disc drives for properly operating the disc drives at the proper phase.

During playback and other modes of operation other than that of recording input video signals, a reference clock generator 98 generates various clocks and additional timing control signals required by the various parts of the signal system used in such modes. The reference clock generator uses the inputs from reference input circuitry 93B, reference logic 125B, the playback portion of the signal system, an operator's control switch and generates clock signals at frequencies of 6SC, 3SC, SC and ½SC and various other timing control signals. The reference logic circuitry 125A and 125B and the reference clock generator circuitry 98 together comprise the signal system's clock generator 94 that provides the system timing control signals.

The clamped and H sync stripped analog video signal from the video input board is applied to the analog-to-digital converter 95 which converts the signal to an 8 bit binary coded signal in a PALEd NRZ (non-return to zero) format which is applied to the encoder switch 126. The analog-to-digital converter 95 is not shown in detail herein as it is identical in its design and operation to the one incorporated in the Ampex Corporation digital time base corrector No. TBC-800. More specifically, the schematic diagrams of the analog-to-digital converter 95 are shown in the catalog No. 7896382-02 issued October 1975. The specific circuitry for the analog-to-digital converter is shown in schematic drawing No. 1374256 appearing on page 3-31/32 of the catalog and in schematic drawing No. 1374259 appearing on page 3-37/38 of the catalog. These schematics are incorporated by reference herein.

The output from the analog-to-digital converter is then fed to an encoder switch 126 which comprises switching circuitry that ordinarily receives either the 8 bit digitized video data from the converter or from data transfer circuitry 129. The data transfer circuitry 129 enables the video information to be transferred from one disc drive to another disc drive. During the transfer mode of operation, the digitized information is read off of the disc drive, decoded to the NRZ digital format, time base corrected and is then applied to the encoder switch which can select either source of digitized video information for the encoder 96. Because the channel encoded data recorded on the disc drives 73 has been clocked with a continuous phase clock, the NRZ data received by the data transfer circuitry 129 also is timed with respect to the continuous phase clock. Ordinarily, the data transfer circuitry 129 is provided with a PALE flag signal that is used to effect retiming of the NRZ digital data with respect to a PALE clock signal so that the data provided to the chroma separator and processing circuitry 101 is in the correct PALEd format. During the transfer mode of operation, this retiming is not necessary. The encoder switch 126 has circuitry for interrupting the coupling of the PALE flag signal to the data transfer circuitry 129 and thereby preventing the retiming of the NRZ data with respect to the PALE clock during the data transfer mode.

The encoder switch 126 is controlled by the computer control system 92 to gate the video data from either the input video or data transfer paths. It also switches between video and reference 6SC and ½SC timing signals since the reference timing signals are used during the data transfer mode and the video timing signals during the record mode. The encoder switch is also adapted to generate a signal that will produce a blinking cross through the TV image which is a visual indication that the still location or address for a still is unoccupied and therefore available for recording and also to provide signals for performing diagnostic functions. With respect to the sync word inserter, the encoder switch 126 couples the 8 bit digital video data from the analog-to-digital converter 95 and the timing signals derived from the input video signal to the encoder 96.

The 8 bit data from the encoder switch 126 is then applied to the encoder 96 which initially generates a parity bit and then encodes the PALEd data into a Miller squared channel code format, which is a self-clocking, DC free, non-return to zero type of code. While PALEd data is applied to the encoder, the output of the encoder is a 9 bit data stream (if parity is included) that has a phase continuity with respect to 3SC. The continuous phase clocked data is easier to process, particularly, during the decoding operations. The DC free code avoids any possible DC component that could occur due to a preponderance of one logical state over a period of time which could have an effect of disturbing the data in the playback process. Reference is made to the application by Jerry Wayne Miller U.S. Ser. No. 668,679, entitled "DC Free Encoding For Data Transmission System" filed Mar. 19, 1976 and assigned to the same assignee as the present invention, now U.S. Pat. No. 4,027,335.

As is comprehensively described therein, the coded format can be characterized as a DC free, self-clocking, nonreturn to zero format. It provides for transmitting binary data over an information channel of limited bandwidth and signal to noise, where the data is transmitted in self-clocking format that is DC free.

In limited bandwidth information channels which do not transmit DC, binary waveforms suffer distortions of zero crossing location which cannot be removed by means of linear response compensation networks. These distortions are commonly referred to as base line wander and act to reduce the effective signal to noise ratio and modify the zero crossings of the signals and thus degrade the bit reliability of the decoded signals. A common transmission format or channel data code that is utilized in recording and reproducing systems is disclosed in Miller U.S. Pat. No. 3,108,261 issued Oct. 22, 1963. In the Miller code, logical 1's are represented by signal transitions at a particular location, i.e., at mid-cell, and logical 0's are represented by signal transitions at a particular earlier location, i.e., near the leading edge of the bit cell. The Miller format involves the suppression of any transition occurring at the beginning of 1 bit interval following an interval containing a transition at its center. Asymmetry of the waveform generated by these rules can introduce DC into the coded signal and the so-called Miller "squared" code used in the present apparatus effectively eliminates the DC content of the original Miller format and does so without requiring either large memory or the necessity of a rate change in the encoding and decoding.

The encoder circuitry 96 also generates a unique sync word in the form of a 7 digit binary number and inserts the sync word on alternate lines in a precise location determined by the 6 SC and ½ SC clock signals. In the record mode of operation, clock signals generated from the synchronizing components of the input video signal by the reference logic circuitry 125A are provided to the encoder circuitry 96 by the encoder switch 126 and result in the sync word being inserted at a location that approximately corresponds to where the video signal's horizontal sync pulse was previously located. In other modes of operation, the 6 SC and ½ SC clock signals are generated from the synchronizing components of the station reference color black video signal by the cooperative action of the reference logic circuitry 125B and reference clock generator 98. The encoder gates the H sync related sync word into the data stream on alternate television lines at the proper time relative to the regenerated subcarrier phase.

Data track information to be recorded on the data track of the disc drives 73 is also encoded by the encoder 96 prior to recording. The data track information is provided by the computer control system 92.

With reference to FIG. 8B, the ten data streams of encoded digital data appearing at the output of the encoder 96 is applied to an electronics data interface 89 which is merely signal splitting and buffering circuitry which couples the encoded data to the three disc drives 73 for selective recording on a disc pack 75. Each disc drive includes a disc drive interface 151 adapted to receive the encoded digital data from the electronics data interface 89 and send it to the record amplifier circuitry 153 and head switch circuitry 97 for recording on an associated disc pack 75 as well as to receive reproduced or detected data from the playback amplifier circuitry 155 and head switch circuitry 97 and send it to the data select switch 128. In addition, the disc drive data interface 151 receives the multiplex servo reference signal through the electronics data interface and sends it to the timing generator of the disc drive control circuitry. This signal is selected by the computer control system 92 from either reference logic circuitry 125A or 125B. The timing generator employs the multiplex servo reference signal to time the operation of the disc drive system so that record and playback operations and the rotational position of the disc pack 75 within the disc drive 73 are synchronized to the appropriate signal system timing reference. As explained hereinbefore, standard computer disc drives are used in the recording and reproducing apparatus 70, although modified slightly to adapt them to the particular operations required of the apparatus. The details of the disc drives 73 as arranged for use in the recording and reproducing apparatus 70 are described in the above-identified related application, Ser. No. 763,371, now U.S. Pat. No. 4,270,150.

The disc drive control circuitry returns pre-record timing and data timing signals through the disc drive data interface 151 to the electronics data interface 89 of the signal system. In the particular embodiment of the apparatus described herein, only two fields of the four field NTSC color television signal color code sequence are recorded, with each of the two fields recorded during separate revolutions of the disc pack 75. Immediately prior to the recording of the two fields of video data, the pre-record timing signal is generated and coupled to the electronics data interface 89. The interface sends the pre-record timing signal to the encoder 96 to cause the generation for an interval equivalent to two fields data equivalent to color black, which is digitally defined by logical 0's in the apparatus described herein. The two field interval of color black data is returned through the interfaces for recording on the disc pack at the track location selected for recording video data and its associated data track information. The recording of the two fields of color black data occurs during two revolutions of the disc pack 75 immediately preceding the two revolutions during which the two fields of video data are to be recorded. This conditions the track location for the subsequent over recording of the video and data track data. Because over recording previously recorded digital data with new digital data can be conducted to obliterate the previously recorded digital data and leave a recorded signal of sufficient quality to provide an acceptable signal to noise ratio upon playback, the pre-record cycle of operation could be eliminated from the apparatus and the recording of the two fields of video data and associated data track data accomplished in only two revolutions of the disc pack 75.

The data timing signal is returned to the electronics data interface 89 to time the generation and recording of the data track information during the second or last field of the two fields of video data. The signal is a pulse which begins after the vertical sync occurring between the two fields of video data and terminates at the end of the second field. It is during this interval that the data track information is recorded on the data track of the disc pack 75. The electronic data interface 89 couples the returned data timing signal to the computer control system 92 for identifying the data track recording interval to the system. In response, the computer control system 92 performs functions incident to the recording of data track information, including the provision to the signal system of the data track information associated with recording video data on a specified track of a specified disc pack. The encoder 96 receives the data track information and processes it as described herein for sending to the disc drive 73 and recording simultaneously with the last field of video data.

The record and playback amplifier circuitry 153 and 155, the head switch circuitry 97, and the disc drive control circuitry of the apparatus described herein are arranged together so that the playback amplifier circuitry 155 and head switch circuitry 97 are activated to reproduce data from the associated disc pack 75 at all times except when a record operation is being performed. Hence, except during record operations, reproduced data is always being received by the disc drive interface 151, which in turn always provides the reproduced data to the data select switch 128. To record data, a record command provided by the disc drive control circuitry is coupled to the record and playback amplifier circuitry 153 and 155 to activate the record amplifier circuitry 153 and disable the playback amplifier circuitry 155. The disc drive control circuitry also provides a 30 Hz head switch signal to the head switch circuitry 97 during record operations to cause the head switch circuitry to couple the data streams to one set of heads during the first field of two consecutive fields of data to be recorded and to the second set of heads during the second field. The 30 Hz head switch signal is continuously available and is similarly employed during playback operations to control the head switch circuitry 97 to switch the playback amplifier circuitry 155 between the two sets of heads for the reproduction of both fields of a desired video data signal.

Returning to FIG. 8A, during playback operations, the reference input circuitry 93B together with the reference logic 125B produces the regenerated subcarrier frequency for application to the reference clock generator 98 and the reference clock generator has outputs of 6 SC, ½ SC, H/2 and other timing signals for providing the basic timing for playback operations. The clock and timing signals, including the reference H/2 signal, are synchronized to the reference color subcarrier to facilitate processing of the reproduced video signals. The reference H/2 signal is defined with respect to a particular phase of the reference color subcarrier in the first line of alternate fields of the reference color black video signal. The reference clock generator outputs are applied to the data decoder and time base corrector 100, data transfer circuitry 129 and the chroma separator and processor 101 in addition to a blanking insertion and bit muting circuit 127 that inserts blanking, performs selective bit muting, and provides a selected picture frame video signal for output by the signal systems when the heads associated with a disc drive coupled to the playback channel are moved between track locations. Because of the use of the redefined reference H/2 signal in the data decoder and time base corrector 100, the synchronizing word contained in alternate reproductions of the two-field video signal is mispositioned relative to the station reference H sync. This would introduce a jitter in the displayed video image if not corrected. The 8 bits of digital information are then applied to the digital-to-analog converter and sync and burst insertion circuitry 102 and 103. The aforementioned mispositioning of the synchronizing word is corrected in the blanking insertion and bit muting circuitry 127 preceding the digital-to-analog converter 102 by appropriately inserting a corrective delay in the signal path upon alternate reproductions of the two-field video signal. The reference clock generator 98 identifies which reproduction of the two-field video signal sequence requires the delay by examination of a color frame rate signal, H drive signal and field index signal, all provided by the reference logic circuitry 125B, and the reference color subcarrier signal. In response to the identification, the reference clock generator 98 generates a frame delay switch signal that is coupled to the blanking insertion and bit muting circuitry 127 for controlling the insertion of the corrective delay. Moreover, during the transfer and diagnostic modes of operation, the reference clock generator 98 supplies the basic timing clocks for the encoder 96 through the encoder switch 126 as shown.

During playback, the 10 bit parallel data stream comprising 8 bits of video data, the parity bit and data from the data track reproduced from a disc pack is amplified, equalized and detected and is then applied through the disc drive data interface circuitry 151 to a data select switch 128 which can switch any of the outputs of the three disc drives onto one or more of three channels. Thus, the data select switch can switch the information from disc drive No. 1 into channel A, or to two channels while simultaneously applying a data stream from another disc drive onto another channel. While information from two drives can not be simultaneously applied to a single channel, the converse is possible. The data select switch 128 comprises conventional switching circuits which are not set forth in detail herein.

Each of the detected nine bit streams of video data and parity data from the data select switch 128 is then applied to nine individual data decoders and time base correctors 100 which decode the data and then independently time base correct each of the nine data streams with respect to a common H/2 reference, which is defined with respect to the phase of the regenerated reference subcarrier, to remove any timing errors that may be present among the nine lines of data, i.e., it aligns all sync words so that each 9 bit parallel byte comprises the correct 9 bits of data. The other bit stream from the data track is coupled by the data select switch 128 to only the decoder portion of the decoder and time base corrector circuitry 100 and the decoded data track information is coupled to the CPU 106. The time base corrector of the present invention does its correction using a continuous phase clock. However, the data is again retimed with respect to a PALE clock by the data transfer circuitry 129, i.e., the phase of the signal is alternated by reclocking it at every horizontal line, so that the 8 bit data stream that comes from the data transfer circuitry is a true PALEd signal. The data transfer circuitry 129 also performs a parity check of the off disc data and performs error masking of individual byte errors when they occur by substituting what is likely to be the most similar previously appearing byte for the byte that was detected as being in error. In this regard, the byte that is substituted is the third previous byte, which is the most recent sample that was taken with the same phase relation to SC.

The output of the data transfer circuitry is applied to the chroma separator and processing circuitry 101 in the event that the video information is desired for viewing, as opposed to being recorded on another disc drive (transfer), in which case the data from the data transfer circuitry 129 is coupled to the encoder switch 126. The chroma separation and processing circuitry 101 works in the digital domain and separates the chroma information from the luminance using comb filter techniques and inverts the chroma information on alternate frames to form a four field composite NTSC signal that is then applied to the blanking insertion and bit muting circuitry 127 which inserts a reference black level during the blanking period, inserts grey level signals during the interval between the playback of consecutive stills, and performs bit muting operations if desired. The bit muting effectively mutes any bit or bits of an 8 bit television signal by shutting down that data bit stream and by so doing, achieves ususual visual effects in the resulting television signal such as producing exaggerated tones, ghostlike images and the like. The output from the blanking insertion and bit muting circuitry 127 is then applied to the following digital-to-analog converter 102. The digital-to-analog converter receives clock signals from the blanking insertion and bit muting circuitry 127 and converts the data to its analog form and also inserts the sync and burst components of the signal to produce a full composite analog television signal.

VIDEO AND REFERENCE INPUT CIRCUITRY

The video input and reference input circuitry 93A and 93B broadly described with respect to the block diagram of FIG. 8A contain substantially similar circuitry in both locations, although different inputs are received by each and all of the outputs that are available from each are not used. During record operations, the composite video input signal to be recorded is applied to the video input circuitry 93A which is used to obtain a regenerated subcarrier signal, and various vertical and horizontal sync rate related signals that are used by the apparatus in the performance of the record operations. The video input circuitry also provides an amplified and filtered video signal suitable for feeding the A/D converter 95. During playback operations, a reference color black video signal is applied to the reference input circuitry 93B which provides similar signals for use by the apparatus in the performance of the playback operations.

Referring more specifically to the block diagram for the video and reference input circuits shown in FIG. 9, the video signal is applied on line 200 into a video amplifier 201 which amplifies the signal and restores the DC component through a clamp 202. The clamp 202 samples the output of the amplifier on line 203 and produces a DC component on line 204 that extends to the amplifier 201. The DC restored video signal on line 203 is then passed through a low pass filter 205, the output of which appears on line 206 extending to a video gain control amplifier 207. The amplifier 207 is connected to another video amplifier 208 where a second clamp circuit 209 assures that the blanking level of the signal is at ground level by the application of a DC control signal via the line 210 to the video amplifier 208. The output of the video amplifier appears on line 211 and is coupled by one of the lines 218 extending therefrom to the sampling input of the clamp 209. Line 211 also extends to a gated sync clipping circuit 212 as well as to a precision sync separator 213. A tip of sync detector 214 detects the level of the tip of sync and provides a corresponding signal level on line 215 that extends to a comparator 216 as well as to the precision sync separator 213. In the video input circuitry 93A, a remote video gain control signal on line 217 is also applied to the comparator 216 for controlling the gain control amplifier 207 from a remote location. In the reference input circuitry 93B, the gain of amplifier 207 is not controlled from a remote location. The output of the tip of sync detector 214, which may contain alternating current ripple, is applied to one input of the precision H sync separator 213 while the other input to the separator is provided by one of lines 218 that extends from the output of the video amplifier 208. The two inputs to the precision sync separator 213 will both have AC ripple thereon if present in the signal and, accordingly, they are common moded so that the separator produces an AC ripple free precision separated sync on line 220 that is applied to miscellaneous sync circuits 221 and to an input of a horizontal sync phase detector 222. Another of the lines 218 from the output of the video amplifier 208 extends to a less precise sync separator 219 that produces a generally less precise separated sync signal which is applied to a gate pulse generator 223, outputs of which appear on lines 224 that extend to both clamps 202 and 209 as well as to the tip of sync detector 214. When the horizontal sync signal is detected and separated, a gate is produced by the pulse generator 223 which closes the clamps as well as the sync tip detector at the appropriate time during horizontal blanking.

The clamp 209 is closed during burst time for a whole, integral number of cycles, rather than an arbitrary period, so that the blanking level of the video signal can be accurately obtained using integration techniques as will now be described in detail. The burst appears on line 225 which is applied to a burst limiter circuit 226 that is in turn connected to an amplifier 227 providing complementary outputs of the limited burst input. The output of the limiter circuit 226 is also connected to a burst presence detector circuit 228 having an output on line 229 that extends to a precision gate generator 230 as well as an output on line 260 that extends to a phase detector 231. When the presence of burst is detected, the precision gate generator 230 generates a precision burst gate signal that is coupled to enable the amplifier 227 and permit it to pass the middle three cycles of burst to apply them to the phase detector 231. The phase detector responsively provides an error signal to a voltage controlled oscillator 232 that reflects the difference in phase between the output of the oscillator and the phase of the burst cycles from the amplifier 227. The effect of the phase detector circuit controlling the oscillator 232 is to correct for longer term changes and not short term changes in the phase of the three cycles of burst that are used on every line as the subcarrier reference. The output of the oscillator 232 appears on line 233 after having been buffered by a buffer 234. The output of the oscillator is a continuous regenerated subcarrier signal SC (3.58 MHz) that is phase locked to the color burst when burst is present. However, in the event that the burst detector circuit 228 fails to detect burst, then the phase detector 231 compares the phase of an H/2 signal with the regenerated subcarrier output of the oscillator 232, the H/2 signal being produced by a sync generator 235 from an oscillator 236 that is controlled by the horizontal sync phase detector 222. This continuously regenerated subcarrier signal SC is coupled to the reference logic circuit 125A and, as will be described in detail hereinbelow, is employed in the apparatus described therein to generate the 3SC PALE clock used by the A/D converter 95 to effect digitization of the video signal.

A horizontal phase position control, indicated generally at 237, is provided for use in the reference input circuitry 93B to adjust the horizontal positioning of the regenerated sync. An 8 bit binary number is loaded into latches 238 by an operator controlled thumb wheel switch or the like, for example, control switches 81 located by the internal access station 78 (FIG. 1), to preset a counter 239 which is clocked by a 400 H clock derived from the oscillator 236. When the counter reaches its terminal count, it triggers a ramp generator 240 having an output 241 which extends to a second input of the H sync phase detector 222. Thus, by adjusting the latches, up to plus or minus 20 microseconds can be inserted in the feedback loop on line 241 and the phase of the regenerated sync signal can be adjusted for horizontal positioning of the the video image represented by the video information signal. Since a delay in the feedback loop means that the regenerated sync will be advanced, the horizontal position control can effectively advance the video information signal to compensate for propagation delays during transmission of a signal through cabling in a television station. As will be explained hereinafter in the detailed description of the reference clock generator circuitry 98, this horizontal phase position control is operated in conjunction with a subcarrier phase control operatively associated with the reference clock generator 98 whereby the amount of delay can be controlled in small increments, which in the embodiment of the apparatus described herein is about ±0.8 nsec.

The output of the oscillator 236 also is used by the sync generator 235, which is of conventional design for television signal processing equipment, to generate the various vertical and horizontal sync rate related signals indicated in FIG. 9. These sync rate related signals are generated with respect to the phase of the precisely regenerated H sync as provided by the phase detector 222 and, therefore, will always have a phase related to the input signal.

An important aspect of the circuitry shown in FIG. 9 is that the H sync of the video signal is clipped at pecisely ½ its value and the level of the blanking is precisely clamped to ground. The regenerated subcarrier is phase locked with the burst and a precision horizontal sync signal is regenerated utilizing the precision sync separator. This signal is used by the sync generator 235 to provide a reset pulse (30 Hz field index pulse) for resetting a line identification or sync word inserter that will be hereinafter described. Since the clamp circuitry 209 examines for a zero average level of video at burst time using a clamping pulse which lasts precisely a whole number of cycles of burst, there is no need for low pass filtering the video and rejecting the burst before clamping is performed. This is due to the fact that resulting integration of the burst is equal to zero and there is no H/2 ripple introduced by integrating a signal that does not contain complete cycles of burst.

The block diagram shown in FIG. 9 describes the functional operation of the input circuitry and specific circuitry which can be used to carry out the operation thereof is shown in FIGS. 15A through 15D which together comprise a single circuit diagram for the video input processing circuitry.

With respect to the operation of the clamp 209 (see FIG. 15C), the voltage at the output of the amplifier 208 appears on lines 211 and 218, one of the latter of which extends downwardly to the base of an emitter follower transistor 244 that provides a voltage drop. Under equilibrium conditions, the blanking level of the video signal appearing on line 218 will be at ground potential. This signal is shifted by about 0.7 V toward the negative as a result of the voltage drop through the emitter follower 244. A matching emitter follower transistor 245 with its emitter connected to the negative input of a differential amplifier 246 by line 247 shifts the comparison level (ground) toward the negative as does transistor 244. The emitter of the transistor 244 is connected to the positive input of the differential amplifier 246 when a transmission gate or switch 248 is closed during and for a whole number of cycles of burst by a signal on the line 224 that is produced by the redefined gate pulse generator 223 shown in FIG. 15D. Thus, during the burst time, switch 248 is closed charging a capacitor 249 to the average level of the burst. The switch is closed for an integral number of cycles of the subcarrier. This eliminates the need for low pass filtering the video to remove the burst before the clamping is performed, which is ordinarily done in the prior art in order to eliminate H/2 modulation of the clamping level. The charge on the capacitor 249 reflects exactly the average value of the burst and the differential amplifier 246 output represents an error that is applied to the video amplifier 208 through line 251, transistor 252 and line 210 which is connected to the emitter of the transistor 252. The blanking level of the signal on line 211 is thus held very close to ground due to the high DC gain of the differential amplifier 246. The operation of the clamp 202 is substantially similar to the operation of the clamp 209 and is shown in FIGS. 15A and 15B.

Figure 15B:
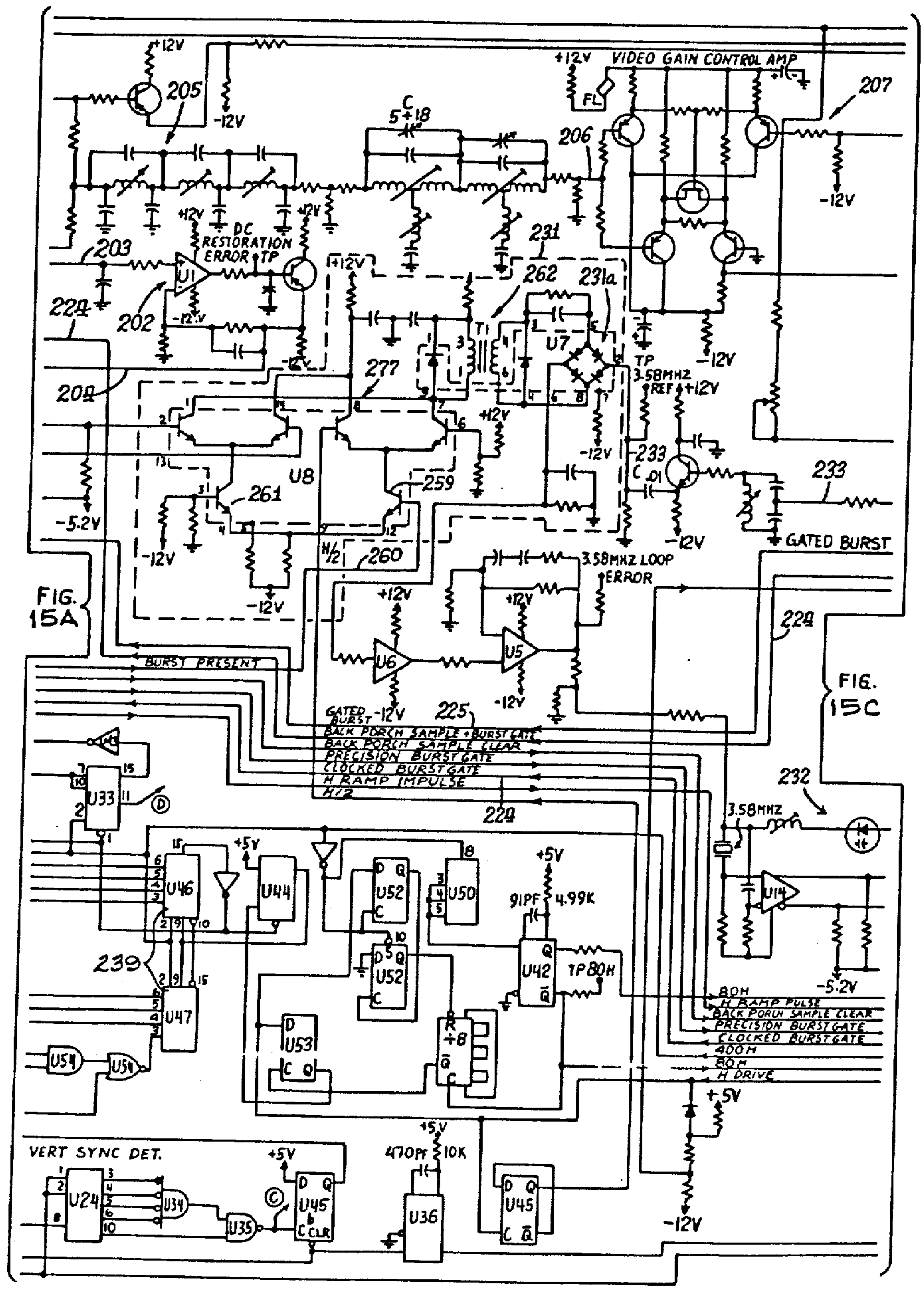

Referring again to FIG. 42C, the closing of the switch 248 gates burst through the switch into capacitor 249 and onto line 225 which extends leftwardly to FIG. 15A which is connected to the emitter of a transistor 254 and the burst therefore appears on the collector and on line 255 that extends to the burst limiter circuit 226. When burst is present, the burst presence detector circuit 228 provides a limited burst signal on its output line 229 that clocks the precision gate generator 230. A counter is employed as the precision gate generator and counts cycles of the limited burst signal and produces a precision burst gate during the middle three cycles of the nine to eleven cycle burst interval that is coupled by line 256 to enable the amplifier 227. Therefore, except for the middle three cycles of burst, the amplifier 227 is disabled by the output of the precision gate generator 230. When burst is present, the diode detector 257 and following latch circuit 258 of the detector circuit 228 provides a more negative level on line 260 extending to a switching transistor 259 (FIG. 15B) of the phase detector 231. When burst is present, switching transistor 259 is shut off and another switching transistor 261 of the detector 231 is turned on. When transistor 261 is on, the three cycles of burst from the amplifier 227 is applied by the driver 277 to a transformer 262 of the detector 231. The driver is in turn connected to the phase comparator **231*a* for comparing the phase of the burst with the phase of the output of the 3.58 MHz (SC) oscillator 232 that is present on line 233. When burst is not detected by the detector circuit 228, transistor 259 is switched on, which applies the signal H/2 to the other input of the driver 277 that is also connected to the transformer 262 and the phase of the oscillator output on line 233** is compared with the phase of the H/2 signal.

Turning now to the detailed circuitry for performing the precision H sync separation and referring to FIG. 15C, the sync is taken from the amplifier 208 on the line 218 extending to a low pass filter 264 whose output is coupled to the base of a transistor 265. The emitter of transistor 265 is connected to a transmission gate or switch 266 that is closed during the presence of sync by control line 224. The level of the sync is determined by charging a following capacitor 267 (FIG. 15D), which is buffered by a unitary gain amplifier 268, and ½ of the DC level of the tip of sync together with the full level of AC ripple present in the signal is then applied via line 215 to one input of sync separator 213, the other of which is supplied by line 269 that comes from the emitter follower transistor 265. In the embodiment of the input circuitry 93A and 93B illustrated in FIGS. 15A–D, the precision H sync separator 213 is a comparator. In this manner, the output on line 220 is a separated sync whose timing is not affected by AC ripple on the video, because any AC ripple will appear on both inputs of the comparator 213 and will be prevented from appearing in the output of the comparator because of common mode rejection. The sync appearing on line 220 is a precision sync that is used by other parts of the signal system to generate horizontal line related synchronizing signals redefined in relation to a particular phase angle of the subcarrier signal which serve as timing references in the signal system for processing the video signals. Also, the horizontal line related synchronizing signal used in the system is at a rate of ½H sync because there are a whole number of subcarrier cycles for every two horizontal lines (227.5×2=455) and this consideration becomes important in the operation of apparatus described herein as will be evident from the ensuing description.

A less precise separated sync is also developed by taking the sync from the low pass filter 264 via line 270 to the imprecise sync separator 219, the output of which appears on line 271 that is applied to the gate pulse generator 223 which includes a one shot serving as a sync presence detector 276. The upper circuit, indicated generally at 272, generates a gate for use by the switch 266 to close the switch during the presence of sync, a circuit 273 produces a backporch sample and a circuit 274 redefines with respect to SC phase a burst gate signal. With respect to the generator 223, it should be appreciated that if no sync is present and therefore does not appear on line 271 from the imprecise sync detector 219, the sync presence detector 276 will through circuit 274 close the switch 248 in the clamp circuit 209 as well as a similar switch 275 in the clamp 202 so that all clamps operate on a DC feedback loop rather than permitting them to remain open. Thus, if sync is not present, the level on line 224 is placed high until sync returns and is detected. In addition, as a precautionary measure in the event the precision gate generator 230 does not receive the necessary number of burst cycles to clock it to its terminal state or count after its count cycle has been initiated, the detector 276 is coupled through circuit 274 to provide the burst gate signal to the precision gate generator 230 to assure termination of its count cycle and provision of the precision burst gate signal. This assures that the precision gate generator 230 will always properly respond to every input burst signal.

Because of the desirability of having a field index signal in the encoder switch 126 that is accurately related in phase to the input video signal's vertical sync, the output of the precision H sync separator 213 and an output of a vertical sync detector 278 (FIG. 15B) are provided to a NOR gate 279 (FIG. 15D) which provides the desired field index signal.

REFERENCE LOGIC CIRCUITRY

The reference logic circuitry 125A and 125B shown in the block diagram of FIG. 8A receive various signals from the input circuitry 93A and 93B relating to horizontal and vertical sync signals, regenerated subcarrier and the like and respectively generate a number of clock and timing control signals used in the operation of the apparatus. In addition, the computer control system 92 provides control signals to both logic circuitry 125A and 125B which cause the generation of servo sync signals which control the operating phase of the disc drives in accordance with the operation, viz, record, playback, transfer and the like, being performed by the apparatus. The reference logic circuitry is essentially duplicated so that one reference logic circuit is provided for use with the video input circuitry 93A and another for the reference input circuitry 93B, with the function of the reference logic circuitry being somewhat different during different operations of the apparatus such as recording, playback, transfer and the like. Because the logic circuitry 125A and 125B perform different functions, different inputs are received by each and all outputs that are available from each are not used.

The operation of the reference logic circuitry will now be explained in further detail with reference to a functional block diagram shown in FIG. 10A that has a dotted line extending horizontally in approximately the middle of the drawing. As is shown thereon, the upper portion of the circuitry is used only during a recording operation, whereas the lower portion is used during recording, playback and other operations performed by the signal system. The function of the upper portion of the circuitry is to generate various phase locked clock signals for recording operations using the regenerated subcarrier that was produced by the video input circuitry 93A from the color burst as has been previously described. The circuitry also generates a nonsymmetrical PALE flag signal at a rate of H/2 which is used within the circuitry to alternate the phase of the analog-to-digital converter sampling clock on consecutive horizontal lines for the reasons that have been hereinbefore described. The PALE flag is also available as an output from the reference logic circuitry 125B for use by other parts of the signal system, primarily those used in processing playback signals. The circuitry also generates a drive synchronization signal for operation of the servo control of the disc drive motors, providing a set of three pulses at a rate of 15 Hz which is multiplexed with H sync for use in controlling the disc drive servo. Other timing control signals are provided by the reference logic circuitry 125B as will be described in the following detailed description.

Figure 10:
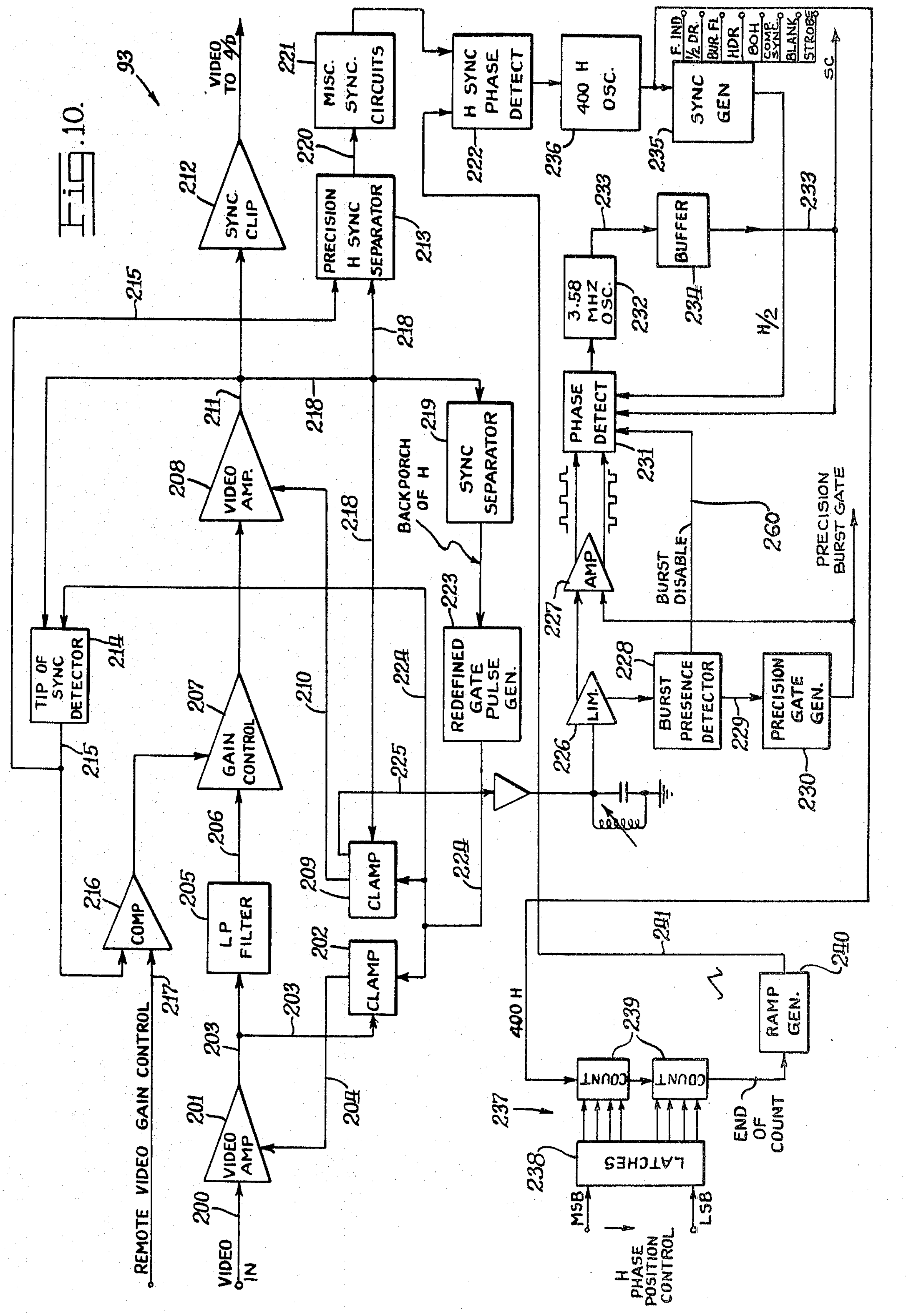
FIG. 10 is a functional block diagram of the reference logic circuitry which is a portion of the signal system shown in FIG. 8A.

Referring to the upper portion of FIG. 10A, the subcarrier signal (SC) from either the video input circuitry 93A for the reference logic circuitry 125A or reference input circuitry 93B for the reference logic circuitry 125B is applied on line 300 and it is extended to a phase comparator 302, the output of which appears on line 303 to a summer 304 that has a second input on line 305 provided by an integrator 306. A precision digital burst phase decoder 307 receives the actual digitized video data taken from the output of the analog-to-digital converter 95 on line 308 and decodes whether the samples were taken at the proper phase of burst and produces a plus or minus error signal to the intergrator 306 via line 309 for use in adjusting the phase of the sample clock so that the video signal is always correctly sampled. The output of the summer 304 appears on line 310 which is applied to a loop amplifier and filter 311 that is connected to a voltage controlled oscillator 312 by line 313 which also extends to one of two trouble lamp drivers 314. The output of the oscillator 312 appears on line 315 at a frequency of 6SC which is applied to a divide by 6 counter 316 as well as to a divide by 2 counter 317 which produces a PALE clock output at a frequency of 3SC on line 318. The divide by 6 counter has an output on line 319 at a frequency of SC which is applied to a divide by 2 counter 320 as well as to the other input of the phase comparator 302. The output of the divide by 2 counter 320 is a ½SC signal on line 321 which also extends to a pulse former 322 that is used to set and reset the divide by 2 counter 317 on alternate lines, the control being supplied through line 323 at an H/2 rate that is supplied by a PALE flag generator 324 as will be discussed hereinafter.

The operation of the upper portion of the circuit is to generate a 6SC frequency signal at the output of the voltage controlled oscillator 312 that is precisely controlled so that sampling that is performed by the analog-to-digital converter 95 is done precisely at the same phase of the color burst synchronizing signal at all times. This is important when it is considered that the phase of the video that is sampled will ultimately determine the color that is produced by the apparatus. Thus, the phase comparator 302 having one input supplied by the divided output of the VCO 312 through line 319 provides a phase lock loop that will lock the phase of the output relatively close to the video or reference subcarrier synchronizing signal phase appearing on line 300 supplied to the other input of the comparator 302. The divided output of the VCO 312 through the phase lock loop produces an SC signal that is generally within approximately 10°. However, the digitized video output from the analog-to-digital converter 95 is also applied through line 308 to the precision digital burst phase decoder 307 which is enabled by the precision burst sampling gate signal received from the video input circuitry 93A over line **307*a* to generate an error signal derived during the burst interval of the video that is intergrated by integrator 306 to provide an average value that is applied to the summer 304. This causes the voltage level out of the loop amplifier 311 controlling the VCO 312 to be adjusted to correct variations in the sampling times of the video signal as reflected in the burst samples provided to the decoder 307. The burst samples will represent the same quantity values for all lines if no variation in sampling times occur. By examining the sampled data actually appearing at the output of the analog-to-digital converter 95, it can be precisely determined whether the samples were taken at the proper phase and in this manner, the VCO output on line 315 which is applied to the divide by 2 counter 317 produces a PALE 3SC clock on line 318 which controls the analog-to-digital converter 95 for keeping the sampling at the proper phase. The precision digital burst phase decoder 307 effectively corrects any errors that may be produced due to temperature drifting and the like which can be on the order of 5° to 10°. In this regard, the phase of the video (or reference) subcarrier synchronizing signal on line 300 provides the basic lockup for the VCO 312 and the precision correction that appears on line 305 in the reference logic circuitry 125B** is arranged to change the phase by a few degrees, i.e., up to about 20°.

Figure 11B:
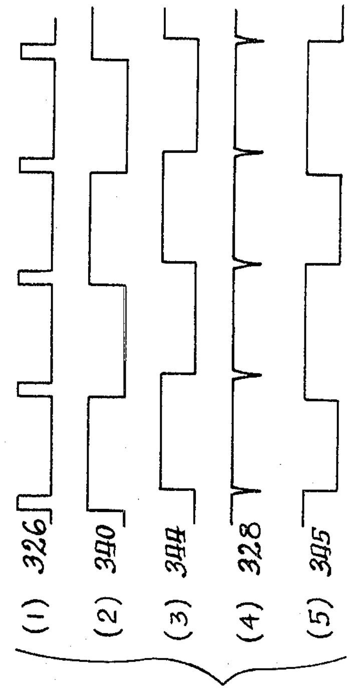
FIG. 11B is a timing diagrams illustrating the operation of portions of the reference clock generator shown in FIG. 11A.
Figure 11A:
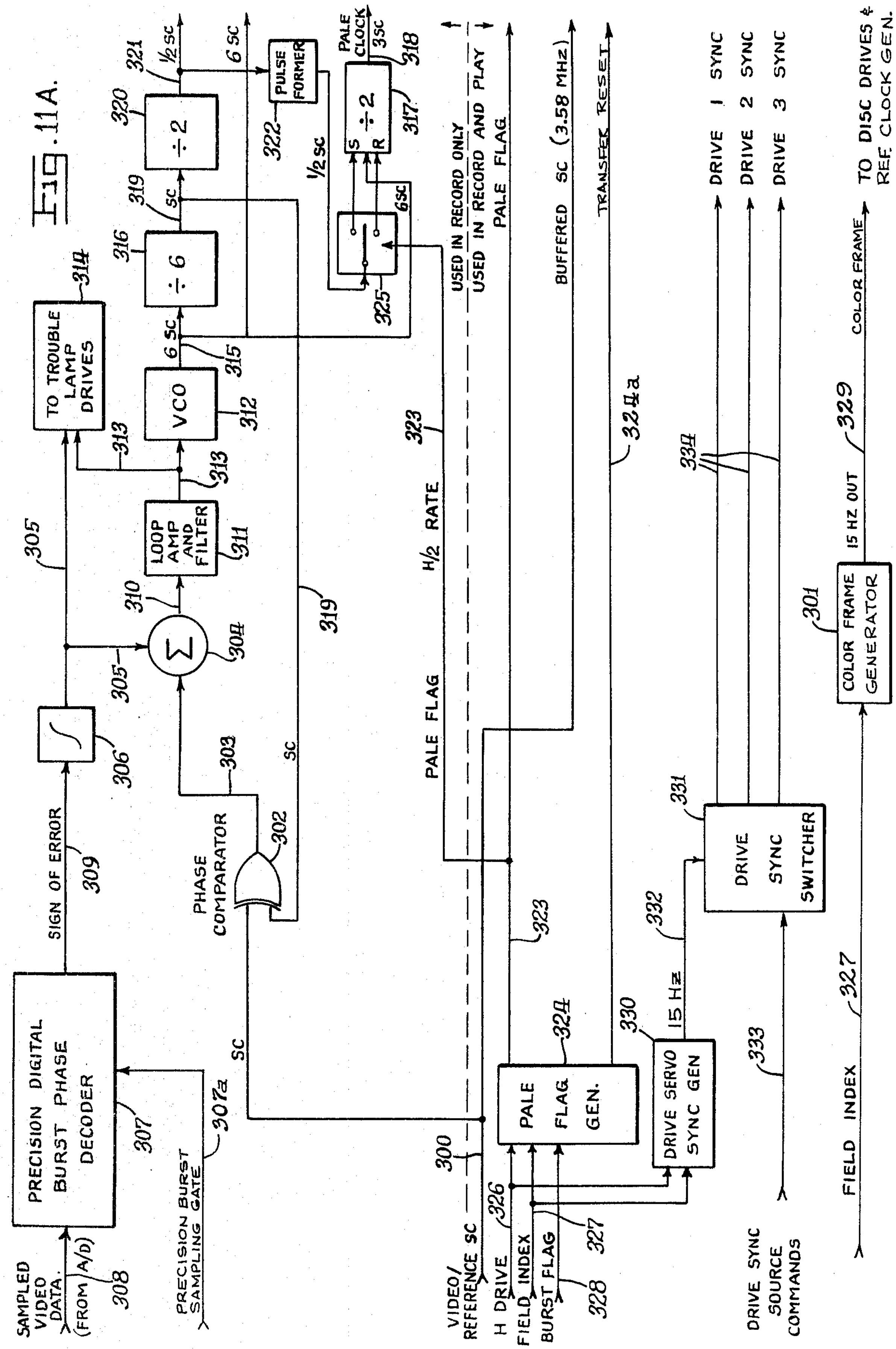
FIG. 11A is a functional block diagram of the reference clock generator circuitry which is a portion of the signal system shown in FIG. 8A.

With respect to the lower portion of the block diagram of FIG. 10A, the PALE flag generator 324 produces a PALE flag signal at the H/2 rate for switching a switch 325 which steers ½ SC pulses into the set or reset terminals of the divide by 2 counter 317 that produces the PALE clock on the output line 318. The PALE flag changes state every line as will be described herein with respect to FIG. 10B. The PALE flag signal is nonsymmetrical so that the phase of the 3SC PALE clock is never reversed during the burst interval of the video signal even though it is reversed during the active video of alternate lines. Thus, the net effect is that only the portion of the line after burst is sampled with a clock signal whose phase is reversed on alternate lines, i.e., a nonsymmetrical signal. As is shown in FIG. 11A, the PALE flag generator 324 has inputs from the video (or reference) input circuitry 93A or 93B of H drive applied on line 326, a field index pulse on line 327 and a burst flag on line 328. The burst flag keeps the PALE flag generator from producing the PALE flag signal on line 323 until after burst has occurred, since the sampling phase of burst must not be altered for the operation of the burst phase decoder 307 in the upper portion of FIG. 10A. The PALE flag generator 324 provides an H/2 rate transfer reset pulse which is sent over line **324*a* to the encoder switch 126 which employs it during data transfer operations to generate a signal that is used by the encoder 96** to reset its sync word inserter.

The H drive and field index signals are also applied to a drive servo sync generator 330 which has an output extending to a drive sync switcher 331 through line 332 and it provides the basic drive sync signals on line 334 for each of the disc drives 73 when commanded by the control line 333 from the computer control system 92. The sync signals are required for all operations in which the information is transferred between a disc pack 75 and the signal system. The computer system 92 differentiates whether a record or playback operation is desired. The sync information is in the form of a multiplex sync signal that appears on lines 334 that extend to the disc drive units and includes a set of three consecutive wide pulses to indicate the first field being recorded or played back at a 15 Hz set rate as well as horizontal sync pulses (at H rate) and is used for control of the spindle servo motor. Color frame and related sync signals also are provided for control of the servo drive and for use by the reference clock generator in generating control signals used during playback operations. The color frame related sync signal is obtained from a color frame generator 301, which receives the 30 Hz field index pulse signal over line 327 and frequency divides it by 2 to obtain the 15 Hz color frame signal. The color frame signal is sent over line 329 to the disc drives 73 and the reference clock generator 98.

The specific circuitry that can be used to carry out the operation of the block diagram shown in FIG. 10A is illustrated in FIGS. 16A through 16D, which together comprise an electrical schematic diagram of the reference logic circuitry. Since the operation of the circuitry shown in the detailed schematic diagram is carried out generally in the manner as has been previously described with respect to FIG. 10A, it will not be described in detail herein. However, with respect to the digital burst phase decoder 307 shown in the upper portion of FIG. 16A, the digitized video subcarrier synchronizing signal or color burst in the form of 8 bits that is derived from the output of the analog-to-digital converter 95, appears on lines 308 which are connected to arithmetic logic units 335 which in turn connect to shift registers 336. The shift registers 336 are clocked by the logic circuitry, indicated generally at 337, which is activated upon receipt of the precision burst sampling gate over line **307*a* and together with the arithmetic logic units 335 perform the arithmetic steps that are necessary to determine the sign of the phase of the digitized color burst on line 309. The error of any sampling is determined by examining the quadrature component of the samples which would be zero if the samples are taken at the proper phase of the subcarrier color burst signal. More specifically, the quadrature component is proportional to the function $X1-\frac{1}{2}(X2+X3)$ where the samples X1, X2 and X3 are 120° apart. The clocking logic 337 performs the sequence that enables the arithmetic units 335 and shift register 336 to carry out the arithmetic computation which will produce either a plus or minus signal on line 309** indicating an error in the phase of the actual samples.

Turning now to FIG. 16A which contains circuitry 324 for generating the PALE flag signal on line 323, the H drive signal is inverted by inverter 342 and is applied via line 338 into the clock input of an FF 339 which is a divide by 2 having output line 340 applied to the input of a second FF 341 that is clocked by the burst gate or flag signal on line 328. Line 340 also extends to a NAND gate 343 as does the output line 344 from the FF 341. The operation of the PALE flag generator 324 will now be described in connection with the timing diagrams shown in FIG. 10B which has the H drive signal (line 326) shown in FIG. 10B(1), the signal on line 340 shown in FIG. 10B(2), the signal on line 344 shown in FIG. 10B(3), the burst gate clock on line 328 shown in FIG. 10B(4) and the output of the NAND gate on line 345 appearing in FIG. 10B(5). The PALE flag signal on line 323 is the inverse of the signal on line 345 by virtue of inverter 346. While the PALE flag signal occurs at a rate of H/2, FIG. 10B(5) shows it to be nonsymmetrical because the output of FF 341 appearing on line 344 and applied to the NAND gate 343 is delayed with respect to the output from the first FF 339 because the FF 341 is clocked by the burst gate rather than by H drive.

REFERENCE CLOCK GENERATOR

The reference clock generator 98 produces the basic timing signals for the apparatus during playback, data transfer, diagnostic and other like operations during which input video signals are not recorded and uses as its input timing reference the regenerated SC (3.58 MHz) that is produced by the input circuitry 93B and passed through the reference logic circuitry 125B. The reference clock generator has phase shifting capability for shifting the entire system phase and includes a phase locked loop and assorted counters and logic circuits to generate the timing signals with the desired system phase. It also generates control signals used by the data decoder and time base corrector 100 and the chroma separator and processing circuit 101. Also, the reference clock generator 98 identifies alternate reproductions of the recorded two field picture frame and issues a frame delay switch signal employed in the blanking insertion and bit muting circuitry 127 to prevent jittering in the display of the output video signal that would otherwise exist because of the use of an H sync related timing control signal synchronized with reference color subcarrier signal to control the processing of the reproduced video information.

The operation of the reference clock generator 98 will now be described in more detail in conjunction with the block diagram shown in FIG. 11A. As is shown therein, the top half of the circuitry produces various timing signals including several clock signals and the bottom half uses reference synchronizing information, such as color frame from the reference logic circuitry 125B and field index and horizontal drive signals from the reference input circuitry 93B and generates the control signals used by the time base corrector 565 (FIG. 13A) and chroma circuitry 101 and blanking insertion and bit muting circuitry 127. More specifically, the SC signal is applied to the reference clock generator 98 at input line 340', causing the generator to produce ½SC, SC, 3SC and 6SC clock timing signals and various time base corrector pulse timing signals as indicated at the right of FIG. 11A. The reference clock generator 98 includes circuitry that is controllable by an operator through, for example, a thumb wheel switch 349 so that the phase of the output signals can be adjusted relative to the phase of the regenerated SC signal on the input by introducing various amounts of phase shift into the circuit and thereby set the playback system phase. Using the horizontal sync position control included in the reference input circuitry 93B and the SC phase control together enables an operator to determine and control the delay introduced to the playback signal channel over a large range in small increments. To control the phase of SC, the input regenerated SC signal on line 340' is divided by 2 by a divider 343', the output of which appears on line 344' that extends to two locations, one being the programmable counter 345' while the other is another divide by 2 divider 346' which in turn is connected by line 347 to a phase comparator 348. The thumb wheel switch 349 introduces a ten bit BCD number, ranging from 0 to 399, into the programmable counter 345' which has the effect of varying the phase of the subcarrier over a range of 0° to 399° in 1° increments. The output of the programmable counter, which is a periodic signal whose duty cycle may be varied in increments of precisely 1/720 of its basic period by means of the thumb wheel switch 349, extends to a current switch **351*a* which modulates the current from a current source 351 of one of two matched current sources 351 and 353. This modulated current is coupled to low pass filter 354*a* which develops a DC voltage proportional to the duty cycle of the signal on line 354**.

A circuit of identical DC characteristics comprising the other matched current source 353, a current switch **353*a* and a low pass filter 355*a*, develops a DC voltage on line 355 which is proportional to the duty cycle of the output of the phase comparator 348. The voltages on lines 354 and 355 are applied to a differential amplifier 356, the output of which is extended by line 357 to the control input of a voltage controlled oscillator 358, which operates at a nominal frequency of 6SC. A number of dividers 360 (divide by 6), 363 (divide by 2) and 365 (divide by 2) sequentially operate on the output of the oscillator 358, producing a signal with a nominal frequency of ¼SC on line 342' which extends to the second input of phase comparator 348, so that the duty cycle of the signal at the phase comparator output varies with the phase angle between its inputs. Under steady state conditions, the duty cycle of the signal on line 352 is forced to be equal to that of the signal on line 350 within a very small margin of error due to close matching of the current sources 351 and the DC impedance of filters 354*a* and 354*b***.

A change in the duty cycle of the signal at the phase comparator 348 output of 1/720 of its basic period requires a change of phase of 0.25° between its inputs, which have a frequency of ¼SC, and this in turn requires a change of 1° between lines 340' and 361, where the frequency is SC. Thus, changing the value by one on the thumb wheel switch 349 causes a 1° change in phase of the SC signal on line 361. The total range of phase comparator 348 (180° at ¼SC) corresponds to 720° at 1SC. For convenience, the thumb wheel switch is limited to 399°, which still insures adequate overrange capability with respect to the necessary 360°.

The phase controlled oscillator 358 provides the phase continuous 6SC clock timing signal over its output line 341' and, through the cooperative operation of the chain of dividers 359, 360 and 363, causes phase continuous 3SC, SC and ½SC clock timing signals to be provided at the outputs as designated in FIG. 11A. The dividers also furnish 3SC and SC clock signals to the logic circuitry 362 that produces phase continuous SC rate read/write (R/WR) mode, write enable (WR EN), demultiplex (DMPLX) clock and multiplex (MPLX) clock signals used by the time base corrector circuitry 565 (FIG. 13A). The details of the logic circuitry are shown in FIGS. 17C and 17D and relationships between the signals provided by the logic circuitry can be found by reference to FIG. 11C. The schematic diagram illustrated by FIGS. 17A through 17D together with the timing diagram of FIG. 11B disclose the operation of one embodiment of logic circuitry 362 for providing phase continuous time base corrector clock signals with the desired timing relationships.

With respect to the lower portion of the circuitry shown in the block diagram of FIG. 11A, the circuitry redefines an H sync related, namely, H/2, signal so that it is synchronous with the phase continuous 3SC signal that is produced by the upper portion of the circuitry and occurs at the first reference horizontal line following alternate reference vertical sync's. As will become apparent upon consideration of the description of H/2 vs SC definition or reclocking circuit 367 hereinbelow, maintaining H/2 synchronized with respect to reference subcarrier and also so that it occurs at the first line of the first field of every two reference field sequence (which corresponds to the placement of the sync word in the video signal), requires frame rate phase inversion of the subcarrier rate clock controlling the reclocking circuit 367 to redefine H/2 with respect to the phase of SC. Subsequent reclocking of the redefined H/2 signal with the phase continuous 3SC clock signal within the circuit 367 introduces a 46 nsec (½ cycle of 3SC) picture frame to picture frame motion of redefined H/2 relative to reference H sync. Use of the redefined H/2 in the time base corrector circuitry 565 to correct a repetitively reproduced video signal transfers the 46 nsec picture frame to picture frame motion to the video signal output by the time base corrector. This motion occurs because the reclocked and redefined H/2 is mispositioned relative to the proper reference H sync position on alternate picture frames and causes the time base corrector circuitry 565 to misposition the sync word a corresponding amount, or ½ cycle of 3SC, on alternate reprodudctions of a frame. As will be explained hereinbelow upon consideration of the sync word insertion circuitry portion of the encoder 96 (FIG. 12), the H/2 rate sync word is inserted in the video signal on alternate picture frames at a position that is displaced ½ cycle of SC from that corresponding to the reference H sync. This is because the sync word inserter is reset every frame and because the sync word is positioned on the first line of every picture frame, it being understood that the first line of successive picture frames have oppositely phased SC. The time base corrector circuitry 565 inherently removes all of this displacement except for the aforementioned ½ cycle of 3SC. A frame delay detector 368 of the reference clock generator 98 generates a frame delay switch signal used by the blanking insertion and bit muting circuitry 127 to correct for such motion. Also, it is not desirable to have the H/2 positive going transition of the unredefined H/2 signal coinciding exactly with a subcarrier transition in the reclocking circuit 367 because an ambiguously timed redefined H/2 pulse signal will be produced for use by the time base correctors 565 and errors in time base correction will result.

To produce an H/2 signal redefined with respect to the phase of the phase adjusted, phase continuous regenerated subcarrier signal, SC provided by divider 360 is coupled to one input of a phase inverter 393 formed by an exclusive OR gate circuit. The other input of the phase inverter is coupled through a NAND gate circuit 397 to receive the 15 Hz color frame pulse signal generated by the reference logic circuitry 125B (FIG. 10A) and present on input line 396*a*. The level of the color frame pulse signal at the input of the phase inverter 393 determines the phase of SC at the output of the inverter, a high level resulting in the inversion of a low level not. Inversion of the phase of SC is necessary because an H/2 signal is preferred that is phase coherent with H sync. (In the recorded video signal, a sync word is inserted in the same lines for all picture frames of the video signal, which in this apparatus is the odd numbered lines of the 525 lines forming an NTSC picture frame.) Without inversion of the phase of SC, the phase of the redefined H/2 signal would change at a 15 Hz rate with respect to H sync by one half of an SC cycle. Such an H/2 signal would not be suitable as a reference for use in a processing reproduced video signals during playback operations. The SC signal output by the phase inverter 393 is provided to the reclocking circuitry 367 and is used together with the reference H drive signal received over line 396 and the field index signal received over line 395, both signals provided by the reference input circuit 93B (FIG. 8A), to generate the H/2 signal defined with respect to the phase of SC. The reclocking circuitry 367 includes logic circuitry to assure that an unambiguously timed H/2 signal is produced and defined with respect to the phase of SC.

The output of the reclocking circuitry 367 is then applied to the frame delay detector 368 which produces the frame delay switch signal on line 369 that identifies the first or second playing of a reproduced still composed of two television fields or a picture frame, so that the clocking circuitry for the blanking insertion and bit muting circuitry 127 will know whether to insert an additional ½ period of 3SC offset for correcting the previously mentioned 46 nsec picture frame to picture frame motion of H/2.

The redefined H/2 pulse signal generated by the reclocking circuitry 367 appears on line 386 that is gated through gate circuitry 370 and 371 to appear on line 372 for use as the basic reference in the time base corrector circuitry 565 during playback operations, which is signified by an enabling signal provided on line 373 by the encoder switch 126 (FIG. 8A) from control signals issued by the computer control system 92. During playback operations, a high level signal appears on line 373 and the playback H/2 on line 386 will satisfy AND gate circuitry 370 and will appear on line 372.

In other operations, such as E to E and transfer, involving the processing of video signals in a playback channel, the H/2 signal as ordinarily generated by the H/2 vs SC definition circuitry 367 is not used. In E to E operations, continuous time base correction is not necessary since the video signal does not experience a record and reproduce process. Hence, the EE or PB command provided by the encoder switch 126 from control signals issued by the computer control system 92 is coupled over line 398 to the reference clock generator 98 associated with the playback channel selected for use to disable the phase alteration of SC. The phase alteration is disabled through the operation of the NAND gate circuit 397 placing a low level signal on the second input of the phase inverter 393. Furthermore, the EE or PB command is coupled to logic circuitry 399 that responsively generates an EE TBC disable signal used to allow the time base corrector circuitry 565 to operate for approximately ten lines at the beginning of each color frame and, thereby, generate the proper timing correction for each color frame or every 15 Hz. This timing correction is required because during the sync word insertion process for E to E operations the sync word generator is reset every two fields, i.e., picture frame. This results in a discontinuity of one half SC cycle in the position of the sync word every other picture frame or every 15 Hz.

When the apparatus is performing a transfer operation through a playback channel, a low level signal is placed on line 373 of the reference clock generator 98 associated with that playback channel. This enables the AND gate circuit 374 to pass a transfer H/2 signal present on line 375 to the OR gate circuit 371 which gates the transfer H/2 to the output on line 372. The transfer H/2 is derived from the sync word inserter portion of the encoder 96 circuitry. An output pulse from the encoder 96 that is coincident with the sync word or line identification is produced and that pulse is used as the time base corrector reference. The pulse appears on line 376 and passes through a shift register delay circuit 377 which correctly positions the pulse that is present on line 376. The transfer H/2 signal is positioned so that the digitized video signal provided to the encoder 96 during a transfer operation has a correctly identified location for insertion of a new sync word.

Specific circuitry that can be used to carry out the operation of the block diagram shown in FIG. 11A is shown in FIGS. 17A through 17D. The operation of the specific schematic circuitry will not be described in detail since it carries out the operation as has been previously described with respect to FIG. 11A. However, with respect to the generation of the H/2 signal so that it is unambiguously redefined with respect to SC, the reclocking circuitry 367 includes an H/2 signal generator 378 comprising a divide by 2 counter and following pulse former respectively formed by an edge triggered flip-flop and following self resetting flip-flop. The counter receives at its clock input H drive signals present on input line 396 and provides an H/2 signal at its output. The H/2 signal is formed into a train of negative pulses, each at a positive going transition, by the H/2 generator's pulse former. The 30 Hz field index signal resets the counter portion of the generator 378 at beginning of the first field of every picture frame so that the phase of the H/2 signal is the same at the time of the first line of the first field of every picture frame.

The SC signal provided by the phase inverter 393 is also formed into a train of negative pulses by a pulse former 393*a*. A pulse coincidence detector circuit 378*a* formed by a low level AND gate and following D latch examines for a coincidence of the SC transition related pulses received from the pulse former 393*a* and the H/2 transition related pulses provided by a timing selection circuit 379 in response to each negative pulse provided by the pulse former portion of the generator 378. If the positive transition of the H/2 signal provided by the generator 378 becomes too close in time to the positive transition of the SC signal, the transition related pulses will overlap in time at the coincidence detector circuit 378*a* resulting in the toggling of the latch of the detector circuit. Toggling of the latch changes the level at an input of an exclusive OR gate 379*a* included in the timing selection circuit 379 to change it between its inverting and non-inverting mode. The timing selection circuit 379 includes a self resetting, edge triggered flip-flop 379*b* having its clock input coupled to the output of the exclusive OR gate 379*a*. By selectively inverting and not inverting the negative pulses provided by the H/2 signal generator 378, the positive edge of the pulse output of the exclusive OR gate is moved relative to SC. The timing selection circuit 379 cooperates with the coincidence detector circuit 378*a* to position the positive edge of the pulse output of the exclusive OR gate 379*a* so that unambiguous redefinition of H/2 will always result.

Redefinition of H/2 is performed by the reclocking edge triggered flip-flop 367*a* having its reset input coupled to an output of the timing selection circuit 379 and its clock input coupled to receive the SC signal provided by the phase inverter 393. Each H/2 transition related pulse resets the flip-flop 367*a* and the immediately following positive transition of the SC signal received at the clock input changes its state to thereby generate the redefined H/2 transition. A following latch 367*b* couples the redefined H/2 transition signal to a delay means 391 composed of a counter and following shift register operated to provide a properly timed H/2 signal on the line 380 extending to the frame delay detector circuit 368. The redefined H/2 transition signal output by the latch 367*b* is coupled to reset the delay means 391 and an SC signal, opposite in phase to that utilized in the reclocking circuitry 367, provided over line 392 clocks the delay means to effect issuance of the redefined H/2 transition signal to the detector 368.

With reference to the frame delay switch signal that appears on line 369 in FIG. 17D, it is a signal that changes level on alternate picture frames and is used in the blanking and bit muting circuitry 127 for adjusting the half cycle of 3SC mispositioning of alternate picture frames as previously discussed. The operation of this portion of the circuitry will now be discussed in connection with FIG. 11C. The signal appearing on line 380 is an H/2 rate pulse signal which has been unambiguously redefined with respect to the phase of the regenerated SC that is inverted on alternate frames so as to insure that the SC redefined H/2 transition signal is stationary with respect to H sync reference. This transition signal is clocked into a shift register 381 by a phase continuous 3SC signal appearing on line 394 and appears on the first output line 385 delayed and synchronized to the 3SC signal. Because the continuous phase 3SC clock is an odd multiple of one half the picture frame frequency, its phase during a first picture frame is 180° different with respect to H sync reference than its phase at the same time during the next picture frame and, hence, is also 180° different frame to frame with respect to the redefined H/2 pulse. Because of this 180° phase relationship difference, the positive transition of the 3SC clock shifts one half cycle picture frame to picture frame relative to the redefined H/2 pulse and consequently the clocking of the shift register 381 relative to the occurrence of the stationary H/2 pulse will change frame to frame by one half of the 3SC clock period. To detect the relationship between the redefined H/2 signal and the phase continuous 3SC clock signal, a stationary pulse is generated from the positive transition of the redefined H/2 signal and is used by the frame delay detector latch or D type flip-flop 368*a* to determine the phase of the 3SC clock at the beginning of alternate picture frames and provide the phase indicative frame delay switch on line 369 as shown in FIG. 11C. More specifically, the pulse forming circuitry comprised of inverter 382, resistor 388, capacitor 387 and NAND gate 389 generates a stationary pulse from the leading edge of the H/2 pulse signal present on line 380 at the input of the shift register 381. The stationary pulse has an interval of $\frac{3}{4}$ of a cycle of 3SC and its leading edge (as well as that of the H/2 pulse signal) corresponds to the positive transition of the redefined H/2 signal. Because the shift register 381 is clocked by the phase continuous 3SC clock, the H/2 pulse signal will appear on the shift register's output line 385 at different times relative to its presence on the input line 380 depending upon the phase relationship of the redefined H/2 signal and 3SC signals. When the signals are in phase, the H/2 pulse signal appears on line 385 one cycle of 3SC after its presence on the input line 380. When the signals are out of phase, the H/2 pulse signal appears on line 385 $\frac{1}{2}$ cycle of 3SC earlier. The signal level on line 385 is strobed into the D flip-flop 368*a* by the positive going transition of the stationary pulse on line 384, which occurs $\frac{3}{4}$ of a cycle of 3SC after the occurrence of the redefined H/2 pulse signal at the input of the shift register. The output of latch 368*a* on line 369 indicates whether the H/2 pulse was present on line 385 after a delay of $\frac{3}{4}$ period thereby determining if the time delay between the positive going signals on lines 394 and 385 is $\frac{1}{2}$ period or 1 period of 3SC. This signal on line 369 in turn is coupled to the blanking insertion and bit muting circuitry 127 to selectively insert a $\frac{1}{2}$ 3SC period offset in the clocking of the video data, compensating for the aforedescribed 46 nsec picture frame to frame motion of the redefined H/2.

With reference to the frame phase inverter switch signal that appears on line 356*a* in FIG. 17D, it is a signal that changes levels on alternate picture frames and is used in the chroma separator and processing circuitry 101 to effect inversion of the chrominance component included in the reproduced video signal on alternate reproductions of the two field color video signal. The playback burst is provided on input lines 361*a* by the data transfer circuitry 129 and is phase compared with the phase continuous SC by the exclusive OR gate 362*a*. SC and playback burst alternate between in phase and out of phase conditions with alternate reproductions of the two field color video signal, causing the level of the output of the exclusive OR gate 362*a* to change at a 15 Hz rate with the change occurring at the time of playback burst. The frame phase inverter switch signal is obtained by clocking the output of exclusive OR gate 362*a* through a latch 363*a* with one properly timed clock at every burst flag. The latch 364*a* receives at its D input the burst flag signal provided on line 360*a* by the reference input circuitry 93B and is clocked by the phase continuous SC provided at its clock input by the divider 360. Each time a burst flag signal is present on input line 360*a*, the latch 364*a* issues a pulse to the latch 363*a* defined with respect to the phase of SC. This pulse is used to clock the level at the input of the latch 363*a* to its output. Because the level at the input of the latch 363*a* changes with alternate reproductions of the two field color video signal, the level at the output of the latch 363*a* also changes with alternate reproductions to produce the 15 Hz frame phase inverter switch signal on line 356*a* that defines when the chrominance should be inverted or not in the chroma separator and processing circuitry 101.

ENCODER

The encoder 96 shown in the block diagram of FIG. 8A of the video signal system contains circuitry which performs functions in addition to channel encoding the digitized data on each of the eight video data bit lines, the parity bit and the data track sequence as described hereinbelow. One of the additional functions involves the use of a parity generator to perform a parity check to verify that the data is correct on all of the eight data bit lines. The parity bit is optional and requires an extra data bit line such as is available in the apparatus described herein. The encoder 96 also generates and inserts the sync word (also referred to herein as the line identification or line ID). The sync word is in the form of a 7-digit binary number which is placed in alternate television lines, generally where the horizontal sync pulse had been previously located, it being understood that the horizontal sync had been stripped from the composite video signal by the video input circuitry 93. The sync word is inserted within one cycle of SC of the location previously occupied by the horizontal sync pulse, and the encoder 96 inserts the sync word into each of the eight video data lines, the parity bit line and the data track line before the channel encoding is performed so that the output of the encoder 96 which is connected to the electronic data interface 89 contains the sync word in each of the 10 data streams recorded on a disc pack 75 (or sent to the playback channel 91 during E to E operations).

Figure 12A:
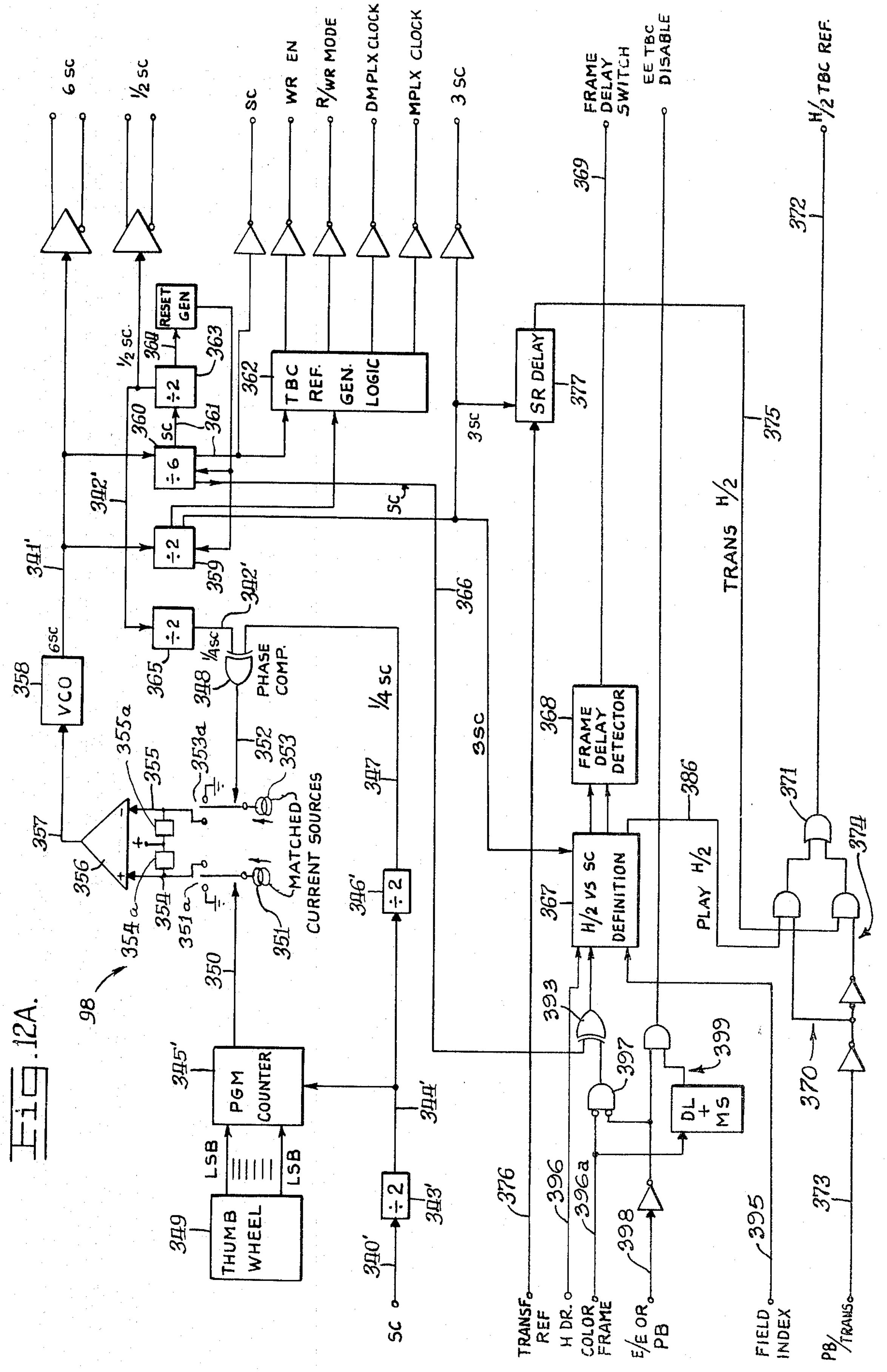
FIG. 12 is a functional block diagram of the encoder and sync word insertion circuitry which is a portion of the signal system shown in FIG. 8A.

The encoder 96 operation will now be described in conjunction with a block diagram shown in FIG. 12 and schematic circuit diagrams of FIGS. 18A–D. NRZ-L data from the encoder switch 126 enters on input line 450 and exits on output line 451 of each data bit line after having been (i) checked for parity, (ii) had the sync word inserted in alternate (odd) lines and (iii) channel encoded in a format that is conducive to magnetic recording and reproducing the digitized information with respect to one of the disc packs 75. The input data on each data bit line is applied to one input of a data input AND gate 452 which is connected to a channel encoder 453, which may be switched between two channel encoding formats, both of which will be described hereinafter. In the schematic circuit diagram of FIGS. 18A–D, identical channel encoders for two video data bit lines are shown in their entirety. Identical channel encoders for the other video, parity and data track data lines are contained in dotted line enclosures below the encoders shown in their entirety. A sync word input AND gate 454 in each of the 10 bit lines is used to gate the sync word into the encoder at the proper time. These AND gates are also arranged to insert a test signal in the 10 bit lines if desired, the test signal being provided on line 450*a* (FIGS. 18A and 18B) by a suitable test signal source, such as digital test pattern generator. A first clock generator 455 has input signals 6SC and $\frac{1}{2}$SC applied thereto by the encoder switch 126 and provides various SC and 3SC outputs as shown. Two of the 3SC outputs are applied by lines 472 and 473 to a second clock generator 456 which provides two time displaced 3SC clock signals on the two lines 474 and 475 that are extended to the channel encoder 453 for clocking the same. The clock signal on line 475 is a $\phi 1$ clock and is displaced one-half cycle of 3SC from the clock signal on line 474, which is a $\phi 2$ clock. During recording operations, these time displaced clocks are derived from the continuous phase 6SC, ½SC signals generated by the reference logic circuitry 125A and provided to the encoder 96 by the encoder switch 126. During other operations, such as recording the blinking cross delete signal, the reference clock generator 98 provides the clock signals. The $\phi 1$ and 100 2 3SC clock signals are used to drive the channel encoder 453 so that a continuous channel encoded digital signal without phase discontinuities is provided at the output on line 451.

The clock generator 455 has an SC clock output 471*a* driving a ÷455 divider 457 which can also be reset by a reset pulse provided by the encoder switch 126 on line 463 at a 30 Hz rate. The divider 457 sets a flip-flop (FF) 458 through the start line 464 and subsequently resets the FF 458 when a pulse appears on the stop line 465 extending to the reset pin. The START and STOP pulses define a window during which a single 7-digit binary sync word provided at the output of a sync word generator 459 can be inserted in all data bit lines simultaneously.

During the vertical blanking period, a pulse is applied to a monostable multivibrator (MS) 460. The multivibrator is active for a period of about 10 lines of the vertical blanking period by switch vertical signal provided on line 466 by the encoder switch 126 and its output is applied to one side of gate 461 (shown in this block to be an NAND gate), the other side of which is supplied by the output of the window generating FF 458. The output of the NAND gate 461 extends to the other input of the AND gate 454 as well as through an inverter 462 to one side of the AND gate 452.

During the operation of the encoder circuitry 96, it is desired that the data stream for each bit be applied on an input such as input 450 which is representative of the eight separate data input lines, each of which is connected to a separate encoder 453 and the associated data and sync word input AND gates 452, 454 and inverter 462 so that a data output line 451 exists for each of the data bits and each of the data streams is properly channel encoded and has a sync word inserted therein. Since it is desired that the sync word occur close to the former location of the horizontal sync pulse and since it is also desired that it not be confused with data of the data stream, the data bit lines input to the channel encoders 453 are disabled by the data input gates 452 when the sync word is inserted during a sync word gate window that is generated by the divider 457 and FF 458. More specifically, the divider 457 provides a START pulse for setting the FF 458 and this enables one input of each AND gate 454 while simultaneously disabling each AND gate 452 thereby blocking the data entering on lines 450. The divider 457 issues a pulse to the sync word generator 459 over line 467 twelve data bit intervals after the generation of the START pulse and the sync word generator 459 then generates the 7-digit binary word which is applied to the upper input of all AND gates 454 which have previously been enabled. The AND gates 454 pass the sync word into each channel encoder 453 where it is encoded onto the data stream. After the sync word has been generated, the divider 457 issues a STOP pulse 29 data bits later which resets the FF 458, disabling all AND gates 454 and simultaneously enabling all AND gates 452 so that the data on lines 450 will be passed into the channel encoders. It should be understood that the data stream line 450 is continuous in its flow and that disabling the AND gates 452 merely blocks it from passing. Hence, the information is only discarded in a sense during the insertion of the sync word. However, since the sync word is inserted approximately at the previous location of the horizontal sync pulse, no active video informational data is lost.

During the vertical blanking interval, the multivibrator 460 provides an output to the NAND gate 461 which occurs for an interval of about 10 lines. This disables the data input AND gate 452 during the 10-line interval of the blanking period so that the received data is prevented from passing to the channel encoder during this interval. Thus, the only data or logical 1 bits that appear on the output data line 451 during the 10 line interval of the vertical blanking period are those in the sync words that appear every other line, as previously described, and pass through the sync word gate 454. This insures that the decoder and time base corrector circuitry 100 will be locked on the actual sync word during playback rather than some randomly occurring sync word bit pattern that might be contained in the active video information during the flow of the data stream.

Another aspect of the operation of the encoder 96 will be more clearly understood by referring to FIGS. 8A and 9B. The electronics data interface 89, disc drive data interface 151 and data select switch 128 couple the encoder 96, disc drive 73 and decoder and time base corrector circuitry 100. It should be appreciated that during a seek operation when the heads in the disc drive 73 are moving between tracks, it is desirable to prevent the introduction of perturbances in the signal system. Ordinarily, the record signal processing system 88 will provide at the output of its encoder 96 digitized data even in the absence of an input video signal. While this signal will represent noise information, the digital signal processing electronics of the apparatus cannot distinguish between digitized noise and digitized video information. This factor is taken advantage of when the apparatus is performing a seek operation. During seek operation, the transducing heads create noise signals that do not conform to the channel encoded format of the digital data ordinarily present in the signal system. Such noise signals, if permitted to enter the playback channel 91, undesirably perturb the phase lock loops of the decoder and time base corrector circuitry 100. To avoid such perturbances, the disc drive data interface 151 is switched (as in an E-to-E operation) to reroute the output provided by the encoder 96 to the decoder and time base corrector circuitry 100. In this manner, the decoder and time base corrector circuitry 100 is receiving channel encoded digital signals that maintain the respective phase lock loops in the circuitry 100 within their normal operation range. Hence, when the heads of the disc drive 73 are properly positioned and playback data provided to playback channel 91, the decoder and time base corrector circuitry 100 are prepared to immediately provide the output decoded and time base corrected signals.

In addition, the encoder 96 also serves to cause black level data to be generated for use in recording on the disc surfaces as previously described during the first two revolutions of the disc pack 75 prior to the recording of the video signal information on the subsequent two revolutions of the disc pack. Accordingly, the prerecord line 470 (FIG. 18A) extending from the electronics data interface 89 is activated as a result of signals provided by the disc drive data interface 151 and causes NAND gate 461 to block any logical "1's" as may be present on the input lines 450 thereby producing the black level at the input of the channel encoder circuitry 453. It should be noted, however, that the encoder 96 still functions to insert the sync word in the black level signal.

Each data bit line of the ten parallel data bit lines recorded on a disc pack 75 is channel encoded selectively by a channel encoder 453 into one of two DC free self clocking channel codes. As will be described further hereinbelow, the two position code selection switch 480 selects between the two channel codes. In both codes, the NRZ-L data bit stream on a data bit line is broken into discrete bit times commonly designated as data bit cell times. For the channel code with the selection switch 480 in POS. 1, the code rules followed result in logical first bits, e.g., logical 1's to be represented by signal transitions at a particular location in the respective bit cells, specifically at mid-cell, and logical second bits or logical 0's to be represented by signal transitions at a particular earlier location in the respective cells, specifically at the beginning or leading edge of each bit cell. Any transition occurring at the beginning of one bit interval following an interval containing a transition at its center is suppressed. The aforedescribed code is referred to herein as the Miller code, which is described in the aforementioned U.S. Pat. No. 3,108,261.

In the channel code with the selection switch in POS. 2 as shown, the input data stream in each data bit line may be viewed as the concatenation of variable length sequences of three types: (a) sequences of the form 1111 . . . 111, any number of logical 1's but no logical 0's; (b) sequences of the form 0111 . . . 1110, any odd number of consecutive 1's or no 1's, with 0's in the first and last positions; (c) sequences of the form 0111 . . . 111, any even number of consecutive 1's preceded by a 0. A sequence is of type (c) only if the first bit of the next following sequence is a zero. Sequences of types (a) and (b) are encoded according to the code rules described in U.S. Pat. No. 3,108,261. A sequence of type (c) is encoded according to the U.S. Pat. No. 3,108,261 rules for all bits except the last logical 1, and for this 1 the transition is simply suppressed. By this means, the type (c) sequence, viewed in isolation, is made to appear the same as a type (b) sequence, that is, the final logical 1 looks like a logical 0.

By definition, the type (c) sequence is followed immediately by a logical 0 at the beginning of the next sequence. No transition is allowed to separate the type (c) sequence from the following 0. Therefore, the special coding is distinctive for decoding purposes. The decoder must merely recognize that when a normally encoded logical 1 is followed by two bit intervals with no transitions, then a logical 1 and logical 0 should be output successively during those intervals. Other transition sequences are decoded as for the Miller code.

The encoding procedure for this code requires that a modulo-2 count be maintained of the number of logical 1's output by the encoder since the last previous 0 which was not the final bit of a type (b) sequence. If the count is 1 (odd number of 1's) and the next two bits to be encoded are 1 and 0 in that order, then no transitions are output during the next two bit intervals. If the next subsequent bit is another 0, then it is separated from its predecessor by a transition in the usual aforementioned U.S. Pat. No. 3,108,261 code fashion. This channel code provides for the transmission of data in binary form over an information channel such as a magnetic record/playback system, incapable of transmitting DC, the information being transmitted in self-clocking fashion. The aforedescribed code is referred to herein as the Miller Squared code, which is described in the aforementioned U.S. Pat. No. 4,027,335.

With respect to the channel code, it makes no difference which binary state is considered logical 1 and which binary state is considered logical 0. In the foregoing and following descriptions the state normally marked by mid-cell transitions is considered the 1 state, whereas the state normally indicated by cell edge transitions is considered the 0 state.

The channel encoders 453 illustrated by the FIG. 18A through 18D operate in accordance with the aforedescribed code rules. FIG. 18E is a timing diagram depicting the operation of the channel encoder 453 included in one of the data bit lines 450, with switch 480 shown in FIG. 18B in the indicated position.

The channel encoder will now be described with the code selection switch 480 set as shown in FIG. 18B to effect channel encoding of one of data bit streams. A description of the differences in the operation of the encoder when the switch 480 is set in its other position to effect channel encoding of the data bit stream will follow.

As described above, data encoded with the selection switch 480 in POS. 2 requires examining two successive data bits to be encoded whenever the modulo-2 count of logical 1's previously encoded is odd. For this purpose, each channel encoder 453 includes a pair of serially connected input latches 481 and 482 clocked by the trailing positive edge of the $\phi 2$ 3SC clock signal (FIG. 18E-(2)) on line 474*a*, which is coupled to line 474 by an inverter 483. The input latches provide a two bit cell delay from the input of latch 481 to the output of latch 482. At each trailing positive edge of the $\phi 2$ clock, latch 481 is operated to latch the present data level of the bit stream at its input so that it appears at its output (FIG. 18E-(3)) and latch 482 is operated to latch the preceding data level of the bit stream contained in latch 481 so that it appears at its output (FIG. 18E-(2), (3) and (4)). Therefore, the outputs of the latches 481 and 482 contain the data bits of two consecutive bit cells that are to be encoded.

The outputs of the latches extend to the inputs of three NAND gates 486, 487 and 488 for separately gating through pulses corresponding to logical 1's and 0's in the data bit stream. NAND gate 486 receives three inputs; one from the output of latch 481, one from the output of latch 482 and $\phi 1$ clock pulses (FIG. 18E-(1)) placed on line 475 by an inverter 484 connected to the output line 475*a* of the clock generator 456. This NAND gate is enabled to provide an output pulse 489 (FIG. 18E-(6)) upon receipt of a $\phi 1$ clock whenever its other two inputs are at a low level, which occurs only when successively received data bits are logical 0's. Consequently, NAND gate 486 issues logical 0 related pulses that are marked by transitions in the channel encoded format of the data stream output by the channel encoder 453. A logical 0 bit that immediately follows a logical 1 bit is blocked from passage by the NAND gate because the latch 482 will be high when, for example, the $\phi1$ clock pulse 490 (FIG. 18E-(1)) occurs. Hence, the channel encoder 453 follows the code rules as if the selection switch 480 was in POS. 1 for successively occurring logical 0 data bits.

On the other hand, the NAND gate 487 has two inputs and is enabled to provide an output pulse (FIG. 18E-(5)) upon receipt of a $\phi1$ clock for all logical 0 data bits. Because the output of latch 482 enables the NAND gate 487, the logical 0 related pulses are provided one data cell time after the data has been latched into the channel encoder 453.

NAND gate 488 has three inputs and is enabled by the inverted output of the latch 482 to provide an output pulse (FIG. 18E-(7)) upon receipt of a $\phi2$ clock for all logical 1 data bits, unless a high level bit suppression command 491 (FIG. 18E-(10)) is placed on the input of the NAND gate by a line 492 extending from a bit suppression NAND gate 493 as will be described hereinbelow. NAND gate 488 generates the logical 1 related pulses during the interval of the $\phi2$ clock, hence, before the latch 482 is clocked by the trailing positive edge of the $\phi2$ clock. The logical 1 related pulses are provided by the NAND gate 487 one data cell time after the data has been latched into the channel encoder 453 at latch 481.

Figure 18C:
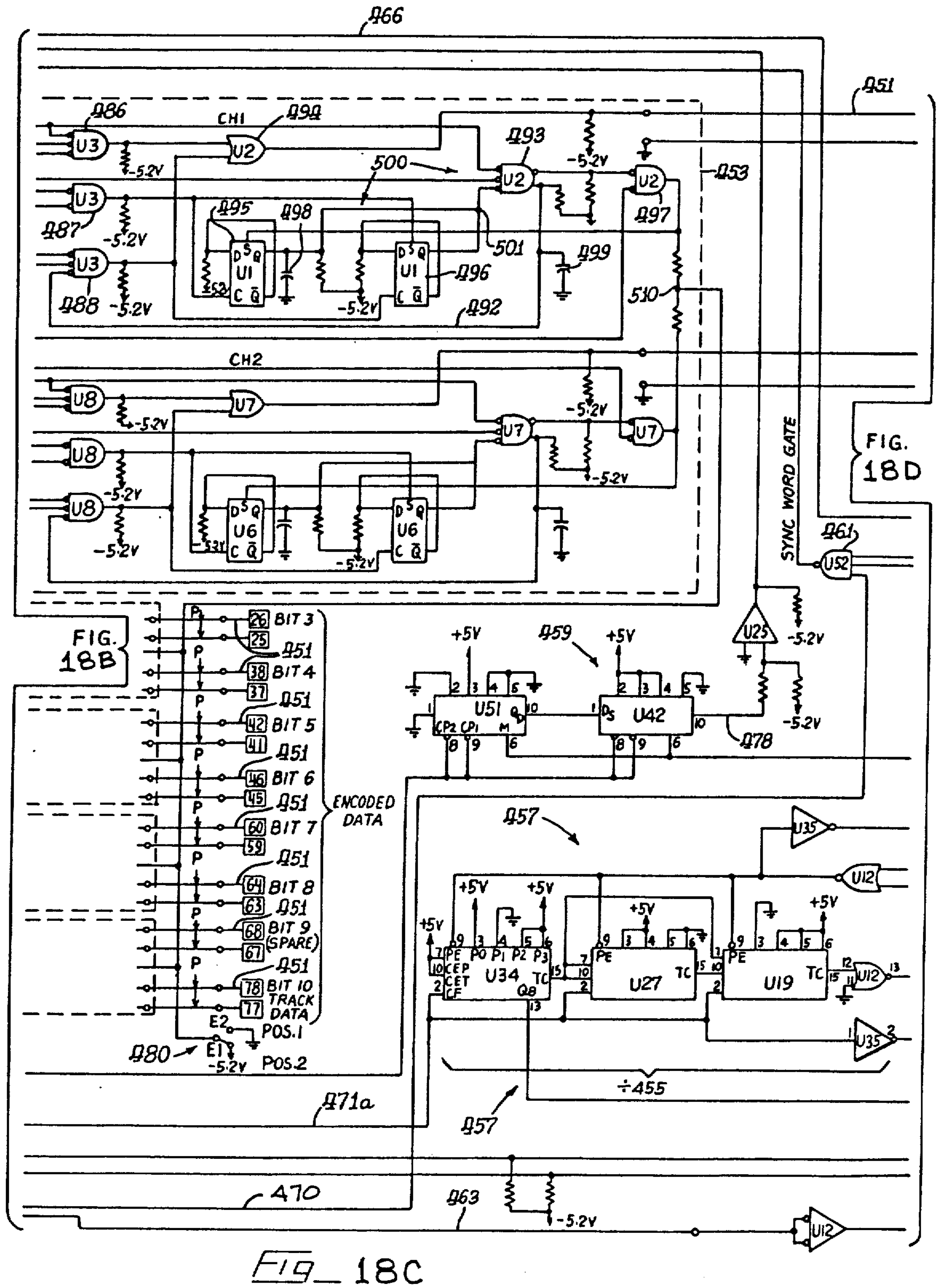

An OR gate 494 has two inputs connected to receive the logical 0 pulses 489 (FIG. 18E-(6)) provided by NAND gate 486 and the logical 1 pulses 515 (FIG. 18E-(7)) provided by the NAND gate 488. The output of the OR gate 494, which appears on the encoder output line 451, will, therefore, be a train of pulses (FIG. 18E-(14)) that occur according to the code rules for the channel encoder. Hence, the NAND gates 486 and 488 together with the OR gate 494 serve to encode the incoming NRZ-L data stored by the latches 481 and 482 into the selected channel code format. The NAND gate 487 operates with bit suppression logic circuitry 500 described below to control the selective suppression of logical 1 data bit related transition in the channel encoded data. By disabling the bit suppression logic circuitry 500, as would occur by changing the position of the switch 480 from that shown in FIG. 18C, the NAND gates 486 and 488 will encode the data according to the Miller rules.

To encode the data bit stream according to the aforementioned Miller Squared code rules, the bit suppression logic circuitry 500 includes two modulo-2 counters 495 and 496 for counting encoded logical 1's and 0's and, together with cooperating gate circuitry, effecting the generation of the bit suppression command on line 492 that suppresses selective logical 1 bit related transitions in the channel encoded data appearing on line 451. The modulo-2 counter 495 counts the logical 0 related pulses coupled to its clock input by the NAND gate 487. Logical 1 related pulses provided by NAND gate 488 are coupled to the clock input for counting by the modulo-2 counter 496. Counter 495 recognizes the beginning of each sequence by toggling in response to logical 0 pulses each time a logical 0 is encoded and being cleared each time a logical 1 related transition is suppressed. As can be seen from the aforedescribed code rules, counter 495 toggles twice during a type (b) sequence and never changes state during a type (a) sequence, and therefore is in its cleared state before the start of any sequence. The bit suppression logic circuitry 500 must recognize the end of a type (c) sequence. Modulo-2 counter 496 is employed in the performance of this function by toggling in response to logical 1 pulses each time a logical 1 is encoded and being cleared in response to logical 0 pulses each time a logical 0 is encoded. Waveforms (8) and (9) of FIG. 18 illustrate the respective operations of the modulo-2 counters 495 and 496 if their outputs are not connected together at the wired-OR 501. Waveform (13) of FIG. 18E illustrates the actual state at the wire-ORed connection 501. As should be appreciated from the foregoing, if counter 496 is not in its cleared state, the counter 495 is in its cleared state, the present bit to be encoded is a logical 1 and the next following bit is a logical 0, the bit suppression command is provided by NAND gate 493 on line 492 to disable the NAND gate 488 and thereby suppress the encoding of the present logical 1 bit.

Considering the cooperating gate circuitry for controlling the clearing of the two modulo-2 counters 495 and 496, counter 496 has its set terminal coupled to the NAND gate 487 so that its output is set high each time a logical 0 related pulse is output by the NAND gate 487. The counter 495 has its set terminal coupled to the output of a NAND gate 497 so that its output is set high each time a logical 1 related transition is suppressed in the channel encoding of the data bit stream. For reasons that will become apparent from the following description, a pair of capacitors 498 and 499 are connected in the output circuits of the modulo-2 counter 495 and NAND gate 493, respectively, to delay the set logic level of counter 495 appearing at the wired-OR 501 and removal of the bit suppression command from NAND gate 488.

The bit suppression command is generated by the NAND gate 493 that examines the first of consecutive data bits to be encoded and which is present in inverted form at the output of the latch 482, the next following of the consecutive data bits to be encoded and which is present at the output of the latch 481 and the counter states of the modulo-2 counters 495 and 496. If either one of the counter outputs at the wire-OR 501 is high, the NAND gate is disabled. However, whenever the beginning of a type (c) sequence occurs, both counters 495 and 496 will be low, thereby placing an enabling signal at the input of the NAND gate 493. If the next two bits to be encoded are a logical 1 followed by a logical 0, the bit suppression command 491 will be generated and placed on line 492 upon the occurrence of the $\phi2$ clock pulse 502 (FIG. 18E-(2)) immediately preceding the $\phi1$ clock pulse 490 that would effect the generation of the logical 1 related pulse through NAND gate 493. Hence, when the $\phi1$ clock pulse 490 (FIG. 18E (2)) occurs on line 474 that would cause the NAND gate 488 to generate a logical 1 bit pulse, the NAND gate 488 is disabled by the bit suppression command on line 492 and the logical 1 bit pulse is suppressed as represented by the pulses 512 shown in phantom at line (14) of FIG. 18E. The bit suppression command is terminated upon setting the counter 495. The set pulse 505 (FIG 18E-(12)) is provided by the NAND gate 497 in response to the bit suppression command 491 (FIG. 18E-(10)) on line 510 and the aforementioned $\phi1$ clock pulse 490, which occurs ½ cycle of 3SC after the $\phi2$ clock pulse or about 47 nanoseconds. To insure that the counter 495 is not set and the bit suppression command not removed until after the $\phi1$ clock pulse 490 has ended, the delay capacitors 498 and 499 are provided to delay the return of the counter 495 to its high set state, hence, disabling of the NAND gate 493 and to delay the return of NAND gate 493 to its low disabled state, hence, extending the duration of the bit suppression command 491. The effect of the delay is seen at the rounded portions 508 and 509 of the waveforms (10) and (13) of FIG. 18E.

To disable the bit suppression logic circuitry 500, switch 480 is placed in the position that places a high level signal (ground in the channel encoder 453 of this apparatus) on the set line 510 for the counter 495. This places the counter permanently in its set state, thereby placing a disabling high level signal permanently at the wire-OR input of the NAND gate 493. Hence, bit suppression commands 491 can not be generated and bits will not be suppressed.

Commonly, self clocking channel encoded data code formats carry data and clock information as particularly placed transitions between two signal levels. When such encoded data is sent through a transmission channel, it usually experiences some timing distortion because of the non-linear characteristics of most transmission channels. If the timing distortion is significant, errors may result because of the inability of the channel decoder to determine the correct location of the transmitted transitions. Furthermore, a high data rates, such as found in the apparatus described herein, the timing distortion may result in unacceptable errors in the transmitted data. This is particularly the case where, as in the case of the channel codes selected for use in the apparatus herein, oppositely directed transitions carry the data and timing information. Non-linear transmission channels will alter the positively and negatively going transitions in a non-linear manner with respect to time. Hence, level sensitive data detectors commonly used at the terminal of a transmission channel to restore the transmitted data so that it has properly positioned transitions will position the positive and negative transitions differently. Different positioning occurs because a positive transition with substantial timing distortion will reach the level selected for sensing the presence of transitions at a time after its nominal position that is different from that required by a similarly distorted negative transition.

To enhance the reliability of transmission of channel encoded data in which oppositely directed transitions carry the data and clock information, each of the channel encoders 453 encodes the data bit stream at its input by providing pulses in accordance with the rules of the selected channel code at the transition locations of the channel encoded format. In the particular channel encoder used in the apparatus described herein, logical 1 data bit pules 515 (FIG. 18E-(7) and (14)) are provided at the data cell boundaries to define logical 1 bit related transitions that appear in the channel encoded data and logical 0 data bit pulses 489 (FIG. 18E-(6) and (14)) are provided at center of a data cell to define logical 0 bit related transitions that appear in the channel encoded data. The transition-related pulses are generated by the clock generator 456 to have a precisely defined edge, the leading edge being selected. The second clock generator 456 includes two one-shot multivibrators that are clocked by the oppositely phased 3SC clock signals provided by the first clock generator 455 over lines 472 and 473. Since the leading edges of the positive pulses generated by each of the one-shot multivibrators are defined by rapidly switching the multivibrators from its stable state to its quasi-stable state (there being no significant time constant determining components involved), each leading edge will be identical to all others and occur at a precise time following the occurrence of the positive clocking transition of the clocking signal. The two multivibrators of the second clock generator 456 thusly provide $\phi 1$ and $\phi 2$ clock pulse trains, which in the embodiment described herein have a pulse width of about 17 nsec, with the leading edges of the pulses of each train precisely defined with respect to each other and those of the other train. As described hereinbefore, the $\phi 1$ clock pulses provided on line 475 are gated through the NAND gate 488 as logical 1 data bit transition related pulses that appear in the channel encoded data and the $\phi 2$ clock pulses provided on line 474 are gated through NAND gate 486 as logical 0 data bit transition related pulses that appear in the channel encoded data. Since the NAND gates 488 and 486 are in an enabled condition at the times the $\phi 1$ and $\phi 2$ are received for transmission as transition related pulses (FIG. 18E-(4), (7) and (14) for logical 1 bit pulses and FIG. 18E-(3), (4), (5), (6) and (14) for logical 0 bit pulses), their respective leading edges will not be noticeably affected by the transmission through the NAND gates. Because the transmission channel over which the pulses are sent will act on identical pulse edges the same, the precise locations of the transition-related positive pulse edges, hence, data signal transitions themselves, are not lost as a result of any distortion that may be introduced to the pulses by the action of the transmission channel.

The channel encoded transition related pulses output by the encoder 96 over lines 451 are coupled by the electronics data interface 89 to the transmission line 152 extending to the disc drive data interface 151 associated with the disc drives 73. The electronics data interface 89 includes conventional logic converters which convert the TTL logic on lines 451 to emitter coupled logic levels which provide complementary level pulses on two lines in a manner that is used elsewhere at various locations of the apparatus. The interface 151 of the disc drive selected for recording the video data passes the data to the selected drive's record amplifier and head switch circuitry. A divide by two JK flip flop included in each data bit line receives the transition related pulses and is responsive to the leading edges of the transmitted pulses to be rapidly switched between its two stable conduction states. This converts the transmitted pulse form of the channel encoded data to the level transition form for recording as transitions between two signal states. Prior to being converted by the JK flip-flop, the transmitted pulses in each data bit line are passed through a differential amplifier line receiver included in the disc drive data interface of the kind described hereinafter with respect to the decoder portion 525 (FIG. 19A) included in the data decoder and time base corrector circuitry 100 to regenerate the transmitted pulses with precisely defined leading edges after passage through the associated transmission line of the transmission line bus 152 (FIG. 8B).

DATA DECODER AND TIME BASE CORRECTOR

The 10 data bit streams of channel encoded data, comprising 8 video data bit streams, 1 parity bit stream (if a parity bit is added) and 1 data track bit stream, transmitted by a disc drive 73 (FIG. 8B) over a transmission line bus 154 are received by one or more of the playback channels 91 (FIG. 4) selected by the data select switch 128. At the input of each playback channel, each of the 10 transmitted data bit streams is received by a separate data decoder and time base corrector included in the circuitry 100 for decoding the channel encoded data back to the NRZ-L form of digital code and then time base correcting the NRZ-L data in accordance with the present invention to remove any intra channel and inter channel bit time displacement errors that may be present in the received data streams. Bit time displacement errors result from the data transmission channel acting on the transmitted data to introduce intersymbol interference and reflections caused by impedance discontinuities in the transmission channel. This disturbs the timing of the data transmitted in the channel. In a video recorder data transmission channel, bit time displacement errors commonly are a result of changes in record medium dimensions, usually caused by environmental changes, of differences in the relative head to medium record and reproduce velocities of the relatively transported head and record medium and of machine to machine mechanical variations resulting in geometric differences between the heads and record medium. Video disc recorders utilizing rigid record media, such as the disc packs 75 used in the apparatus described herein, ordinarily do not cause large time displacement errors in the transmitted apparatus, particularly, at the data rates common for analog type video disc recorders that are in wide use today. The rigid record media used in such recorders are dimensionally stable and the servo mechanisms used are able to maintain the relative transport of the heads and rigid record media within sufficient tolerances so that time displacement errors are kept small. In some applications of video disc recorders, the time displacement errors are so small as to be insignificant and time base correction is not necessary.

However, as described herein, the present apparatus in which the time base corrector circuitry is used employs (with little modification) highly reliable disc drives that have been specifically designed and manufactured for computer data processing. Unfortunately, the computer disc drives do not maintain the relative head to disc velocity stable enough to avoid the introduction of intolerable bit time displacement errors into the data bit streams when such disc drives are used in the present apparatus to process video data. This is because the disc pack spindle in the drive is not servoed but instead is driven by a common three phase AC motor referenced to a relatively unstable line voltage and the rotational position of its disc pack is not controllable with respect to an external reference. The resulting position errors and bit time displacement errors are particularly detrimental at the high data bit rates, i.e., 10.7 MHz, required to faithfully process broadcast quality video data withour reduction in the quality of the video information. Therefore, to take advantage of the mechanical reliability of the existing computer disc drive design, the apparatus described herein is provided with a positional servo for the AC motor and the time base corrector circuitry of the present invention to remove any unacceptable time displacement errors introduced into the data bit streams rather than altering the reliable design of the computer disc drives.

As described above, before the received data bit streams are time base corrected, each channel encoded data bit stream is decoded back to its original NRZ-L digital form. For this purpose, and with reference FIGS. 19A and 19B, the data decoder and time base corrector circuitry 100 includes for each data bit line a channel decoder circuitry portion 525 having a pair of input terminals 526 coupled to the data select switch 128 (FIGS. 8A and 8B) for receiving channel encoded data, which as described hereinbefore, is in the form of channel encoded transition related pulses, such as pulses 515 and 489 shown in FIG. 18E-(14). The pair of input terminals 526 are coupled to a differential amplifier line receiver circuit 527 connected to reject common mode noise in the pair of complementary transition related pulses received from the transmission line pair included in the transmission line bus 154 after passage through the data select switch 128 (FIG. 8B). In addition, the differential amplifier line receiver circuit 527 regenerates a single transition related pulse from each transmitted pair of complementary transition related pulses so that the regenerated pulse has a well defined leading edge properly positioned according to the code rules of the channel code selected for originally encoding the video NRZ-L data. More specifically, the differential amplifier line receiver circuitry 527 provides a single regenerated transition pulse with leading and trailing edges provided when the levels of the edges of the received complementary pulses are the same. By examining the edges of the transmitted complementary pulses in this manner, the leading edges of all regenerated pulses will be properly positioned according to the channel encoding rules because the same sense, i.e., leading positive going and leading negative going, edges of each pair of the complementary pulses are employed to define the occurrence of the leading edge of each regenerated transition related pulse. Because the transmission channel through which the transition related pulses are sent to the decoder circuitry 525 affect identical pulse edges the same, any time distortion introduced to the pulse edges will not effect the regneration of the transition related pulses.

Following the regeneration of the transition related pulses, they are coupled over line 528 to clock a one shot multivibrator 529 at each occurrence of a regenerated pulse, using the defined leading edge to effect clocking. The one shot 529 is rapidly switched from its stable conduction state to its quasi-stable conduction state to provide the precisely defined leading edge of the transition related pulses. The one shot 529 has one of its outputs connected to line 530*a* that extends to the clock input of a divide by two flip flop 531. Upon the occurrence of each regenerated transition related pulse, the flip flop 531 is rapidly switched between its two stable conduction states by the leading edges of the regenerated pulses and thereby converts the pulse form of the channel encoded data to the level form for subsequent decoding of the data back to its original NRZ-L digital form as will be described hereinbelow.

The one shot 529 provides complementary outputs of the channel encoded data on line 530*a* and 530*b*. The complementary outputs are coupled to a 6SC clock generator 532 which provides complementary 6SC clock signals on its output lines 533 and 534 for use by the data decoder circuitry 525 for decoding the received data. The clock generator includes a 6SC voltage controlled oscillator 537 which is locked by an operatively associated phase detector 535 to the phase of the data clock carried by the channel encoded data. The complementary transition related data pulses output by the one shot 529 on lines 530*a* and 530*b* are coupled to the input of the phase detector 535, which has its output on line 536 coupled to the control input of the 6SC voltage controlled oscillator 537. The phase detector 535 examines the phase of the 6SC clock provided by the oscillator 537 with respect to the received and regenerated transition related data pulses and provides an error correction signal to the oscillator via the phase error smoothing capacitor 538. A change in the phase of the received data causes the phase detector 535 to change the average voltage level on the capacitor 538 by a corresponding amount and thereby cause the phase of the 6SC clock provided by the voltage controlled oscillator 537 to be adjusted to clock carried in the channel encoded data.

The phase detection operation is performed by a pair of matched current sources 540 and 541, each having an output line 542 and 543 respectively connected to the line 536 coupled to the error averaging capacitor 538. In the absence of a transition related data pulse, the line **530*b* extending from the one shot 529 is high, which enables the current source 541. Because the base electrodes of each transistor of the differential pair forming a current switch 545 at the output of the current source 541 are grounded, the current provided by the current source 541 divides equally in the two current paths defined by the current switch 545. Current in the path defined by the current switch 545 connected to the output line 543 flows onto line 536 to charge the error smoothing capacitor 538 to a level which, when a data stream is not input to the decoder circuitry 525, will cause the voltage controlled oscillator 537 to provide a 6SC clock at a nominal frequency and phase. Thus, even in the absence of a data bit stream at the input of the decoder circuitry 525, a 6SC clock is provided at its nominal frequency. This facilitates rapid synchronization of the oscillator 537** to data clock when a data bit stream is initially received and proper decoding of the channel encoded data.

When a transition related data pulse is received on the input line 526, the one shot responsively provides a high level signal on line **530*a* and a low level signal on line 530*b* for an interval determined by its time constant circuit 529*a*, which in the decoder circuit described herein is about 17 nsec. The low level signal on line 530*b* disables the current source 541, thereby terminating the provision of charging current through the current switch 545 to the error smoothing capacitor 538. However, the high level signal on line 530*a* enables the other current source 540, which provides charging current to the error detection capacitor 538 in accordance with the relative conduction periods of the halves 544*a* and 544*b* of a current switch 544 formed by the transistors arranged in circuit as a differential pair. The transistors forming the two halves 544*a* and 544*b* of the current switch have their respective base electrodes coupled to receive the 6SC clock provided over line 533. When the clock is at a low level, transistor 544*a* is disabled. However, the other transistor 544*b* is allowed to conduct because the long time constant RC circuit 547 holds the voltage at its base electrode at an average voltage level which is more positive than the low level of the 6SC clock. Consequently, all of the current furnished by the current source 540 will flow through the one enabled transistor 544*b* to the output line 542 of the current source 540**.

When the 6SC clock goes high, the base of the transistor **544*a* goes more positive than the base of the transistor 544*b*. Therefore, transistor 544*a* is enabled and transistor 544*b* disabled. This removes the current flow to the error smoothing capacitor 538. If the transition related data pulse received by the current source 540 is positioned in time relative to the 6SC clock provided to the current switch 544 so that low to high level transitions in the 6SC clock occur at the center of the transition related data pulses, each transistor 544*a* and 544*b* of the current switch will be enabled for equal intervals and the voltage on the error detection capacitor 538 will be maintained at an average level corresponding to a correctly phased 6SC clock. Any change in the data bit rate of the received channel encoded data bit stream changes the position of the transition related pulses at the input to the current source 540 relative to the low to high level transitions of the 6SC clock at the input to the current switch 544. If this occurs, one of the transistors of the current switch 544 will be enabled during the period that the current source 540 is enabled (by the transition related pulse) for a longer interval than the other transistor, with one of the transistors enabled for a longer interval depending upon whether the data bit rate increased or decreased. This causes a corresponding change in the current provided to the error smoothing capacitor 538 and a corresponding corrective change in the average voltage level on the capacitor. A change in the voltage level on the capacitor causes the voltage controlled oscillator 537 to change its phase and frequency until the transition related pulses are centered with respect to the low-to-high level change in the 6SC clock provided to the current source 540. With the low to high level change in the 6SC clock adjusted to be centered with respect to the duration of the transmission related pulses, the two halves, 544*a* and 544*b*, of the current switch will individually pass current from the current source 540 for equal intervals. Hence, the average voltage on the capacitor 538 will be maintained at the level required to lock the frequency and phase of the 6SC oscillator 537** to the data clock rate of the received channel encoded data.

If the 6SC voltage controlled oscillator 537 fails to lock to the received data or data is not received by one of the decoder and time base correctors 100 included in one of the 10 bit lines of a playback channel, a frequency unlock signal is provided on an output line 550 that extends to the reference clock generator circuitry 98. All of the lines 550 from the 10 decoder and time base correctors of the playback channel are ORed in the reference clock generator circuitry 98 for coupling a frequency unlock command to the computer control system 92 in the event that one or more frequency unlock signals are generated in a playback channel. The computer control system 92 responds to the frequency unlock command by providing a video mute command to the blanking insertion and bit muting circuitry that blocks the sending of data to the requesting station. In the channel decoder 525, the frequency unlock signal is generated by detecting the failure of the channel decoder to provide a data bit for 16 cycles of 6SC. The frequency unlock signal is provided by a divide by two circuit 546 that has its clock input coupled to receive a clock pulse provided on line 548 each time the channel decoder 525 fails to detect a data bit for an interval of four cycles of 3SC, hence, 8 cycles of 6SC. If a second clock pulse appears on line 548 before the divide by two circuit 546 is reset by the NAND gate 549, the divide by two circuit 546 provides the frequency unlock signal on line 550. The NAND gate 549 resets the divide by two circuit 546 each time a coincidence occurs between a low level of the 6SC clock provided by the oscillator 537 and a low level on line **530*b*, which occurs when a transition related data pulse is received at the input 526** of the channel decoder.

Figures 19A, 19B:
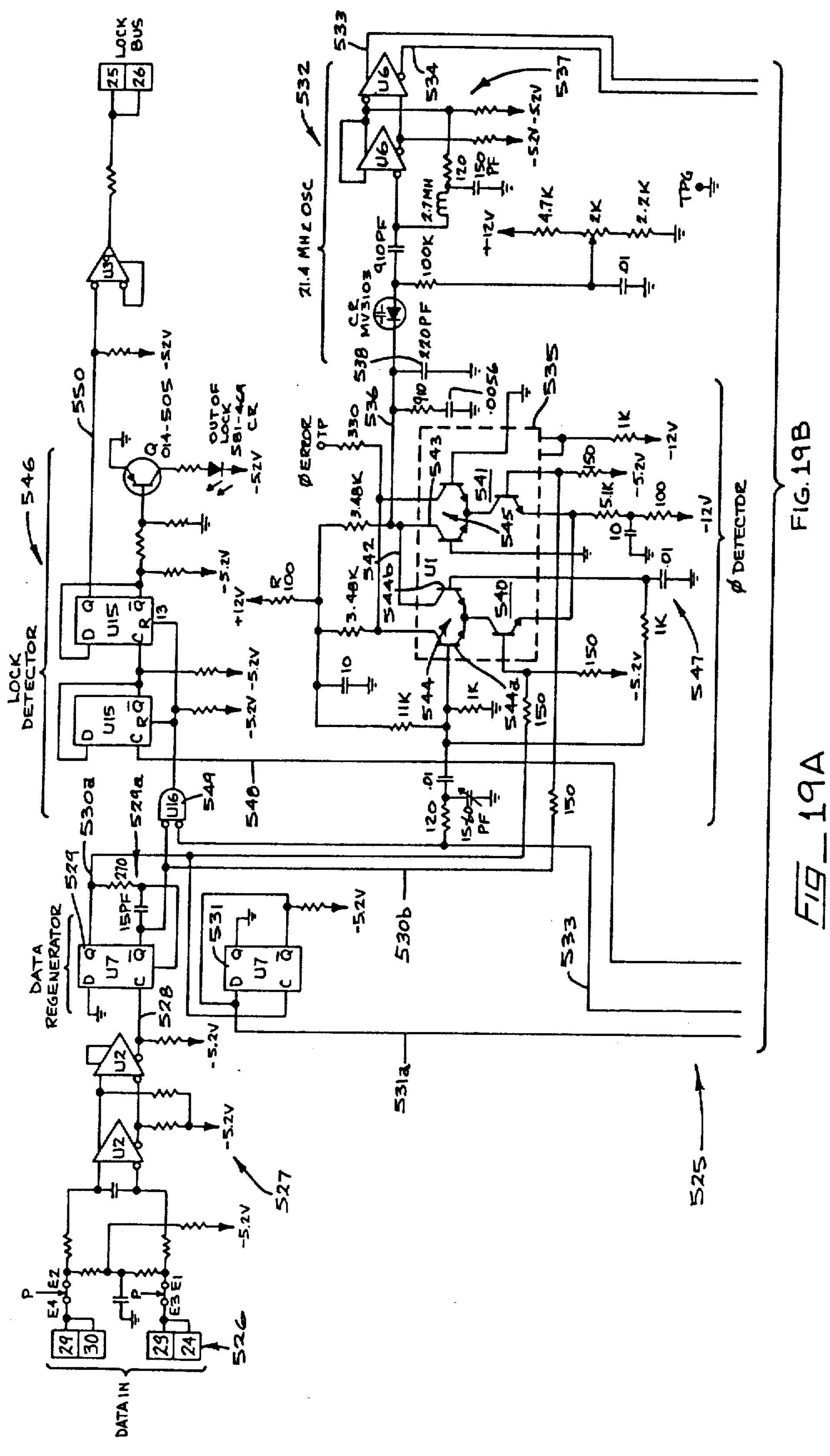

After the divide by two flip flop 531 converts the channel encoded data from the transition related pulse form to the channel encoded NRZ-L form, the data is coupled by line 531*a* to a pair of latches 551 and 552 (FIG. 19B) at the input of the decoding circuitry 525. The decoding circuitry is able to decode data that is channel encoded according to both of the above-described code rules. FIG. 19E (1) illustrates the data encoded in the Miller code by the encoder 96 with the selection switch 480 of FIG. 18C in POS. 1 and FIG. 19E (2) illustrates the data encoded in Miller squared code with selection switch 480 in POS. 2. The latches are clocked by $\phi 1$ and $\phi 2$ 3SC clocks, respectively, derived from the 6SC clock generated by the oscillator 537.

The 6SC clock on line 534 is coupled to one input of each of the NAND gates 553*a* and 553*b*. The other input of each of the NAND gates receives complementary 3SC square waves generated by the divide by two flip flop 534*a* from the 6SC clock on line 534. The NAND gates are enabled when their inputs are low to issue the positive $\phi 1$ (FIG. 19E-(4)) clock pulses to clock the latch 552 and positive $\phi 2$ (FIG. 19E-(3)) clock pulses to clock the latch 551. The $\phi 1$ and $\phi 2$ clock pulses are displaced in time by one half cycle of 3SC. Hence, the time that the level of the channel encoded NRZ-L data on line 531*a* is latched by latch 551 is displaced one half cycle of 3SC from the time the level is latched by latch 552 (FIG. 19E-(5) and (6)). Both latches are coupled to the two inputs of an exclusive OR gate 554*a*. The exclusive OR gate serves to detect the occurrence of a change in state in the level of the channel encoded NRZ-L data at the input of latches 551 and 552 between the times they are clocked by the displaced $\phi 1$ and $\phi 2$ clocks (FIG. 19E-(7)). To determine if the change in state at the input of latches represented a logical 1 bit, the output of the exclusive OR gate 554*a* is coupled to one input of a NAND gate 555. The other input of the NAND gate receives inverted $\phi 1$ 3SC clock pulses coupled from the NAND gate 553*a* by the inverter 555*a*. If the change in state at the input of the latches represents a logical 1 bit, the output of the exclusive OR gate 554*a* will be low at the occurrence of an inverted $\phi 1$ 3SC clock pulse. The NAND gate 555 will be enabled, placing a high level on its output. To assure safe latching of the detected logical 1 bit pulse at the output of the NAND gate 555, a delay circuit 556 is connected to the input of the NAND gate 555 receiving the inverted $\phi 1$ clock so that the output of the NAND will be maintained high for an interval longer than the $\phi 1$ 3SC clock pulse (FIG. 19E-(8)). This permits the following latch 557 to be clocked with the positive trailing edge of the $\phi 1$ 3SC clock to latch the delayed high level provided by the NAND gate 555 (FIG. 19E-(9)). If the input data is channel encoded according to U.S. Pat. No. 3,108,261 code rules, the output of latch 557 will be the channel decoded NRZ-L data. This is represented by the doted lines in the timing diagram shown by FIG. 19E. In the decoder shown by FIGS. 19A and 19B, however, an additional latch 558 is needed to permit decoding of data channel encoded according to the above-described Miller Square code rules. However, for the Miller code, the additional latch 558 only delays the output of the decoded data by one cycle of 3SC.

When data is encoded according to the Miller Square code rules which specified logical 1 bit related transitions are suppressed, if a logical 1 bit related transition has been suppressed, there will be an absence of data transitions for an interval greater than 1½ cycles of 3SC. This is detected by a modulo-4 counter 559 having its clock input coupled to receive $\phi 0$ clock pulses provided by the NAND gate 553*b* and its reset input to the output of the edge detecting exclusive OR gate 554*a*. The exclusive OR gate 554*a* provides a reset pulse to clear the counter 559 each time a transition occurs in the channel encoded data (FIG. 19E-(10)). The output of the modulo-4 counter 559 is coupled to one input of an AND gate 560 which also receives $\phi 0$ clock pulses at its other input. Both inputs are low ½ cycle of 3SC after the modulo-4 counter has counted four $\phi 1$ 3SC clock pulses without being reset, which corresponds to an absence of data transitions for an interval of 2½ cycles of 3SC (FIG. 19E-(11), (12) and (13)). Ordinarily, this signifies that a logical 1 bit has bit suppressed in the channel encoded data. To make certain that no errors have been introduced to the data stream, a following NAND gate 561 examines an output of the latch 558 at the time when AND gate 560 provides the low state signal representing a suppressed logical 1 bit. If the examined output of the latch 558 is also low, it verifies that a logical 1 bit has been suppressed and pulse is output on line 562 (FIG. 19E-(14)) by the NAND gate 561 that is wired ORed with the output of latch 557. Line (14) of FIG. 19E represents the state of NAND gate 561 as if it was not wire ORed with the output of latch 557. The second pulse 563 (FIG. 19E-(14)) provided by the NAND gate 561 occurs at the time of and is latched into the latch 558 by the $\phi 1$ 3SC clock. This prevents the output of the latch 558 from being returned low, thereby, inserting the suppressed logical 1 bit into the decoded NRZ-L data (FIG. 19E-(15)) appearing on line 566. In the data track bit line, the decoded data is coupled by line 566 to the computer control system 92. The decoded data clock provided by the flip flop 534*a* on line 574 and the line 1D or sync word from the first shift register and sync word detector circuitry 572 are also coupled to the computer control system 92.

If the phase of the 3SC decode clock provided by the flip flop 534*a* is incorrect, a one-shot multivibrator 534*b* is enabled by the coincidence of the 6SC clock on line 534 and a pulse provided on line 564. This pulse will be generated 3 cycles of 3SC before the line ID is first detected by sync word detector portion of the circuitry 572, if the level of the decoded data at that time is low, therefore, incorrect. A counter 590 (FIGS. 13A and 19C) receives 3SC decoded data clock and, as will be described hereinbelow, provides an advanced end of count pulse at H/2 rate, designated advanced EOC pulses, on line 591. Because of the known data bit pattern of the sync word interval, which interval ordinarily occurs when the advanced end of count pulse is generated, the decoded data level can be examined at the shift register portion of the circuitry 572 to determine if decoding is performed correctly. The gating circuitry 592 issues a pulse on line 564 when the examined decoded data level is low that enables the one-shot 534*b* to provide a disabling signal at the clock input of the flip flop 534*a* for one cycle of 6SC. This results in a shift in the phases of the $\phi 1$ and $\phi 2$ clocks by ½ cycle of 3SC, thereby establishing the right phase for correct decoding of the channel encoded NRZ-L data.

During playback operations, each bit stream of channel decoded NRZ-L data provided at the output line 566 of the decoder circuitry 525 will contain time base errors in the form of bit time displacement errors as previously described. Furthermore, bit line to bit line or skew time displacement errors will be present in the 9 data bit streams that carry the 8 parallel bits of digitized video and 1 parity bit, if included. To remove these bit time displacement errors from the NRZ-L data, a time base corrector 565 in accordance with the present invention is provided in each data bit stream and corrects such errors by electronically adjusting a variable delay through which the NRZ-L data is passed. Each time base corrector contains circuitry which processes the received data so that the data bit rates in all video data and parity bit lines are frequency and phase coherent with respect to the reference 3SC provided by the reference clock generator 98 for the playback channel 91. Furthermore, each of the time base correctors 565 also aligns the data bits in the data bit lines with respect to a common redefined H/2 reference provided by the playbck channel's reference clock generator 98. As a result of these combined functions, any relative time displacement errors between the data bits in the 9 bit lines are removed, i.e., line to line or skew errors removed, and any bit time displacement errors within a bit line corrected. However, as described hereinbefore, the redefined H/2 signal, while being synchronized to a particular phase of SC and thereby facilitating processing of the reproduced video data, it is not stationary with respect to reference H sync. For this reason, use of the H/2 signal by the time base corrector 565 results in a mispositioning of the sync word in the video data that is output by the time base corrector for alternate reproductions of the picture frame of video data.

The operation of the time base corrector 565 included in each data bit line will be described in connection with the block diagram shown in FIG. 13A and the timing diagrams of FIGS. 13B and C Specific circuitry which can be used to carry out the operation of the time base corrector is shown in FIGS. 19B, 19C and 19D. The decoded data in each data bit line received from the decoder 525 over line 566 is time base corrected independently of the other 8 data bit lines by using a periodically occurring time reference common to all of the data bit lines and defined in terms of the frequency and phase of a higher rate clock used to encode the data. In video recording and reproducing apparatus such as described herein, horizontal line related H/2 signals derived from the periodically occurring sync words synchronously inserted in each data bit stream in the horizontal blanking interval as hereinbefore described is defined in terms of the frequency and phase of the higher rate (455 times H/2) signal color subcarrier component and the 3SC data clock (1365 times H/2) and is available for use as the periodically occurring timing reference.

To effect time base correction of the reproduced and channel decoded data, the data in each of the data bit lines is directed through a phaser 567. All of the phasers in all of the data bit lines are clocked by a common stable reference 3SC clock provided by the reference clock generator 98 (FIG. 8A) to retime the data to a stable clock signal. In the illustrated embodiment, a multiple port shift register 568 performs the retiming by having data written into addresses determined by the write address generator 569 clocked by the decoded 3SC data clock provided by the channel decoder 525 on line 574. The data is read out of the register 568 under the control of the read address generator 570 clocked by the reference 3SC clock provided on line 571. Because all of the phaser read address generators 570 in the 9 data bit lines are clocked by the same reference 3SC clock, the data in all of the data bit lines are retimed to the desired stable 3SC reference clock, which for an NTSC television signal standard is 10.7 MHz.

The write and read address generators 569 and 570 are preset and reset respectively to their starting addresses by the sync word included in the data being corrected, with the starting write address in advance of the starting read address by four addresses. Each time a sync word is detected in the received decoded data by the first shift register and sync word detector circuitry 572, a reset signal is provided and coupled to reset the read address generator 570. The decoded data on line 566 enters a seven bit shift register included in the circuitry 572 and is examined by logic circuits forming the sync word detector portion of the circuitry 572 for the occurrence of the 7-bit sync word pattern. After passage through the shift register, the data is clocked into the multiple port shift register 568. The register 568 has an 8 bit capacity and is initially operated to read an address four 3SC cycles following writing of data at the address. Because the write address generator 569 is clocked by the 3SC data clock and the read address generator 570 by the reference 3SC clock, data bit displacement errors in the received data will change the time an address has data written into it relative to the time the address is read. This change in the time between writing data at an address and reading data from the address results in the received data being retimed to the stable 3SC reference. Furthermore, the phaser 567 will properly retime the received data to the stable 3SC reference even if the sync word is not detected by the first sync word detector 572 as long as unanticipated large time displacement errors do not occur that exceed the storage capacity of the register 568. Even if large time displacement errors occur, the video data emerging from the phaser 567 will be at the proper reference 3SC rate although incorrectly positioned in phase.

The sync word detector 572 provides a first input to the gating circuitry 592 (FIG. 19C) each time a sync word is detected in the decoded data. The seven bit shift register is clocked by the decoded data clock on line 574 to enter the decoded data received over line 566 for examination by the logic circuitry. The sync word detector 572 is enabled for sync word detection by the sync word enable pulse generator 600. This generator is enabled by a divide by 1364 counter 590 clocked by the 3 SC data clock on line 574. The generator 600 provides a sync word detection enable pulse on line 601 (FIG. 13B-(3)) which is initiated by the advanced EOC pulse (FIG. 13B-(2)) issued by the counter 590 issued over line 591 three counts in advance of the excepted occurrence of a sync word at the first sync word detector circuitry 572 (FIG. 13B-(6)). This advanced EOC pulse also is coupled by line 591 to the gating circuitry 592 that responsively examines the output of the shift register to determine the data logic level and, hence, the phase of the decoded data clock. The detection of a sync word by the second sync word detector 575 (FIG. 13B-(6)), a reset signal is issued over line 608 to the generator 600. The reset signal terminates upon the enable pulse on line 601 before the counter 590 reaches a count of fifteen. The counter position 15 in the counter 590 terminates the enable pulse if a sync word is not detected by the second sync word detector 575 (FIG. 13B-(7)). The shift register 604 provides the automatic EOC reset pulse to the counter 590 over line 610 upon the occurrence of the third 6SC clock pulse following the advanced EOC reset pulse (FIG. 13C (2) and (5)). The shift register 604 and the pulse generator 605 cooperate to allow the sync word enable pulse to follow changes in the time of the occurrence of consecutive sync words in the amount of ±1 cycle of 3SC. The pulse generator 605 simultaneously examines three outputs of the shift register 604 and generates a gating waveform (FIG. 13B-(4)) that prevents the sync word enable pulse from resetting the counter if it occurs within 1 clock time of the occurrence of the automatic EOC reset pulse generated by the shift register 604. If the reset enable pulse derived from a sync word arrives one count before the automatic EOC reset pulse, the counter 590 will not be reset (FIG. 13B-(4) and (8)). If the reset enable pulse is provided one count after the occurrence of the EOC reset pulse, the counter 590 will not be reset again (coincidence with the second positive pulse of the gating waveform provided by the pulse generator 605). If a sync word is not detected during the interval of the sync word enable pulse, the counter 590 will continuously reset itself through shift register 604 and line 610 (FIG. 13B-(5)) and, thereby, with generator 600 retain, as a memory, knowledge of when to provide sync word enable pulses until a sync word is detected. As long as the detected sync word is not in coincidence with the positive gating waveform (FIG. 13B-(4)) provided by the generator 605 NAND gate, 612 is enabled to permit the sync word to be placed on line 613 for resetting the counter 590.

Figure 13B:
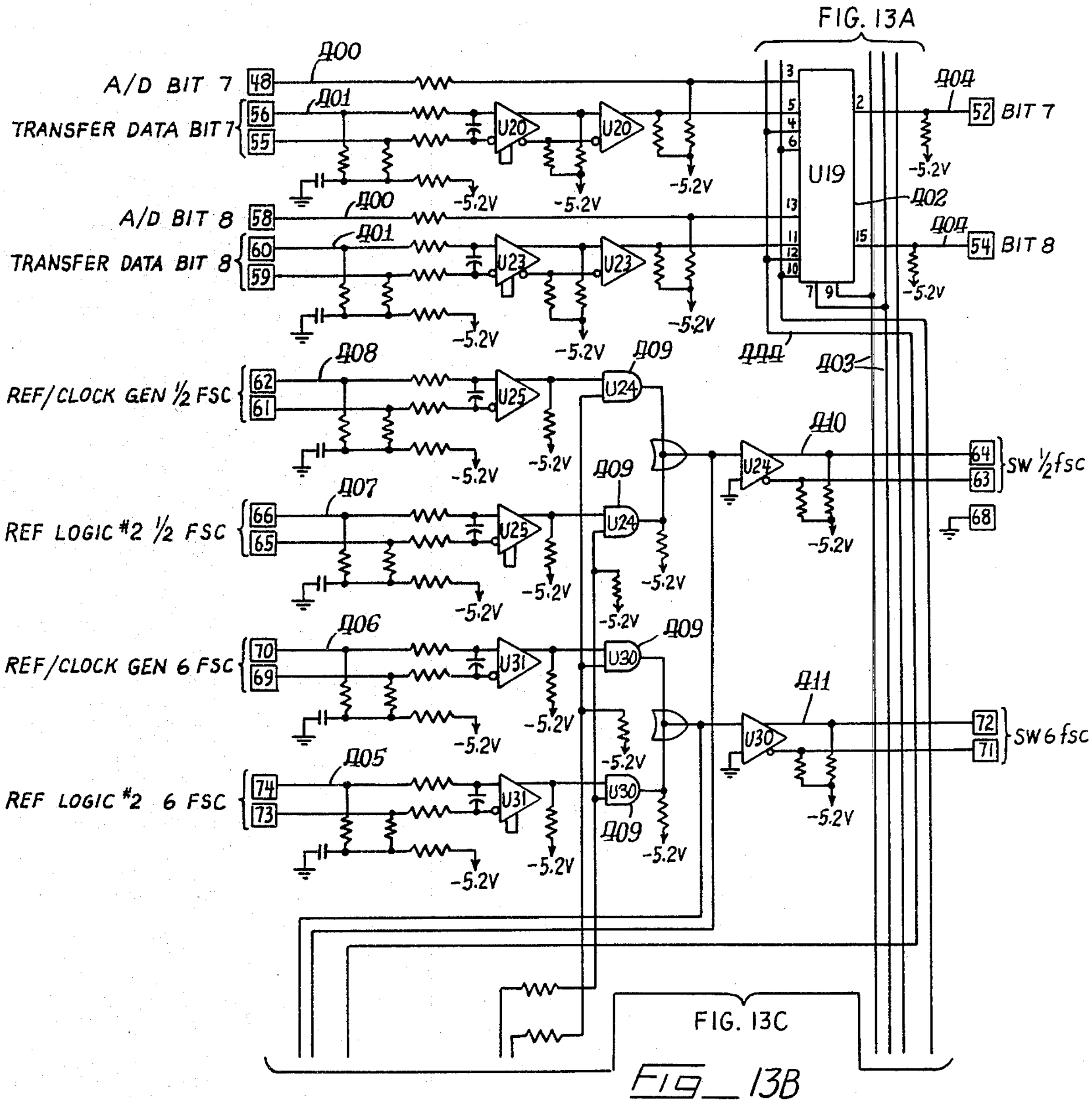
Figure 16:
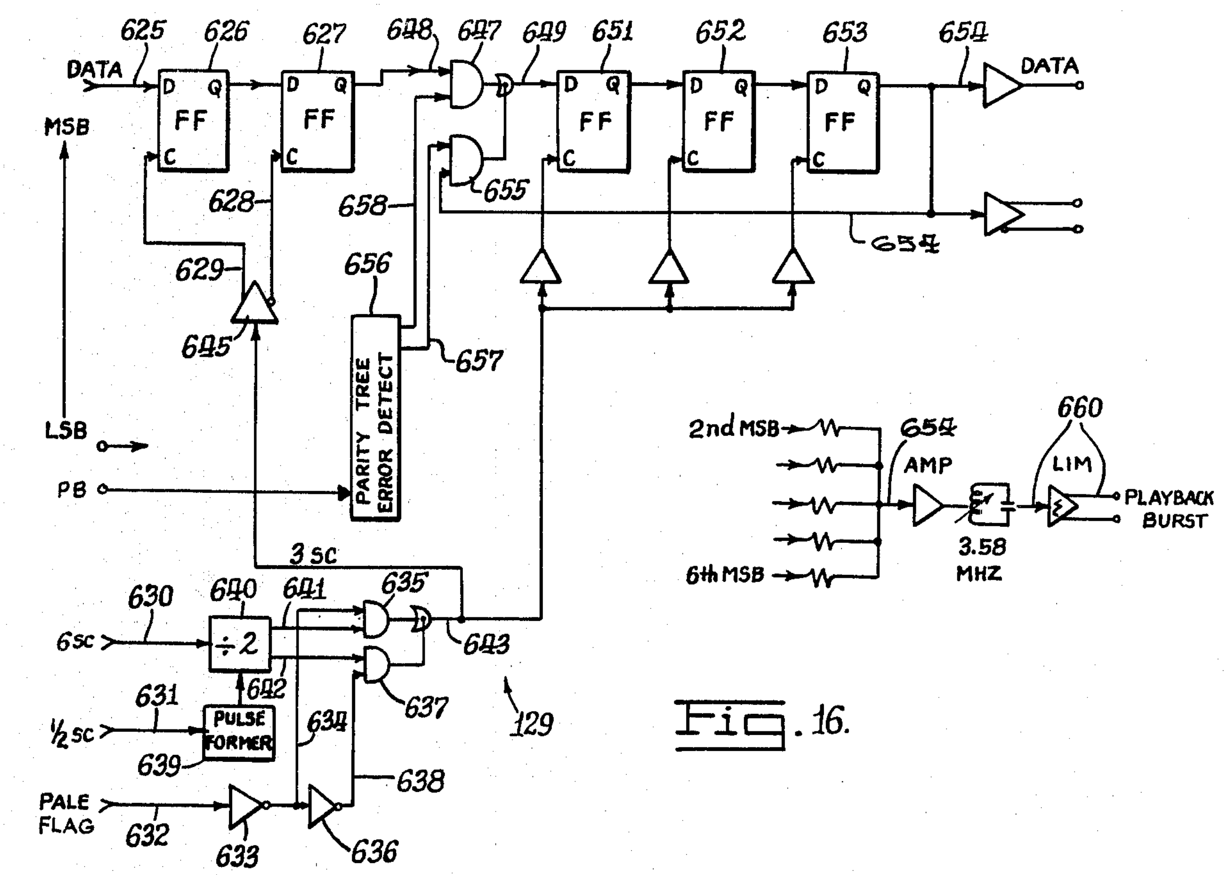
FIGS. 16A, 16B, 16C and 16D together comprise an electrical schematic diagram of the reference logic circuitry of the signal system shown in the block diagram of FIG. 10A.
Figure 14:
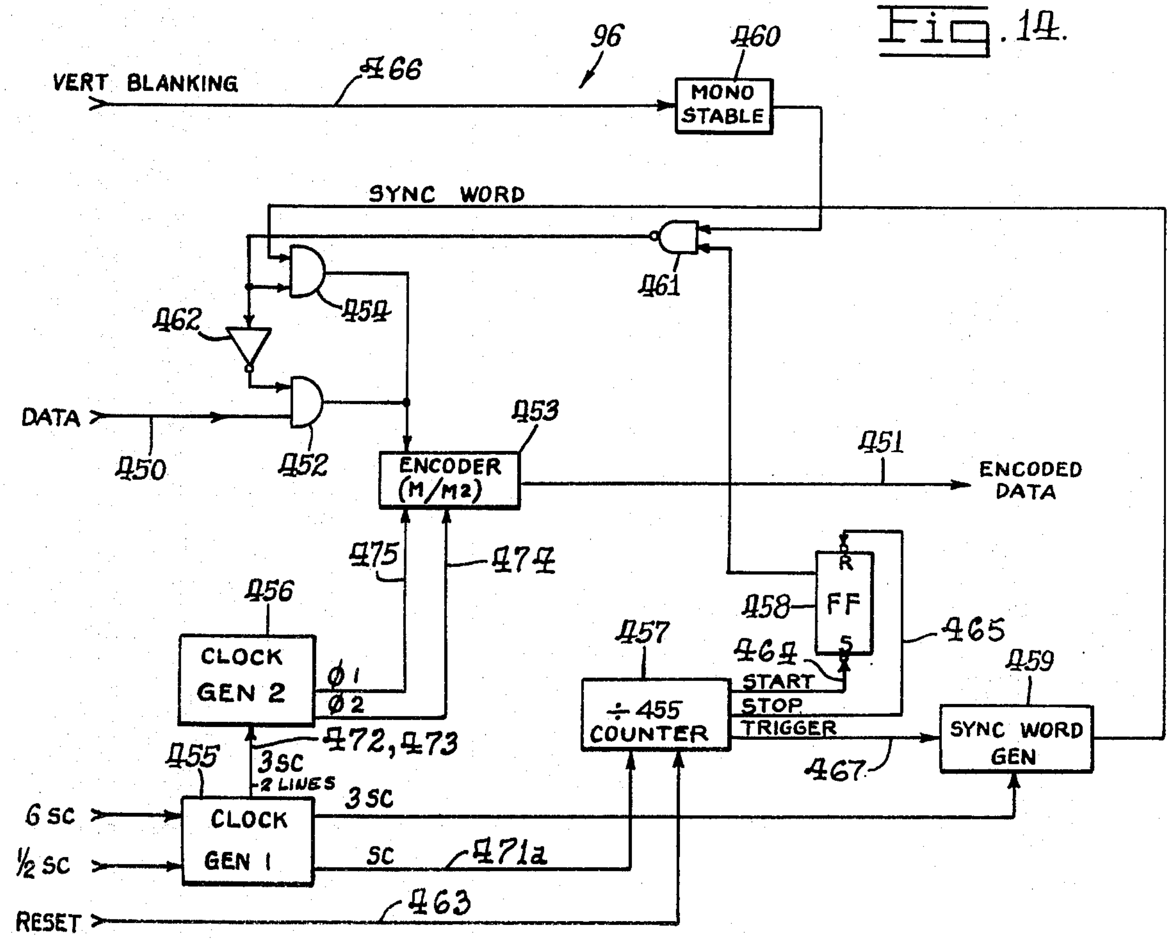
FIG. 14 is a functional block diagram of the data transfer circuitry which is a portion of the signal system shown in FIG. 8A.
Figure 23:
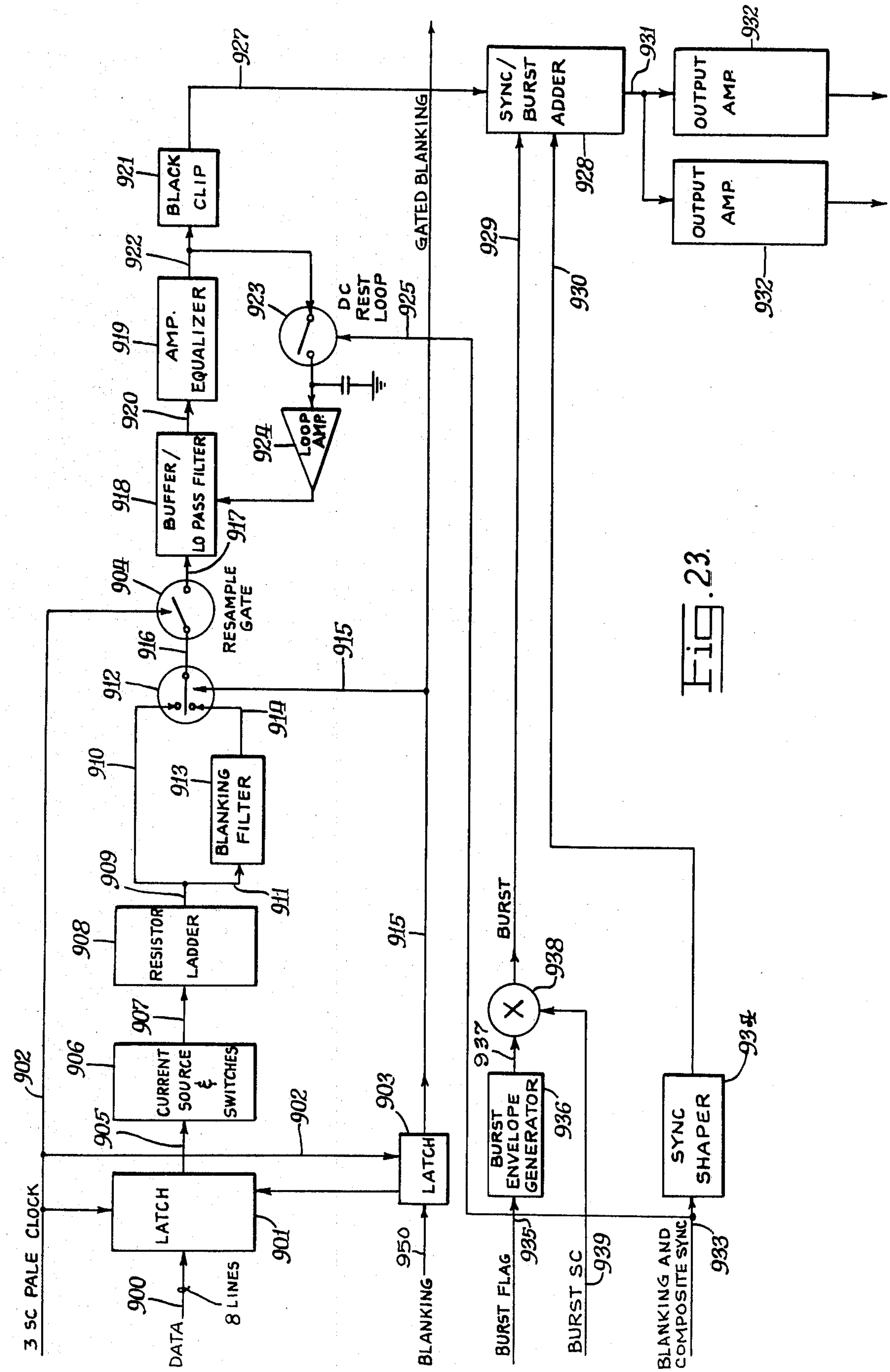
Figure 29:
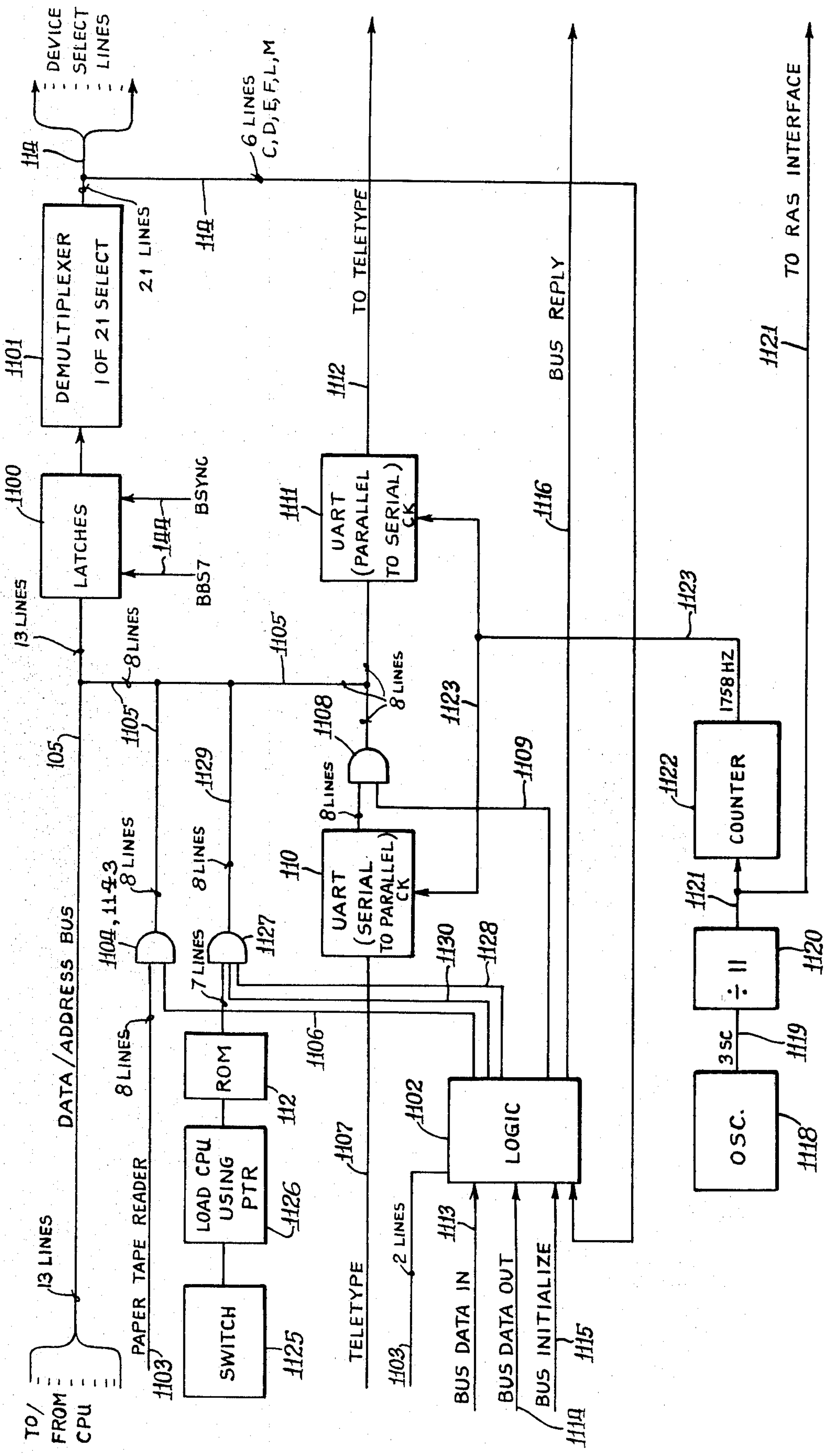
Figure 30:
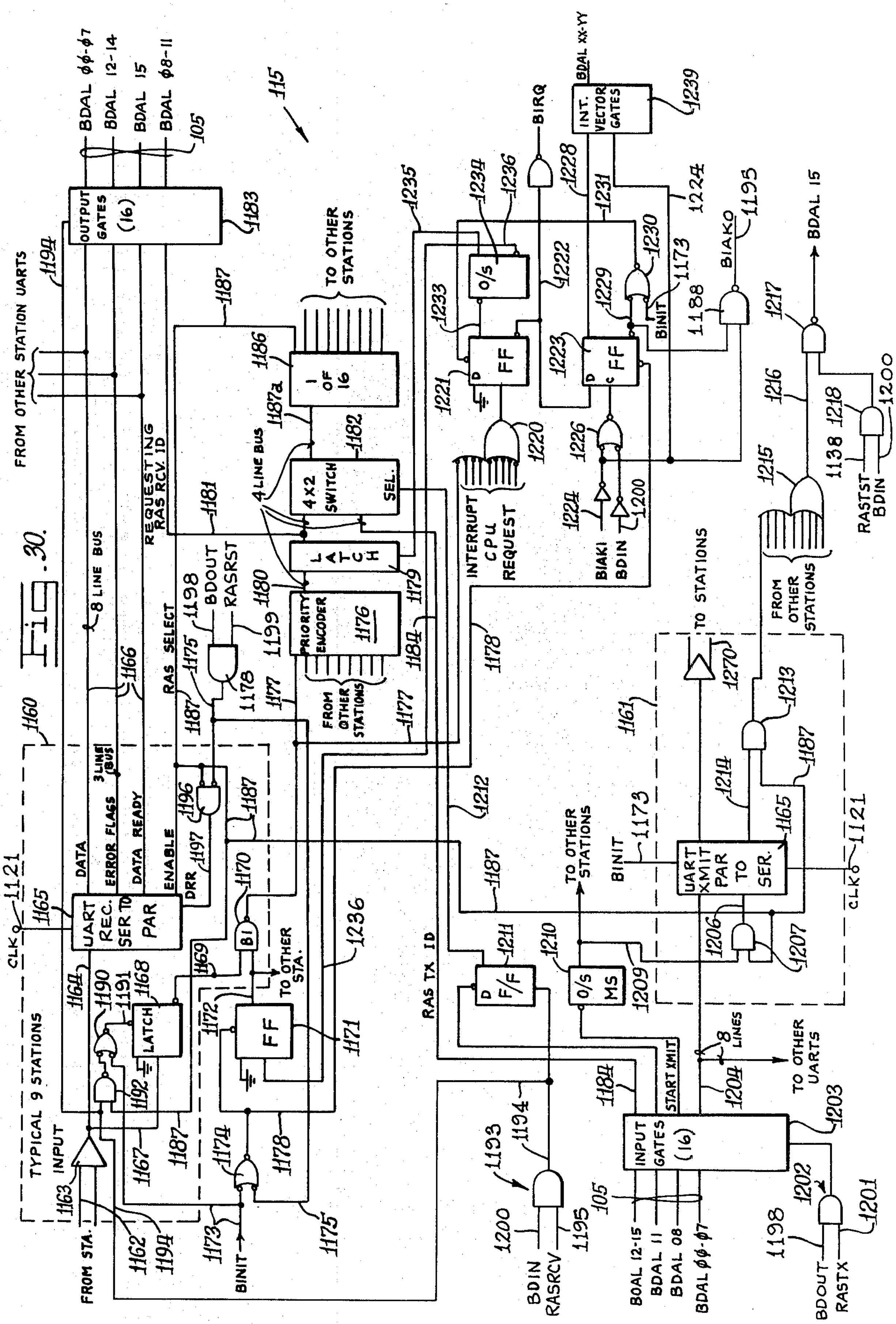
Figure 31:
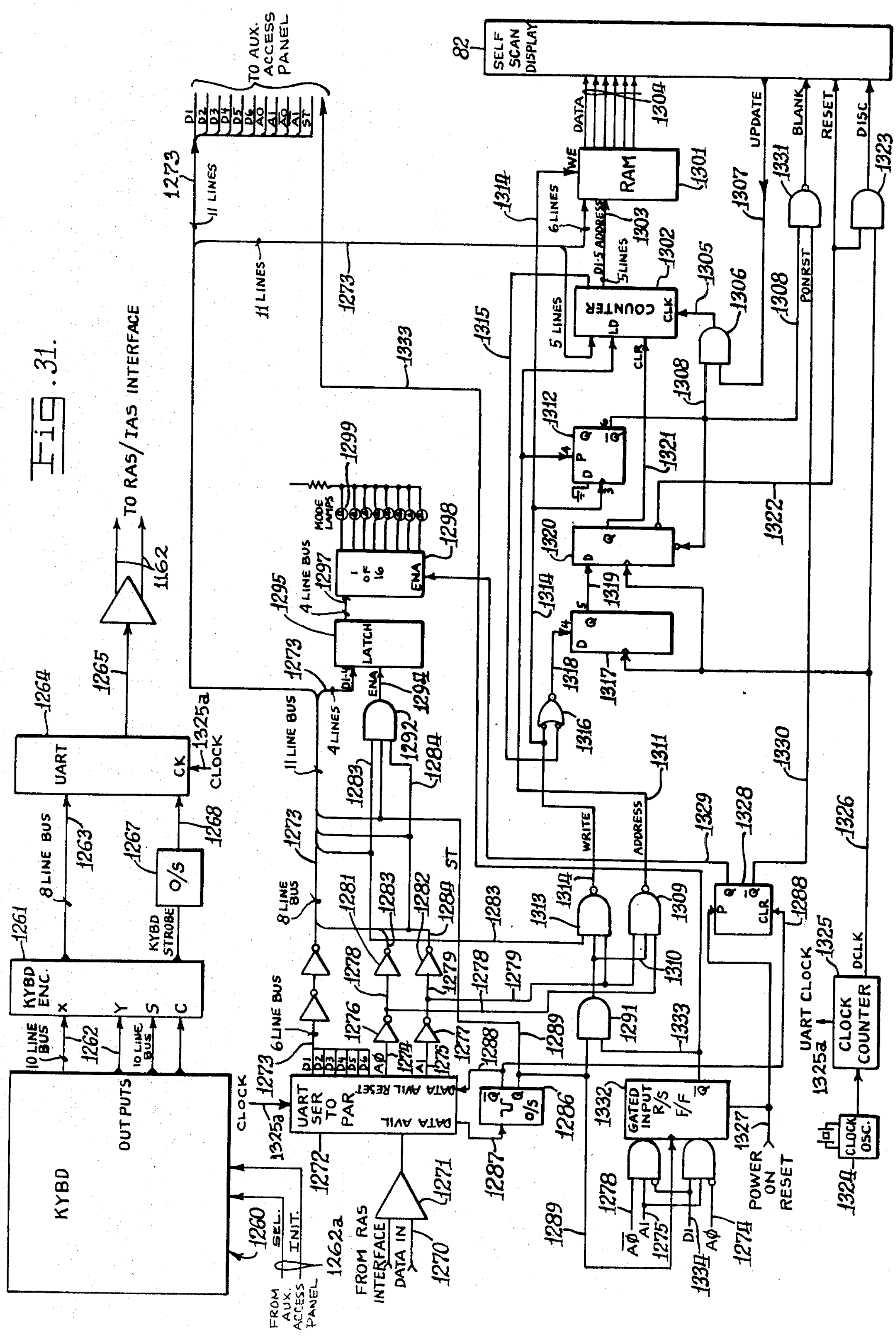
Figure 33A:
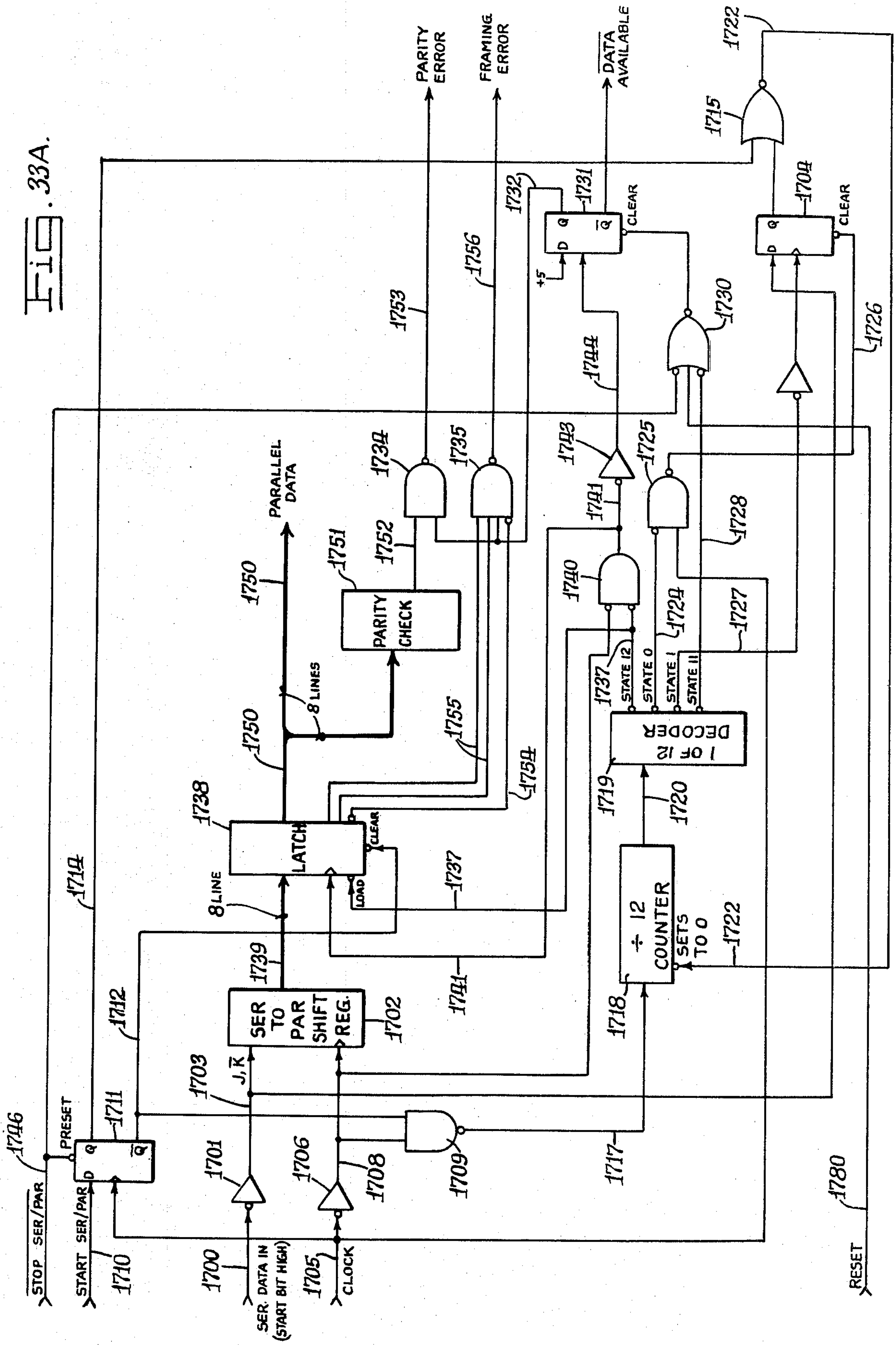
Figure 33B:
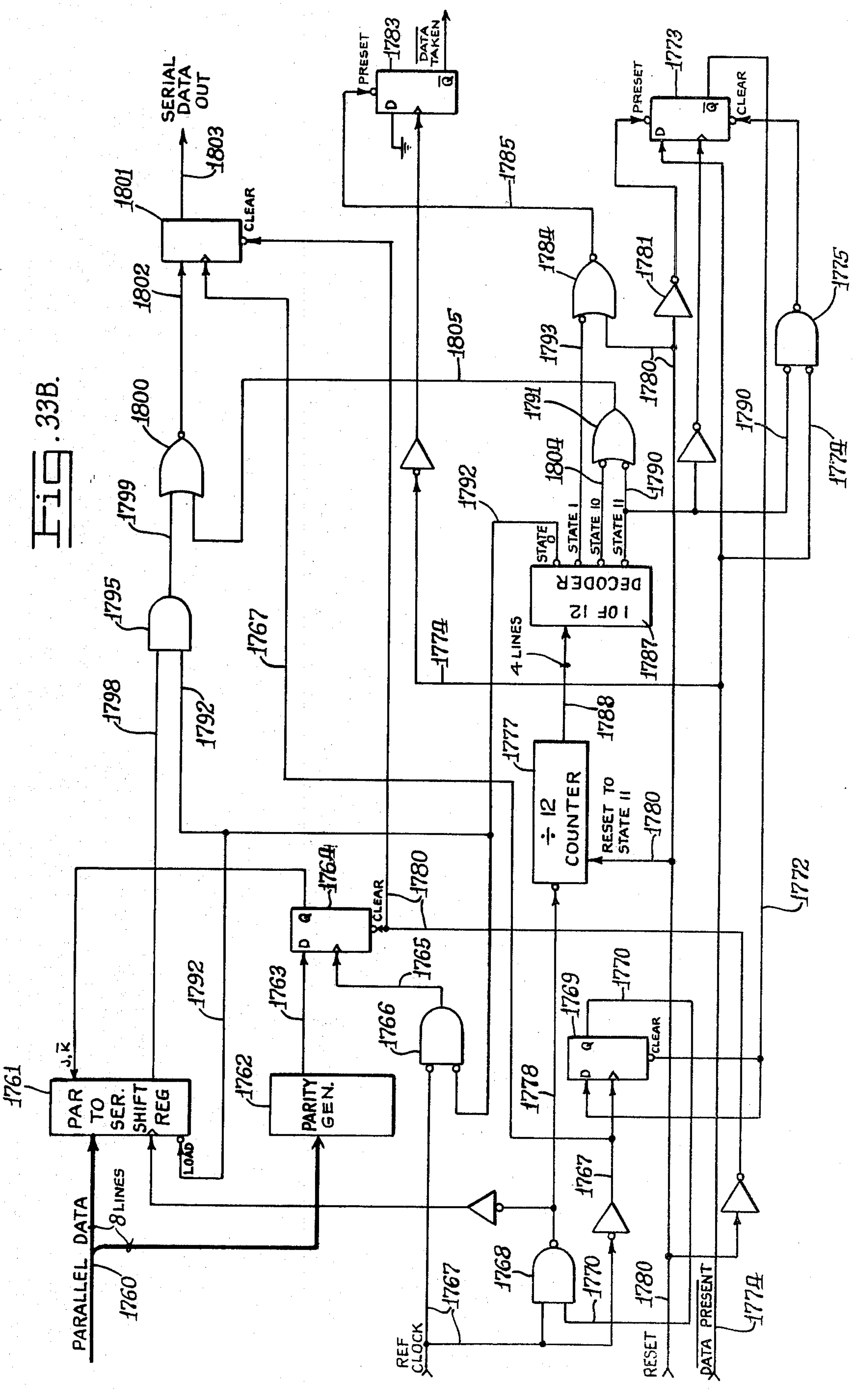
Figure 36:
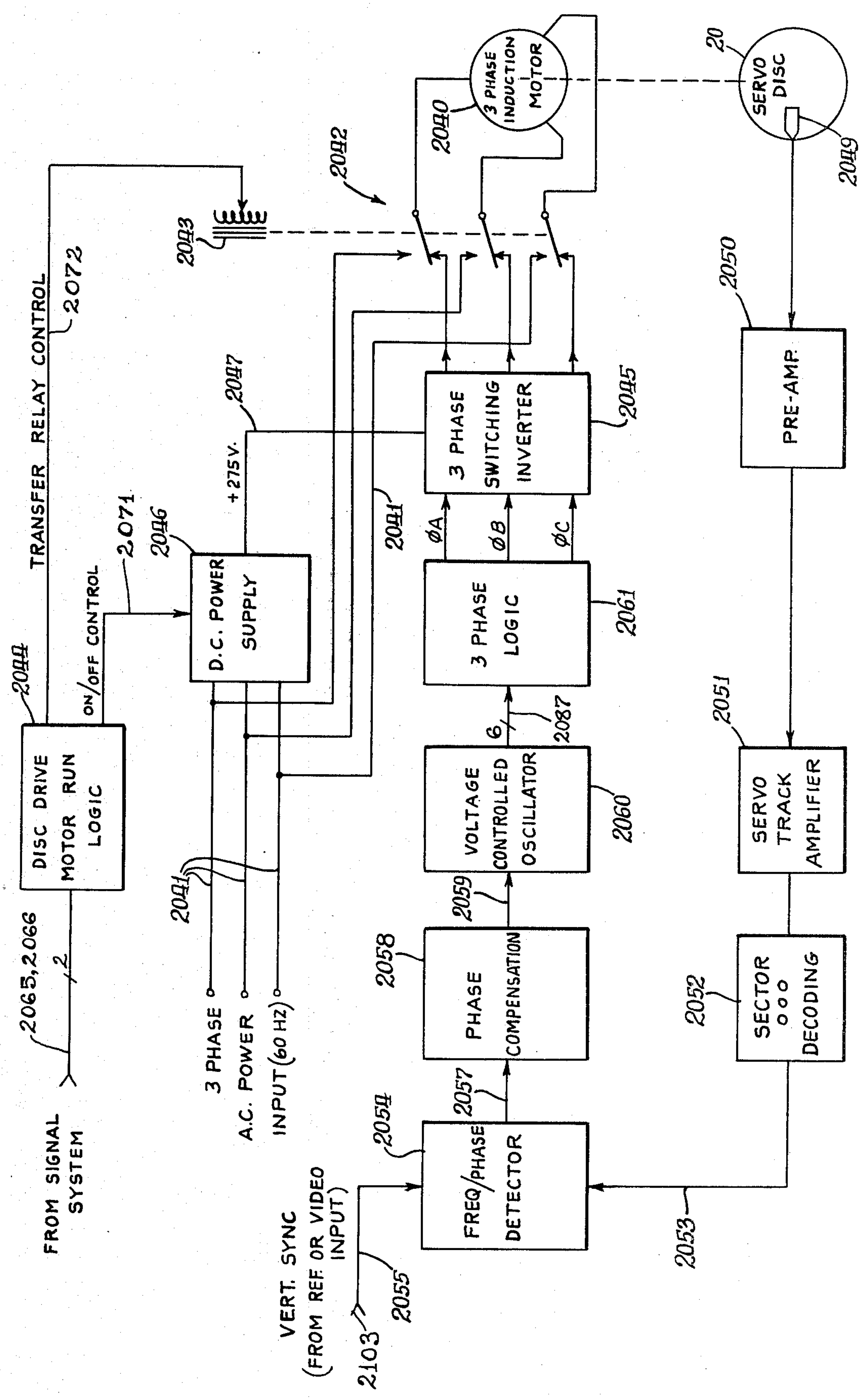
Figure 37A:
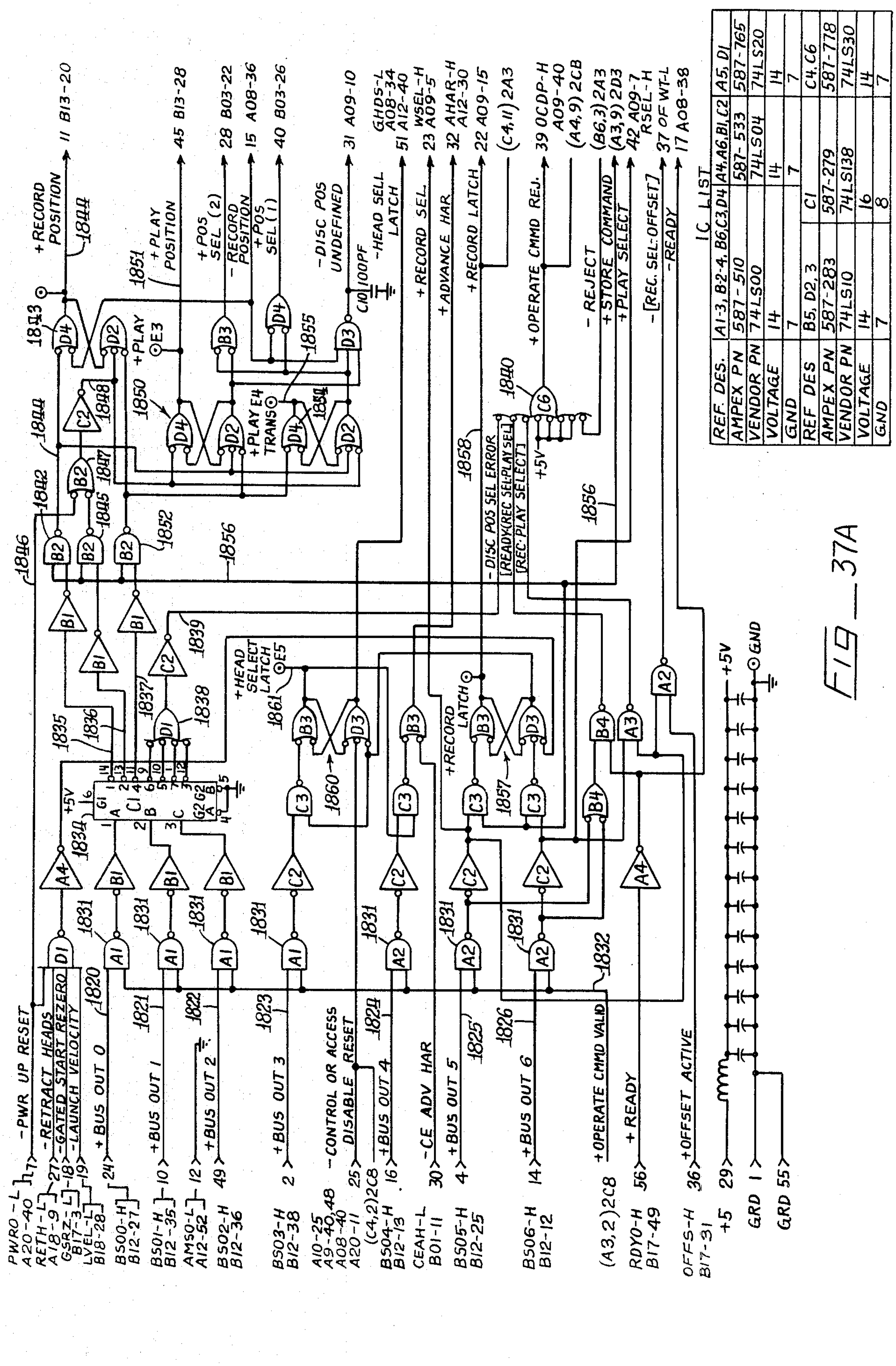
Figure 37B:
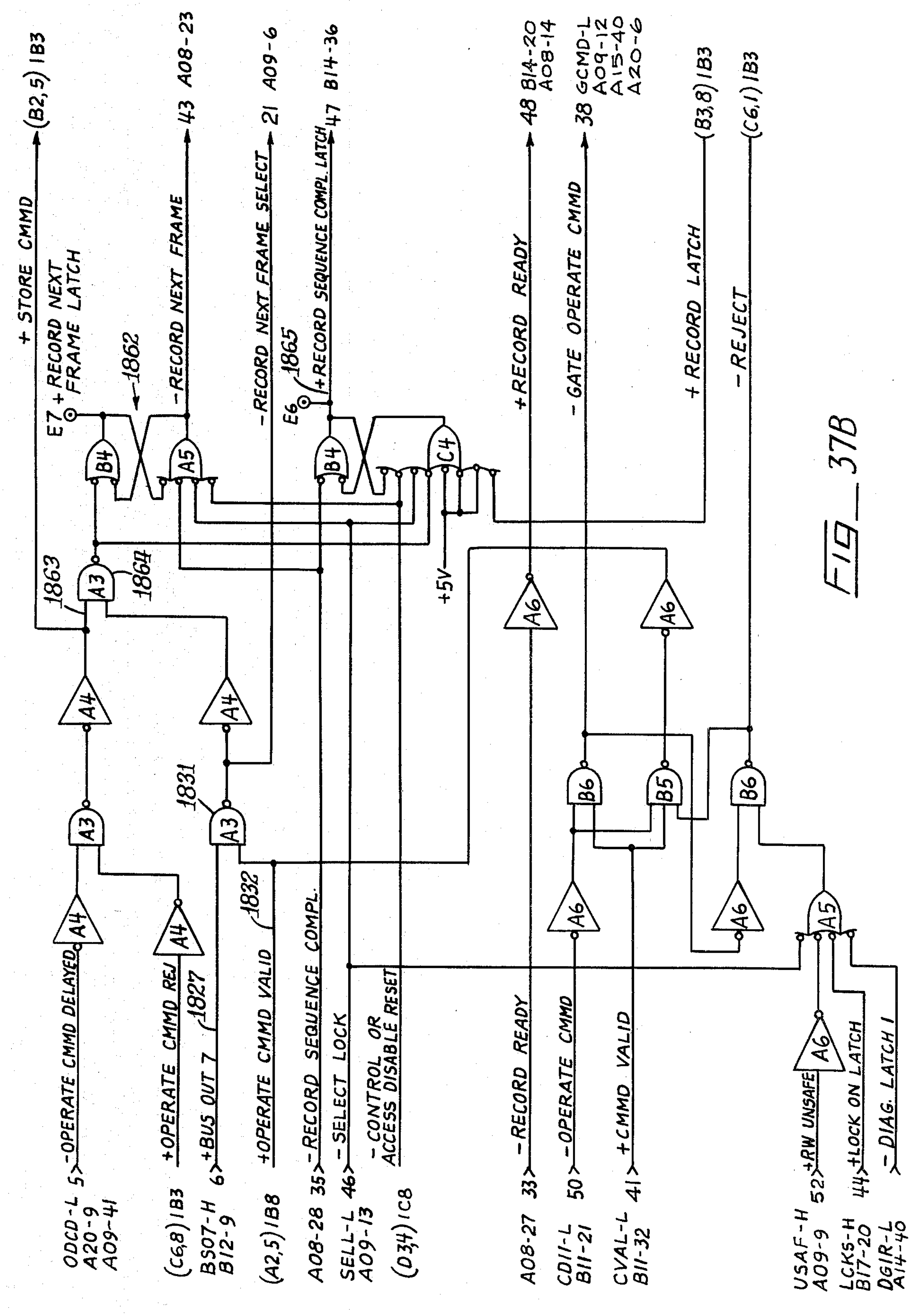
Figure 38A:
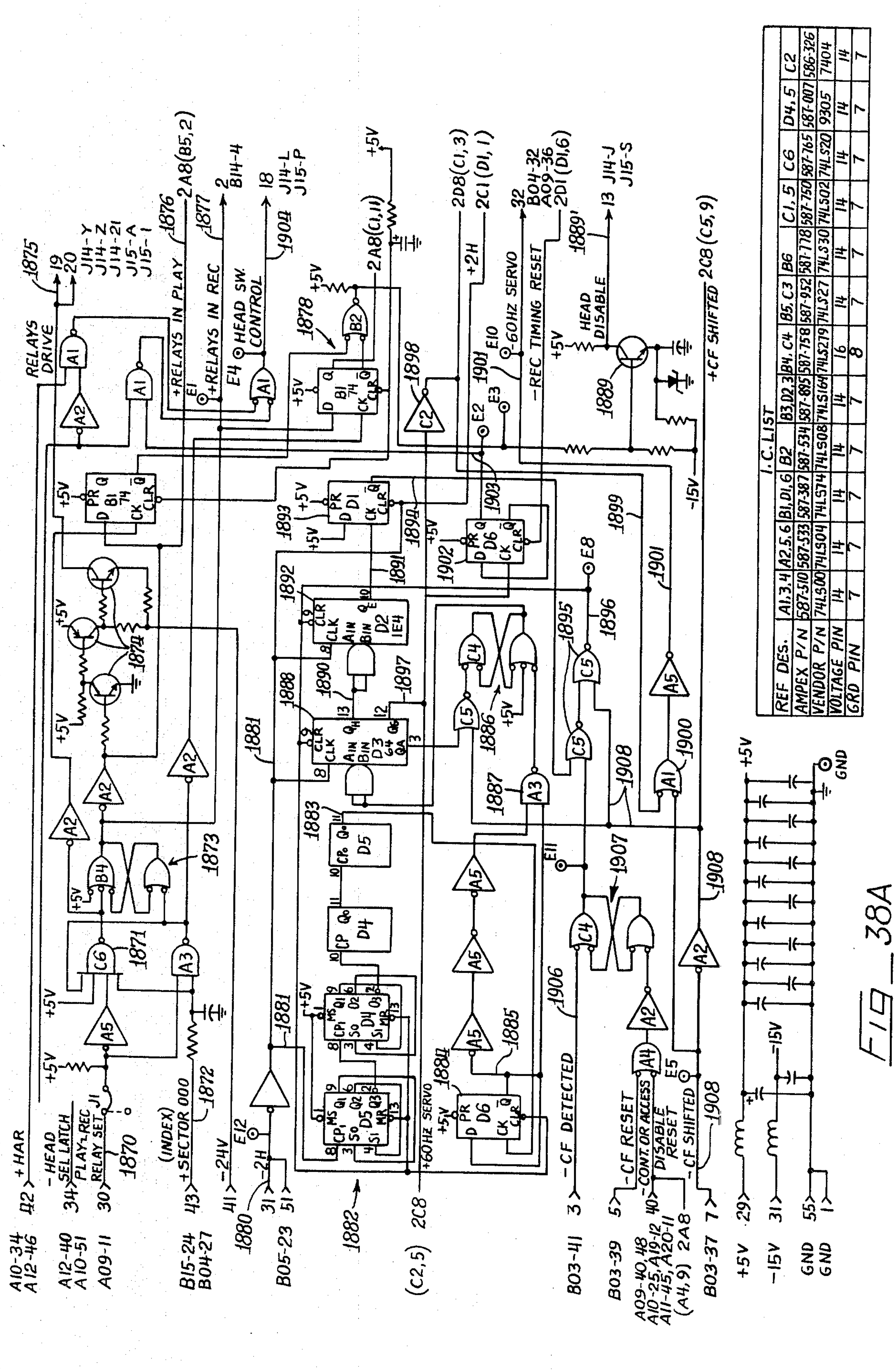
Figure 38B:
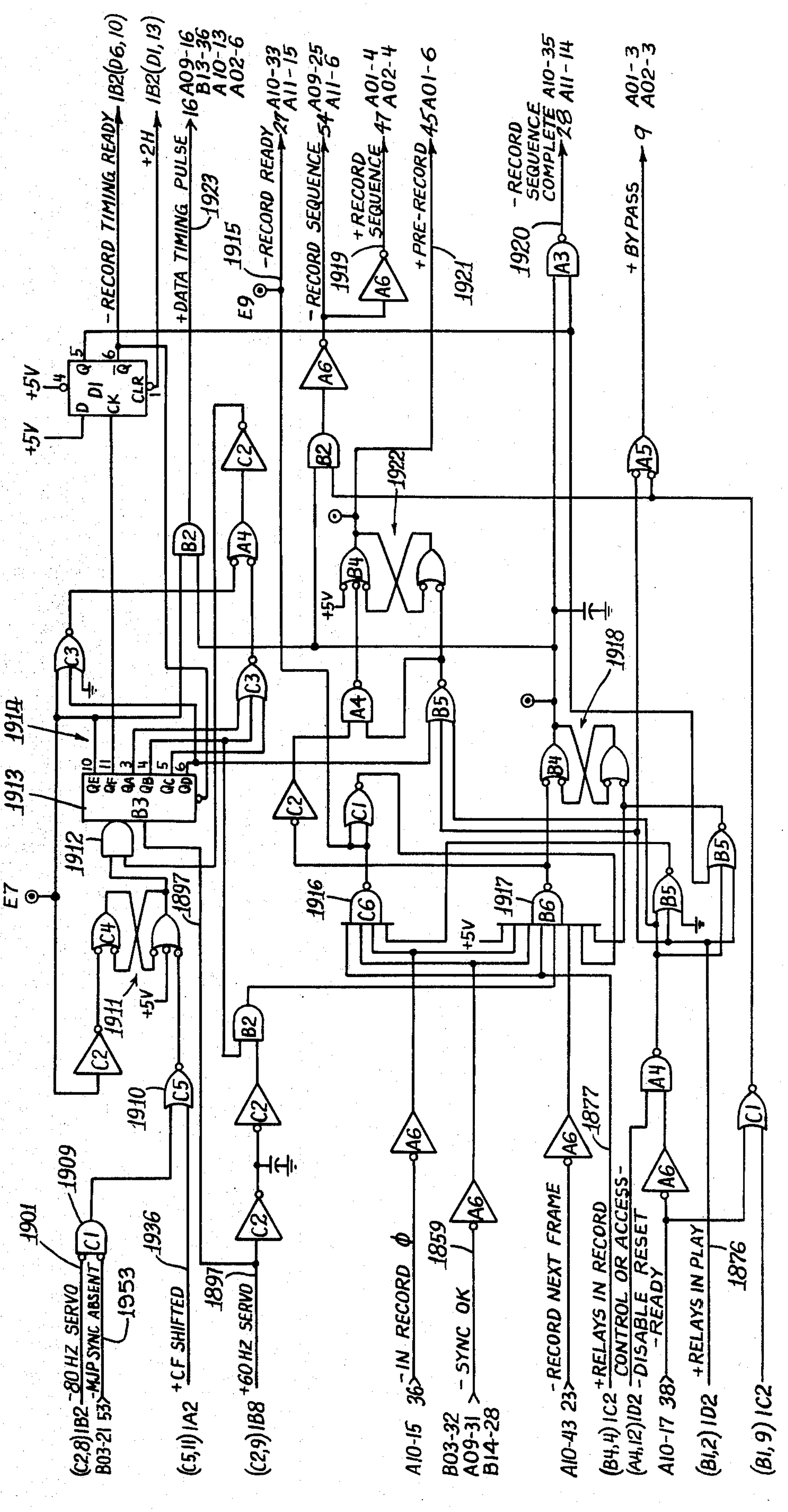
Figure 39:
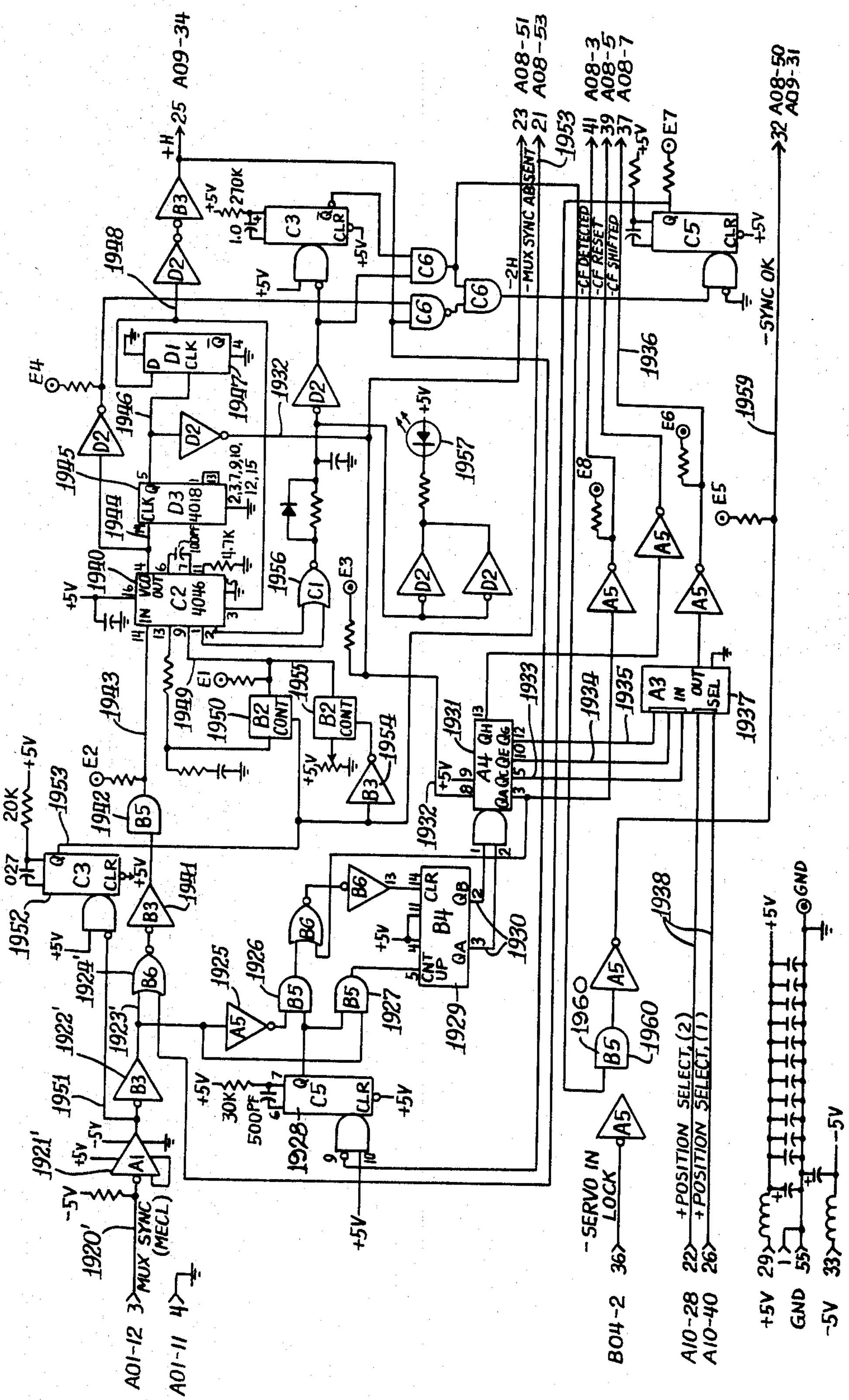
Figure 40A:
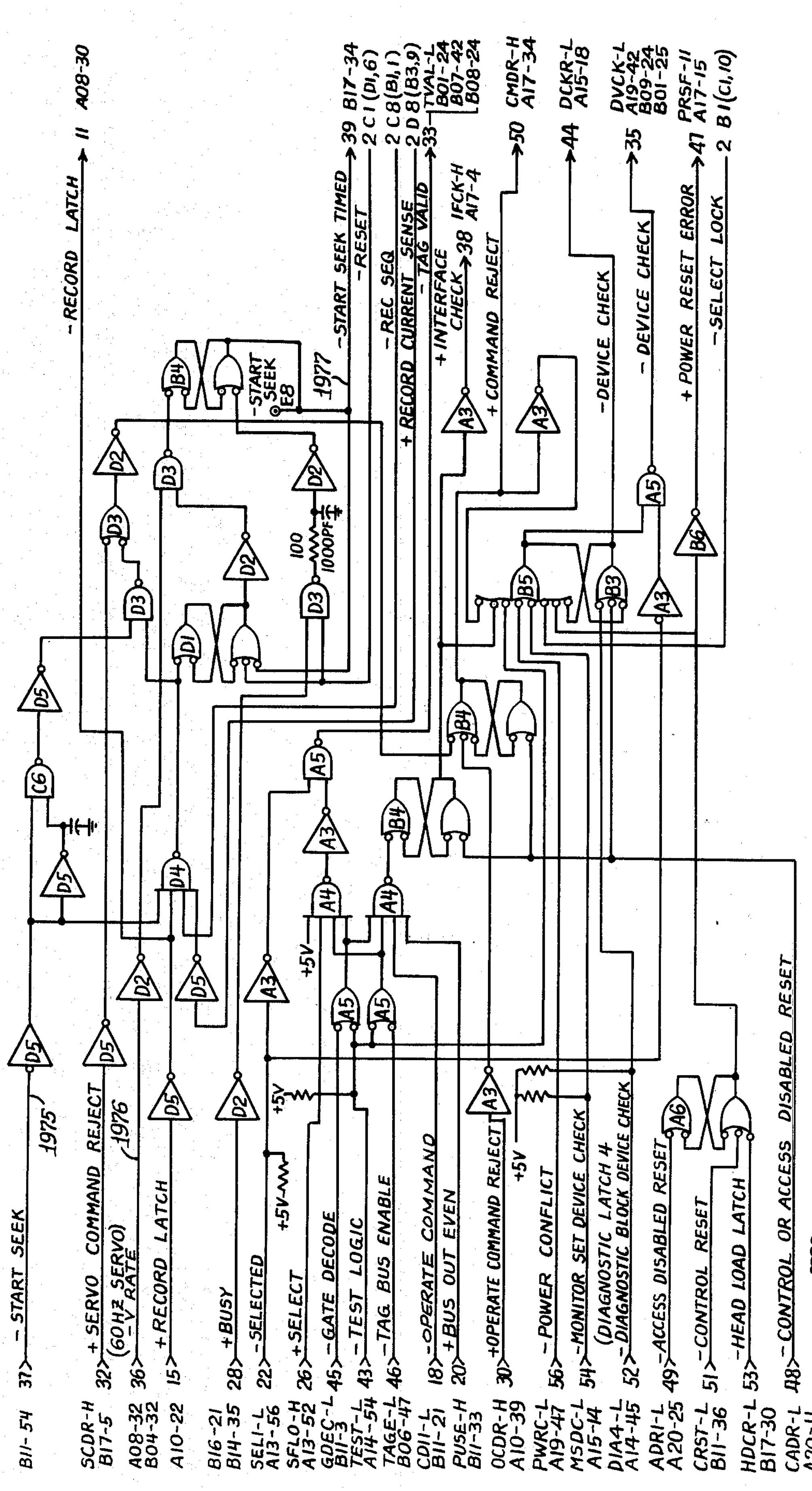

The vertical blanking signal on line 606 (FIG. 13B-(1)) is coupled to place the sync word enable pulse generator 600 in the enabled state for an interval of ten horizontal lines by disabling gate 611 and prevent the coupling of the count 15 position of the counter 590 to generator 600. This enables the decoder/time base corrector circuitry to lock onto the sync word detectors 572 and 575 and thereby be enabled at sync word time and set the phaser 568 and error gate 582 for proper operation.

The data is read from the multiple port shift register 568 with the 3SC reference clock into the shift register portion of the second sync word detector circuitry 575 (FIG. 19B). The shift register portion has three of its output lines 576 coupled to the data input of a serial to parallel converter 577. The multiplex clock provided on line 578 by the reference clock generator 98 is at the SC rate and latches the data in blocks of three data bit cells from the shift register portion of the circuitry 575 into the converter 577. The contents of the serial to parallel converter are transferred to a following RAM 579 each cycle of SC. The three output lines 580 of the converter 577 extend to the input of a RAM 579. The final time base correction is performed in RAM 579 whose write address generator 614 is clocked at reference SC, since the data rate at the input of the RAM is SC. The read address generator and latch and subtractor circuitry 623 and 615 is also clocked at reference SC to cause the reading of the RAM addresses. Read/write mode signals and write enable signals from the reference clock generator 98 of of FIGS. 17A–D control the reading and writing of the RAM addresses so that a read cycle occurs during one part of a subcarrier cycle and a write cycle at a different part of the cycle (refer to FIG. 11B). The amount of time displacement error, required to be corrected is determined by the error gate 582. Upon the detection of the sync word by the second sync word detector 575, a signal placed on line 608 opens the error gate and allows reference 3SC clock pulses placed on line 571 by the reference clock generator 98 to pass to a divide by three counter 583. One output of the counter 583 extends to the read error address generator 623 to provide SC rate clock pulses to the generator. When the reference H/2 is received on line 581 from the reference clock generator 98, the error gate 582 is closed, terminating the coupling of reference 3SC clock pulses to the counter 583. Consequently the SC rate clock pulses are no longer provided to the read error address generator 623 and the number being provided at such time represents the time displacement between the video signal's sync word and reference H/2 in a whole number cycles of SC. Also, a delayed pulse is generated by the delay and pulse former 621 in response to the closure of the error gate 582. The delayed pulse is coupled to the read error address generator 623 and latches the error count in the read error address generator. Subsequently, a reset pulse is generated from the latch pulse to reset the ÷3 binary counter 583 and read error address generator 623. The counter sets the read address in accordance with the timing difference between reference H/2 and the sync word detected by the second sync word detector 575 measured in cycles of 3SC divided by three. The measured value of the timing difference is coupled to a latch and subtractor 624 and is subtracted from the write address to generate the correct read address. Because the clocks representing error are divide-by-three, the RAM 579 will adjust for errors of integral numbers of subcarrier cycles. A 3-bit shift register 617, error latch 618 and gates 619 provide correction in fractions of one cycle of 3SC of any residual error remaining after the data has passed through the RAM 579 . The parallel to serial converter 620 at the output of the RAM 579 receives the demultiplex clock from the reference clock generator 98 and converts the data rate back to 3SC at the input of the shift register 617. FIG. 13C shows the typical correction performed by the phaser 567 and following time base correction by the RAM 579 and shift register 617. The corrected output of the time base corrector 565 appears at terminal 622. However, the use of the reference H/2 signal, which is redefined with respect to a particular phase of subcarrier, in measuring the time displacement error through the operation of the error gate 582 results in the 46 nsec 15 Hz jitter in the video signal provided by the time base corrector 565.

The 9-bit parallel output of the time base corrector 565 is coupled to the data transfer circuitry 129.

What is claimed is:

1. A digital time base compensator for correcting timing errors in a stream of digital data, said digital data occurring at intervals and a rate determined by a data clock signal and including a selected sequence of digital data bits that periodically occurs in the stream of digital data in phase with the digital data, comprising:

a first clock signal generator for generating a first clock signal at a variable rate in accordance with the timing errors;

a second clock signal generator for generating a second clock signal at a reference rate;

a first detector responsive to the first clock signal to receive the stream of digital data for generating a first indicating signal upon the detection of the occurrence of the selected sequence of digital data bits;

a first digital data memory for temporarily storing the digital data at a time after the receipt of the digital data by the first detector, said first digital data memory responsive to one of said first and second clock signals for entering the digital data for storage at a rate determined by said one clock signal and responsive to the other of said first and second clock signals for retrieving the stored digital data at a rate determined by said other clock signal, said first digital data memory further responsive to the first indicating signal for initially setting the relative times of entering and retrieving digital data;

a second detector responsive to the second clock signal to receive the stream of digital data retrieved from the first digital data memory for generating a second indicating signal in response to and indicative of the time difference between the occurrence of the selected sequence of digital data bits and a reference time signal; and a second digital data memory for temporarily storing the digital data retrieved from the first digital memory at a time after the receipt of the digital data by the second detector, said second digital data memory responsive to the second indicating signal for storing the digital data for an interval corresponding to the indicated time difference.

2. The digital time base compensator according to claim 1 wherein the second digital data memory is responsive to a clock signal coherent with the second clock signal for entering and retrieving digital data in storage, said second digital data memory responsive to the second indicating signal for setting the relative times of entering and retrieving digital data.

3. The digital time base compensator according to claim 2 wherein the first digital data memory is responsive to the first clock signal for entering the digital data for storage and is responsive to the second clock signal for retrieving the stored digital data.

4. The digital time base compensator according to either claim 2 or claim 3 wherein each of the first and second clock signals have a frequency equal to that of the data clock signal, the second indicating signal is indicative of the time difference in numbers of cycles of the second clock signal, and further comprising:

a first data rate converter for reducing the rate of the digital data entered for storage in the second digital data memory by a factor equal to a selected integral number;

a divider for dividing the second indicating signal by the selected integral number;

a third detector coupled to the divider for generating a third indicating signal indicative of the number of second clock signal cycles less than a whole number obtained by dividing the second indicating signal;

a third digital data memory in circuit with the second digital data memory and responsive to the third indicating signal for temporarily storing the stream of digital data for an interval corresponding to the number of second clock signal cycles indicated by said third indicating signal.

5. The digital time base compensator according to claim 4 wherein the third digital data memory is coupled to receive and store the digital data stream after storage in the second digital data memory, and further comprising a second data rate converter coupled between the second and third digital data memories for increasing the rate of the digital data before storage in the third digital data memory by a factor equal to the selected integral number.

6. The digital time base compensator according to either claim 1, claim 2 or claim 3 adapted for correcting timing errors in a plurality of streams of digital data, each stream of digital data transmitted through a channel including first clock signal generator, first and second detectors and first and second digital data memories, said second clock signal generator coupled to provide the second clock signal to each channel whereby a single common second clock signal is utilized in the channels, and the second detector in each channel is responsive to a common reference time signal.

7. The digital time base compensator according to claim 6 wherein the digital data is a digitized color television signal defining horizontal lines and including a chrominance subcarrier component, the digitized color television signal is in the form of digital data bits in a plurality of parallel streams with the data bits in each stream generated at a rate equal to a multiple of the frequency of the chrominance subcarrier component and transmitted through one of the channels, the selected sequence of digital data bits periodically occurring in each stream at a rate related to the frequency of the horizontal lines of the color television signal and in phase with the chrominance subcarrier component, the nominal rates of the first and second clock signals corresponding to that of digital data bits, and the rate of the common reference time signal corresponding to the nominal rate of periodic occurrence of the selected sequence of digital data bits.

8. The digital time base compensator according to claim 7 wherein the selected sequence of digital data bits and the common reference time signal periodically occur at a nominal rate equal to one-half the frequency of the horizontal lines of the color television signal.

9. A digital time base compensator for correcting timing errors in a stream of digital data, said digital data occurring at intervals and a rate that varies with timing errors and including a selected sequence of digital data bits that periodically occurs in the stream of digital data in phase with the digital data, comprising:

a first clock signal generator for generating a first clock signal at a variable rate in accordance with that of the digital data;

a second clock signal generator for generating a second clock signal at a reference rate;

a detector responsive to the first clock signal to receive the stream of digital data for generating a first indicating signal upon the detection of the occurrence of the selected sequence of digital data bits;

a digital data memory for temporarily storing the digital data at a time after the receipt of the digital data by the detector, said digital data memory responsive to one of said first and second clock signals for entering the digital data for storage at a rate determined by said one clock signal and responsive to the other of said first and second clock signals for retrieving the stored digital data at a rate determined by said other clock signal, said digital data memory further responsive to the first indicating signal for initially setting the relative times of entering and retrieving digital data.

10. The digital time base compensator according to claim 9 adapted for correcting timing errors in a plurality of streams of digital data, each stream of digital data transmitted through a channel including a clock signal generator, a detector and a digital data memory, said second clock signal generator coupled to provide the second clock signal to each channel whereby a single common second clock signal is utilized in the channels.

11. The digital time base compensator according to either claim 1 or claim 9 further comprising means responsive to the digital data stream for detecting the absence of the periodically occurring selected sequence of digital data bits for a selected number of expected occurrences of said selected sequence, the first detector responsive to the means for detecting the absence of the periodically occurring selected sequence of digital data bits to search for the occurrence of said selected sequence.

* * * * *

US004349832B1

REEXAMINATION CERTIFICATE (1998th)

United States Patent [19]

[11] B1 4,349,832

Gallo

[45] Certificate Issued May 11, 1993

[54] DIGITAL DATA RATE CORRECTOR AND TIME BASE CORRECTOR

[75] Inventor: Luigi C. Gallo, Woodside, Calif.

[73] Assignee: Ampex Corporation, Redwood City, Calif.

Reexamination Request:
No. 90/002,633, Feb. 7, 1992

Reexamination Certificate for:

| | |
|---|---|
| Patent No.: | **4,349,832** |
| Issued: | **Sep. 14, 1982** |
| Appl. No.: | **108,912** |
| Filed: | **Dec. 31, 1979** |

Related U.S. Application Data

[63] Continuation of Ser. No. 763,762, Jan. 28, 1977, Pat. Pat. No. 9,278 column top

[51] Int. Cl.[5] .......................... H04N 11/00; H04N 5/95; H04N 5/91

[52] U.S. Cl. .......................... 358/17; 358/324; 375/114; 375/119; 360/10.1

[58] Field of Search .......................... 358/13, 17, 19, 149, 358/18, 148, 9.1, 320, 339, 337, 324; 360/36.1, 36.2; 370/100, 108; 375/107, 114, 118, 119

[56] References Cited

U.S. PATENT DOCUMENTS

| | | | |
|---|---|---|---|
| 3,325,794 | 6/1967 | Jenkins | 340/174.1 |
| 3,497,634 | 2/1970 | Damron et al. | 179/100.2 |
| 3,587,007 | 6/1971 | Temes | 333/18 |
| 3,597,707 | 8/1971 | Chao et al. | 333/18 |
| 3,789,379 | 1/1974 | Breikss | 340/174.1 |
| 3,873,920 | 3/1975 | Apple, Jr. et al. | 325/41 |
| 3,909,839 | 9/1975 | Inaba et al. | 358/8 |
| 3,921,209 | 11/1975 | Yoshino et al. | 360/32 |
| 4,024,571 | 5/1977 | Dishert et al. | 358/19 |
| 4,027,283 | 5/1977 | Tang | 340/146.1 |
| 4,054,904 | 10/1977 | Saitoh et al. | 358/19 |
| 4,133,009 | 1/1979 | Kittler et al. | 360/9 |
| 4,212,027 | 7/1980 | Lemoine | 358/8 |
| 4,231,063 | 10/1980 | Ito et al. | 358/148 |

OTHER PUBLICATIONS

Connolly, W. G. and J. Dierman, "The Electronic Still Store: A Digital System for the Storage and Display of Still Pictures", SMPTE Journal, vol. 85, No. 8 (Aug. 1976) pp. 609–613.

Yamamoto, F. and S. Shirai, "Study of Various Time-Base Correcting Systems for VTR's", *Video Recording Research Society (Japan)*, Data No. 3-2, Feb. 26, 1974.

*Primary Examiner*—James J. Groody

[57] ABSTRACT

A first digital data memory is responsive to a first clock signal varying at a rate in accordance with the timing errors contained in a stream of digital data to enter the digital data for temporary storage. The stored digital data is retrieved from storage in the first digital data memory in response to a second clock signal of a stable reference rate. The relative times of entering and retrieving the digital data in the first digital memory are set according to the occurrence of a selected sequence of digital data bits contained in the digital data. The digital data retrieved from the first digital data memory is further temporarily stored in a second digital data memory for an interval determined by the time difference between the occurrence of the selected sequence of digital data bits and the occurrence of a reference time signal.

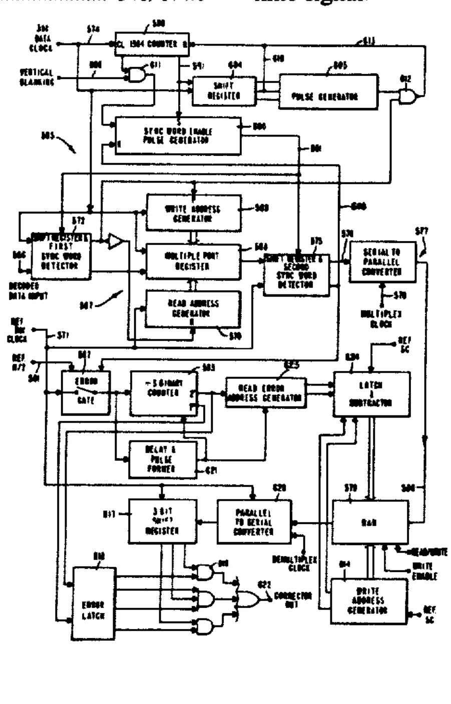

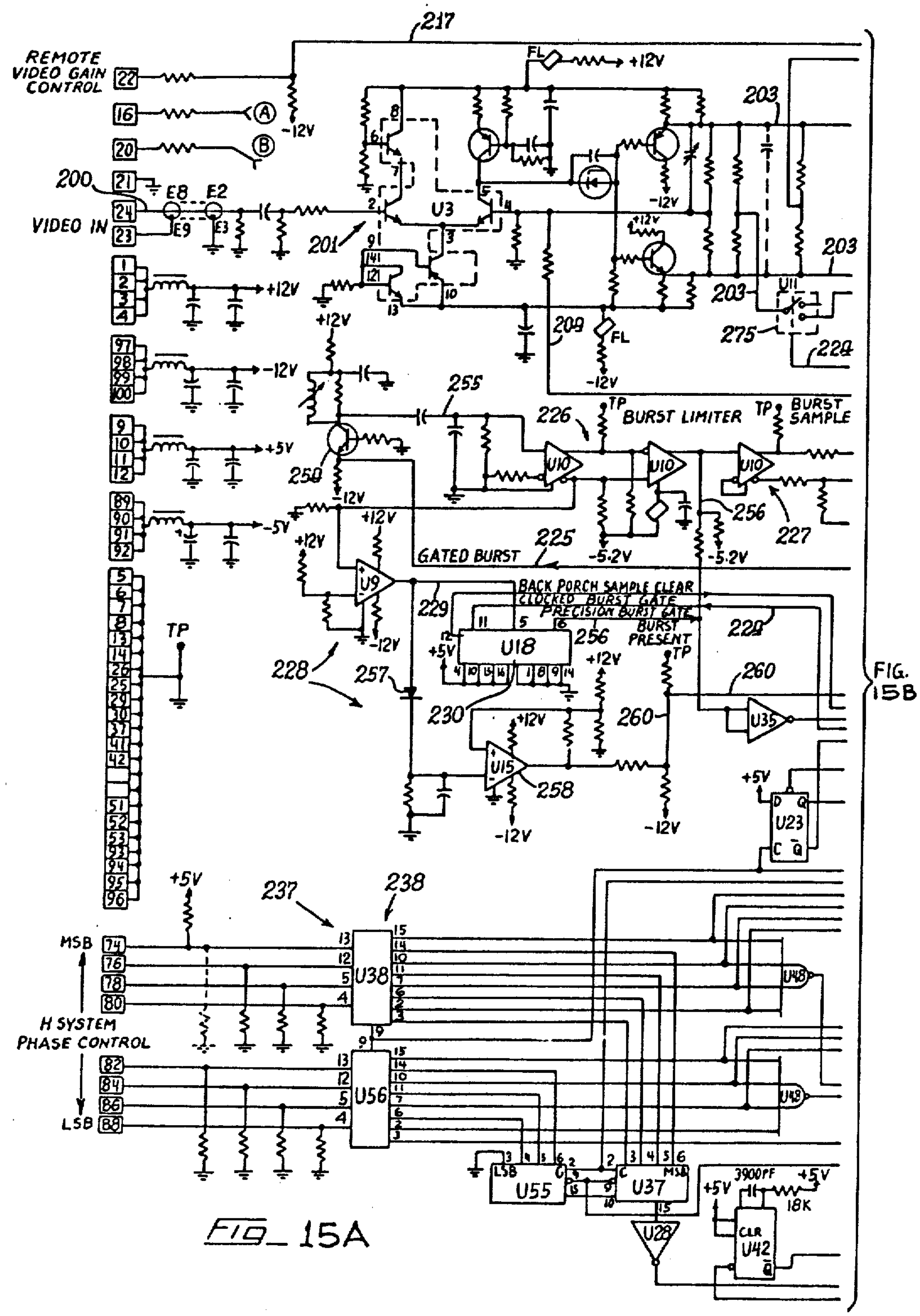
FIG_15A

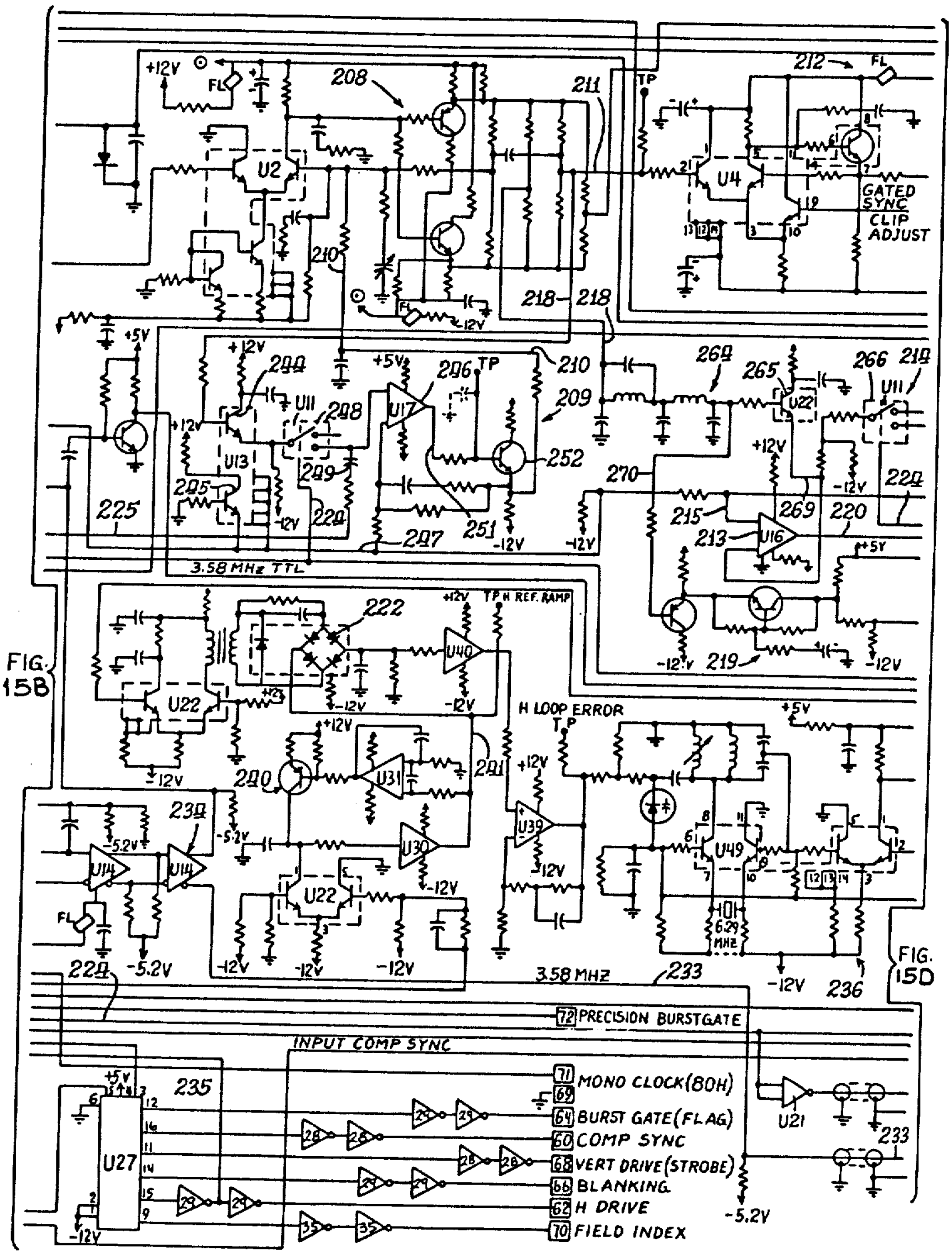
FIG_ 15C

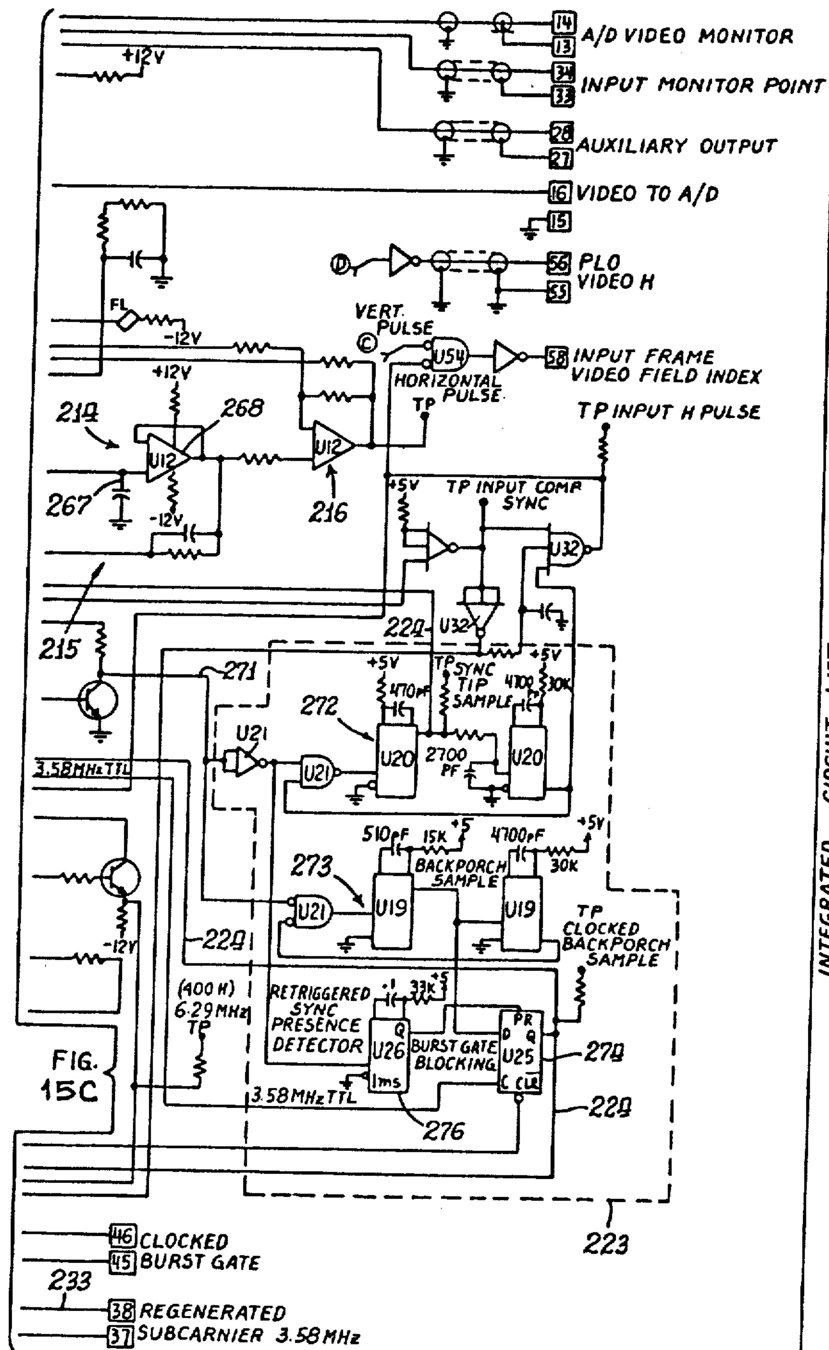
FIG_ 15D
INTEGRATED CIRCUIT LIST
| REF DES | AMPEX P/N | VENDOR P/N | VOLTAGE PIN | GROUND PIN |
|---|---|---|---|---|
| U2,3,4,13,22 | | CA3046 | | |
| U1,12,17 | | 1458 | | |
| U5,31,39 | | 741 | | |
| U6,30,40 | | 302 | | |
| U8 | | CA3054 | | |
| U9,15,16 | | 710 | | |
| U24 | | 74164 | | |
| U32 | | 7410 | | |
| U33,37,46,47,55 | | 9316 | | |
| U34 | | 7425 | | |
| U38,51,56 | | 74LS175 | | |
| U7,41 | | 3019 | | |
| U48 | | 7420 | | |
| REF DES | AMPEX P/N | VENDOR P/N | VOLTAGE PIN | GROUND PIN |
|---|---|---|---|---|
| U10,14 | | 10116 | | |
| U12,17 | | 1458 | | |
| U18 | | 74193 | | |
| U19,20,26,36,42 | | 74123 | | |
| U21,35 | | 7400 | | |
| U23,25,44,45,52 | | 7474 | | |
| U49 | | 3103 | | |
| U50 | | 9305 | | |
| U53 | | 74154 | | |
| U54 | | 7402 | | |
| U11 | | | | |

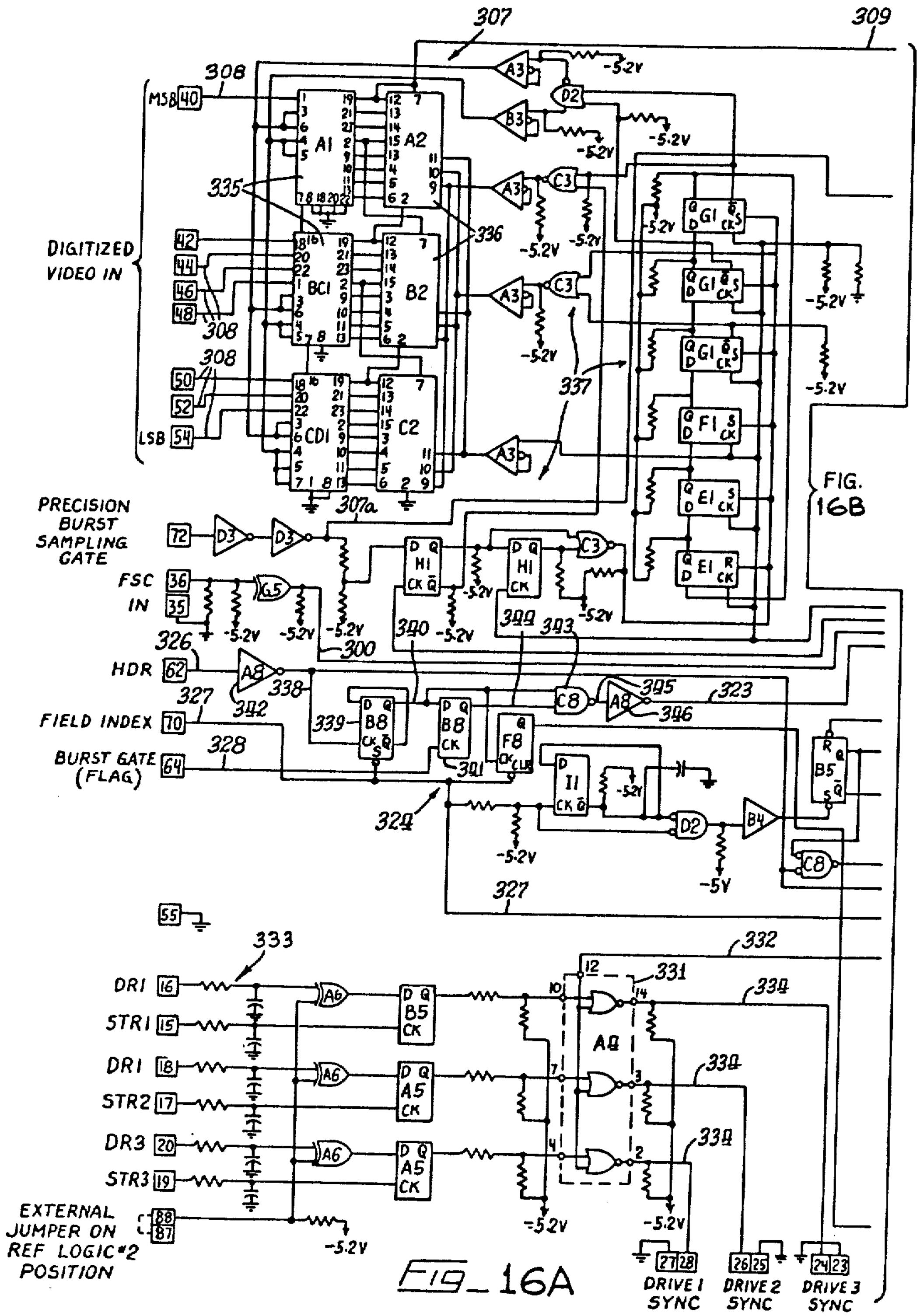
FIG_16A

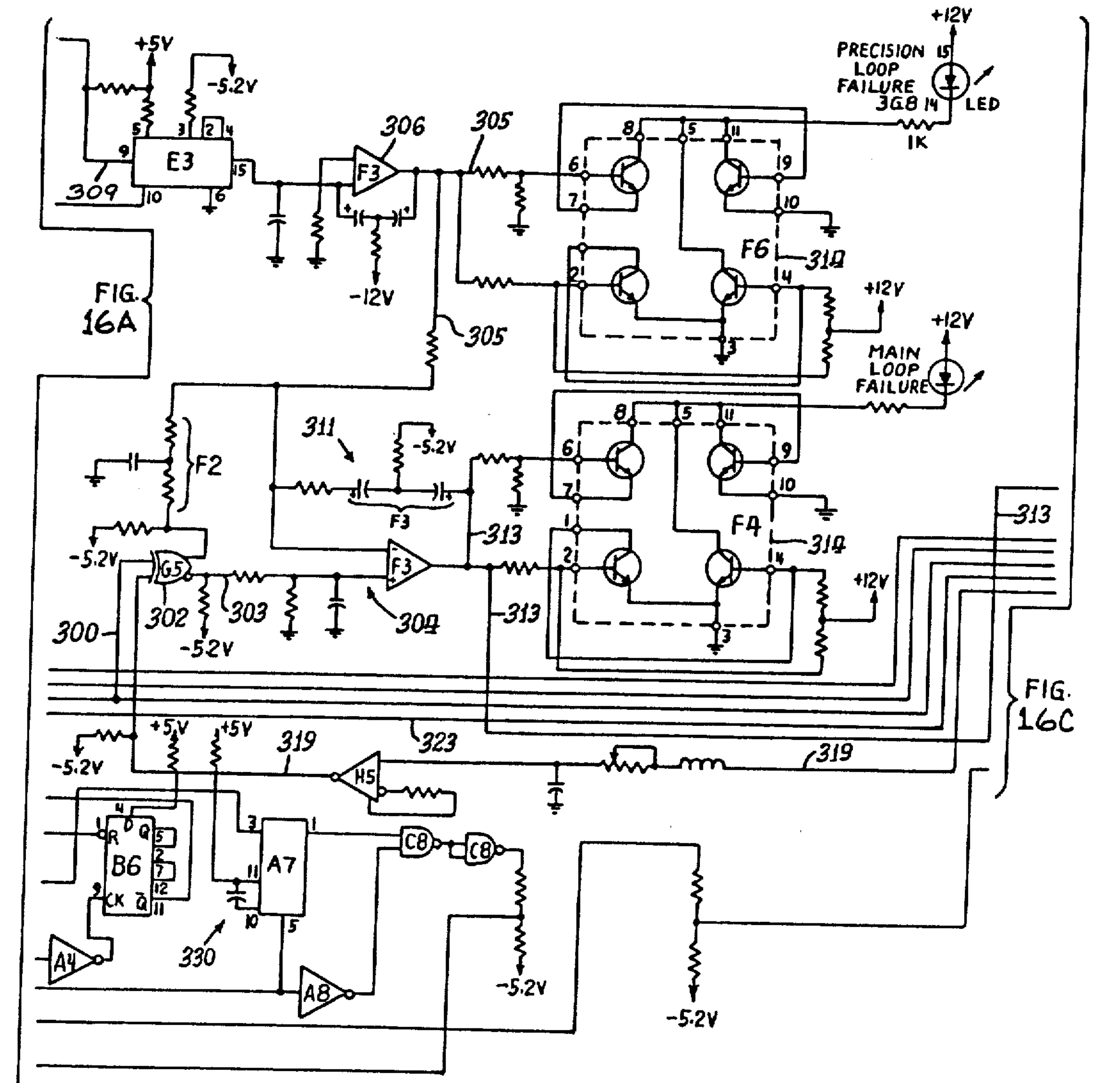
| I.C. LIST | | | | | | | | | | | |
|---|---|---|---|---|---|---|---|---|---|---|---|
| REF DES | F4, F6 | D7 | E3 | F3 | F7 | C8 | A8, D3 | A6 | A7 | A5, B5, 8 | B6 |
| AMPEX P/N | — | — | — | 586-905 | 586-764 | 586-075 | 586-326 | 586-705 | 586-533 | 587-875 | 587-757 |
| VENDOR P/N | CA3046 | CA3028 | CD4053 | MC1458 | LM741 | 7400 | 7404 | 7486 | 74121 | 74LS74 | 74LS175 |
| VOLTAGE PIN | — | — | +5V (16) | — | — | +5V (14) | +5V (14) | +5V (14) | +5V (14) | +5V (14) | +5V (16) |
| GROUND PIN | — | — | 8 | — | — | 7 | 7 | 7 | 7 | 7 | 8 |
| REF. DES | A1, BC-1, CD1 | A2, B2, C2 | A4, D4, D5, D8, E2, E4, E5, F8 | C5 | C3, C4, D2, H4 | G5 | E6, H7 | A3, B3, B4 | C6, C7, U6, E1, F1, G1, G3, G8, H1, H2, H3, I1 |
|---|---|---|---|---|---|---|---|---|---|
| AMPEX P/N | 587-100 | 587-924 | 587-203 | 587-205 | 587-703 | 587-747 | 587-704 | 587-285 | 587-139 |
| VENDOR P/N | 745181 | 745194 | 10101 | 10102 | 10105 | 10107 | 10116 | 10125 | 10131 |
| VOLTAGE PIN | +5V (24) | +5V (16) | -5.2V (8) | -5.2V (8) | -5.2V (8) | -5.2V (8) | -5.2V (8) | +5V (9) - 5.2V (8) | -5.2V (8) |
| GROUND PIN | 12 | 8 | 1,16 | 1.16 | 1,16 | 1.16 | 1.16 | 16 | 1.16 |
31 TRANSFER ID RESET
FIG_16B

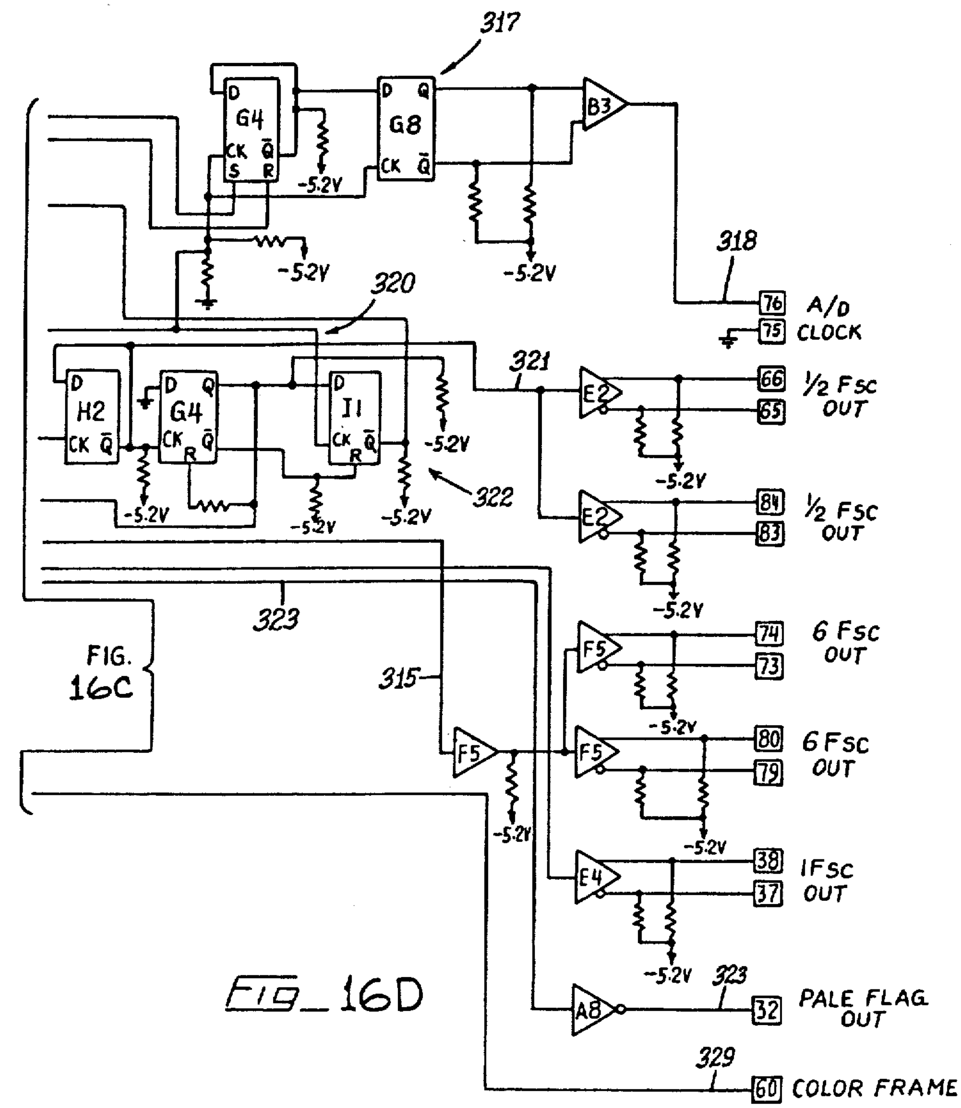
FIG_16D

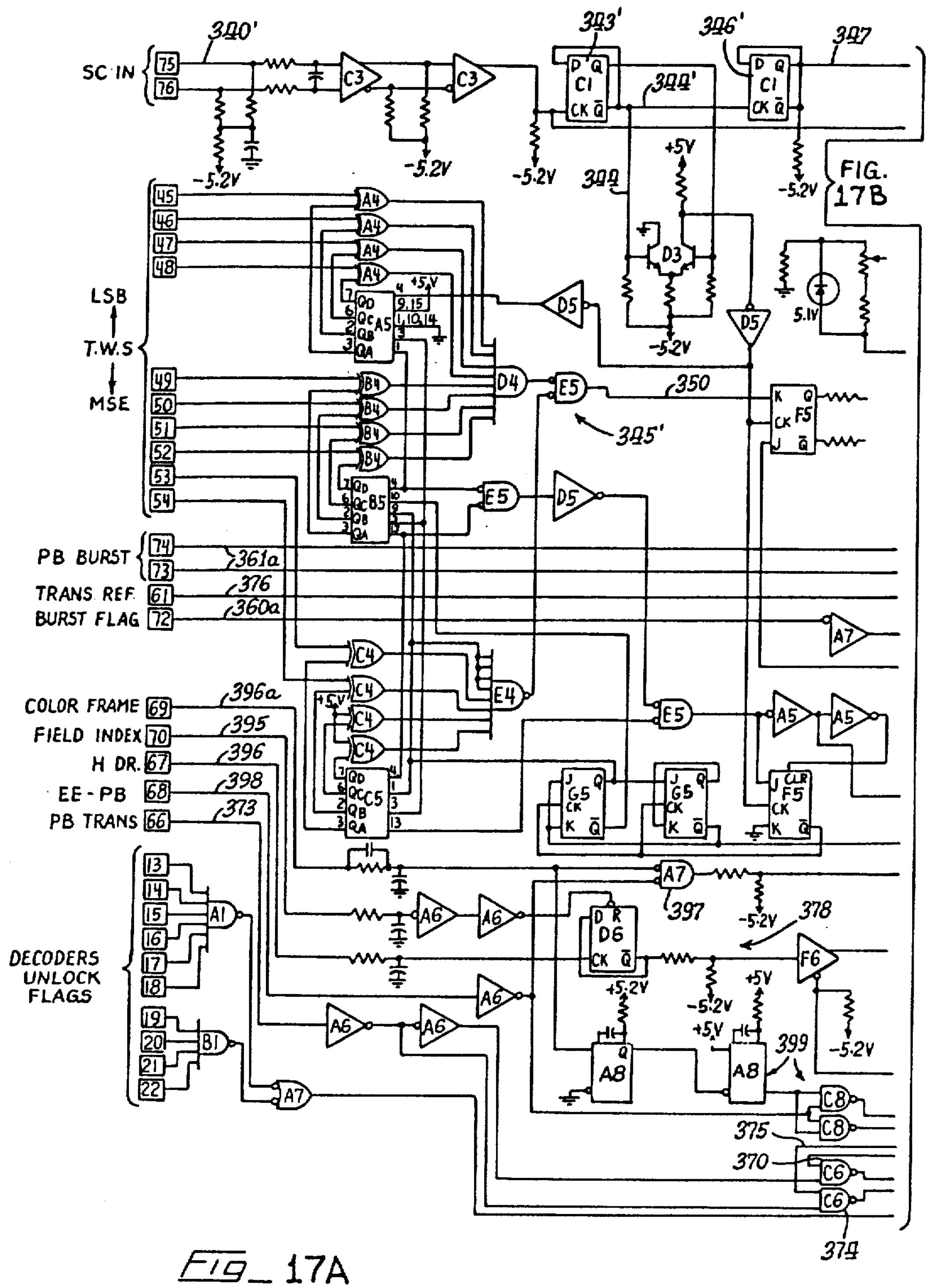
FIG_ 17A

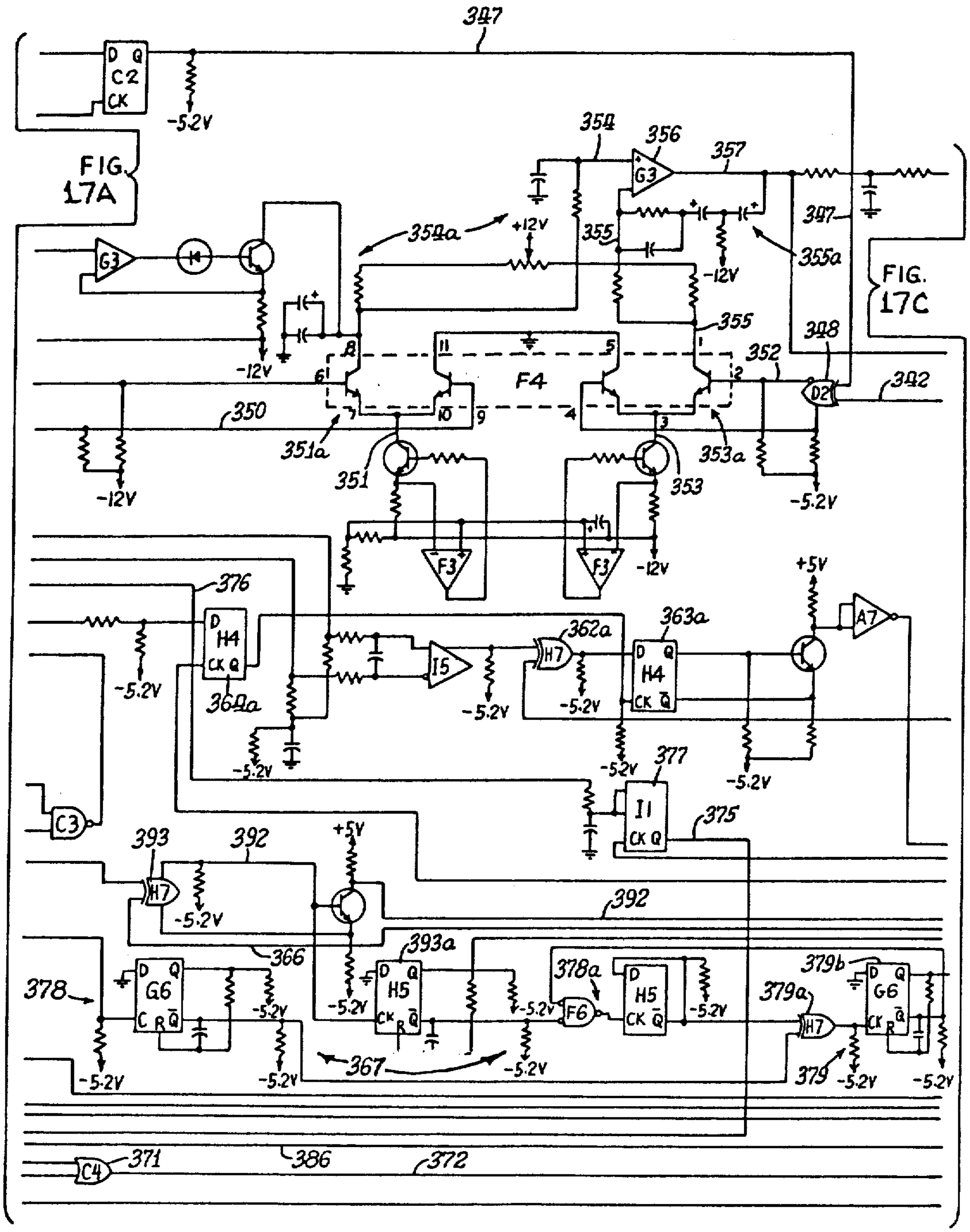
FIG_17B

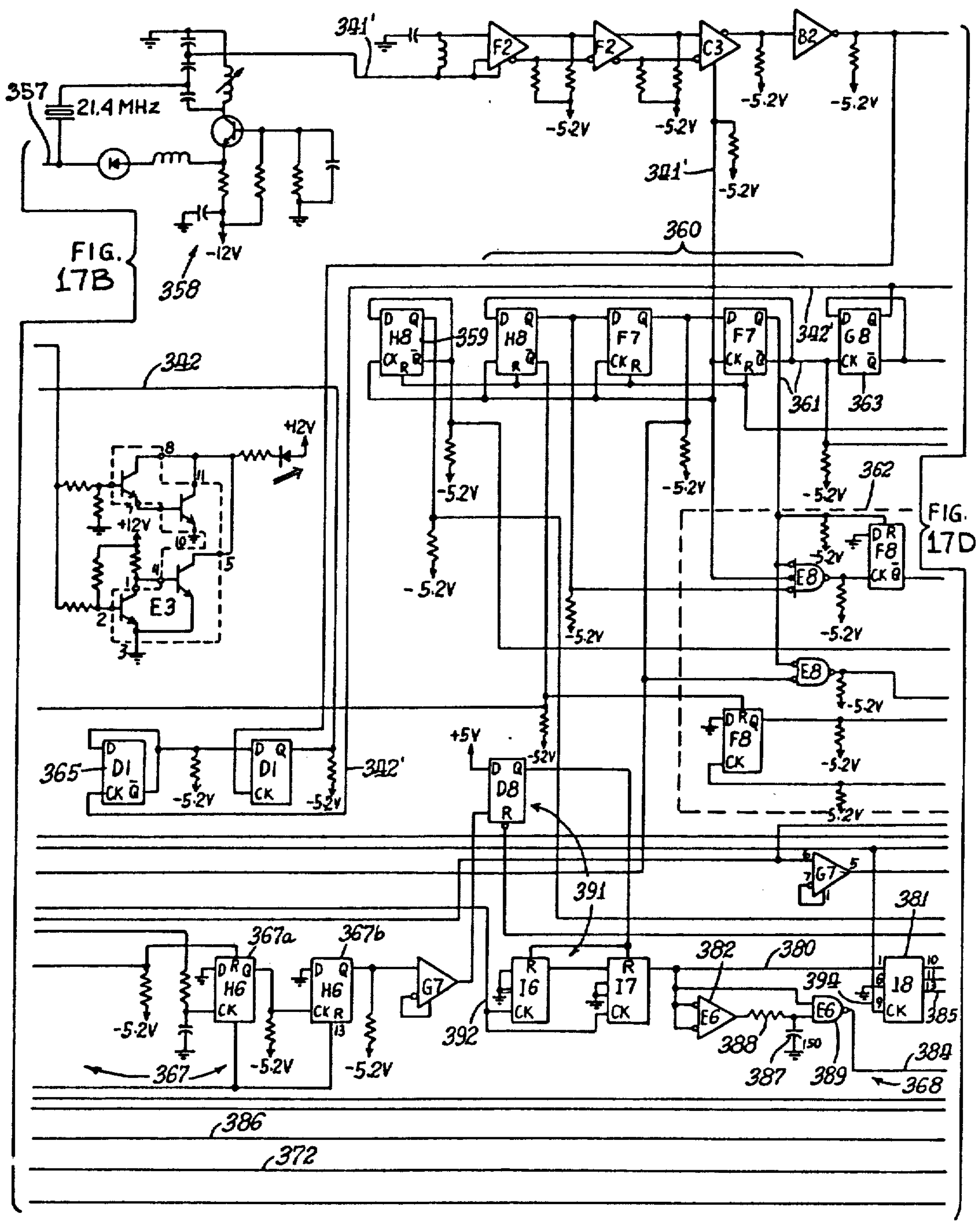
| INTEGRATED CIRCUIT LIST | | | | | | | | | | | | | | | | | |
|---|---|---|---|---|---|---|---|---|---|---|---|---|---|---|---|---|---|
| REFERENCE DESIGNATION | A7, E5 | A8 | B1 | C1, C2, D1, F7, F8 G8, H4, H5, H6, H8 | A6, B6 B7, D5 | A1, D4, E4 | A2, A3 B2, B3 | A4, B4 C4 | A5, B5, C5 | C3, F2 I5 | C6, C8 E6 | C7, D7 | D2, H7 | D6, D8 | E3, F4 | E7, G8 G7 | E8 |
| AMPEX P/N | | | | | | | | | | | | | | | | | |
| VENDOR P/N | 7402 | 74123 | 7420 | 10131 | 7404 | 7430 | 10101 | 7486 | 74192 | 10116 | 7400 | 74H04 | 10107 | 7474 | 3046 | 10125 | 10105 |
| VOLTAGE PIN | +5V(14) | +5V(15) | +5V(14) | -5V (8) | +5V(14) | +5V(14) | -5V(8) | +5V(15) | +5V(15) | -5V(14) | +5V(14) | +5V(14) | -5V(8) | +5V(14) | – | -5V(8) +5V(9) | -5V(8) +5V(9) |
| GROUND PIN | 7 | 8 | 7 | 1+16 | 7 | 7 | 1+16 | 7 | 8 | 7 | 7 | 7 | 1+16 | 7 | – | 16 | 16 |
FIG_17C

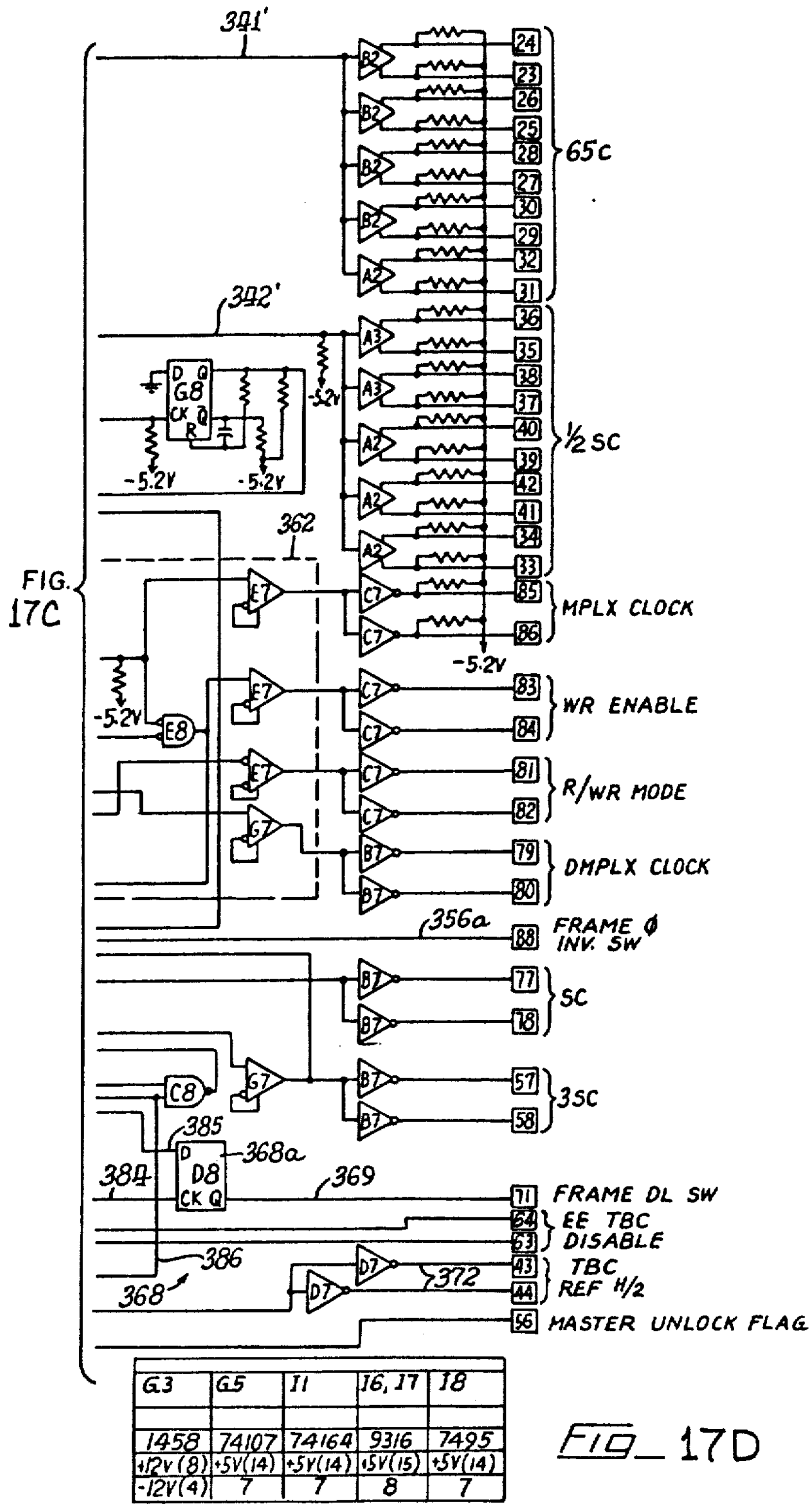
| G3 | G5 | I1 | I6, I7 | I8 |
|---|---|---|---|---|
| | | | | |
| 1458 | 74107 | 74164 | 9316 | 7495 |
| +12V (8) | +5V (14) | +5V (14) | +5V (15) | +5V (14) |
| -12V (4) | 7 | 7 | 8 | 7 |
FIG_ 17D

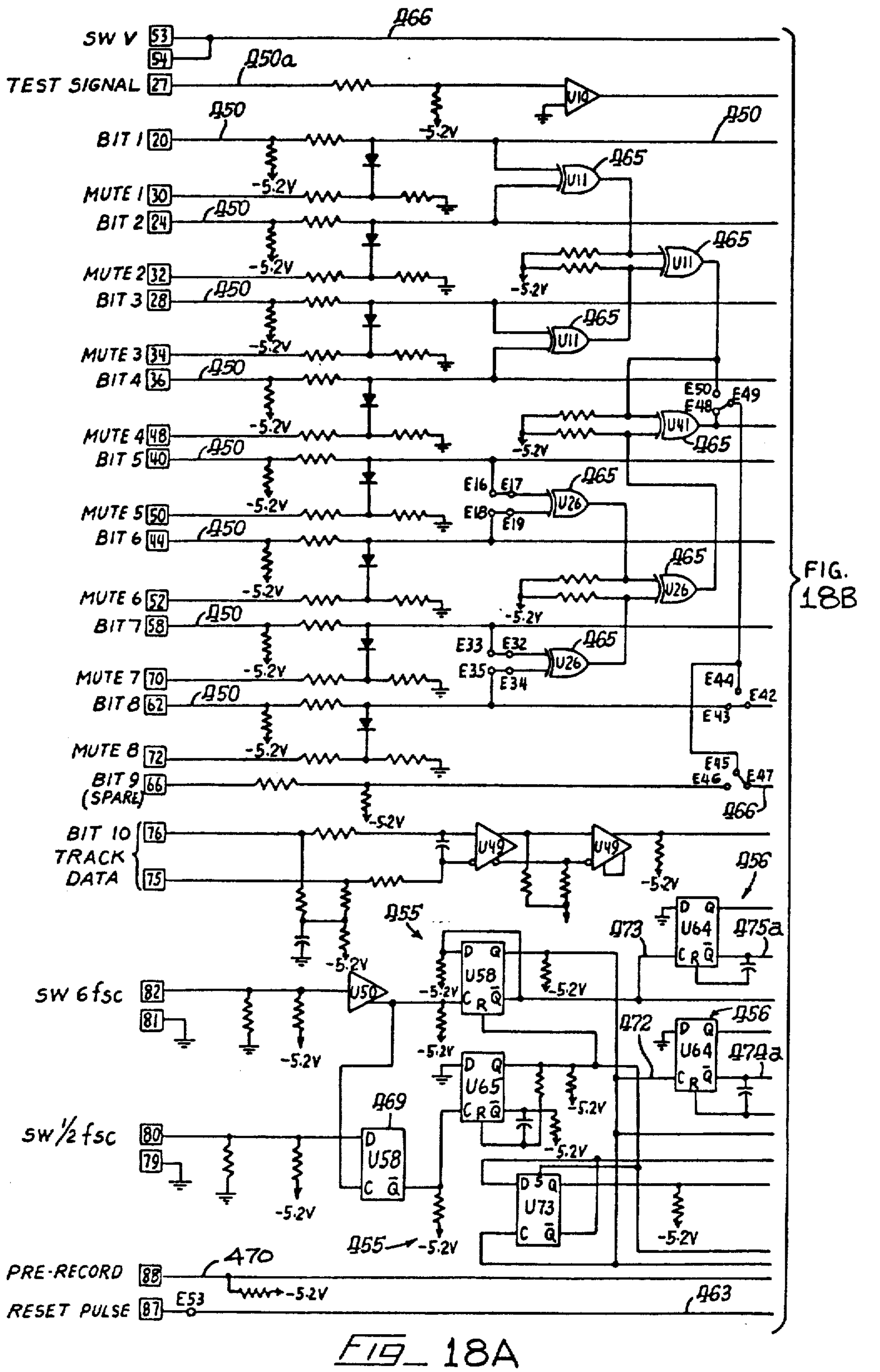
FIG_ 18A

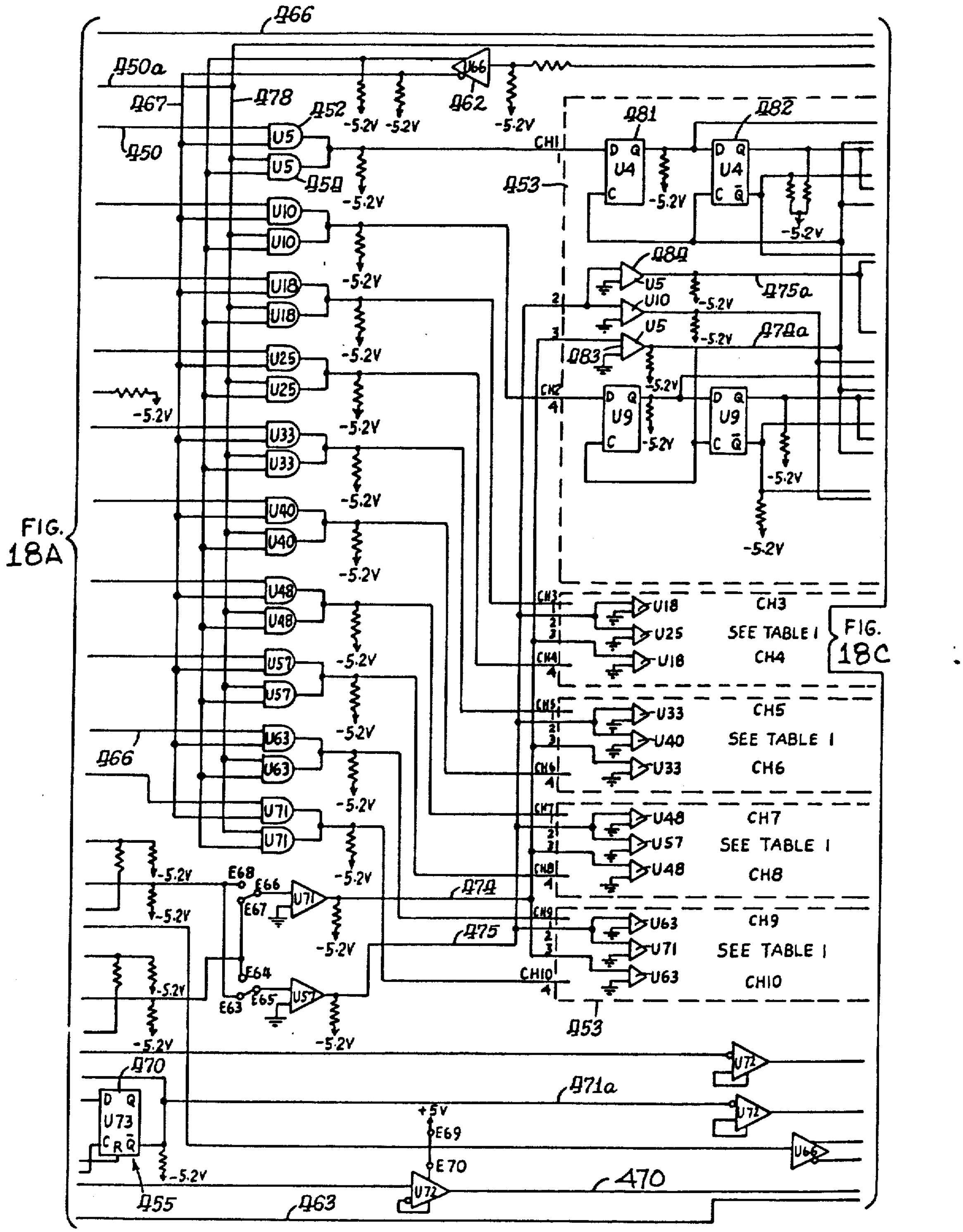
FIG_18B

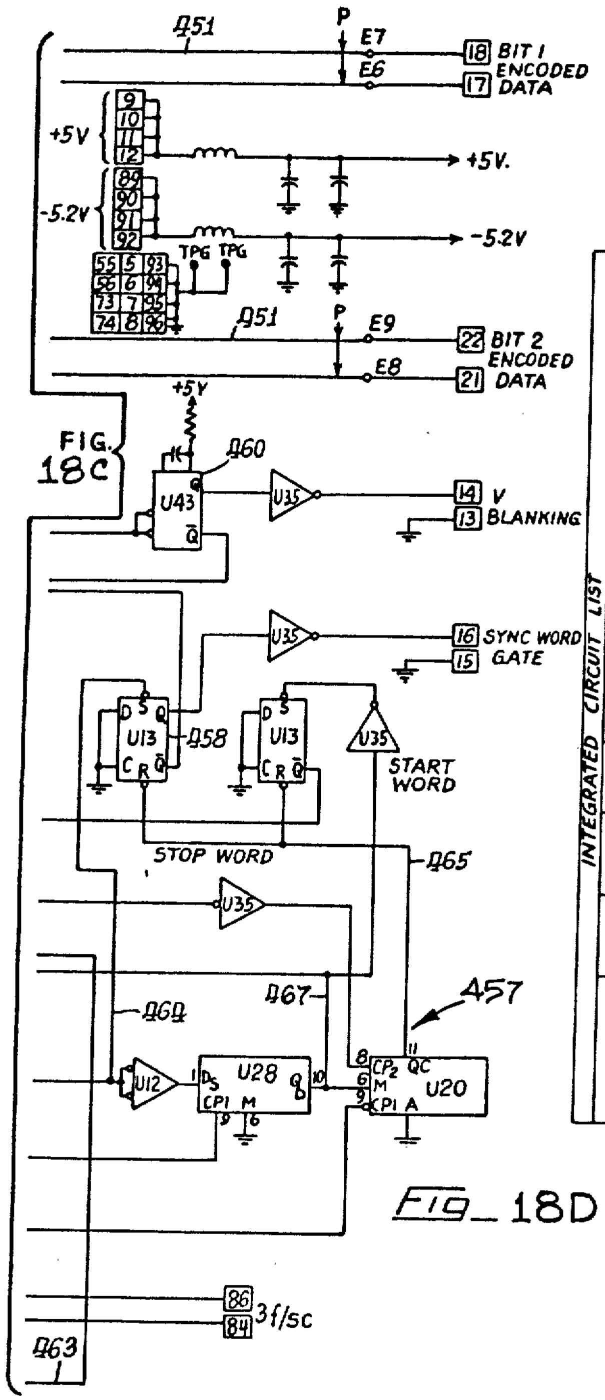

FIG_18D

| REFERENCE DESIGNATION | U52 | U13 | U12 | U35 | U20, 28, 42, 51 | U43 | U19, 27, 34 | U1, 4, 6, 9, 24, 29, 32, 36, 39, 44, 47, 53, 56, 58, 59, 62, 64, 65, 67, 70, 73 |
|---|---|---|---|---|---|---|---|---|
| AMPEX P/N | 586-076 | 586-108 | 586-109 | 586-326 | 586-497 | 586-533 | 586-552 | 587-139 |
| VENDOR P/N | 7410 | 7474 | 7402 | 7404 | 7495 | 74121 | 9316 | 10131 |
| VOLTAGE PIN | +5V (14) | +5V (14) | +5V (14) | +5V (14) | +5V (14) | +5V (14) | +5V (16) | -5.2V (8) |
| GROUND PIN | 7 | 7 | 7 | 7 | 7 | 7 | 8 | 1, 16 |

INTEGRATED CIRCUIT LIST

NOTES: UNLESS OTHERWISE SPECIFIED.

1 RESISTANCE VALUES ARE IN OHMS, 1/4W, 5%.
2 CAPACITANCE VALUES ARE IN MICROFARADS, 50V.
3 SCHEMATIC REFLECTS PWA 1403332-01 REVISION "A"

| REFERENCE DESIGNATION | U66 | U50 | U11, 26, 41 | U3, 8, 16, 23, 31, 38, 46, 55, 61, 69 | U5, 10, 18, 25, 33, 40, 48, 57, 63, 71 | U2, 7, 15, 22, 30, 37, 45, 54, 60, 68 | U49 | U72 |
|---|---|---|---|---|---|---|---|---|
| AMPEX P/N | 587-203 | 587-205 | 587-741 | 587-324 | 587-549 | 587-703 | 587-704 | 587-285 |
| VENDOR P/N | 10101 | 10102 | 10107 | 10106 | 10104 | 10105 | 10116 | 10125 |
| VOLTAGE PIN | -5.2V (8) | -5.2V (8) | -5.2V (8) | -5.2V (8) | -5.2V (8) | -5.2V (8) | -5.2V (8) | -5.2V (8) -5V (9) |
| GROUND PIN | 1, 16 | 1, 16 | 1, 16 | 1, 16 | 1, 16 | 1, 16 | 1, 16 | 16 |

INTEGRATED CIRCUIT LIST

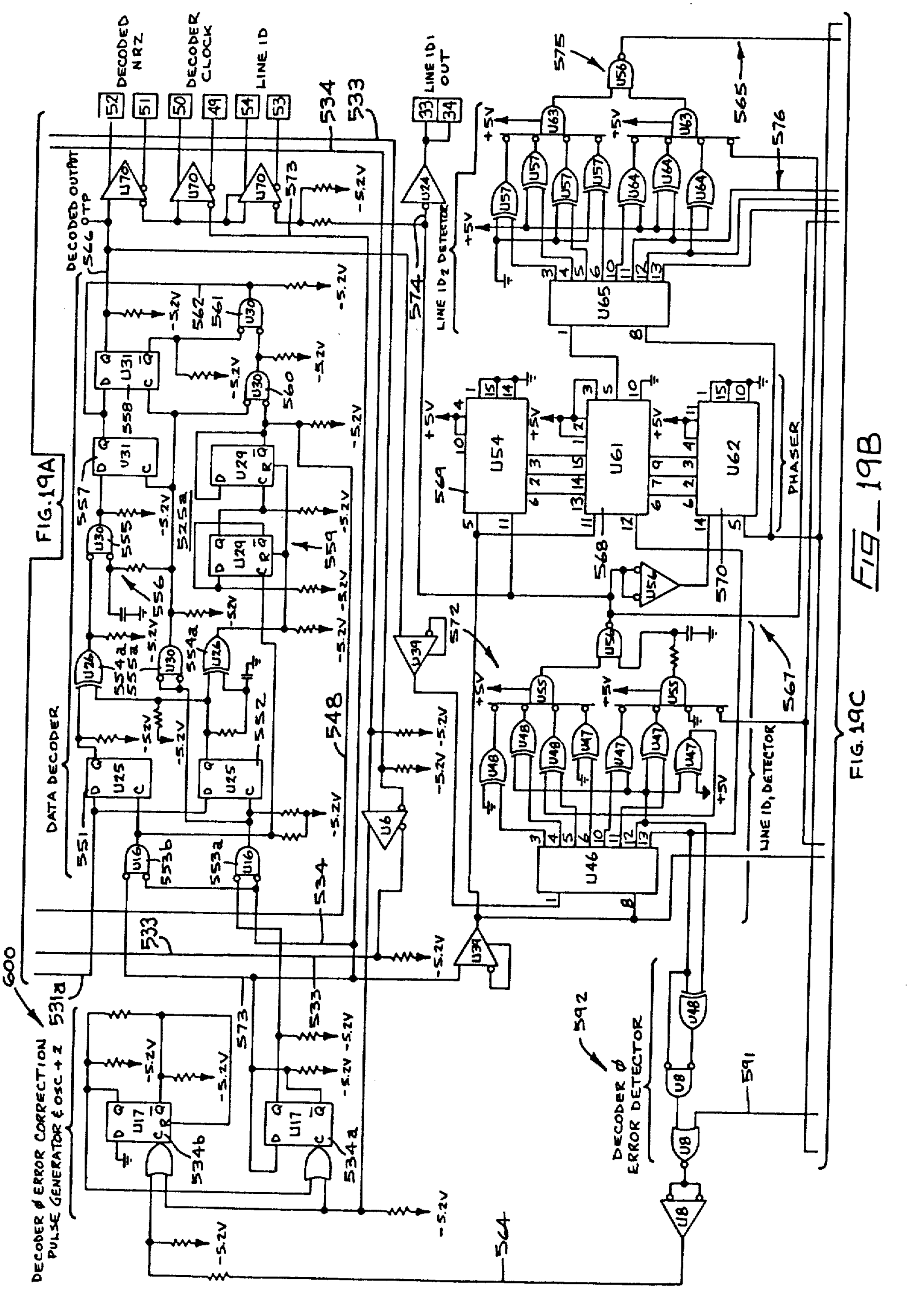
FIG_19B

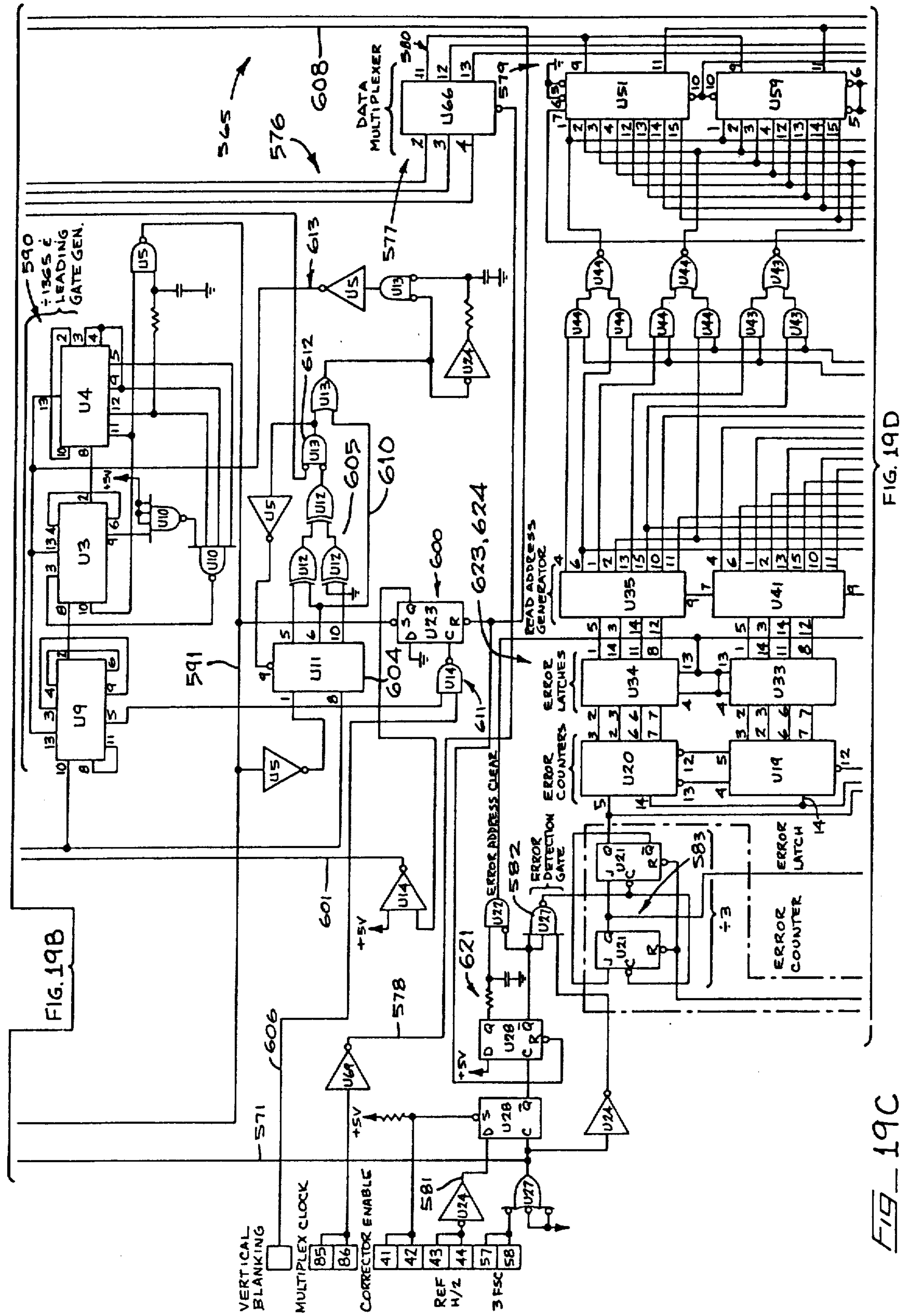
FIG_19C

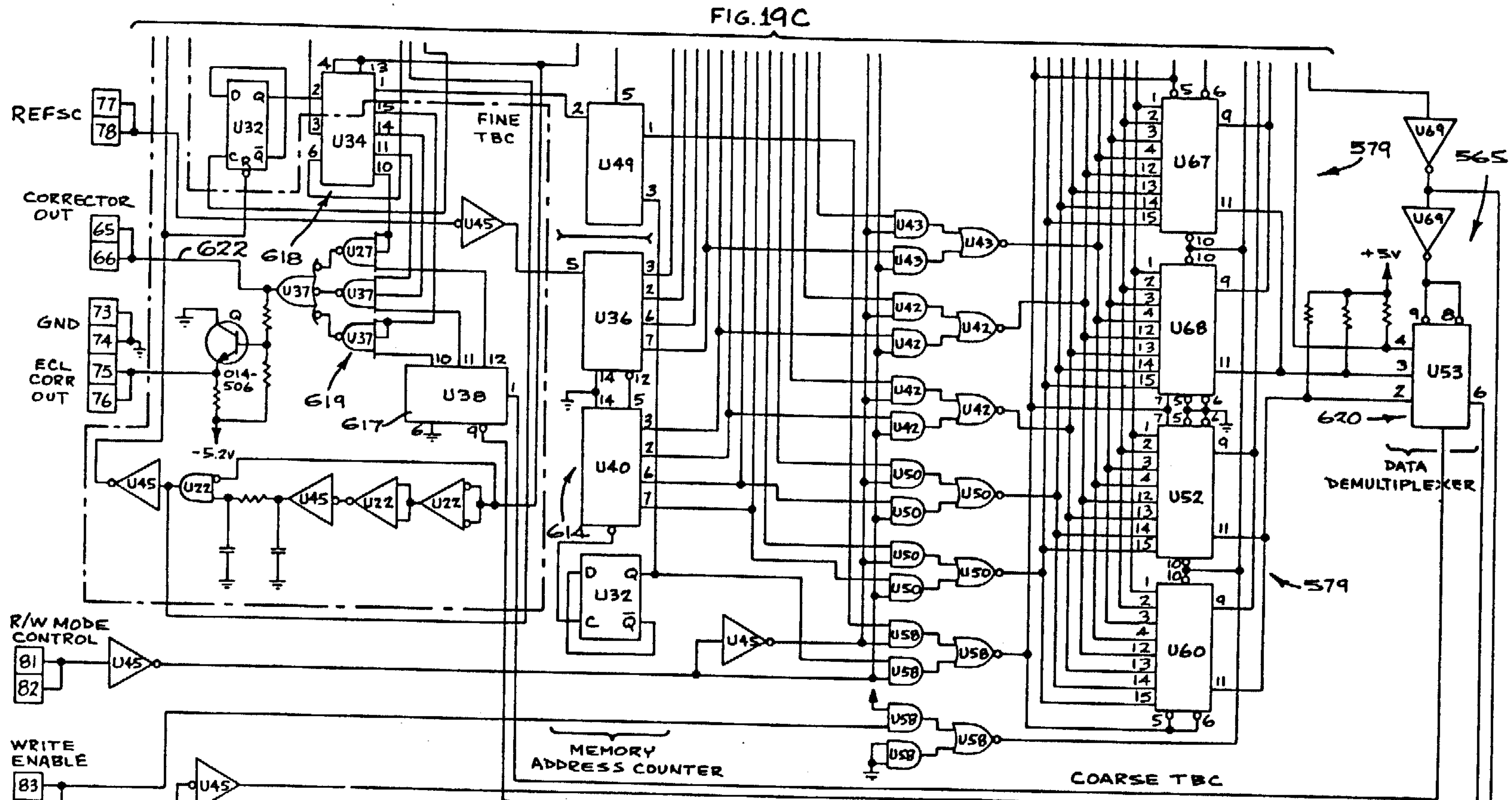
| REF. DES. | U14,56 | U10 | U23,32 | U13,8 | U47,44,50,58 | U24 | U18,33,34,34 | U38,66,53 | U49 | U69 | U12,47,48,48,51 | U5 | U45 | U27,37 | U22 |
|---|---|---|---|---|---|---|---|---|---|---|---|---|---|---|---|
| AMPEX P/N | 586-075 | 586-077 | 586-108 | 586-109 | 586-287 | 586-326 | 586-445 | 586-497 | 586-550 | 586-688 | 586-705 | 586-830 | 586-831 | 587-018 | 586-277 |
| VENDOR P/N | 7400 | 7420 | 7474 | 7402 | 74H51 | 7404 | 7475 | 7495 | 7482 | 74H04 | 7486 | 74S00 | 74S04 | 74S10 | 74S02 |
| VOLT. PIN | +5V(14) | +5V(14) | +5V(14) | +5V(14) | +5V(14) | +5V(14) | +5V(6) | +5V(14) | +5V(4) | +5V(14) | +5V(14) | +5V(14) | +5V(14) | +5V(14) | +5V(14) |
| GND. PIN | 7 | 7 | 7 | 7 | 7 | 7 | 12 | 7 | 11 | 7 | 7 | 7 | 7 | 7 | 7 |
| REF. DES. | U21 | U11,46,65 | U35,41 | U3,4,9 | U61 | U51,52,59,60,67,68 | U55,63 | U39 | U2,6,70 | U7,15,17,25,29,31 | U26 | U16,30 | U1 | U28 | U19,20,36,40,54,62 |
| AMPEX P/N | 587-710 | 586-450 | 587-495 | 587-007 | 589-127 | 587-040 | 587-051 | 587-285 | 587-704 | 587-139 | 587-747 | 587-205 | 589-129 | 586-700 | 586-600 |
| VENDOR P/N | 74S114 | 74164 | 74283 | 9305 | 9338 | 93410 | 7425 | 10125 | 10116 | 10131 | 10107 | 10102 | CA3102 | 74H74 | 74193 |
| VOLT. PIN | +5V(14) | +5V(14) | +5V(16) | +5V(14) | +5V(16) | +5V(16) | +5V(14) | +5V(9) -5.2V(8) | -5.2V(8) | -5.2V(8) | -5.2V(8) | -5.2V(8) | | +5V(14) | +5V(16) |
| GND. PIN | 7 | 7 | 8 | 7 | 8 | 8 | 7 | 16 | 1,16 | 1,16 | 1,16 | 1,16 | | 7 | 8 |
INTEGRATED CIRCUIT LIST
FIG_19D

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 4, lines 49-52:

FIGS. 8A and 8B together comprise [a] block diagrams illustrating the signal system for the apparatus of the present invention, including control interconnections between the various blocks;

Column 4, lines 56-62:

FIG. 9 is a functional block diagram of the video input circuitry (substantially similar to the reference input circuitry) which is a portion of the signal system shown in FIG. [9A] *8A*.

FIG. [10] *10A* is a functional block diagram of the reference logic circuitry which is a portion of the signal system shown in FIG. 8A;

Column 5, insert after line 3:

*FIG. 11C is a timing diagram illustrating the relationships between the signals provided by the logic circuitry of FIGS. 17C and 17D;*

Column 5, lines 23-26:

FIGS. 17A, 17B, 17C and 17D together comprise electrical schematic diagrams of the reference clock generator of the signal system shown in the block [diagrams] *diagram* of FIG. 11A;

Column 45, lines 34-60;

However, as described herein, the present apparatus in which the time base corrector circuitry is used employs (with little modification) highly reliable disc drives that have been specifically designed and manufactured for computer data processing. Unfortunately, the computer disc drives do not maintain the relative head to disc velocity stable enough to avoid the introduction of intolerable bit time displacement errors into the data bit streams when such disc drives are used in the present apparatus to process video data. This is because the disc pack spindle in the drive is not servoed but instead is driven by a common three phase AC motor referenced to a relatively unstable line voltage and the rotational position of its disc pack is not controllable with respect to an external reference. The resulting position errors and bit time displacement errors are particularly detrimental at the high data bit rates, i.e., 10.7 MHz, required to faithfully process broadcast quality video data [withour] *without* reduction in the quality of the video information. Therefore, to take advantage of the mechanical reliability of the existing computer disc drive design, the apparatus described herein is provided with a positional servo for the AC motor and the time base corrector circuitry of the present invention to remove any unacceptable time displacement errors introduced into the data bit streams rather than altering the reliable design of the computer disc drives.

Column 49, line 66 to column 50, line 40:

When data is encoded according to the Miller Square code rules which specified logical 1 bit related transitions are suppressed, if a logical 1 bit related transition has been suppressed, there will be an absence of data transitions for an interval greater than 1½ cycles of 3SC. This is detected by a modulo-4 counter 559 having its clock input coupled to receive $\phi 0$ clock pulses provided by the NAND gate 553b and its reset input to the output of the edge detecting exclusive OR gate 554a. The exclusive OR gate 554a provides a reset pulse to clear the counter 559 each time a transition occurs in the channel encoded data (FIG. 19E-(10)). The output of the modulo-4 counter 559 is coupled to one input of an AND gate 560 which also receives $\phi 0$ clock pulses at its other input. Both inputs are low ½ cycle of 3SC after the modulo-4 counter has counted four $\phi 1$ 3SC clock pulses without being reset, which corresponds to an absence of data transitions for an interval of 2½ cycles of 3SC (FIG. 19E-(11), (12) and (13)). Ordinarily, this signifies that a logical 1 bit has [bit] *been* suppressed in the channel encoded data. To make certain that no errors have been introduced to the data stream, a following NAND gate 561 examines an output of the latch 558 at the time when AND gate 560 provides the low state signal representing a suppressed logical 1 bit. If the examined output of the latch 558 is also low, it verifies that a logical 1 bit has been suppressed and pulse is output on line 562 (FIG. 19E-(14)) by the NAND gate 561 that is wired ORed with the output of latch 557. Line (14) of FIG. 19E represents the state of NAND gate 561 as if it was not wire ORed with the output of latch 557. The second pulse 563 (FIG. 19E-(14)) provided by the NAND gate 561 occurs at the time of and is latched into the latch 558 by the $\phi 1$ 3SC clock. This prevents the output of the latch 558 from being returned low, thereby, inserting the suppressed logical 1 bit into the decoded NRZ-L data (FIG. 19E-(15)) appearing on line 566. In the data track bit line, the decoded data is coupled by line 566 to the computer control system 92. The decoded data clock provided by the flip flop 534a on line 574 and the line 1D or sync word from the first shift register and sync word detector circuitry 572 are also coupled to the computer control system 92.

The drawing figures have been changed as follows:

Original figures have been renumbered with new figure number as follows:

| Original Figure Number | New Figure Number |
|---|---|
| 9A | 8A |
| 9B | 8B |
| 9C | 8C |
| 10 | 9 |
| 11A | 10A |
| 11B | 10B |
| 12A | 11A |
| 12B | 11B |
| 12C | 11C |
| 14 | 12 |
| 15A | 13A |
| 15B | 13B |
| 15C | 13C |
| 16 | 14 |

-continued

| Original Figure Number | New Figure Number |
|---|---|
| 42A | 15A |
| 42B | 15B |
| 42C | 15C |
| 42D | 15D |
| 43A | 16A |
| 43B | 16B |
| 43C | 16C |
| 43D | 16D |
| 44A | 17A |
| 44B | 17B |
| 44C | 17C |
| 44D | 17D |
| 45A | 18A |
| 45B | 18B |
| 45C | 18C |
| 45D | 18D |
| 45E | 18E |
| 46A | 19A |
| 46B | 19B |
| 46C | 19C |
| 46D | 19D |
| 46E | 19E |

The following changes have been made in either the original or renumbered figures.

Figure 3:
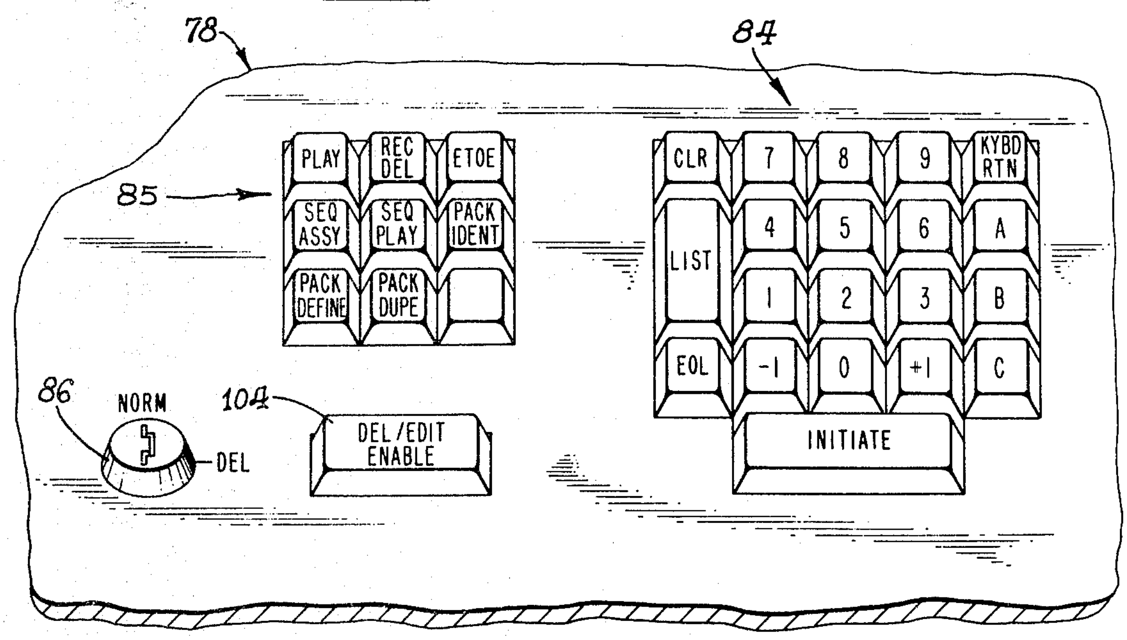
FIG. 3 is an enlarged top view of a portion of the internal access station keyboard shown in FIG. 1 particularly illustrating the various keys and bars that an operator uses during operation.

In original FIG. 3, the number "83" has been added.

Original FIG. 8 has been cancelled.

In new FIG. 8A (original FIG. 9A), "9B" (two occurrences) has been changed to "8B".

In new FIG. 8B (original FIG. 9B), "9A" has been changed to "8A".

In new FIG. 15A (original FIG. 42A), "42B" has been changed to "15B".

In new FIG. 15B (original FIG. 42B), "42A" has been changed to "15A", and "42C" has been changed to "15C".

In new FIG. 15C (original FIG. 42C), "42B" has been changed to "15B" and "42D" has been changed to "15D".

In new FIG. 15D (original FIG. 42D), "42C" has been changed to "15C".

In new FIG. 16A (original FIG. 43A), "43B" has been changed to "16B".

In new FIG. 16B (original FIG. 43B), "43A" has been changed to "16A", and "43C" has been changed to "16C".

Figure 16C:
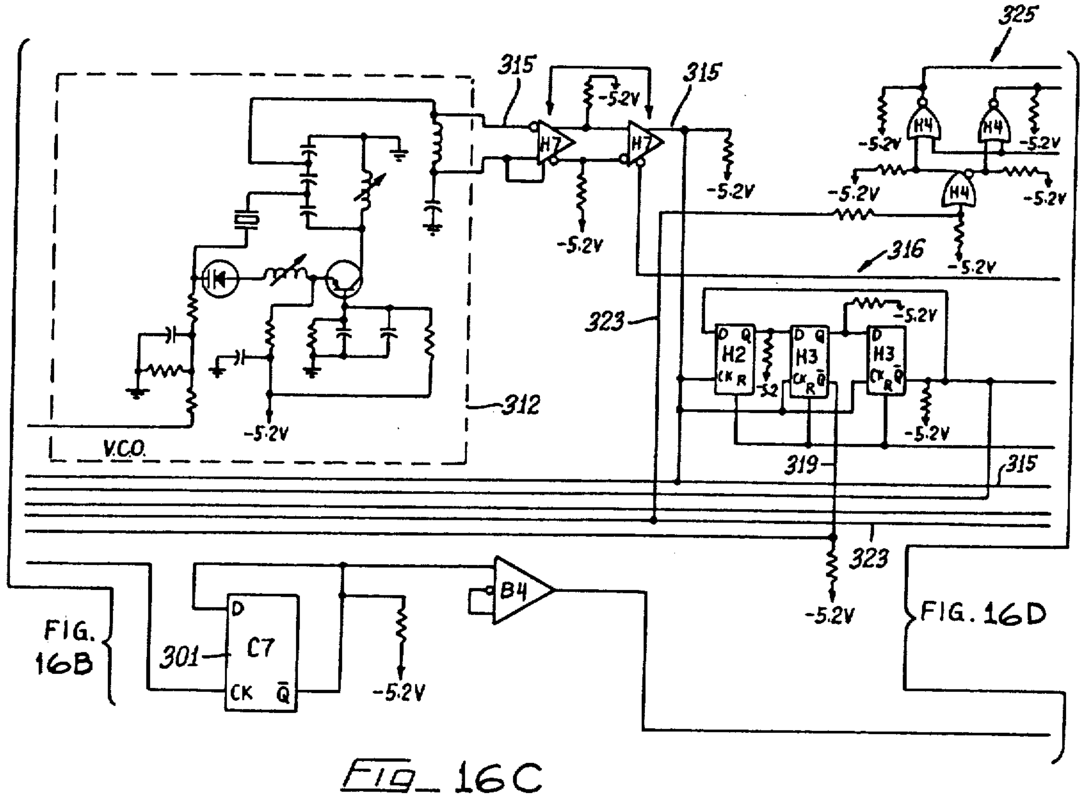

In new FIG. 16C (original FIG. 43C), "43B" has been changed to "16B" and "43D" has been changed to "16D".

In new FIG. 16D (original FIG. 43D), "43C" has been changed to "16C".

Figure 44B:
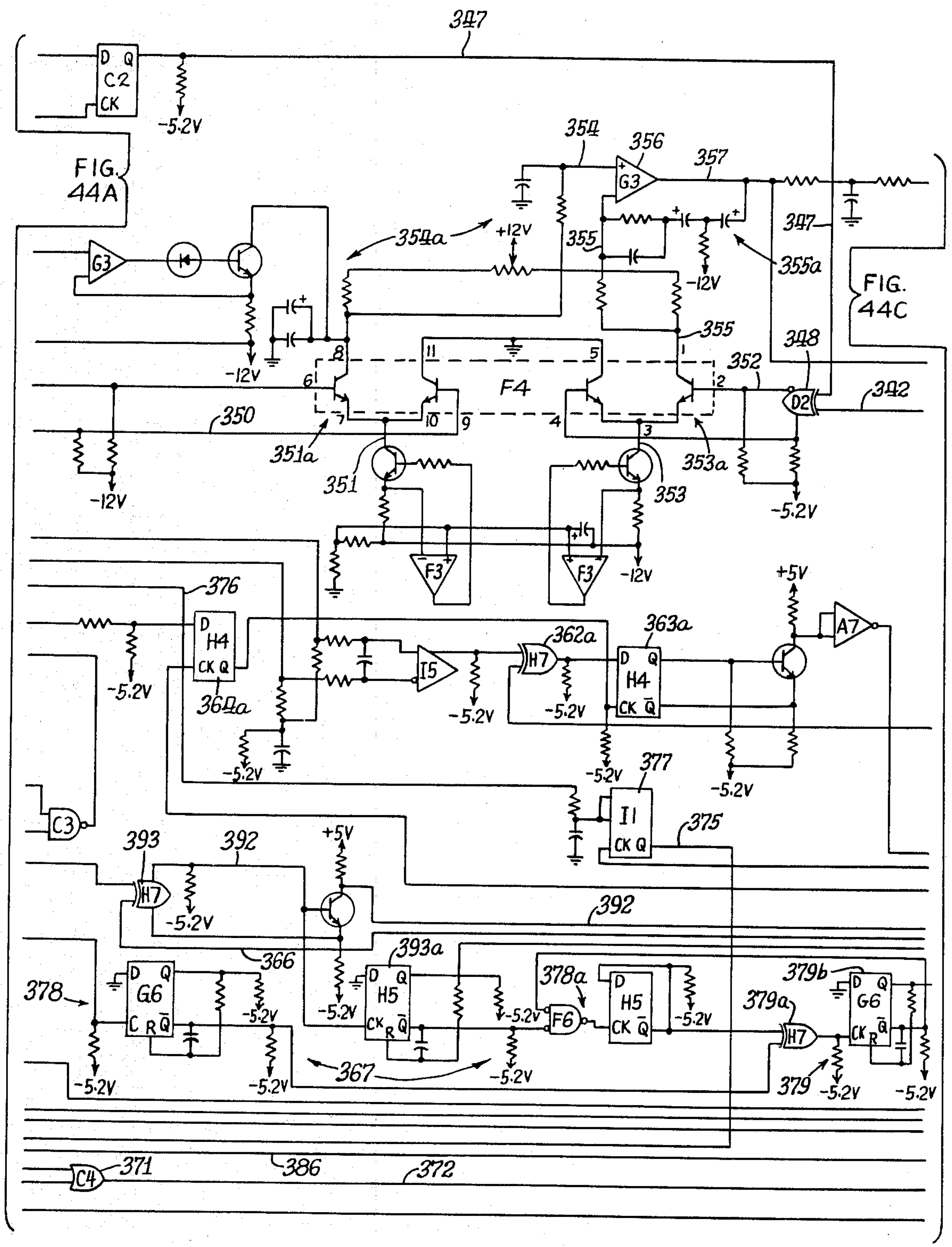

In new FIG. 17A (original FIG. 44A), "44B" has been changed to "17B".

In new FIG. 17B (original FIG. 44B), "44A" has been changed to "17A" and "44C" has been changed to "17C".

Figure 44C:
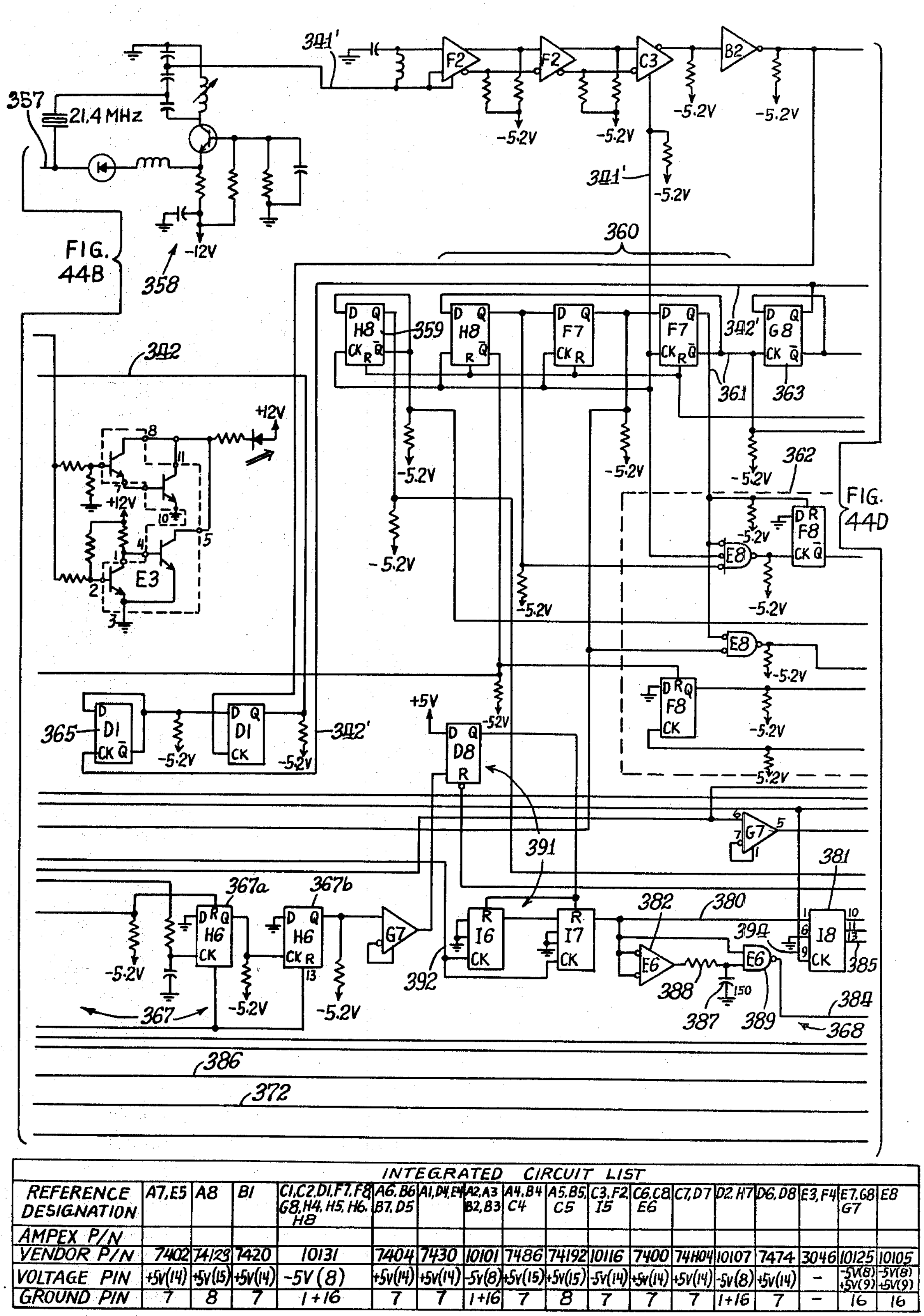
Figure 44C:
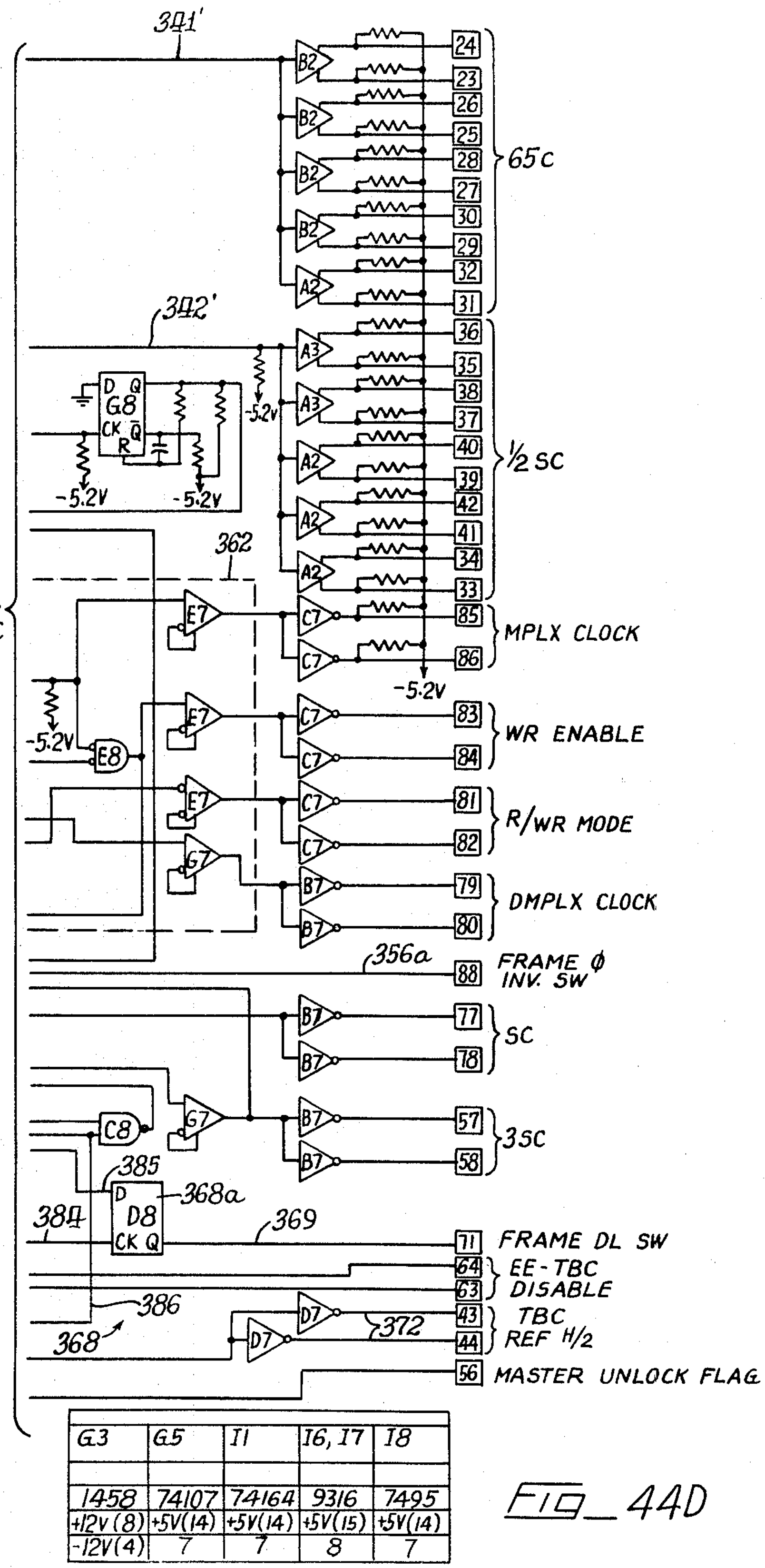

In new FIG. 17C (original FIG. 44C), "44B" has been changed to "17B" and "44D" has been changed to "17D".

In new FIG. 17D (original FIG. 44D), "44C" has been changed to "17C".

Figure 45B:
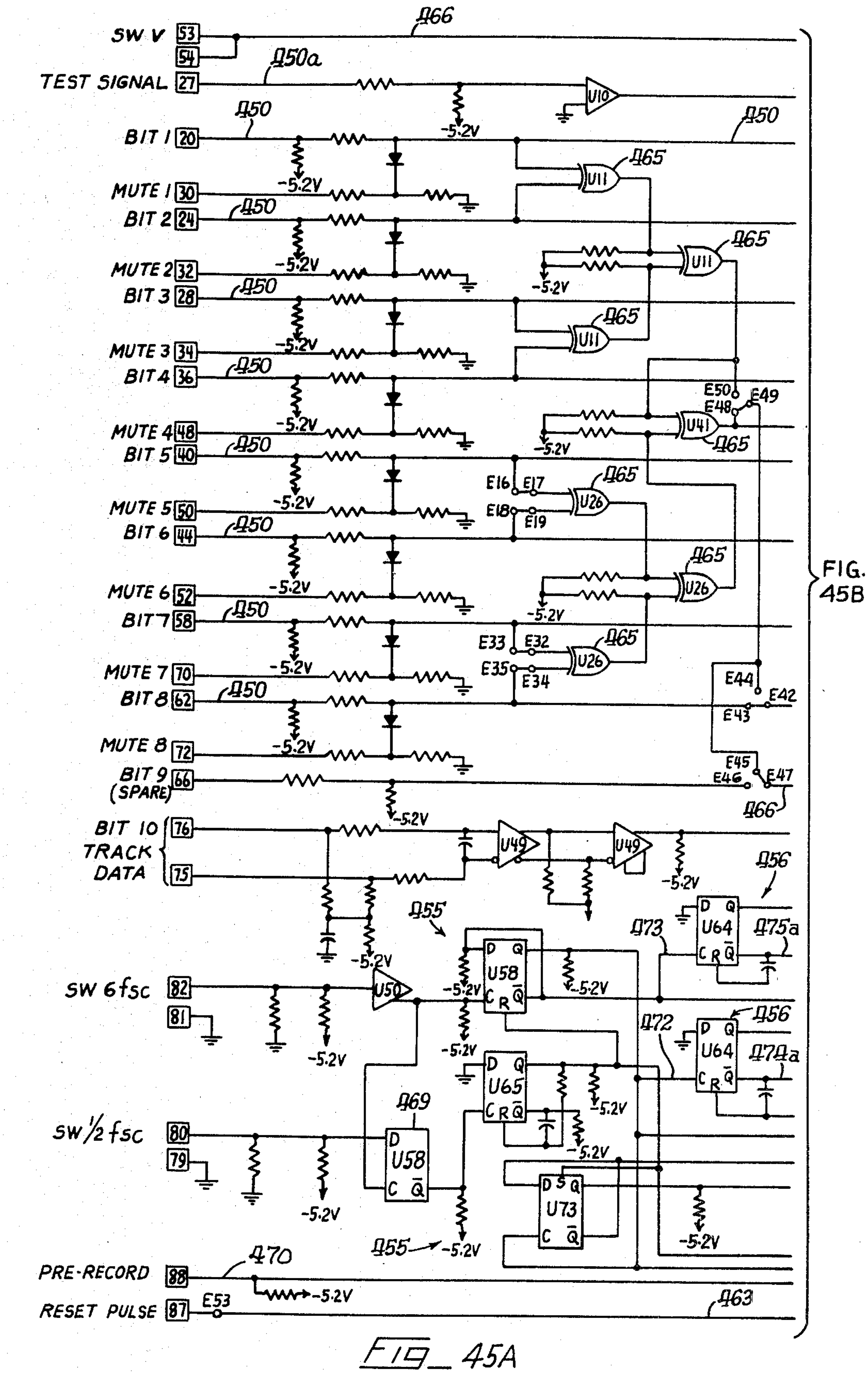

In new FIG. 18A (original FIG. 45A), "45B" has been changed to "18B".

In new FIG. 18B (original FIG. 45B), "45A" has been changed to "18A" and "45C" has been changed to "18C".

In new FIG. 18C (original FIG. 45C), "45B" has been changed to "18B" and "45D" has been changed to "18D".

In new FIG. 18D (original FIG. 45D), "45C" has been changed to "18C".

Figures 46A, 46B:
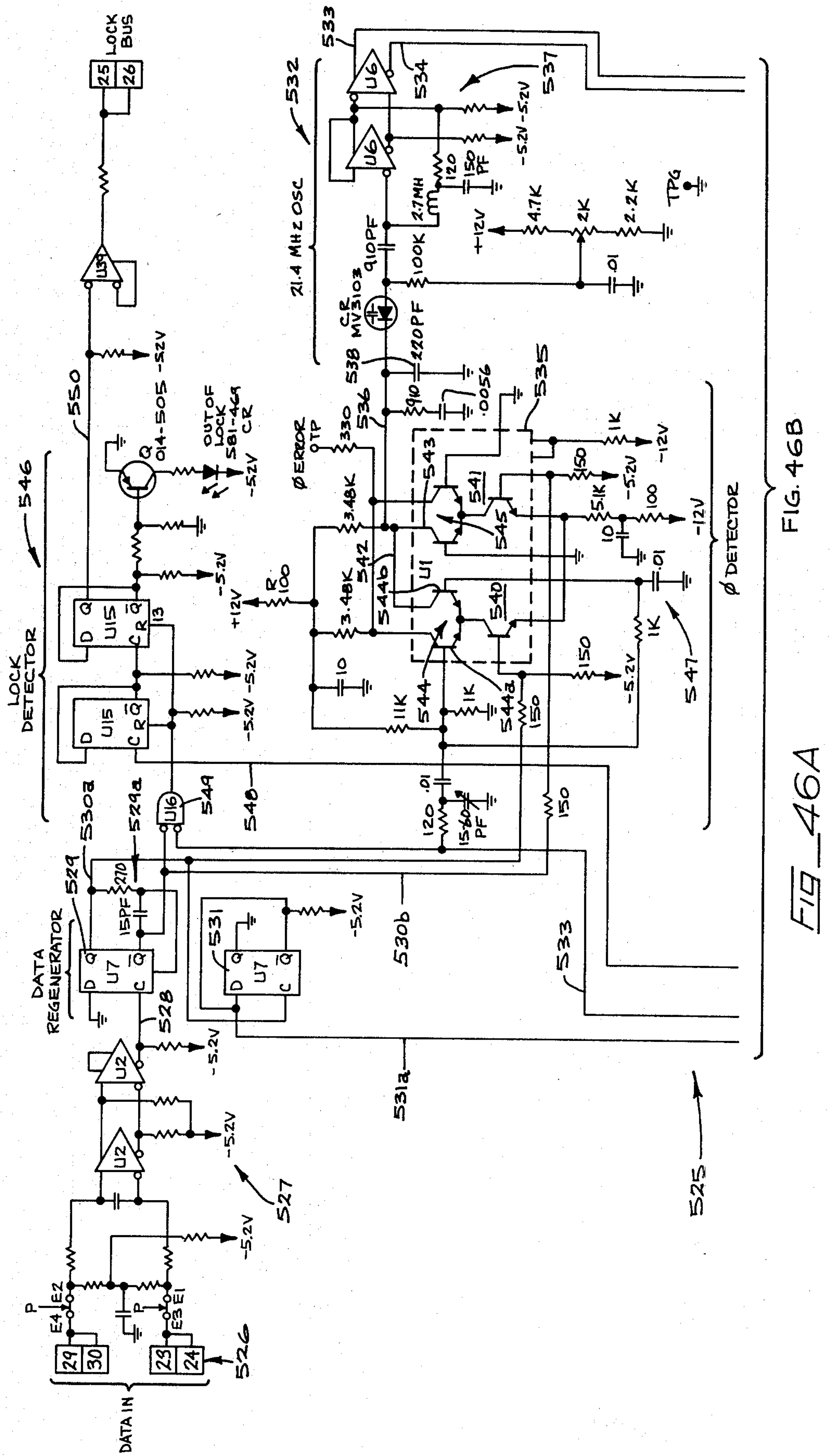
Figure 46B:
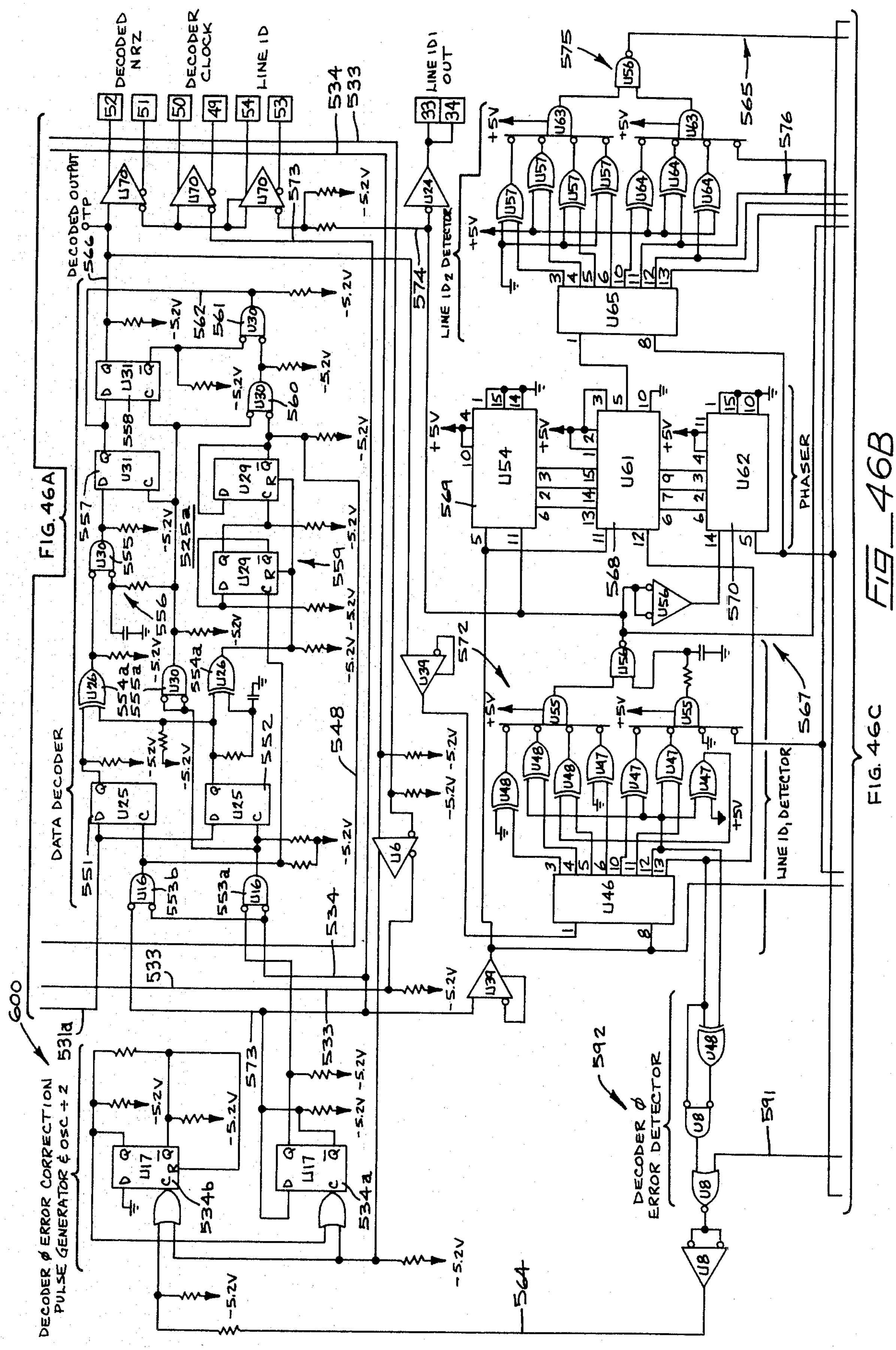
Figure 47B:
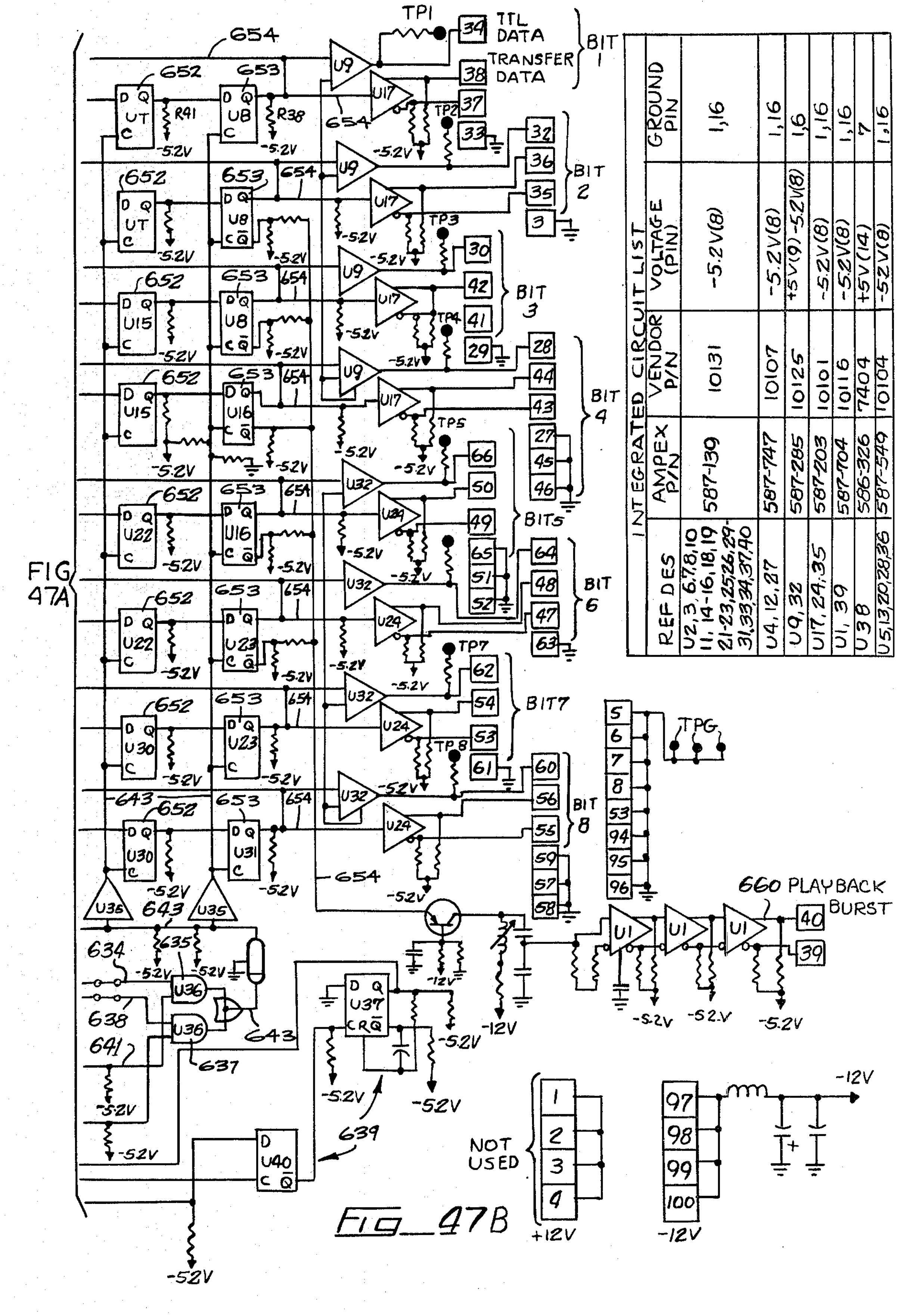
Figure 51A:
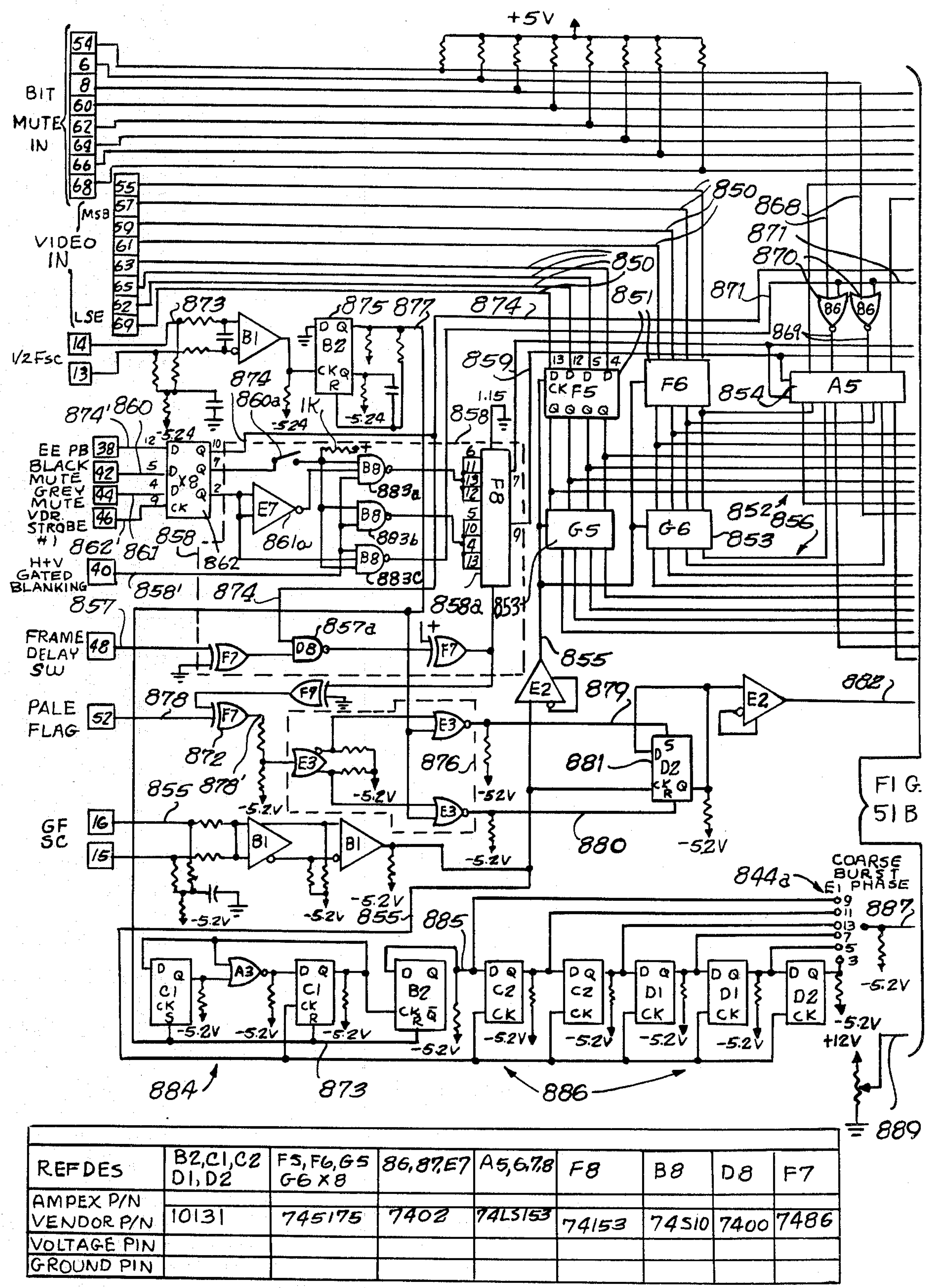
Figure 52A:
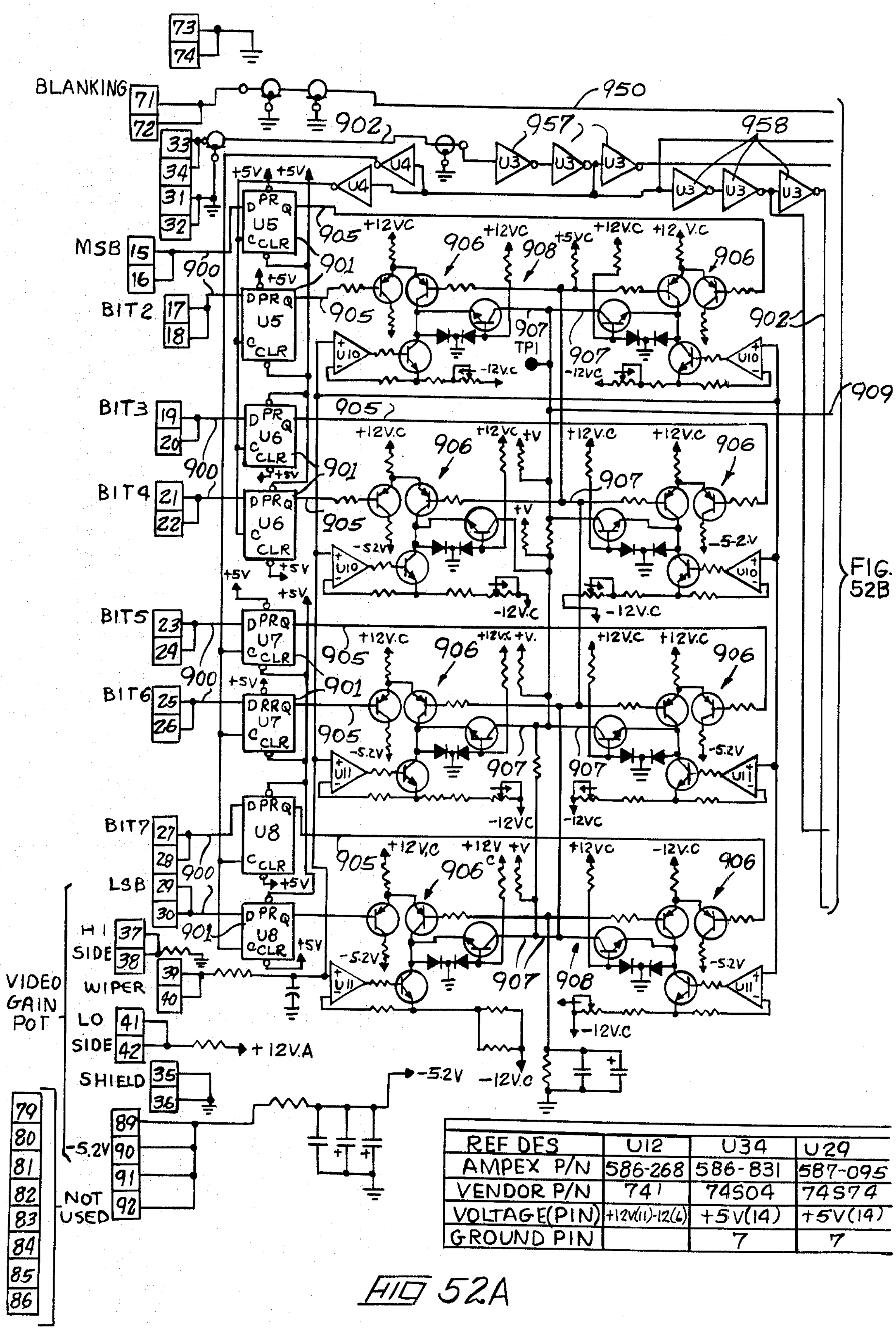
Figure 55B:
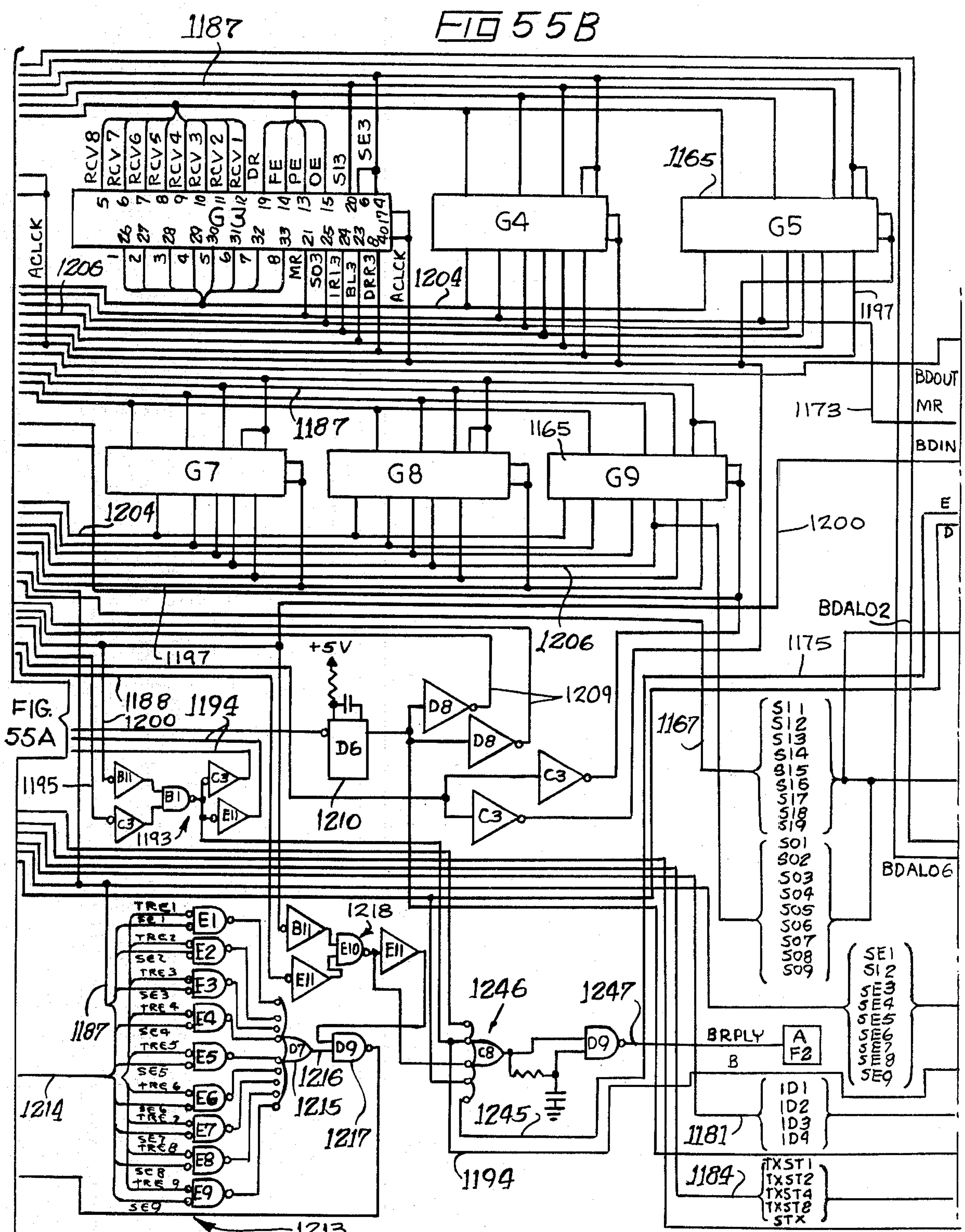
Figure 58B:
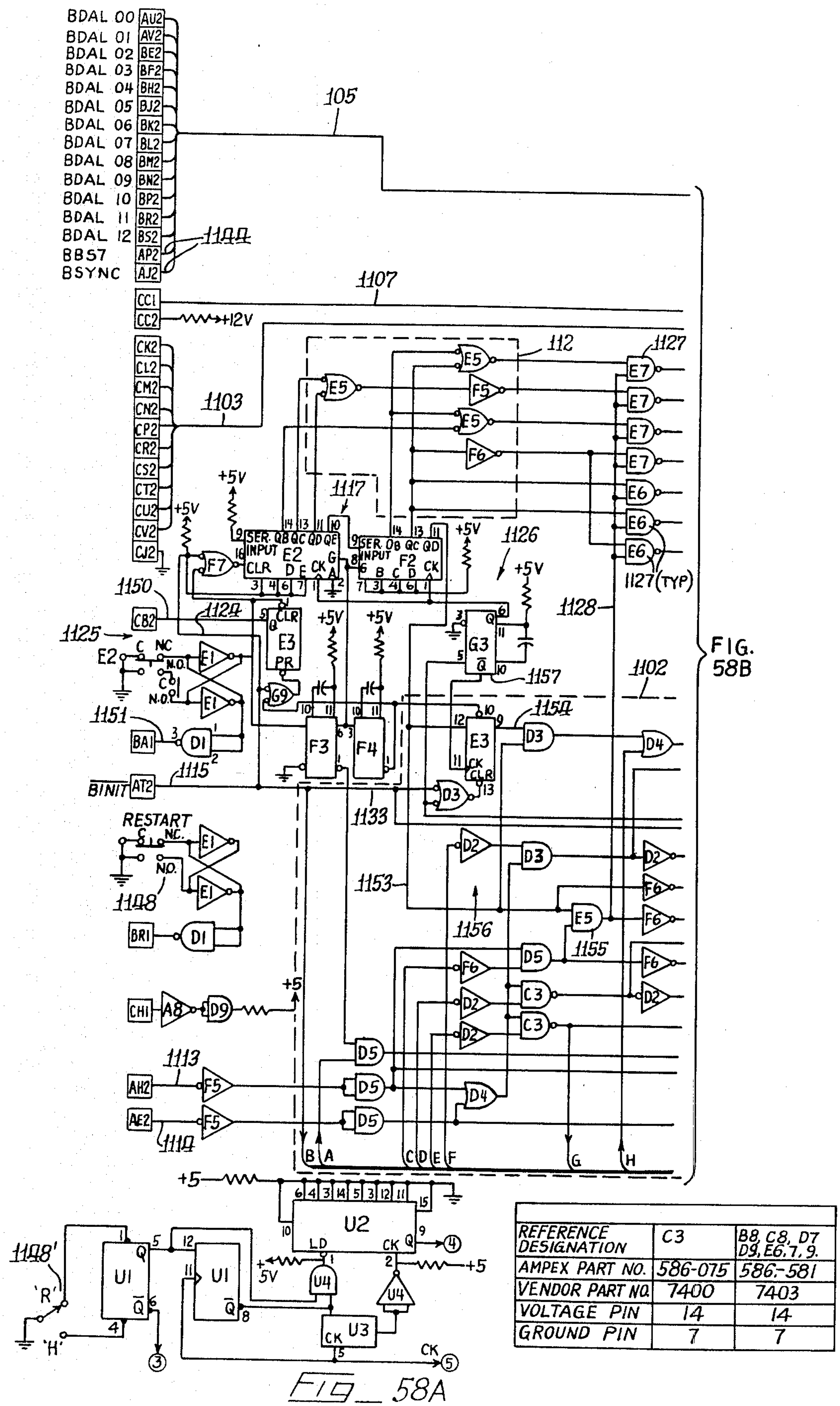
Figure 63A:
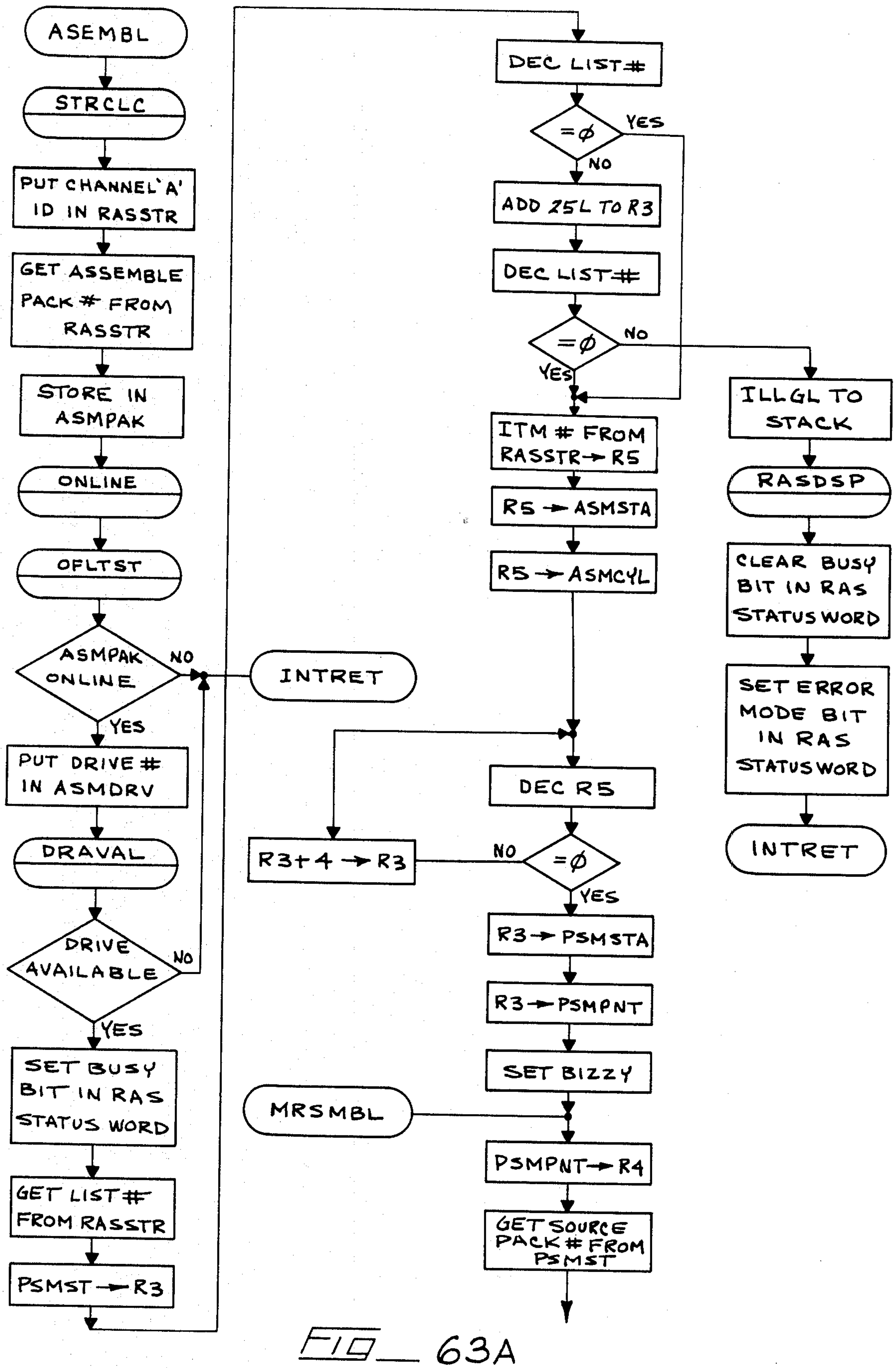
Figure 63B:
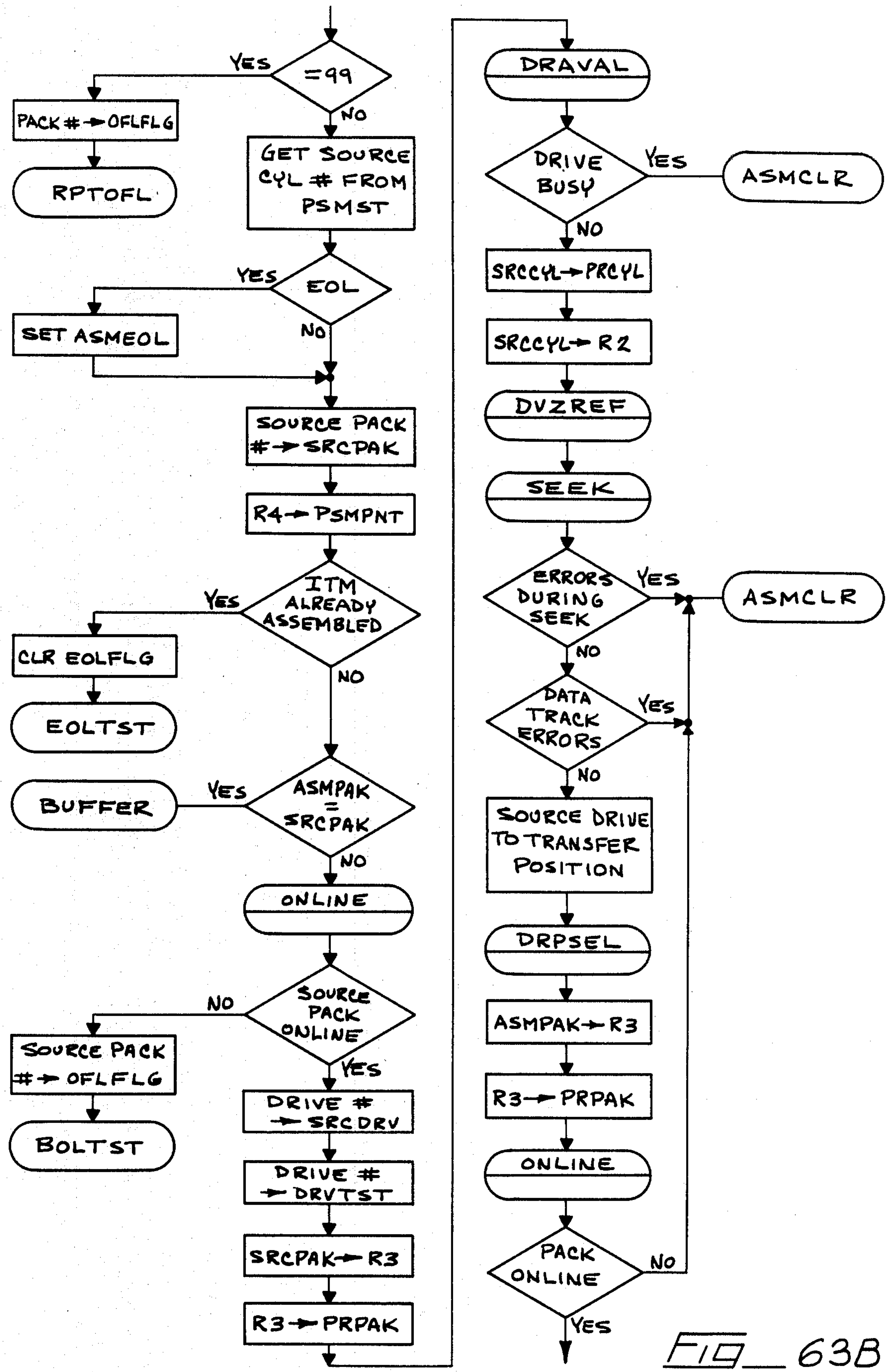
Figure 63D:
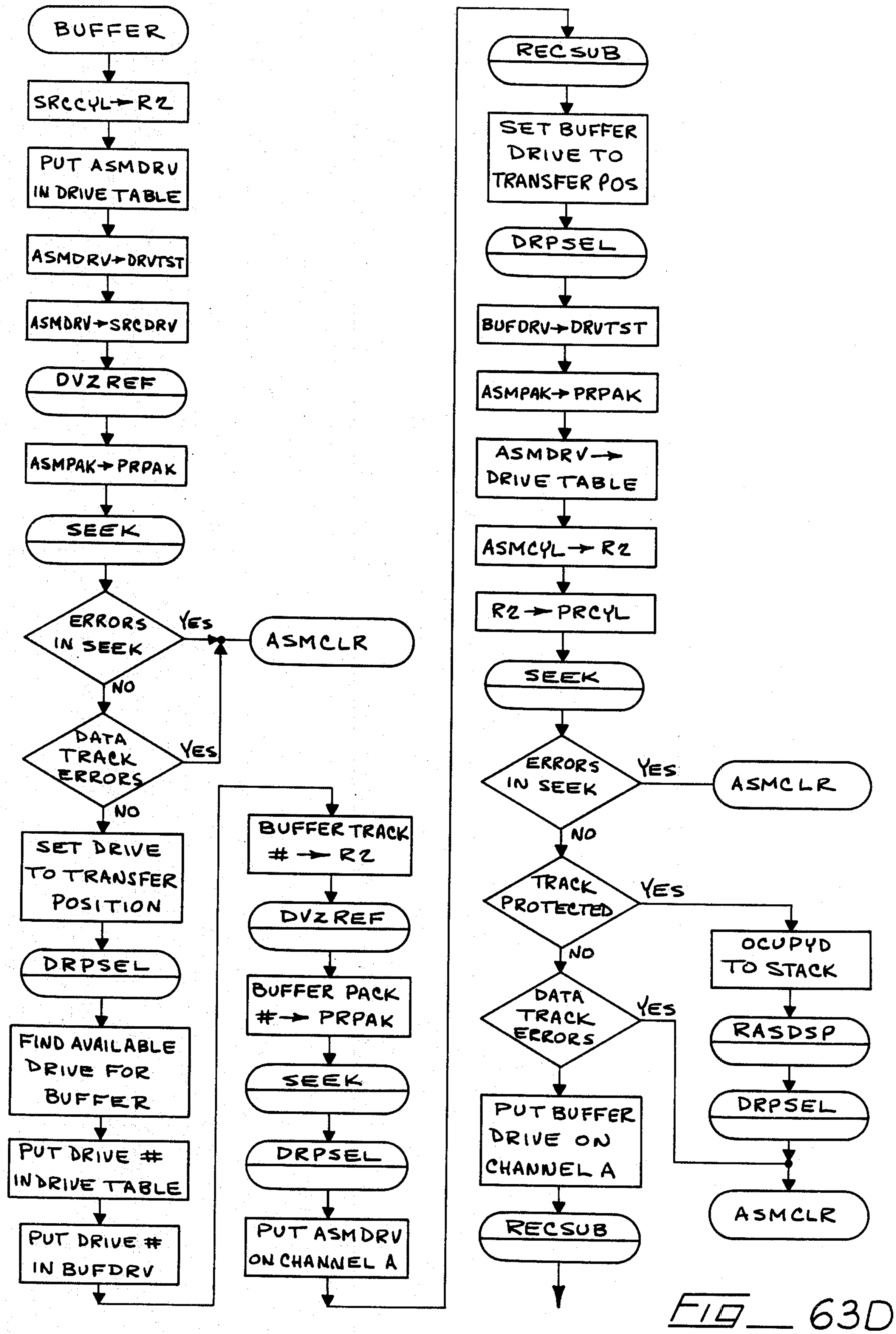
Figure 63H:
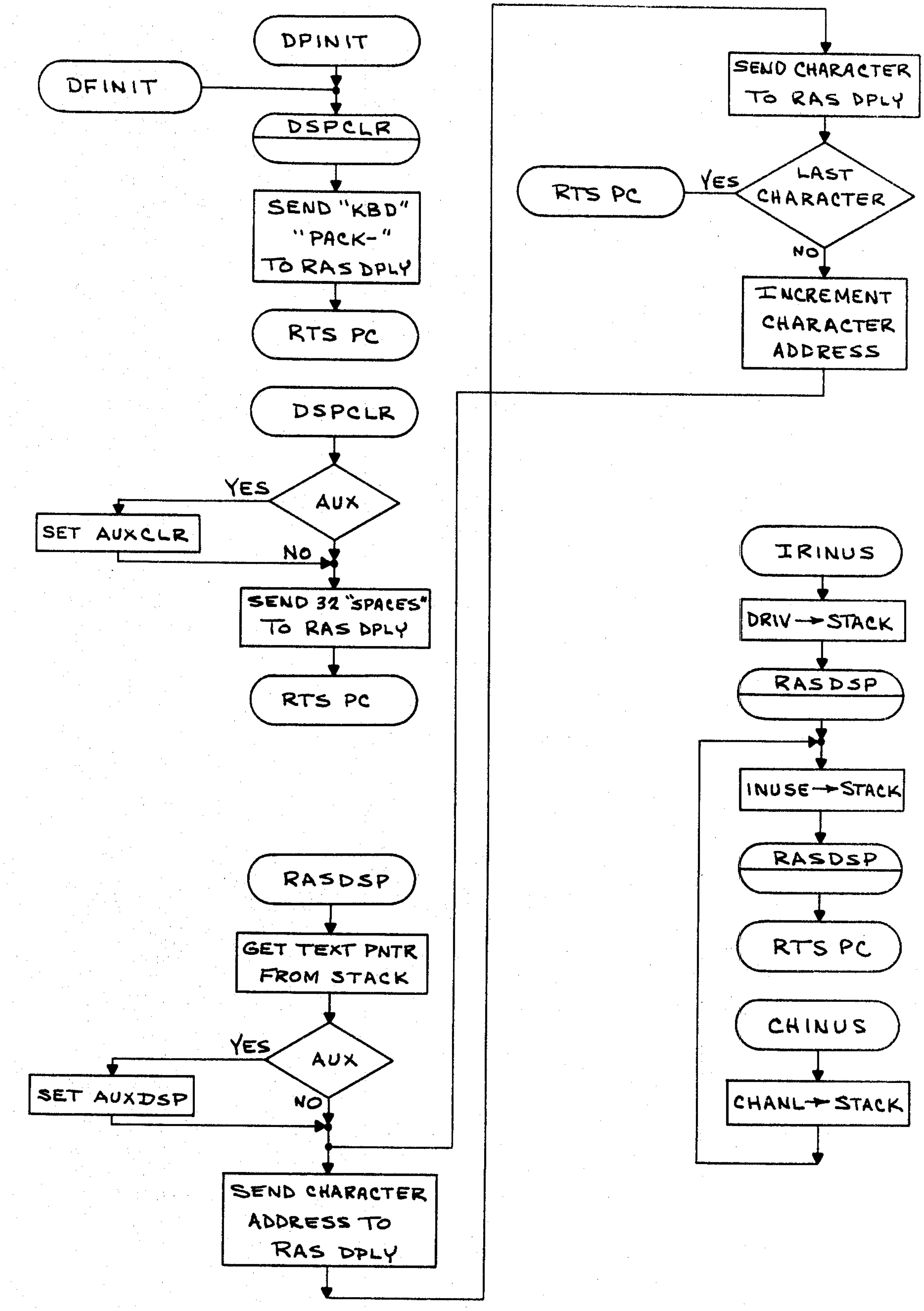
Figure 63K:
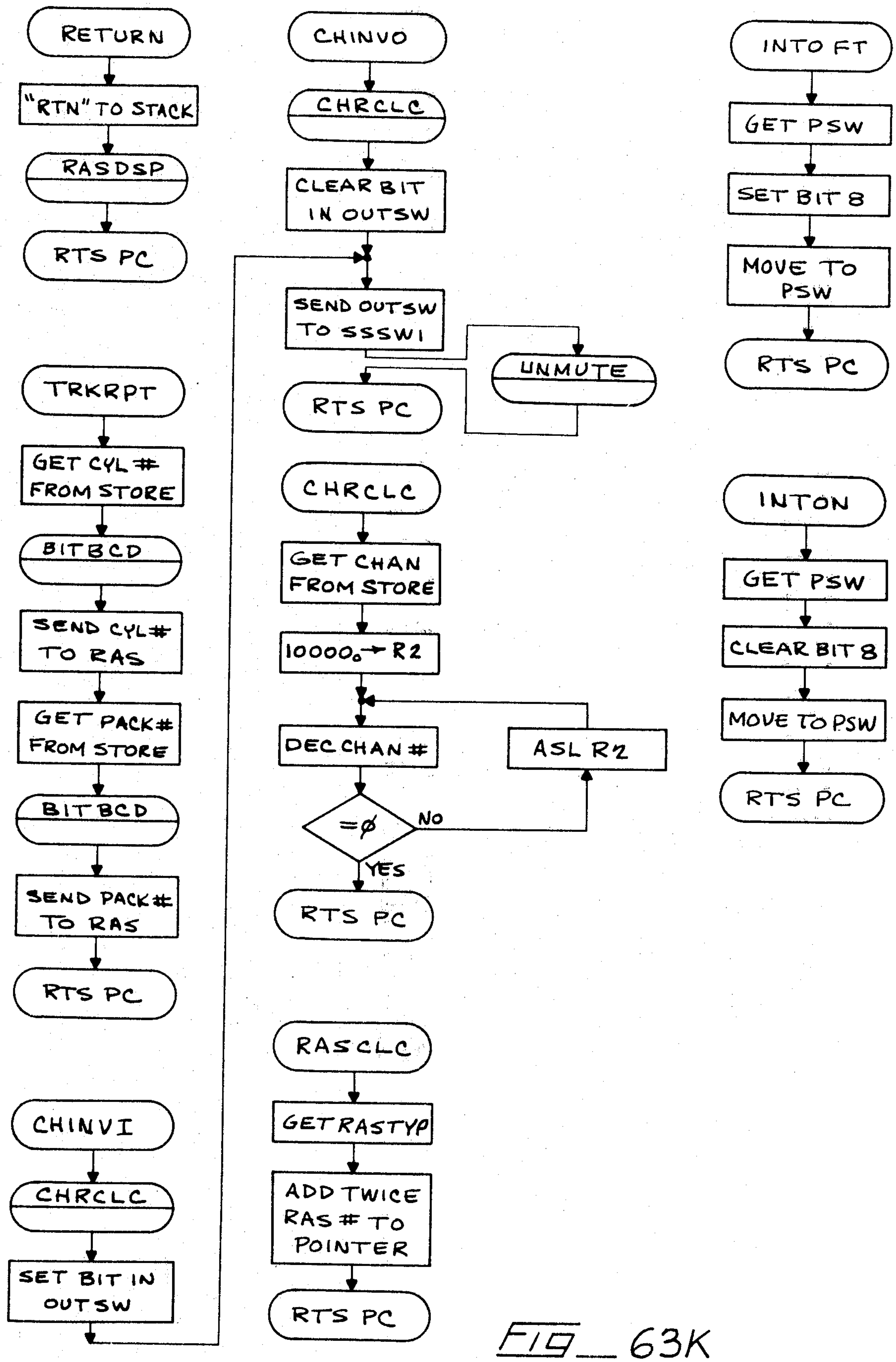
Figure 63M:
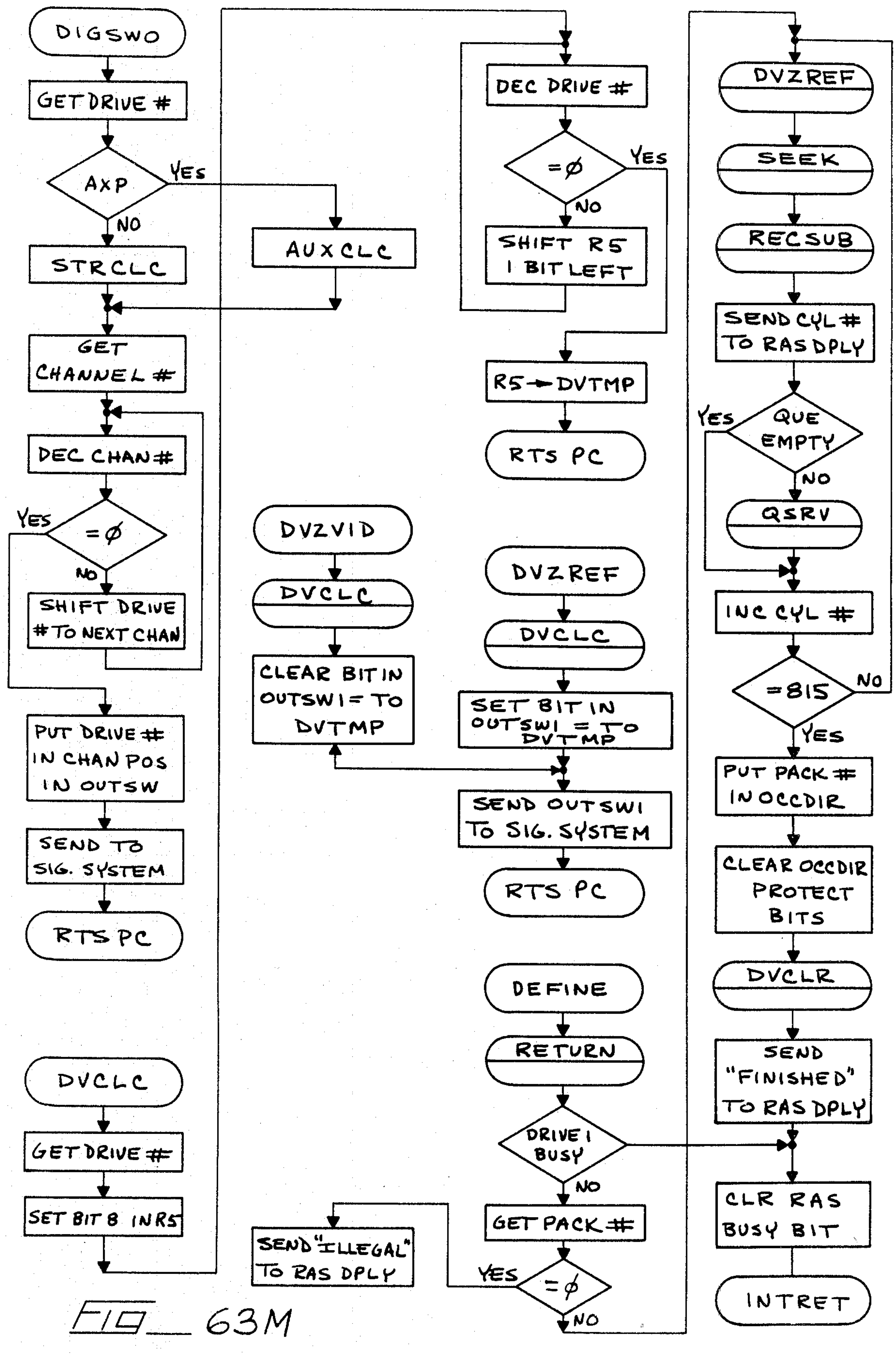
Figure 63N:
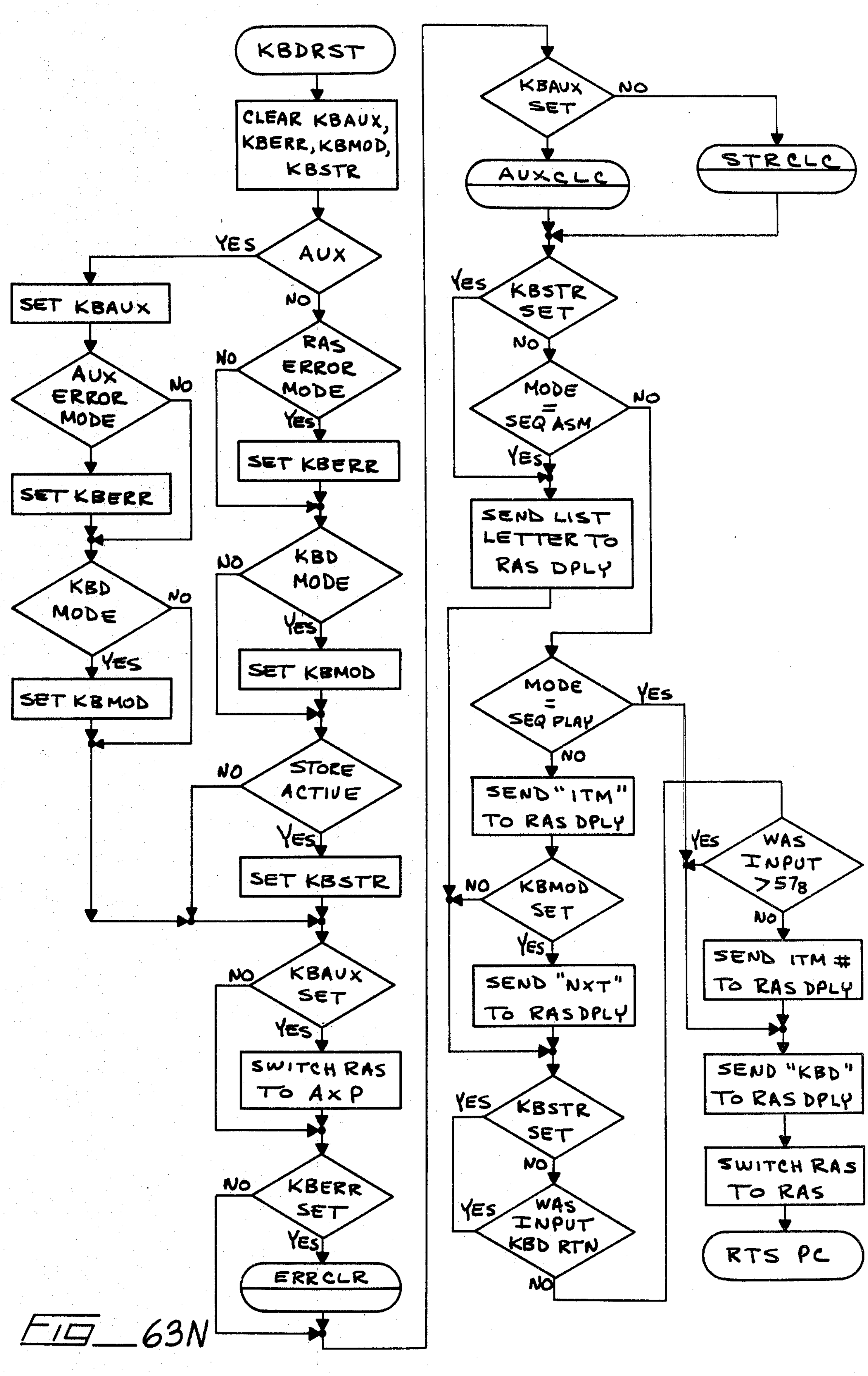
Figure 63S:
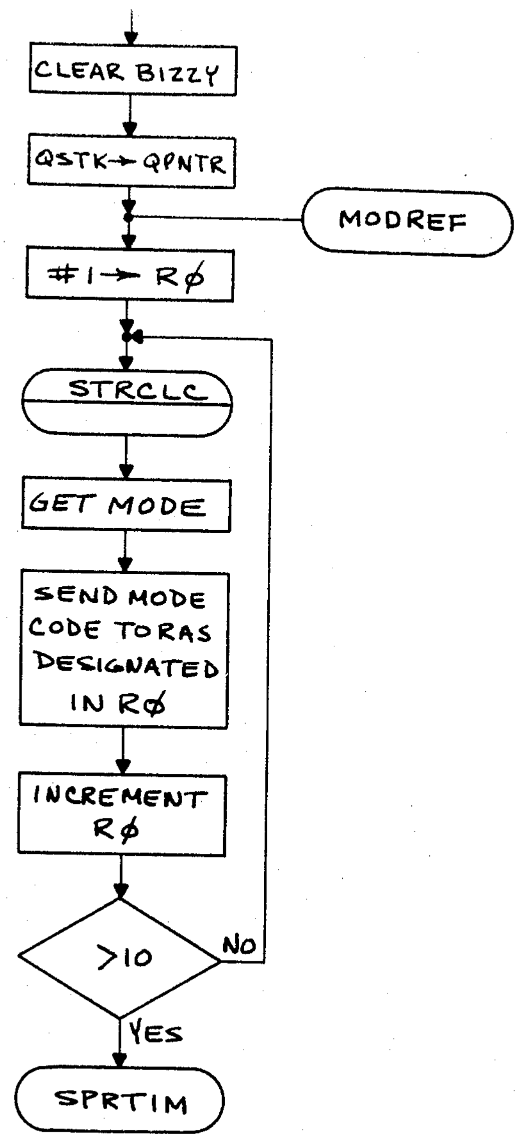
Figure 63G:
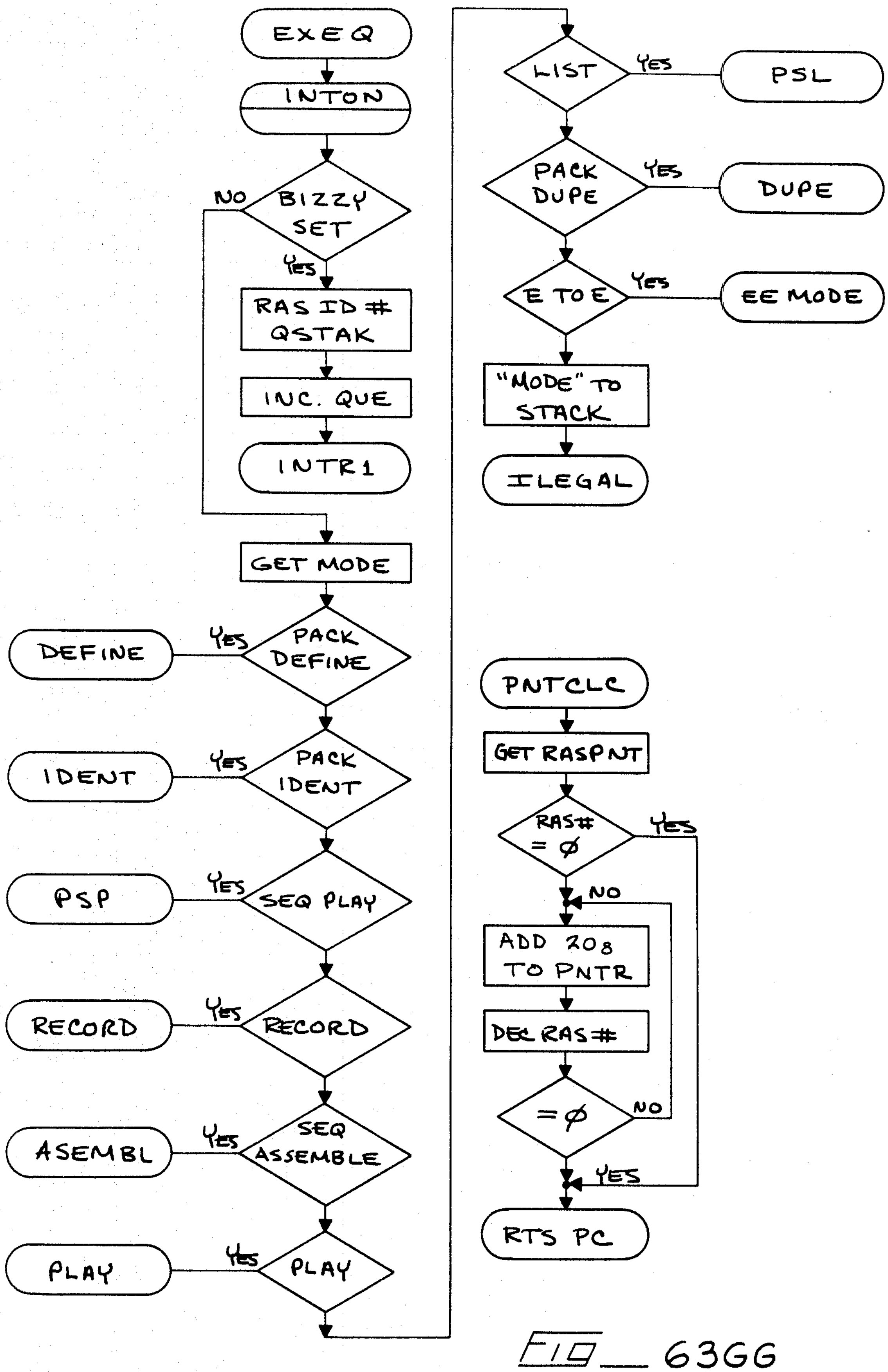
Figure 63H:
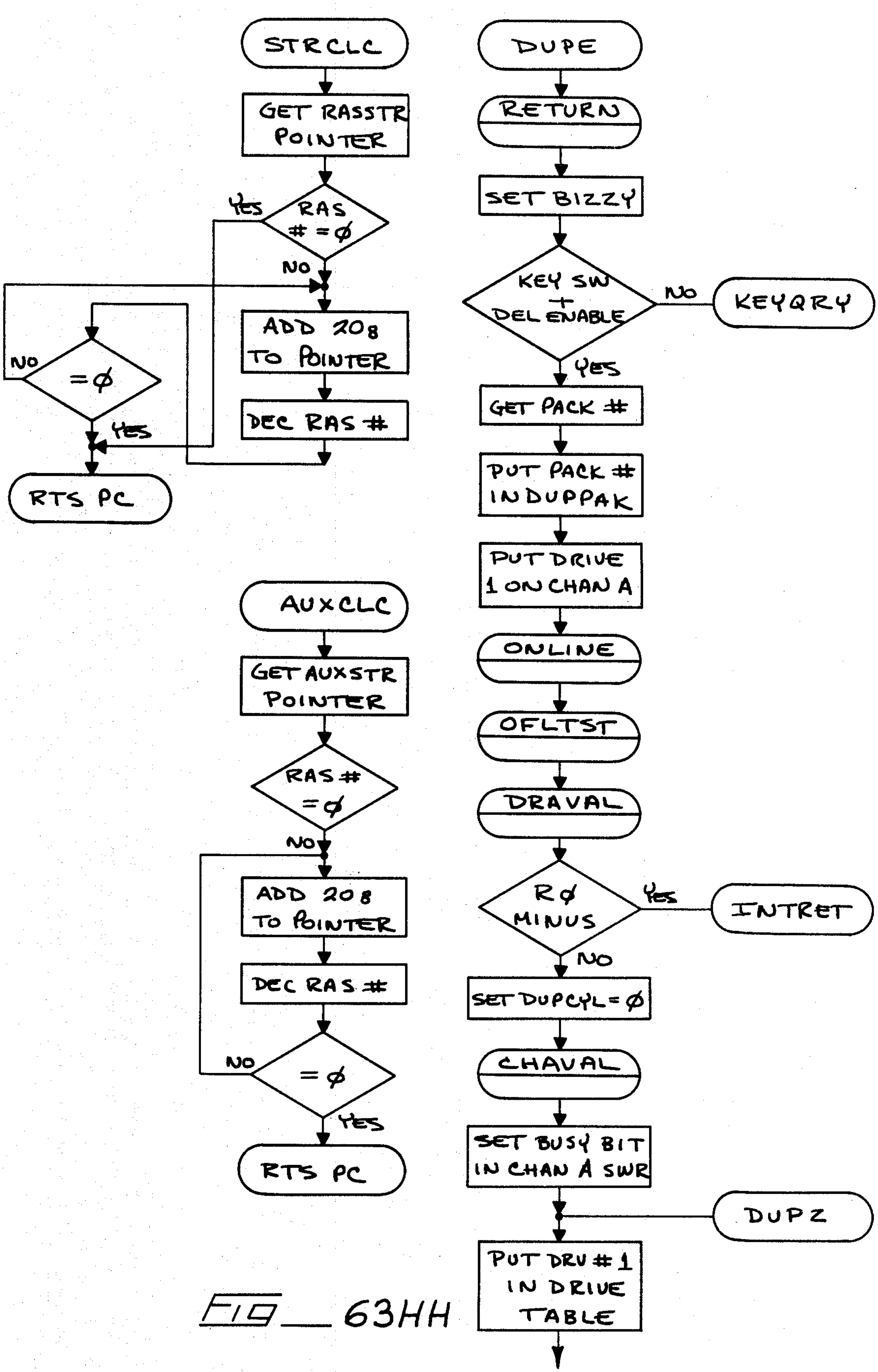
Figure 63I:
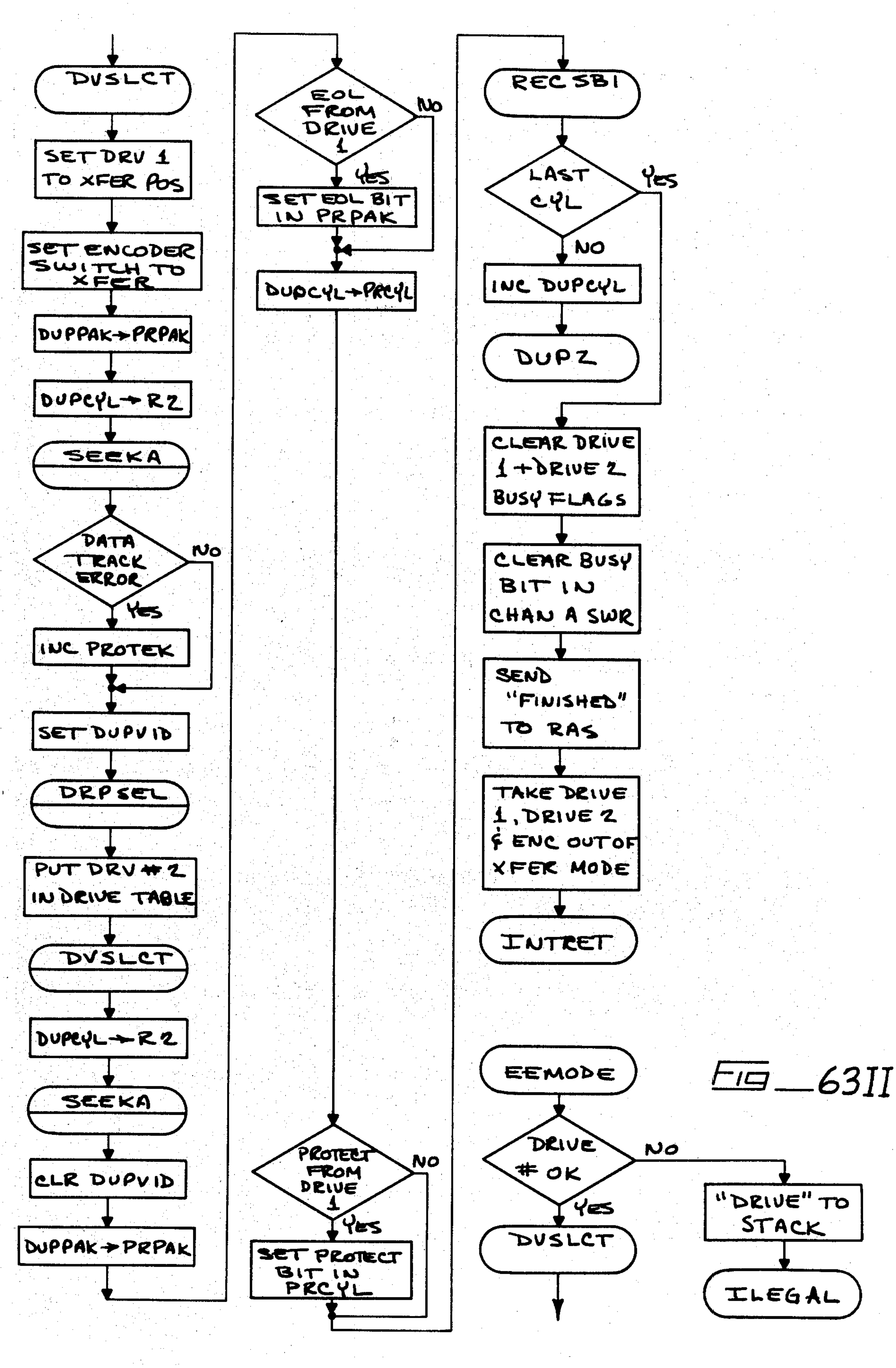
Figure 63J:
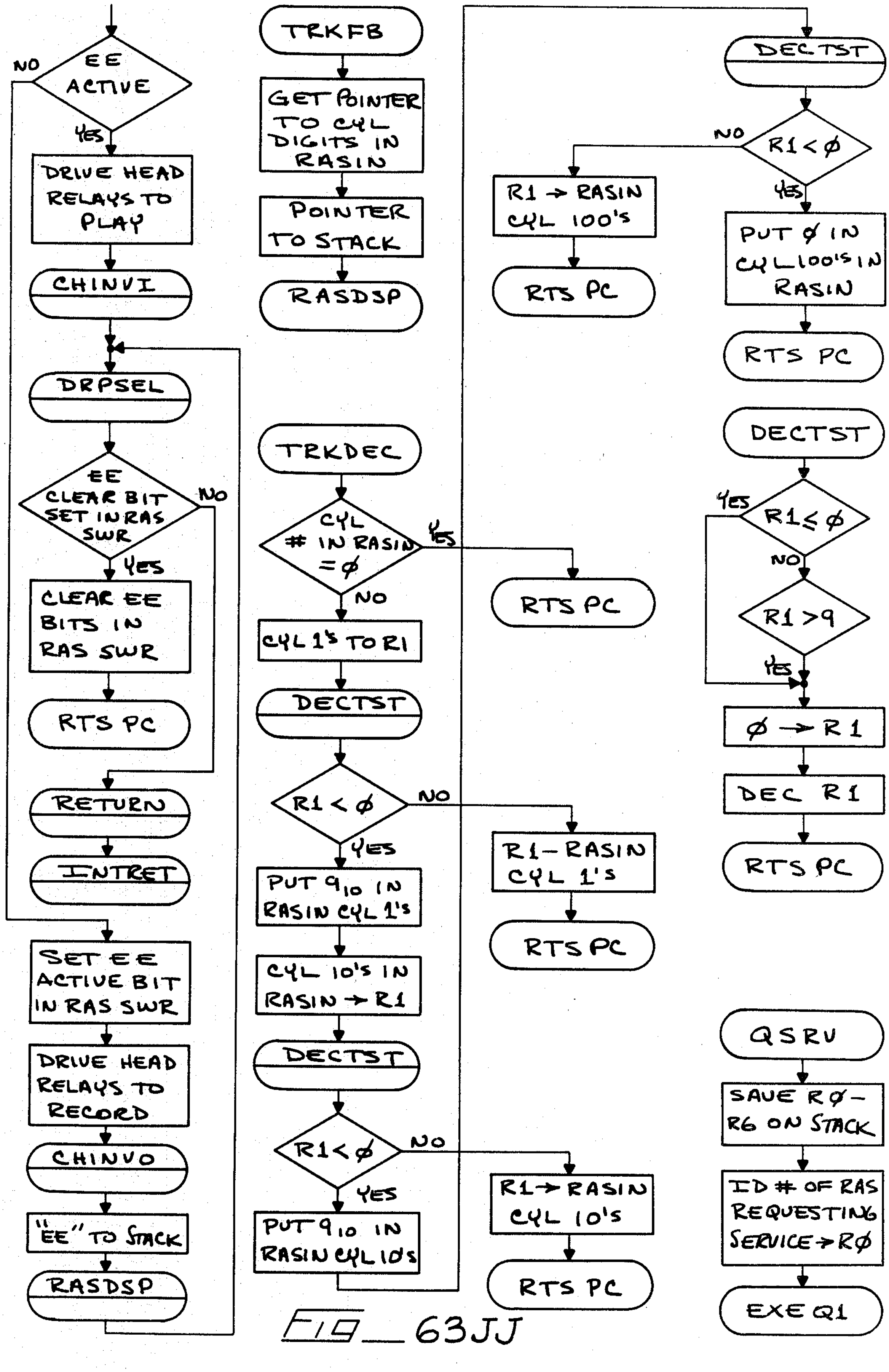
Figure 63M:
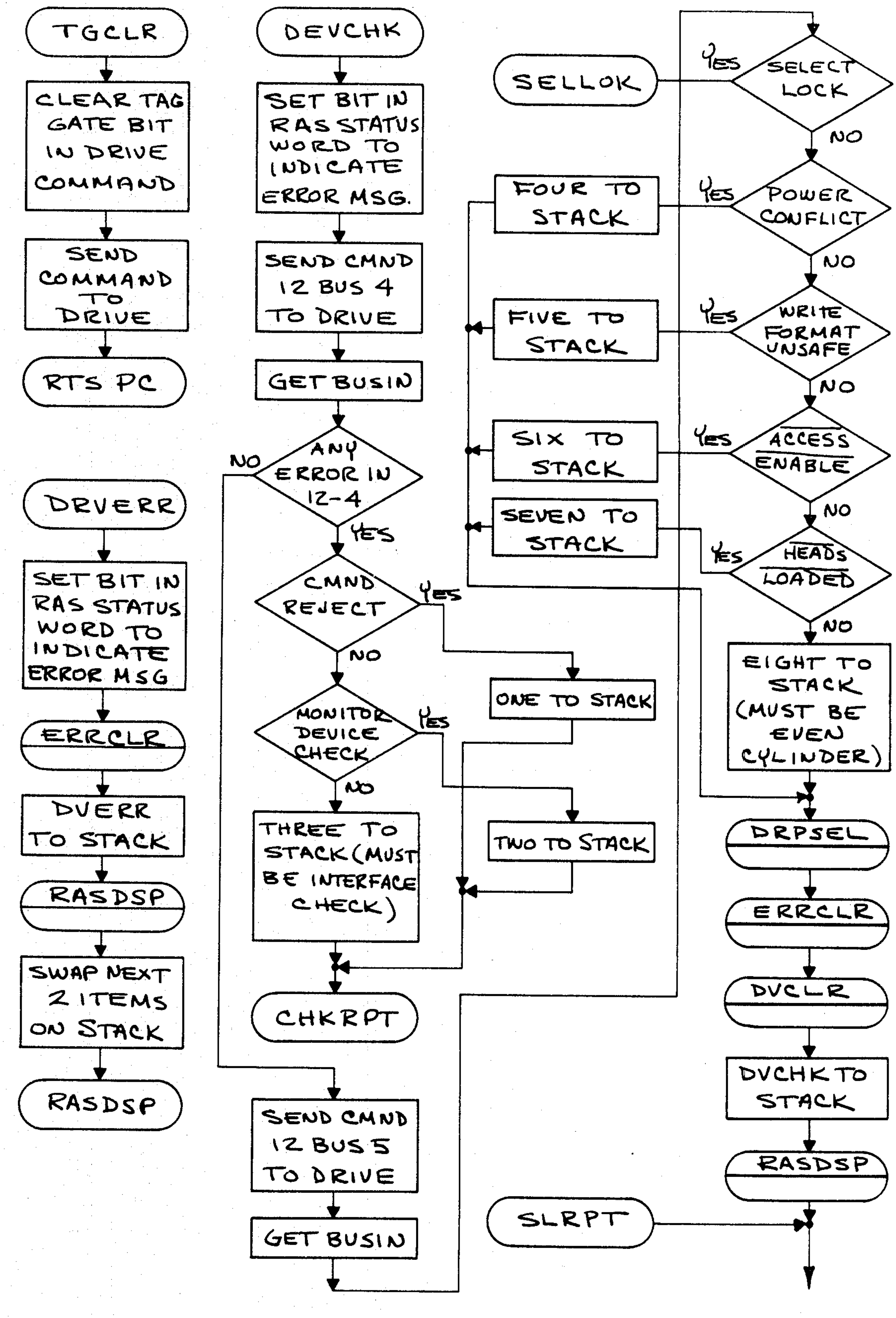
Figure 1:
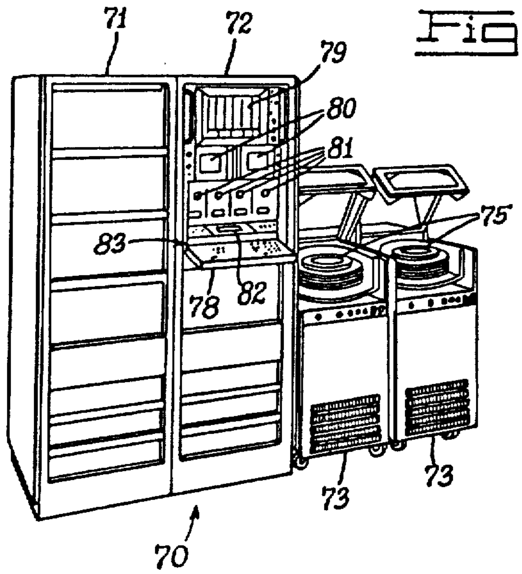
Figure 2:
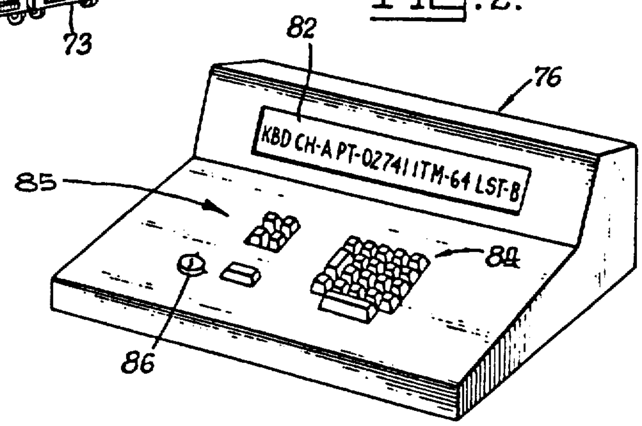
Figure 3:
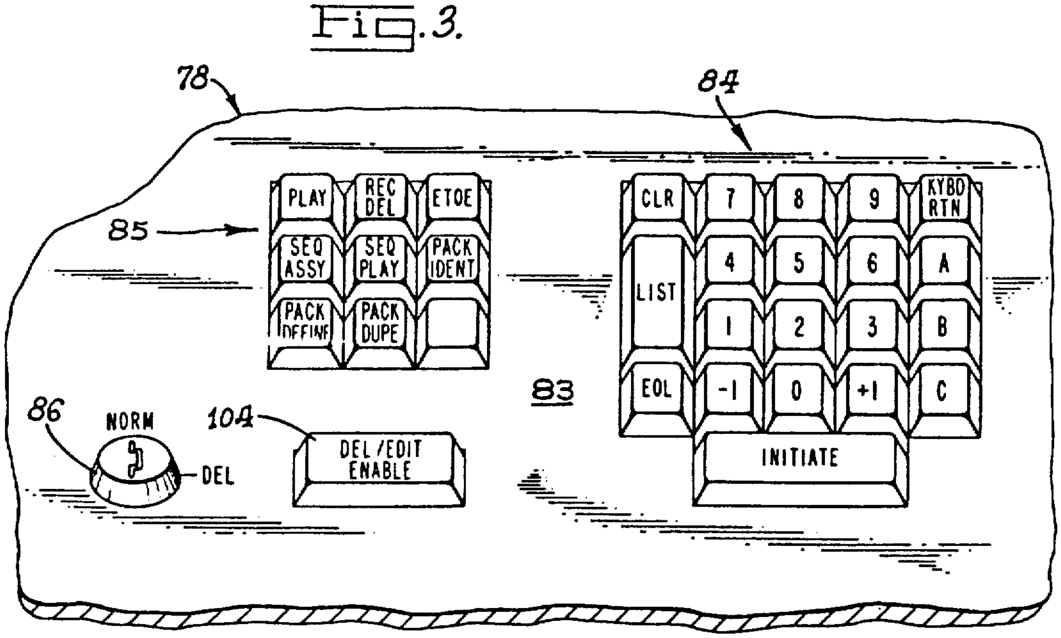

In new FIG. 19A (original FIG. 46A), "46B" has been changed to "19B".

In new FIG. 19B (original FIG. 46B), "46A" has been changed to "19A" and "46C" has been changed to "19C".

In new FIG. 19C (original FIG. 46C), "46B" has been changed to "19B" and "46D" has been changed to "19D".

In new FIG. 19D (original FIG. 46D), "46C" has been changed to "19C".

Original FIGS. 13A–F, 16–41B, and 47A–63VV have been cancelled.

AS A RESULT OF REEXAMINATION, IT HAS BEEN DETERMINED THAT:

The patentability of claims 1–11 is confirmed.

New claims 12–20 are added and determined to be patentable.

*12. A digital time base compensator according to claim 9 wherein the detector receives the stream of digital data as bit serial data, wherein the digital data memory stores the digital data in as multi-bit parallel data, and further comprising a parallel to serial convertor coupled to receive the digital data from the digital data memory as multi-bit parallel data and output the digital data as bit serial data.*

*13. A digital time base compensator according to claim 9 wherein the digital data memory includes a register coupled to receive the digital data from the detector as bit serial data and a random access memory coupled to receive the digital data from the register as multi-bit parallel data and store the digital data as multi-bit parallel data.*

*14. A digital time base compensator according to claim 9 wherein the digital data memory includes a multi-bit register receiving the digital data in response to the first clock signal and a random access memory coupled to receive the digital data from the register and store the digital*

*data as multi-bit parallel data, the random access memory outputting the stored digital data as multi-bit parallel data in response to the second clock signal.*

*15. A digital time base compensator according to claim 14 further including a parallel to serial converter coupled to receive the digital data from the random access memory as multi-bit parallel data and output the digital data as time base compensated bit serial data.*

*16. A digital time base compensator according to claim 9 wherein the digital data memory includes a random access memory coupled to receive and store the digital data in response to the second clock signal and to retrieve the stored digital data in response to the second clock signal, the random access memory including an address generator circuit maintaining separate read and write addresses for the storage and retrieval respectively of the digital data by the random access memory.*

*17. A digital time base compensator according to claim 16 wherein the random access memory receives, stores, and retrieves the digital data as multi-bit parallel data.*

*18. A digital time base compensator according to claim 16 further comprising a multi-bit register coupled to receive the digital data in response to the first clock signal before*

*it is stored by the random access memory and a parallel to serial converter coupled to receive the digital data retrieved from the random access memory as multi-bit parallel data and convert the received digital data to bit serial data.*

*19. A digital time base compensator according to claim 9 wherein the digital data memory includes an addressable register receiving the digital data and a write address generator defining the location at which the digital data is written into the addressable register, the write address generator being responsive to the first indicating signal to initialize the write address upon each occurrence of the first indicating signal.*

*20. A digital time base compensator according to claim 9 wherein the digital data memory includes an addressable register coupled to receive the digital data as bit serial data; a real address generator defining the location at which data is read from the addressable register; and a write address generator defining the location at which data is written into the addressable register, the read and write address generators being initialized upon each occurrence of the first indicating signal.*

* * * * *